US012087947B2

(12) United States Patent
Busacca et al.

(10) Patent No.: US 12,087,947 B2
(45) Date of Patent: *Sep. 10, 2024

(54) ELECTRODE ASSEMBLY, SECONDARY BATTERY, AND METHOD OF MANUFACTURE

(71) Applicant: Enovix Corporation, Fremont, CA (US)

(72) Inventors: Robert S. Busacca, San Francisco, CA (US); Ashok Lahiri, Cupertino, CA (US); Murali Ramasubramanian, Fremont, CA (US); Bruno A. Valdes, Sunnyvale, CA (US); Gardner Cameron Dales, Los Gatos, CA (US); Christopher J. Spindt, Menlo Park, CA (US); Geoffrey Matthew Ho, San Ramon, CA (US); Harrold J. Rust, III, Alamo, CA (US); James D. Wilcox, Pleasanton, CA (US); John F. Varni, Los Gatos, CA (US); Kim Han Lee, Pleasanton, CA (US); Nirav S. Shah, Pleasanton, CA (US); Richard J. Contreras, Campbell, CA (US); Lynn Van Erden, Pollock Pines, CA (US); Ken S. Matsubayashi, Fremont, CA (US); Jeremie J. Dalton, San Jose, CA (US); Jason Newton Howard, Alpharetta, GA (US); Robert Keith Rosen, Rocklin, CA (US); Jonathan C. Doan, Pleasanton, CA (US); Michael J. Armstrong, Danville, CA (US); Anthony Calcaterra, Milpitas (CA); Benjamin L. Cardozo, Palo Alto, CA (US); Joshua David Winans, Mountain View, CA (US); Neelam Singh, Fremont, CA (US); Jeffrey Glenn Buck, Salinas, CA (US); Thomas John Schuerlein, Pleasanton, CA (US); Kim Lester Fortunati, Pleasanton, CA (US); Neal Sarswat, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/471,499

(22) Filed: Sep. 10, 2021

(65) Prior Publication Data

US 2022/0115753 A1 Apr. 14, 2022

Related U.S. Application Data

(63) Continuation of application No. 16/763,078, filed as application No. PCT/US2018/061245 on Nov. 15, 2018, now Pat. No. 11,128,020.

(Continued)

(51) Int. Cl.
*H01M 10/0525* (2010.01)
*H01M 4/134* (2010.01)
(Continued)

(52) U.S. Cl.
CPC ........... *H01M 4/525* (2013.01); *H01M 4/134* (2013.01); *H01M 4/386* (2013.01); *H01M 4/483* (2013.01);
(Continued)

(58) Field of Classification Search
CPC ...... H01M 4/134; H01M 4/525; H01M 4/386; H01M 4/483; H01M 4/661–669; H01M 50/46; H01M 50/54
See application file for complete search history.

(56) References Cited

U.S. PATENT DOCUMENTS 3,563,805 A 2/1971 Deierhoi
4,396,689 A 8/1983 Grimes et al.
(Continued)

FOREIGN PATENT DOCUMENTS

CA 02388711 5/2001
CN 85106872 6/1986
(Continued)

OTHER PUBLICATIONS

Patent Cooperation Treaty, International Search Report for PCT/US2022/022445, 2 pages Jul. 6, 2022.
(Continued)

*Primary Examiner* — Osei K Amponsah
(74) *Attorney, Agent, or Firm* — Haley Guiliano LLP

(57) ABSTRACT

Secondary batteries and methods of manufacture thereof are provided. A secondary battery can comprise an offset between electrode and counter-electrode layers in a unit cell. Secondary batteries can be prepared by removing a popu-
(Continued)

lation of negative electrode subunits from a negative electrode sheet, the negative electrode sheet comprising a negative electrode sheet edge margin and at least one negative electrode sheet weakened region that is internal to the negative electrode sheet edge margin, removing a population of separator layer subunits from a separator sheet, and removing a population of positive electrode subunits from a positive electrode sheet, the positive electrode sheet comprising a positive electrode edge margin and at least one positive electrode sheet weakened region that is internal to the positive electrode sheet edge margin, and stacking members of the negative electrode subunit population, the separator layer subunit population and the positive electrode subunit population.

20 Claims, 105 Drawing Sheets

Related U.S. Application Data

(60) Provisional application No. 62/715,233, filed on Aug. 6, 2018, provisional application No. 62/586,737, filed on Nov. 15, 2017.

(51) Int. Cl.

| | |
|---|---|
| ***H01M 4/38*** | (2006.01) |
| ***H01M 4/48*** | (2010.01) |
| ***H01M 4/525*** | (2010.01) |
| ***H01M 4/66*** | (2006.01) |
| ***H01M 10/04*** | (2006.01) |
| ***H01M 10/054*** | (2010.01) |
| ***H01M 10/0565*** | (2010.01) |
| ***H01M 10/0585*** | (2010.01) |
| ***H01M 50/103*** | (2021.01) |
| ***H01M 50/46*** | (2021.01) |
| ***H01M 50/54*** | (2021.01) |
| *H01M 4/02* | (2006.01) |

(52) U.S. Cl.

CPC .......... *H01M 4/661* (2013.01); *H01M 4/669* (2013.01); *H01M 10/0436* (2013.01); *H01M 10/0525* (2013.01); *H01M 10/054* (2013.01); *H01M 10/0565* (2013.01); *H01M 10/0585* (2013.01); *H01M 50/103* (2021.01); *H01M 50/46* (2021.01); *H01M 50/54* (2021.01); *H01M 2004/027* (2013.01); *H01M 2004/028* (2013.01)

(56) References Cited

U.S. PATENT DOCUMENTS 4,587,182 A 5/1986 Stiles et al.
5,238,759 A 8/1993 Plichta et al.
5,294,504 A 3/1994 Otagawa
5,350,645 A 9/1994 Lake et al.
5,709,962 A 1/1998 Bailey
6,083,640 A 7/2000 Lee et al.
6,090,505 A 7/2000 Shimamura et al.
6,235,427 B1 5/2001 Idota et al.
6,287,371 B1 9/2001 Ota et al.
6,355,369 B1 3/2002 Iarochenko et al.
6,383,234 B1 5/2002 Noh
6,432,579 B1 8/2002 Tsuji et al.
6,432,585 B1 8/2002 Kawakami
6,525,391 B1 2/2003 Bertrand et al.
6,679,925 B1 1/2004 Tanizaki et al.
6,726,733 B2 4/2004 Lee et al.
6,791,737 B2 9/2004 Giron
6,855,378 B1 2/2005 Narang
7,066,971 B1 6/2006 Carlson
7,309,548 B2 12/2007 Ota et al.
7,402,829 B2 7/2008 Green
7,722,984 B2 5/2010 Kim et al.
7,824,806 B2 11/2010 Visco et al.
8,101,298 B2 1/2012 Green et al.
8,129,048 B2 3/2012 Hirakawa et al.
8,133,613 B2 3/2012 Ramasubramanian et al.
8,192,788 B1 6/2012 Shah et al.
8,367,244 B2 2/2013 Ramasubramanian et al.
8,475,957 B2 7/2013 Rust, III et al.
8,524,395 B2 9/2013 Ramasubramanian et al.
8,527,395 B2 9/2013 Ramasubramanian et al.
8,580,439 B1 11/2013 Kaiser et al.
8,722,226 B2 5/2014 Chiang et al.
8,841,030 B2 9/2014 Lahiri et al.
8,865,345 B1 10/2014 Ramasubramanian et al.
8,993,159 B2 3/2015 Chiang et al.
9,105,905 B2 8/2015 Ramasubramanian et al.
9,153,833 B2 10/2015 Chiang et al.
9,343,772 B2 5/2016 Byun
9,356,271 B2 5/2016 Ramasubramanian et al.
9,362,553 B2 6/2016 Lahiri et al.
9,660,292 B2 5/2017 Rust, III et al.
9,692,044 B2 6/2017 Delpuech et al.
9,806,331 B2 10/2017 Lahiri et al.
9,991,490 B2 6/2018 Ramasubramanian et al.
10,020,514 B2 7/2018 Ramasubramanian et al.
10,038,214 B2 7/2018 Rust, III
10,177,400 B2 1/2019 Busacca et al.
10,256,507 B1 4/2019 Busacca et al.
10,283,807 B2 5/2019 Busacca et al.
10,784,477 B2 9/2020 Fischer et al.
11,063,299 B2 7/2021 Busacca et al.
11,081,718 B2 8/2021 Busacca et al.
11,128,020 B2 9/2021 Busacca et al.
11,205,803 B2 12/2021 Busacca et al.
11,211,639 B2 12/2021 Busacca et al.
11,239,488 B2 2/2022 Busacca et al.
11,264,680 B2 3/2022 Busacca et al.
11,411,253 B2 8/2022 Busacca et al.
11,444,310 B2 9/2022 Busacca et al.
11,600,864 B2 3/2023 Busacca et al.
2002/0013986 A1 2/2002 Ahn et al.
2003/0082446 A1 5/2003 Chiang et al.
2003/0175589 A1 9/2003 Kaminaka et al.
2004/0038125 A1 2/2004 Kim et al.
2004/0048151 A1 3/2004 Hayashi et al.
2004/0185336 A1 9/2004 Ito et al.
2004/0214085 A1 10/2004 Sheem et al.
2004/0234861 A1 11/2004 Kawase et al.
2004/0241540 A1 12/2004 Tsutsumi et al.
2004/0253512 A1 12/2004 Watanabe et al.
2005/0008939 A1 1/2005 Ota et al.
2005/0095503 A1 5/2005 Adachi et al.
2005/0120548 A1 6/2005 Rohl et al.
2005/0130383 A1 6/2005 Divakaruni et al.
2005/0208379 A1 9/2005 Musha et al.
2006/0093871 A1 5/2006 Howard
2007/0002523 A1 1/2007 Ando et al.
2007/0031733 A1 2/2007 Kogetsu et al.
2007/0097481 A1 5/2007 Burdis et al.
2007/0172732 A1 7/2007 Jung et al.
2007/0285051 A1 12/2007 Jeon et al.
2008/0003490 A1 1/2008 Christensen
2008/0081256 A1 4/2008 Madou et al.
2008/0081257 A1 4/2008 Yoshida et al.
2008/0233455 A1 9/2008 Deimede
2009/0023073 A1 1/2009 Okada et al.
2009/0035664 A1 2/2009 Chiang et al.
2009/0068567 A1 3/2009 Konishiike et al.
2009/0123847 A1 5/2009 Okada et al.
2009/0136844 A1 5/2009 Watanabe et al.
2009/0142656 A1 6/2009 Nathan et al.
2009/0155678 A1 6/2009 Less et al.
2009/0159311 A1 6/2009 Zheng et al.
2009/0263716 A1 10/2009 Ramasubramanian et al.
2009/0303660 A1 12/2009 Nair et al.

(56) References Cited

U.S. PATENT DOCUMENTS

| | | | |
|---|---|---|---|
| 2010/0040951 | A1 | 2/2010 | Yamamoto et al. |
| 2010/0051856 | A1 | 3/2010 | Kim et al. |
| 2010/0209775 | A1 | 8/2010 | Kim |
| 2010/0266907 | A1 | 10/2010 | Yazami |
| 2010/0285368 | A1 | 11/2010 | Yamamato et al. |
| 2011/0008656 | A1 | 1/2011 | Takayuki et al. |
| 2011/0014522 | A1 | 1/2011 | Visco et al. |
| 2011/0020701 | A1 | 1/2011 | Park et al. |
| 2011/0020713 | A1 | 1/2011 | Cui et al. |
| 2011/0020719 | A1 | 1/2011 | Manabe et al. |
| 2011/0067228 | A1 | 3/2011 | Green |
| 2011/0111283 | A1 | 5/2011 | Rust, III et al. |
| 2011/0129732 | A1 | 6/2011 | Bachrach et al. |
| 2011/0159328 | A1 | 6/2011 | Yeo |
| 2011/0171518 | A1 | 7/2011 | Dunn et al. |
| 2011/0200862 | A1 | 8/2011 | Kurosawa |
| 2011/0294015 | A1 | 12/2011 | Pirk et al. |
| 2012/0052341 | A1 | 3/2012 | Kim et al. |
| 2012/0100438 | A1 | 4/2012 | Fasching et al. |
| 2012/0176093 | A1 | 7/2012 | Ramasubramanian et al. |
| 2012/0202113 | A1 | 8/2012 | Hodge et al. |
| 2012/0288742 | A1 | 11/2012 | Tanaka et al. |
| 2013/0078493 | A1 | 3/2013 | Chen |
| 2013/0136963 | A1 | 5/2013 | Chiba |
| 2013/0143120 | A1 | 6/2013 | Ramasubramanian et al. |
| 2013/0189602 | A1 | 7/2013 | Lahiri et al. |
| 2013/0202942 | A1 | 8/2013 | Sakai et al. |
| 2013/0230751 | A1 | 9/2013 | Shaw |
| 2014/0050969 | A1 | 2/2014 | Rust, III et al. |
| 2014/0072850 | A1 | 3/2014 | Kwon |
| 2014/0154531 | A1 | 6/2014 | Furuya et al. |
| 2014/0272547 | A1* | 9/2014 | Ramasubramanian ..................... H01M 50/46 429/246 |
| 2014/0335395 | A1 | 11/2014 | Ramasubramanian et al. |
| 2014/0366366 | A1 | 12/2014 | Kang et al. |
| 2015/0007952 | A1 | 1/2015 | Möderl et al. |
| 2015/0024253 | A1 | 1/2015 | Noh |
| 2015/0033547 | A1 | 2/2015 | Yang et al. |
| 2015/0079452 | A1 | 3/2015 | Park et al. |
| 2015/0104686 | A1 | 4/2015 | Brommer et al. |
| 2015/0135522 | A1 | 5/2015 | Seto et al. |
| 2015/0162575 | A1 | 6/2015 | Son |
| 2015/0243997 | A1 | 8/2015 | Park et al. |
| 2016/0186335 | A1 | 6/2016 | Naito et al. |
| 2016/0197332 | A1 | 7/2016 | Lee et al. |
| 2017/0141365 | A1 | 5/2017 | Kim et al. |
| 2017/0170525 | A1 | 6/2017 | Mitani et al. |
| 2017/0244088 | A1 | 8/2017 | Narbonne et al. |
| 2017/0352850 | A1 | 12/2017 | Nagane et al. |
| 2018/0040876 | A1 | 2/2018 | Lahiri et al. |
| 2018/0079035 | A1 | 3/2018 | Watanabe |
| 2018/0145367 | A1 | 5/2018 | Busacca et al. |
| 2018/0166735 | A1 | 6/2018 | Busacca et al. |
| 2019/0207264 | A1 | 7/2019 | Busacca et al. |
| 2019/0221878 | A1 | 7/2019 | Busacca et al. |
| 2019/0319294 | A1 | 10/2019 | Busacca et al. |
| 2019/0350633 | A1 | 11/2019 | Ramadhyani et al. |
| 2019/0372150 | A1 | 12/2019 | Busacca et al. |
| 2020/0212493 | A1 | 7/2020 | Busacca et al. |
| 2020/0313146 | A1 | 10/2020 | Busacca et al. |
| 2020/0350633 | A1 | 11/2020 | Busacca et al. |
| 2021/0265617 | A1 | 8/2021 | Okano et al. |
| 2022/0115711 | A1 | 4/2022 | Busacca et al. |
| 2022/0123370 | A1 | 4/2022 | Busacca et al. |
| 2022/0149423 | A1 | 5/2022 | Busacca et al. |
| 2022/0158220 | A1 | 5/2022 | Busacca et al. |
| 2022/0166051 | A1 | 5/2022 | Busacca et al. |
| 2022/0173485 | A1 | 6/2022 | Busacca et al. |
| 2022/0181702 | A1 | 6/2022 | Busacca et al. |
| 2022/0399612 | A1 | 12/2022 | Busacca et al. |

FOREIGN PATENT DOCUMENTS

| | | | |
|---|---|---|---|
| CN | 1286811 | | 9/1993 |
| CN | 1555588 | | 12/2004 |
| CN | 101960643 | | 1/2011 |
| CN | 102007625 | | 6/2011 |
| CN | 102569758 | | 7/2012 |
| CN | 104347856 | | 2/2015 |
| CN | 105518904 | | 4/2015 |
| CN | 104662714 | | 5/2015 |
| CN | 105308772 | A | 2/2016 |
| DE | 102018203033 | | 9/2018 |
| EP | 0883199 | | 12/1998 |
| EP | 1028476 | | 8/2000 |
| EP | 1100134 | | 5/2001 |
| EP | 1102340 | | 5/2001 |
| EP | 1465268 | | 10/2004 |
| EP | 1270765 | | 1/2007 |
| EP | 2048262 | | 4/2009 |
| EP | 2277214 | | 10/2009 |
| EP | 2624357 | A1 | 8/2013 |
| EP | 2858162 | | 4/2015 |
| EP | 2223367 | | 6/2015 |
| EP | 3051606 | | 8/2016 |
| EP | 3295507 | | 3/2018 |
| EP | 3367468 | | 8/2018 |
| EP | 3455898 | | 3/2019 |
| EP | 3883199 | A1 | 9/2021 |
| JP | H01132064 | | 5/1989 |
| JP | H06236768 | A | 8/1994 |
| JP | 1012279 | | 1/1998 |
| JP | 2001185224 | | 7/2001 |
| JP | 2003323882 | | 11/2003 |
| JP | 2004351500 | | 12/2004 |
| JP | 2005149891 | | 6/2005 |
| JP | 2005285378 | A | 10/2005 |
| JP | 2006100280 | | 4/2006 |
| JP | 2006173001 | | 6/2006 |
| JP | 2006236768 | | 9/2006 |
| JP | 2006286427 | | 10/2006 |
| JP | 2007258160 | | 10/2007 |
| JP | 2008140633 | A | 6/2008 |
| JP | 2008171732 | | 7/2008 |
| JP | 2009170258 | A | 7/2009 |
| JP | 2010146732 | A | 7/2010 |
| JP | 2010225552 | A | 10/2010 |
| JP | 2010262752 | A | 11/2010 |
| JP | 2010278125 | A | 12/2010 |
| JP | 2011171029 | | 9/2011 |
| JP | 2012516941 | A | 7/2012 |
| JP | 2012160352 | | 8/2012 |
| JP | 2015505120 | | 2/2015 |
| JP | 2015064959 | A | 4/2015 |
| JP | 2015172997 | | 10/2015 |
| JP | 2015220218 | | 12/2015 |
| JP | 201618772 | | 2/2016 |
| JP | 2016139610 | | 8/2016 |
| JP | 2019169476 | | 10/2019 |
| KR | 20030044508 | | 6/2003 |
| KR | 1020060050988 | | 5/2006 |
| KR | 1020070021192 | | 2/2007 |
| KR | 20130105001 | | 9/2013 |
| KR | 1020150010226 | | 1/2015 |
| KR | 1020150045456 | | 4/2015 |
| KR | 10-2015-0100129 | A | 9/2015 |
| NL | 1015956 | | 2/2002 |
| TW | 201214847 | A | 4/2012 |
| TW | 201225385 | A | 6/2012 |
| TW | 201414048 | | 4/2014 |
| WO | 01/05258 | A1 | 1/2001 |
| WO | 0243168 | A2 | 5/2002 |
| WO | 03105258 | | 12/2003 |
| WO | 2005101973 | | 11/2005 |
| WO | 2006064344 | | 6/2006 |
| WO | 2008030215 | | 3/2008 |
| WO | 2008089110 | | 7/2008 |
| WO | 2009109834 | | 9/2009 |
| WO | 2009129490 | | 10/2009 |
| WO | 2009140300 | | 11/2009 |

(56) References Cited

FOREIGN PATENT DOCUMENTS

| | | |
|---|---|---|
| WO | 2010090956 A2 | 8/2010 |
| WO | 2010092059 | 8/2010 |
| WO | 2010138176 | 12/2010 |
| WO | 2011154862 | 12/2011 |
| WO | 2012/020480 A1 | 2/2012 |
| WO | 2013112135 | 8/2013 |
| WO | 2013112670 | 8/2013 |
| WO | 2014024424 | 2/2014 |
| WO | 2014028230 A1 | 2/2014 |
| WO | 2014151202 | 9/2014 |
| WO | 2016183410 | 11/2016 |
| WO | 2018020906 | 2/2018 |
| WO | 2018115016 | 6/2018 |
| WO | 2019099642 | 5/2019 |
| WO | 2019099650 | 5/2019 |
| WO | 2020066254 | 4/2020 |
| WO | 2021020480 | 2/2021 |
| WO | 2022060703 | 3/2022 |
| WO | 2022108954 | 5/2022 |
| WO | 2022125529 | 6/2022 |
| WO | 202221056 | 10/2022 |

OTHER PUBLICATIONS

Patent Cooperation Treaty, International Search Report for PCT/US2022/022439, 3 pages Jul. 8, 2022.
Extended European Search Report for 21208850.4 dated Apr. 20, 2022, 8 pages.
Alliance Rubber Company, Rubber Band Size Chart, retrieved from www.rubberband.com/public/userfiles/sales-collateral/RubberBandChart.pdf, 2 pgs 2021.
Patent Cooperation Treaty, International Search Report for PCT/US2018/061254, 5pgs. Mar. 7, 2019.
Rubber Bans (Year: 2021).
Patent Cooperation Treaty, International Search Report for PCT/US2016/032255, dated Aug. 25, 2017, 4 pages 2017.
U.S. Appl. No. 17/471,499, filed Sep. 10, 2021.
U.S. Appl. No. 17/562,228, filed Dec. 27, 2021.
U.S. Appl. No. 17/582,451, filed Jan. 24, 2022.
U.S. Appl. No. 17/355,725, filed Jun. 1, 2021.
Patent Cooperation Treaty, International Search Report issued on PCT/US2012/022393, on Oct. 10, 2012, 4 pages.
European Patent Office, Extended European Search Report for 20191612.9, 7 pages Mar. 5, 2021.
Golodnitsky et al., Advanced materials for the 3D microbattery, Journal of Power Sources, 2006, 153, 281-287.
Long et al., Three-Dimensional battery Architectures, Chemical Reviews, 2004, 104, 4463-4492.
Broussely et al., Li-ion batteries and portable power source prospects for the next 5-10 years, Journal of Power Sources, 136, 2004, 386-394.
Whitehead et al., Current Collectors for positive electrodes of lithium-based batteries, Journal of the Electrochemical Society, 2005, A5105-A2113, 152(11) Sep. 8, 2005.
United Kingdom Search Report dated mailed Dec. 18, 2012, 4 pages Dec. 18, 2012.
Patent Cooperation Treaty, International Search report issued for PCT/US2013/022868, mailed May 15, 2013, 3 pages May 15, 2013.
Harraz et al., Different behavior in immersion plating of nickel on porous silicon from acidic and alkaline fuoride media, J. Electrochem. Soc, 150, 5, 2003, pp. C277-C284 Mar. 18, 2003.
Patent Cooperation Treaty, International Search Report for PCT/US2009/041012, mailed Sep. 8, 2009, 4 pages Sep. 8, 2009.
Liu, C., Bulk Micromachining and Silicon Anisotropic Etching, Foundations of MEMS, Prentice Hall Inc. Chapter 10, pp. 326-370; Prentice Hall Dec. 31, 2006.
Shin et al. Porous Silicon Negative Electrodes for Rachargeable Lithium Batteries, Journal of Power Sources, 139 (2005) 314-320 Sep. 13, 2004.
Vyatkin et al., Random and Ordered Macropore in p-type silicon J. Electrochem. Soc. 149, 1, G70-G76 (2002) Dec. 6, 2001.
Arora, P. et al., Battery Separators, Chem. Reviews, 2004, 104, 4419-4462 Mar. 30, 2004.
Bourderau et al., Amorphous Silicon As A Possible Anode Material For Li-Ion Batteries, Journal of Power Sources, 1999, 81-82, 233-236 Sep. 30, 1999.
Li et al., The Crystal Structural Evolution Of Nano-Si Anode Caused By Lithium Insertion And Extraction At Room Temperature, Solid State Ionics, 2000, 135, 181-191 Nov. 30, 2000.
Kasavajjula et al., Nano- and Bulk-Silicon-Based Insertion Anodes for Lithium-Ion Secondary Cells, Journal of Power Sources, 2007, 1003-1039, 163 Nov. 9, 2006.
Green et al., Structured silicon anodes for lithium battery applications, Electrochemical and Solid State Letters, 6, 2003, A75-A79 Mar. 5, 2003.
Dierks, S., GuideChem, NickelSilicide (Ni2Si) (cas 12059-14-2) MSDS, Material safety data sheet, retrieved from www.guidechem.com/cas-120/12059-14-2.html, 2 pgs Sep. 30, 1993.
Patent Cooperation Treaty, International Search Report for PCT/US2013/053235, mailed Jan. 28, 2014, 5 pages Jan. 28, 2014.
Patent Cooperation Treaty, International Search Report issued for PCT/US2014/025200, mailed on Jul. 29, 2014, 4 pages Jul. 29, 2014.
Mu et al., Silicon nanotube array/gold electrode for direct electrochemistry of cytochrome C, J. Phys. Chem. B, 2007, 111(6), 1491-1495.
European Patent Office, Extended Search Report for EP 13 74 0825, App. No. 13740825.8, issued Aug. 8, 2015, 9 pages.
Harraz et al., Immersion plating of nickel onto a porous silicon layer from fluoride solutions, Phys. Stat. Sol., 2003, 197(1): 51-56.
Obrovac et al., Reversible cycling of crystalline silicon powder, J. Elect. Soc., 2007, 154(2): A103-A108.
Waidmann et al., Tuning nickel silicide properties using a lamp based RTA, a heat conduction based RTA or a furnace anneal, Microelectronic Engineering, 2006, 83, 2282-2286.
Xu et al., Theorectical studies of displacement disposition of nickel into porous silicon with ultrahigh aspect ration, Electrochimica Acta, 2006, 52, 3901-3909.
Xu et al., Nickel displacement deposition of porous silicon with ultrahigh aspect ratio, J. Elect. Soc., 2007, 154(3): 170-174.
Zhang et al., High aspect ration nickel structions fabricated by electrochemical replication of hydrofluoric acid etched silicon, Electrochemical and Solid-State Letters, 2006, 9(9): C150-C152.
European Patent Office, Extended European Search Report for 12866772.2, EP 2807698, dated Oct. 8, 2015, 3 pages.
Su et al., Silicon-Based Nanomaterials for Lithium-Ion Batteries: A Review, Advanced Energy Materials, 2013, 1-23.
Maranchi et al., High capacity, reversible silicon thin-film anodes for lithium-ion batteries, Electronchemical and Solid-State Letters, 2001, 6(9), A198-A201.
Iaboni et al., Li15SI4 Formation in silicon thin film negative electrodes, Journal of the Electrochemical Society, 2016, 163(2), A255-A261.
European Patent Office, Extended European Search Report for 13829954.0, EP 2885830, dated Feb. 19, 2016, 7 pages.
European Patent Office, Extended European Search Report for 14768734.7, EP 2973785, 10 pages Jul. 15, 2016.
Patent Cooperation Treaty, International Search Report for PCT/US2016/032284, dated Aug. 26, 2016, 4 pages 2016.
Roberts et al., 3D lithium ion batteries—from fundamentals to fabrication, Journal of Materials Chemistry, Royal Society of Chemistry, 2011, 21: 9876-9890 2011.
Taiwan Search Report for App. No. 102129550, issued Sep. 9, 2016, 1 page Sep. 9, 2016.
Patent Cooperation Treaty, International Search Report for PCT/US2017/032355, 4 pages Aug. 25, 2017.
Patent Cooperation Treaty, International Search Report for PCT/US2017/061892, 6 pages Mar. 27, 2018.
European Patent Office, Extended European Search Report for EP 17872332.6, 7 pages Sep. 1, 2020.
European Patent Office, Extended Search Report for EP App. 19197127.4, 3 pages Jan. 17, 2020.

(56) References Cited

OTHER PUBLICATIONS

European Patent Office, Extended European Search Report for Application No. 16793590.7, publication EP 3295507, 7 pages Aug. 28, 2018.
Patent Cooperation Treaty, International Search Report for PCT/US2018/061245, 10 pgs. May 7, 2019.
European Patent Office, Extended Search Report for EP App. 17796914.4, 10 pages Nov. 19, 2019.
Google Query Result Page for "Pressure a Rubber Band Can Apply" and "How much pressure does a rubber band have?", 1 page 2021.
Keener Rubber Bands Federal Specifications, retrieved from keener-rubber.com/Federal%20Specifications.htm, 1 page 2021.
Patent Cooperation Treaty, Written Opinion of the International Searching Authority issued on PCT/US2012/022393, on Oct. 9, 2012, 5 pages.

* cited by examiner $A_{EA}$
116
118
142

Stacking Process - 3

Post Stack Battery Fabrication Process - 1

ELECTRODE ASSEMBLY, SECONDARY BATTERY, AND METHOD OF MANUFACTURE

CROSS-REFERENCE TO RELATED APPLICATIONS

The present application is a continuation of U.S. patent application Ser. No. 16/763,078 filed on May 11, 2020, now U.S. Pat. No. 11,128,020, which is a National Stage of PCT/US2018/061245 filed Nov. 15, 2018, claims priority to U.S. provisional application No. 62/715,233 filed on Aug. 6, 2018 and U.S. provisional application No. 62/586,737 filed on Nov. 15, 2017. The entire contents of the above patent documents are incorporated by reference as if recited in full herein.

FIELD OF THE INVENTION

This disclosure generally relates to methods of manufacturing electrode assemblies for use in energy storage devices, and to energy storage devices having electrode assemblies manufactured according to methods herein.

BACKGROUND

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two or more battery cells that have been electrically coupled to form the battery, with each battery cell comprising a positive electrode, a negative electrode, a microporous separator, and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

When the carrier ions move between electrodes, one of the persistent challenges resides in the fact that the electrodes tend to expand and contract as the battery is repeatedly charged and discharged. The expansion and contraction during cycling tends to be problematic for reliability and cycle life of the battery because when the electrodes expand, electrical shorts and battery failures occur. Yet another issue that can occur is that mismatch in electrode alignment, for example caused by physical or mechanical stresses on the battery during manufacture, use or transport, can lead to shorting and failure of the battery.

Therefore, there remains a need for controlling the expansion and contraction of electrodes during battery cycling to improve reliability and cycle life of the battery. There also remains a need for controlling electrode alignment, and structures that improve mechanical stability of the battery without excessively increasing the battery footprint.

Furthermore, there remains a need for reliable and effective means of manufacture of such batteries. That is, there is a need for efficient manufacturing methods for providing batteries having electrode assemblies with carefully controlled alignment, and with controlled expansion of the electrode assemblies during cycling of the battery.

SUMMARY

Briefly, therefore, one aspect of this disclosure relates to a secondary battery for cycling between a charged and a discharged state, the secondary battery comprising a battery enclosure and an electrode assembly, carrier ions, and electrode and counter-electrode busbars for collecting current from the electrode assembly within the battery enclosure, wherein:

(a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis 20) $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to carrier ions, a population of counter-electrode structures, a population of counter-electrode current collectors, and a population of unit cells wherein (i) members of the electrode and counter-electrode structure populations are arranged in an alternating sequence in the longitudinal direction, (ii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a height $H_E$ that corresponds to the Feret diameter of the electrode active material layer as measured in the vertical direction between first and second opposing vertical end surfaces of the electrode active material layer, and a width $W_E$ that corresponds to the Feret diameter of the electrode active material layer as measured in the longitudinal direction between first and second opposing surfaces of the electrode active material layer, and each member of the population of counter-electrode structures comprises a layer of a counter-electrode active material having a length $L_C$ that corresponds to the Feret diameter of the counter-electrode active material layer as measured in the transverse direction between first and second opposing transverse end surfaces of the counter-electrode active material layer, and a height $H_C$ that corresponds to the Feret diameter of the counter-electrode active material layer as measured in the vertical direction between first and second opposing vertical end surfaces of the counter-electrode active material layer, and a width $W_C$ that corresponds to the Feret diameter of the counter-electrode active material layer as measured in the longitudinal direction between first and second opposing surfaces of the counter-electrode active material layer (iii) each unit cell comprises a unit cell portion of a first member of the electrode current collector of the electrode current collector population, a first electrode active material layer of one member of the electrode population, a member of the separator population that is ionically permeable to the carrier ions, a first counter-electrode active material layer of one member of the counter-electrode population, and a unit cell portion of a first member of the counter-electrode current collector of the counter-electrode current collector population, wherein (aa) the first electrode active material layer is proximate a first side of the separator and the first counter-electrode material layer is proximate an opposing second side of the separator, and (bb) the separator electrically isolates the first electrode active material layer from the first counter-electrode active material layer, and carrier ions are primarily exchanged between the first electrode active material layer and the first counter-electrode active material layer via the separator of each such unit cell during cycling of the battery between the charged and discharged state, (cc) the first member of the electrode current collector population extends at least partially along the length $L_E$ of the electrode active material layer in the transverse direction and comprises an electrode current collector end that extends past the first transverse end surface of the counter-electrode active material layer of each such unit cell, and (dd) the counter-electrode current collector extends at least partially along the length $L_C$ of the counter-electrode active material layer in the transverse direction and comprises a counter-electrode current collector end that extends past the second transverse end surface of the electrode active material layer in the transverse direction of each such unit cell, and (c)(i) the electrode busbar comprises at least one conductive segment configured to electrically connect to the population of electrode current collectors, and extending in the longitudinal direction of the electrode assembly, the conductive segment comprising a first side having an interior surface facing the first transverse end surfaces of the counter-electrode active material layers, and an opposing second side having an exterior surface, the conductive segment optionally comprising a plurality of apertures spaced apart on along the longitudinal direction, the conductive segment of the electrode bus bar being arranged with respect to the electrode current collector ends such that the electrode current collector ends extend at least partially past a thickness of the conductive segment, to electrically connect thereto, the thickness of the conductive segment being measured between the interior and exterior surfaces, and (c)(ii) the counter-electrode busbar comprises at least one conductive segment configured to electrically connect to the population of counter-electrode current collectors, and extending in the longitudinal direction of the electrode assembly, the conductive segment comprising a first side having an interior surface facing the second transverse end surfaces of the electrode active material layers, and an opposing second side having an exterior surface, the conductive segment optionally comprising a plurality of apertures spaced apart on along the longitudinal direction, the conductive segment of the counter-electrode bus bar being arranged with respect to the counter-electrode current collector ends such that the counter-electrode current collector ends extend at least partially past a thickness of the conductive segment, to electrically connect thereto, the thickness of the conductive segment being measured between the interior and exterior surfaces.

Another aspect of the disclosure relates to a secondary battery for cycling between a charged and a discharged state, the secondary battery comprising a battery enclosure, an electrode assembly, and carrier ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to the carrier ions, a population of counter-electrode structures, a population of counter-electrode collectors, and a population of unit cells wherein (i) members of the electrode and counter-electrode structure populations are arranged in an alternating sequence in the longitudinal direction, (ii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a height $H_E$ that corresponds to the Feret diameter of the electrode active material layer as measured in the vertical direction between first and second opposing vertical end surfaces of the electrode active material layer, and a width $W_E$ that corresponds to the Feret diameter of the electrode active material layer as measured in the longitudinal direction between first and second opposing surfaces of the electrode active material layer, and each member of the population of counter-electrode structures comprises a layer of a counter-electrode active material having a length $L_C$ that corresponds to the Feret diameter of the counter-electrode active material layer as measured in the transverse direction between first and second opposing transverse end surfaces of the counter-electrode active material layer, and a height $H_C$ that corresponds to the Feret diameter of the counter-electrode active material layer as measured in the vertical direction between first and second opposing vertical end surfaces of the counter-electrode active material layer, and a width $W_C$ that corresponds to the Feret diameter of the counter-electrode active material layer as measured in the longitudinal direction between first and second opposing surfaces of the counter-electrode active material layer, (iii) each unit cell comprises a unit cell portion of a first member of the electrode current collector population, a member of the separator population that is ionically permeable to the carrier ions, a first electrode active material layer of one member of the electrode population, a unit cell portion of first member of the counterelectrode current collector population and a first counter-electrode active material layer of one member of the counter-electrode population, wherein (aa) the first electrode active material layer is proximate a first side of the separator and the first counter-electrode material layer is proximate an opposing second side of the separator, (bb) the separator electrically isolates the first electrode active material layer from the first counter-electrode active material layer and carrier ions are primarily exchanged between the first electrode active material layer and the first counter-electrode active material layer via the separator of each such unit cell during cycling of the battery between the charged and discharged state, and (cc) within each unit cell, a. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, wherein for at least 60% of the height $H_C$ of the counter electrode active material layer (i) the absolute value of a separation distance, $S_{X1}$, between the plots $E_{TP1}$ and $CE_{TP1}$ measured in the transverse direction is 1000 $\mu m \geq |S_{X1}| \geq 5$ $\mu m$, and (ii) as between the first transverse end surfaces of the electrode and counter-electrode active material layers, the first transverse end surface of the counter-electrode active material layer is inwardly disposed with respect to the first transverse end surface of the electrode active material layer, b. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, wherein for at least 60% of the height $H_C$ of the counter-electrode active material layer (i) the absolute value of a separation distance, $S_{X2}$, between the plots $E_{TP2}$ and $CE_{TP2}$ measured in the transverse direction is 1000 $\mu m \geq |S_{X2}| \geq 5$ $\mu m$, and (ii) as between the second transverse end surfaces of the electrode and counter-electrode active material layers, the second transverse end surface of the counter-electrode active material layer is inwardly disposed with respect to the second transverse end surface of the electrode active material layer, c. the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vertical end surface plot, $E_{VP1}$, a 2D map of the median vertical position of the first opposing vertical end surface of the counter-electrode active material layer in the X-Z plane, along the length $L_C$ of the counter-electrode active material layer, traces a first vertical end surface plot, $CE_{VP1}$, wherein for at least 60% of the length $L_C$ of the first counter-electrode active material layer (i) the absolute value of a separation distance, $S_{Z1}$, between the plots $E_{VP1}$ and $CE_{VP1}$ measured in the vertical direction is 1000 $\mu m \geq |S_{Z1}| \geq 5$ $\mu m$, and (ii) as between the first vertical end surfaces of the electrode and counter-electrode active material layers, the first vertical end surface of the counter-electrode active material layer is inwardly disposed with respect to the first vertical end surface of the electrode active material layer, d. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, $E_{VP2}$, a 2D map of the median vertical position of the second opposing vertical end surface of the counter-electrode active material layer in the X-Z plane, along the length $L_C$ of the counter-electrode active material layer, traces a second vertical end surface plot, $CE_{VP2}$, wherein for at least 60% of the length $L_C$ of the counter-electrode active material layer (i) the absolute value of a separation distance, $S_{Z2}$, between the plots $E_{VP2}$ and $CE_{VP2}$ as measured in the vertical direction is 1000 $\mu m \geq |S_{Z2}| \geq 5$ $\mu m$, and (ii) as between the second vertical end surfaces of the electrode and counter-electrode active material layers, the second vertical end surface of the counter-electrode active material layer is inwardly disposed with respect to the second vertical end surface of the electrode active material layer, (c) the set of electrode constraints comprises a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%.

Yet another aspect of the disclosure relates to a secondary battery for cycling between a charged and a discharged state, the secondary battery comprising a battery enclosure, an electrode assembly, and carrier ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to carrier ions, a population of counter-electrode structures, a population of counter-electrode collectors, a carrier ion insulating material layer, and a population of unit cells, wherein (i) each electrode current collector of the population is electrically isolated from each counter-electrode active material layer of the population, and each counter-electrode current collector of the population is electrically isolated from each electrode active material layer of the population, (ii) members of the electrode and counter-electrode structure populations are arranged in an alternating sequence in the longitudinal direction, (iii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a width $W_E$ that corresponds to the Feret diameter of the electrode active material layer as measured in the longitudinal direction between first and second opposing surfaces of the electrode active material layer, and a height $H_E$ that corresponds to the Feret diameter of the electrode active material layer as measured in the vertical direction between first and second opposing vertical end surfaces of the electrode active material layer, and each member of the population of counter-electrode structures comprises a layer of a counter-electrode active material having a length $L_C$ that corresponds to the Feret diameter of the counter-electrode active material layer as measured in the transverse direction between first and second opposing transverse end surfaces of the counter-electrode active material layer, and a width $W_C$ that corresponds to the Feret diameter of the counter-electrode active material layer as measured in the longitudinal direction between first and second opposing longitudinal end surfaces of the counter-electrode active material layer, and a height $H_C$ that corresponds to the Feret diameter of the counter-electrode active material layer as measured in the vertical direction between first and second opposing vertical end surfaces of the counter-electrode active material layer, (iv) each unit cell comprises a unit cell portion of a first member of the electrode current collector population, a member of the separator population that is ionically permeable to the carrier ions, a first electrode active material layer of one member of the electrode population, a unit cell portion of a first member of the counter-electrode current collector population and a first counter-electrode active material layer of one member of the counter-electrode population, wherein (aa) the first electrode active material layer is proximate a first side of the separator and the first counter-electrode material layer is proximate an opposing second side of the separator, (bb) the separator electrically isolates the first electrode active material layer from the first counter-electrode active material layer and carrier ions are primarily exchanged between the first electrode active material layer and the first counter-electrode active material layer via the separator of each such unit cell during cycling of the battery between the charged and discharged state, and (cc) within each unit cell, a. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, and wherein an absolute value of a separation distance, $|S_{X1}|$ is the distance as measured in the transverse direction between the plots $E_{TP1}$ and $CE_{TP1}$ b. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, and wherein an absolute value of a separation distance, $|S_{X2}|$ is the distance as measured in the transverse direction between the plots $E_{TP2}$ and $CE_{TP2}$, c. the first vertical end surfaces of the electrode and the counter-electrode active material layers are on the same side of the electrode assembly, a 2D map of the median vertical position of the first opposing vertical end surface of the electrode active material in the Y-Z plane, along the length $L_E$ of the electrode active material layer, traces a first vertical end surface plot, $E_{VP1}$, a 2D map of the median vertical position of the first opposing vertical end surface of the counter-electrode active material layer in the Y-Z plane, along the length $L_C$ of the counter-electrode active material layer, traces a first vertical end surface plot, $CE_{VP1}$, and wherein an absolute value of a separation distance, $|S_{Z1}|$ is the distance as measured in the transverse direction between the plots $E_{VP1}$ and $CE_{VP1}$.

d. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the Y-Z plane, along the length $L_E$ of the electrode active material layer, traces a second vertical end surface plot, $E_{VP2}$, a 2D map of the median vertical position of the second opposing vertical end surface of the counter-electrode active material layer in the Y-Z plane, along the length $L_C$ of the counter-electrode active material layer, traces a second vertical end surface plot, $CE_{VP2}$, and wherein an absolute value of a separation distance, $|S_{Z2}|$ is the distance as measured in the transverse direction between the plots $E_{VP2}$ and $CE_{VP2}$, e. the carrier ion insulating material layer has an ionic conductance of carrier ions that does not exceed 10% of the ionic conductance of the separator of carrier ions during cycling of the battery, and ionically insulates a surface of the electrode current collector layer from the electrolyte that is proximate to and within a distance Dcc of (i) the first transverse end surface of the electrode active material layer, wherein Dcc equals the sum of $2\times W_E$ and $|S_{X1}|$, and/or (ii) second transverse end surface of the electrode active material layer, wherein Dcc equals the sum of $2\times W_E$ and $|S_{X2}|$, and/or (iii) the first vertical end surface of the electrode active material layer, wherein Dcc equals the sum of $2\times W_E$ and $|S_{Z1}|$, (iv) the second vertical end surface of the electrode active material layer wherein Dcc equals the sum of $2\times W_E$ and $|S_{Z2}|$.

A method for preparing an electrode assembly comprising a constraint for a secondary battery configured to cycle between a charged and a discharged state, the method comprising:

forming a sheet structure;

cutting the sheet structure into pieces;

stacking the pieces; and applying a set of constraints to the stacked pieces, wherein the sheet structure comprises at least one of a unit cell and a component of a unit cell, wherein the pieces comprise an electrode active material layer, an electrode current collector, a counter-electrode active material layer, a counter-electrode current collector, and a separator, wherein the set of constraints comprise a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%, and wherein one or more of the first and second primary growth constraints are attached to at least one of the electrode active material layer, electrode current collector, counter-electrode active material layer, counter-electrode current collector, and separator.

Another aspect of the disclosure relates to a method for the preparation of an electrode assembly, the method comprising removing a population of negative electrode subunits from a negative electrode sheet, the negative electrode sheet comprising a negative electrode sheet edge margin and at least one negative electrode sheet weakened region that is internal to the negative electrode sheet edge margin, the at least one negative electrode sheet weakened region at least partially defining a boundary of the negative electrode subunit population within the negative electrode sheet, the negative electrode subunit of each member of the negative electrode subunit population having a negative electrode subunit centroid, removing a population of separator layer subunits from a separator sheet, the separator sheet comprising a separator sheet edge margin and at least one separator sheet weakened region that is internal to the separator sheet edge margin, the at least one separator sheet weakened region at least partially defining a boundary of the separator layer subunit population, each member of the separator layer subunit population having opposing surfaces, removing a population of positive electrode subunits from a positive electrode sheet, the positive electrode sheet comprising a positive electrode edge margin and at least one positive electrode sheet weakened region that is internal to the positive electrode sheet edge margin, the at last one positive electrode sheet weakened region at least partially defining a boundary of the positive electrode subunit population within the positive electrode sheet, the positive electrode subunit of each member of the positive electrode subunit population having a positive electrode subunit centroid, stacking members of the negative electrode subunit population, the separator layer subunit population and the positive electrode subunit population in a stacking direction to form a stacked population of unit cells, each unit cell in the stacked population comprising at least a unit cell portion of the negative electrode subunit, the separator layer of a stacked member of the separator layer subunit population, and a unit cell portion of the positive electrode subunit, wherein (i) the negative electrode subunit and positive electrode subunit face opposing surfaces of the separator layer comprised by such stacked unit cell population member, and (ii) the separator layer comprised by such stacked unit cell population member is adapted to electrically isolate the portion of the negative electrode subunit and the portion of the positive electrode subunit comprised by such stacked unit cell while permitting an exchange of carrier ions between the negative electrode subunit and the positive electrode subunit comprised by such stacked unit cell.

According to yet another aspect, an energy storage device having an electrode assembly comprising, in a stacked arrangement, a negative electrode subunit, a separator layer, and a positive electrode subunit, is provided, the electrode assembly comprising:

an electrode stack comprising a population of negative electrode subunits and a population of positive electrode subunits stacked in a stacking direction, each of the stacked negative electrode subunits having a length L of the negative electrode subunit in a transverse direction that is orthogonal to the stacking direction, and a height H of the negative electrode subunit in a direction orthogonal to both the transverse direction and stacking directions, wherein (i) each member of the population of negative electrode subunits comprises a first set of two opposing end surfaces that are spaced apart along the transverse direction, (ii) each member of the population of positive electrode subunits comprises a second set of two opposing end surfaces that are spaced apart along the transverse direction, wherein at least one of the opposing end surfaces of the negative electrode subset and/or positive electrode subunit comprises regions about the opposing end surfaces of one or more of the negative electrode subset and positive electrode subunit that exhibit plastic deformation and fracturing oriented in the transverse direction, due to elongation and narrowing of the cross-section of the negative electrode subunit and/or positive electrode subunit.

Another aspect of the disclosure relates to a secondary battery for cycling between a charged and a discharged state, the secondary battery comprising a battery enclosure, an electrode assembly, and lithium ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, wherein a ratio of the maximum length $L_{EA}$ and the maximum width $W_{EA}$ to the maximum height $H_{EA}$ is at least 2:1

(b) the electrode assembly comprises a series of layers stacked in a stacking direction that parallels the longitudinal axis within the electrode assembly wherein the stacked series of layers comprises a population of negative electrode active material layers, a population of negative electrode current collector layers, a population of separator material layers, a population of positive electrode active material layers, and a population of positive electrode current collector material layers, wherein (i) each member of the population of negative electrode active material layers has a length $L_E$ that corresponds to the Feret diameter of the negative electrode active material layer as measured in the transverse direction between first and second opposing transverse end surfaces of the negative electrode active material layer, and a height $H_E$ that corresponds to the Feret diameter of the negative electrode active material layer as measured in the vertical direction between first and second opposing vertical end surfaces of the negative electrode active material layer, and a width $W_E$ that corresponds to the Feret diameter of the negative electrode active material layer as measured in the longitudinal direction between first and second opposing surfaces of the negative electrode active material layer, wherein a ratio of $L_E$ to $H_E$ and $W_E$ is at least 5:1;

(ii) each member of the population of positive electrode active material layers has a length $L_C$ that corresponds to the Feret diameter of the positive electrode active material layer as measured in the transverse direction between first and second opposing transverse end surfaces of the positive electrode active material layer, and a height $H_C$ that corresponds to the Feret diameter of the positive electrode active material layer as measured in the vertical direction between first and second opposing vertical end surfaces of the positive electrode active material layer, and a width $W_C$ that corresponds to the Feret diameter of the positive electrode active material layer as measured in the longitudinal direction between first and second opposing surfaces of the positive electrode active material layer, wherein a ratio of $L_C$ to $H_C$ and $W_C$ is at least 5:1

(iii) members of the negative electrode active material layer population comprise a particulate material having at least 60 wt % of negative electrode active material, less than 20 wt % conductive aid, and binder material, and where the negative electrode active material comprises a silicon-containing material, (c) the set of electrode constraints comprises a primary constraint system and a secondary constraint system wherein (i) the primary constraint system comprises first and second growth constraints and at least one primary connecting member, the first and second primary growth constraints separated from each other in the longitudinal direction, and the at least one primary connecting member connecting the first and second primary growth constraints to at least partially restrain growth of the electrode assembly in the longitudinal direction, and (ii) the secondary constraint system comprises first and second secondary growth constraints separated in a second direction and connected by members of the stacked series of layers wherein the secondary constraint system at least partially restrains growth of the electrode assembly in the second direction upon cycling of the secondary battery, the second direction being orthogonal to the longitudinal direction, and (iii) the primary constraint system maintains a pressure on the electrode assembly in the stacking direction that exceeds the pressure maintained on the electrode assembly in each of two directions that are mutually perpendicular and perpendicular to the stacking direction, and (d) the electrode assembly comprises a population of unit cells, wherein each unit cell comprises a unit cell portion of a first member of the electrode current collector layer population, a member of the separator population that is ionically permeable to the carrier ions, a first member of the electrode active material layer population, a unit cell portion of first member of the counter-electrode current collector population and a first member of the counter-electrode active material layer population, wherein (aa) the first member of the electrode active material layer population is proximate a first side of the separator and the first member of the counter-electrode material layer population is proximate an opposing second side of the separator, (bb) the separator electrically isolates the first member of the electrode active material layer population from the first member of the counter-electrode active material layer population and carrier ions are primarily exchanged between the first member of the electrode active material layer population and the first member of the counter-electrode active material layer population via the separator of each such unit cell during cycling of the battery between the charged and discharged state, and (cc) within each unit cell, a. the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vertical end surface plot, $E_{VP1}$, a 2D map of the median vertical position of the first opposing vertical end surface of the counter-electrode active material layer in the X-Z plane, along the length $L_C$ of the counter-electrode active material layer, traces a first vertical end surface plot, $CE_{VP1}$, wherein for at least 60% of the length $L_C$ of the first counter-electrode active material layer (i) the absolute value of a separation distance, $S_{Z1}$, between the plots $E_{VP1}$ and $CE_{VP1}$ measured in the vertical direction is $1000\ \mu m \geq |S_{Z1}| \geq 5\ \mu m$, and (ii) as between the first vertical end surfaces of the electrode and counter-electrode active material layers, the first vertical end surface of the counter-electrode active material layer is inwardly disposed with respect to the first vertical end surface of the electrode active material layer, b. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, $E_{VP2}$, a 2D map of the median vertical position of the second opposing vertical end surface of the counter-electrode active material layer in the X-Z plane, along the length $L_C$ of the counter-electrode active material layer, traces a second vertical end surface plot, $CE_{VP2}$, wherein for at least 60% of the length $L_C$ of the counter-electrode active material layer (i) the absolute value of a separation distance, $S_{Z2}$, between the plots $E_{VP2}$ and $CE_{VP2}$ as measured in the vertical direction is $1000\ \mu m \geq |S_{Z2}| \geq 5\ \mu m$, and (ii) as between the second vertical end surfaces of the electrode and counter-electrode active material layers, the second vertical end surface of the counter-electrode active material layer is inwardly disposed with respect to the second vertical end surface of the electrode active material layer.

Another aspect of the disclosure relates to a secondary battery for cycling between a charged and a discharged state, the secondary battery comprising a battery enclosure, an electrode assembly, and carrier ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, wherein the maximum length $L_{EA}$ and/or maximum width $W_{EA}$ is greater than the maximum height $H_{EA}$, (b) the electrode assembly comprises a series of layers stacked in a stacking direction that parallels the longitudinal axis within the electrode assembly wherein the stacked series of layers comprises a population of negative electrode active material layers, a population of negative electrode current collector layers, a population of separator material layers, a population of positive electrode active material layers, and a population of positive electrode current collector material layers, wherein (i) each member of the population of negative electrode active material layers has a length $L_E$ that corresponds to the Feret diameter of the negative electrode active material layer as measured in the transverse direction between first and second opposing transverse end surfaces of the negative electrode active material layer, and a height $H_E$ that corresponds to the Feret diameter of the negative electrode active material layer as measured in the vertical direction between first and second opposing vertical end surfaces of the negative electrode active material layer, and a width $W_E$ that corresponds to the Feret diameter of the negative electrode active material layer as measured in the longitudinal direction between first and second opposing surfaces of the negative electrode active material layer, wherein a ratio of $L_E$ to $H_E$ and $W_E$ is at least 5:1;

(ii) each member of the population of positive electrode material layers has a length $L_C$ that corresponds to the Feret diameter of the positive electrode active material layer as measured in the transverse direction between first and second opposing transverse end surfaces of the positive electrode active material layer, and a height $H_C$ that corresponds to the Feret diameter of the positive electrode active material layer as measured in the vertical direction between first and second opposing vertical end surfaces of the positive electrode active material layer, and a width $W_C$ that corresponds to the Feret diameter of the positive electrode active material layer as measured in the longitudinal direction between first and second opposing surfaces of the positive electrode active material layer, wherein a ratio of $L_C$ to $H_C$ and $W_C$ is at least 5:1

(iii) members of the negative electrode active material layer population comprise a particulate material having at least 60 wt % of negative electrode active material, less than 20 wt % conductive aid, and binder material, (c) the set of electrode constraints comprises a primary constraint system and a secondary constraint system wherein (i) the primary constraint system comprises first and second growth constraints and at least one primary connecting member, the first and second primary growth constraints separated from each other in the longitudinal direction, and the at least one primary connecting member connecting the first and second primary growth constraints to at least partially restrain growth of the electrode assembly in the longitudinal direction, and (ii) the secondary constraint system comprises first and second secondary growth constraints separated in a second direction and connected by members of the stacked series of layers wherein the secondary constraint system at least partially restrains growth of the electrode assembly in the second direction upon cycling of the secondary battery, the second direction being orthogonal to the longitudinal direction, and (iii) the primary constraint system maintains a pressure on the electrode assembly in the stacking direction that exceeds the pressure maintained on the electrode assembly in each of two directions that are mutually perpendicular and perpendicular to the stacking direction, and (d) the stacked series of layers comprises layers with opposing end surfaces that are spaced apart from one another in the transverse direction, wherein a plurality of the opposing end surfaces of the layers exhibit plastic deformation and fracturing oriented in the transverse direction, due to elongation and narrowing of the layers at the opposing end surfaces.

Another aspect of the disclosure relates to a secondary battery comprising an enclosure, an electrode assembly, carrier ions within the battery enclosure, and a set of electrode constraints, wherein the electrode assembly comprises a series of layers stacked in a stacking direction to form a stacked population, the stacked population comprising a population of negative electrode layers, a population of positive electrode layers, a population of separator material layers, and a population of unit cells, wherein (i) each unit cell comprises a unit cell portion of a first member of the negative electrode layers, a member of the population of separator material layers that is ionically permeable to the carrier ions, and a unit cell portion of a first member of the positive electrode layers, wherein the negative electrode layer is proximate a first side of the separator material layer, and the positive electrode layer is proximate an opposing second sider of the separator material layer, and the separator electrically isolates the negative electrode layer from the positive electrode layer, and carrier ions are primarily exchanged between the first member of the negative electrode layers and the first member of the positive electrode layers via the separator material layer of each such unit cell during cycling of the battery between the charged and discharged state the set of electrode constraints comprises a primary constraint system and a secondary constraint system wherein (i) the primary constraint system comprises first and second growth constraints and at least one primary connecting member, the first and second primary growth constraints separated from each other in the stacking direction, and the at least one primary connecting member connecting the first and second primary growth constraints to at least partially restrain growth of the electrode assembly in the stacking direction, and (ii) the secondary constraint system comprises first and second secondary growth constraints separated in a second direction and connected by secondary connecting members comprising at least a portion of the negative electrode layers, wherein the secondary constraint system at least partially restrains growth of the electrode assembly in the second direction, the second direction being orthogonal to the stacking direction, and (iii) the primary constraint system maintains a pressure on the electrode assembly in the stacking direction that exceeds the pressure maintained on the electrode assembly in each of two directions that are mutually perpendicular and perpendicular to the stacking direction, each unit cell comprises a cell volume in that unit cell that is located bounded by a centerline of the negative electrode layer, the centerline comprising a reference plane that is located in a plane orthogonal to the stacking direction, and by a surface of the separator material layer that faces the negative electrode layer, as well as by the first and second secondary growth constraints that are connected to one another by the negative electrode layer, wherein the cell volume comprises a first region that is adjacent the separator surface, and a second region that is adjacent the centerline, and wherein the first region comprises at least 10% of the cell volume and has a void fraction greater than 85%, and the second region comprises at least 10% of the cell volume and has a void fraction of less than 60%.

Yet another aspect of the disclosure relates to a method for the preparation of an electrode assembly, the method comprising:

removing a population of negative electrode subunits from a negative electrode sheet, the negative electrode sheet comprising a negative electrode sheet edge margin and at least one negative electrode sheet weakened region that is internal to the negative electrode sheet edge margin, the at least one negative electrode sheet weakened region at least partially defining a boundary of the negative electrode subunit population within the negative electrode sheet, the negative electrode subunit of each member of the negative electrode subunit population having a negative electrode subunit centroid, removing a population of separator layer subunits from a separator sheet, the separator sheet comprising a separator sheet edge margin and at least one separator sheet weakened region that is internal to the separator sheet edge margin, the at least one separator sheet weakened region at least partially defining a boundary of the separator layer subunit population, each member of the separator layer subunit population having opposing surfaces, removing a population of positive electrode subunits from a positive electrode sheet, the positive electrode sheet comprising a positive electrode edge margin and at least one positive electrode sheet weakened region that is internal to the positive electrode sheet edge margin, the at last one positive electrode sheet weakened region at least partially defining a boundary of the positive electrode subunit population within the positive electrode sheet, the positive electrode subunit of each member of the positive electrode subunit population having a positive electrode subunit centroid, and stacking members of the negative electrode subunit population, the separator layer subunit population and the positive electrode subunit population in a stacking direction to form a stacked population of unit cells, each unit cell in the stacked population comprising at least a unit cell portion of the negative electrode subunit, the separator layer of a stacked member of the separator layer subunit population, and a unit cell portion of the positive electrode subunit, wherein (i) the negative electrode subunit and positive electrode subunit face opposing surfaces of the separator layer comprised by such stacked unit cell population member, and (ii) the separator layer comprised by such stacked unit cell population member is adapted to electrically isolate the portion of the negative electrode subunit and the portion of the positive electrode subunit comprised by such stacked unit cell while permitting an exchange of carrier ions between the negative electrode subunit and the positive electrode subunit comprised by such stacked unit cell, affixing a set of electrode constraints to the stacked population of unit cells, the set of electrode constraints comprising a primary constraint system and a secondary constraint system wherein (i) the primary constraint system comprises first and second growth constraints and at least one primary connecting member, the first and second primary growth constraints separated from each other in the stacking direction, and the at least one primary connecting member connecting the first and second primary growth constraints to at least partially restrain growth of the electrode assembly in the stacking direction, and (ii) the secondary constraint system comprises first and second secondary growth constraints separated in a second direction and connected by secondary connecting members comprising at least a portion of the negative electrode subunit, wherein the secondary constraint system at least partially restrains growth of the electrode assembly in the second direction, the second direction being orthogonal to the stacking direction, and (iii) the primary constraint system maintains a pressure on the electrode assembly in the stacking direction that exceeds the pressure maintained on the electrode assembly in each of two directions that are mutually perpendicular and perpendicular to the stacking direction, providing, for each member of the population of unit cells, a cell volume in that unit cell that is bounded by a centerline of the negative subunit, the centerline comprising a reference plane that is located in a plane orthogonal to the stacking direction, and by a surface of the separator material subunit that faces the negative electrode subunit, as well as by the first and second secondary growth constraints that are connected to one another by the negative electrode subunit, and wherein the cell volume comprises a first region that is adjacent the surface of the separator subunit, and a second region that is adjacent the centerline, and wherein the first region comprises at least 10% of the cell volume and has a void fraction greater than 85%, and the second region comprises at least 10% of the cell volume and has a void fraction of less than 60%.

Other aspects, features and embodiments of the present disclosure will be, in part, discussed and, in part, apparent in the following description and drawing.

BRIEF DESCRIPTION OF THE DRAWINGS

FIGS. 27A'-27F' illustrate the respective cross-sections of FIGS. 27A-27F taken in a X-Y plane.

Figure 1A:
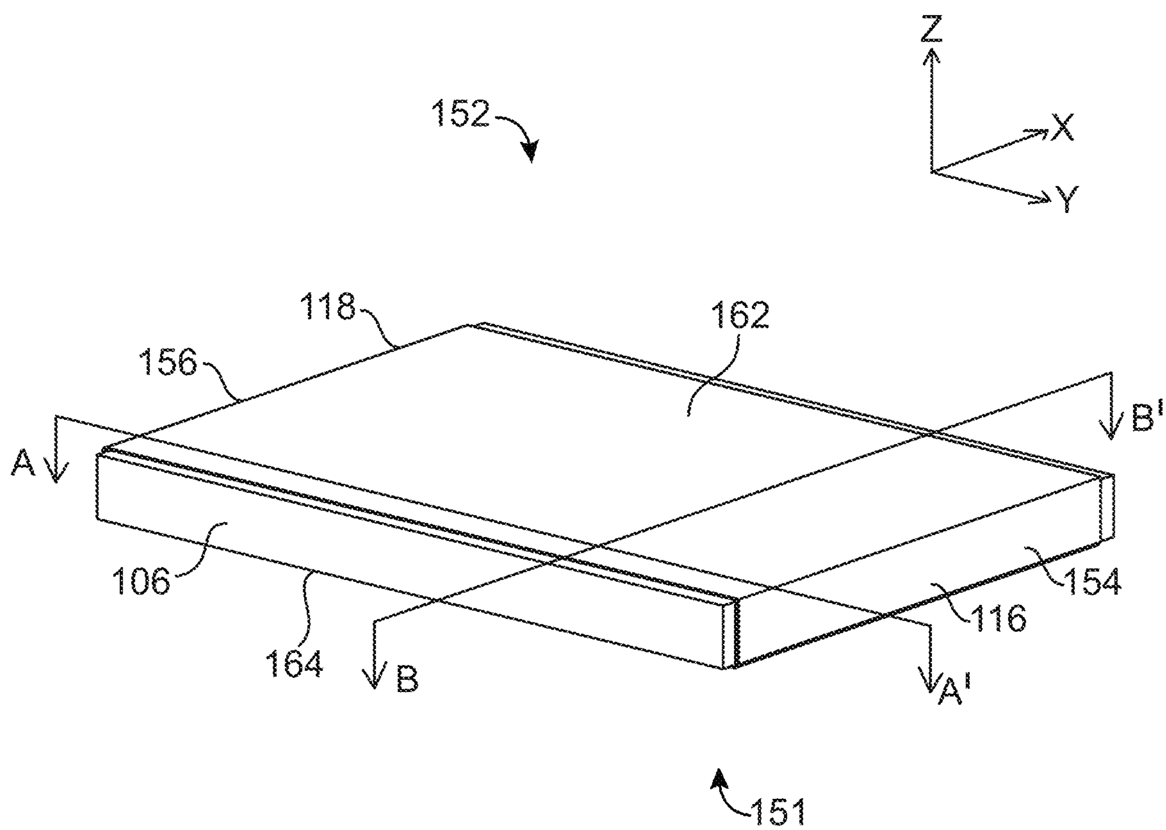
FIG. 1A is a perspective view of one embodiment of a constraint system employed with an electrode assembly.

Other aspects, embodiments and features of the inventive subject matter will become apparent from the following detailed description when considered in conjunction with the accompanying drawing. The accompanying figures are schematic and are not intended to be drawn to scale. For purposes of clarity, not every element or component is labeled in every figure, nor is every element or component of each embodiment of the inventive subject matter shown where illustration is not necessary to allow those of ordinary skill in the art to understand the inventive subject matter.

Definitions

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in the secondary battery.

"Anodically active" as used herein means material suitable for use in an anode of a secondary battery.

"Cathode" as used herein in the context of a secondary battery refers to the positive electrode in the secondary battery.

"Cathodically active" as used herein means material suitable for use in a cathode of a secondary battery.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"C-rate" as used herein refers to a measure of the rate at which a secondary battery is discharged, and is defined as the discharge current divided by the theoretical current draw under which the battery would deliver its nominal rated capacity in one hour. For example, a C-rate of 1C indicates the discharge current that discharges the battery in one hour, a rate of 2C indicates the discharge current that discharges the battery in ½ hours, a rate of C/2 indicates the discharge current that discharges the battery in 2 hours, etc.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Feret diameter" as referred to herein with respect to the electrode assembly, the electrode active material layer and/or counter-electrode active material layer is defined as the distance between two parallel planes restricting the structure, i.e. the electrode assembly electrode active material layer and/or counter-electrode active material layer, as measured in a direction perpendicular to the two planes. For example, a Feret diameter of the electrode assembly in the longitudinal direction is the distance as measured in the longitudinal direction between two parallel planes restricting the electrode assembly that are perpendicular to the longitudinal direction. As another example, a Feret diameter of the electrode assembly in the transverse direction is the distance as measured in the transverse direction between two parallel planes restricting the electrode assembly that are perpendicular to the transverse direction. As yet another example, a Feret diameter of the electrode assembly in the vertical direction is the distance as measured in the vertical direction between two parallel planes restricting the electrode assembly that are perpendicular to the vertical direction. As another example, a Feret diameter of the electrode active material layer in the transverse direction is the distance as measured in the transverse direction between two parallel planes restricting the electrode active material layer that are perpendicular to the transverse direction. As yet another example, a Feret diameter of the electrode active material layer in the vertical direction is the distance as measured in the vertical direction between two parallel planes restricting the electrode active material layer that are perpendicular to the vertical direction. As another example, a Feret diameter of the counter-electrode active material layer in the transverse direction is the distance as measured in the transverse direction between two parallel planes restricting the counter-electrode active material layer that are perpendicular to the transverse direction. As yet another example, a Feret diameter of the counter-electrode active material layer in the vertical direction is the distance as measured in the vertical direction between two parallel planes restricting the counter-electrode active material layer that are perpendicular to the vertical direction.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Alternatively stated, the axes may be interchangeable when referring to three-dimensional aspects of the inventive subject matter.

"Longitudinal direction," "transverse direction," and "vertical direction," as used herein, refer to mutually perpendicular directions (i.e., each are orthogonal to one another). For example, the "longitudinal direction," "transverse direction," and the "vertical direction" as used herein may be generally parallel to the longitudinal axis, transverse axis and vertical axis, respectively, of a Cartesian coordinate system used to define three-dimensional aspects or orientations.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rated capacity" as used herein in the context of a secondary battery refers to the capacity of the secondary battery to deliver a specified current over a period of time, as measured under standard temperature conditions (25° C.). For example, the rated capacity may be measured in units of Amp hour, either by determining a current output for a specified time, or by determining for a specified current, the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours. In particular, the rated capacity for a secondary battery may be given as the rated capacity at a specified discharge current, such as the C-rate, where the C-rate is a measure of the rate at which the battery is discharged relative to its capacity. For example, a C-rate of 1C indicates the discharge current that discharges the battery in one hour, 2C indicates the discharge current that discharges the battery in ½ hours, C/2 indicates the discharge current that discharges the battery in 2 hours, etc. Thus, for example, a battery rated at 20 Amp·hr at a C-rate of 1C would give a discharge current of 20 Amp for 1 hour, whereas a battery rated at 20 Amp·hr at a C-rate of 2C would give a discharge current of 40 Amps for ½ hour, and a battery rated at 20 Amp·hr at a C-rate of C/2 would give a discharge current of 10 Amps over 2 hours.

"Maximum width" ($W_{EA}$) as used herein in the context of a dimension of an electrode assembly corresponds to the greatest width of the electrode assembly as measured from opposing points of longitudinal end surfaces of the electrode assembly in the longitudinal direction.

"Maximum length" ($L_{EA}$) as used herein in the context of a dimension of an electrode assembly corresponds to the greatest length of the electrode assembly as measured from opposing points of a lateral surface of the electrode assembly in the transverse direction.

"Maximum height" ($H_{EA}$) as used herein in the context of a dimension of an electrode assembly corresponds to the greatest height of the electrode assembly as measured from opposing points of the lateral surface of the electrode assembly in the transverse direction.

"Centroid" as used herein refers to the geometric center of a plane object, which is the arithmetic mean position of all the points in the object. In n-dimensional space, the centroid is the mean position of all the points of the object in all of the coordinate directions. For purposes of describing the centroid of the objects herein, such as for example the negative and positive electrode subunits, and negative and positive electrode active material layers, the objects may be treated as effectively 2-D objects, such that the centroid is effectively the same as the center of mass for the object. For example, the centroid of a positive or negative electrode subunit, or positive or negative electrode active material layer, may be effectively the same as the center of mass thereof.

DETAILED DESCRIPTION

Figure 1B:
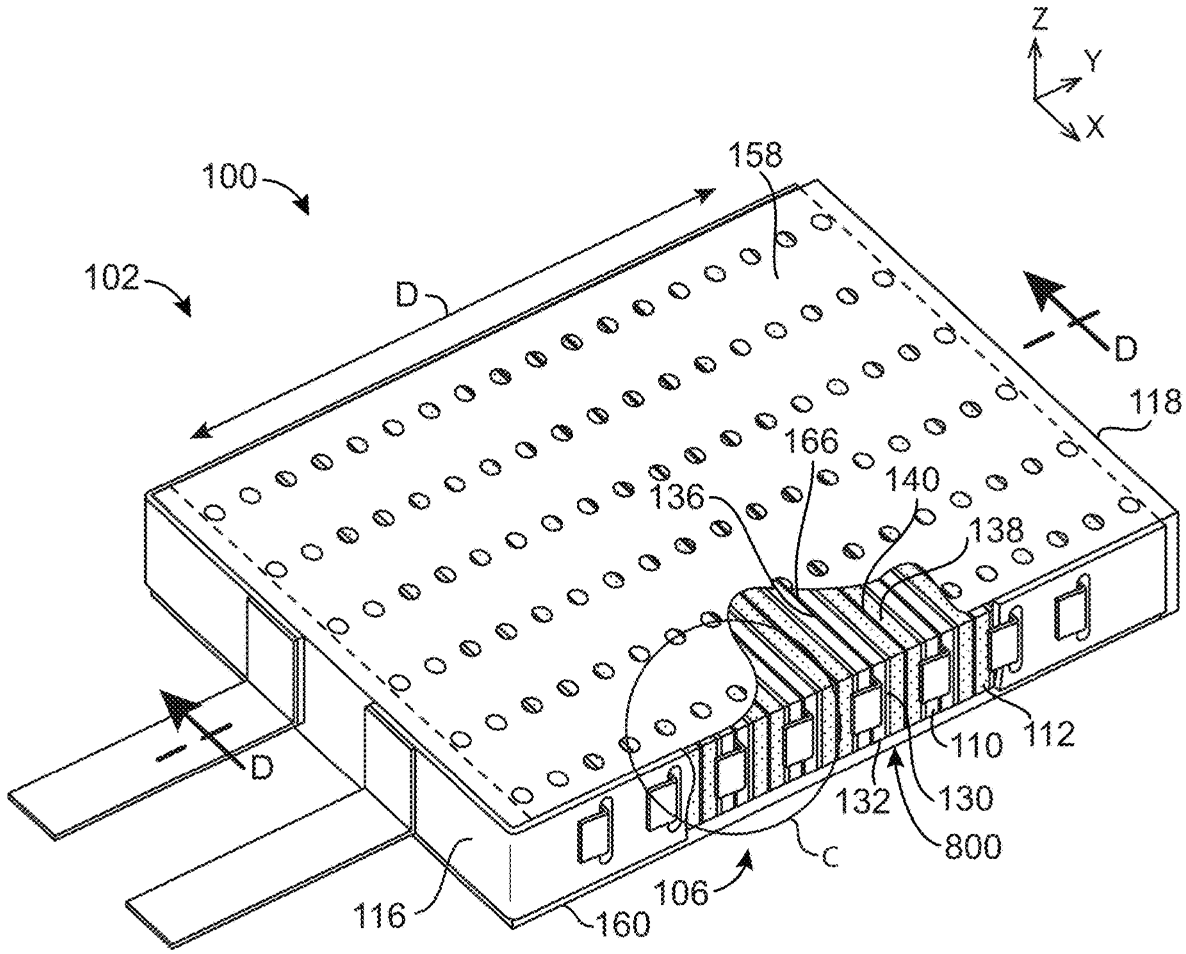
FIG. 1B is a schematic of one embodiment of a three-dimensional electrode assembly for a secondary battery.
Figure 2A:
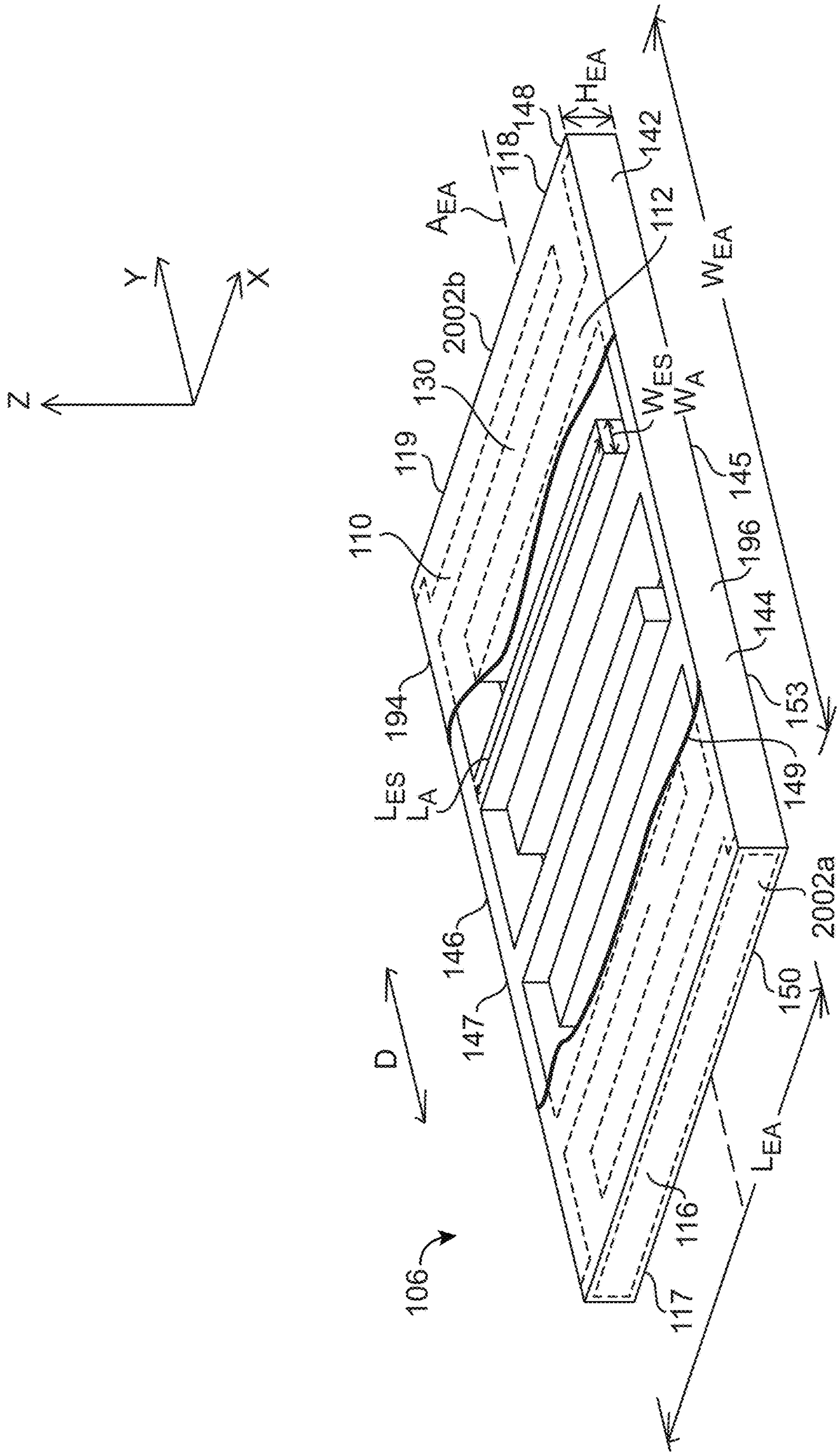
FIG. 2A is a schematic of one embodiment of a three-dimensional electrode assembly.
Figure 20:
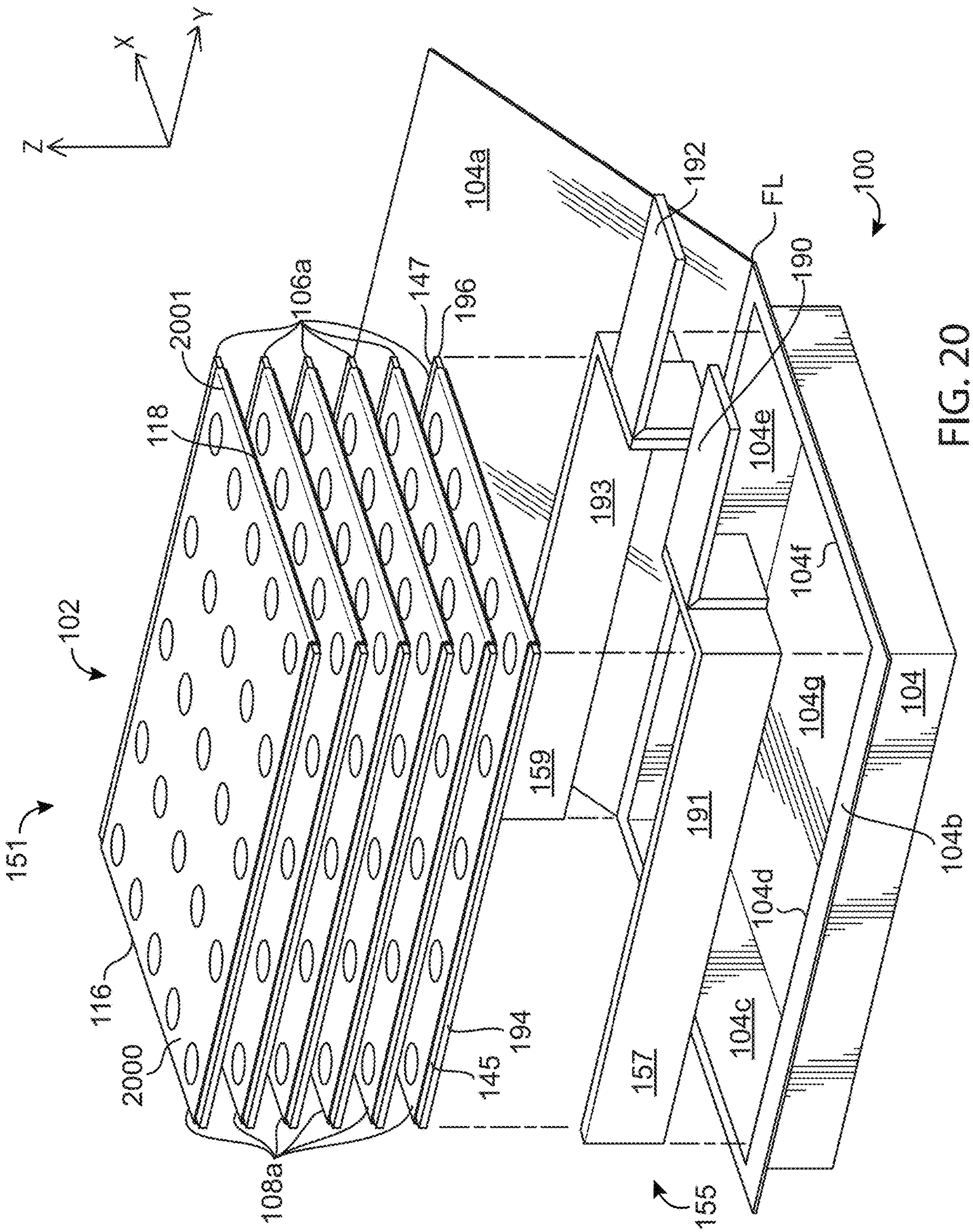
FIG. 20 illustrates an exploded view of an embodiment of an energy storage device or a secondary battery utilizing one embodiment of a set of growth constraints.

In general, aspects of the present disclosure are directed to an energy storage device 100, such as a secondary battery 102, as shown for example in FIG. 1B, FIG. 2A and/or FIG. 20, that cycles between a charged and a discharged state, and a method of manufacture therefor. The secondary battery 102 includes a battery enclosure 104, an electrode assembly 106, and carrier ions, and may also contain a non-aqueous liquid electrolyte within the battery enclosure. The secondary battery 102 can also include a set of electrode constraints 108 that restrain growth of the electrode assembly 106. The growth of the electrode assembly 106 that is being constrained may be a macroscopic increase in one or more dimensions of the electrode assembly 106.

Aspects of the present disclosure further provide for a method of preparation of an electrode assembly, which may allow for efficient and accurate fabrication of the electrode assembly, with improved alignment of assembly parts and/or an assembly with improved energy density and/or reduced shorting risk. In one aspect, a method of preparation is provided that includes removing a population of multilayer electrode subunits from an electrode sheet comprising at least one electrode sheet weakened region, removing a population of separator layer subunits from a separator sheet comprising at least one separator sheet weakened region, and removing a population of multilayer counter-electrode subunits from a counter-electrode sheet comprising at least one counter-electrode sheet weakened region, and stacking to form unit cells.

Aspects of the present disclosure further provide for a reduced offset and/or separation distance in vertical and transverse directions, for electrode active material layers and counter-electrode active material layers, which may improve storage capacity of a secondary battery, without excessively increasing the risk of shorting or failure of the secondary battery, as is described in more detail below. Aspects of the present disclosure may also provide for methods of fabricating secondary batteries, and/or structures and configurations that may provide high energy density of the secondary battery with a reduced footprint.

Further, in certain embodiments, aspects of the present disclosure include three-dimensional constraint structures offering particular advantages when incorporated into energy storage devices 100 such as batteries, capacitors, fuel cells, and the like. In one embodiment, the constraint structures have a configuration and/or structure that is selected to resist at least one of growth, swelling, and/or expansion of an electrode assembly 106 that can otherwise occur when a secondary battery 102 is repeatedly cycled between charged and discharged states. In particular, in moving from a discharged state to a charged state, carrier ions such as, for example, one or more of lithium, sodium, potassium, calcium and magnesium, move between the positive and negative electrodes in the battery. Upon reaching the electrode, the carrier ions may then intercalate or alloy into the electrode material, thus increasing the size and volume of that electrode. Conversely, reversing to move from the charged state to the discharged state can cause the ions to de-intercalate or de-alloy, thus contracting the electrode. This alloying and/or intercalation and de-alloying and/or de-intercalation can cause significant volume change in the electrode. In yet another embodiment, the transport of carrier ions out of electrodes can increase the size of the electrode, for example by increasing the electrostatic repulsion of the remaining layers of material (e.g., with LCO and some other materials). Other mechanisms that can cause swelling in secondary batteries 102 can include, for example, the formation of SEI on electrodes, the decomposition of electrolyte and other components, and even gas formation. Thus, the repeated expansion and contraction of the electrodes upon charging and discharging, as well as other swelling mechanisms, can create strain in the electrode assembly 106, which can lead to reduced performance and ultimately even failure of the secondary battery.

Figure 2B:
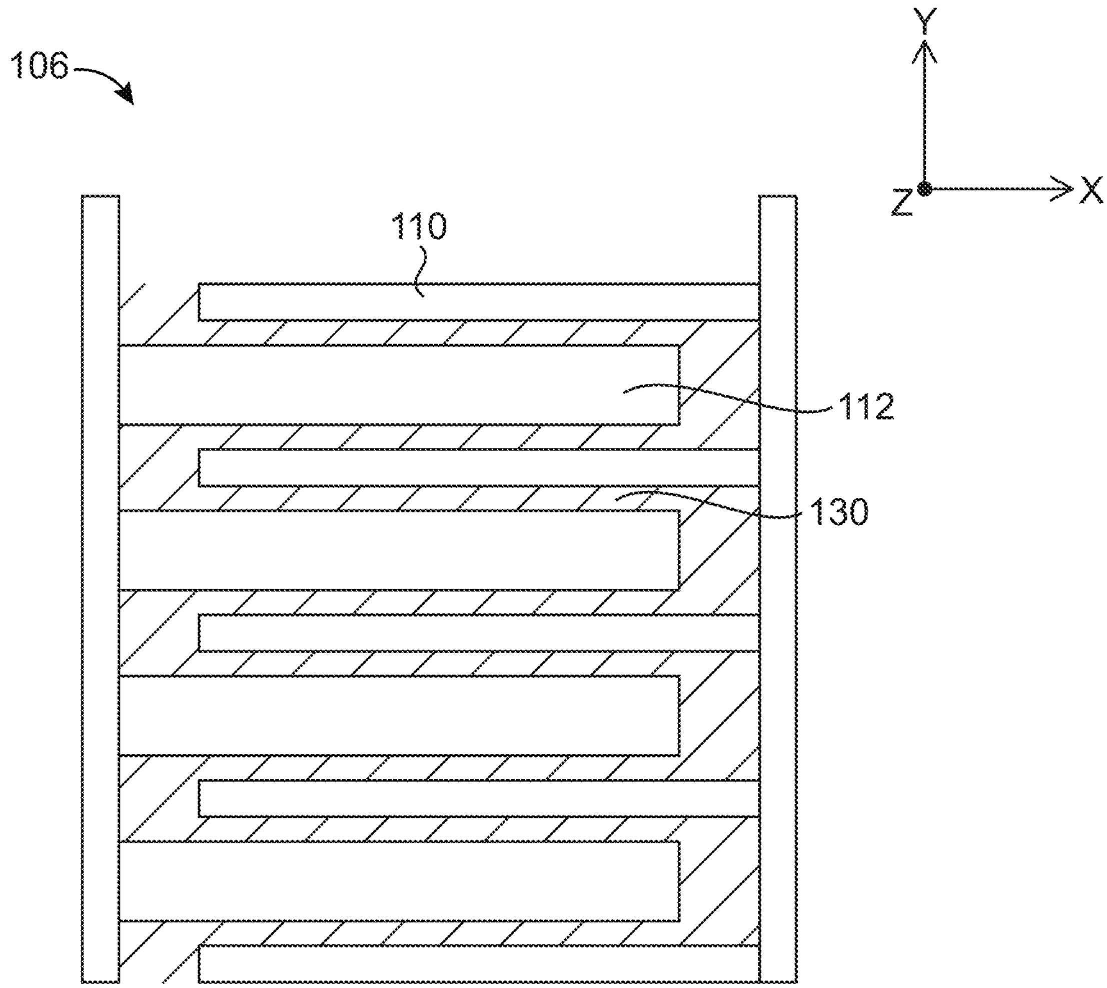
FIGS. 2B-2C are schematics of one embodiment of a three-dimensional electrode assembly, depicting anode structure population members in constrained and expanded configurations.
Figure 2C:
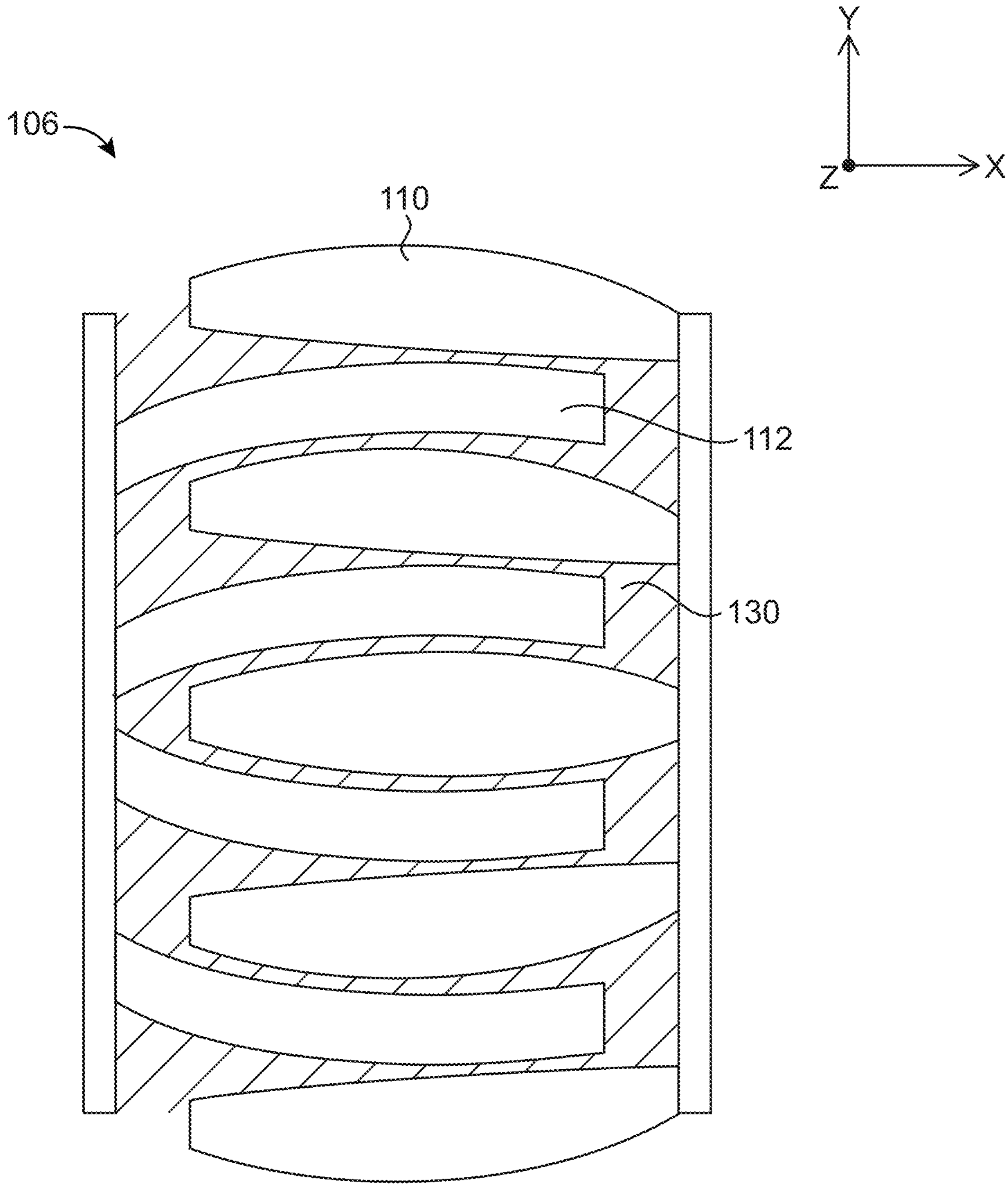

Referring to FIGS. 2A-2C, the effects of the repeated expansion and/or contraction of the electrode assembly 106, according to an embodiment of the disclosure, can be described. FIG. 2A shows an embodiment of a three-dimensional electrode assembly 106, with a population of electrode structures 110 and a population of counter-electrode structures 112 (e.g., population of anode and cathode structures, respectively). The three-dimensional electrode assembly 106 in this embodiment provides an alternating set of the electrodes structures 110 and counter electrode structures 112 that are interdigitated with one another and, in the embodiment shown in FIG. 2A, has a longitudinal axis $A_{EA}$ parallel to the Y axis, a transverse axis (not shown) parallel to the X axis, and a vertical axis (not shown) parallel to the Z axis. The X, Y and Z axes shown herein are arbitrary axes intended only to show a basis set where the axes are mutually perpendicular to one another in a reference space, and are not intended in any way to limit the structures herein to a specific orientation. Upon charge and discharge cycling of a secondary battery 102 having the electrode assembly 106, the carrier ions travel between the electrode and counter-electrode structures 110 and 112, respectively, such as generally in a direction that is parallel to the Y axis as shown in the embodiment depicted in FIG. 2A, and can intercalate into electrode material of one or more of the electrode structures 110 and counter-electrode structures 112 that is located within the direction of travel. The effect of intercalation and/or alloying of carrier ions into the electrode material can be seen in the embodiments illustrated in FIGS. 2B-2C. In particular, FIG. 2B depicts an embodiment of the electrode assembly 106 with electrode structures 110 in a relatively unexpanded state, such as prior to repeated cycling of the secondary battery 106 between charged and discharged states. By comparison, FIG. 2C depicts an embodiment of the electrode assembly 106 with electrode structures 110 after repeated cycling of the secondary battery for a predetermined number of cycles. As shown in this figure, the dimensions of the electrode structures 110 can increase significantly in the stacking direction (e.g., Y-direction), due to the intercalation and/or alloying of carrier ions into the electrode material, or by other mechanisms such as those described above. The dimensions of the electrode structures 110 can also significantly increase in another direction, such as in the Z-direction (not shown in FIG. 2C). Furthermore, the increase in size of the electrode structures 110 can result in the deformation of the structures inside the electrode assembly, such as deformation of the counter-electrode structures 112 and separator 130 in the assembly, to accommodate the expansion in the electrode structures 110. The expansion of the electrode structures 110 can ultimately result in the bulging and/or warping of the electrode assembly 106 at the longitudinal ends thereof, as depicted in the embodiment shown in FIG. 2C (as well as in other directions such as at the top and bottom surfaces in the Z-direction). Accordingly, the electrode assembly 106 according to one embodiment can exhibit significant expansion and contraction along the longitudinal (Y axis) of the assembly 106, as well as other axis, due to the intercalation and de-intercalation of the carrier ions during the charging and discharging process.

Thus, in one embodiment, a primary growth constraint system 151 is provided to mitigate and/or reduce at least one of growth, expansion, and/or swelling of the electrode assembly 106 in the longitudinal direction (i.e., in a direction that parallels the Y axis), as shown for example in FIG. 1A. For example, the primary growth constraint system 151 can include structures configured to constrain growth by opposing expansion at longitudinal end surfaces 116, 118 of the electrode assembly 106. In one embodiment, the primary growth constraint system 151 comprises first and second primary growth constraints 154, 156, that are separated from each other in the longitudinal direction, and that operate in conjunction with at least one primary connecting member 162 that connects the first and second primary growth constraints 154, 156 together to restrain growth in the electrode assembly 106. For example, the first and second primary growth constraints 154, 156 may at least partially cover first and second longitudinal end surfaces 116, 118 of the electrode assembly 106, and may operate in conjunction with connecting members 162, 164 connecting the primary growth constraints 154, 156 to one another to oppose and restrain any growth in the electrode assembly 106 that occurs during repeated cycles of charging and/or discharging. Further discussion of embodiments and operation of the primary growth constraint system 151 is provided in more detail below.

In addition, repeated cycling through charge and discharge processes in a secondary battery 102 can induce growth and strain not only in a longitudinal direction of the electrode assembly 106 (e.g., Y-axis in FIG. 2A), but can also induce growth and strain in directions orthogonal to the longitudinal direction, as discussed above, such as the transverse and vertical directions (e.g., X and Z axes, respectively, in FIG. 2A). Furthermore, in certain embodiments, the incorporation of a primary growth constraint system 151 to inhibit growth in one direction can even exacerbate growth and/or swelling in one or more other directions. For example, in a case where the primary growth constraint system 151 is provided to restrain growth of the electrode assembly 106 in the longitudinal direction, the intercalation of carrier ions during cycles of charging and discharging and the resulting swelling of electrode structures can induce strain in one or more other directions. In particular, in one embodiment, the strain generated by the combination of electrode growth/swelling and longitudinal growth constraints can result in buckling or other failure(s) of the electrode assembly 106 in the vertical direction (e.g., the Z axis as shown in FIG. 2A), or even in the transverse direction (e.g., the X axis as shown in FIG. 2A).

Accordingly, in one embodiment of the present disclosure, the secondary battery 102 includes not only a primary growth constraint system 151, but also at least one secondary growth constraint system 152 that may operate in conjunction with the primary growth constraint system 151 to restrain growth of the electrode assembly 106 along multiple axes of the electrode assembly 106. For example, in one embodiment, the secondary growth constraint system 152 may be configured to interlock with, or otherwise synergistically operate with, the primary growth constraint system 151, such that overall growth of the electrode assembly 106 can be restrained to impart improved performance and reduced incidence of failure of the secondary battery having the electrode assembly 106 and primary and secondary growth constraint systems 151 and 152, respectively. Further discussion of embodiments of the interrelationship between the primary and secondary growth constraint systems 151 and 152, respectively, and their operation to restrain growth of the electrode assembly 106, is provided in more detail below.

By constraining the growth of the electrode assembly 106, it is meant that, as discussed above, an overall macroscopic increase in one or more dimensions of the electrode assembly 106 is being constrained. That is, the overall growth of the electrode assembly 106 may be constrained such that an increase in one or more dimensions of the electrode assembly 106 along (the X, Y, and Z axes) is controlled, even though a change in volume of one or more electrodes within the electrode assembly 106 may nonetheless occur on a smaller (e.g., microscopic) scale during charge and discharge cycles. The microscopic change in electrode volume may be observable, for example, via scanning electron microscopy (SEM). While the set of electrode constraints 108 may be capable of inhibiting some individual electrode growth on the microscopic level, some growth may still occur, although the growth may at least be restrained. The volume change in the individual electrodes upon charge/discharge, while it may be a small change on the microscopic level for each individual electrode, can nonetheless have an additive effect that results in a relatively larger volume change on the macroscopic level for the overall electrode assembly 106 in cycling between charged and discharged states, thereby potentially causing strain in the electrode assembly 106.

According to one embodiment, an electrode active material used in an electrode structure 110 corresponding to an anode of the electrode assembly 106 comprises a material that expands upon insertion of carrier ions into the electrode active material during charge of the secondary battery 102. For example, the electrode active materials may comprise anodically active materials that accept carrier ions during charging of the secondary battery, such as by intercalating with or alloying with the carrier ions, in an amount that is sufficient to generate an increase in the volume of the electrode active material. For example, in one embodiment the electrode active material may comprise a material that has the capacity to accept more than one mole of carrier ion per mole of electrode active material, when the secondary battery 102 is charged from a discharged to a charged state. By way of further example, the electrode active material may comprise a material that has the capacity to accept 1.5 or more moles of carrier ion per mole of electrode active material, such as 2.0 or more moles of carrier ion per mole of electrode active material, and even 2.5 or more moles of carrier ion per mole of electrode active material, such as 3.5 moles or more of carrier ion per mole of electrode active material. The carrier ion accepted by the electrode active material may be at least one of lithium, potassium, sodium, calcium, and magnesium. Examples of electrode active materials that expand to provide such a volume change include one or more of silicon (e.g., SiO), aluminum, tin, zinc, silver, antimony, bismuth, gold, platinum, germanium, palladium, and alloys and compounds thereof. For example, in one embodiment, the electrode active material can comprise a silicon-containing material in particulate form, such as one or more of particulate silicon, particulate silicon oxide, and mixtures thereof. In yet another embodiment, the electrode active material can comprise a material that exhibits a smaller or even negligible volume change. For example, in one embodiment the electrode active material can comprise a carbon-containing material, such as graphite. In yet another embodiment, the electrode structure comprises a layer of lithium, which serves as the electrode active material layer.

Yet further embodiments of the present disclosure may comprise energy storage devices 100, such as secondary batteries 102, and/or structures therefor, including electrode assemblies 106, that do not include constraint systems, or that are constrained with a constraint system that is other than the set of electrode constraints 108 described herein.

Electrode Assembly

Figure 1C:
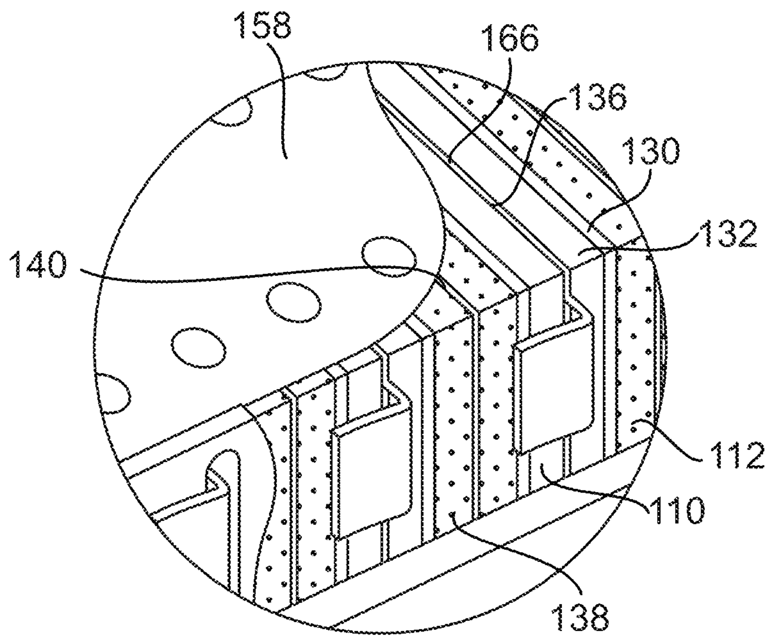
FIG. 1C is an inset cross-sectional view of the electrode assembly of FIG. 1B.
Figure 1D:
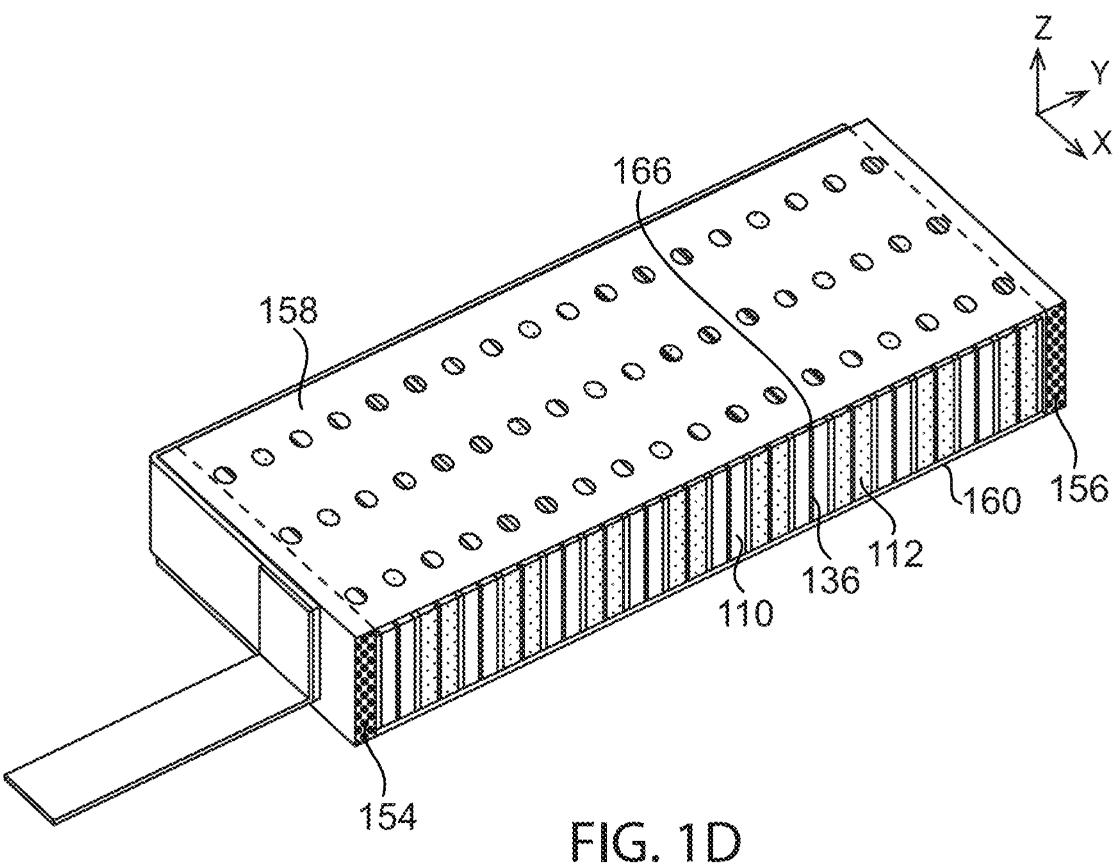
FIG. 1D is a cross-sectional view of the electrode assembly of FIG. 1B, taken along line E in FIG. 1B.

Referring again to FIG. 1B and FIG. 2A, in one embodiment, an electrode assembly 106 includes a population of electrode structures 110, a population of counter-electrode structures 112, and an electrically insulating separator 130 electrically insulating the electrode structures 110 from the counter-electrode structures 112. In one example, as shown in FIG. 1B, the electrode assembly comprises a series of stacked layers 800 comprising the electrode structures 110 and counter-electrode structures in an alternating arrangement. FIG. 1C is an inset showing the secondary battery with electrode assembly 106 of FIG. 1B, and FIG. 1D is a cross-section of the secondary battery with electrode assembly 106 of FIG. 1B. As yet another example, in the embodiment as shown in FIG. 2A, the electrode assembly 106 comprises an interdigitated electrode assembly 106 with electrode and counter-electrode structures interdigitated with one another.

Furthermore, as used herein, for each embodiment that describes a material or structure using the term "electrode" such as an "electrode structure" or "electrode active material," it is to be understood that such structure and/or material may in certain embodiments correspond that of a "negative electrode", such as a "negative electrode structure" or "negative electrode active material." Similarly, as used herein, for each embodiment that describes a material or structure using the term "counter-electrode" such as a "counter-electrode structure" or "counter-electrode active material," it is to be understood that such structure and/or material may in certain embodiments correspond to that of a "positive electrode," such as a "positive electrode structure" or "positive electrode active material." That is, where suitable, any embodiments described for an electrode and/or counter-electrode may correspond to the same embodiments where the electrode and/or counter-electrode are specifically a negative electrode and/or positive electrode, including their corresponding structures and materials, respectively.

Figure 7:
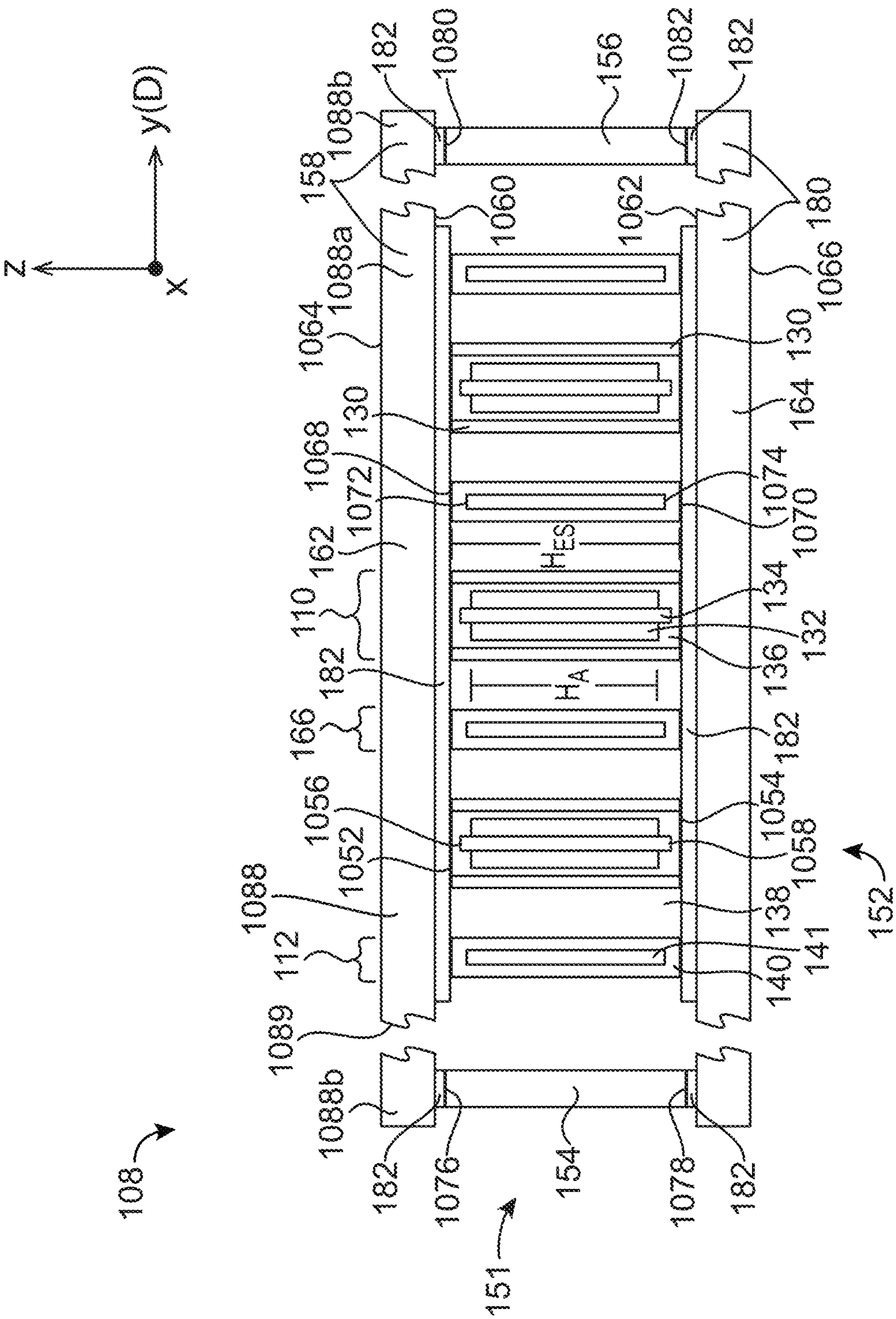
FIG. 7 illustrates a cross-section of an embodiment of the electrode assembly taken along the line A-A' as shown in FIG. 1A, further including a set of electrode constraints, including one embodiment of a primary constraint system and one embodiment of a secondary constraint system.

In one embodiment, the electrode structures 110 comprise an electrode active material layer 132, an electrode backbone 134 that supports the electrode active material layer 132, and an electrode current collector 136, which may be an ionically porous current collector to allow ions to pass therethrough, as shown in the embodiment depicted in FIG. 7. For example, the electrode structure 110, in one embodiment, can comprise an anode structure, with an anodically active material layer, an anode backbone, and an anode current collector. In yet another embodiment, the electrode structure 110 can comprise an anode structure with an anode current collector 136 and an anodically active material layer 132, as shown in FIG. 1B. For example, the anode currently collector 136 can comprise an anode current collector layer disposed between one or more anode active material layers. In yet another embodiment, the electrode structure 110 can comprise a single layer of material, such as a lithium sheet electrode. Similarly, in one embodiment, the counter-electrode structures 112 comprise a counter-electrode active material layer 138, a counter-electrode current collector 140, and a counter-electrode backbone 141 that supports one or more of the counter-electrode current collector 140 and/or the counter-electrode active material layer 138, as shown for example in the embodiment depicted in FIG. 7. For example, the counter-electrode structure 112 can comprise, in one embodiment, a cathode structure comprising a cathodically active material layer, a cathode current collector, and a cathode backbone. In yet another embodiment, the counter-electrode structure 110 can comprise an cathode structure with a cathode current collector 140 and a cathodically active material layer 138, as shown in FIG. 1B. The electrically insulating microporous separator 130 allows carrier ions to pass therethrough during charge and/or discharge processes, to travel between the electrode structures 110 and counter-electrode structures 112 in the electrode assembly 106. Furthermore, it should be understood that the electrode and counter electrode structures 110 and 112, respectively, are not limited to the specific embodiments and structures described herein, and other configurations, structures, and/or materials other than those specifically described herein can also be provided to form the electrode structures 110 and counter-electrode structures 112. For example, the electrode and counter electrode structures 110, 112 can be provided in a form where the structures are substantially absent any electrode and/or counter-electrode backbones 134, 141, as in the case of FIG. 1B, and/or such as in a case where the region of the electrode and/or counter-electrode structures 110, 112 that would contain the backbones is instead made up of electrode active material and/or counter-electrode active material.

According to the embodiment as shown in FIG. 1B and FIG. 2A, the members of the electrode and counter-electrode structure populations 110 and 112, respectively, are arranged in alternating sequence, with a direction of the alternating sequence corresponding to the stacking direction D. The electrode assembly 106 according to this embodiment further comprises mutually perpendicular longitudinal, transverse, and vertical axes, with the longitudinal axis $A_{EA}$ generally corresponding or parallel to the stacking direction D of the members of the electrode and counter-electrode structure populations. As shown in the embodiment in FIG. 2A, the longitudinal axis $A_{EA}$ is depicted as corresponding to the Y axis, the transverse axis is depicted as corresponding to the X axis, and the vertical axis is depicted as corresponding to the Z axis. While FIG. 2A is referred to herein for description of various features, including dimensions and axis with respect to the secondary battery and electrode assembly, it should be understood that such descriptions also apply to the embodiments as depicted in other figures herein, including the embodiments of FIGS. 1B-1E.

Further, the electrode assembly 106 has a maximum width $W_{EA}$ measured in the longitudinal direction (i.e., along the γ-axis), a maximum length $L_{EA}$ bounded by the lateral surface and measured in the transverse direction (i.e., along the x-axis), and a maximum height $H_{EA}$ also bounded by the lateral surface and measured in the vertical direction (i.e., along the z-axis). The maximum width $W_{EA}$ can be understood as corresponding to the greatest width of the electrode assembly 106 as measured from opposing points of the longitudinal end surfaces 116, 118 of the electrode assembly 106 where the electrode assembly is widest in the longitudinal direction. For example, referring to the embodiment of the electrode assembly 106 in FIG. 2A, the maximum width $W_{EA}$ can be understood as corresponding simply to the width of the assembly 106 as measured in the longitudinal direction. However, referring to the embodiment of the electrode assembly 106 shown in FIG. 3H, it can be seen that the maximum width $W_{EA}$ corresponds to the width of the electrode assembly as measured from the two opposing points 300*a*, 300*b*, where the electrode assembly is widest in the longitudinal direction, as opposed to a width as measured from opposing points 301*a*, 301*b* where the electrode assembly 106 is more narrow. Similarly, the maximum length $L_{EA}$ can be understood as corresponding to the greatest length of the electrode assembly as measured from opposing points of the lateral surface 142 of the electrode assembly 106 where the electrode assembly is longest in the transverse direction. Referring again to the embodiment in FIG. 2A, the maximum length $L_{EA}$ can be understood as simply the length of the electrode assembly 106, whereas in the embodiment shown in FIG. 3H, the maximum length $L_{EA}$ corresponds to the length of the electrode assembly as measured from two opposing points 302*a*, 302*b*, where the electrode assembly is longest in the transverse direction, as opposed to a length as measured from opposing points 303*a*, 303*b* where the electrode assembly is shorter. Along similar lines, the maximum height $H_{EA}$ can be understood as corresponding to the greatest height of the electrode assembly as measured from opposing points of the lateral surface 143 of the electrode assembly where the electrode assembly is highest in the vertical direction. That is, in the embodiment shown in FIG. 2A, the maximum height $H_{EA}$ is simply the height of the electrode assembly. While not specifically depicted in the embodiment shown in FIG. 3H, if the electrode assembly had different heights at points across one or more of the longitudinal and transverse directions, then the maximum height $H_{EA}$ of the electrode assembly would be understood to correspond to the height of the electrode assembly as measured from two opposing points where the electrode assembly is highest in the vertical direction, as opposed to a height as measured from opposing points where the electrode assembly is shorter, as analogously described for the maximum width $W_{EA}$ and maximum length $L_{EA}$. The maximum length $L_{EA}$, maximum width $W_{EA}$, and maximum height $H_{EA}$ of the electrode assembly 106 may vary depending upon the energy storage device 100 and the intended use thereof. For example, in one embodiment, the electrode assembly 106 may include maximum lengths $L_{EA}$, widths $W_{EA}$, and heights $H_{EA}$ typical of conventional secondary battery dimensions. By way of further example, in one embodiment, the electrode assembly 106 may include maximum lengths $L_{EA}$, widths $W_{EA}$, and heights $H_{EA}$ typical of thin-film battery dimensions.

In some embodiments, the dimensions $L_{EA}$, $W_{EA}$, and $H_{EA}$ are selected to provide an electrode assembly 106 having a maximum length $L_{EA}$ along the transverse axis (X axis) and/or a maximum width $W_{EA}$ along the longitudinal axis (Y axis) that is longer than the maximum height $H_{EA}$ along the vertical axis (Z axis). For example, in the embodiment shown in FIG. 2A, the dimensions $L_{EA}$, $W_{EA}$, and $H_{EA}$ are selected to provide an electrode assembly 106 having the greatest dimension along the transverse axis (X axis) that is orthogonal with electrode structure stacking direction D, as well as along the longitudinal axis (Y axis) coinciding with the electrode structure stacking direction D. That is, the maximum length $L_{EA}$ and/or maximum width $W_{EA}$ may be greater than the maximum height $H_{EA}$. For example, in one embodiment, a ratio of the maximum length $L_{EA}$ to the maximum height $H_{EA}$ may be at least 2:1. By way of further example, in one embodiment a ratio of the maximum length $L_{EA}$ to the maximum height $H_{EA}$ may be at least 5:1. By way of further example, in one embodiment, the ratio of the maximum length $L_{EA}$ to the maximum height $H_{EA}$ may be at least 10:1. By way of further example, in one embodiment, the ratio of the maximum length $L_{EA}$ to the maximum height $H_{EA}$ may be at least 15:1. By way of further example, in one embodiment, the ratio of the maximum length $L_{EA}$ to the maximum height $H_{EA}$ may be at least 20:1. The ratios of the different dimensions may allow for optimal configurations within an energy storage device to maximize the amount of active materials, thereby increasing energy density.

In some embodiments, the maximum width $W_{EA}$ may be selected to provide a width of the electrode assembly 106 that is greater than the maximum height $H_{EA}$. For example, in one embodiment, a ratio of the maximum width $W_{EA}$ to the maximum height $H_{EA}$ may be at least 2:1. By way of further example, in one embodiment, the ratio of the maximum width $W_{EA}$ to the maximum height $H_{EA}$ may be at least 5:1. By way of further example, in one embodiment, the ratio of the maximum width $W_{EA}$ to the maximum height $H_{EA}$ may be at least 10:1. By way of further example, in one embodiment, the ratio of the maximum width $W_{EA}$ to the maximum height $H_{EA}$ may be at least 15:1. By way of further example, in one embodiment, the ratio of the maximum width $W_{EA}$ to the maximum height $H_{EA}$ may be at least 20:1.

According to one embodiment, a ratio of the maximum width $W_{EA}$ to the maximum length $L_{EA}$ may be selected to be within a predetermined range that provides for an optimal configuration. For example, in one embodiment, a ratio of the maximum width $W_{EA}$ to the maximum length $L_{EA}$ may be in the range of from 1:5 to 5:1. By way of further example, in one embodiment a ratio of the maximum width $W_{EA}$ to the maximum length $L_{EA}$ may be in the range of from 1:3 to 3:1. By way of yet a further example, in one embodiment a ratio of the maximum width $W_{EA}$ to the maximum length $L_{EA}$ may be in the range of from 1:2 to 2:1.

In the embodiment as shown in FIG. 1B and FIG. 2A, the electrode assembly 106 has the first longitudinal end surface 116 and the opposing second longitudinal end surface 118 that is separated from the first longitudinal end surface 116 along the longitudinal axis $A_{EA}$. The electrode assembly 106 further comprises a lateral surface 142 that at least partially surrounds the longitudinal axis $A_{EA}$, and that connects the first and second longitudinal end surfaces 116, 118. In one embodiment, the maximum width $W_{EA}$ is the dimension along the longitudinal axis $A_{EA}$ as measured from the first longitudinal end surface 116 to the second longitudinal end surface 118. Similarly, the maximum length $L_{EA}$ may be bounded by the lateral surface 142, and in one embodiment, may be the dimension as measured from opposing first and second regions 144, 146 of the lateral surface 142 along the transverse axis that is orthogonal to the longitudinal axis. The maximum height $H_{EA}$, in one embodiment, may be bounded by the lateral surface 142 and may be measured from opposing first and second regions 148, 150 of the lateral surface 142 along the vertical axis that is orthogonal to the longitudinal axis.

For the purposes of clarity, only four electrode structures 110 and four counter-electrode structures 112 are illustrated in the embodiment shown in FIG. 2A, and similarly only a limited number of electrode structures 110 and counter-electrode structures are shown in FIG. 1B. In one embodiment, the alternating sequence of members of the electrode and counter-electrode structure populations 110 and 112, 15 respectively, may include any number of members for each population, depending on the energy storage device 100 and the intended use thereof, and the alternating sequence of members of the electrode and counter-electrode structure populations 110 and 112 may be interdigitated, for example, as shown in FIG. 2A. By way of further example, in one embodiment, each member of the population of electrode structures 110 may reside between two members of the population of counter-electrode structures 112, with the exception of when the alternating sequence terminates along the stacking direction, D. By way of further example, in one embodiment, each member of the population of counter-electrode structures 112 may reside between two members of the population of electrode structures 110, with the exception of when the alternating sequence terminates along the stacking direction, D. By way of further example, in one embodiment, and stated more generally, the population of electrode structures 110 and the population of counter-electrode structures 112 each have N members, each of N−1 electrode structure members 110 is between two counter-electrode structure members 112, each of N−1 counter-electrode structure members 112 is between two electrode structure members 110, and N is at least 2. By way of further example, in one embodiment, N is at least 4. By way of further example, in one embodiment, N is at least 5. By way of further example, in one embodiment, N is at least 10. By way of further example, in one embodiment, N is at least 25. By way of further example, in one embodiment, N is at least 50. By way of further example, in one embodiment, N is at least 100 or more. In one embodiment, members of the electrode and/or counter-electrode populations extend sufficiently from an imaginary backplane (e.g., a plane substantially coincident with a surface of the electrode assembly) to have a surface area (ignoring porosity) that is greater than twice the geometrical footprint (i.e., projection) of the members in the backplane. In certain embodiments, the ratio of the surface area of a non-laminar (i.e., three-dimensional) electrode and/or counter-electrode structure to its geometric footprint in the imaginary backplane may be at least about 5, at least about 10, at least about 50, at least about 100, and/or even at least about 500. In general, however, the ratio will be between about 2 and about 1000. In one such embodiment, members of the electrode population are non-laminar in nature. By way of further example, in one such embodiment, members of the counter-electrode population are non-laminar in nature. By way of further example, in one such embodiment, members of the electrode population and members of the counter-electrode population are non-laminar in nature.

According to one embodiment, the electrode assembly 106 has longitudinal ends 117, 119 at which the electrode assembly 106 terminates. According to one embodiment, the alternating sequence of electrode and counter-electrode structures 110, 112, respectively, in the electrode assembly 106 terminates in a symmetric fashion along the longitudinal direction, such as with electrode structures 110 at each end 117, 119 of the electrode assembly 106 in the longitudinal direction, or with counter-electrode structures 112 at each end 117, 119 of the electrode assembly 106, in the longitudinal direction. In another embodiment, the alternating sequence of electrode 110 and counter-electrode structures 112 may terminate in an asymmetric fashion along the longitudinal direction, such as with an electrode structure 110 at one end 117 of the longitudinal axis $A_{EA}$, and a counter-electrode structure 112 at the other end 119 of the longitudinal axis $A_{EA}$. According to yet another embodiment, the electrode assembly 106 may terminate with a substructure of one or more of an electrode structure 110 and/or counter-electrode structure 112 at one or more ends 117, 119 of the electrode assembly 106. By way of example, according to one embodiment, the alternating sequence of the electrode 110 and counter-electrode structures 112 can terminate at one or more substructures of the electrode 110 and counter-electrode structures 112, including an electrode backbone 134, counter-electrode backbone 141, electrode current collector 136, counter-electrode current collector 140, electrode active material layer 132, counter-electrode active material layer 138, and the like, and may also terminate with a structure such as the separator 130, and the structure at each longitudinal end 117, 119 of the electrode assembly 106 may be the same (symmetric) or different (asymmetric). The longitudinal terminal ends 117, 119 of the electrode assembly 106 can comprise the first and second longitudinal end surfaces 116, 118 that are contacted by the first and second primary growth constraints 154, 156 to constrain overall growth of the electrode assembly 106.

According to yet another embodiment, the electrode assembly 106 has first and second transverse ends 145, 147 (see, e.g., FIG. 1B and FIG. 2A) that may contact one or more electrode and/or counter electrode tabs 190, 192 (see, e.g., FIG. 20) that may be used to electrically connect the electrode and/or counter-electrode structures 110, 112 to a load and/or a voltage supply (not shown). For example, the electrode assembly 106 can comprise an electrode bus 194 (see, e.g., FIG. 2A), to which each electrode structure 110 can be connected, and that pools current from each member of the population of electrode structures 110. Similarly, the electrode assembly 106 can comprise a counter-electrode bus 196 to which each counter-electrode structure 112 may be connected, and that pools current from each member of the population of counter-electrode structures 112. The electrode and/or counter-electrode buses 194, 196 each have a length measured in direction D, and extending substantially the entire length of the interdigitated series of electrode structures 110, 112. In the embodiment illustrated in FIG. 20, the electrode tab 190 and/or counter electrode tab 192 includes electrode tab extensions 191, 193 which electrically connect with, and run substantially the entire length of electrode and/or counter-electrode bus 194, 196. Alternatively, the electrode and/or counter electrode tabs 190, 192 may directly connect to the electrode and/or counter-electrode bus 194, 196, for example, an end or position intermediate thereof along the length of the buses 194, 196, without requiring the tab extensions 191, 193. Accordingly, in one embodiment, the electrode and/or counter-electrode buses 194, 196 can form at least a portion of the terminal ends 145, 147 of the electrode assembly 106 in the transverse direction, and connect the electrode assembly to the tabs 190, 192 for electrical connection to a load and/or voltage supply (not shown). Furthermore, in yet another embodiment, the electrode assembly 106 comprises first and second terminal ends 149, 153 disposed along the vertical (Z) axis. For example, according to one embodiment, each electrode 110 and/or counter-electrode structure 112, is provided with a top and bottom coating of separator material, as shown in FIG. 2A, where the coatings form the terminal ends 149, 153 of the electrode assembly 106 in the vertical direction. The terminal ends 149, 153 that may be formed of the coating of separator material can comprise first and second surface regions 148, 150 of the lateral surface 142 along the vertical axis that can be placed in contact with the first and second secondary growth constraints 158, 160 to constrain growth in the vertical direction.

In general, the electrode assembly 106 can comprise longitudinal end surfaces 116, 118 that are planar, co-planar, or non-planar. For example, in one embodiment the opposing longitudinal end surfaces 116, 118 may be convex. By way of further example, in one embodiment the opposing longitudinal end surfaces 116, 118 may be concave. By way of further example, in one embodiment the opposing longitudinal end surfaces 116, 118 are substantially planar. In certain embodiments, electrode assembly 106 may include opposing longitudinal end surfaces 116, 118 having any range of two-dimensional shapes when projected onto a plane. For example, the longitudinal end surfaces 116, 118 may independently have a smooth curved shape (e.g., round, elliptical, hyperbolic, or parabolic), they may independently include a series of lines and vertices (e.g., polygonal), or they may independently include a smooth curved shape and include one or more lines and vertices. Similarly, the lateral surface 142 of the electrode assembly 106 may be a smooth curved shape (e.g., the electrode assembly 106 may have a round, elliptical, hyperbolic, or parabolic cross-sectional shape) or the lateral surface 142 may include two or more lines connected at vertices (e.g., the electrode assembly 106 may have a polygonal cross-section). For example, in one embodiment, the electrode assembly 106 has a cylindrical, elliptic cylindrical, parabolic cylindrical, or hyperbolic cylindrical shape. By way of further example, in one such embodiment, the electrode assembly 106 may have a prismatic shape, having opposing longitudinal end surfaces 116, 118 of the same size and shape and a lateral surface 142 (i.e., the faces extending between the opposing longitudinal end surfaces 116 and 118) being parallelogram-shaped. By way of further example, in one such embodiment, the electrode assembly 106 has a shape that corresponds to a triangular prism, the electrode assembly 106 having two opposing triangular longitudinal end surfaces 116 and 118 and a lateral surface 142 consisting of three parallelograms (e.g., rectangles) extending between the two longitudinal ends. By way of further example, in one such embodiment, the electrode assembly 106 has a shape that corresponds to a rectangular prism, the electrode assembly 106 having two opposing rectangular longitudinal end surfaces 116 and 118, and a lateral surface 142 comprising four parallelogram (e.g., rectangular) faces. By way of further example, in one such embodiment, the electrode assembly 106 has a shape that corresponds to a pentagonal prism, hexagonal prism, etc. wherein the electrode assembly 106 has two pentagonal, hexagonal, etc., respectively, opposing longitudinal end surfaces 116 and 118, and a lateral surface comprising five, six, etc., respectively, parallelograms (e.g., rectangular) faces.

Figures 3A, 3B, 3C, 3D, 3E:
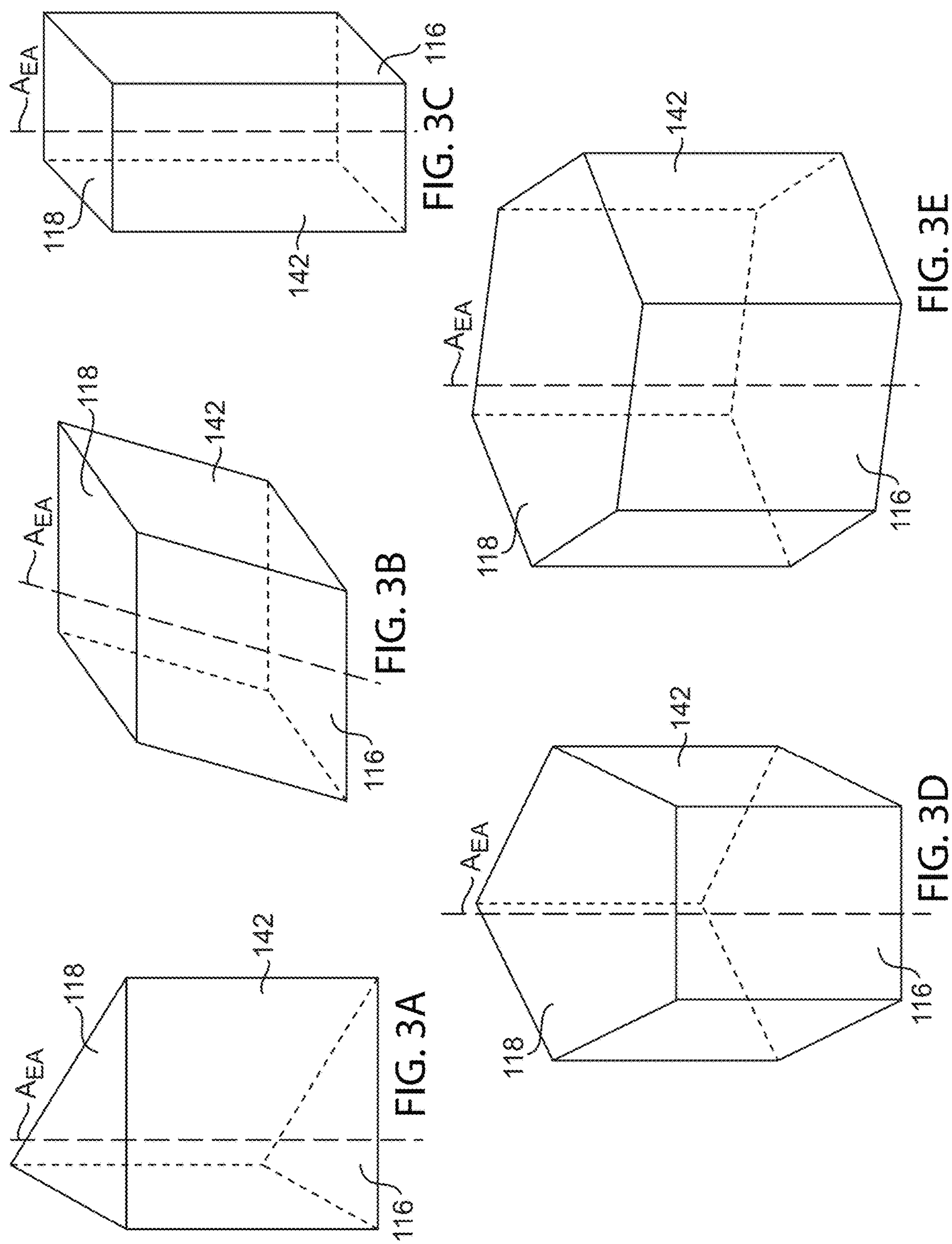
FIGS. 3A-3H show exemplary embodiments of different shapes and sizes for an electrode assembly.
Figure 3F:
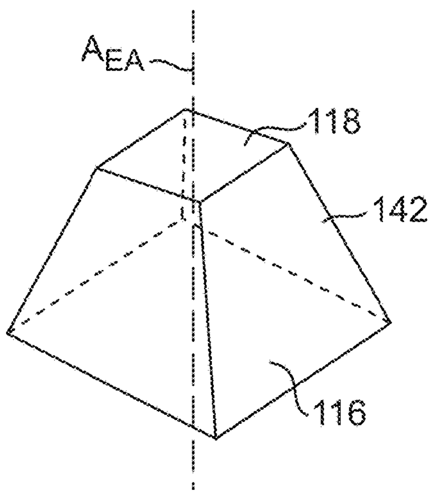
Figure 3G:
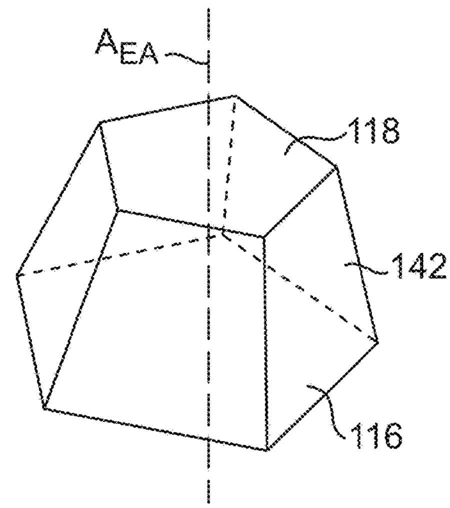
Figure 3H:
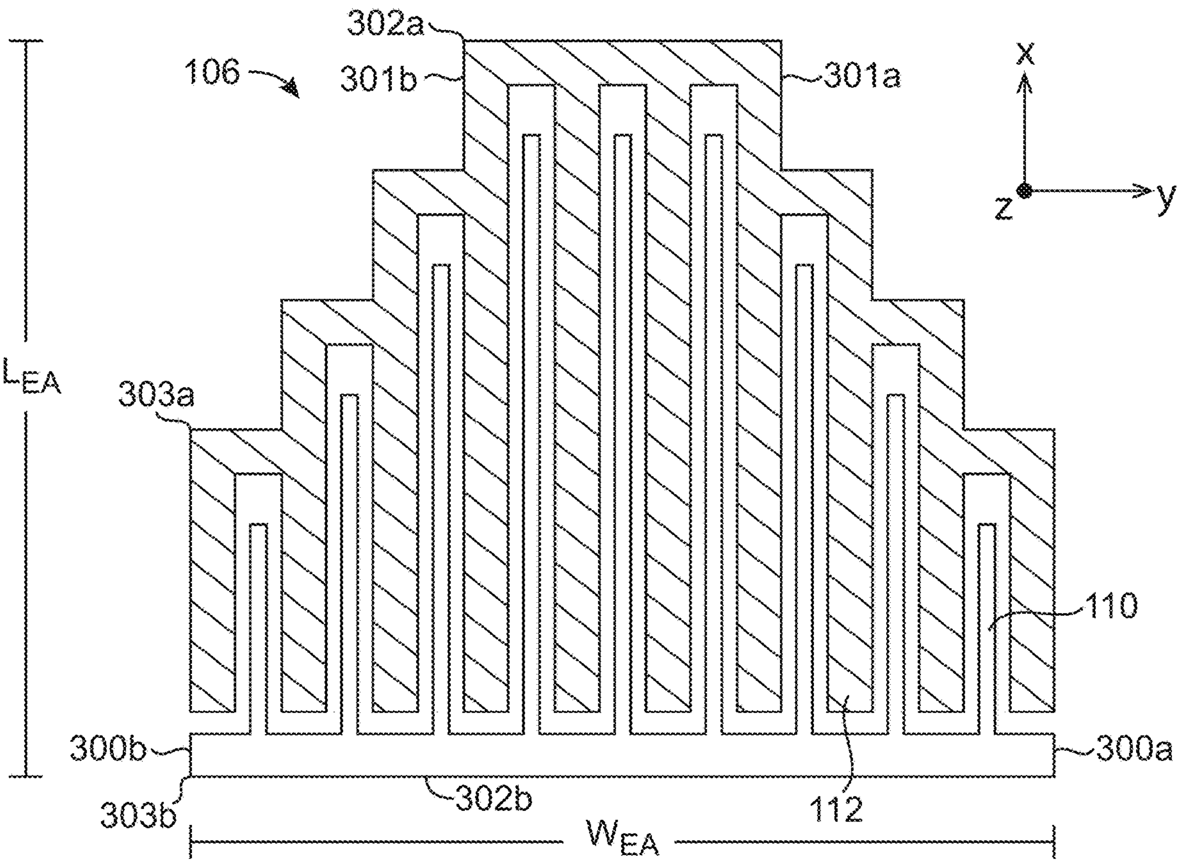

Referring now to FIGS. 3A-3H, several exemplary geometric shapes are schematically illustrated for electrode assembly 106. More specifically, in FIG. 3A, electrode assembly 106 has a triangular prismatic shape with opposing first and second longitudinal end surfaces 116, 118 separated along longitudinal axis $A_{EA}$, and a lateral surface 142 including the three rectangular faces connecting the longitudinal end surfaces 116, 118, that are about the longitudinal axis $A_{EA}$. In FIG. 3B, electrode assembly 106 has a parallelepiped shape with opposing first and second parallelogram longitudinal end surfaces 116, 118 separated along longitudinal axis $A_{EA}$, and a lateral surface 142 including the four parallelogram-shaped faces connecting the two longitudinal end surfaces 116, 118, and surrounding longitudinal axis $A_{EA}$. In FIG. 3C, electrode assembly 106 has a rectangular prism shape with opposing first and second rectangular longitudinal end surfaces 116, 118 separated along longitudinal axis $A_{EA}$, and a lateral surface 142 including the four rectangular faces connecting the two longitudinal end surfaces 116, 118 and surrounding longitudinal axis $A_{EA}$. In FIG. 3D, electrode assembly 106 has a pentagonal prismatic shape with opposing first and second pentagonal longitudinal end surfaces 116, 118 separated along longitudinal axis $A_{EA}$, and a lateral surface 142 including the five rectangular faces connecting the two longitudinal end surfaces 116, 118 and surrounding longitudinal axis $A_{EA}$. In FIG. 3E, electrode assembly 106 has a hexagonal prismatic shape with opposing first and second hexagonal longitudinal end surfaces 116, 118 separated along longitudinal axis $A_{EA}$, and a lateral surface 142 including the six rectangular faces connecting the two longitudinal end surfaces 116, 118 and surrounding longitudinal axis $A_{EA}$. In FIG. 3E, the electrode assembly has a square pyramidal frustum shape with opposing first and second square end surfaces 116, 118 separated along longitudinal axis $A_{EA}$, and a lateral surface 142 including four trapezoidal faces connecting the two longitudinal end surfaces 116, 118 and surrounding longitudinal axis $A_{EA}$, with the trapezoidal faces tapering in dimension along the longitudinal axis from a greater dimension at the first surface 116 to a smaller dimension at the second surface 118, and the size of the second surface being smaller than that of the first surface. In FIG. 3F, the electrode assembly has a pentagonal pyramidal frustum shape with opposing first and second square end surfaces 116, 118 separated along longitudinal axis $A_{EA}$, and a lateral surface 142 including five trapezoidal faces connecting the two longitudinal end surfaces 116, 118 and surrounding longitudinal axis $A_{EA}$, with the trapezoidal faces tapering in dimension along the longitudinal axis from a greater dimension at the first surface 116 to a smaller dimension at the second surface 118, and the size of the second surface being smaller than that of the first surface. In FIG. 3H, the electrode assembly 106 has a pyramidal shape in the longitudinal direction, by virtue of electrode and counter-electrode structures 110, 112 having lengths that decrease from a first length towards the middle of the electrode assembly 106 on the longitudinal axis, to second lengths at the longitudinal ends 117, 119 of the electrode assembly 106.

Manufacturing Method

In one embodiment, a method of manufacturing an electrode assembly 106 is provided. Referring to FIGS. 38 and 40A-C, aspects of a method of manufacturing are described.

Embodiments of the method involve removing a population of negative electrode subunits 900 from a negative electrode sheet 906, where the negative electrode sheet 906 comprises a negative electrode sheet edge margin 907 and at least one electrode sheet weakened region 908 that is internal to the edge margin 907 (see, e.g., FIGS. 39A-39B), the at least one weakened region at least partially defining a boundary 909 of the negative electrode subunit population within the negative electrode sheet 906. Members of the negative electrode subunit population can, in certain embodiments, comprise at least one of a negative electrode active material layer 132 and a negative electrode current collector 136. In certain embodiments, the members of the negative electrode subunit population can comprise a multi-layer subunit comprising a negative electrode active material layer 132 on at least one side, and even both sides 917*a,b*, of an electrode current collector layer 136 (see, e.g., FIG. 42). Furthermore, according to aspects of the disclosure, the negative electrode subunit 900 of each member of the population has a negative electrode subunit centroid 910, marking the geometric center of the negative electrode subunit, as shown for example in FIGS. 42 and 43B. According to some aspects, the negative electrode subunit 900 can comprise a negative electrode active material layer 132 having a centroid 911, which may be at a same or different position than the negative electrode subunit centroid 910, according to a geometry and configuration of the electrode active material layer with respect to the entire negative electrode subunit 900.

Aspects of the method further involve removing a population of separator layer subunits 904 from a separator sheet 912, where the separator sheet 912 comprises a separator sheet edge margin 913 and at least one separator sheet weakened region 914 that is internal to the edge margin 913, the at least one weakened region at least partially defining a boundary 915 the separator layer subunit population within the separator sheet 912. Each member of the separator layer subunit population can comprise opposing surfaces 916*a*, 916*b*.

Aspects of the method further involve removing a population of positive electrode subunits 902 from a positive electrode sheet 918, where the positive electrode sheet 918 comprises a positive electrode sheet edge margin 919 and at least one positive electrode sheet weakened region 920 that is internal to the edge margin 919, the at last one weakened region at least partially defining a boundary 921 of the positive electrode subunit population within the positive electrode sheet 918. Members of the positive electrode subunit population can, in certain embodiments, comprise at least one of a positive electrode active material layer 138 and a positive electrode current collector 140. In certain embodiments, the members of the positive electrode subunit population can comprise a multi-layer subunit comprising a positive electrode active material layer 138 on at least one side and even both sides 927*a,b* of a positive electrode current collector layer 140 (see, e.g., FIG. 42). Furthermore, according to aspects of the disclosure, the positive electrode subunit 902 of each member of the population has a positive electrode subunit centroid 922, marking the geometric center of the positive electrode subunit, as shown for example in FIGS. 42 and 43B. According to some aspects, the positive electrode subunit 902 can comprise a negative electrode active material layer 138 having a centroid 923, which may be at a same or different position than the positive electrode subunit centroid 910, according to a geometry and configuration of the electrode active material layer with respect to the entire positive electrode subunit 900.

Figure 43A:
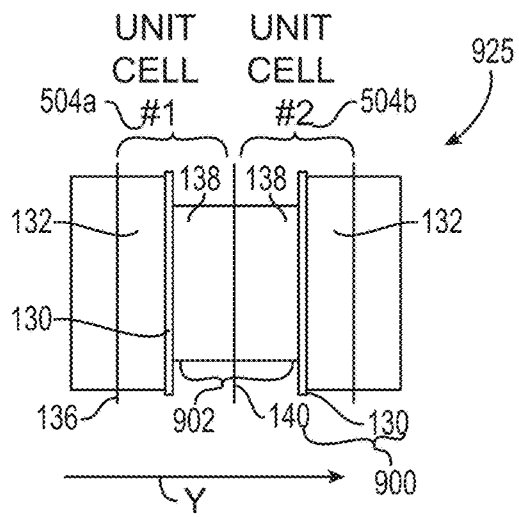
FIG. 43A illustrates a schematic view in the YZ plane of unit cells of a stacked population.

Aspects of the method further comprise stacking members of the negative electrode subunit population 900, the separator layer subunit population 904 and the positive electrode subunit population 902 in the stacking direction D to form a stacked population 925 of unit cells 504. Referring to FIG. 43A, each unit cell 504*a*, 504*b* in the stacked population 925 comprises at least a unit cell portion of a negative electrode subunit 900, the separator layer 130 of a stacked member of the separator layer subunit population 904, and a unit cell portion of a positive electrode subunit 902. For example, each unit cell 504*a*, 504*b* can comprise at least a unit cell portion of the negative electrode 30) current collector layer 136 and the negative electrode active material layer 132 of a stacked member of the negative electrode subunit population 900, the separator layer 130 of a stacked member of the separator layer subunit population 904, and the positive electrode active material layer 138 and a unit cell portion of the positive electrode current collector layer 140 of a stacked member of the positive electrode subunits 902. Furthermore, the negative electrode subunit 900 and positive electrode subunit 902 face opposing surfaces of the separator layer 130 comprised by such stacked unit cell population member. For example, the negative electrode active material 132 and positive electrode active material layers 138 comprised by a member of the stacked unit cell population 504 face opposing surfaces 916*a*, 916*b* of the separator layer 130 comprised by such stacked unit cell population member 504. The separator layer comprised by such stacked unit cell population member is adapted to electrically isolate the portion of the negative electrode subunit 900 and the portion of the positive electrode subunit 902 comprised by such stacked unit cell while permitting an exchange of carrier ions between the negative electrode subunit and the positive electrode subunit comprised by such stacked unit cell. For example, the separator layer 130 comprised by such stacked unit cell population member 504 may be adapted to electrically isolate the negative electrode active material 132 and positive electrode active material layer 138 comprised by such stacked unit cell 504, while permitting an exchange of carrier ions between the negative electrode active material 132 and positive electrode active material layer 134 comprised by such stacked unit cell 504. Furthermore, according to embodiments herein, the electrode structure 110 as described elsewhere herein can comprise a negative electrode structure having an electrode active material layer that is the negative electrode active material layer 132, and the counter-electrode structure 112 as described elsewhere herein can comprise a positive electrode structure having the positive electrode active material layer 138.

Figure 42:
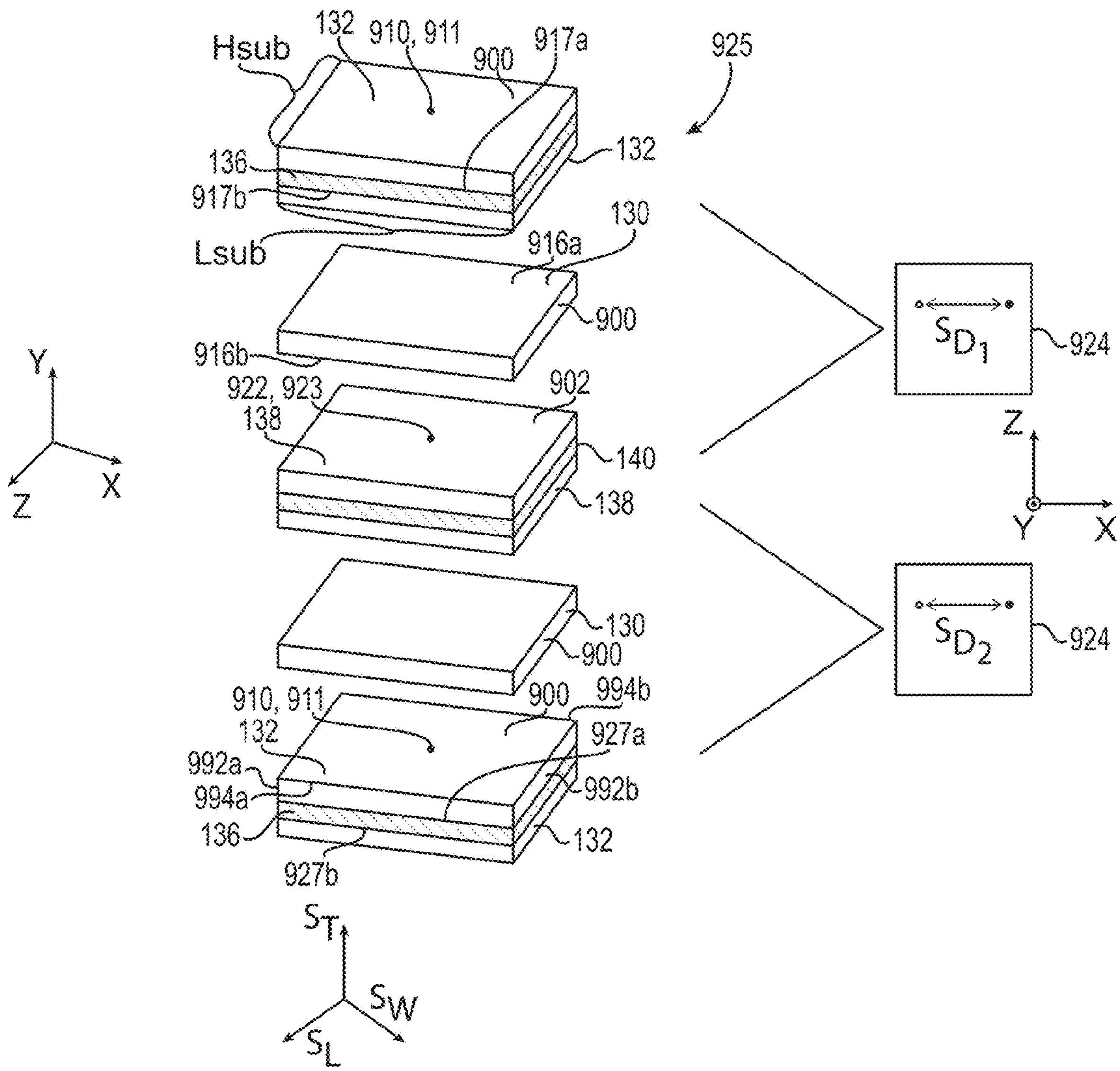
FIG. 42 illustrates an exploded schematic view of stacked negative electrode, positive electrode and separator subunits, showing the centroid separation distances as projected onto a plane, according to aspects herein.

Referring to FIGS. 42 and 43A-C, embodiments of the method are shown where the each member of the stacked population 925 of unit cells 504 has a centroid separation distance Sp between the centroids of the portions of the negative electrode subunit and the positive electrode subunit in a unit cell that is within a predetermined range. Furthermore, in certain embodiments, members of the stacked population 925 of unit cells 504 may have a separation distance Sp between centroids of negative electrode and positive electrode active material layers of the unit cell 504. In the case of a separation distance Sp between negative and positive electrode subunit centroids 910, 922, the centroid separation distance Sp for an individual member of the population of unit cells 504 is the absolute value of the distance between the centroid 910 of the unit cell portion of the negative electrode subunit, and the centroid 922 of the unit cell portion of the positive electrode subunit comprised by such individual unit cell member 504, as projected onto an imaginary plane 924 that is orthogonal to the stacking direction D. In the case of a separation distance $S_D$ between negative and positive electrode active material layers 911, 923 the centroid separation distance Sp for an individual member of the population of unit cells 504 is the absolute value of the distance between the centroid 911 of the unit cell portion of the negative electrode active material layer 132, and the centroid 923 of the unit cell portion of the positive electrode active material layer 138 comprised by such individual unit cell member 504, as projected onto an imaginary plane 924 that is orthogonal to the stacking direction Y (e.g., the stacking direction Y as shown in FIGS. 1 and 2A). Furthermore, in the embodiment as shown in FIG. 42, the centroid 911 of the unit cell portion of the electrode active material layer 132 is coincident with the centroid 911 of the negative electrode subunit 900, however the centroids may also be different. A separation distance Sp can also be calculated as to two negative electrode subunits and/or two positive electrode subunits in different unit cells 504*a*, 504*b*, as well as for two negative electrode active material layers in different unit cells 504*a*, 504*b* and/or two negative electrode active material layers in different unit cells 504*a*, 504*b*, by taking the absolute value of the distance between the centroids of the structures of interest, as projected onto an imaginary plane 924 that is orthogonal to the stacking direction Y.

Figure 43B:
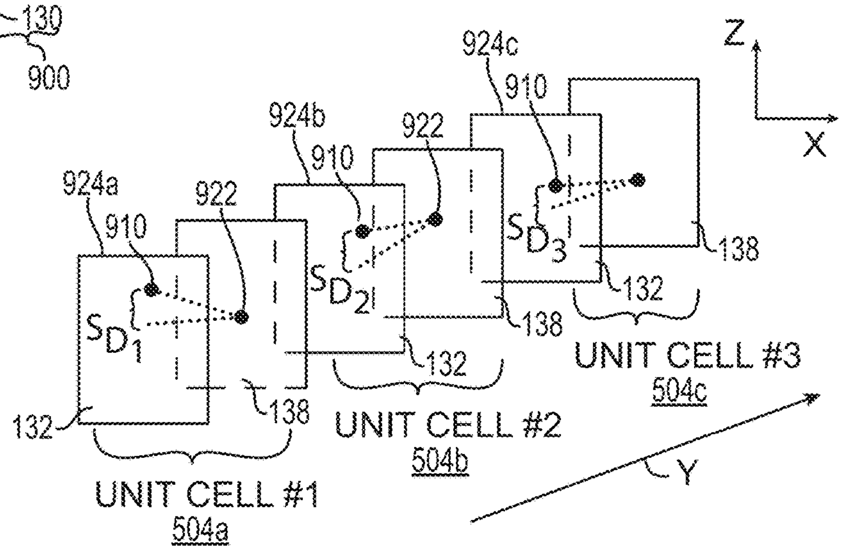
FIGS. 43B and 43C illustrate centroid separation distances between unit cells in a stacked population as projected onto a plane (43B) and as depicted in graph form for each unit cell (43C).
Figure 43C:
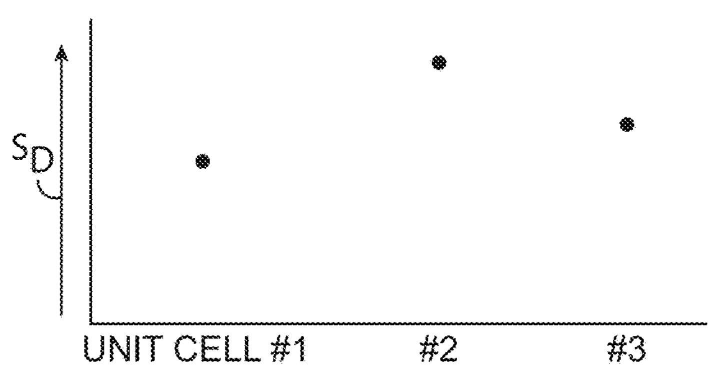

Referring to FIGS. 43A-B, which depicts a stacked population 925 of unit cells 504 comprising negative electrode active material layers 132, separator layers 130 and positive electrode active material layers 138, it can be seen that a centroid separation distance between the negative electrode active material layer 132 and positive electrode active material layer 138 on either side of the separator layer 130 (i.e., in the same unit cell 504) (or similarly, the negative electrode subunit 900 and positive electrode subunit 902), can be projected onto an imaginary plane 924 orthogonal to the stacking direction Y. FIG. 43B further depicts negative electrode active material layers 132 and positive electrode active material layers 138 (or alternatively, unit cell portions of the negative electrode subunit 900 and positive electrode subunit 902) stacked in the stacking direction Y and having centroids 910, 922, where the centroid separation distance $S_{D1}$ for a first unit cell 504*a* (as shown in FIG. 43B) is shown as projected onto a first imaginary plane 924*a* (coincident with a plane of a layer of negative electrode active material as depicted), and the centroid separation distance $S_{D2}$ for a first unit cell 504*b* (as shown in FIG. 43B) is shown as projected onto a second imaginary plane 924*b* (coincident with a plane of a layer of negative electrode active material as depicted). That is, according to certain embodiments, the separation distance Sp can be understood to be the absolute value of the distance between the centroids 910, 922 of each of the respective negative electrode subunit portion and positive electrode subunit portion (or, between the centroids of the negative electrode and positive electrode active material layers) in a given unit cell 504, as projected onto an XZ plane that is orthogonal to the stacking direction Y (i.e., not including a component of the distance between centroids in the stacking direction). FIG. 43C further depicts an embodiment of a plot of the centroid separation distances $S_{D1}$, $S_{D2}$ and $S_{D3}$ for first, second, and third unit cells 504*a*, 504*b*, 504*c*, showing examples of the magnitude of the centroid separation distances for each unit cell 504. In a case where SD is 0, then the centroids of the respective structures project to a point that is coincident on the XZ plane. In a case where $S_D$ is non-zero (greater than 0, since $S_D$ is the absolute value of the distance, the centroids for the respective structures are offset from one another.

According to certain aspects, the centroid separation distances are maintained within a predetermined limit that provides a suitable alignment of the negative electrode subunit and positive electrode subunit portions in a unit cell, such as alignment of the negative electrode active material layer and positive electrode active material layers 132, 138, with any member of the unit cell population. According to yet another embodiment, the centroid separation distances are maintained within a predetermined limit that provides suitable alignment of positive electrode subunits and/or positive electrode active material layers between different unit cell members, and/or suitable alignment of negative electrode subunits and/or negative electrode active material layers between different unit cell members 504. An average centroid separation distance $S_D$ for a predetermined number of unit cells 504 within the electrode assembly, and/or among different unit cells 504 within the electrode assembly, may also be maintained within a certain predetermined limit. For example, the stacking of the negative electrode subunits 900 and the positive electrode subunits 902 may be performed in such a way so as to provide an alignment of the negative electrode and positive electrode subunits and/or active material layers with respect to one another, with this relative alignment and/or positioning being reflected via relative alignment of the centroids of these structures with respect to one another, within a predetermined limit.

In one embodiment, the centroid separation distance for an individual member of the population $S_D$ is within a predetermined limit corresponding to either less than 500 microns, or in a case where 2% of the largest dimension of the negative electrode structure in the member (i.e., electrode subunit and/or active material layer) is less than 500 microns, then the predetermined limit is less than 2% of that largest dimension. That is, in the case where a largest dimension of the individual member is less than 25 mm, the centroid separation distance is less than 2% of the largest dimension, and otherwise the centroid separation distance is less than 500 microns. In another embodiment, the centroid separation distance between first and second members of the population $S_D$ is within a predetermined limit corresponding to either less than 500 microns, or in a case where 2% of the largest dimension of the negative or positive electrode structure in either of the members (i.e., electrode subunit and/or active material layer) is less than 500 microns, then the predetermined limit is less than 2% of that largest dimension of the larger negative or positive electrode structure in either of the members. That is, in the case where a largest dimension of the individual member is less than 25 mm, the centroid separation distance is less than 2% of the largest dimension, and otherwise the centroid separation distance is less than 500 microns.

The largest dimension of the negative electrode active material 132 in each unit cell (or negative electrode active material layers 132 in first and second unit cells), may be, for example, the larger of either the length $L_E$ that corresponds to the Feret diameter as measured in the transverse direction X between first and second opposing transverse end surfaces 502*a,b* of the electrode active material layer (see, e.g., FIG. 26A) and/or a height $H_E$ that corresponds to the Feret diameter of the negative electrode active material layer as measured in the vertical direction between first and second opposing vertical end surfaces 500*a, b* of the negative electrode active material layer 132 (see, e.g., FIG. 30), as is described further hereinbelow. The largest dimension of a positive electrode active material layer 138 in each unit cell, or in first and second unit cells, if the larger of the length or height that corresponds to the Feret diameter in the same manner as determined for the electrode active material layer. Furthermore, the largest dimension of either the negative electrode subunit and/or positive electrode subunit, either in the same unit cell, or first and second unit cells may also correspond to the larger of the $L_{Sub}$ that corresponds to the Feret diameter of the negative and/or positive electrode subunit as measured in the X direction between first and second opposing transverse end surfaces 992*a,b* of the negative electrode subunit and/or the height $H_{Sub}$ that corresponds to the Feret diameter of the negative electrode subunit and/or positive electrode subunit as measured in the Z direction between first and second opposing end surfaces 994*a,b* of the negative electrode active material layer 132 (see, e.g., FIG. 42).

In one embodiment, the stacked population has an average centroid separation distance that is within the predetermined limit across at least 5 unit cells in the stacked population. That is, according to one aspect the average across 5 unit cells of the centroid separation distances between structures within in each unit cell may be within the predetermined limit. According to yet another aspect, the average across 5 unit cells of the centroid separation distances between structures in first and second unit cells may be within the predetermined limit. According to yet another embodiment, the stacked population has an average centroid separation distance that is within the predetermined limit for at least 10 unit cells, at least 15 unit cells, at least 20 unit cells, and/or at least 25 unit cells in the stacked population, again either for structures within the same unit cell or structures in different unit cells. According to yet another embodiment, the stacked population can comprise the average centroid separation distance that is within the predetermined limit for at least 75%, at least 80%, at least 90% and/or at least 95% of the unit cell members 504 of the stacked population of unit cells, either for structures within the same unit cell or structures in different unit cells. That is, the average centroid separation distance for positive and negative electrode structures in the same unit cell (e.g., negative and positive electrode subunits in the same unit cell, or positive and negative electrode active material layers in the same unit cell), may be within the predetermined limit for at least 75%, at least 80%, at least 90% and/or at least 95% of the unit cell members 504 of the stacked population of unit cells. Also, the average of the centroid separation distance between unit cells, for positive and negative electrode structures (e.g., negative electrode subunits in the different unit cells, negative electrode active material layers in different unit cells, positive electrode subunits in the different unit cells, or positive electrode active material layers in different unit cells), may be within the predetermined limit for at least 75%, at least 80%, at least 90% and/or at least 95% of the unit cell members 504 of the stacked population of unit cells. Furthermore, in a case where a negative electrode subunit does not have electrode active material (for example when negative electrode active material is formed in situ in a formation process), an area of a negative electrode subunit (e.g., negative electrode current collector) that is geometrically opposing an positive-electrode active material layer in the same unit cell can be treated as an electrode active area, and the separation distance of a centroid of this electrode active area to other structures in the stacked population can be calculated as for the negative electrode active material herein (e.g., generally the separation distance will be zero between the electrode active area and the positive electrode active material layer in the same unit cell).

Figure 44A:
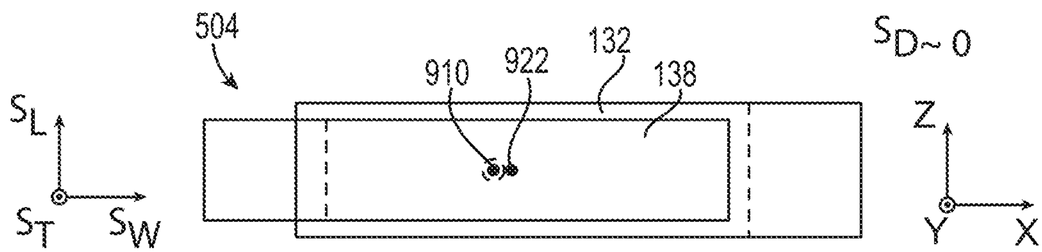
FIGS. 44A and 44B illustrate schematic embodiments of stacked negative and positive electrode subunits with centroids, according to aspects herein.
Figure 44B:
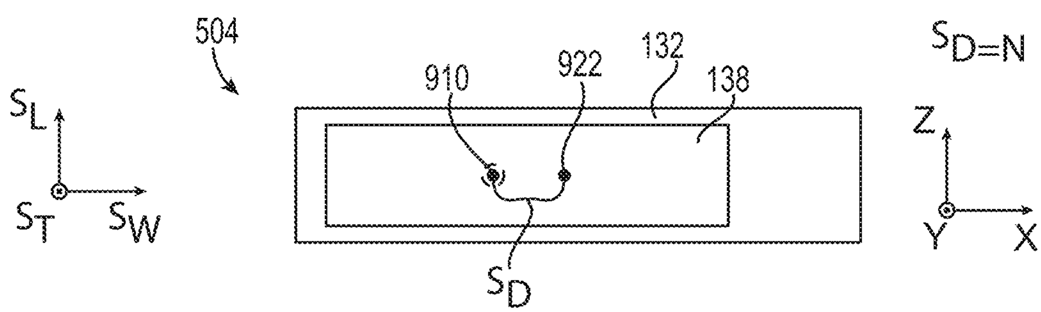

Referring to FIGS. 44A and 44B, a further illustration showing an embodiment of the centroid separation distance $S_D$ is depicted, with the centroids 910, 922 of negative electrode active material layer 132 and positive electrode active material layer 138 in a unit cell 504 being shown as superimposed on a surface of the positive electrode active material layer 138 (separators and current collectors are omitted from the figures for ease of illustration). In the embodiment shown in FIG. 44A, the geometric centers of the negative electrode active material layer 132 and positive electrode active material layer 138 in a unit cell 504 are more or less aligned in the unit cell 504, such that a separation distance Sp between the centroids is close to or even effectively zero. In the embodiment shown in FIG. 44B, the geometric centers of the layers in the unit cell 504 are slightly offset, such that the separation distance $S_D$ as measured between the centroids 910 and 920 of the layers 132, 138 has a non-zero value, due to a negative electrode active material layer 132 that has a geometric center of mass that is slightly offset in the X-direction from the geometric center of mass of the positive electrode active material layer 138, as shown in the figure. As discussed above, in certain embodiments, the layers 132, 138 in a unit cell 504 of the stacked population are aligned such that the separation distance between the respective centroids 910, 922 is within a predetermined limit. Maintaining the centroid alignment within the predetermined limit can provide for improved manufacture of the electrode assembly 106 with improved energy density, and even reduced incidence of shorting between negative electrodes and positive electrodes in the electrode assembly. Furthermore, by providing the centroid alignment within the predetermined limit, offsets between the edges of negative and positive electrode active material layers can be controlled, as is described further herein, which can be critical to provide improved current distribution in the electrode assembly. That is, as further described hereinbelow, maintaining the negative and positive electrode edge offsets in the Z and X directions can be critical to maximize the performance, energy density and safety of the electrode assembly.

Figure 38:
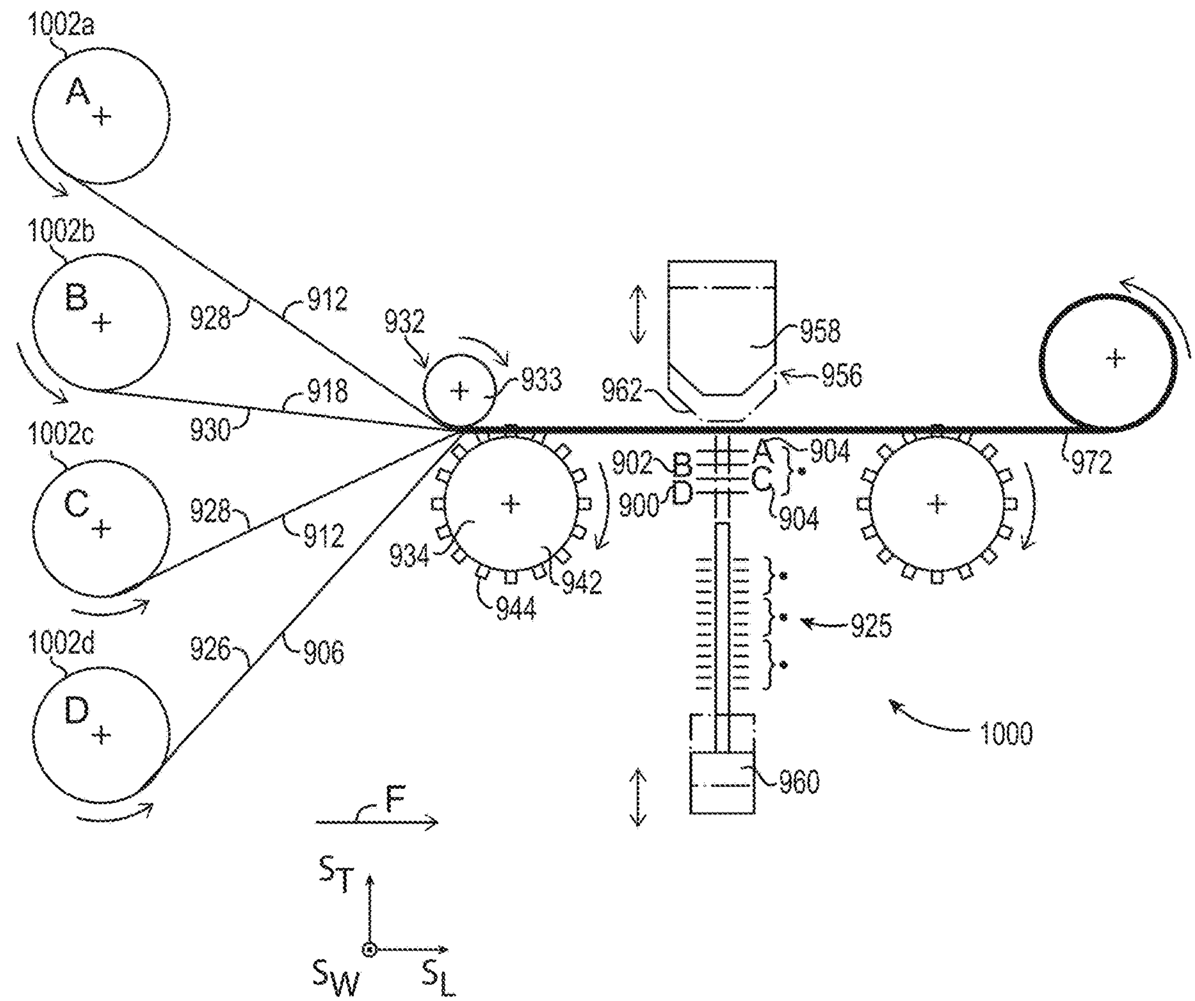
FIG. 38 illustrates a schematic of an embodiment of an electrode assembly manufacturing apparatus for aspects of a process for manufacturing an energy storage device.
Figure 39A:
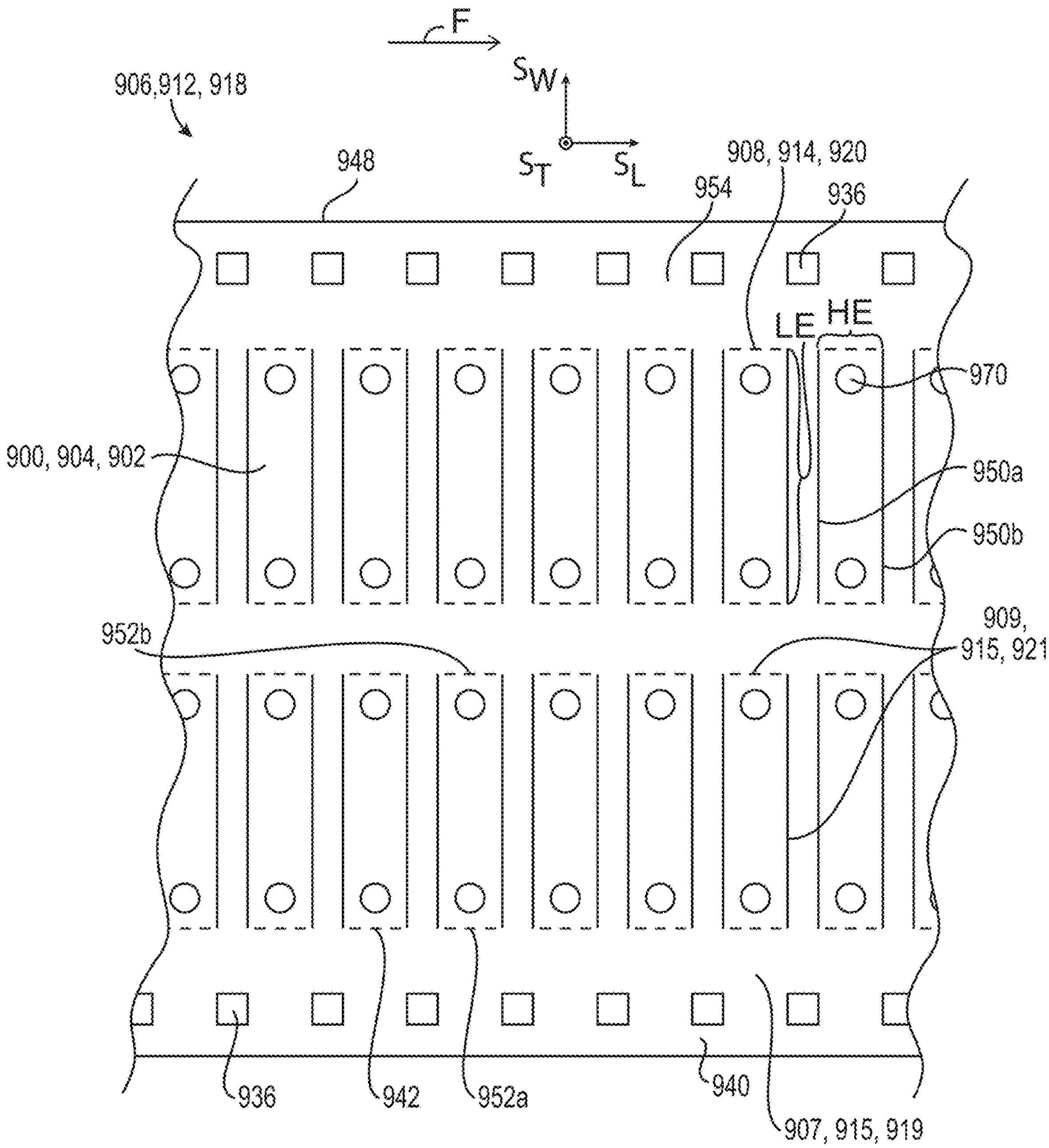
FIGS. 39A-39B illustrate embodiments of sheets having subunits therein for removal in a process for manufacturing an energy storage device.

Returning to FIG. 38, an embodiment of an electrode assembly manufacturing apparatus 1000 is shown, by which further embodiments of the method of manufacture are described. In one embodiment, as shown in FIG. 38, the apparatus 1000 comprises a plurality of rolls 1002*a-d* of continuous webs of electrode assembly components, such that the negative electrode sheet 906, separator sheet 912 and/or positive electrode sheet 918 may comprise a continuous web having the negative electrode, separator and/or positive electrode subunits formed therein. In one embodiment, a negative electrode sheet continuous web 926 is provided that has one or more negative electrode sheets 906 (e.g., as shown in FIG. 39A, B) each having the negative electrode subunits 900 formed therein. Furthermore, a separator sheet continuous web 928 can be provided that has one or more separator sheets 912 (e.g., as shown in FIG. 39A, B) each having the separator layer subunits 904 formed therein. Furthermore, a positive electrode continuous web 930 can be provided that has one or more positive electrode sheets 918 (e.g., as shown in FIG. 39A, B) each having the positive electrode subunits 902 formed therein. In further embodiments, as an alternative or in addition to continuous webs, one or a plurality of discrete sheets that are separated from each other, and that contain one or more subunits or other structures, may also be provided. Accordingly, processes and/or devices using the continuous webs described herein may also be performed and/or operated with individual and discrete sheets having the subunits formed therein, in certain embodiments. The continuous web can further comprise a plurality of each type of subunit (e.g., negative electrode, separator and positive electrode sheets) e.g., with each type separated from each other along a web feeding direction F, and/or the continuous web can comprise a single type of the subunit therein.

The continuous webs 930 and/or sheets may be patterned to provide the subunit structures therein, as is described in further detail herein. For example, the continuous webs may be patterned prior to forming the rolls of the continuous webs, or may be patterned as a part of the process as the webs are being fed from the rolls to the processing stations of the apparatus 1000. The continuous webs are patterned to form weakened regions therein, as described below. Methods of patterning the webs can include using laser energy or heat to form a pattern of weakened regions in the webs, by cutting the patterns into the webs, or by other methods that are capable of forming a region that is susceptible separation under certain predetermined conditions, as is discussed further herein. For example, the pattern may be formed by stamping, laser cutting, or other means of material removal.

In the embodiment as shown in FIG. 38, a plurality of continuous webs and/or sheets are fed in a feeding direction F from separate rolls 1002*a,b,c,d* comprising each of the continuous webs and/or sheets, to a merging station 932 where the webs are aligned and merged in a continuous fashion, prior to removal of the subunits from the sheets. For example, a negative electrode sheet continuous web 926, a positive electrode continuous web 930, and at least one separator continuous web 928 (in the embodiment shown in FIG. 38, two separator sheet continuous webs 928), each of which are separated from one another in a vertical direction in the embodiment as shown, are fed to a merging station 932 of the apparatus 1000, where the continuous webs are layered one on top of another to form a merged web stack and/or merged sheet stack of the continuous webs and/or sheets (4-layer merged web stack in the embodiment shown in FIG. 38). In the embodiment as shown, the roller 933 may cooperate with an opposing surface to merge the incoming sheets and/or webs on top of one another to form a merged stack and/or merged web. Furthermore, according to one aspect, the apparatus 1000 can comprise at least one registration station 935 with at least one registration device 934 that is provided to register and align the continuous webs and/or sheets with respect to one another before and/or after merging, for example by engagement and/or interaction with alignment features 936 formed in the continuous webs and/or sheets (see, e.g., FIG. 39). That is, the continuous webs can comprise alignment features 936 formed therein that can allow for alignment of each of the webs and/or sheets with respect to one another, such as by mechanical and/or optical alignment means.

Figure 39B:
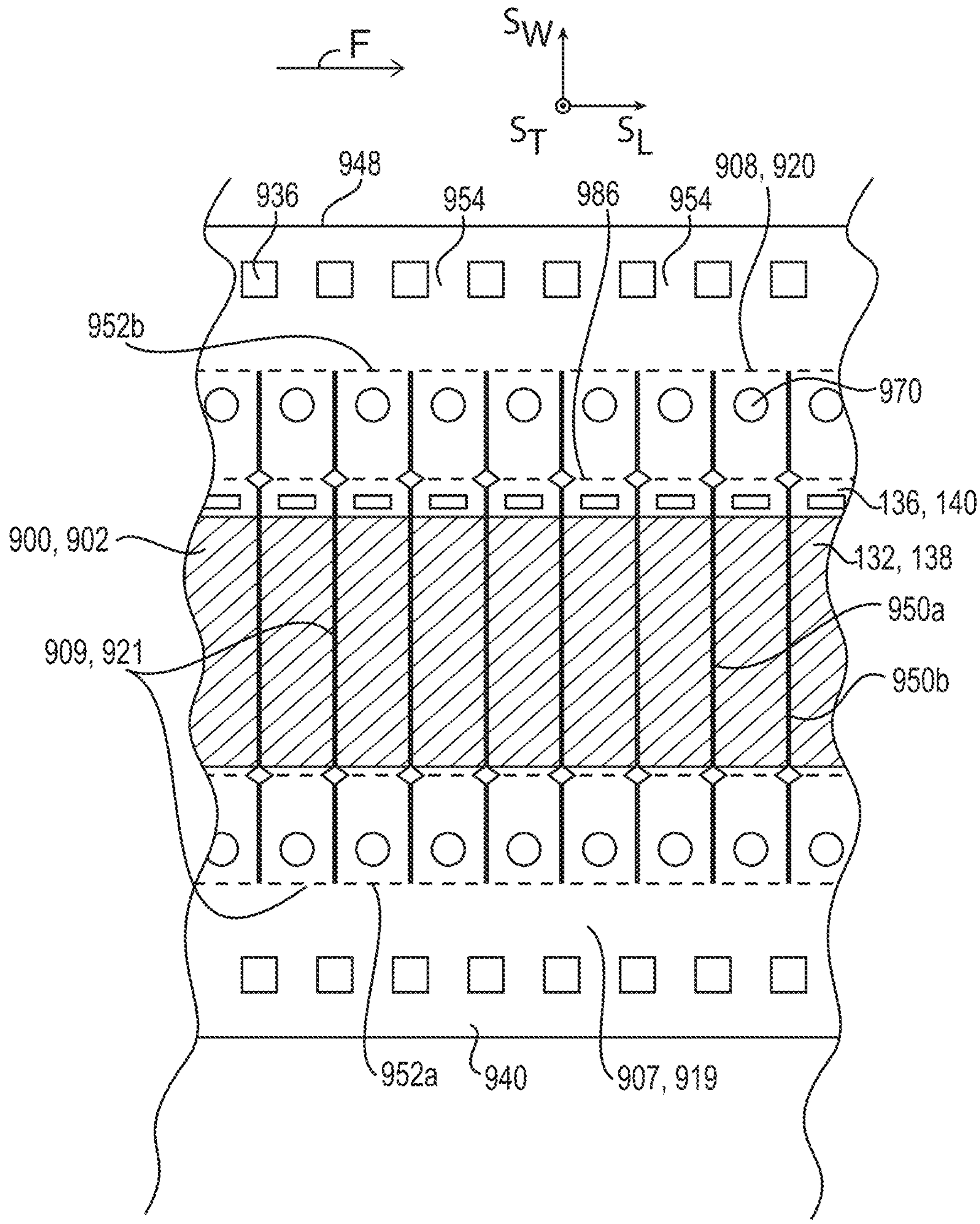

In the embodiment as shown in FIGS. 39A and 39B, the alignment features 936 comprise apertures 938 formed in the plurality of continuous webs and/or sheets, at predetermined positions, such as at positions corresponding to alignment of the subunits therein with subunits in the other webs. For example, the alignment features 936 can be formed so as to provide alignment of the individual negative electrode subunits, positive electrode subunits, and separator layer subunits in each of the layers of the merged web and/or stack. According to one aspect, the alignment features 938 can comprise a plurality of apertures 938 that extend through the thickness of at least one and even the entire stack of merged webs and/or sheets (e.g., in the web and/or sheet thickness $S_T$ dimension, as shown in FIGS. 39A and 39B, which is orthogonal to the web and/or sheet length dimension SL, and also orthogonal to the web and/or sheet width dimension $S_W$). The plurality of apertures may further be formed in a plurality of positions along the dimension SL, which may be along a direction of a web and/or sheet feeding direction F, to provide for continuous registration and/or alignment thereof as the web and/or sheet is fed in the feeding direction F (see, e.g., FIGS. 39A and 39B). The plurality of apertures 938 may further be formed in a peripheral region 940 and/or edge margin 907, 919, 913 of the webs and/or sheets that is outside an outer boundary 909, 915, 921 defining the subunits 900, 904, 902 formed in each web. Alternatively, according to certain aspects, the plurality of webs and/or sheets may be aligned without providing separate alignment features, such as by optically or mechanically detecting edges of the webs and/or sheets, such that the edges serve as integrated alignment features. In yet another embodiment, the subunit alignment features 970 that are at least partially within the boundaries of the subunits may be used for the web and/or sheet alignment (in addition to subunit alignment, discussed in more detail hereinbelow), without requiring separate alignment features 936. Furthermore, according to certain aspects, processing may proceed without a separate step of alignment of the continuous webs and/or sheets, such as for example where a roll comprising a single pre-merged sheet is provided for the manufacturing process, where webs and/or sheets of different types are processed individually, or where the process otherwise does not require alignment of the webs and/or sheets. According to certain embodiments, alignment of the apertures 938 in each web and/or sheet (e.g., negative electrode sheet continuous web 930, positive electrode sheet continuous web 930, and/or separator sheet continuous web 928) with respect to one another in the merged web and/or merged sheet, can thus provide for a predetermined positioning and alignment of the subunits in each web and/or sheet with respect to each other.

In the embodiment shown in FIG. 38, the apparatus 1000 comprises a registration device 934 including a mechanical sprocket wheel 942 with teeth 944 that are capable of engaging the apertures 938 in each web and/or sheet, as the webs and/or sheets are fed to the wheel from a feeding roller 933 at the merging station 932. Furthermore, in one embodiment, merging and registration may happen substantially simultaneously, such that alignment of the webs and/or sheets occurs as they are merged. In the embodiment as shown the webs and/or sheets are merged just before registering and/or alignment. In addition to the sprocket wheel with teeth to engage the apertures 938 as shown, alternatively and/or additionally, the registration device 943 can comprise a device that is capable of optically determining registration and/or alignment of the webs and/or sheets, such as by detecting optical features, and/or other mechanical alignment means other than that specifically shown can be provided, such as mechanical alignment with alignment features comprising protrusions, tabs, bumps, indentations, or other features in the web. Furthermore, while alignment of continuous webs is exemplified herein, the registration device and/or web alignment features may similarly be applied to alignment of individual sheets having the subunits therein, regardless of whether said sheets form a part of a continuous web, or comprise a plurality of separate sheets having the subunits formed therein. Additionally, while the embodiment of FIG. 38 depicts merging and alignment of 4 continuous webs with respect to each other, it is also possible to merge and align only two continuous webs, or 3 or even 5 or more continuous webs with one another, each of the webs comprising the subunits for forming the stacked population. In yet another embodiment, one or more of the continuous webs and/or sheets may optionally comprise a backing layer (not shown) that provides structural support for the continuous web and/or sheet, and which can be rolled out with the web and/or sheet and removed before a processing stage, such as before merging of the continuous webs and/or sheets.

Figure 47A:
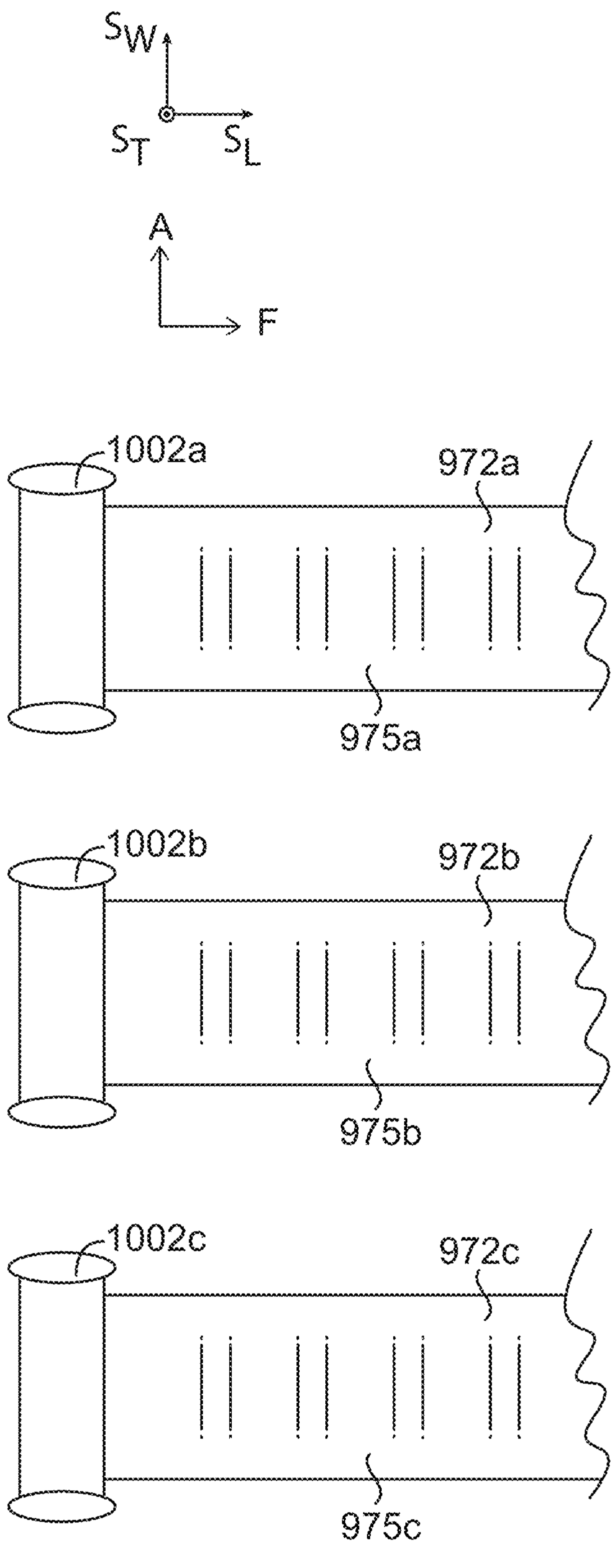
FIGS. 47A-47B illustrate embodiments of a plurality of feeding lines for feeding sheets of material for an aligning and/or stacking process of a manufacturing methods, according to aspects herein.
Figure 47B:
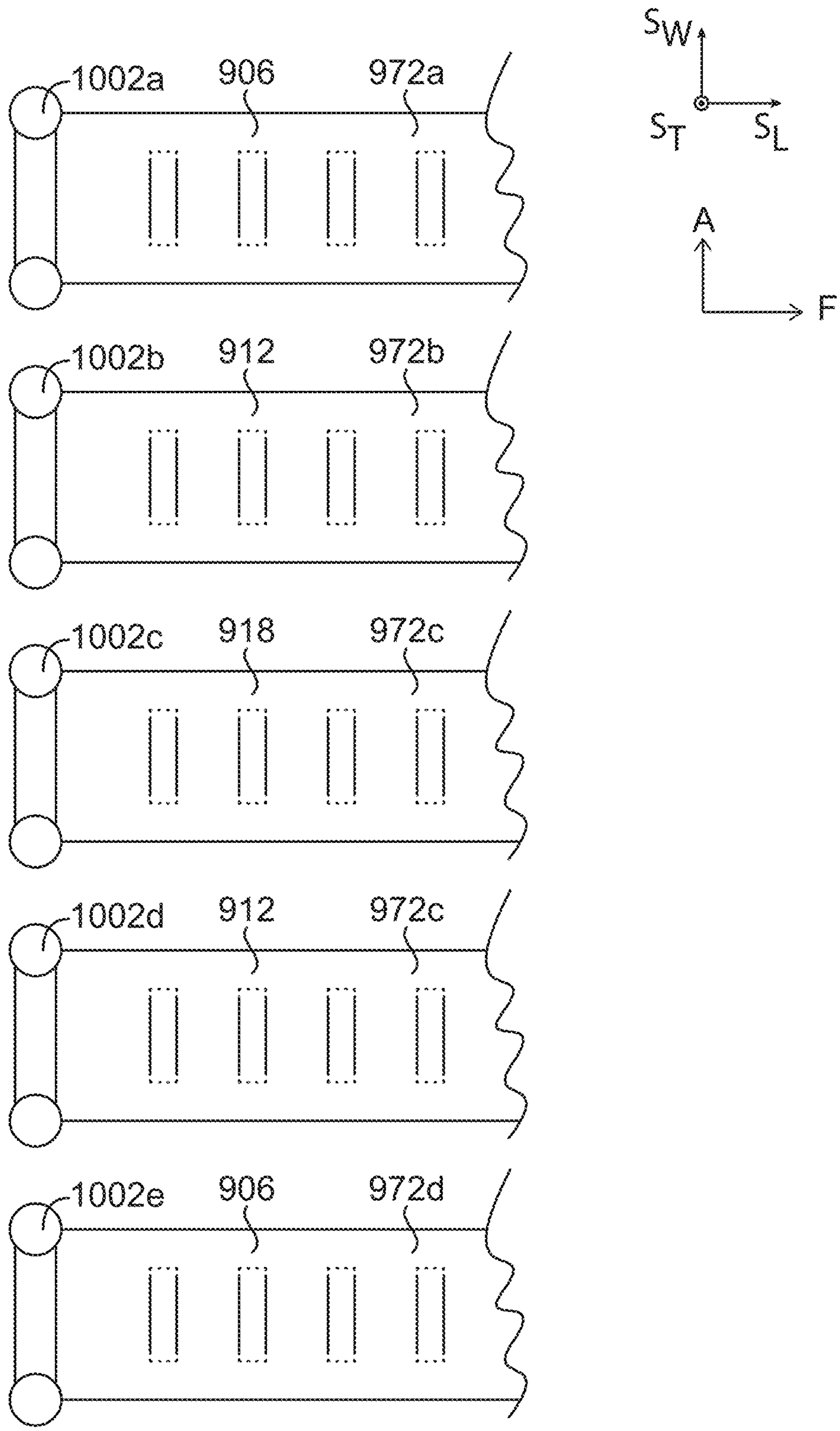

Furthermore, while only one merging station 932 and registration station 935 are shown for the apparatus 1000 as shown in FIG. 38, it may also be possible for the apparatus 1000 to comprise a plurality of feeding lines 972*a,b,c*, that each run a line of continuous webs for processing as shown in FIGS. 47A and 47B. For example, the apparatus may comprise an array of feeding lines along a direction A orthogonal to the feeding direction F, and which feed in the same feeding direction F, or in other embodiments the feeding lines may be set up along varying orientations with respect to each other. According to certain embodiments, for an apparatus 1000 having multiple feeding lines 972*a,b,c*, individual merging stations 932, registration stations 935, and other processing stations and devices described herein, may be provided for each feeding line, and/or shared between feeding lines (such as by advancing a device between feeding lines), to process the continuous webs and/or sheets being fed along the feeding lines.

In yet another embodiment, the apparatus 1000 and/or method may provide for sequential alignment and/or merging of the continuous webs and/or sheets, such as merging and/or alignment of a first set of continuous webs and/or sheets at a first merging and/or registration station, followed by merging and/or registration at a subsequent merging and/or registration station, such as in a same feeding line, or by moving between feeding lines. Also, the merging and registration of the webs and/or sheets can proceed simultaneously, and/or the continuous webs and/or sheets may be merged before alignment thereof, or some combination thereof. Even further, in one embodiment, the continuous webs and/or sheets may be individually fed from the rolls 1002 of the continuous webs and/or sheets, in the feeding direction F, for further processing, without merging the continuous webs and/or sheets with respect to one another, and/or without aligning the continuous webs and/or sheets with respect to one another. For example, in a case where the subunits 900, 902, 904 are to be removed individually from the continuous webs and/or sheets, to sequentially form the stacked population of unit cells 504, each continuous web and/or sheet containing the individual subunit (900, 902 and/or 904) may be fed in the feeding direction F for removal of the subunit therefrom, without pre-merging of the webs and/or sheets and/or pre-alignment 30 of the subunits therein. FIG. 47B shows an embodiment where separate continuous webs comprising negative electrode sheets 906, separator sheet 912 and positive electrode sheet 918 are fed separately along separate feeding lines 972*a,b,c*, in the feeding direction F with processing of the continuous webs being performed separately for each continuous web, and without merging of the webs.

Figure 41C:
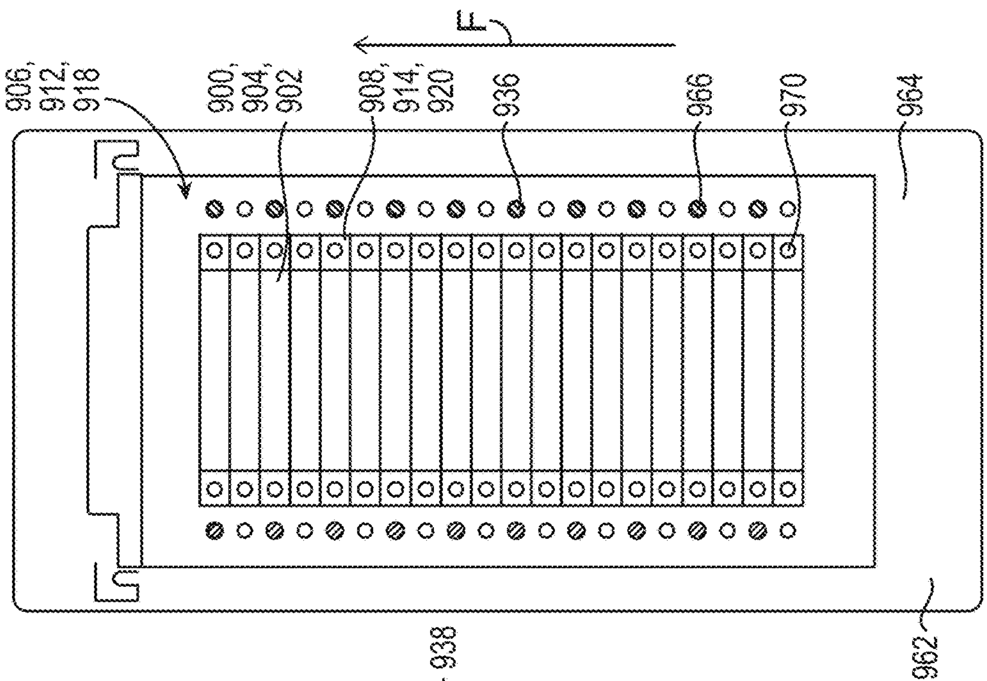
FIGS. 41A-41C illustrate top view of embodiments of an alignment plate and sheet positioned on the alignment plate, according to aspects herein.
Figure 41B:
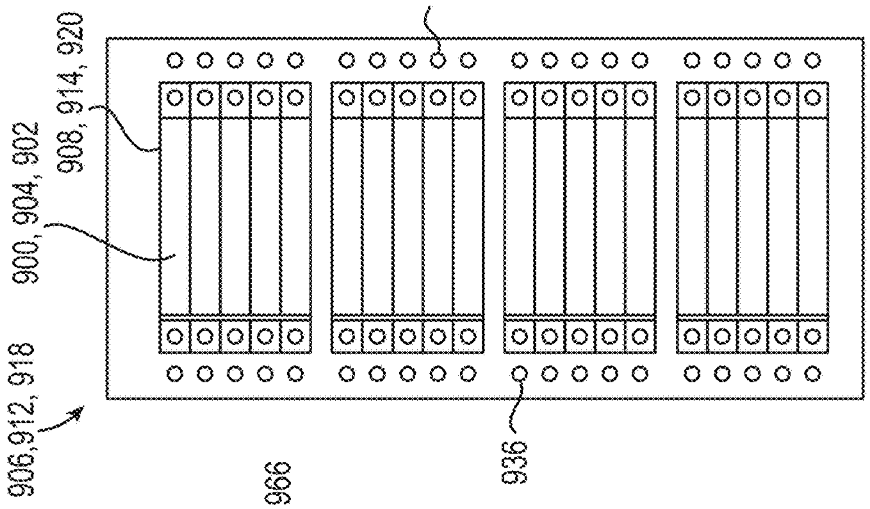

Referring to FIGS. 39A and 39B and 41B, the sheets 906, 912, 918 (which may form a part of the continuous webs described herein, or may be separate sheets), are described in further detail. Each of the negative electrode sheet 906, positive electrode sheet 918, and separator layer sheet 912 may have a similar configuration as shown in FIGS. 39A and 39B, with each sheet having a plurality of subunits 900, 902, 904 (negative electrode, positive electrode, and/or separator layer) formed therein. In one embodiment, each sheet comprises a same type of unit, i.e. the separator sheet comprises only separator layer subunits, the negative electrode sheet comprises only negative electrode subunits, and the positive electrode sheet comprises only positive electrode subunits. In another embodiment, each sheet can comprise two or more different types of subunits. In the embodiments shown in FIGS. 39A and 39B, the sheet comprises a plurality of such subunits formed along the dimension $S_L$ (i.e., length direction of the sheet), which also corresponds to the feeding direction F of the sheet (and/or continuous web). The sheet can also comprise a plurality of subunits formed in an orthogonal direction $S_W$ in a direction of the width of the sheet (and/or continuous web). In the embodiment shown, the sheet comprises two columns separated from each other in the $S_W$ direction, with each column having a plurality of subunits extending along the $S_L$ direction of the sheet (and/or web). Alternatively, only a single column, or more than two columns separated from one another in the $S_W$ direction can be provided. Further orientations and/or configurations of the subunits in the sheet can also be provided, such as different combinations of rows and columns of the subunits. In one aspect, as discussed above, the sheets 906, 912, 918 can also comprise web and/or sheet alignment features 936 that provide for alignment of the web and/or sheets with respect to one another. As discussed herein, the subunits may comprise a single layer of material, such as a single layer of separator material, or may comprise a multi-layer subunit. In yet another and/or alternative embodiment, the alignment features 936 may provide for alignment of the sheet and/or web in a predetermined position such that subunits can be removed from the sheets at the predetermined sheet position, as discussed in further detail below. That is, the alignment features 936 can allow for the alignment of subunits in a first sheet and/or web to be aligned with subunits in a second sheet and/or web, and/or the subunits in a plurality of further sheets and/or webs.

In the embodiment as shown in FIGS. 39A and 39B, the sheets (and/or continuous webs) comprise edge margins 907, 913, 919 and an outer edge perimeter 948 that extends about the outer boundary and/or edges of the sheet, and the least one weakened region 908, 914, 920 that is internal to the edge margins 907, 913, 919 (and thus also the outer sheet perimeter 948). The at least one weakened region at least partially defines boundaries 909, 915, 921 of the subunit 900, 404, 902 within the sheet, and in certain aspects may even entirely define the subunit. The at least one weakened region is a region of the sheet that has been weakened with respect to the rest of the sheet, such that the subunit having the boundary that is at least partially defined by the at least one weakened region can be removed therefrom, leaving a remaining portion of the sheet behind (e.g., the edge margins 907, 913, 919). That is, according to certain embodiments, the weakened region may be a region where release of the subunit from the sheet occurs upon application of electrical, mechanical or thermal energy. According to certain embodiments, the weakened region can comprise one or more of a region comprising perforations and/or cuts in the sheet, and/or a region where the material of the sheet has been thinned or indented with respect to other regions of the sheet, and/or a region comprising a thinner cross-section as compared to other regions of the sheet, and/or a region where the material of the sheet has in some other way been compromised, such that the weakened region gives way upon application of a removal force to the subunit and/or sheet, such as by applying a tensioning force to one or more parts of the sheet to tear the subunit away from the sheet. According to other embodiments, the weakened region may be constructed such that application of heat or electrical energy separates the subunit from the sheet. For example, the weakened region may be a separated region that is held together with a low-melting point adhesive, such that application of heat energy melts the adhesive and causes the subunit to separate from the sheet. The weakened region may also comprise a region having a thin cross-section in the $S_T$ dimension (thickness dimension), such that application of electrical energy to a subunit that is electrically conducting causes the subunit to separate from the sheet at the weakened region. According to certain embodiments, the sheet margin 954 adjacent the outer perimeter 948 may remain when the plurality of subunits have been removed from the sheet.

In the embodiment as shown in FIG. 39A, the boundaries of the subunits are at least partially defined by first and second weakened regions 952*a*, 952*b* comprising perforated regions extending in the $S_L$ direction on opposing sides of the subunits, and are further defined by weakened regions comprising separated regions 950*a*, 950*b* extending in the $S_W$ direction on opposing sides of the subunits, the separated regions 950, 950*b* being regions where portions of the subunits have been completely removed from the sheet, such as by cutting the subunits from the sheet, or other separation method. According to other aspects, the weakened regions may completely define the subunits, such as by completely surrounding a perimeter of the subunits. While at least a portion of the weakened region is internal to the edge margin of the sheet, in certain aspects at least a portion of the weakened region may extend to reach the outer perimeter 948, or alternatively the at least one weakened region defining the subunit may be entirely internal to the outer perimeter, meaning that no portion extends to the outer perimeter. Furthermore, while the weakened region is depicted in FIG. 39A as comprising straight lines in the $S_L$ and $S_W$ directions, the weakened region may also and/or alternatively comprise other shapes, as is discussed in further detail below. In FIG. 39B, the weakened regions 908, 920 are depicted for negative electrode and/or positive electrode subunits 900, 902. The weakened regions in this embodiment likewise comprise first and second weakened regions 952*a*, 952*b* comprising perforated regions extending in the $S_L$ direction on opposing sides of the subunits, and are further defined by weakened regions comprising separated regions 950*a*, 950*b* extending in the $S_W$ direction on opposing sides of the subunits, the separated regions 950, 950*b* being regions where a portion of the subunits have been completely removed from the sheet. FIG. 39B further shows an embodiment of a multi-layer positive or negative electrode subunit, with negative electrode active material 132, 138 forming a layer towards an interior region of the subunit, and current collector material forming a layer 136, 140 towards the ends of the subunit in the $S_W$ direction. That is, the current collector layers 136, 140 may be exposed at the ends of the subunit, while the active material layer covers the current collector layer in the interior region of the subunit. Furthermore, in the embodiment as shown in FIG. 39B, the sheet comprises weakened regions 908, 920 for separating the subunits from the sheet, and further comprises subunit weakened regions 986 that are internal to the subunits, and which are described in further detail below. Furthermore, while weakened regions 908, 920 are exemplified for the negative electrode and/or positive electrode subunits 900,902 in FIG. 39B, the separator subunit can also comprise such weakened regions as shown and described, and can further comprise weakened regions 986 that are internal to separator layer subunits, as described for the negative and/or positive electrode subunits. That is, the description herein of the weakened regions, whether at least partially defining or internal to the subunits, may be applicable to subunits in any of the negative electrode, positive electrode, and/or separator subunits.

According to embodiments herein, the negative electrode subunit 900 and positive electrode subunit 902 are processed form negative and positive electrodes of an electrode assembly 106 for an energy storage device, such as for example the electrode structure 110 and counter-electrode structure 112 of the electrode assembly 106, as described herein. Accordingly, the negative electrode subunit 900 and positive electrode subunit 902 may have dimensions and ratios of dimensions in $S_W$, $S_L$ and $S_T$, that are the same as and/or similar to those described for the electrode and counter-electrode structures 110, 112 in X, Y and Z, as shown for example in FIG. 2A. That is, the negative electrode subunit may have the same and/or similar width dimension $S_W$ as described herein for the length of the electrode structure 110 in the X direction, the same and/or similar dimension $S_L$ as described herein for the width of electrode structure 110 in the Y direction, and the same and/or similar dimension $S_T$ as described herein for the height of the electrode structure 110 in the Z direction. Similarly, the positive electrode subunit may have the same and/or similar width dimension $S_W$ as described herein for the length of the counter-electrode structure 112 in the X direction, the same and/or similar dimension $S_L$ as described herein for the width of the counter-electrode structure 112 in the Y direction, and the same and/or similar dimension $S_T$ as described herein for the height of the counter-electrode structure 112 in the Z direction. The dimensions of the negative electrode active material layer and/or the positive electrode active material layer in the subunits in the dimensions $S_T$, $S_W$ and $S_L$ may also be the same and/or similar to those of the electrode active material layer and/or the counter-electrode active material layer in the electrode assembly 106 in Z, X and Y dimensions. Furthermore, the ratios of the $S_T$, $S_W$ and $S_L$ dimensions of the negative electrode subunits with respect to one another may be the same and/or similar to the ratios of the electrode length $L_E$, height $H_E$ and width $W_E$ with respect to each other, and/or the ratios of the $S_T$, $S_W$ and $S_L$ dimensions of the positive electrode subunits with respect to one another may be the same and/or similar to the ratios of the counter-electrode length $L_{CE}$, height $H_{CE}$ and width $W_{CE}$ with respect to each other, as is described further herein, and the relative ratios of the dimensions of the negative electrode active material layer and positive electrode active material layer may also be similar to and/or the same as the relative ratios of the dimensions of the electrode and counter-electrode active material layers, respectively.

Referring again to FIG. 38, in one embodiment the apparatus 1000 comprises a subunit removal station 956 that is capable of removing the subunits from the sheets, or removing a plurality of subunits from a plurality of stacked sheets (or stacked continuous webs). As shown in the embodiment shown in FIG. 38, the sheets can be fed in the F direction from the layering station 932 and/or alignment device 934 to the removal station 956. In the embodiment as shown, the removal station 956 comprises a punch head 958 that is capable of exerting a force on the subunits in the direction ST that is orthogonal to both the length direction $S_L$ and width direction $S_W$ of the sheet and/or web, such that at least one subunit is removed from the sheet. Other methods of removing the subunits may also be provided, such as by pulling the subunits away from the sheets and/or webs, and/or by pushing the subunits in the opposing direction along ST, or by using other means of separating the subunits from the sheets at the weakened regions. In one embodiment, the removal station 956 may be capable of removing only one subunit each time a force is exerted (e.g., the punch head 958 may be capable of punching out a single subunit at a time), or alternatively the removal station may be capable of simultaneously removing a plurality of subunits spaced apart along $S_W$ and/or $S_L$ each time a force is exerted (e.g., the punch head 958 may be capable of punching out a plurality of subunits at a time). As discussed above, the sheet may comprise a part of a merged stack of such sheets, and/or merged continuous webs, such as a stack comprising a negative electrode sheet, positive electrode sheet and/or separator sheet 912, 906, 918, in which case the removal station 956 may be capable of removing a plurality of subunits in the stack, such as the negative electrode subunits 900, the positive electrode subunits 902, and/or the separator layer subunits 904. For example, as shown in FIG. 38, the continuous webs comprising the negative electrode sheet 906, positive-electrode sheet 918, and two alternating separator sheets 912, are fed into the removal station 956, such that the subunits in each sheet can be simultaneously removed. That is, the removal station 956 may simultaneously remove from the merged sheets and/or webs, a stacked population 925 comprising the multi-layer negative electrode subunits 900, the multi-layer positive electrode subunits 902, and the two separator layer subunits 904, as shown in FIG. 38. In another embodiment, the removal station 956 removes one or more subunits at a time from just a single sheet of a first type (e.g., negative electrode sheet), followed by removal of one or more subunits at a time from a subsequent sheet of a second type (e.g., positive electrode sheet), to provide for sequential subunit removal. Other sequences of subunit removal from the sheets may also be possible. The sheet margins and/or other portions of the sheet remaining after removal of the subunits may be fed along the feeding line 972 as advanced by post-removal advancing sprocket 996, optionally with teeth configured to engage the alignment features remaining in the sheets following removal of the subunits, and/or with an end of line roller 997.

Furthermore, while the embodiment of FIG. 38 depicts advancement of the continuous web or sheet in the feeding direction F, in yet another embodiment, the continuous web and/or sheet feeding direction may also be reversed, and/or the web and/or sheet may be advanced in alternating directions, so as to allow for removal of predetermined subunits from the sheet. According to one embodiment, the web and or sheet is advanced to the removal station 956 a sufficient distance to allow for the removal of a predetermined number of subunits at the removal station and at a feeding position corresponding to the position of the removal station 956, without further advancing of the web and/or sheet, such as 1, 2, 3, 4, 5, 8 and/or 10 subunits, after which the web and/or sheet is advanced sufficiently far to allow for a subsequent predetermined number of subunits to be removed. The predetermined number of subunits may be removed simultaneously or sequentially, or some combination thereof, while the web and/or sheet is maintained in position at the removal station. Alternatively, the web and/or sheet may be continuously advanced through the removal station at a rate that allows for removal of the subunits from the moving web and/or sheet. According to yet another embodiment, the punching head or other removal device may alternate between feeding lines as shown for example in FIGS. 47A and 47B, to provide for the sequential removal of subunits from different feeding lines 972*a, b,c*, and/or may advance in a direction forwards or backwards along a single feeding line to remove subunits that are along the feeding direction of the line.

Figure 41A:
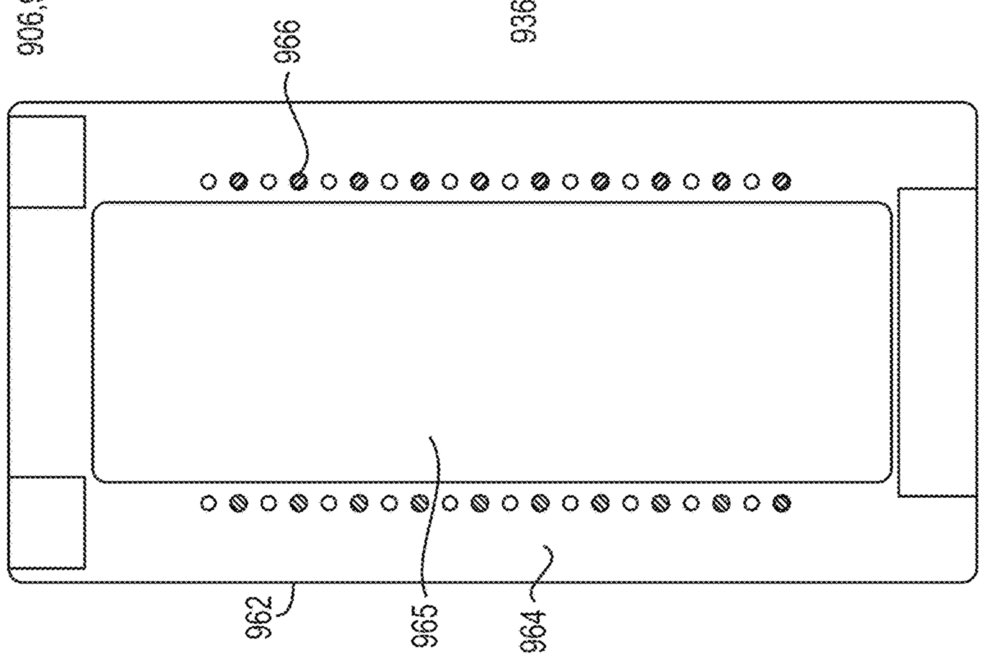

Referring to FIGS. 41A-41C, in one embodiment, the apparatus 1000 comprises a removal alignment station 962 where the one or more sheets and/or webs can be aligned for removal of the subunits therefrom by the removal station 956, such as for example by punch-out of the subunits from their respective sheets. In the embodiment shown in FIG. 41A, the removal alignment station 962 comprises a plate 964 having a central opening 965 that is sized to allow the subunits to pass therethrough upon removal of the subunits from the sheets. The plate 964 further provides one or more registration features 966 to align the one or more sheets over the plate and provide proper alignment therefor prior to removal of the one or more subunits, such as alignment of the subunits and/or sheets and/or webs with respect to the punching head 958 or other removal device. In the embodiment as shown in FIGS. 41A and 41C, the registration features 966 comprise a plurality of registration teeth that are capable of engaging the one or more alignment features 936 formed in the sheets and/or webs, and/or may also be capable of advancing the sheets and/or webs either forward in the feeding direction F or backwards. The alignment features 936 formed in the sheets may be the same as those used by the registration device 934 upstream of the pre-removal alignment station 962, such as for example the apertures 938, and/or the alignment features may comprise features other than those used by the registration device 934. Also, as described with respect to the registration device 934, according to certain aspects, it may be possible to align without providing any alignment features on the sheet, and/or the subunit alignment features 970 that are formed in the subunits may serve as alignment features. Furthermore, in certain embodiment, the sheets and/or webs may comprise a single set of alignment features 936 and/or may comprise two or more sets of alignment features, to provide alignment and one or more stations via different alignment mechanisms. In yet another embodiment, the removal alignment station 962 may comprise an alignment device, such as plate 964 as shown in FIG. 41A, that aligns one or more of the sheets and/or continuous webs with respect to one another using mechanical or non-mechanical means. As for the alignment device, the removal alignment station 962 may be capable of aligning the sheets in one or more of the $S_W$ and $S_L$ direction with respect to the removal station 956, and/or with respect to one another, so that the sheets are properly aligned for removal of the subunits therefrom.

In the embodiment as shown in FIG. 41C, the one or more sheets having alignment features 936 comprising apertures 938, as shown in FIG. 41B, is fed onto the plate 964 with the registration features 966 engaging the apertures 938 to provide proper alignment of the one or more sheets on the plate. One or more of the subunits can then be removed from the one or more sheets by exerting a force on the one or more subunits such that the at least one weakened region in each subunit in each sheet gives way, and the one or more subunits pass through the opening 965, leaving the sheet margins remaining as retained by the plate and registration features 966. The removal alignment station 962 may operate with the removal station 956 to substantially provide alignment of the sheets and/or webs at the proper positioning for removal of the subunits via the removal station 956, for example by aligning for removal immediately before removal is executed, or even substantially simultaneously with removal of the subunits. In certain embodiments where the removal station 956 advances in a direction along the feeding line, or moves to separate feeding lines, the removal alignment station 962 may even move in concert with the removal station to provide alignment of the sheets for the removal of the subunits.

In one embodiment, a plurality of removal stations 956 and/or removal alignment stations 962 are provided, for example to remove a plurality of subunits from one or more sheets in a same sheet feeding line 972 along the feeding direction F of the sheets (e.g., as in FIG. 38), or to remove a plurality of subunits from a plurality of sheets in separate sheet feeding lines 972*a,b,c*, such as an array of sheet feeding lines in a direction A that is orthogonal to F (e.g., as shown in FIGS. 47A and 47B). In yet another embodiment, the removal station 965 may be capable of moving to a plurality of different positions in the feeding direction F, and/or in other directions or positions co-located with separate feeding lines, to remove multiple subunits in a same sheet feeding line or in adjacent sheet feeding lines. Alternatively, the sheet feeding lines may themselves be re-positioned to process different sheets, or individual sheets may be fed to different removal 965 and/or alignment stations 962 in the feeding direction F, as well as on other feeding lines. In the embodiment as shown in FIG. 38, a single removal station 956 is provided that is capable of simultaneously removing two subunits and/or subunit stacks (in the case of a merged sheet) from a sheet, the subunits being separated from one another in the $S_W$ direction as shown in FIG. 39. Following removal of the subunits, the sheet is advanced in the $S_L$ direction (feeding direction F), to allow for removal of the next set of subunits and/or subunit stacks in the $S_W$ direction, and the process is iterated. In the embodiment as shown, the subunits that are removed in a single removal execution at the removal station 956 can include a subunit stack comprising a negative electrode subunit, two separator layer subunits, and a positive electrode subunit, removed from a merged sheet comprising a negative electrode sheet, two separator layer sheets, and a positive electrode sheet, although other configurations of subunits can also be removed. The removal process can be repeated with further subunits from the sheets, until a stacked population 925 having a predetermined number of unit cells 504 is achieved.

Referring again to FIG. 38, the apparatus 1000 further comprises a receiving unit 960 that is configured to receive subunits removed from the sheets, to form the stacked population 925 of unit cells 504. In one embodiment, the receiving unit 960 is configured to engage with one or more stacking alignment features 970 formed in the subunits to provide a stacked population having an alignment of at least a portion of the unit cells in the stacked population, such as an alignment of centroids of negative electrode subunits and/or active material layers and positive electrodes subunits and/or active material layers in the unit cells 504, as described above. Referring to FIGS. 39A and B and FIG. 41, the stacking alignment features 970 may be formed internally to the sheet and/or web alignment features 936, such that the alignment features are retained by the subunits even after removal of the subunits from the sheets and/or web. The stacking alignment features 970 may also be at least partially and even entirely within the boundary of the subunits 900, 902, 904. In certain embodiments, the stacking alignment features 970 can comprise holes or apertures formed through a thickness of at least a portion of the subunit $S_T$, and may even extend through all of the layers in a merged stack in the thickness direction. Further description of the stacking alignment features 970 is described below. The receiving unit 960 may be capable of receiving the subunits separated from the sheets and/or webs by the removal station 956, such as subunits separated from the sheets and/or webs by the punching head 958 above the pre-removal alignment station. In the embodiments as shown in FIGS. 40A-40C and 41D, the receiving unit 960 comprises one or more alignment pins 977 extending from a base 961, that are configured to engage with the stacking alignment features 970, to allow for stacking of the subunits removed at the removal station 956. That is, in certain embodiments, the alignment pins 977 may be spaced apart from each other a distance that corresponds to the distance in $S_W$ between the stacking alignment features 970 in the subunits. A length of the alignment pins may be selected to allow for the stacking of multiple subunits to form a stacked population 925 having a predetermined number of unit cells. A dimension of the alignment pins in the SW and $S_L$ directions may also be selected to accommodate the features 970, such as a dimension that is slightly smaller or roughly the same size as the features. Further description of alignment pin shapes and sizes, and complementary features 970, is provided below.

Figure 40A:
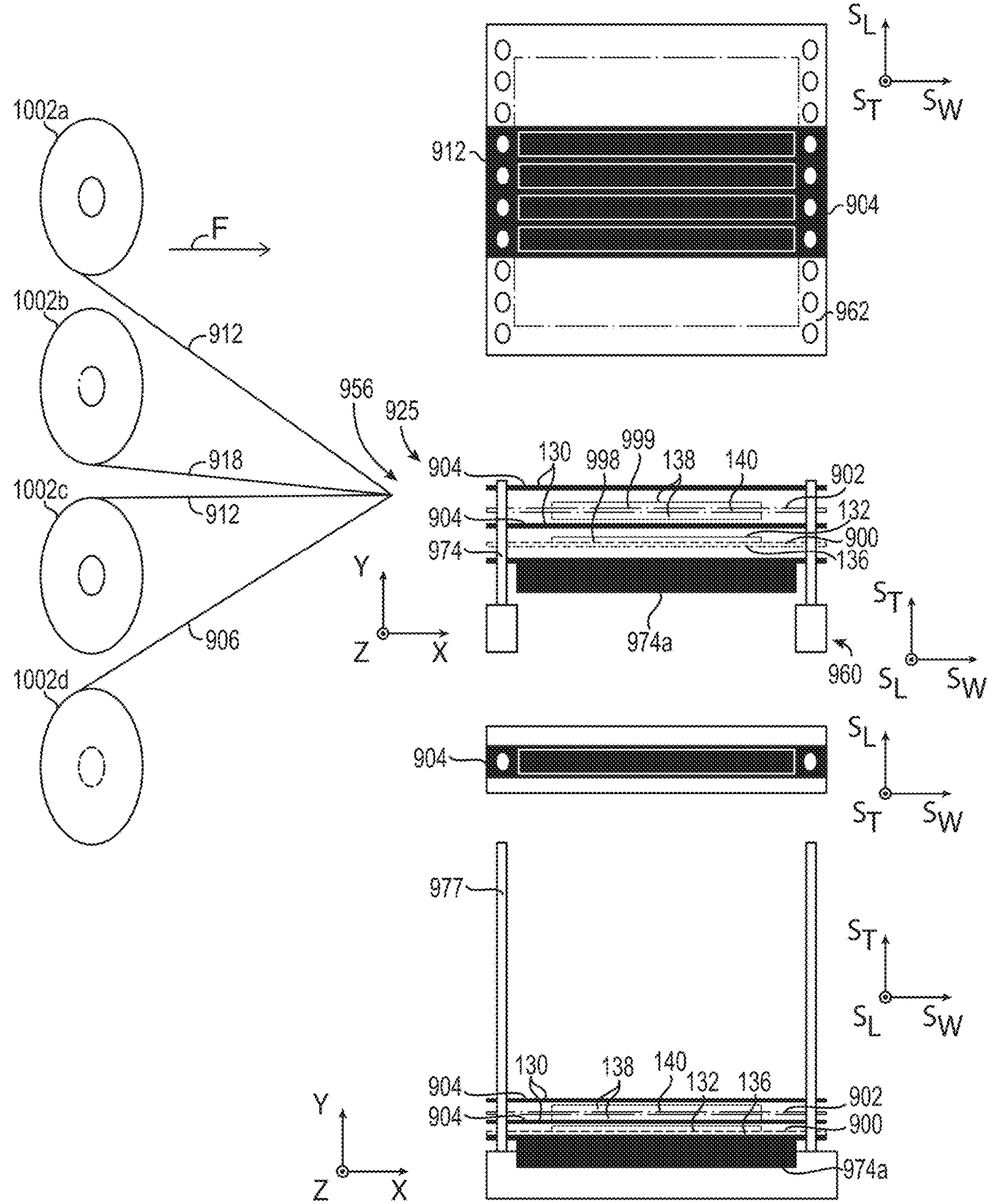
FIGS. 40A-40C illustrate embodiments of processes for stacking negative electrode subunits, positive electrode subunits, and separator subunits in an embodiment of a method of manufacturing of an energy storage device.
Figure 40B:
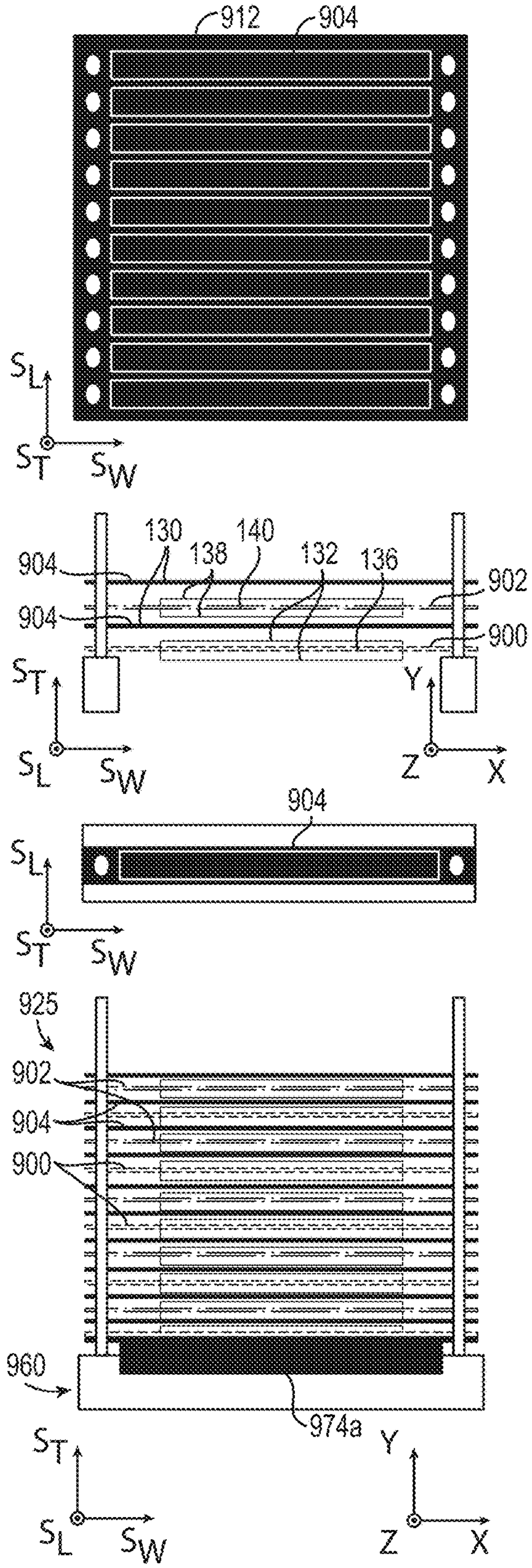
Figure 40C:
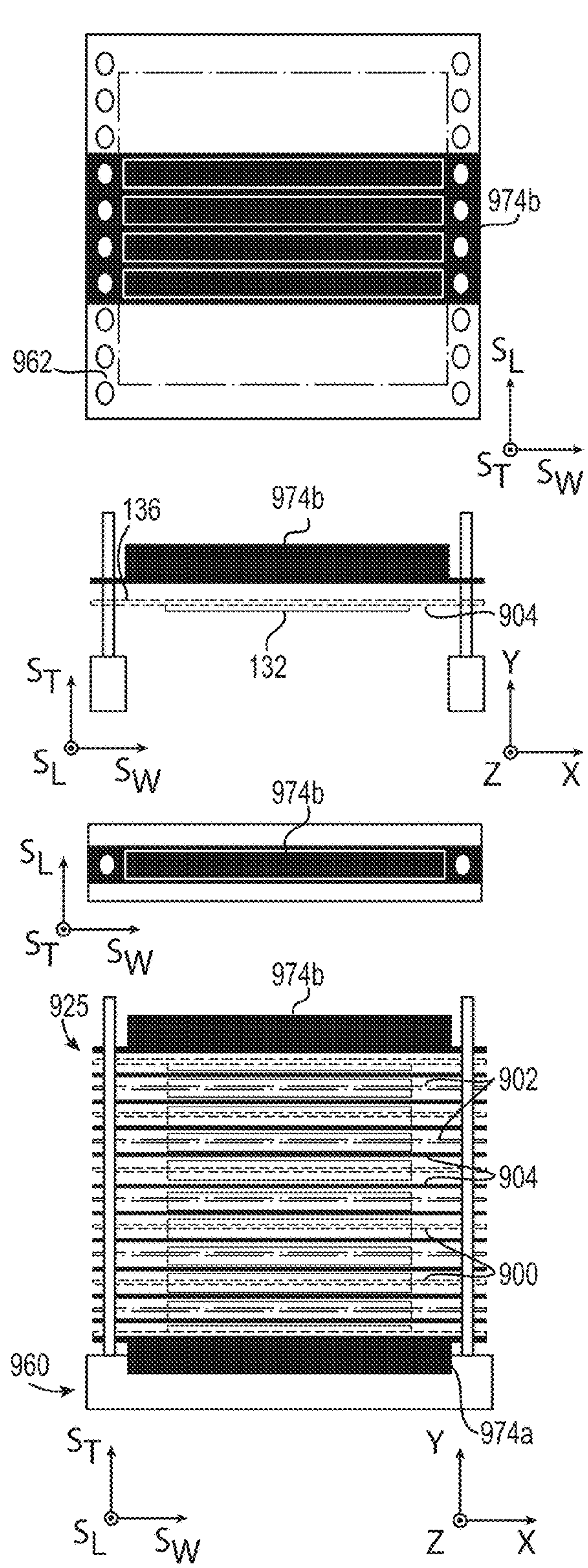

Referring to FIGS. 40A-40C, an embodiment of a subunit removal and stacking process is described. In FIG. 40A, a plurality of continuous webs 912, 918 and 906 can be fed to the removal station 956, where subunits can be removed from the webs. In an embodiment of a first removal and stacking iteration, the subunits that are removed and formed into the stack include, in a stacking direction Y starting from a first end of the stack, a first end plate 974*a*, a negative electrode subunit 900 comprising a single layer of negative electrode material 132 on a side of a negative electrode current collector 136 that is opposite a side of the negative electrode current collector facing the first end plate 974*a*, a separator layer subunit 904, a positive electrode subunit 918 having positive electrode active material layers 138 on opposing sides of a positive electrode current collector 140, and a subsequent separator layer subunit 904. The first removal and stacking iteration thus starts a first end of the stack with the end plate 974*a*, a negative electrode subunit 900 having only one layer of negative electrode active material on a side of the subunit facing the rest of the stack, and positive electrode subunit 918 and separator layer subunits 904.

In one embodiment, the first end plate 974*a* is a part of a continuous web having end plate subunits therein, which is merged with a continuous web comprising the negative electrode subunit 900 with the single layer of negative electrode active material, a continuous web comprising the separator layer subunit 94, and a continuous web comprising the positive electrode subunit 918. The first end plate 974*a* subunits, the negative electrode subunits 900 with the single electrode active material layer, the separator layer subunits 904, and positive electrode subunits 918 are aligned with each other within the merged web, to provide for a stack of the subunits upon removal of the subunits at the removal station 956. For example as shown in FIG. 47A, in one embodiment a first feeding line 972 can comprise a line on which a first merged web 975*a* and/or merged sheets are fed in the feeding direction F to the removal station 956. The first merged web 975*a* and/or merged sheets can comprise the subunits for the first removal and stacking iteration, such as the first end plate subunits 974*a*, and the negative and positive electrode subunits and separator layer subunits. Alternatively, the first end plate 974*a* can be stacked on the receiving unit 960 separately from the other subunits. In the embodiment as shown in FIG. 47A, the first merged web 975*a* has been pre-merged into a first roll 1002*a*, which feeds the merged web into the first feeding line 972. Alternatively, the first merged web 975*a* can be formed by merging separate continuous webs and/or sheets each corresponding to the separate subunits, such as from separate rolls, to a merging station 932, as shown for example in FIG. 38, after which the subunits can be removed from the merged web and stacked in the first removal and stacking operation. Furthermore, in the embodiment as shown in FIG. 47A, second and third feeding lines 972*a,b,c* can also be provided to feed merged layers for subsequent removal and stacking iterations, as described in further detail below. The first, second, and third feeding lines 972*a,b,c* in FIG. 47A may form an array of feeding lines that are separated from one another in a direction A (array direction), such as a direction that is orthogonal to the feeding direction F.

In yet another embodiment, the subunits making up the first iteration in the stacked population may be provided from separate continuous webs and/or sheets on a plurality of different feed lines, as shown in FIG. 47B. For example, separate feed lines 972*a*-972*e* may be arranged in a direction orthogonal to the feeding direction F, such as in an array direction A. Each of the feed lines may comprise a separate continuous web with a type of subunit, such as for example a negative electrode sheet 906, separator sheet 912 and/or positive electrode sheet 918. In the case where the first iteration of the subunit stack is being formed, each feedline can comprise, for example, a sheet comprising the first base plates, a sheet comprising the negative electrode subunits with just a single layer of negative electrode active material, and separator sheets 912. The receiving unit 960 can move in the array direction A to the different feedlines to provide for stacking of subunits from each of the sheets.

Furthermore, in alternative embodiments, the first removal and stacking iteration can comprise removal and stacking of different subunits other than those specifically exemplified (such as a positive electrode subunit having only a single positive electrode active material layer in place of the negative electrode subunit having the single layer of negative electrode active material layer), and including negative and positive electrode subunits and separator layer subunits without an end plate, only one or two of the subunits, and/or only a single separator layer subunit. According to certain aspects, the first iteration is performed to provide any subunits and/or structures on which the remaining stacked population can be built. Also, while the first removal and stacking iteration can be performed before further removal and stacking operations, alternatively the removal and stacking iteration shown in FIG. 40A can be performed at a subsequent stage, such as after a stacked population of predetermined subunits has be formed, as a final removal and stacking operation. The top right-hand side figure of FIG. 40A depicts the sheet having subunits for removal as viewed from a direction $S_T$ of the sheet, the second figure from the top on the right hand side of FIG. 40A and the bottom figure from the top on the right hand side of FIG. 40A depict the stacked population 925 after the first iteration as viewed from a direction $S_L$ of the sheets, which corresponds to a direction Z of the electrode assembly 106 as described herein, and the figure third from the top on the right hand side of FIG. 40A depicts a view of the stacked population as viewed from a direction $S_T$ of the sheet.

An embodiment of a subsequent removal and stacking iteration is shown in FIG. 40B. In this embodiment, the subunits that are removed and formed into the stack include, in a stacking direction Y starting from a first end of the stack where the first end plate 974*a* is located, a negative electrode subunit 900 comprising two layers of negative electrode material 132, one on each of opposing sides of a negative electrode current collector 136, a separator layer subunit 904, a positive electrode subunit 918 having two positive electrode active material layers 138, one on each of opposing sides of a positive electrode current collector 140, and a subsequent separator layer subunit 904. The subsequent removal and stacking iteration thus adds on to the subunits removed and stacked in the first removal and stacking iteration, as shown in the bottom of FIG. 40B. Furthermore, the subsequent removal and stacking iteration can be repeatedly performed a predetermined number of times, to achieve a predetermined number of unit cells 504 in the stacked population 925.

Similarly to the first iteration described above, in the subsequent removal and stacking iteration (e.g., the primary stacking process) a merged web can be provided that is formed from a continuous web comprising the negative electrode subunit 900 with both layers of negative electrode active material on the opposing sides of the negative electrode current collector, two continuous webs comprising the separator layer subunits 904, and a continuous web comprising the positive electrode subunit 918 with positive electrode active material layers on opposing sides of the positive electrode current collector. The negative electrode subunits 900, the separator layer subunits 904, and the positive electrode subunits 918 are aligned with each other within the merged web, to provide for a stack of the subunits upon removal of the subunits at the removal station 956. For example as shown in FIG. 47A, in one embodiment a second feeding line 972*b* can comprise a line on which a second merged web 975*b* and/or merged sheets are fed in the feeding direction F to the removal station 956. The second merged web 975*b* and/or merged sheets can comprise the subunits for the subsequent removal and stacking iteration, such as the negative and positive electrode subunits and separator layer subunits. In the embodiment as shown in FIG. 47A, the second merged web 975*b* has been pre-merged into a second roll 1002*b*, which feeds the merged web into the second feeding line 972*b*. Alternatively, the second merged web 975*b* can be formed by merging separate continuous webs and/or sheets each corresponding to the separate subunits, such as from separate rolls, to a merging station 932, as shown for example in FIG. 38, after which the subunits can be removed from the merged web and stacked in the primary removal and stacking operation. Referring to FIG. 47A, in one embodiment the receiving unit 960 and/or removal station 956 may be capable of moving in an array direction A between the first and second feeding lines to provide for the first iteration of removal and stacking at the first feed line, followed by the second iteration of removal and stacking at the second feed line.

In yet another embodiment, the subunits making up the subsequent iteration (the primary stacking process) to form the stacked population may be provided from separate continuous webs and/or sheets on a plurality of different feed lines, as shown in FIG. 47B. For example, separate feed lines 972*a*-972*e* may be arranged in a direction orthogonal to the feeding direction F, such as in an array direction A. Each of the feed lines may comprise a separate continuous web with a type of subunit, such as for example a negative electrode sheet 906, separator sheet 912 and/or positive electrode sheet 918. In the case where the subsequent iteration of the removal and stacking process is performed, each feedline can comprise, for example, a sheet comprising the negative electrode subunits with layers of negative electrode active material on opposing sides of a negative electrode current collector, a sheet comprising the positive electrode subunits with layers of positive electrode active material on opposing sides of a positive electrode current collector, and sheets comprising separator layer subunits. The receiving unit 960 can move in the array direction A between the separate feed lines 972*a*-972*e* to form the stacked population from the subunits in each sheet.

Furthermore, in alternative embodiments, the subsequent removal and stacking iteration can comprise removal and stacking of different subunits other than those specifically exemplified. Also, while the subsequent removal and stacking iteration can be performed before after the initial removal and stacking iteration, alternatively the removal and stacking iteration shown in FIG. 40B can be performed first, with the subsequent processes being performed to provide end plates and/or otherwise complete the electrode assembly 106. The top figure of FIG. 40B depicts the sheet having subunits for removal as viewed from a direction $S_T$ of the sheet, the second figure from the top and the bottom figure of FIG. 40B depict the stacked population 925 after a subsequent iteration following the first iteration, as viewed from a direction $S_L$ of the sheets, which corresponds to a direction Z of the electrode assembly 106 as described herein, and the figure third from the top side of FIG. 40B depicts a view of the stacked population as viewed from a direction $S_T$ of the sheet. In the second figure from the top in FIG. 40B, and embodiment of the stacked subunits for just a single subsequent iteration are shown, and in this embodiment comprises just 4 subunits. In the bottom figure of FIG. 40B, an embodiment of a stacked population having several subsequent stacking iterations is shown.

FIG. 40C depicts an embodiment of a final removal and stacking iteration. In the embodiment as shown, the subunits that are removed and formed into the stack include, in a stacking direction Y starting from the first end of the stack and the first end plate 974*a*, a negative electrode subunit 900 and a second end plate 974*b*, wherein the negative electrode subunit comprises a single electrode active material layer 134 on a side of a negative electrode current collector 136 that is opposite a side of the negative electrode current collector facing the second end plate 974*b*. The final removal and stacking iteration may thus complete the stacked population 925 by providing the second end plate 974*b* at the second end of the stack opposing the end with the first end plate 974*a*.

In one embodiment, the second end plate 974*b* is a part of a continuous web having end plate subunits therein, which is merged with a continuous web comprising the negative electrode subunit 900 with the single layer of negative electrode active material. The second end plate 974*b* subunits, and the negative electrode subunits 900 with the single electrode active material layer, are aligned with each other within the merged web, to provide for a stack of the subunits upon removal of the subunits at the removal station 956. For example as shown in FIG. 47A, in one embodiment a third feeding line 972*c* can comprise a line on which a third merged web 975*c* and/or merged sheets are fed in the feeding direction F to the removal station 956. The third merged web 975*c* and/or merged sheets can comprise the subunits for the final removal and stacking iteration, such as the second end plate subunits 974*b*, and the negative electrode subunits. Alternatively, the second end plate 974*b* can be stacked on the receiving unit 960 separately from the other subunits. In the embodiment as shown in FIG. 47A, the third merged web 975*c* has been pre-merged into a third roll 1002*c*, which feeds the merged web into the third feeding line 972*c*. Alternatively, the third merged web 975*c* can be formed by merging separate continuous webs and/or sheets each corresponding to the separate subunits, such as from separate rolls, to a merging station 932, as shown for example in FIG. 38, after which the subunits can be removed from the merged web and stacked in the final removal and stacking operation. Furthermore, in the embodiment as shown in FIG. 47A, second and third feeding lines 972*a,b,c* can also be provided to feed merged layers for subsequent removal and stacking iterations, as described in further detail below. The first, second, and third feeding lines 972*a,b,c* in FIG. 47A may form an array of feeding lines that are separated from one another in a direction A (array direction) that is orthogonal to the feeding direction F.

In yet another embodiment, the subunits making up the final iteration in the stacked population may be provided from separate continuous webs and/or sheets on a plurality of different feed lines, as shown in FIG. 47B. For example, separate feed lines 972*a*-972*e* may be arranged in a direction orthogonal to the feeding direction F, such as in an array direction A. Each of the feed lines may comprise a separate continuous web with a type of subunit, such as for example a negative electrode sheet 906, separator sheet 912 and/or positive electrode sheet 918. In the case where the final iteration of the subunit stack is being formed, each feedline can comprise, for example, a sheet comprising the second end plates, and a sheet comprising the negative electrode subunits with just a single layer of negative electrode active material. The receiving unit 960 can move in the array direction A to the different feedlines to provide for stacking of subunits from each of the sheets.

Furthermore, in alternative embodiments, the final removal and stacking iteration can comprise removal and stacking of different subunits other than those specifically exemplified (such as a positive electrode subunit having only a single positive electrode active material layer in place of the negative electrode subunit having the single layer of negative electrode active material layer), and including negative and positive electrode subunits and separator layer subunits without an end plate, only one or two of the subunits, and/or only a single separator layer subunit. According to certain aspects, the final iteration is performed to provide any subunits and/or structures to complete the stacked population 925. However, while the final removal and stacking iteration can be performed after prior removal and stacking operations have been performed, alternatively the removal and stacking iteration shown in FIG. 40C can be performed at an earlier stage, with the stacked layers of the final iteration being joined to the other stacked layers once they are formed. The top figure of FIG. 40C depicts the sheet having subunits for removal as viewed from a direction $S_T$ of the sheet, the second figure from the top of FIG. 40C and the bottom figure from the top of FIG. 40C depict the stacked population 925 after the final iteration as viewed from a direction $S_L$ of the sheets, which corresponds to a direction Z of the electrode assembly 106 as described herein, and the figure third from the top of FIG. 40C depicts a view of the stacked population as viewed from a direction ST of the sheet.

Figure 45A:
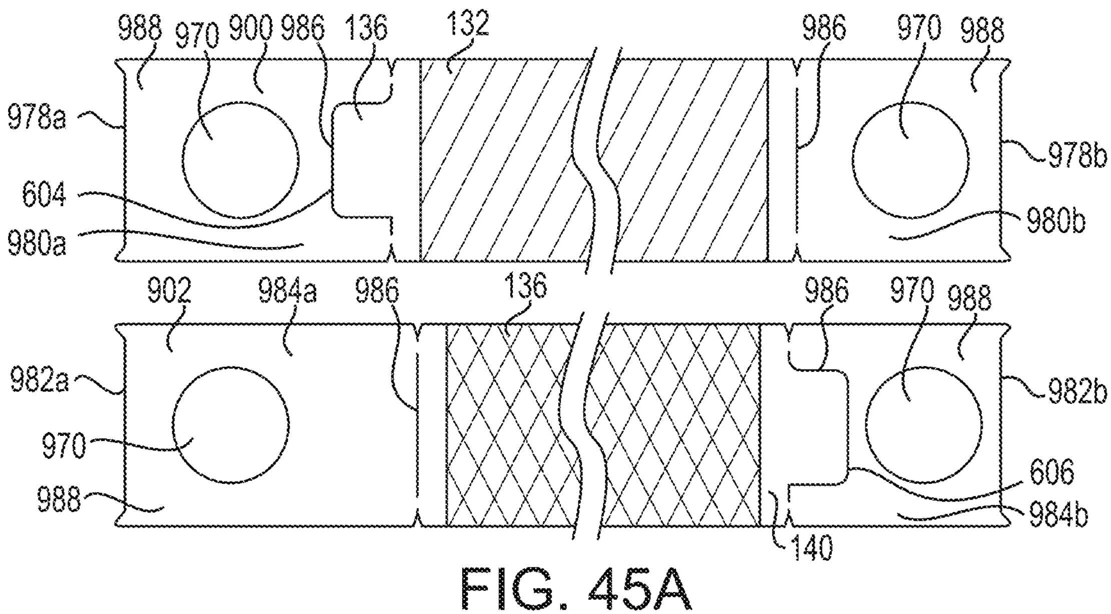
FIGS. 45A and 45B illustrate schematic embodiments of positive and negative electrode subunits with alignment features formed therein, according to aspects herein.
Figure 45B:
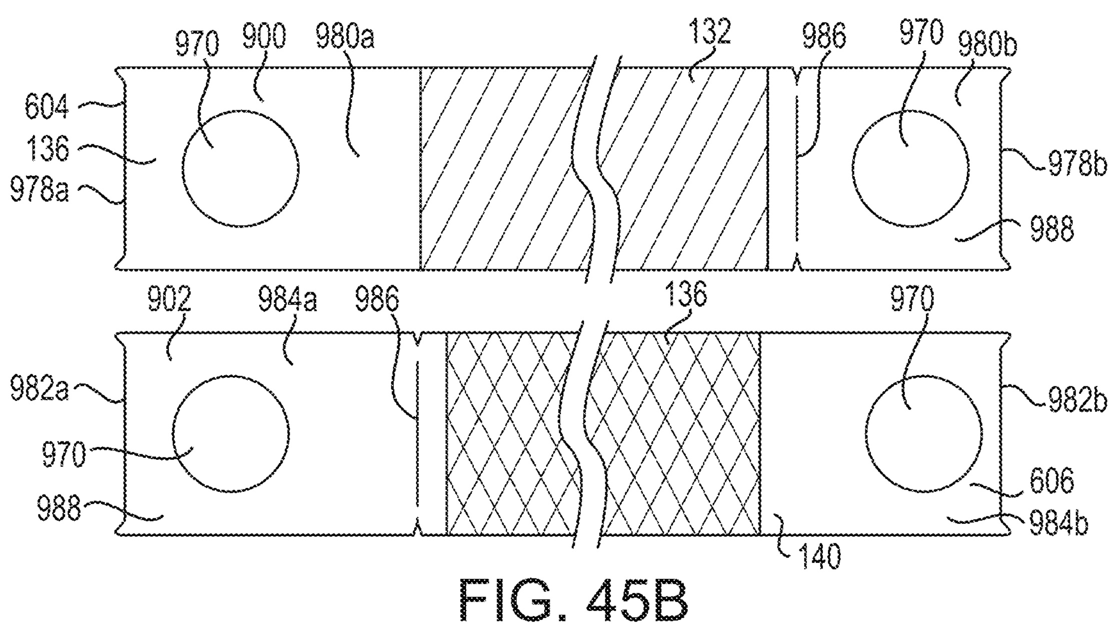

In yet a further embodiment, the method can comprise removing at least a portion 988 of one or more of the subunits that has been removed from the sheets and stacked in the stacked population 925, to provide a final subunit structure for the stacked population. For example, at least a portion 988 of a negative electrode subunit 900 and/or positive electrode subunit 902 may be removed to provide for connection of current collectors therein to a busbar 600, 602, as is described in further detail hereinbelow. For example, the portion 988 may be removed to provide for free and/or exposed positive electrode and/or negative electrode current collector ends 606, 604 that can be electrically connected to a positive and/or negative electrode busbar 600,602 (electrode or counter-electrode busbar 600,602), as shown in any of FIG. 27A-27F herein, or via another suitable connection method and/or structure. Referring to FIG. 45A, according to one embodiment, the negative electrode subunit 900 has a first set of two opposing end surfaces 978*a,b*, and opposing end margins 980*a,b* adjacent each of the first set of opposing end surfaces, (ii) the positive electrode subunit 902 has a second set of opposing end surfaces 982*a,b*, and opposing end margins 984*a,b* adjacent each of the second set of opposing end surfaces 982*a,b*, (iii) one or more of the negative electrode subunit and positive electrode subunit have at least one subunit weakened region 986 in at least one of the opposing end margins thereof. According to embodiments of the method, a tensioning force is applied to at least one of the opposing end margins of one or more of the negative electrode subunit 900 and positive electrode subunit 902 in a tensioning direction, to remove a portion 988 of one or more of the negative electrode subunit 900 and positive electrode subunit 902 that is adjacent the weakened region 986 in the at least one opposing end margin, such that one or more of the first set of opposing end surfaces 978*a*, 978*b* of the negative electrode subunit 900 and the second set of opposing end surfaces 982*a,b* of the positive electrode subunit 902 comprise at least one end surface 990 exposed by removal of the portion 980, as shown for example in FIGS. 46A-46C. That is, the tensioning force T is applied to pull or otherwise tear the portion 988 from the negative electrode and/or positive electrode subunit 900, 902, to provide a new structure shape. In the embodiment as shown in FIG. 45A, the portion may be removed to expose current collector ends 604, 606 on opposing sides of the negative electrode and positive electrode subunits 900, 902, respectively. In one embodiment, the tensioning force T may be in a direction that is parallel to the length of the subunit. FIG. 45B shows another embodiment where the positive and negative electrode subunits 900, 902 have the subunit weakened regions 986 where the portions 988 can be separated from the subunits by application of tension to the end margins.

Figure 45D:
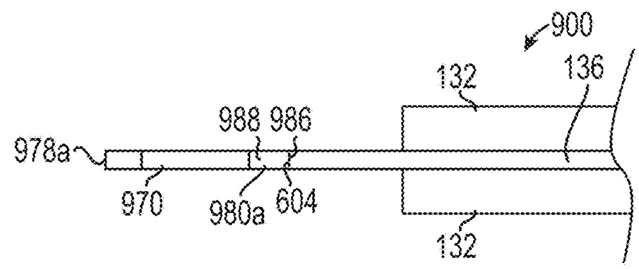
FIGS. 45D-45E illustrate embodiments of cross-sections of the electrode subunit of FIG. 45C.
Figure 45C:
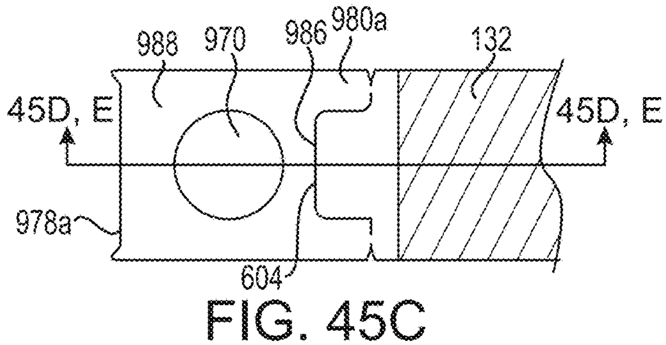
FIG. 45C illustrates a cut-away schematic embodiment of an electrode subunit with an alignment feature formed therein, according to aspects herein.
Figure 45E:
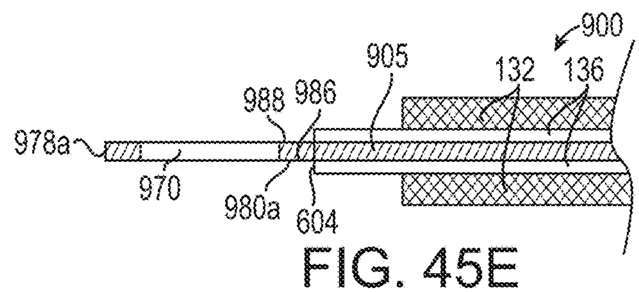

FIGS. 45D and 45E show cross-sections of FIG. 45C, where the end margin 980*a* is formed in a negative electrode current collector layer 136 (FIG. 45D), and/or in a sacrificial layer 905 that is layered between layers 136*a,b* of negative electrode current collector (FIG. 45E). In the embodiment shown in FIG. 45D, the end margin 980 corresponds to an end region of a negative electrode current collector layer 136 that extends beyond the electrode active material layers, and the weakened region 986 that is formed in the margin provides for exposure of the current collector end upon removal of the portion 988 from the subunit. In the embodiment shown in FIG. 45E, the end margin 980 corresponds to an end region of the sacrificial layer 905, in a section of the layer that extends out from between layers 136*a,b* of negative electrode current collector. The weakened region 986 is formed in the margin 980 of the sacrificial layer, and the portion 988 can be separated from the subunit at the weakened region, leaving an end surface of the sacrificial layer exposed, along with the ends of current collector layers that are adjacent to the sacrificial layer. Similarly, while not shown, a positive electrode subunit 902 can comprise positive electrode active material layers 132 on either side of the positive electrode current collector layer 136, with the end margin 980*a* having a weakened region 986 formed in the positive electrode current collector layer and/or a sacrificial layer sandwiched in between layers of positive electrode current collector. Accordingly, by removing the portion of the subunit via the weakened region, the ends of current collectors for the negative electrode and/or positive electrode subunits can be exposed to allow for electrical connection thereof. Also, by forming the weakened region at a predetermined position corresponding to a resulting subunit shape, subunits having a predetermined dimension in $S_W$ (and optionally $S_L$ may be formed). That is, in certain embodiments, negative and/or positive electrode units having predetermined dimensions may be formed, by removing the portion 988 to leave a unit of the predetermined size. In one embodiment, the at least one portion 988 is removed by exerting a tension via one or more alignment pins 977 engaging the alignment features 970, as is discussed in more detail below. That is, in one embodiment, the alignment pins 977 engaged in alignment features 970 on opposing ends of the subunits can be pulled apart from one another in the tensioning direction, to cause the weakened region to release the at least one portion from the subunit.

Figure 45F:
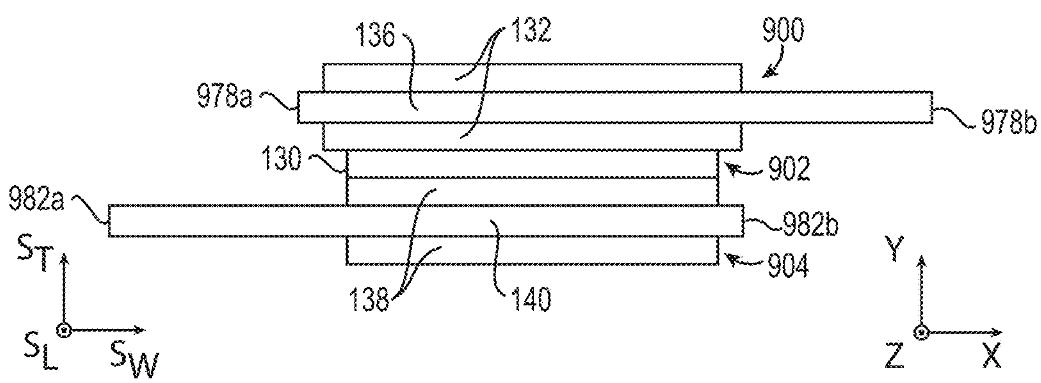
FIG. 45F illustrates an embodiment of a stacked population comprising negative and positive electrode subunits, and having an offset between first and second ends of the positive and negative electrode subunits, according to aspects herein.

Furthermore, according to one embodiment, in the stacked population 925, the subunits may be stacked such that the opposing end margins of the negative electrode subunit 900 and the positive electrode subunit 902 at least partially overlie one another (e.g., as shown in FIGS. 40A-40C). According to aspects herein, following removal of the portion 980 of one or more of the negative electrode subunit 900 and the positive electrode subunit 902, at least a portion of one or more of the opposing end surfaces 978*a,b* in the first set of opposing end surfaces 978*a, b* of the negative electrode subunit 900 are offset relative to at least a portion of one or more of the opposing end surfaces 982*a,b* in the second set of opposing end surfaces 982*a,b* of the positive electrode subunit 902, in one or more of the tensioning direction and a third direction orthogonal to both the tensioning direction T and the stacking direction. For example, referring to FIG. 45F which shows an negative electrode subunit 900 with negative electrode active material layers 132 and negative electrode current collector 136, and positive electrode subunit 902 with positive electrode active material layers 138 and positive electrode current collector 140, the first opposing end 978*a* of the negative electrode subunit, following removal of the portion, is internally offset with respect to the first opposing end 982*a* of the positive electrode subunit, and the second opposing end 978*b* of the negative electrode subunit, following removal of the portion, is externally offset with respect to the second opposing end 982*b* of the positive electrode subunit. In FIG. 45F, the offsets are in the tensioning direction, which is also corresponds to a dimension $S_W$ of the electrode subunits and the components thereof, and also corresponds to the direction X as shown (the coordinate system of the electrode assembly in FIG. 2A). However, the offsets may also be in another direction orthogonal to the stacking direction, such as in dimension $S_L$ and/or the Z direction that corresponds to a height dimension of the electrode subunits and components thereof. According to one embodiment, by providing an offset between the subunits and/or current collector layers, the positive and negative electrode current collector ends may be able to be individually accessed such that the negative electrode current collector ends can be collected and electrically connected to their respective busbar separately from the positive electrode current collector ends (e.g., as shown in FIGS. 27A-27F herein), and/or the offset may inhibit any shortening between the negative and positive electrode current collector ends.

According to yet another embodiment, in the stacked population, an interior portion 998 of the negative electrode subunit 900 and an interior portion 999 of the positive electrode subunit 902 are aligned with respect to each other in a tensioning direction X that is orthogonal to the stacking direction Y, and further comprising maintaining an alignment of the stacked population 925 while the tension is applied. According to one aspect, an interior portion of a subunit that is internal to the end margins, such as an interior portion that is interior to the portion 988 that is to be removed, is aligned with the interior portion of other subunits, and this alignment is maintained while tension is applied, to provide a stacked population having proper alignment following removal of the portion 988. In one embodiment, the alignment is maintained by applying a tension at the opposing margins that is sufficiently balanced to maintain alignment. In yet another embodiment, the alignment is maintained by clamping the subunits in the stacked population into a fixed position with respect to each other, such as for example with the first and second end plates 974*a,b*. Alternatively, in one embodiment, the alignment is maintained by separately fixing and holding the subunits, such as by individually clamping and holding each subunit in place. In another embodiment, the alignment is maintained by adhering the subunits to one another with an adhesive or by otherwise bonding the subunits together. In yet another embodiment, separate alignment pins may be provided to engage first alignment features 70*a* that are internal to weakened regions, while second alignment features 70*b* are used to remove the portion (see, e.g., FIG. 48M).

Figure 41D:
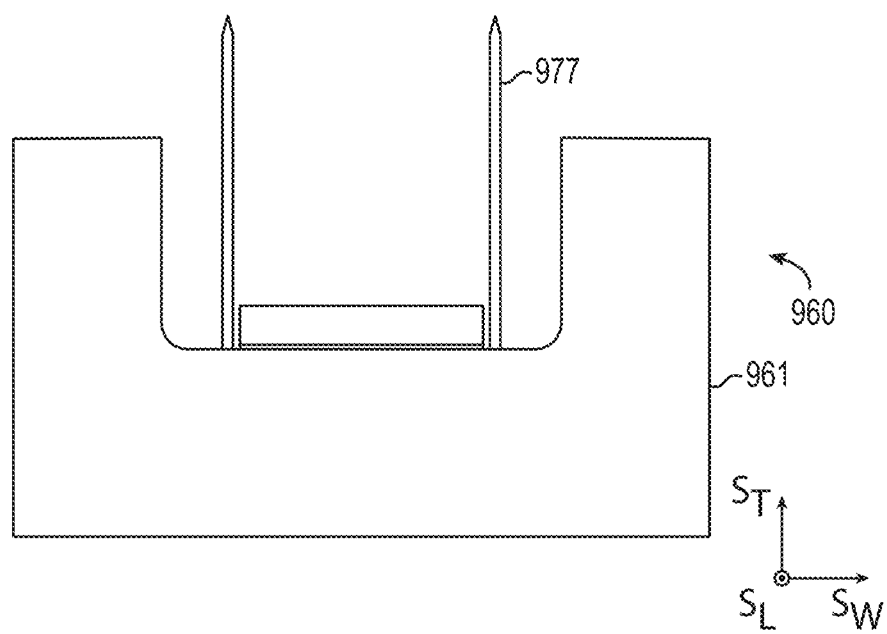
FIG. 41D illustrates an embodiment of a receiving unit for receiving positive electrode, negative electrode, and/or separator subunits that have been removed from negative electrode, positive electrode, and/or separator subunits herein, according to aspects herein.
Figure 41E:
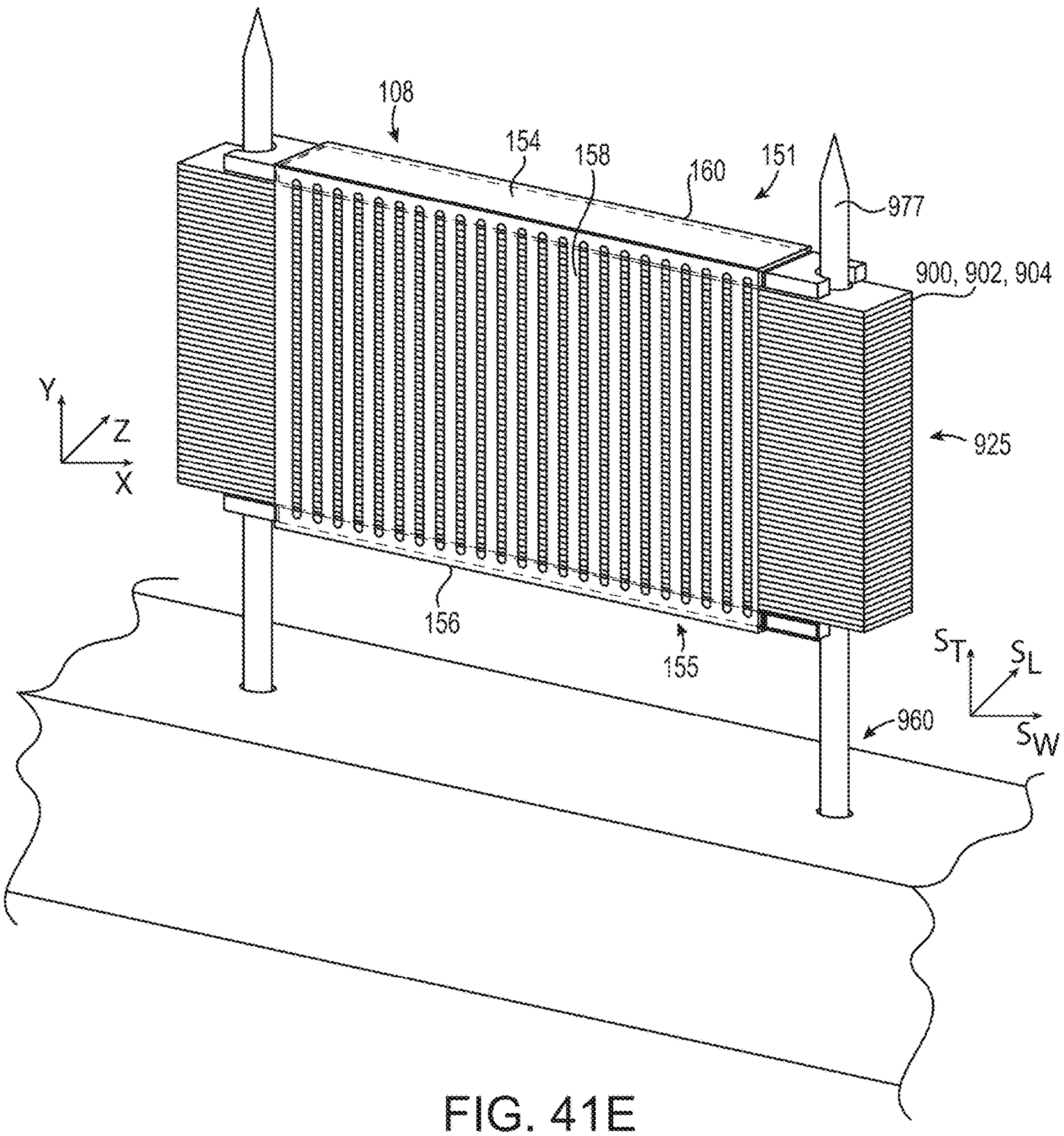
FIG. 41E illustrates an embodiment of a stacked population of unit cells that is stacked on alignment pins of a receiving device, according to aspects herein.

In yet another embodiment, as shown in FIG. 41E, the alignment is maintained by affixing a structure to one or more of the subunits in the $S_T S_W$ plane (corresponding to the XY plane of FIG. 2A). That is, the edges of the subunits along the dimension $S_L$ (corresponding to the Z dimension) may be affixed to a structure, such as the first and second secondary growth constraints 158, 160 described herein, to maintain alignment of the subunits with respect to each other while tension is applied to the ends of the subunits in the $S_W$ dimension (X direction). In the embodiment as shown, the end plates 974*a,b* used to clamp and compress the first and second ends of the stacked population correspond to the first and second primary growth constraints 154, 164, and in combination with the secondary growth constraints 158, 160, serve to fix the positions of the subunits with respect to each other during processing to remove one or more of the end portions therefrom. According to certain aspects, each subunit in the stacked population may be affixed to the first and second secondary growth constraints. In another aspect, only a few of the subunits are affixed, with the remaining optionally being affixed at a later processing point. In certain aspects, the current collectors of the subunits may be affixed to the constraints. In the embodiment as shown, pulling the alignment pins 977 apart from one another in the X direction (tensioning direction) results in removal of the portion while keeping the rest of the stacked population in the predetermined alignment. That is, according to one embodiment, the alignment may be maintained by attaching a plurality of the negative electrode current collectors and/or positive electrode current collectors in the stacked population to one or more constraint members on a face of the stacked population that is in a plane of the stacking direction. According to one embodiment, following removal of the portion of one or more of the positive electrode subunit and the negative electrode subunit, each positive electrode subunit in the stacked population comprises a predetermined position with respect to the other positive electrode subunits in the tensioning direction and the third direction, and/or each negative electrode subunit in the negative electrode sheet comprises a predetermined position with respect to the other negative electrode sheets in the tensioning direction and the third direction. According to another embodiment, following removal of the portion of one or more of the negative electrode subunit and the positive electrode subunit, each negative electrode subunit in the stacked population comprises a predetermined position with respect to each positive electrode subunit in the stacked population in the tensioning direction.

According to one embodiment, the centroid separation distances between structures in a same unit cell (such as the unit cell portion of the negative electrode unit and unit cell portion of the positive electrode unit, and/or the unit cell portion of the negative electrode active material layer and unit cell portion of the positive electrode active material layer), and/or the centroid separation distances between structures in different unit cells (such as negative electrode units and/or negative electrode active material layers in different unit cells, or positive electrode units and/or positive electrode active material layers in different unit cells), as defined above, may be within the predetermined limits defined above following removal of the at least one portion, to provide a stacked population with proper alignment between the structures. For example in one embodiment, following removal of the portion of the one or more of the positive electrode subunit and the negative electrode subunit, the centroid separation distance between a positive electrode subunit centroid and a negative electrode subunit centroid is within a predetermined limit. In another embodiment, following removal of the portion of one or more of the positive electrode subunit and the negative electrode subunit, for a centroid separation distance for each unit cell member of the population that is the distance between a centroid of the negative electrode active material layer and a centroid of the positive electrode active material layer comprised by such individual member projected onto an imaginary plane that is orthogonal to the stacking direction, the centroid distance is within a predetermined limit. According to yet another embodiment, following removal of the portion of one or more of the positive electrode subunit and the negative electrode subunit, for a centroid separation distance for each unit cell member of the population that is the absolute value of the distance between a centroid of the negative electrode subunit and a centroid of the positive electrode subunit comprised by such individual member projected onto an imaginary plane that is orthogonal to the stacking direction, the centroid distance is within a predetermined limit. According to yet another embodiment, following removal of the portion of one or more of the positive electrode subunit and the negative electrode subunit, the members of the stacked population of unit cells have a centroid separation distance between either or both of negative electrode active material layers and/or positive electrode active material layers of first and second members, and wherein the centroid separation distance between first and second members of the population is the absolute value of the distance between the centroid of the unit cell portion of the negative electrode active material layer of the first member and the centroid of the unit cell portion of the negative electrode active material layer of the second member, and/or the absolute value of the distance between the centroid of the unit cell portion of the positive electrode active material layer of the first member and the centroid of the unit cell portion of the positive electrode active material layer of the second member, and the centroid distance is within a predetermined limit.

According to one embodiment, following removal of the portion of one or more of the positive electrode subunit and the negative electrode subunit, the absolute value of the centroid separation distance for unit cell portions of negative electrode and positive electrode subunits in an individual member of the population SD is within a predetermined limit corresponding to either less than 500 microns, or in a case where 2% of the largest dimension of the negative electrode subunit is less than 500 microns, then within a predetermined limit of less than 2% of the largest dimension of the negative electrode subunit. According to yet another embodiment, following removal of the portion of one or more of the positive electrode subunit and the negative electrode subunit, the absolute value of the centroid separation distance for unit cell portions of negative electrode and positive electrode active material layers in an individual member of the population Sp is within a predetermined limit corresponding to either less than 500 microns, or in a case where 2% of the largest dimension of the negative electrode active material layer is less than 500 microns, then within a predetermined limit of less than 2% of the largest dimension of the negative electrode active material layer. According to yet another embodiment, following removal of the portion of one or more of the positive electrode subunit and the negative electrode subunit, the absolute value of the centroid separation distance for unit cell portions of negative electrode subunits in first and second members of the population Sp is within a predetermined limit corresponding to either less than 500 microns, or in a case where 2% of the largest dimension of the negative electrode subunit in either of the members is less than 500 microns, then within a predetermined limit of less than 2% of the largest dimension of the largest negative electrode subunit in the first and second members, and wherein the absolute value of the centroid separation distance for unit cell portions of positive electrode subunits in first and second members of the population Sp is within a predetermined limit corresponding to either less than 500 microns, or in a case where 2% of the largest dimension of the positive electrode subunit in either of the members is less than 500 microns, then within a predetermined limit of less than 2% of the largest dimension of the largest positive electrode subunit in the first and second members. According to one embodiment, following removal of the portion of one or more of the positive electrode subunit and the negative electrode subunit, the absolute value of the centroid separation distance for unit cell portions of negative electrode active material layers in first and second members of the population Sp is within a predetermined limit corresponding to either less than 500 microns, or in a case where 2% of the largest dimension of the negative electrode active material in either of the members is less than 500 microns, then within a predetermined limit of less than 2% of the largest dimension of the largest negative electrode active material layer in the first and second members, and wherein the absolute value of the centroid separation distance for unit cell portions of positive electrode active material layers in first and second members of the population $S_D$ is within a predetermined limit corresponding to either less than 500 microns, or in a case where 2% of the largest dimension of the positive electrode active material layer in either of the members is less than 500 microns, then within a predetermined limit of less than 2% of the largest dimension of the largest positive electrode active material layer in the first and second members.

In one embodiment, following removal of the portion of one or more of the positive electrode subunit and the negative electrode subunit, an average centroid separation distance for at least 5 unit cells in the stacked population is within the predetermined limit. In another embodiment, following removal of the portion of one or more of the positive electrode subunit and the negative electrode subunit, the average centroid separation distance is within the predetermined limit for at least 10 unit cells, at least 15 unit cells, at least 20 unit cells, and/or at least 25 unit cells in the stacked population. In one embodiment, following removal of the portion of one or more of the positive electrode subunit and the negative electrode subunit, the average centroid separation distance is within the predetermined limit for at least 75%, at least 80%, at least 90% and/or at least 95% of the unit cell members of the stacked population of unit cells.

Figure 50A:
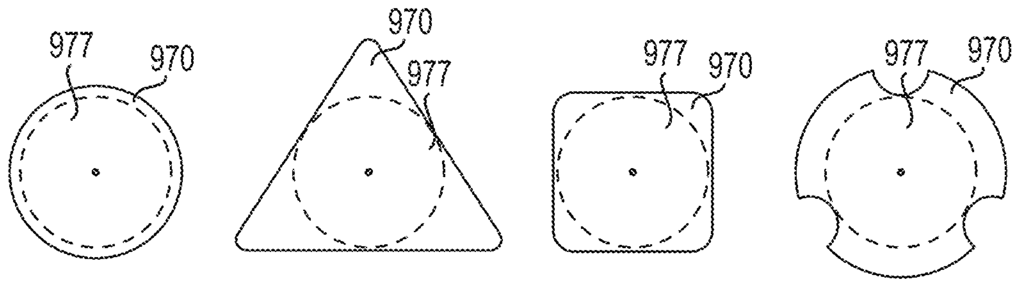
FIGS. 50A-50B illustrate embodiments of shapes and configurations of alignment features, according to aspects herein.
Figure 50B:
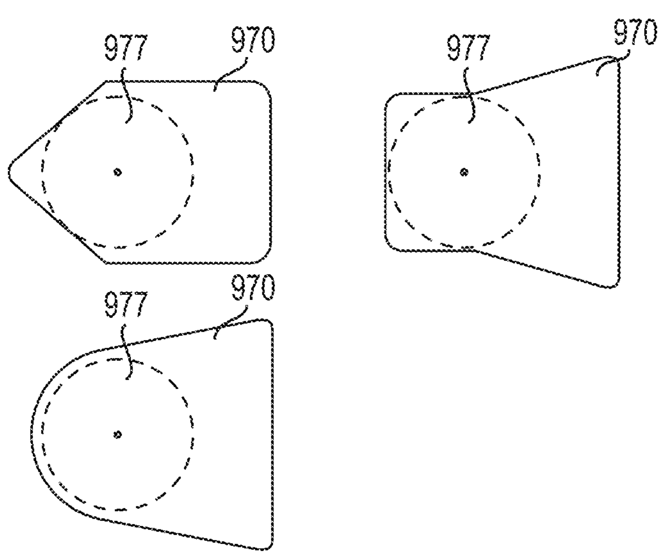

The positive electrode, negative electrode, and separator sub-units may have one or more alignment features (for example, 970 in FIG. 41C) in order to enable aligning each of the subunits to required tolerances upon stacking. In many cases, the subunit stacking alignment features are created on the sheet level prior to stacking onto a receiving unit 960 (FIG. 38) onto alignment pins (FIGS. 41D, 41E). However, in some embodiments, the subunit alignment features can also be created during the stacking process by puncturing the sheets during a stacking process. Referring now to FIG. 50A, the subunit stacking alignment features 970 can be created in various shapes such as circles, triangles, squares, indented circles etc. In certain aspects, the design of the alignment features 90 may depends on, and is co-designed with, the shape of the alignment pins 977 in order to achieve a certain tolerance, and ease of assembly. It is also possible to have alignment features 977 with clearance as shown in FIG. 50B. A strategically designed clearance in the subunit alignment features paired with a corresponding alignment pin shape can provide benefits in stacking efficiency by causing less binding on the alignment pins 977 during the stacking operation. In one embodiment, the alignment feature has a five-sided shape with a narrow triangular end as shown in FIG. 50B. The alignment pins 977 in this case could be positioned along the wider square area which enables less binding during stacking.

The subunit alignment features (e.g. 970 in FIG. 41C) may be positioned along different points on the sheet subunits (908, 914, 920 in FIG. 41C) in order to provide alignment of the subunits in the stacks. In a preferred embodiment, the alignment features are positioned towards the middle of the subunit in the height direction (for example, the direction of height $H_E$ along the electrode subunit) and towards each end of the subunit along the length direction (for example, the direction of length $L_E$ along the electrode subunit) as shown in FIG. 39. Once the stack has been formed by stacking the negative electrode, separator, positive electrode sheets in alternating fashion onto the receiving unit 960 by utilizing the alignment pins 977, a subsequent fine alignment step can be performed by tensioning the stack by moving the alignment pins away from each other along the electrode length $L_E$ direction. In an arrangement where the subunit alignment features 970 have a five-sided shape with a triangular end (FIG. 50B), and the triangular portions of the five-sided shapes in the alignment features are facing away from each other, the post-stacking tensioning step can move the alignment pins toward the narrow areas, thereby providing tension to the different components of the stack and resulting in tighter alignment between layers.

Figure 49:
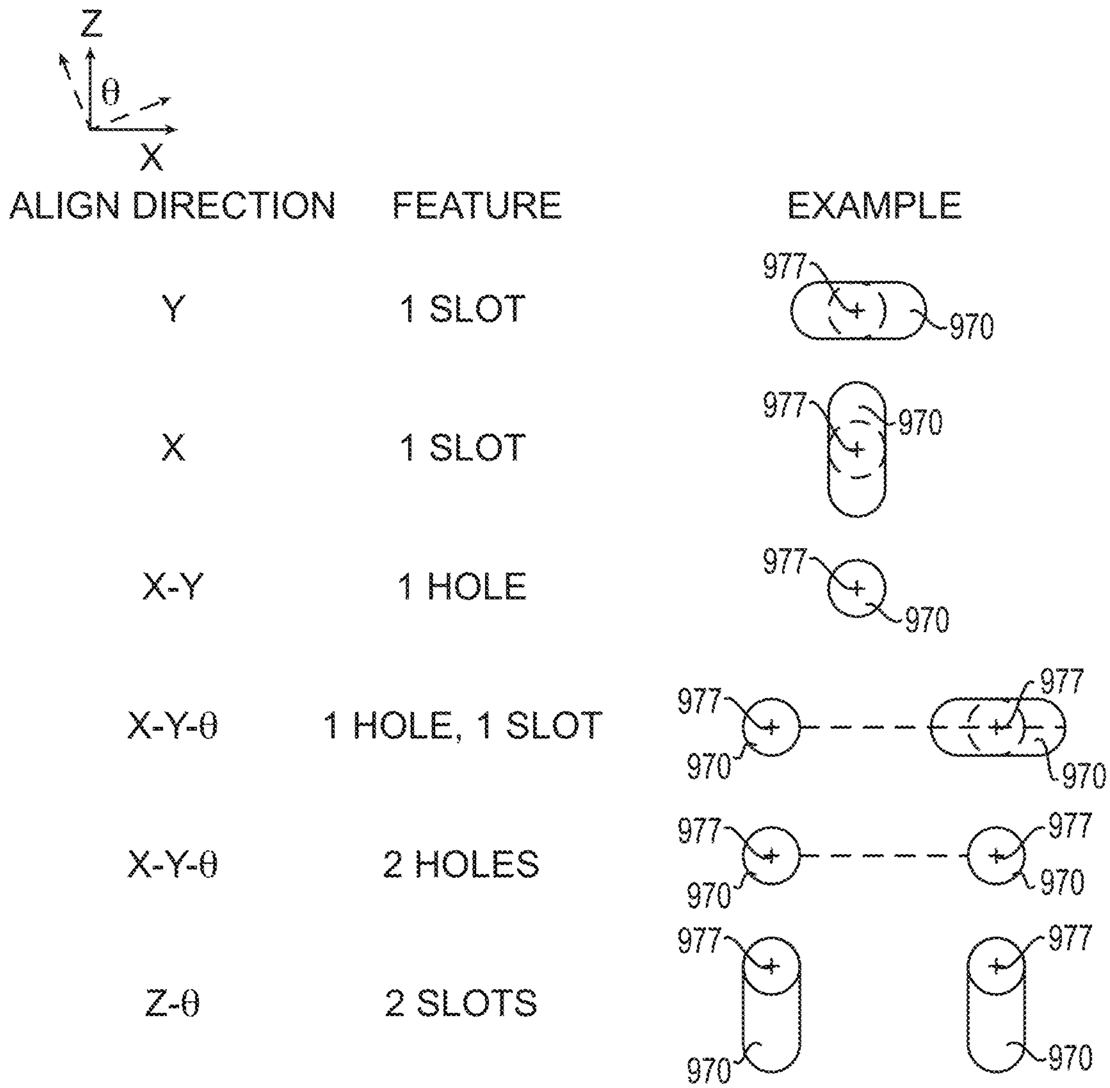
FIG. 49 illustrates embodiments of alignment feature configurations and combinations, according to aspects herein.

In other embodiments, subunit alignment features 970 in combinations with alignment pin shape and dimensions can be used to tailor alignments along different directions as shown in FIG. 49. For example, a slot along the X-direction in FIG. 49 can be used to align sheets in a Z-direction, which a slot along the Z-direction can be used to align sheets in an X-direction. Combinations of slots, holes, and other shapes can be used in conjunction with alignment pins to achieve required alignment tolerances along a X, Z, and Θ direction.

In certain embodiments, the subunits themselves have weakened regions 986 therein, in order to enable removal of subunit alignment features 970 after the stack has been aligned and stack alignment has been fixed by utilizing an alignment fixing processes as described elsewhere herein. While in certain embodiments the subunit alignment features 970 can be left intact by removing the alignment pins 977 after fixing the stack alignment; extra volume occupied by the alignment features 970 in the battery can in certain instances negatively impact volumetric and gravimetric energy density. In an embodiment as in FIG. 48I, the positive and negative electrode subunits (and the separator in between the positive and negative electrode subunits, not shown) each have two alignment features 970, one each towards each end of the subunit sheet along the X-direction. The positive and negative electrode sheets also have two weakened regions 986, one each towards each end of the subunit sheet along the X-direction, with both weakened regions in each sheet inboard of the alignment features along the X-direction (closer to each other). Once stacking is complete and alignment is fixed, the areas marked by X in FIG. 48I can be removed by removing the negative and positive electrodes (and the separators, not shown) by applying a force to remove the alignment feature pieces from the stack.

Figure 48A:
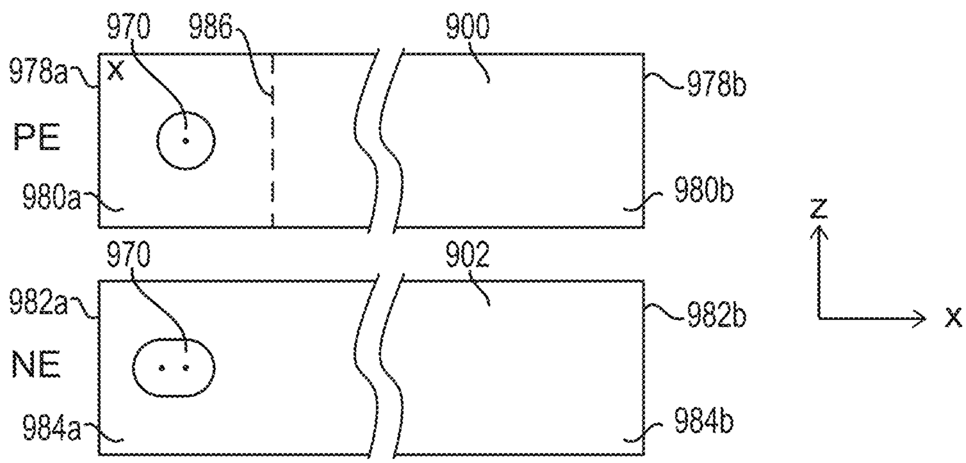
FIGS. 48A-48M illustrate embodiments of positive and negative electrode subunits having one or more weakened regions and/or alignment features therein, according to aspects herein.

Referring now to FIG. 48A thru 48J, various combinations of subunit alignment features 970 and weakened regions 986 can be used to achieve different alignments and offsets for the stacks as determined by device design requirements. In each figure in this sequence, the piece that gets removed from the final device is marked with the letter X. The separator sheet is not shown in these series of images, but the separator sheet can have similar features to one of the positive or negative electrodes and can be treated as an extension of the electrode for excess material removal purposes. In certain embodiments, such as for safety and shorting prevention reasons, the separator may be the widest material remaining in the device. In FIG. 48A, the positive electrode subunit 900 has a hole as an alignment feature 970 in the near edge and a weakened region 986 close to the hole and inboard of the hole towards the center of the positive electrode subunit. The negative electrode subunit 902 has a slot along the near edge in the X-direction and does not have a weakened region in the subunit internal to the perimeter. In this arrangement, according to certain embodiments, the stacking can be done using one alignment pin 977 until all the layers are stacked, and then a subsequent alignment could be done by aligning the far edge of the sheets by pushing the edges together while allowing the stack to rotate along the alignment holes and slots on the near edge. Once the alignment is fixed, the far edge can be held in place by holding on to the sheets from the edges with a mechanism such as clamping, and the alignment pin in the near edge can be moved away from the center of the electrode subunit along the length direction, thereby removing a portion of the positive electrode sheet along its weakened region. Embodiments may provide a stack with the negative electrode unit overhanging the positive electrode along the near side of the stack, which could then potentially be used for electrical connections or mechanical reinforcements. Alternatively, referring to FIG. 48B, embodiments may provide a negative electrode subunit overhang on the far side, away from the alignment features.

Figure 48B:
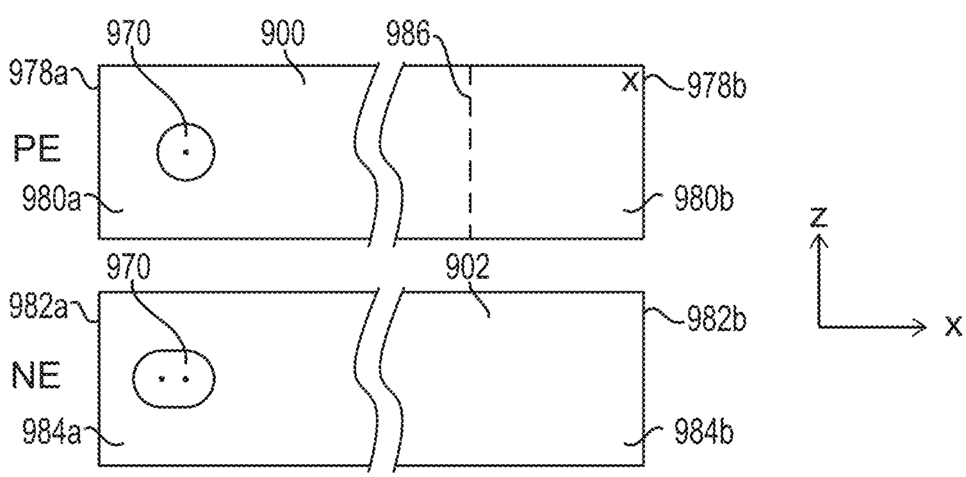
Figure 48C:
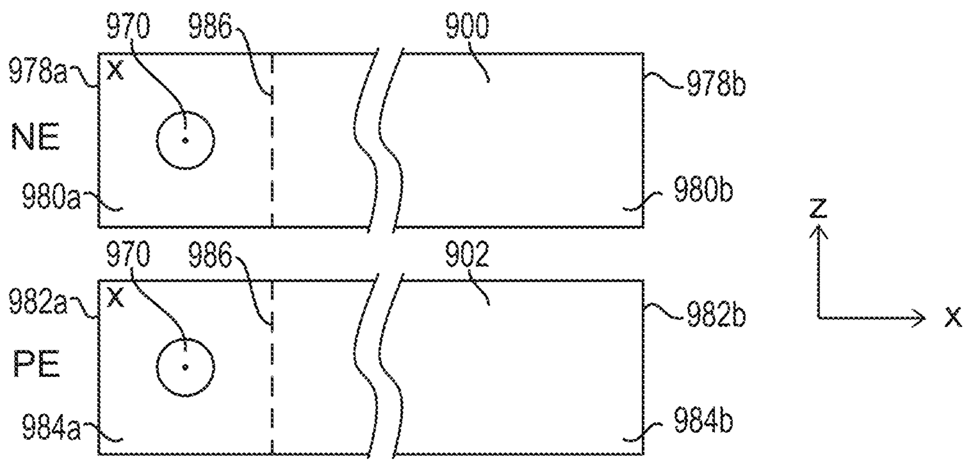
Figure 48D:
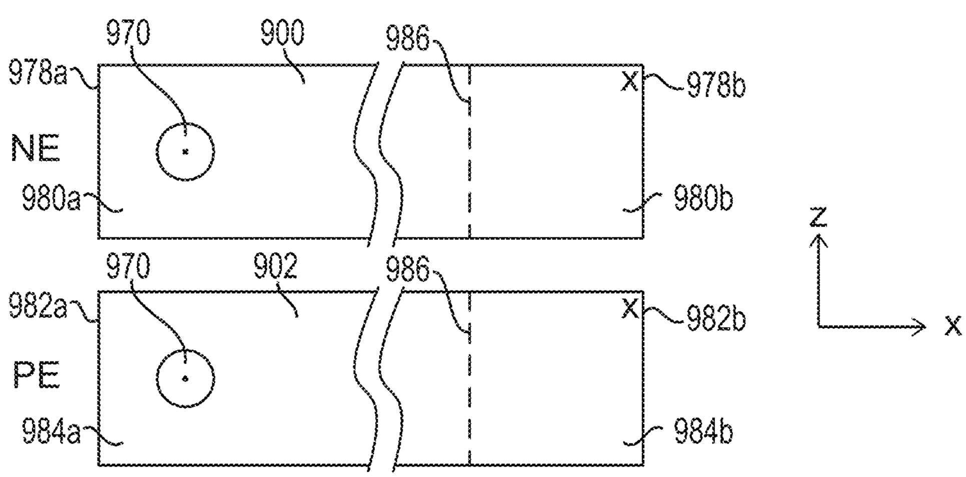
Figure 48E:
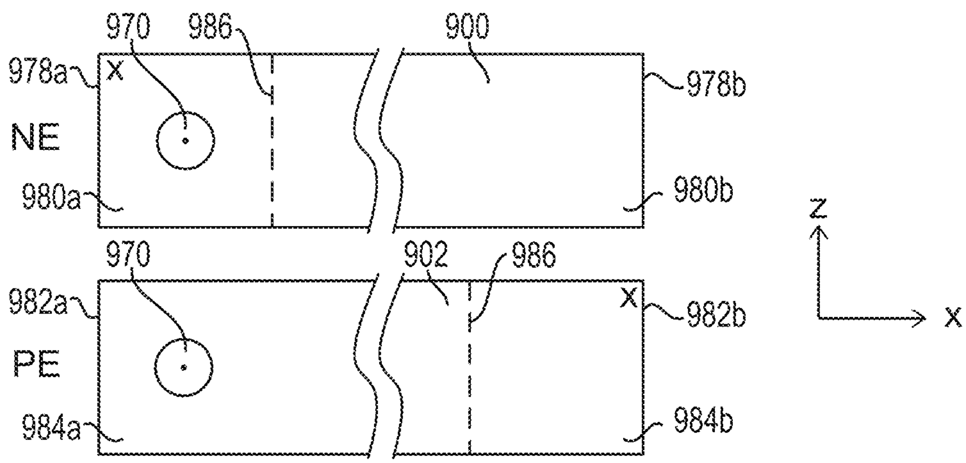

Referring to FIGS. 48C and 48D, in certain embodiments no overhang of the positive and negative electrode subunits may result if the weakened regions 986 are aligned along the same length with respect to each other. According to certain aspects, it may be possible to provide an overlap of either one of the negative or positive electrode subunit by tailoring the location of the weakened regions 986 relative to one another. Referring to FIG. 48E, in certain embodiments the removal of the portion at the weakened region 986 may result in a device that has the positive electrode subunit 900 overhang on the far side and a negative electrode subunit 902 overhang on the near side, and would allow for electrical connections of like electrode current collectors on opposite sides along the X-direction. FIGS. 48F through 48J show further embodiments of weakened region and alignment feature configurations, which may result in differing orientations and offsets of the negative electrode subunit with respect to the positive electrode subunit.

According to certain embodiments, the alignment features 970 can be used to apply mechanical forces along the X-direction (along the length direction of the subunits) to preferentially leave behind the desired subunit shapes and dimensions. However, other methods can be utilized to remove the weakened regions as well. Mechanical, electrical, and thermal methods can be used to separate the two features along the weakened area. For example, a laser beam could be directed along the weakened area to heat, melt, and separate the two regions. High current could be applied between the two sections and utilize resistance melting to remove the two pieces. Combination of electrical, thermal, and mechanical processes can be used as well. Additionally, the weakened regions 986 can be fabricated and/or correspond to any of the configurations and/or methods described herein, such as the sheet weakened regions 908, 914, 920. That is, the sheet weakened regions 908,914,920 may comprise the same and or similar types of regions, and/or may be formed in the same or similar fashion, as the weakened regions 986, and thus the disclosure herein with respect to the sheet weakened regions 908,914, 920 should also be understood as applying to the weakened regions of the subunits.

Figure 57A:
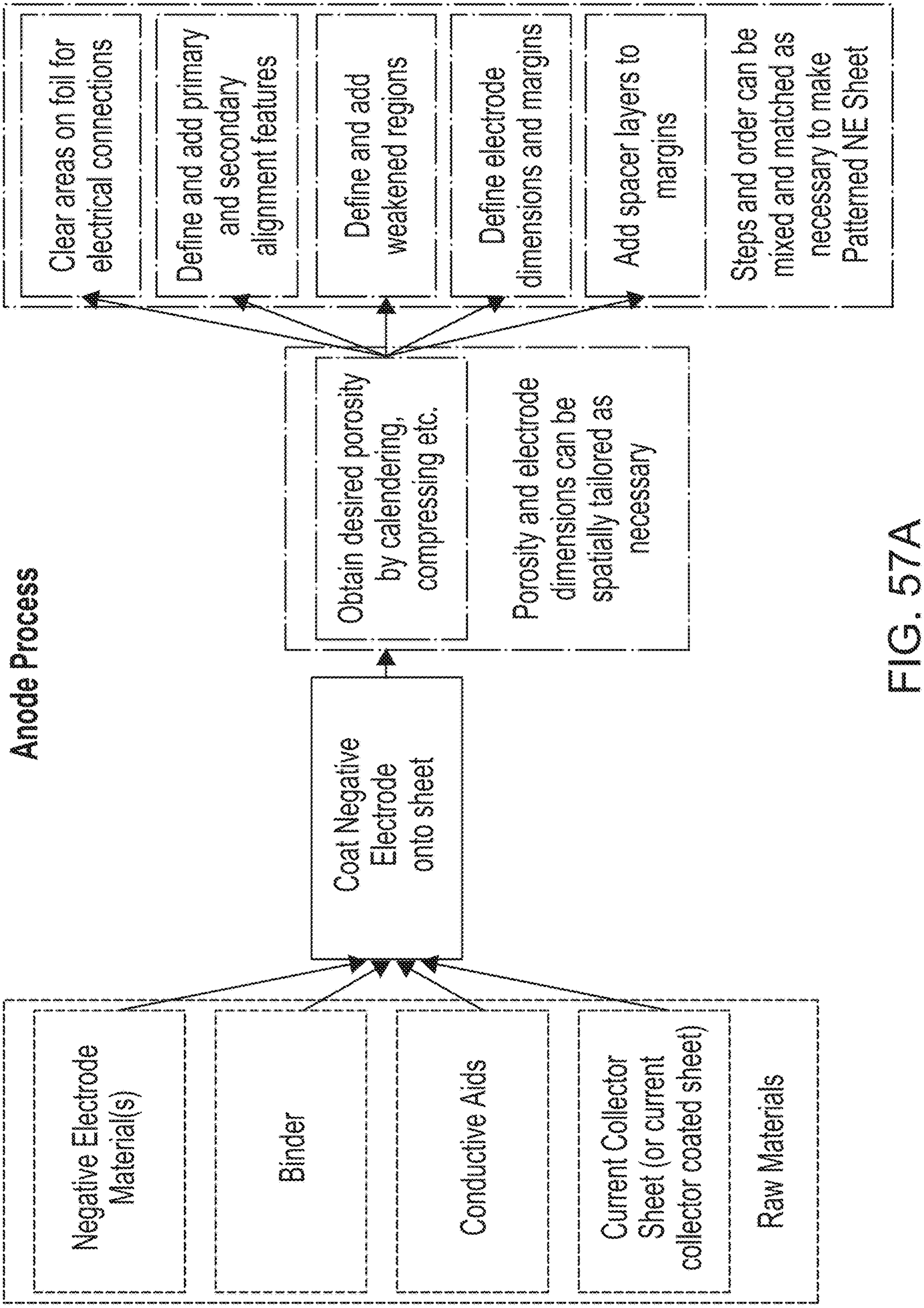
FIGS. 57A-57I illustrate embodiments of processes for manufacturing an energy storage device such as a secondary battery, according to aspects herein.

Referring to FIG. 57A, an embodiment of a negative electrode sheet 906 process flow is shown. According to this embodiment, the raw materials for the negative electrode consisting of the negative electrode active material (such as carbon, silicon, silicon oxides, tin, tin oxides, lithium titanium oxide), binders (such as polyimide, PAA, CMC/SBR, PVDF), and conductive aids (such as carbon black, acetylene black, graphite, carbon nanotubes) are mixed with a solvent (such as NMP, water or other organic liquid) to form a paste.

The mixing process can follow multiple paths such as: mixing all the dry ingredients first, followed by mixing with the solvent; adding each of the dry ingredients in a particular sequence to the solvent followed by interim mixing; and/or mixing a portion of the dry ingredients together such as the active material and conductive agent first and then adding the components in a specific order followed by interim mixing.

The mixing process can be done in electrode batch slurry mixing equipment or with a continuous flow mixing process where the raw materials are fed in and the mixed slurry is continuously fed to the coating equipment. The temperature of the mixing process can be controlled to a specified setting or varied to multiple settings at different points in the process. The atmosphere in contact with the slurry being mixed can be ambient air, inert with controlled humidity or a vacuum.

Once the mixing process is complete, the next step in this embodiment is coating the slurry onto a negative electrode current collector 136, typically within a specified time after the mixing is complete. According to embodiments herein, the current collector material can be a metal foil of specified thickness (between 0.5 um and 30 um) and made of Cu, Ni or stainless steel or a mixture of these. The current collector can also be a mesh made of the above materials. The current collector can also be a laminated foil where the core and the surface are made of different materials.

The coating process according to one embodiment can involve laying down a uniform layer of the slurry in a specified pattern on the current collector. Examples of coating processes include slot die, reverse roll, inkjet, spray coat, dip coat, screen and stencil print. Only one side of the current collector may be coated or both sides. When both sides of the current collector are coated, it can be done concurrently or sequentially. After the coating process is complete, the solvent may be evaporated off. This can be done with the assistance of higher temperature, increased airflow or lower air pressure or with a combination of these.

Optionally, in a next step, the negative electrode sheet 906 can be calendared to a specified thickness and porosity with a calendar mill. The surface of the calendar mill can be smooth, rough or with a specified pattern that leaves portions of the electrode at different thicknesses and porosities.

According to certain embodiments, an alternate negative electrode sheet process could be performed for a metal anode such as Li, Na, Mg. In this case, a single foil of the negative electrode material can serve as both the negative electrode active material and the negative electrode current collector. Alternately, the negative electrode active material can be laminated (or deposited with other means such as CVD, plating, evaporation, sputtering, etc.) onto a backing layer to provide further support to the subunit. The backing layer could be comprised of an organic material, a ceramic or ceramic composite, or another metal or metal alloy.

According to embodiments herein, the next steps in the method can be mixed and matched from the following to make a patterned negative electrode sheet. (1) Clear the negative electrode active material off the negative electrode current collector with a specific pattern to define parts of the negative electrode active material layer and electrode tab geometries (e.g., the geometry of the area occupied by the negative electrode active material and that of negative electrode current collector and current collector end that is to be connected to the negative electrode busbar 600). This clearing can be done with a laser or with a mechanical process. Care may be taken minimize damage to the underlying negative electrode current collector layer as well as to the remaining electrode active material layer. In addition, accumulation of debris on the surface of the negative electrode active material layer or negative electrode current collector should typically be minimized. (2) Define and add primary and secondary alignment features 936, 970 (e.g., web and/or sheet alignment features and/or subunit alignment features). This can involve making marks or through holes in the negative electrode current collector layer and/or negative electrode active material layer at specified locations, and with a specified pattern and geometry. This can be accomplished with a laser or with a mechanical process. (3) Define and add weakened regions 908, 938 (e.g., weakened regions defining negative electrode subunits, and weakened regions within the subunit for removal of a portion therefrom). The weakened regions can be generated by removing or thinning a specified geometry of the negative electrode current collector layer, or even both the negative electrode current collector and negative electrode active material layer, for example such that when a tensional force is applied later in the process, stress is increased in the weakened region. Alternatively, the weakened regions may be formed by, following removal of parts of the negative electrode current collector layer and/or negative electrode active material layer, applying weaker materials (such as organic films) to the regions where removal occurred to at least partially rejoin the parts, including electrically or thermally fusible materials. The weaker material may add enough structural rigidity to allow subsequent processing with high yield. (3) Add spacer layers 909*a,b* to the margins. The spacer layer can include, for example, a layer of organic or inorganic material, and can be applied to portions of either or both the active and inactive surfaces. The spacer layers 909*a*, 909*b* can also comprise a material that is the same as an electrode active material layer and/or separator layer, as is described in further detail hereinbelow. The thickness of the spacer layer can be well controlled such that when the stack is assembled, the spacer layer increases the distance between adjacent layers in the stack by a specified amount. The spacer layer can later be removed as part of the battery manufacturing process, or portions of it can be left behind.

Figure 57B:
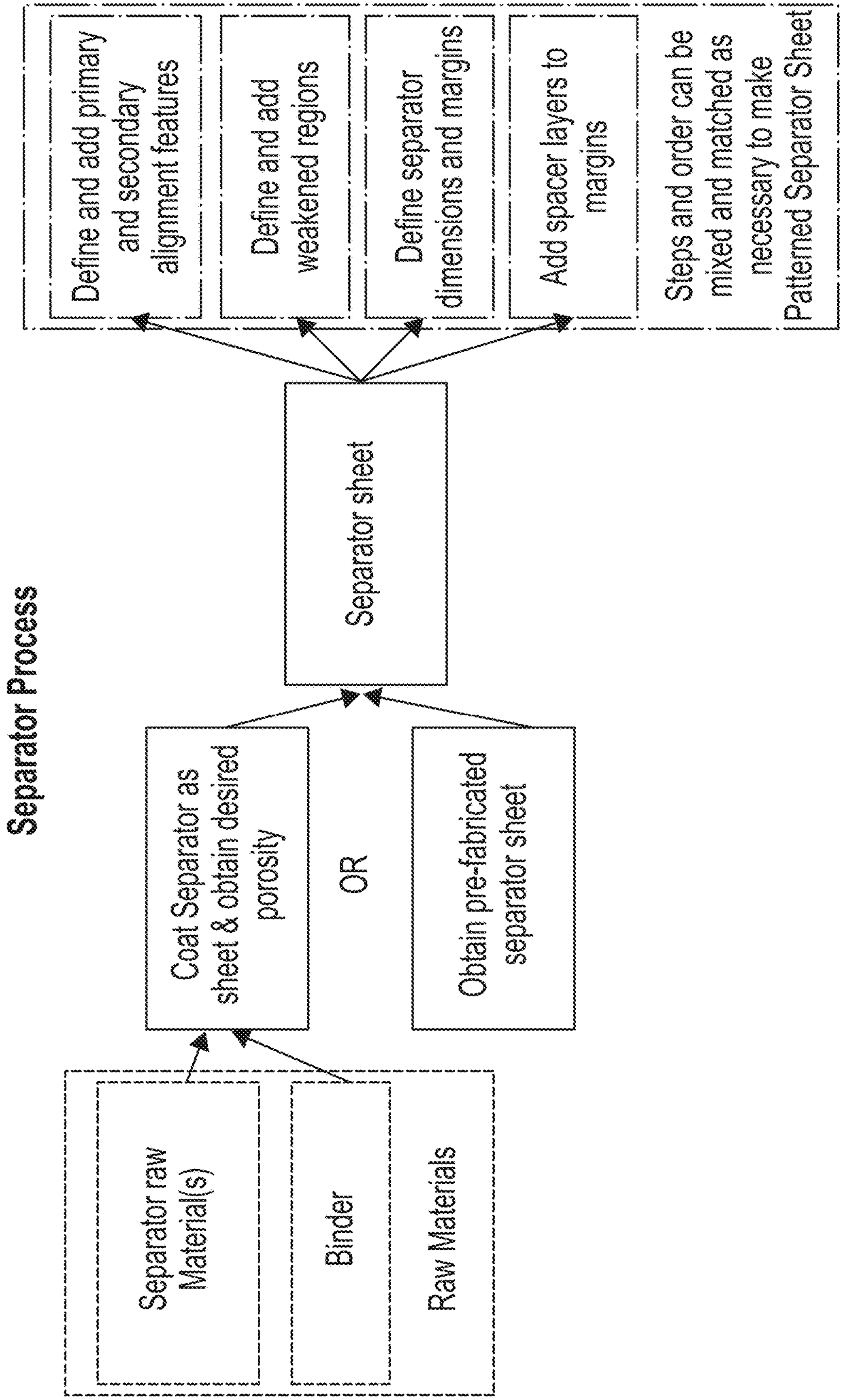

Referring to FIG. 57B, an embodiment of a process flow for a separator sheet 912 is described. According to the embodiment, the separator layer 130 is formed by mixing an insulating particulate material with a binder in a liquid medium to make a slurry. The liquid medium can be water or an organic solvent. The slurry is then applied to a backing material to a consistent thickness. The method of application can be casting, spray coating, dip coating, slot die coating, reverse roll coating, inkjet printing, stencil or screen printing. After the coating process is complete, the solvent may be evaporated off. This can be done with the assistance of higher temperature, increased airflow or lower air pressure or with a combination of these.

According to one embodiment, a next step may be to optionally calendar the separator layer 130 to a specified thickness and porosity with a calendar mill. The surface of the calendar mill can be smooth, rough or with a specified pattern that leaves portions of the separator at different thicknesses and porosities. The backing layer could be optionally removed at this stage or left on to be removed later to provide structural support for the separator layer. An alternate option according to certain embodiments is to obtain the separator as a sheet from another source and integrate into the process.

Another alternate option according to certain embodiments is to obtain the separator sheet 912 from another source, and add a layer from a suspension or a slurry. The suspension or slurry can contain a particulate material or materials in a liquid medium. The method of application can be casting, spray coating, dip coating, slot die coating, reverse roll coating, inkjet printing, stencil or screen printing. After the coating process is complete, the liquid may be evaporated off. This can be done with the assistance of higher temperature, increased airflow or lower air pressure or with a combination of these. The additional layer may, according to certain aspects add additional functionality to the separator. Examples of this added functionality may be increase in puncture resistance, increase in elastomeric properties, or reduction of defects or combinations of these. In addition to thickness, porosity, tortuosity, defect density and ionic conductance which may be parameters measured for the separator, the separator may also be controlled to provide these same parameters under applied pressures between 0 and 20 MPa. Furthermore, according to certain embodiments, in order for the separator to maintain a minimum ionic conductance under increasing pressure, the materials and construction of the separator may be engineered such that the pores in the separator do not generally collapse.

According to certain embodiments, the next steps can be mixed and matched to make the patterned separator sheet 912. (1) Define and add primary and secondary alignment features (936, 970). This can involve making marks or through holes in the separator layer 130 at specified locations and with a specified pattern and geometry. This can be accomplished with a laser or with a mechanical process. (2) Define and add weakened regions 914, 986. The weakened regions can be generated by removing or thinning a specified geometry of the separator layer, for example such that when a tensional force is applied later in the process, stress is increased in the weakened region. Alternatively, the weakened regions may be formed by, following removal of parts of the separator layer 130, applying weaker materials (such as organic films) to the regions where removal occurred to at least partially rejoin the parts, including electrically or thermally fusible materials. (3) Add spacer layers to the margins 909*a,b*. The spacer layer can comprise a layer of organic or inorganic material, and can be applied to portions of the separator layer. The thickness of the spacer layer should be well controlled such that when the stack is assembled, the spacer layer increases the distance between adjacent layers in the stack by a specified amount. The spacer layer can later be removed as part of the battery manufacturing process, or portions of it can be left behind.

Figure 57C:
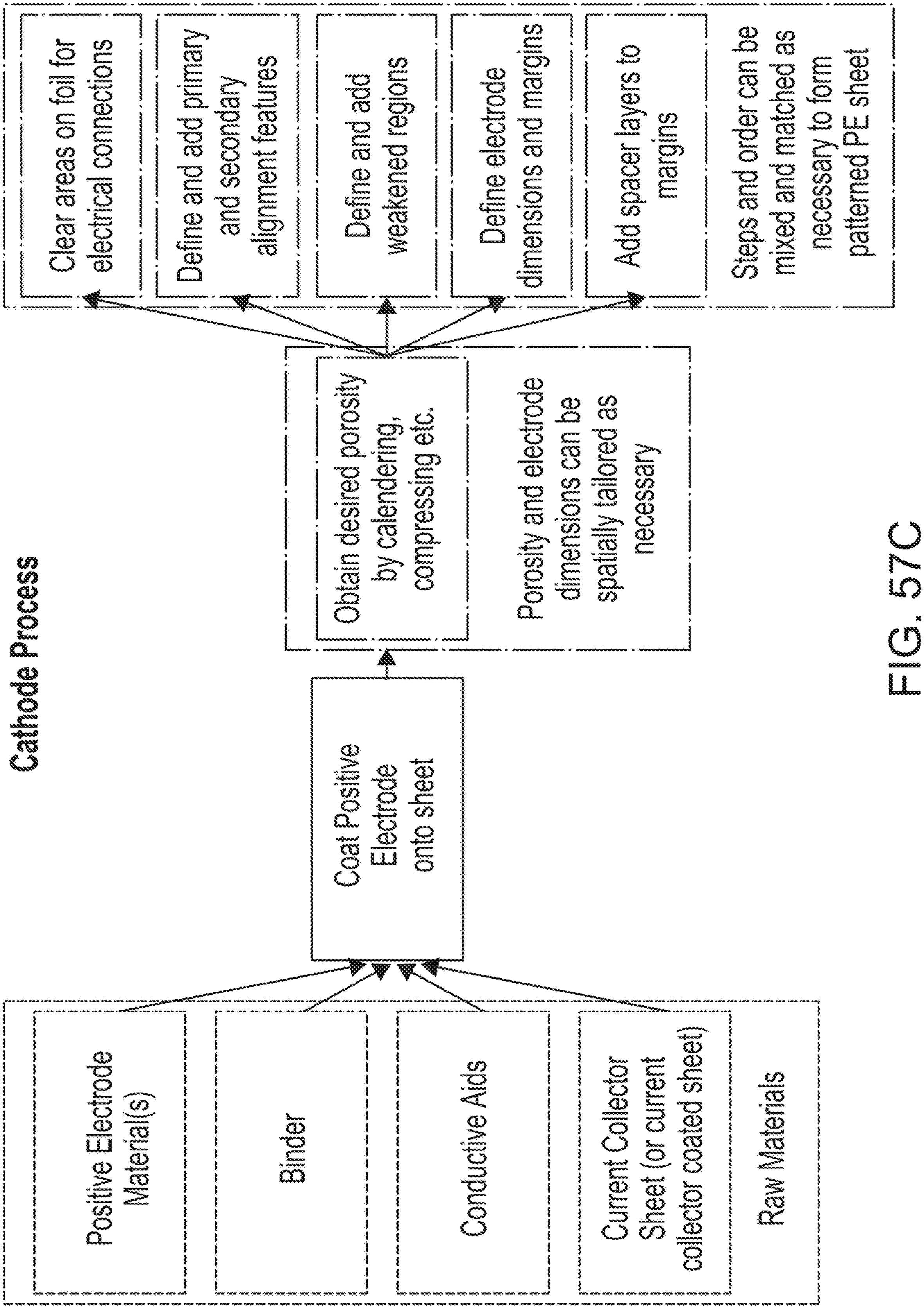

Referring to FIG. 57C, an embodiment of a process flow for preparing a positive electrode sheet 918 is described. According to this embodiment, the raw materials for the positive electrode can include the active material (such as LCO, NCA, NCM, $FePO_4$), binders (such as polyimide, PAA, CMC/SBR, PVDF), and conductive aids (such as carbon black, acetylene black, graphite, carbon nanotubes) are mixed with a solvent (such as NMP, water or other organic liquid) to form a paste. The mixing process can follow multiple paths such as: mixing all the dry ingredients first, followed by mixing with the solvent; adding each of the dry ingredients in a particular sequence to the solvent followed by interim mixing; and/or mixing a portion of the dry ingredients together such as the active material and conductive agent first and then adding the components in a specific order followed by interim mixing.

The mixing process can be done in a battery electrode batch slurry mixing equipment or with a continuous flow mixing process where the raw materials are fed in and the mixed slurry is continuously fed to the coating equipment. The temperature of the mixing process can be controlled to a specified setting or varied to multiple settings at different points in the process. The atmosphere in contact with the slurry being mixed can be ambient air, inert with controlled humidity or a vacuum.

Once the mixing process is complete, the next step according to certain embodiments is coating the slurry onto a positive electrode current collector 140 which should be completed within a specified time after the mixing is complete. The positive electrode current collector material can, for example, be a metal foil of specified thickness (between 0.5 μm and 30 μm) and made of Al. The positive electrode current collector can also be a mesh made of the above material. The positive electrode current collector can also be a laminated foil where the core and the surface are made of different materials.

According to certain embodiment, the coating process can involve laying down a uniform layer of the slurry in a specified pattern on the positive electrode current collector. Examples of coating processes include slot die, reverse roll, inkjet, spray coat, dip coat, screen and stencil print. Only one side of the positive electrode current collector may be coated, or both sides can be coated. When both sides of the positive electrode current collector are coated, it may be done concurrently or sequentially. After the coating process is complete, the solvent may be evaporated off. This can be done with the assistance of higher temperature, increased airflow or lower air pressure or with a combination of these.

The next step, according to certain embodiments, may be to optionally calendar the positive electrode sheet 918 to a specified thickness and porosity with a calendar mill. The surface of the calendar mill can be smooth, rough or with a specified pattern that leaves portions of the positive electrode at different thicknesses and porosities. The next steps can be mixed and matched to make the patterned positive electrode sheet 918. (1) Clear the positive electrode active material off the positive electrode current collector with a specific pattern to define parts of the positive electrode active material layer and positive electrode tab geometries (e.g., the geometry of the area occupied by the positive electrode active material and that of the positive electrode current collector and positive electrode current collector end that is to be connected to the positive electrode busbar 602). This clearing can be done with a laser or with a mechanical process. Care is typically taken to minimize damage to the underlying current collector as well as to the remaining electrode. In addition, accumulation of debris on the surface of the electrode or current collector is typically minimized. (2) Define and add primary and secondary alignment features 936, 970. This can involve making marks or through holes in the positive electrode current collector and/or positive electrode active material layer at specified locations and with a specified pattern and geometry. This can be accomplished with a laser or with a mechanical process. (3) Define and add weakened regions 920, 986. The weakened regions can be generated by removing or thinning a specified geometry of the positive electrode current collector and/or positive electrode current collector and positive electrode active material layer, for example such that when a tensional force is applied later in the process, stress is increased in the weakened region. Alternatively, the weakened regions may be formed by, following removal of parts of the positive electrode current collector and/or positive electrode active material layer, applying weaker materials (such as organic films) to the regions where removal occurred to at least partially rejoin the parts, including electrically or thermally fusible materials. The weaker material may add enough structural rigidity to allow subsequent processing with high yield. (4) Add spacer layers 909*a,b* to the margins. The spacer layer can comprise a layer of organic or inorganic material, and can be applied to portions of either or both the active and inactive surfaces. The thickness of the spacer layer may be controlled such that when the stack is assembled, the spacer layer increases the distance between adjacent layers in the stack by a specified amount. The spacer layer can later be removed as part of the battery manufacturing process, or portions of it can be left behind.

Figure 57D:
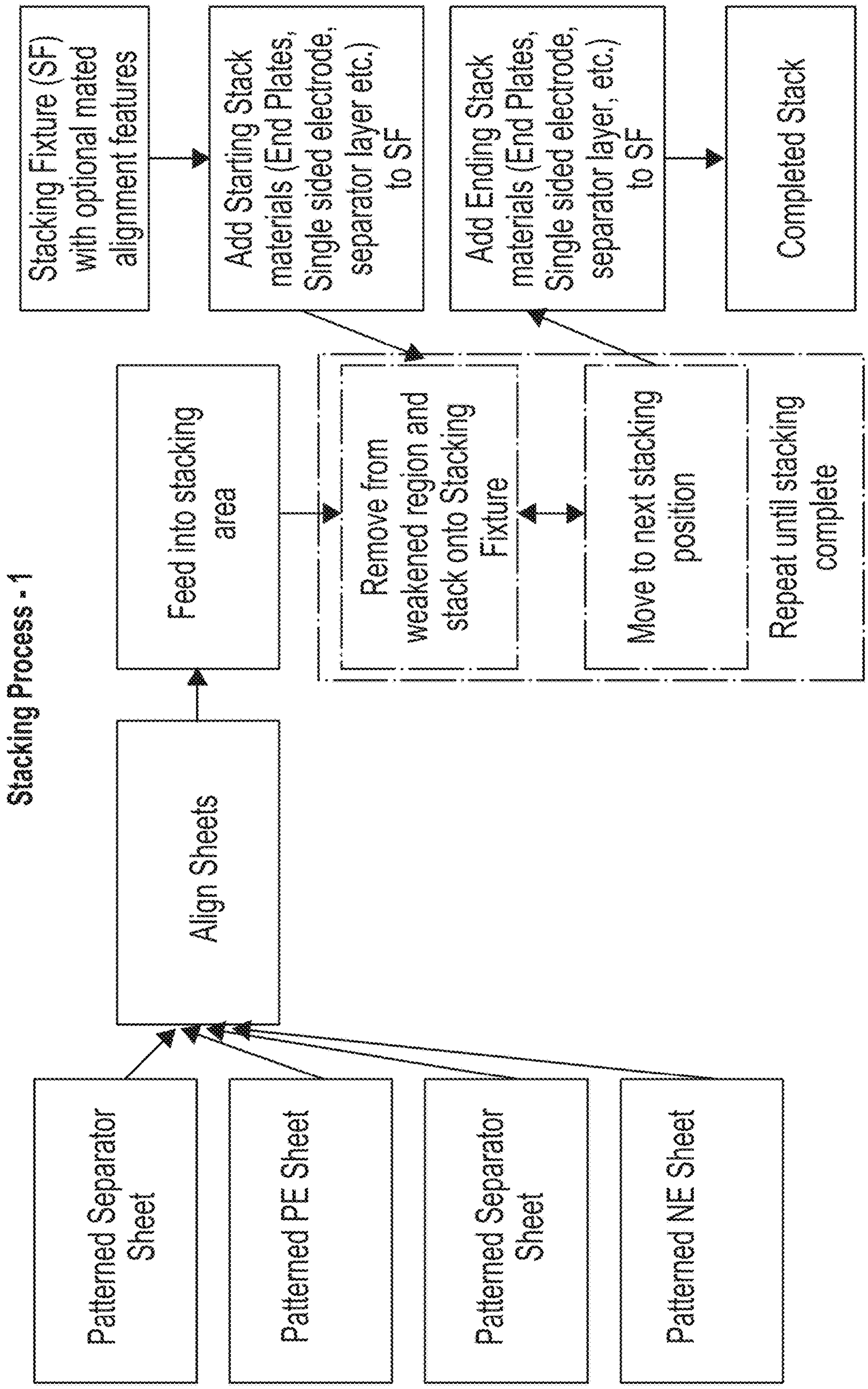

Referring to FIG. 57D, an embodiment of a stacking process is described. According to this embodiment, separate feeds of the patterned separator sheet 912, the patterned positive electrode sheet 918, another patterned separator sheet 912 and the patterned negative electrode sheet 906 are brought together to roughly align the sheets to their respective final positions in the stack with the aid of alignment features 936 on the sheets, thereby forming a pre-aligned set of sheets. The feeds of the electrode and separator sheets can originate from a roll of each or directly fed from the tool that patterns each sheet respectively, or from combinations of the two.

According to this embodiment, the starting stack materials comprised of an end plate, a single-sided electrode facing away from the end plate and optionally a layer of separator are fed into the stacking fixture (e.g., receiving unit 960). According to another embodiment, additional electrodes and separators could be added, such that a sequence of negative electrode/separator/positive electrode/separator is maintained.

According to the embodiment, the pre-aligned sheets that have been roughly aligned in the alignment process are then fed into the stacking area (e.g., subunit removal station 956) where four pieces (two electrodes and two separators) are removed from their respective sheets by detaching through the weakened area. The weakened area could be, for example, mechanically, electrically or thermally weakened, or a combination of these. The detached electrodes and separators are then fed into the stacking fixture such that a sequence of negative electrode/separator/positive electrode/separator is maintained through the stack. As the electrodes and separators enter the stacking fixture they are further aligned to be closer to their respective final positions with respect to each electrode and separator centroid.

According to the embodiment, the roughly aligned sheets advance to another position where another four pieces (two electrodes and two separators) are removed from their respective sheets by detaching through the weakened area. The weakened area could be mechanically, electrically or thermally weakened or a combination of these. The detached electrodes and separators are then fed into the stacking fixture such that a sequence of negative electrode/separator/positive electrode/separator is maintained through the stack. As the electrodes and separators enter the stacking fixture they are further aligned to be closer their respective final positions with respect to each electrode and/or separator centroid. This process is repeated until the required number of electrodes and separators are inserted into the stacking fixture.

According to the embodiment, the ending stack materials comprised of an end plate, a single-sided electrode facing away from the end plate and optionally a layer of separator are fed into the stacking fixture. A further option would be add additional electrodes and separators such that a sequence of negative electrode/separator/positive electrode/separator is maintained.

Upon completion, the completed electrode and separator stack and stacking fixture are removed from the stacking tool.

Figure 57E:
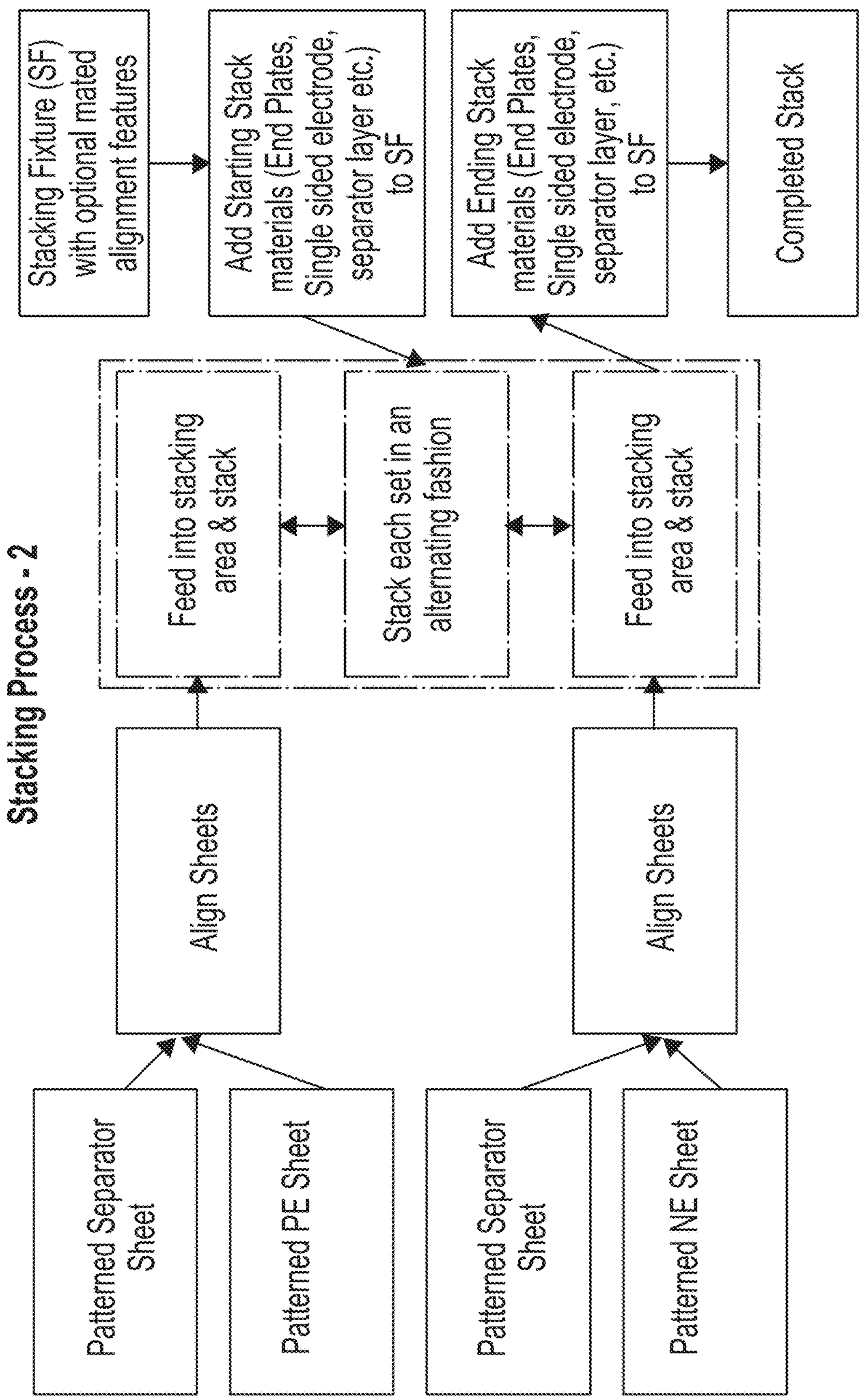

Referring to FIG. 57E, a further embodiment of a stacking process is described. According to this embodiment, separate feeds of the patterned separator sheet 912 and the patterned positive electrode sheet 918, are brought together to roughly align the sheets to their respective final positions in the stack with the aid of alignment features on the sheets, and form a first set of pre-aligned sheets. Furthermore, separate feeds of another patterned separator sheet 912 and the patterned negative electrode sheet 906 are brought together to roughly align the sheets to their respective final positions in the stack with the aid of alignment features on the sheets, and form a second set of pre-aligned sheets. The feeds of the electrode and separator sheets can originate from a roll of each or directly fed from the tool that patterns each sheet respectively, or from combinations of the two.

According to this embodiment, the starting stack materials comprised of an end plate, a single-sided electrode facing away from the end plate and optionally a layer of separator are fed into the stacking fixture (e.g., receiving unit 960). According to another embodiment, additional electrodes and separators could be added, such that a sequence of negative electrode/separator/positive electrode/separator is maintained.

According to the embodiment, the first and second set of pre-aligned sheets are fed to one or more stacking areas (e.g., removal stations 956) for stacking of the electrodes and separators from the sets of sheet. According to one embodiment, the second set of pre-aligned sheets are fed into a second stacking area where two pieces in the second set (the negative electrode and separator) are removed from their respective sheets by detaching through the weakened area. The weakened area could be, for example, mechanically, electrically or thermally weakened, or a combination of these. A stacking fixture is provided in the second stacking area to receive and further align the pieces removed from the second set of pre-aligned sheets. Furthermore, as the negative electrode and separators enter the stacking fixture they are further aligned to be closer to their respective final positions with respect to each negative electrode and separator centroid. Similarly, according to one embodiment, the first set of pre-aligned sheets are fed into a first stacking area where two pieces in the second set (the positive electrode and separator) are removed from their respective sheets by detaching through the weakened area. The weakened area could be, for example, mechanically, electrically or thermally weakened, or a combination of these. A stacking fixture is provided in the first stacking area to receive and further align the pieces removed from the first set of pre-aligned sheets.

According to one embodiment, the stacking fixture is configured to move between first and second stacking areas, to provide for alternating stacking of the negative electrode and separator in the second set of pre-aligned sheets, and the positive electrode and separator in the first set of pre-aligned sheets. That is, the stacking fixture may alternate between the first and second stacking areas so as to stack each set with each other in an alternating fashion. For example, in a case where the first and second stacking areas are in separate first and second feeding lines 971*a,b*, the stacking fixture may alternate between two lines. Each of the pieces in the sets of sheets can be removed from their respective sheets by detaching through the weakened area. The weakened area could be mechanically, electrically or thermally weakened or a combination of these. The first and second (and optionally more) sets of detached electrodes and separators are fed into the stacking fixture, in an alternating fashion, such that a sequence of negative electrode/separator/positive electrode/separator is maintained through the stack. As the electrodes and separators enter the stacking fixture they are further aligned to be closer their respective final positions with respect to each electrode and/or separator centroid. This process is repeated until the required number of electrodes and separators are inserted into the stacking fixture.

According to yet another embodiment, the stacking fixture is configured to separately receive the first set of pre-aligned sheets and the second set of pre-aligned sheets at a same stacking area (e.g., in the same feeding line), with the first and second set being fed separately in an alternating fashion to the stacking area, such that a sequence of negative electrode/separator/positive electrode/separator is maintained through the stack. As the electrodes and separators enter the stacking fixture they are further aligned to be closer their respective final positions with respect to each electrode and separator's centroid. This process is repeated until the required number of electrodes and separators are inserted into the stacking fixture.

According to the embodiment, the ending stack materials comprised of an end plate, a single-sided electrode facing away from the end plate and optionally a layer of separator are fed into the stacking fixture. A further option would be to add additional electrodes and separators, such as from the first and second pre-aligned sheets above, such that a sequence of negative electrode/separator/positive electrode/separator is maintained.

Upon completion, the completed electrode and separator stack and stacking fixture are removed from the stacking tool.

Figure 57F:
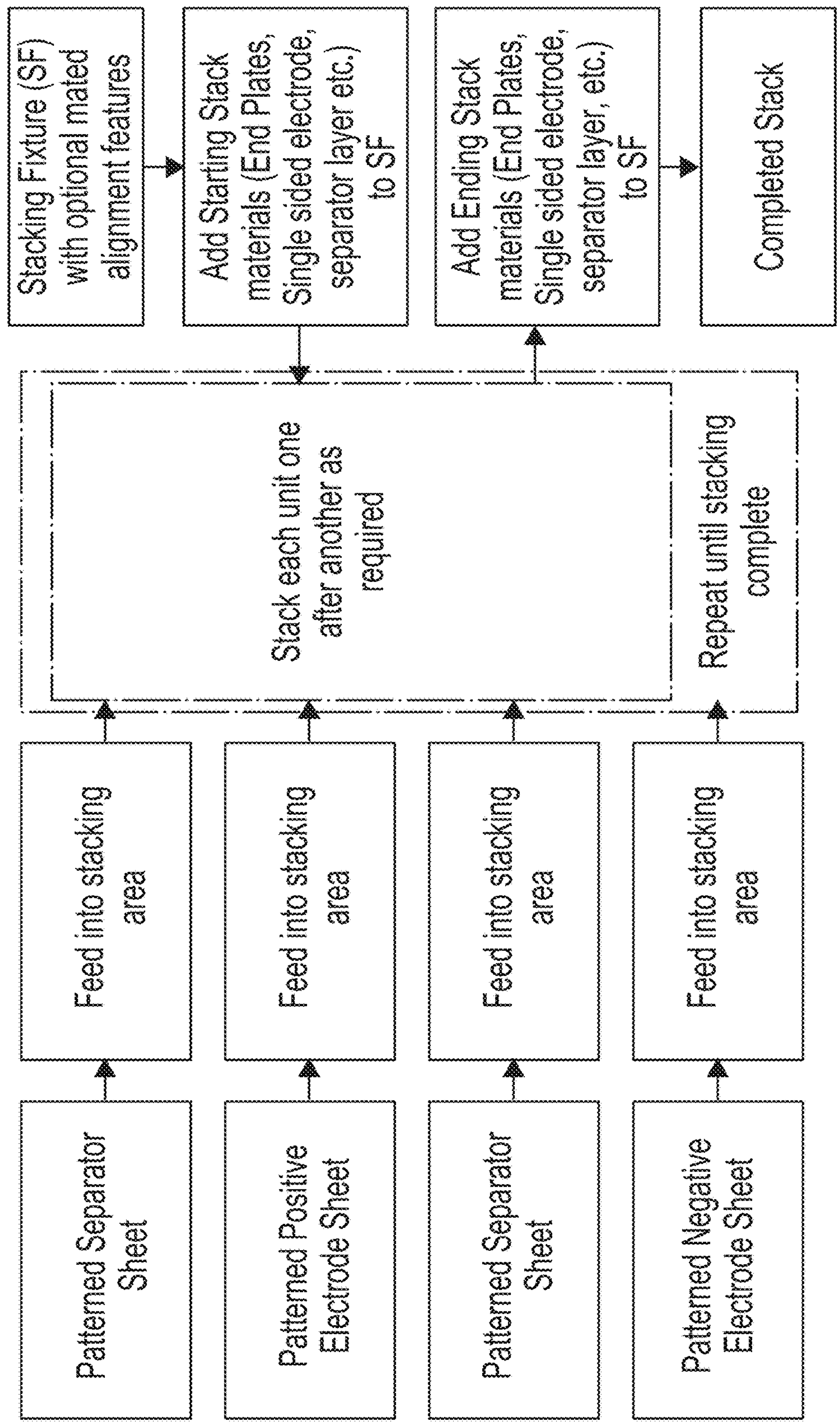

Referring to FIG. 57F, a further embodiment of a stacking process is described. According to this embodiment, separate feeds of the patterned separator sheets 912, the patterned positive electrode sheet 918, and the negative electrode sheet 906 are each individually fed into a stacking area (e.g., removal station 956). That is, according to certain aspects, the separate feeds may be brought to an area for stacking, substantially without preforming a step to pre-align the sheets with respect to each other. The feeds of the electrode and separator sheets can originate from a roll of each, or be directly fed from the tool that patterns each sheet respectively, or any combination of the two.

According to this embodiment, the starting stack materials comprised of an end plate, a single-sided electrode facing away from the end plate and optionally a layer of separator are fed into the stacking fixture. According to another embodiment, additional electrodes and separators could be added, such that a sequence of negative electrode/separator/positive electrode/separator is maintained.

According to the embodiment, the separate feeds may be fed to separate stacking areas (e.g., via separate feeding lines) for individual stacking of the pieces from each sheet and/or the separate feeds may be individually fed to the same stacking area (e.g., via a shared feeding line), but stacking is alternated between each feed. For example, according to one embodiment, a stacking fixture may alternate between different stacking areas for each separate feed, and/or may receive the separate feed individually at a same stacking area. According to one aspect, each of the patterned separator feeds, the patterned positive electrode sheet and the patterned negative electrode sheet are each fed to a separate stacking area, and the stacking fixture may alternate between each of the separate stacking areas to provide for individual stacking of the features removed from the sheets in the separate feeds. According to another aspect, each of the patterned separator feeds, the patterned positive electrode sheet and the patterned negative electrode sheet, are each fed to a same stacking area in an alternating fashion, such that the stacking fixture at the same stacking area receives the pieces removed from the sheets in the separate feeds in an alternating fashion. According to one embodiment the pieces removed from each separate feed (e.g., separator, positive electrode, and negative electrode) are removed from their respective sheets by detaching through the weakened area. The weakened area could be, for example, mechanically, electrically or thermally weakened, or a combination of these. Furthermore, as the electrodes and separators enter the stacking fixture they are further aligned to be closer to their respective final positions with respect to each electrode and/or separator centroid. The detached pieces removed from the sheets of each feed (separator, positive electrode, negative electrode) are fed onto the stacking fixture, in an alternating fashion, such that a sequence of negative electrode/separator/positive electrode/separator is maintained through the stack. This process is repeated until the required number of electrodes and separators are inserted into the stacking fixture According to the embodiment, the ending stack materials comprised of an end plate, a single-sided electrode facing away from the end plate and optionally a layer of separator are fed into the stacking fixture. A further option would be to add additional electrodes and separators, such as from the first and second pre-aligned sheets above, such that a sequence of negative electrode/separator/positive electrode/separator is maintained.

Upon completion, the completed electrode and separator stack and stacking fixture are removed from the stacking tool.

Figure 57G:
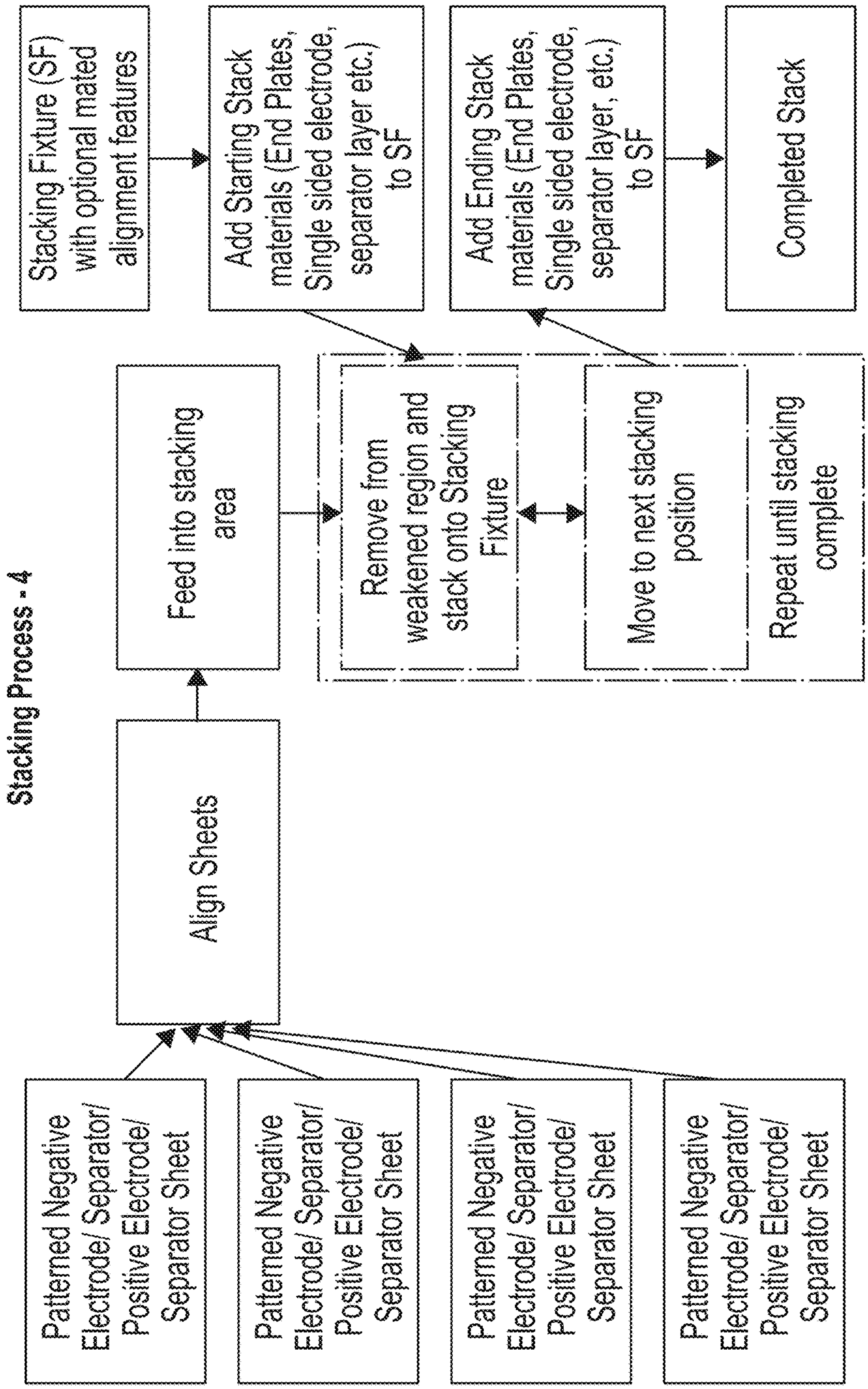

Referring to FIG. 57G, a further embodiment of a stacking process is described. According to this embodiment, separate multi-sheet feeds are brought together to roughly align each of the multi-sheet feeds to their respective final positions in the stack with the aid of alignment features on the sheets of the multi-sheet feeds. For example, each of the multi-sheet feeds can comprise layered sheets of patterned negative electrode 906, patterned separator 912, patterned positive electrode 918, and another patterned separator sheet 912 that have been patterned and then roughly pre-aligned with respect to one another. By aligning each of the multi-sheet feeds (4 multi-sheet feeds as shown), a stacking feed can be provided having a plurality of the multi-sheet feeds aligned together therein. That is, a stacking feed having more than just a single stacking iteration of negative electrode/separator/positive electrode/separator can be provided, with multiple iterations corresponding to each multi-sheet feed that is aligned together to form the stacking feed. The multi-sheet feeds can originate from a roll of each or directly fed from the tool that patterns each sheet respectively, or from combinations of the two.

According to this embodiment, the starting stack materials comprised of an end plate, a single-sided electrode facing away from the end plate and optionally a layer of separator are fed into the stacking fixture. According to another embodiment, additional electrodes and separators could be added, such that a sequence of negative electrode/separator/positive electrode/separator is maintained.

According to the embodiment, the stacking feed comprising the pre-aligned multi-sheet that have been roughly aligned with respect to each other are then fed into the stacking area (e.g., removal station 956) where the pieces (electrodes and separators of each multilayer sheet) are removed from their respective sheets and the stacking feed, by detaching through the weakened area in each sheet. The weakened area could be, for example, mechanically, electrically or thermally weakened, or a combination of these. The detached electrodes and separators are then fed into the stacking fixture such that a sequence of negative electrode/separator/positive electrode/separator is maintained through the stack. As the electrodes and separators enter the stacking fixture they are further aligned to be closer to their respective final positions with respect to each electrode and separator centroid.

According to the embodiment, the stacking feed may then be advanced to another position where another set of pieces (electrodes and separators) are removed from each of the multi-layer sheets stacked together in the stacking feed by detaching through the weakened area. The weakened area could be mechanically, electrically or thermally weakened or a combination of these. The detached electrodes and separators are then fed into the stacking fixture such that a sequence of negative electrode/separator/positive electrode/separator is maintained through the stack. As the electrodes and separators enter the stacking fixture they are further aligned to be closer their respective final positions with respect to each electrode and/or separator centroid. This process is repeated until the required number of electrodes and separators are inserted into the stacking fixture.

According to the embodiment, the ending stack materials comprised of an end plate, a single-sided electrode facing away from the end plate and optionally a layer of separator are fed into the stacking fixture. A further option would be to add additional electrodes and separators such that a sequence of negative electrode/separator/positive electrode/separator is maintained.

Upon completion, the completed electrode and separator stack and stacking fixture can be removed from the stacking tool.

Figure 57H:
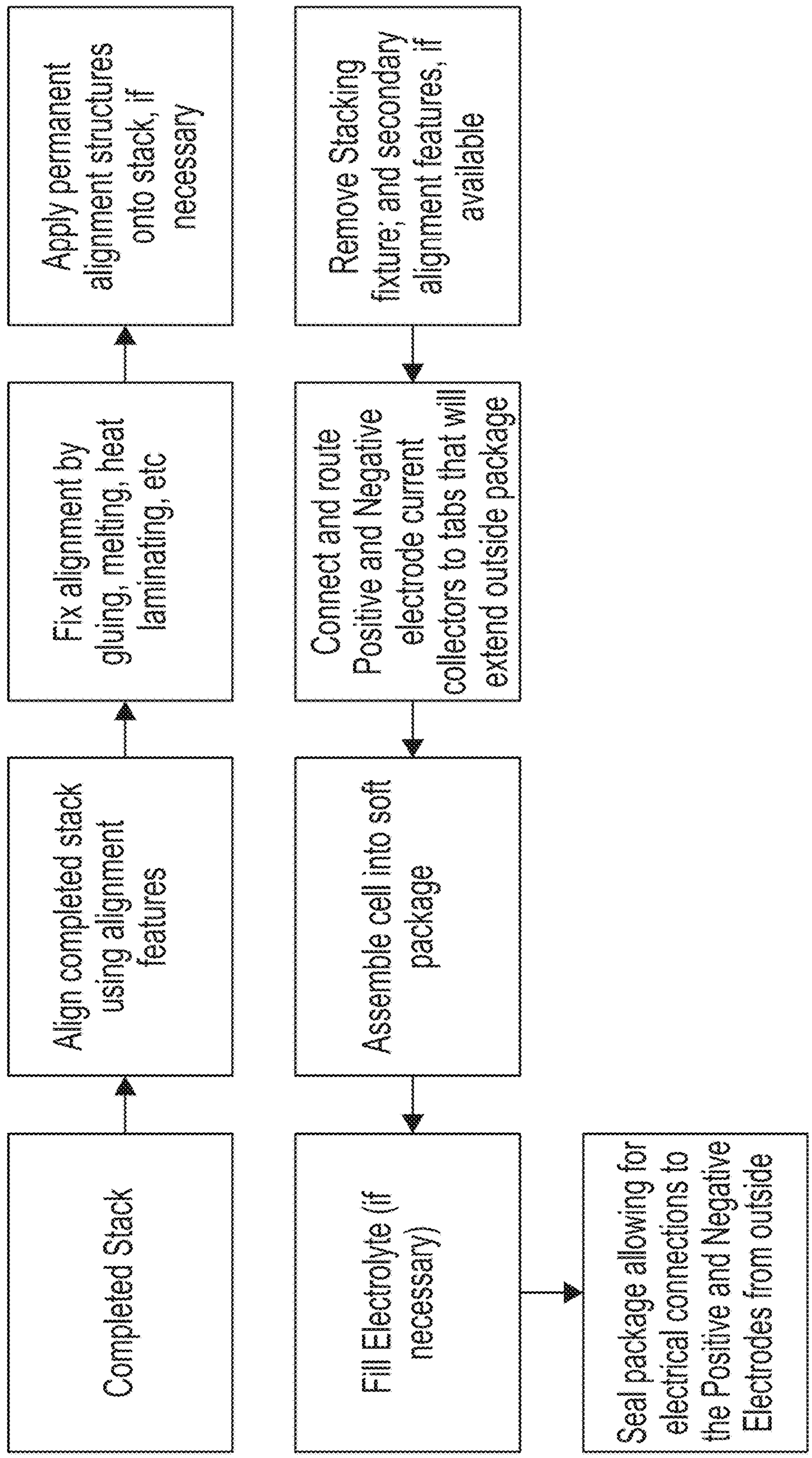

Referring to FIG. 57H, an embodiment of a post stack battery fabrication process is described. According to this embodiment, the completed stack in its stacking fixture (such as any in FIGS. 57D-57G above) is fed into the final alignment tool. The final alignment of each negative electrode subunits, positive electrode subunits and separator layer subunits with respect to the target location of the centroid for the subunits may be achieved by using alignment features 970 on one or more element. According to this embodiment, the alignment of each element of the stack can be then fixed by either gluing the elements together, melting a portion of the negative electrode, positive electrode or separator, or by heat laminating the structure.

According to this embodiment, a final alignment structure can be bonded in place. Furthermore, according to certain aspects, fixing the alignment of each element and bonding the final alignment structure can be achieved as one step. According to certain aspects, the stacking fixture, and optionally, the secondary alignment features are removed. This can be done removing the secondary alignment features 970 along a weakened region 986 in the negative electrode subunit, positive electrode subunit or separator layers. The weakened area could be mechanically, electrically or thermally weakened or a combination of these.

According to this embodiment, a next step of the process is to connect current carrying tabs (e.g., busbars 600,602) to the ends of the negative electrode current collectors and the positive electrode current collectors, separately. The other end of the negative electrode tab and positive electrode tab can, in a further step, be brought outside the package of the battery and serve as the positive and negative terminals of the battery. The connection process of the current carrying tabs to the negative electrode current collectors and positive electrode current collectors can involve laser, resistance or ultrasonic welding, gluing, or pressure connections.

According to the embodiment, the battery stack may then be inserted into a soft pouch. The pouch material can be made of standard battery aluminized pouch foil material. Furthermore, a liquid electrolyte may optionally be injected into the package, and the package sealed by laminating the edges of the pouch material together. After the sealing is complete, the positive and negative current carrying tabs may be visible outside of the pouch with the laminated pouch seals around each tab.

Figure 57I:
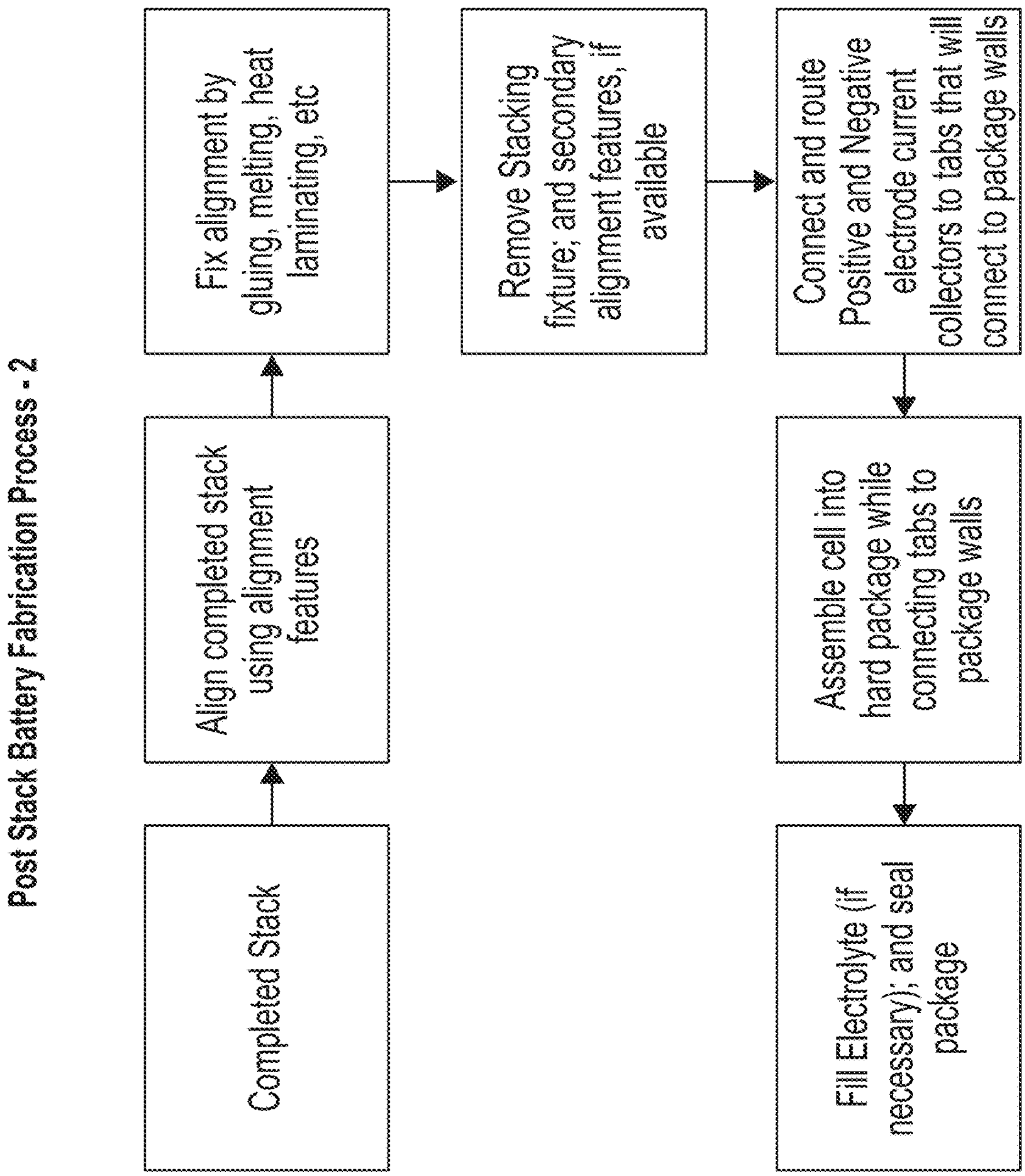

Referring to FIG. 57I, another embodiment of a post stack battery fabrication process is described. According to this embodiment, the completed stack in its stacking fixture (such as any in FIGS. 57D-G above) is fed into the final alignment tool. The final alignment of each negative electrode subunit, positive electrode subunit and separator layer subunit with respect to the target location of the centroid for one or more of the subunits can be achieved by using alignment features 970 the subunits. According to this embodiment, the alignment of each element of the stack can be then fixed by either gluing the elements together, melting a portion of the negative electrode, positive electrode or separator, or by heat laminating the structure.

According to this embodiment, the stacking fixture, and optionally, the secondary alignment features 970 are removed. This can be done removing the secondary alignment features 970 along a weakened region 986 in the negative electrode current collector and/or negative electrode active material layer, positive electrode current collector and/or positive electrode active material layer, or separator layer. The weakened area could be mechanically, electrically or thermally weakened or a combination of these. According to certain embodiments, a next step of the process can be to connect current carrying tabs (e.g., negative electrode busbar 600 and positive electrode busbar 602) to the ends of the negative electrode current collectors and the positive electrode current collectors, separately. The other end of the negative electrode tab and positive electrode tab can in a later step be brought outside the package of the battery and serve as the positive and negative terminals of the battery. The connection process of the current carrying tabs to the negative electrodes and positive electrodes can involve laser, resistance or ultrasonic welding, gluing, or pressure connections.

According to certain embodiments, the battery stack may then be inserted into a soft pouch. The pouch material can be made of standard battery aluminized pouch foil material. Furthermore, a liquid electrolyte may optionally be injected into the package, and the package sealed by laminating the edges of the pouch material together. After the sealing is complete, the positive and negative current carrying tabs may be visible outside of the pouch with the laminated pouch seals around each tab.

Furthermore, processes for manufacturing the secondary battery, energy storage device and/or electrode assembly described herein may also incorporate combinations of steps in any of FIGS. 57A-57I above, and/or combinations of the entire process flows as described with reference to any of FIGS. 57A-57I above, as well as any other suitable steps and/or processes.

Figure 48F:
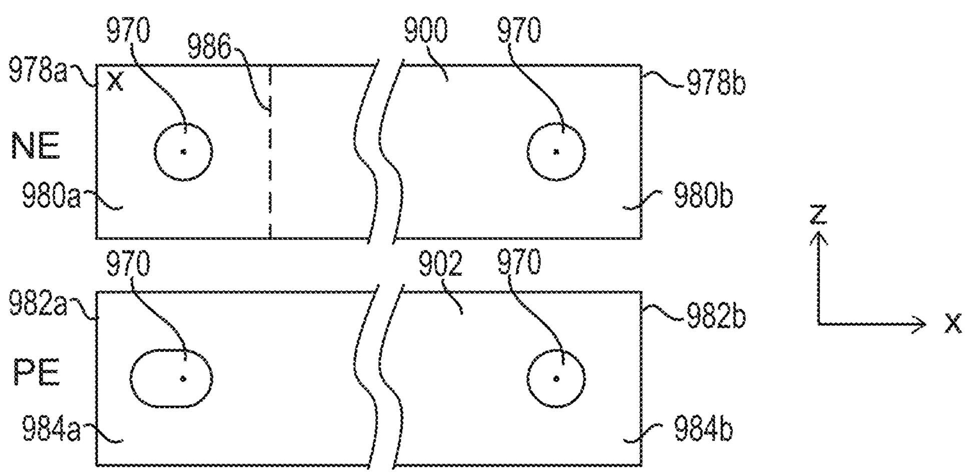
Figure 48G:
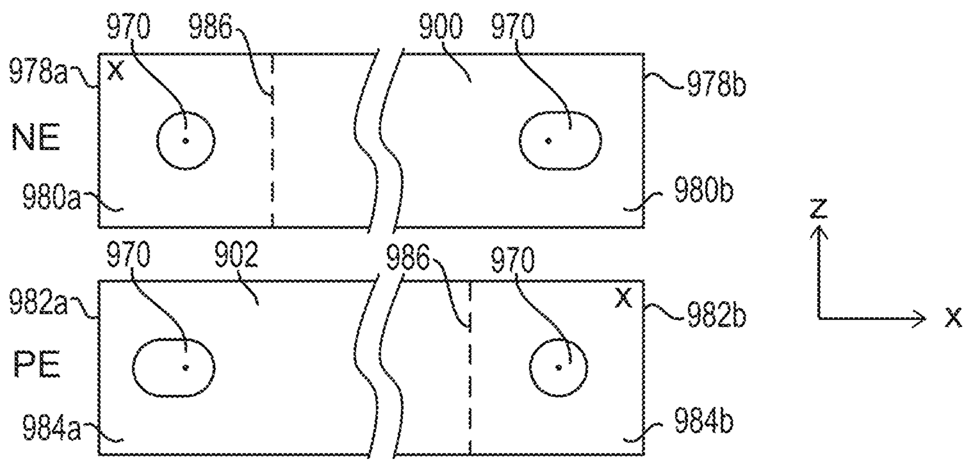
Figure 48H:
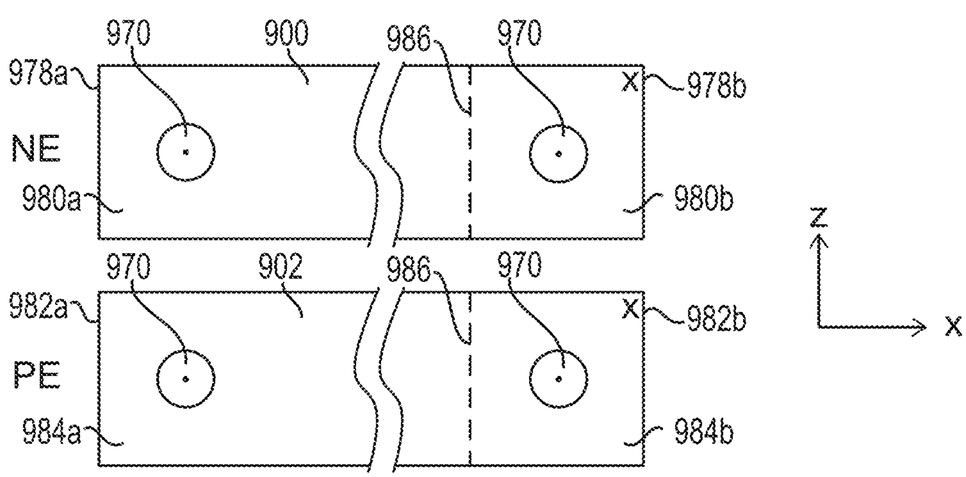
Figure 48I:
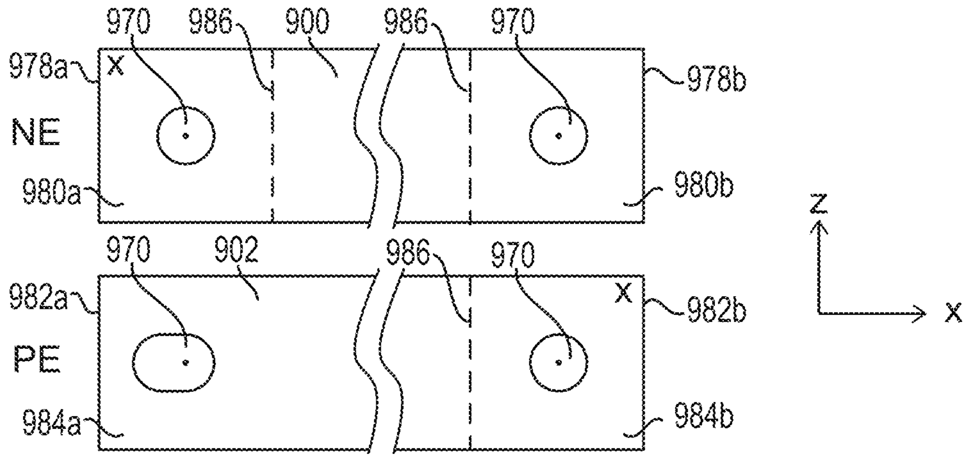
Figure 48J:
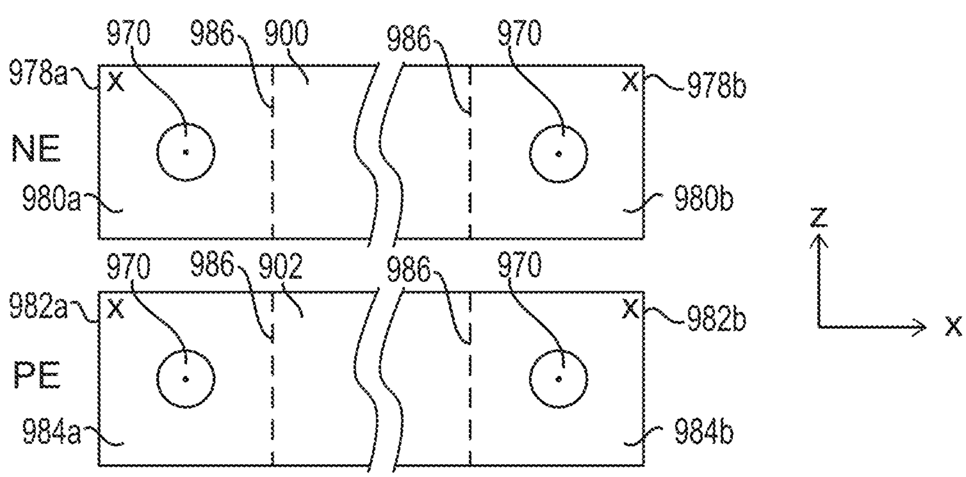

Returning to FIGS. 48A-48M and 46A-46C, in one embodiment the negative electrode subunit 900 has the at least one weakened location 986 in an opposing end margin thereof, and tension may be applied to the opposing end margin of the negative electrode subunit having the weakened region to remove the portion of the negative electrode subunit, such that the first set of opposing end surfaces of the negative electrode subunit comprise the at least one end surface exposed by removal of the portion, as shown in FIGS. 48A-48B and 46A. In another embodiment, the positive electrode subunit 902 has the at least one weakened location 986 in at least one opposing end margin thereof, and tension may be applied to the opposing end margin having the weakened region of the positive electrode subunit to remove the portion of the positive electrode subunit, such that the second set of opposing end surfaces of the negative electrode subunit comprise the at least one end surface exposed by removal of the portion, as shown in FIGS. 48G-48H. Furthermore, in one embodiment, both the negative electrode subunit 900 and the positive electrode subunit 902 have the at least one weakened region 986 in at least one opposing end margin thereof, such that tension may be applied to the opposing end margins having the at least one weakened region of the negative electrode and positive electrode subunits to remove the portions of the negative electrode subunit and positive electrode subunit, such that both the first set of opposing end surfaces of the negative electrode subunit and the second set of opposing end surfaces of the positive electrode subunit comprise at least one end surface exposed by removal of the portions therefrom, as shown in FIGS. 48C-48D. Furthermore, in one embodiment, the opposing end margin having the at least one weakened region of the negative electrode subunit 900 is on a same side in the tensioning direction as the opposing margin having the at least one weakened region of the positive electrode subunit, as shown in FIGS. 48C-48D. In yet another embodiment, the opposing end margin having the at least one weakened region of the negative electrode subunit is on an opposing side in the tensioning direction as the opposing margin having the at least one weakened region of the positive electrode subunit, as shown in FIG. 48E. According to yet another embodiment, at least one of the negative electrode subunit and positive electrode subunit comprises weakened end regions at both opposing end margins thereof, as shown in FIG. 48I. In a further embodiment, both the negative electrode subunit and the positive electrode subunit comprise weakened end regions at both opposing end margins thereof, as shown in FIG. 48J.

Furthermore, while embodiments herein have described forming the complete stack population 925 before removing the portions from the negative electrode and positive electrode subunits, in further embodiments it may be possible to form a portion of the stacked population prior to removal of the portion of one or more of the positive electrode subunit and the negative electrode subunit, and wherein the removal of the portion of one or more of the positive electrode subunit and the negative electrode subunit is followed by stacking further members of one or more of the negative electrode subunit population, the separator layer subunit population, and the positive electrode subunit population to form the stacked population. Alternating steps of stacking and end margin portion removal may also be performed.

According to one embodiment, the stacked population 925 is formed by stacking a plurality of negative electrode subunits and positive electrode subunits, optionally with a plurality of separator sheets, to form at least one unit cell, at least two unit cells, at least three unit cells, at least four unit cells, at least 5 unit cells, at least 6 unit cells, at least 7 unit cells, at least 8 unit cells, at least 9 unit cells, at least 10 unit cells, at least 11 unit cells, at least 12 unit cells, at least 13 unit cells, at least 14 unit cells, at least 15 unit cells and/or at least 16 unit cells of a battery. In another embodiment, the stacked population is formed by stacking at least 1 negative electrode subunit and at least 1 positive electrode subunit, stacking at least 2 negative electrode subunits and at least 2 positive electrode subunits, stacking at least 3 negative electrode subunits and at least 3 positive electrode subunits, stacking at least 4 negative electrode subunits and at least 4 positive electrode subunits, stacking at least negative electrode subunits and at least 5 positive electrode subunits, stacking at least 6 negative electrode subunits and at least 6 positive electrode subunits, stacking at least 7 negative electrode subunits and at least 7 positive electrode subunits, stacking at least 8 negative electrode subunits and at least 8 positive electrode subunits, stacking at least 9 negative electrode subunits and at least 9 positive electrode subunits, stacking at least 10 negative electrode subunits and at least 10 positive electrode subunits, stacking at least 11 negative electrode subunits and at least 11 positive electrode subunits, stacking at least 12 negative electrode subunits and at least 12 positive electrode subunits, stacking at least 13 negative electrode subunits and at least 13 positive electrode subunits, stacking at least 14 negative electrode subunits and at least 14 positive electrode subunits, stacking at least 15 negative electrode subunits and at least 15 positive electrode subunits, and/or stacking at least 16 negative electrode subunits and at least 16 positive electrode subunits.

Furthermore, according to embodiments herein, the at least one subunit weakened region may be formed in a negative electrode current collector layer of a negative electrode subunit, and/or the at least one subunit weakened region may be formed in a positive electrode current collector layer of a positive electrode subunit. The at least one weakened region may also be formed in a sacrificial layer. Furthermore, the at least one weakened region may also be formed in a negative electrode active material layer of a negative electrode subunit, and/or in a positive electrode active material layer of a positive electrode subunit. The at least one weakened layer may also be formed in a separator layer. In one embodiment, the weakened region is formed through multiple layers of the subunit. In another embodiment the at least one subunit weakened region extends through a thickness of the subunit in the stacking direction.

Figure 51A:
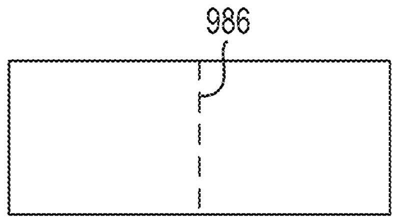
FIGS. 51A-51E illustrate embodiments of electrode subunits having different configurations and/or arrangements of weakened regions therein, according to aspects herein.
Figure 51B:
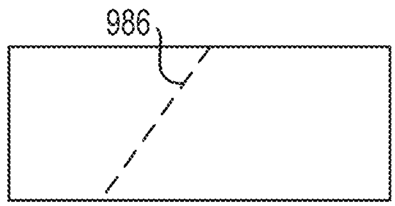
Figure 51C:
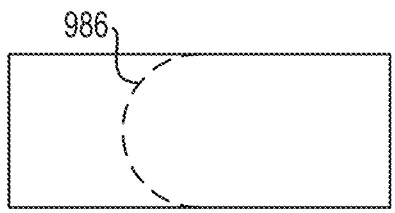
Figure 51C:
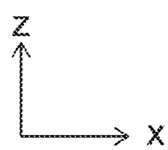
Figure 51D:
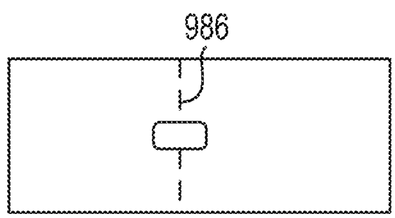
Figure 51E:
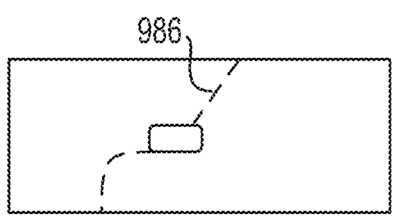

Referring to FIGS. 51A-51E, in one embodiment, the at least one weakened region traverses at least a portion of height of the positive electrode and/or negative electrode subunit in the Z direction orthogonal to the stacking direction Y and the tensioning direction, between first and second opposing surfaces thereof. In another embodiment, the at least one weakened region traverses at least a portion of a substantially straight line between first and second opposing surfaces of the negative electrode subunit and/or positive electrode subunit in the third direction, as shown in FIG. 51A. In another embodiment, the at least one weakened region traverses at least a portion of a diagonal line between first and second opposing surfaces of the negative electrode subunit and/or positive electrode subunit in the third direction, as shown in FIG. 51B. In another embodiment, the at least one weakened region traverses at least a portion of a curved line between first and second opposing surfaces of the negative electrode subunit and/or positive electrode subunit in the third direction, as in FIG. 51C. In yet another embodiment, the at least one subunit weakened region comprises a combination of weakened features, as in FIGS. 51D-51E. In one embodiment, the negative electrode subunit and/or positive electrode subunit comprises one or more separated regions, with one or more regions where the negative electrode subunit and/or positive electrode subunit comprises perforations and/or thinning of the subunit in the stacking direction, as shown in FIGS. 51D-51E.

Figure 48K:
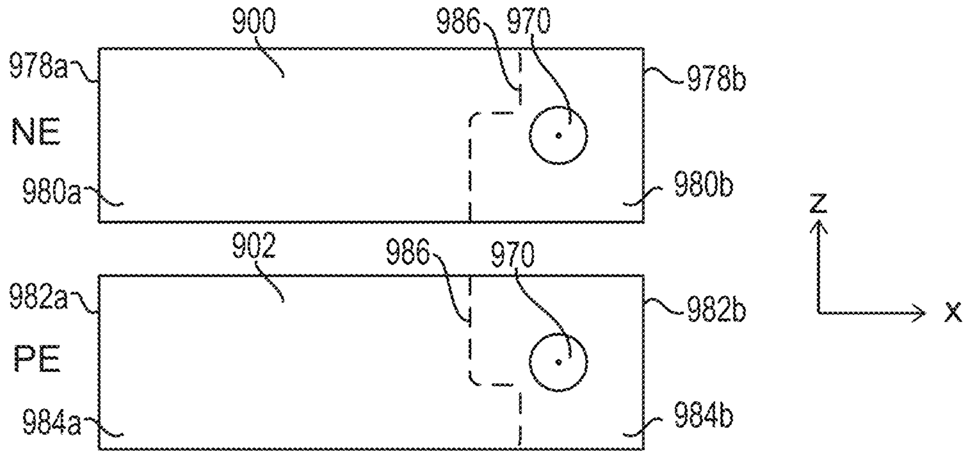
Figure 48L:
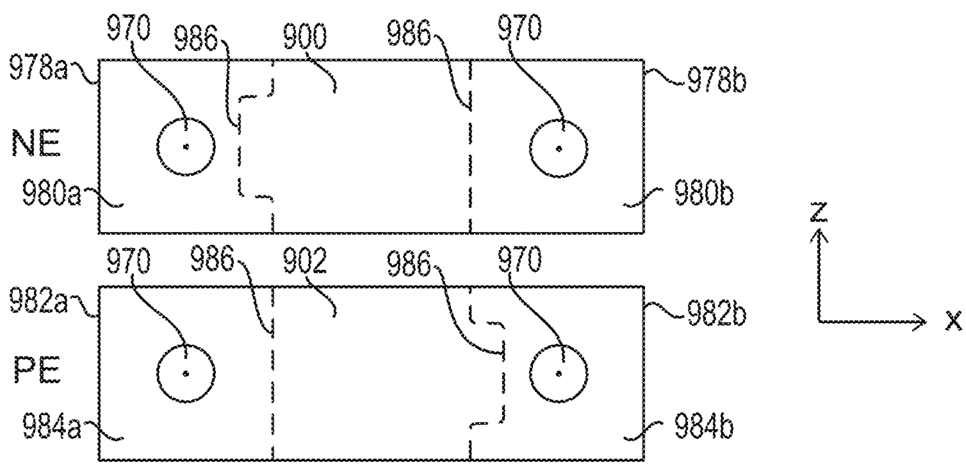
Figure 53A:
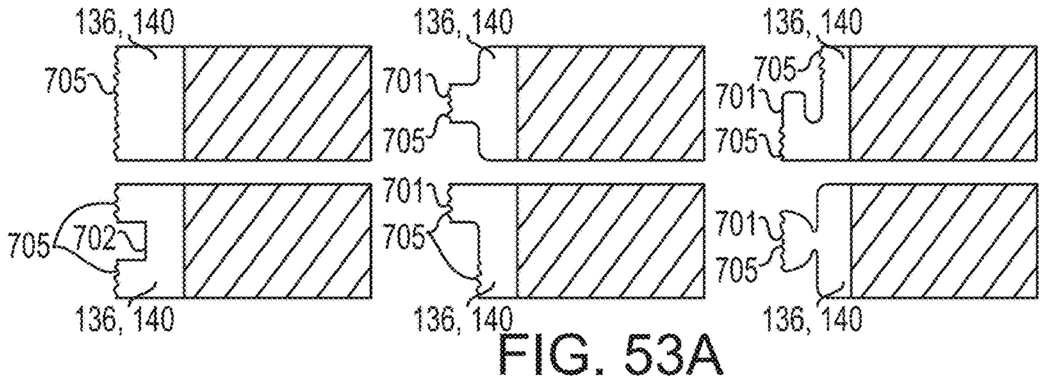
FIGS. 53A-53D illustrate embodiments of electrode subunits having current collector ends exposed by removal of portion of the subunits at a weakened region thereof, and depicting embodiments of different shapes and configurations of eth exposed current collector for electrically connecting to a busbar, according to aspects herein.
Figure 53B:
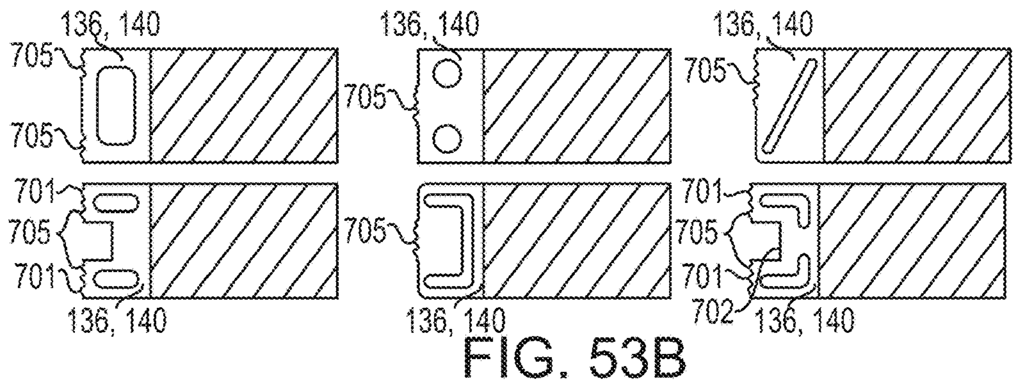
Figure 53C:
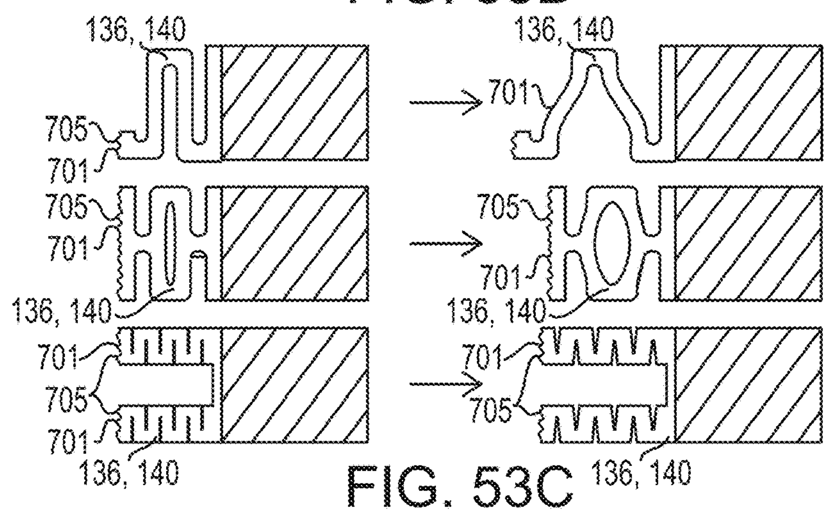
Figure 53D:
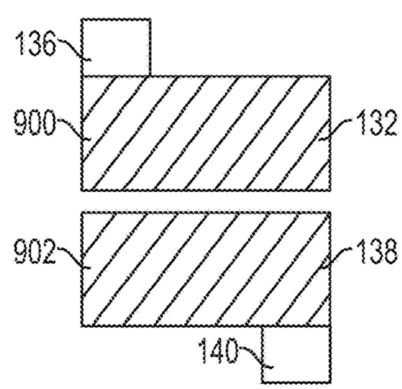
Figure 55:
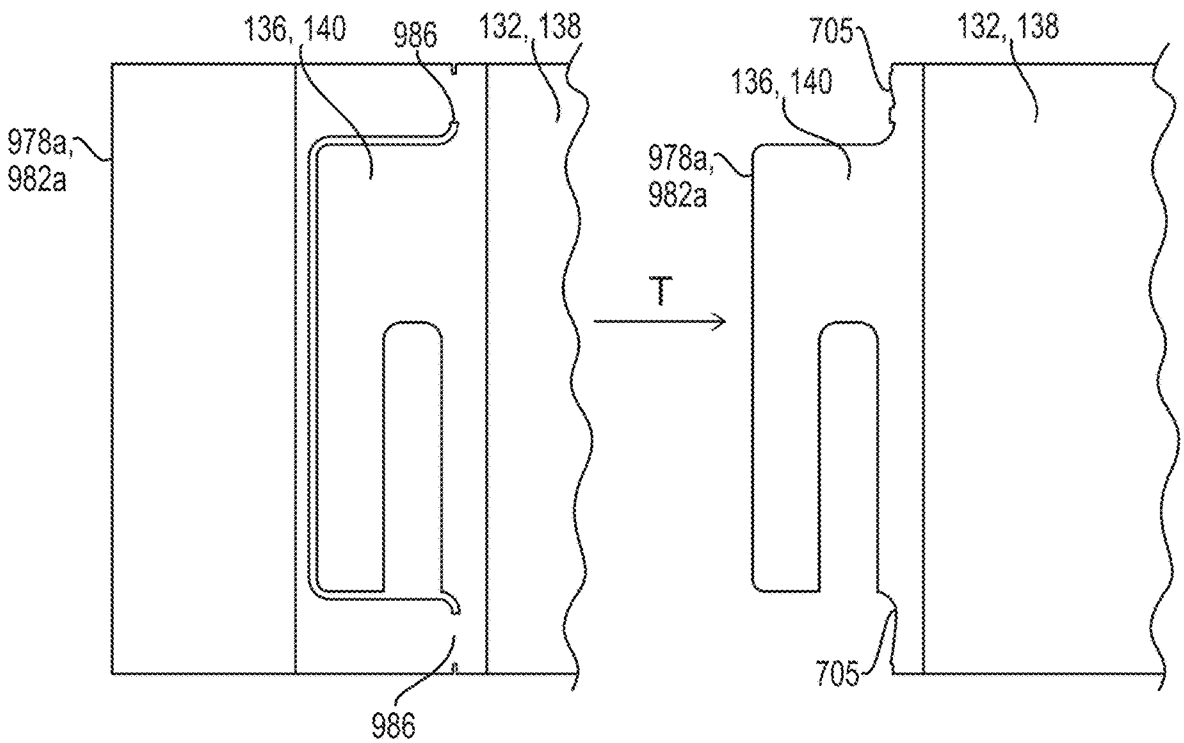
FIG. 55 is a schematic of an image of a negative electrode subunit before and after a current collector end is exposed following removal of an end portion of the negative electrode subunit, and showing the plastic deformation at portions of the current collector end resulting from the removal of the end portion at the current collector end.

According to one embodiment, the at least one weakened region at least partially traces a current collector end feature 700 of the negative electrode subunit and/or positive electrode subunit, as shown for example in FIGS. 48K-48L and 53A-53D. In one embodiment, the at least one subunit weakened region at least partially traces a current collector end protrusion 701 of the negative subunit and/or positive electrode subunit, as shown in FIGS. 53A, 53C and 48K-48L. In another embodiment, the at least one weakened region at least partially traces one or more current collector end protrusions 701 and a current collector end indentation 702 of the negative electrode subunit and/or positive electrode subunit, as shown in FIG. 53B. In yet another embodiment, the at least one weakened region at least partially traces a current collector end that extends in a Z direction from the electrode active material, for example as shown in FIG. 53D, and wherein the negative electrode subunit and positive electrode subunit may have current collectors that extend in opposing directions in Z. According to one embodiment, the at least one subunit weakened region at least partially traces a hook-shaped current collector end protrusion 701 of the negative electrode subunit and/or positive electrode subunit, as shown for example in FIG. 55. Furthermore, as shown in FIG. 48K, in one embodiment, the at least one weakened traces current collector protrusions 701 on the negative and positive electrode subunits that are on a same side in the X direction of the subunits, but that are offset in the Z direction from each other. According to yet another embodiment, the at least one weakened region in the negative electrode subunit at least partially traces one or more current collector end protrusions in the negative electrode subunit, and the at least one weakened region in the positive electrode subunit at least partially traces one or more current collector protrusions in the positive electrode subunit, and wherein the one or more negative electrode current collector ends are offset from the one or more positive-electrode current collector ends in one or more of the tensioning and Z directions, as shown in FIG. 45F. In yet another embodiment, the one or more negative electrode current collector ends are on a first side of the negative electrode subunit, and the one or more positive electrode current collector ends are on a second side of the positive electrode subunit, the first side opposing the second side in the tensioning direction. According to yet another embodiment, the one or more negative electrode current collector ends are on a same side as the one or more positive electrode current collector ends in the tensioning direction, and the one or more negative electrode current collector ends comprise at least a portion thereof that is offset in the Z direction from at least a portion of the one or more positive electrode current collector ends.

Figure 46A:
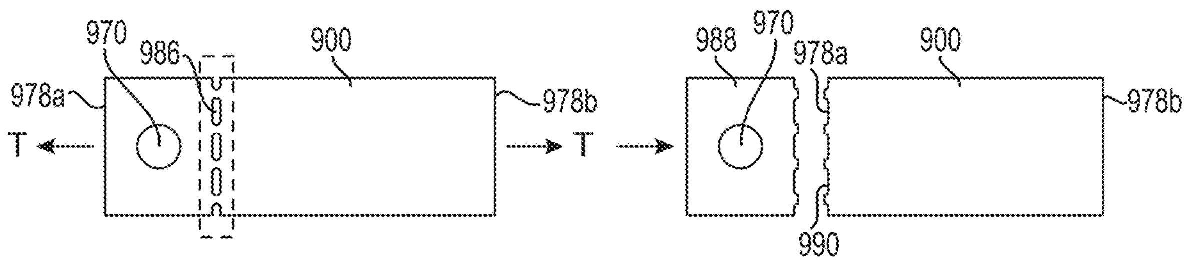
FIGS. 46A-46C illustrate embodiments of an electrode subunit having weakened regions therein, and removal of at least a portion of the electrode subunit at the weakened region, according to aspects herein.
Figure 46B:
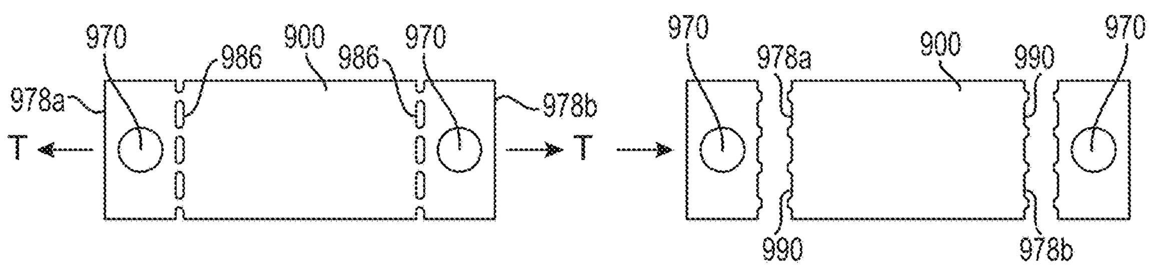
Figure 46C:
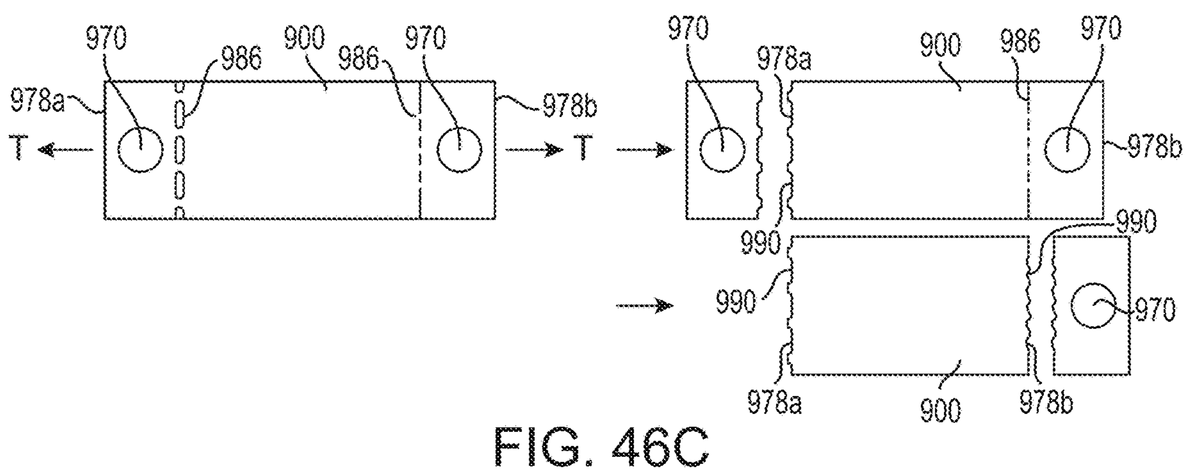

In one embodiment, to remove the at least one portion, tension is simultaneously applied to both opposing end margins on both sides of the negative electrode subunit and/or positive electrode subunit, to remove portions of the negative electrode and/or positive electrode subunits adjacent the weakened regions at both opposing end margins, for example as shown in FIG. 46B. According to yet another embodiment, to remove the at least one portion, a tension may be applied, sequentially, to a first end margin on a first side of the negative electrode subunit and/or positive electrode subunit, followed by applying tension to a second end margin on a second side of the negative electrode subunit and/or positive electrode subunit, to remove portions of the negative electrode subunit and/or positive electrode subunits adjacent the weakened regions at both opposing end margins, as shown for example in FIG. 46C. Furthermore, in certain embodiments, the weakened region formed in a first opposing end margin may be weaker than a weakened region formed in a second opposing end margin, such that the portion in the first end margin releases at a lower tensioning force than the portion in the second end margin, as shown in FIG. 46D with two weakened regions, one being more highly perforated than the other. In another embodiment, as shown in FIG. 46A, tension is applied to both opposing end margins, to remove just one portion on one side of the positive and/or negative electrode subunit. Furthermore, according to one embodiment, a method can comprise, while maintaining the alignment of the interior portions of the negative electrode subunit and positive electrode subunit with respect to one another in the tensioning direction, simultaneously applying tension to a first opposing end margin on a first side of the negative electrode subunit, and applying tension to a second opposing end margin on a second side of the positive electrode subunit, to remove a portion of the negative electrode subunit at the first end margin on the first side and a portion of the positive electrode subunit at the second end margin at the second side. In another embodiment, a method can comprise, while maintaining the alignment of the interior portions of the negative electrode subunit and positive electrode subunit with respect to one another in the tensioning direction, sequentially, applying tension to a first opposing end margin on a first side of the negative electrode subunit, followed by applying tension to a second opposing end margin on a second side of the positive electrode subunit, to remove a portion of the negative electrode subunit at the first end margin on the first side and a portion of the positive electrode subunit at the second end margin at the second side. In yet another embodiment, a methods can comprise, while maintaining the alignment of the interior portions of the negative electrode subunit and positive electrode subunit with respect to one another in the tensioning direction, sequentially, applying tension to a first opposing end margin on a first side of the positive electrode subunit, followed by applying tension to a second opposing end margin on a second side of the negative electrode subunit, to remove a portion of the positive electrode subunit at the first end margin on the first side and a portion of the negative electrode subunit at the second end margin at the second side.

As described herein, according to one embodiment, at least one of the negative electrode subunit and positive electrode subunit comprise an alignment feature formed in at least one of the opposing end margins thereof, as shown for example in FIGS. 48A-48M. In one embodiment, at least one of the negative electrode subunit and the positive electrode subunit comprise alignment features formed in both opposing end margins thereof, as shown in FIG. 48F. In yet another embodiment, both the negative electrode subunit and the positive electrode subunit comprise alignment features formed in at least one of the opposing end margins thereof, as shown for example in FIGS. 48A-48B. In yet another embodiment, both the negative electrode subunit and the positive electrode subunit comprise alignment features formed in both opposing end margins thereof. In a further embodiment, the tensioning force is applied to remove the portion of the negative electrode subunit and/or positive electrode subunit adjacent the weakened region in the at least one end margin, by pulling the at least one alignment pin placed in an alignment feature at one end of the negative electrode subunit and/or positive electrode subunit, in the tensioning direction and away from the second end of the negative electrode subunit and/or positive electrode subunit. In another embodiment, the tensioning force is applied to remove the portion of the negative electrode subunit and/or positive electrode subunit adjacent the weakened region in the at least one end margin, by simultaneously pulling alignment pins in alignment features on opposing ends of the negative electrode subunit and/or positive electrode subunit in opposing directions in the tensioning direction. In one embodiment, the alignment feature is formed in an opposing end margin that is removed upon application of the tension, as shown in FIG. 48A. In another embodiment, the alignment feature is formed in an end margin that opposes an end margin where a portion adjacent a subunit weakened region is removed, as shown in FIG. 48B.

According to one embodiment, the negative electrode subunit and positive electrode subunit both comprise alignment features in at least one end margin thereof, and an alignment feature in at least one of the negative electrode subunit and positive electrode subunit comprises a slot having a translation dimension in the tensioning direction, as shown in FIG. 48A, such that when an alignment pin inserted into the alignment features of the negative electrode subunit and positive electrode subunit on a first side is pulled outwardly in a tensioning direction away from the second side of the negative electrode subunit and positive electrode subunit, the alignment pin applies a tension to the end margin of the negative electrode subunit and/or positive-electrode subunit having the smaller dimension of the alignment feature via tension applied to the negative electrode subunit alignment feature, while the alignment pin translates through the translation dimension of the slot in the tensioning direction in the other of the negative electrode subunit and/or positive electrode subunit. According to yet another embodiment, the alignment feature of the negative electrode subunit and/or positive electrode subunit is formed in the same end margin as the at least one weakened region, and applying tension via the alignment pin results in removal of the portion of the end margin comprising the alignment feature in the negative electrode subunit and/or positive electrode subunit, as shown in FIG. 48A. In another embodiment, the alignment feature of the negative electrode subunit and/or positive electrode subunit is formed in an end margin opposing an end margin where at least one subunit weakened region is formed, and applying tension via the alignment pin results in removal of the portion of the end margin of the negative electrode subunit and/or positive electrode subunit opposing the end margin where the alignment feature is located, as shown in FIG. 48B. In yet another embodiment, alignment features are formed in end margins having the at least one subunit weakened region on a same side of both the negative electrode subunit and the positive electrode subunit, and applying tension via the alignment pin results in removal of the portions of the end margins comprising the alignment features on the same sides in the negative electrode subunits and positive electrode subunits, as shown in FIG. 48C. In another embodiment, alignment features are formed in end margins on a same side of both the negative electrode subunit and the positive electrode subunit that oppose end margins where the at least one weakened region is formed in each negative electrode subunit and positive electrode subunit, and applying tension via the alignment pin results in removal of the portions of the end margins of the negative electrode subunits and positive electrode subunits opposing the end margins where the alignment features are located, as shown in FIG. 48D.

In yet another embodiment, both the negative electrode subunit and positive electrode subunit comprise alignment features at opposing end margins of each sheet thereof, and at least one of the negative electrode subunit and positive electrode subunit comprise an alignment feature formed in an end margin comprising the at least one weakened region therein, and the other of the negative electrode subunit and positive electrode subunit comprise an alignment feature comprising a slot having a translation dimension in the tensioning direction that is greater than that of the alignment feature in the other of the negative electrode subunit and/or positive electrode subunit, the alignment feature comprising the slot being on a same side as the alignment feature formed in the end margin having the at least one subset weakened region. Applying of tension via insertion of a set of alignment pins into the alignment features on both sides of the stacked population results in removal of the portion of the negative electrode and/or positive electrode subunit in the end margin having the subset weakened region, and translation of the pin in the translation dimension of the alignment feature comprising the slot of the other of the negative electrode subunit and/or positive electrode subunit, as shown in FIG. 48F.

In yet a further embodiment, the stacked population comprises alignment features in both opposing end margins of each of the negative electrode subunit and positive electrode subunit, and alignment features on a first side of the negative electrode subunit and second opposing side of the positive electrode subunit are in end margins comprising the at least one subunit weakened region therein, and alignment features formed on a second side of the negative electrode subunit and a first side of the positive electrode subunit comprise slots having translation dimensions in the tensioning direction that are greater than that of the alignment features formed in the other of the negative electrode subunit and positive electrode subunit on the same respective side. Applying of tension via insertion of a set of alignment pins into the alignment features on both sides of the stacked population results in removal of the portion of the negative electrode and positive electrode subunit in the end margin having the subset weakened region, and translation of the pin in the translation dimension of the alignment features comprising the slots in the other opposing end margins, as shown in FIG. 48G.

In yet another embodiment, the stacked population comprises alignment features in both opposing end margins of each of the negative electrode subunit and positive electrode subunit, and alignment features are formed in the end margin of a first side of the negative electrode subunit having at least one subunit weakened region, and the end margin of a first side of the positive electrode subunit having at least one subunit weakened region on the same side. Applying of tension via insertion of a set of alignment pins into the alignment features on both sides of the negative electrode subunit and positive electrode subunit results in removal of the portion of the negative electrode and positive electrode subunit in the end margins on the same side having the weakened region, as shown in FIG. 48H. According to another embodiment, the stacked population comprises alignment features in both opposing end margins of each of the negative electrode subunit and the positive electrode subunit, and alignment features on a first side of the negative electrode subunit and same first side of the positive electrode subunit are in end margins comprising the at least one weakened region therein. The alignment feature on the second opposing side of either the negative electrode subunit or positive electrode subunit is in an end margin comprising at least one subunit weakened region therein, and the alignment features formed on a second opposing side of the other of the negative electrode subunit and positive electrode subunit comprises a slot having translation dimensions in the tensioning direction that is greater than that of the alignment feature formed in the other of the negative electrode and positive electrode subunits on the same respective side. Applying of tension via insertion of a set of alignment pins into the alignment features on both sides of the stacked population results in removal of the portion of the negative electrode and positive electrode subunit in the end margin on the first side having the weakened region, removal of the portion of the negative electrode subunit or positive electrode subunit in the end margin on the second side having the weakened region, and translation of the pin in the translation dimension of the alignment feature comprising the slots in the end margin on the second side of the other of the negative electrode subunit or positive electrode subunit, as shown in FIG. 48I. According to yet another embodiment, the stacked population comprises alignment features in both opposing end margins of each of the negative electrode subunit and positive electrode subunit, and alignment features on both first and second sides of the negative electrode subunit and the positive electrode subunit are in end margins comprising the at least one subset weakened region therein. Applying of tension via insertion of a set of alignment pins into the alignment features on both sides of the stacked population results in removal of the portions of the negative electrode and positive electrode subunit in the end margins on the first side and second sides having the weakened regions, as shown in FIG. 48J.

In one embodiment, the stacked population comprises alignment features in end margins on a same side of each of the negative electrode subunit and the positive electrode subunit, and the alignment feature of one of the negative electrode subunit and positive electrode subunit is formed in an end margin of a first side comprising the at least one subunit weakened region therein, and the alignment feature on the other of the negative electrode subunit or positive electrode subunit is in an end margin on the first side that is opposing a second side having an end margin with the at least one subunit weakened region therein. Applying of tension via insertion of a set of alignment pins into the alignment features on the same side of the stacked population results in removal of the portion of the negative electrode subunit and/or positive electrode subunit in the end margin on the first side having the subunit weakened region, and removal of the portion of the negative electrode subunit or positive electrode subunit in the end margin on the second side having the subset weakened region that is opposing the first end with the end margins where the alignment features are formed, as shown in FIG. 48I.

Figure 48M:
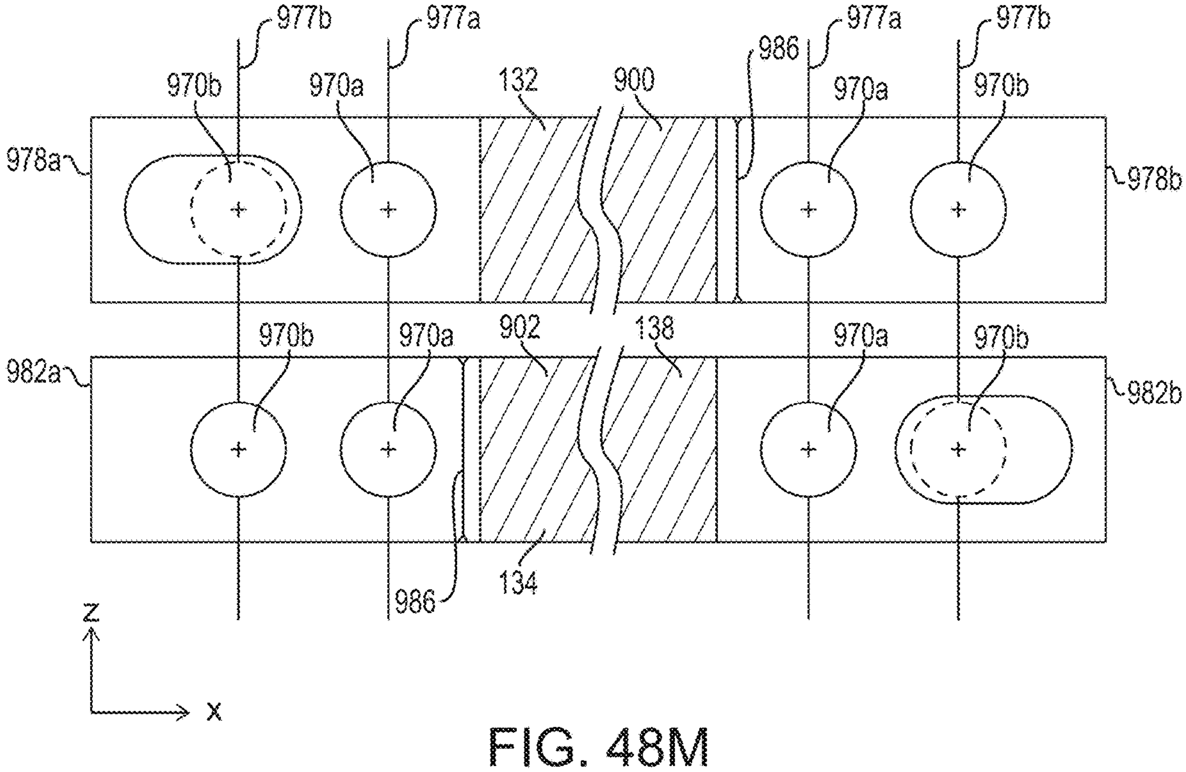

According to one embodiment, the alignment features on one or more of the negative electrode subunits and/or positive electrode units comprise a slot with a translation dimension in the tensioning direction, as shown in FIG. 49. In another embodiment, the subunit alignment features on each of the negative electrode subunit and/or positive electrode subunit comprise a slot with a translation dimension in the Z direction orthogonal to the tensioning direction and stacking direction, as shown in FIG. 49. In one embodiment, the subunit alignment features on each of the negative electrode subunits and/or positive electrode subunits comprise round apertures sized to allow an alignment pin to pass therethrough, and may be further sized to provide for a tensioning force to be exerted via the alignment feature upon exerting a tensioning force with the alignment pin, as shown for example in FIGS. 49 and 50B. In a further embodiment, the subunit alignment features comprise a combination of slots with translation dimensions, and round apertures. In another embodiment, the subunit alignment features comprise a first set of apertures 970*a* to provide for stacking and alignment of the negative electrode subunits and positive electrode subunits, and the negative electrode and/or positive electrode subunits further comprise second set of apertures 970*b* through which pins can be inserted to exert a tensioning force on one or more of the stacked negative electrode and positive electrode subunits, as shown in FIG. 48M. In one embodiment, the second set of apertures 970*b* comprise holes in end margins having at least one weakened region, and slots having a translation dimension on one opposing side of each of the negative electrode subunit and positive electrode subunit. Applying tension results in removal of portions of the negative electrode subunit and positive electrode subunit on opposing sides thereof, at the subunit weakened locations, as shown in FIG. 48M. In one embodiment, the alignment features comprise apertures having an opening with a cross-section that is any one or more of rounded, triangular, square, oblong, oval, and rectangular, as shown in FIG. 50A. In another embodiment, the alignment features comprise apertures with inwardly protruding engagement portions about a circumference thereof to engage the alignment pins, as shown in FIG. 50B. According to yet another embodiment, the alignment features comprise apertures having an opening with a cross-section that is larger at a first side of the opening proximate to the end of the negative electrode subunit and/or positive electrode subunit, and is narrower at a second side of the opening that is distal to the end of the negative electrode subunit and/or positive electrode subunit, as shown in FIG. 50B.

In one embodiment, the receiving station is configured to receive the one or more subunits at a stacking position in the sheet feeding direction and sheet width direction that coincide with a removal position where the one or more subunits are separated from the one or more sheets at the removal station. Furthermore, the receiving station may receive the one or more subunits at a plurality of positions in the sheet feeding direction and/or sheet width direction that correspond to a plurality of separation positions along the sheet feeding direction and/or sheet width direction. In one embodiment, the receiving station is configured to maintain that portion of the stacked population that is stacked thereon in tension in the web width direction.

Figure 52A:
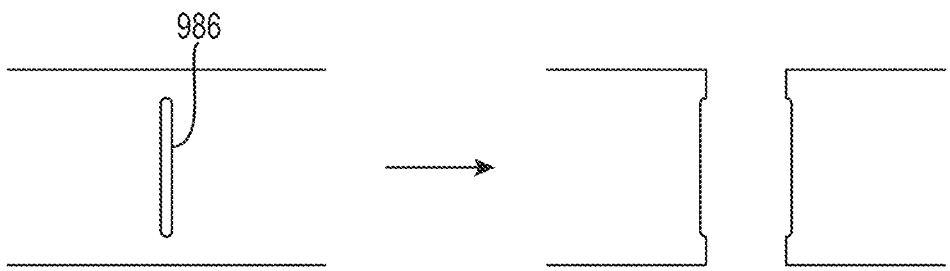
FIGS. 52A-52C illustrate different types of weakened regions formed in an electrode subunit, according to aspects herein.
Figure 52B:
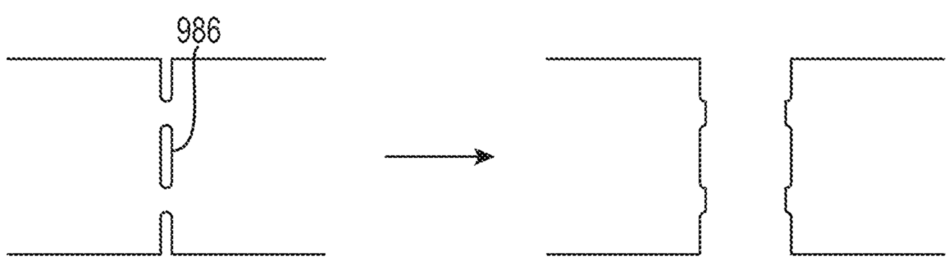
Figure 52C:
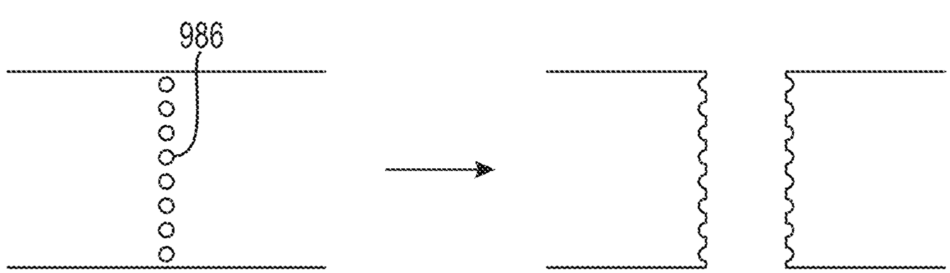

In yet another embodiment, as shown in FIGS. 52A-52C, weakened regions can be formed according to varying perforation patterns, according to a strength of the weakened region that may be suitable for the subunit.

Figure 54:
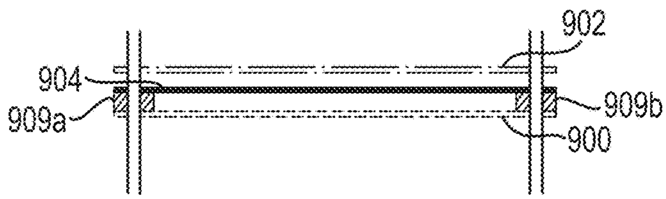
FIG. 54 illustrates an embodiment of a stacking process for stacking positive and/or negative electrode subunits in a stacked population, having spacer elements about a periphery an electrode subunit, according to aspects herein.

According to yet another embodiment, as shown in FIG. 54, a stacked population can be formed with negative electrode units 900, positive electrode units 902 and separator layers 904, and stacked on alignment pins 977 to align the stack and optionally provide for removal of a portion of one of the subunits, as has been described herein. However, further, at least one of the subunits may be provided with spacers 909*a,b* placed at the peripheral edges of the subunits (e.g., in the margins), to space the subunit away from an adjacent layer. The spacers may be provided to the subunit at any point before stacking on the alignment pins, for example the spacers may be provided as a part of the continuous web sheet of which the subunit is a part, or the spacers may be applied to the subunit immediately before removal of the subunit and stacking on the receiving unit. The spacers may be provided to a negative electrode unit, a positive electrode unit and/or a separator unit, and only one or a plurality of the units may have the spacers. In one embodiment, the spacers are placed in the edge margins on the subunits, exterior to the weakened regions, such that they are removed with the end portions of the subunits when the at least one portion is removed, for example by applying the tensioning force to the subunit.

Figure 56A:
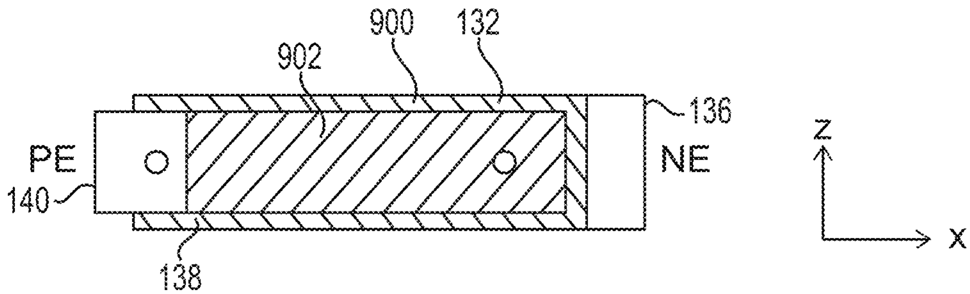
FIGS. 56A and 56B illustrate alternative embodiments of stacked positive and negative electrode subunits, showing a stack with alignment features remaining in the stack (56A) and a stack aligned by groove type alignment features (56B).
Figure 56B:
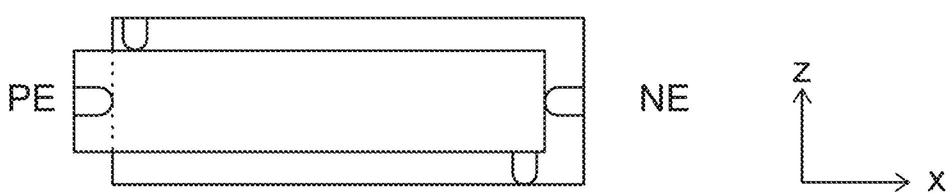

Furthermore, FIG. 56A gives an example of an embodiment where the stacked population is formed by stacking and aligning the negative electrode subunit 900 and positive electrode subunit 902, but no portion of the end margins of either of the subunits are removed. That is, the alignment features 970 using to align the subunits are simply maintained as a part of the stack. FIG. 56B provides yet another example of a method of alignment. In this embodiment, the alignment features 970 comprise open divots and/or groove type features formed in the negative electrode and positive electrode subunits. The divots can be formed in either or both of the X direction, to align the subunits along X, or along Y to align the subunits along Y. A pin or other engagement feature can be used to engage the feature and push the divot in one subunit until the edge of the other subunit is reached, on both opposing sides, indicating alignment.

Furthermore, according to one embodiment, an energy storage device (e.g., a secondary battery) having an electrode assembly is provided, the energy storage device comprising, in a stacked arrangement, a negative electrode subunit, a separator layer, and a positive electrode subunit. The electrode assembly comprises an electrode stack comprising a population of negative electrode subunits and a population of positive electrode subunits stacked in a stacking direction, each of the stacked negative electrode subunits having a length $L_E$ of the negative electrode subunit in a transverse direction that is orthogonal to the stacking direction, and a height $H_E$ of the negative electrode subunit in a direction orthogonal to both the transverse direction and stacking directions, wherein (i) each member of the population of negative electrode subunits comprises a first set of two opposing end surfaces that are spaced apart along the transverse direction, (ii) each member of the population of positive electrode subunits comprises a second set of two opposing end surfaces that are spaced apart along the transverse direction. Furthermore, at least one of the opposing end surfaces of the negative electrode subset and/or positive electrode subunit comprises regions 705 about the opposing end surfaces of one or more of the negative electrode subset and positive electrode subunit that exhibit plastic deformation and fracturing oriented in the transverse direction, due to elongation and narrowing of the cross-section of the negative electrode subunit and/or positive electrode subunit. For example, referring to FIG. 55, the deformation resulting from separation of the removed portion from the subunit can be seen at the area where the current collector attached to the removed portion (i.e., about the weakened region).

According to one aspect, the energy storage device manufactured according to the method described herein comprises a set of electrode constraints such as any of those described in further detail herein. For example, according to one embodiment, the set of electrode constraints 108 comprises a primary constraint system 151 comprising first and second primary growth constraints and at least one primary connecting member, the first and second primary growth constraints separated from each other in the longitudinal direction (stacking direction), and the at least one primary connecting member connecting the first and second primary growth constraints. The set of electrode constraints 108 may also comprise a secondary constraint system 155 comprising first and second secondary growth constraints and at least one secondary connecting member, the first and second second growth constraints separated from each other in a second direction that is orthogonal to the longitudinal direction (e.g., the Z direction), and the at least one secondary connecting member connecting the first and second secondary growth constraints, to reduce growth in the second direction, In one embodiment, the primary constraint array restrains growth of the electrode assembly in the longitudinal direction such that any increase in the Feret diameter of the electrode assembly in the longitudinal direction over 20 consecutive cycles of the secondary battery is less than 20%, where the charged state is at least 75% of a rated capacity of the secondary battery, and the discharged state is less than 25% of the rated capacity of the secondary battery. According to further embodiments, the energy storage device manufactured according to the method herein may even be capable of exhibiting reduced growth, such that growth of the electrode assembly in the longitudinal direction such that any increase in the Feret diameter of the electrode assembly in the longitudinal direction over 20 consecutive cycles of the secondary battery is less than 20%, where the charged state is at least 75% of a rated capacity of the secondary battery, and the discharged state is less than 25% of the rated capacity of the secondary battery. Furthermore, aspects of the energy storage device manufactured according to the method as claimed, may allow for an electrode assembly with reduced growth in the longitudinal direction, such that any increase in the Feret diameter of the electrode assembly in the stacking direction over 20 consecutive cycles and/or 50 consecutive cycles of the secondary battery is less than 3% and/or less than 2%, where the charged state is at least 75% of a rated capacity of the secondary battery, and the discharged state is less than 25% of the rated capacity of the secondary battery. The energy storage device manufactured according to embodiments of the method described herein may exhibit the reduced growth in the longitudinal and/or vertical directions, such as with the primary and/or secondary growth constraints, as is further described herein.

According to another embodiment, the negative electrode subunits and/or positive electrode subunits used to form the energy storage device may have dimensions that are the same as and/or similar to those described herein for electrode structures and/or counter-electrode structures. For example, the negative electrode subunits and/or positive electrode subunits may have a ratio of a length dimension L, to both the height H and width dimensions W of at least 5:1, such as at least 8:1 and even at least 10:1, and have a ratio of H to W in the range of 0.4:1 to 1000:1, such as in the range of 2:1 to 10:1. Furthermore, the energy storage device formed according to the method herein using the subunits may have electrodes and/or counter-electrodes and/or active material layers having the dimensions that are described elsewhere herein for these structures. For example, the energy storage device may comprise negative electrode active material from the negative electrode subunits and/or positive electrode active material from the positive electrode subunits having a ratio of a length dimension L, to both the height H and width dimensions W of at least 5:1, such as at least 8:1 and even at least 10:1, and have a ratio of H to W in the range of 0.4:1 to 1000:1, such as in the range of 2:1 to 10:1.

Electrode/Counter-Electrode Separation Distance

Figure 25A:
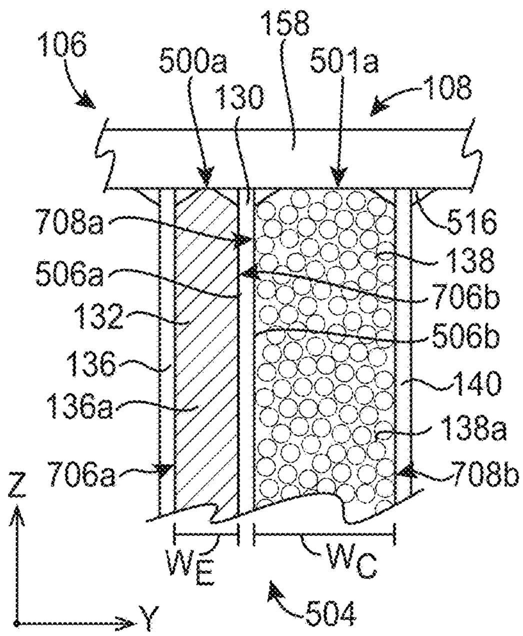
FIGS. 25A-25H illustrate cross-sections in a Z-Y plane, of embodiments of unit cells having electrode and counter-electrode active material layers, both with and without vertical offsets and/or separation distances.

In one embodiment, the electrode assembly 106 has electrode structures 110 and counter-electrode structures 112, where an offset in height (in the vertical direction) and/or length (in the transverse direction) between the electrode active material layers 132 and counter-electrode material layers 138, in neighboring electrode and counter-electrode structures 110, 112, is selected to be within a predetermined range. By way of explanation, FIG. 25A depicts an embodiment of a section of an electrode assembly 106 comprising an electrode active material layer 132 of an electrode structure 110, adjacent a counter-electrode active material layer 138 of a counter-electrode structure 112, with a microporous separator 130 therebetween. In this cross-sectional cut-away as shown, the height in the z direction of the electrode active material layer 132 is roughly equivalent to the height in the z direction of the counter-electrode active material layer 138. While structures with a same height of the electrode active material layer 132 and counter-electrode active material layer 138 may have benefits in terms of matching of the carrier ion capacity between the layers, thereby improving the storage capacity of a secondary battery 102 having equal height layers, such equal height layers can also be problematic. Specifically, for counter-electrode active material layers 138 that have a height that is excessively close to that of the electrode active material layers 132, the carrier ions may become attracted to a vertical end surface 500 of the electrode active material layer 132, and/or an exposed portion of an electrode current collector 136 forming a part of the electrode structure 110. The result may be plating out of carrier ions and/or the formation of dendrites, which can ultimately lead to performance degradation and/or failure of the battery. While the height of the cathode active material layer 138 can be reduced with respect to the electrode active material layer 34 to mitigate this issue, excessive inequalities in size effect the storage capacity and function of the secondary battery. Furthermore, even when an offset or separation distance between the layers 138, 132 is provided, it may be the case that mechanical jarring or bumping of a secondary battery having the layers, such as during use or transport of the secondary battery 106, can move and alter the alignment of the layers 138, 132, such that any original offset and/or separation distance between the layers becomes negligible or is even eliminated.

Accordingly, aspects of the present disclosure are directed to the discovery that, by providing a set of constraints 108 (such as a set corresponding to any of the embodiments described herein) an alignment between the layers 138, 132 in the electrode structures 110 and counter-electrode structures 112 can be maintained, even under physical and mechanical stresses encountered during normal use or transport of the secondary battery. Thus, a predetermined offset and/or separation distance can be selected that is small enough to provide good storage capacity of the secondary battery 106, while also imparting reduced risk of shorting or failure of the battery, with the predetermined offset being as little as 5 μm, and generally no more than 500 μm.

Referring to FIGS. 25A-25H, further aspects according to the present disclosure are described. Specifically, it is noted that the electrode assembly 106 comprises a population of electrode structures 110, a population of electrode current collectors 136, a population of separators 130, a population of counter-electrode structures 112, a population of counter-electrode collectors 140, and a population of unit cells 504. As also shown by reference to FIGS. 1B and 2A, members of the electrode and counter-electrode structure populations are arranged in an alternating sequence in the longitudinal direction. Each member of the population of electrode structures 110 comprises an electrode current collector 136 and a layer of an electrode active material 132 having a length $L_E$ that corresponds to the Feret diameter as measured in the transverse direction between first and second opposing transverse end surfaces 502*a,b* of the electrode active material layer (see, e.g., FIG. 26A) and a height $H_E$ that corresponds to the Feret diameter of the electrode active material layer as measured in the vertical direction between first and second opposing vertical end surfaces 500*a,b* of the electrode active material layer 132 (see, e.g., FIG. 30). Each member of the population of electrode structures 110 also has a layer of electrode active material 132 having a width $W_E$ that corresponds to the Feret diameter of the electrode active material layer 132 as measured in the longitudinal direction between first and second opposing surfaces of the electrode active material layer (see, e.g., FIG. 25A). Each member of the population of counter-electrode structures further comprises a counter-electrode current collector 140 and a layer of a counter-electrode active material 138 having a length $L_C$ that corresponds to the Feret diameter of the counter-electrode active material (see, e.g., FIG. 26A), as measured in the transverse direction between first and second opposing transverse end surfaces 503*a,b* of the counter-electrode active material layer 138, and a height $H_C$ that corresponds to the Feret diameter as measured in the vertical direction between first and second opposing vertical end surfaces 501*a*, 501*b* of the counter-electrode active material layer 138 (see, e.g., FIG. 30). Each member of the population of counter-electrode structures 112 also has a layer of counter-electrode active material 138 having a width $W_C$ that corresponds to the Feret diameter of the counter-electrode active material layer 138 as measured in the longitudinal direction between first and second opposing surfaces of the electrode active material layer (see, e.g., FIG. 25A).

Figure 24A:
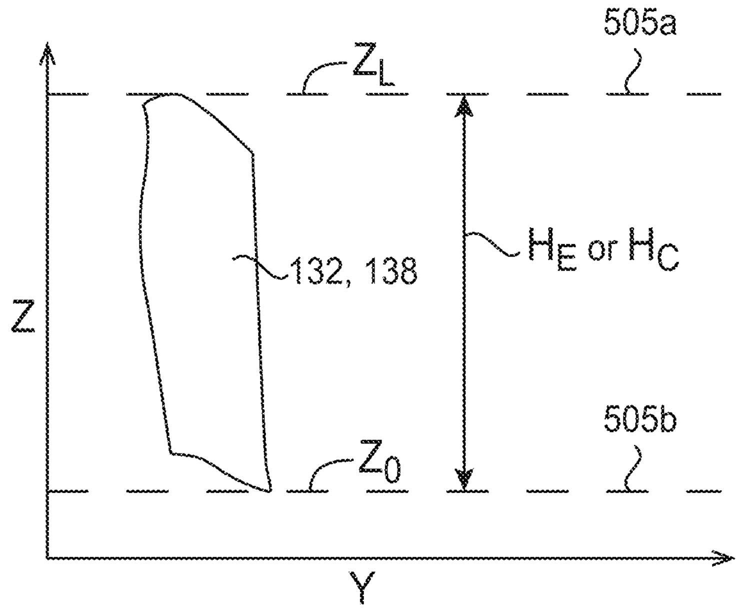
FIGS. 24A-24B illustrate embodiments for the determination of the height $H_E$, $H_C$ and length $L_E$, $L_C$ of the electrode and/or counter-electrode active material layers, according to the Feret diameters thereof.
Figure 24B:
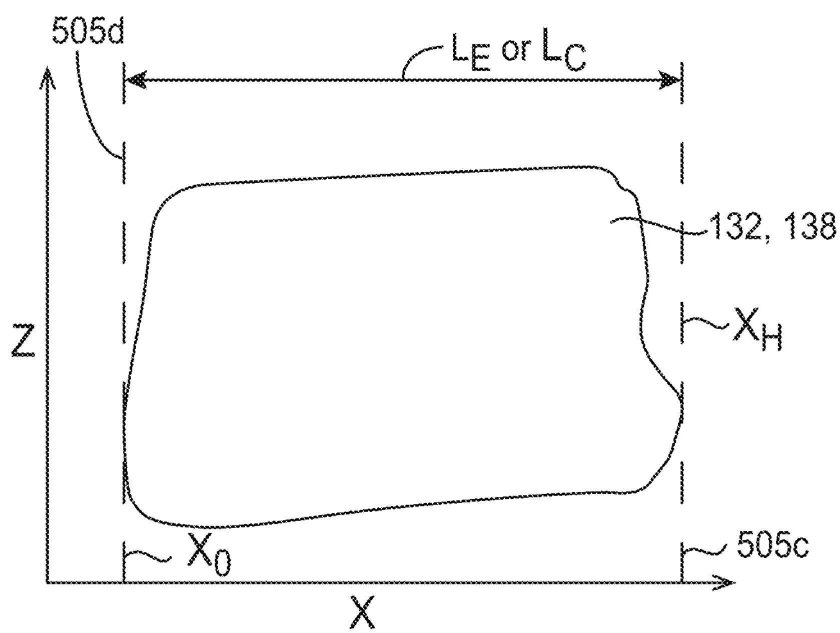

As defined above, a Feret diameter of the electrode active material layer 132 in the transverse direction is the distance as measured in the transverse direction between two parallel planes restricting the electrode active material layer that are perpendicular to the transverse direction. A Feret diameter of the electrode active material layer 132 in the vertical direction is the distance as measured in the vertical direction between two parallel planes restricting the electrode active material layer that are perpendicular to the vertical direction. A Feret diameter of the counter-electrode active material layer 138 in the transverse direction is the distance as measured in the transverse direction between two parallel planes restricting the counter-electrode active material layer that are perpendicular to the transverse direction. A Feret diameter of the counter-electrode active material layer 138 in the vertical direction is the distance as measured in the vertical direction between two parallel planes restricting the counter-electrode active material layer that are perpendicular to the vertical direction. For purposes of explanation, FIGS. 24A and 24B depict a Feret diameter for an electrode active material layer 132 and/or counter-electrode active material layer 138, as determined in a single 2D plane. Specifically, FIG. 24A depicts a 2D slice of an electrode active material layer 132 and/or counter-electrode active material layer, as take in the Z-Y plane. A distance between two parallel X-Y planes (505*a*, 505*b*) that restrict the layer in the z direction (vertical direction) correspond to the height of the layer H (i.e., $H_E$ or $H_C$) in the plane. That is, the Feret diameter in the vertical direction can be understood to correspond to a measure of the maximum height of the layer. While the depiction in FIG. 24A is only that for a 2D slice, for purposes of explanation, it can be understood that in 3D space the Feret diameter in the vertical direction is not limited to a single slice, but is the distance between the X-Y planes 505*a*, 505*b* separated from each other in the vertical direction that restrict the three-dimensional layer therebetween. Similarly, FIG. 24B depicts a 2D slice of an electrode active material layer 132 and/or counter-electrode active material layer 138, as take in the X-Z plane. A distance between two parallel Z-Y planes (505*c*, 505*d*) that restrict the layer in the x direction (transverse direction) correspond to the length of the layer L (i.e., $L_E$ or $L_C$) in the plane. That is, the Feret diameter in the transverse direction can be understood to correspond to a measure of the maximum length of the layer. While the depiction in FIG. 24B is only that for a 2D slice, for purposes of explanation, it can be understood that in 3D space the Feret diameter in the transverse direction is not limited to a single slice, but is the distance between the Z-Y planes 505*c*, 505*d* separated from each other in the transverse direction that restrict the three-dimensional layer therebetween. Feret diameters of the electrode active material layer and/or counter-electrode active material in the longitudinal direction, so as to obtain a width $W_E$ of the electrode active material layer 132 and/or width $W_C$ of the counter-electrode active material layer 138, can be similarly obtained.

In one embodiment, the electrode assembly 106, as has also been described elsewhere herein, can be understood as having mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction.

Figure 31A:
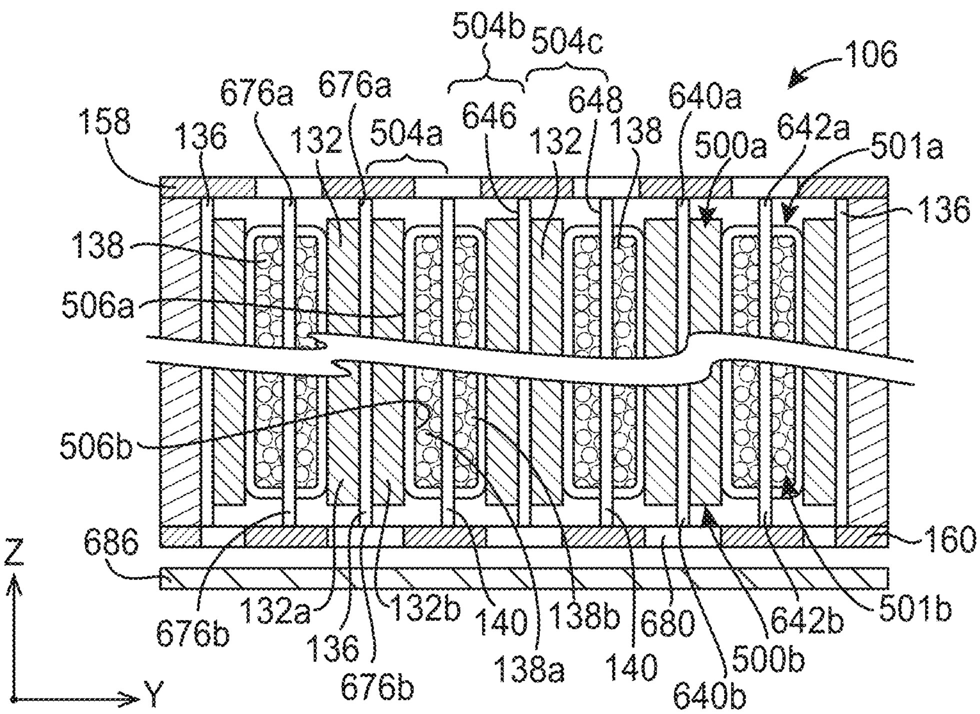
FIGS. 31A-31B illustrate cross-sections in a Z-Y plane, of embodiments of an electrode assembly, with auxiliary electrodes.

Referring again to FIGS. 25A-25H, it can be seen that each unit cell 504 comprises a unit cell portion of a first electrode current collector 136 of the electrode current collector population, a separator 130 that is ionically permeable to the carrier ions (e.g., a separator comprising a porous material), a first electrode active material layer 132 of one member of the electrode population, a unit cell portion of first counter-electrode current collector 140 of the counter-electrode current collector population and a first counter-electrode active material layer 138 of one member of the counter-electrode population. In one embodiment, in the case of contiguous and/or adjacent members 504*a*, 504*b*, 504*c* of the unit cell population (e.g., as depicted in FIG. 31A), at least a portion of the electrode current collector 136 and/or counter-electrode current collector may be shared between units (504*a* and 504*b*, and 504*b* and 504*c*). For example, referring to FIG. 31A, it can be seen that unit cells 504*a* and 504*b* share the counter-electrode current collector 140, whereas unit cells 504*b* and 504*c* share electrode current collector 136. In one embodiment, each unit cell comprises ½ of the shared current collector, although other structural arrangements can also be provided. According to yet another embodiment, for a current collector forming a part of a terminal unit cell at a longitudinal end of the electrode assembly 106, the unit cell 504 can comprise an unshared current collector, and thus comprises the entire current collector as a part of the cell.

Furthermore, referring again to the unit cells depicted in FIGS. 25A-25H and FIG. 31A, it can be seen that, within each unit cell 504, the first electrode active material layer 132*a* is proximate a first side 506*a* of the separator 130 and the first counter-electrode material layer 138*a* is proximate an opposing second side 506*b* of the separator 130. As shown in the embodiment of FIG. 31A, the electrode structures 110 comprise both the first electrode active material layer 132*a* forming a part of the unit cell 504*a*, as well as a second electrode active material layer 132*b* that forms a part of the next adjacent until cell in the longitudinal direction. Similarly, the counter-electrode structures 112 comprise both the first counter electrode active material layer 138*a* forming a part of the unit cell 504*a*, as well as a second counter-electrode active material layer 138*b* that forms a part of the next adjacent until cell (504*b*) in the longitudinal direction. The separator 130 electrically isolates the first electrode active material layer 132*a* from the first counter-electrode active material layer 138*a*, and carrier ions are primarily exchanged between the first electrode active material layer 132*a* and the first counter-electrode active material 138*a* layer via the separator 130 of each such unit cell 504 during cycling of the battery between the charged and discharged state.

Figure 22A:
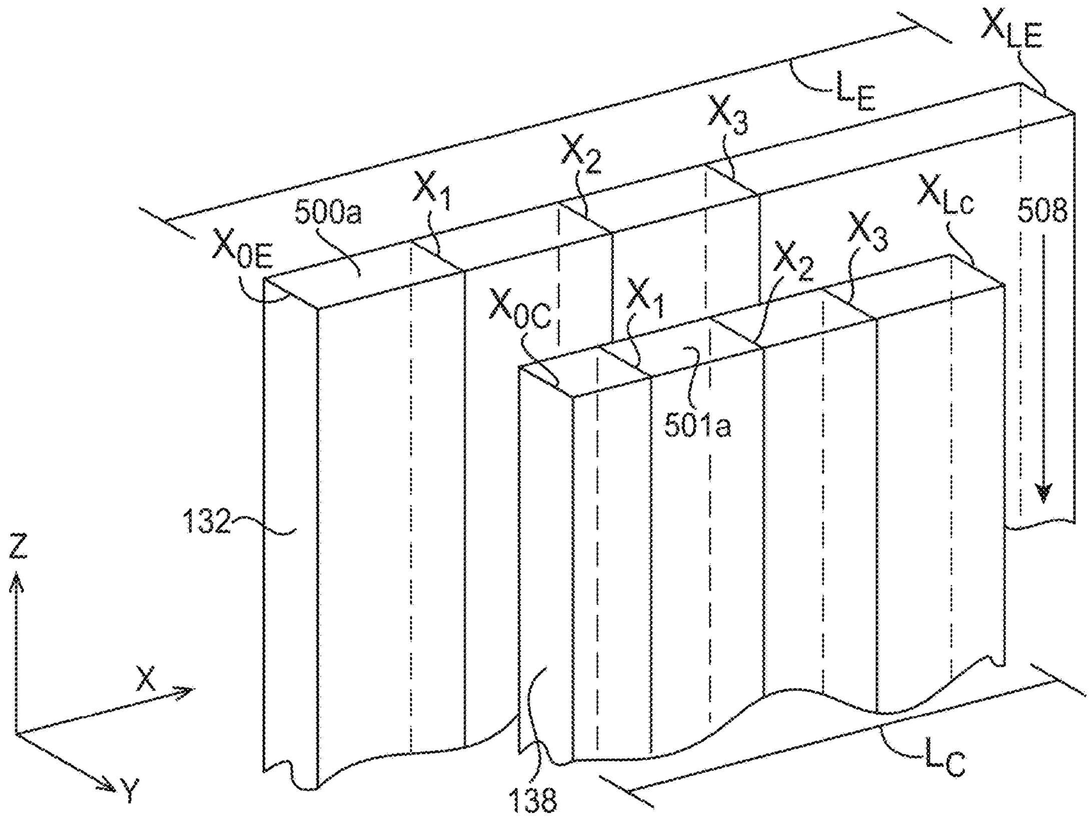
FIGS. 22A-22C illustrate embodiments for the determination of vertical offsets and/or separation distances $S_{Z1}$ and $S_{Z2}$, between vertical end surfaces of electrode and counter-electrode active material layers.
Figure 22B:
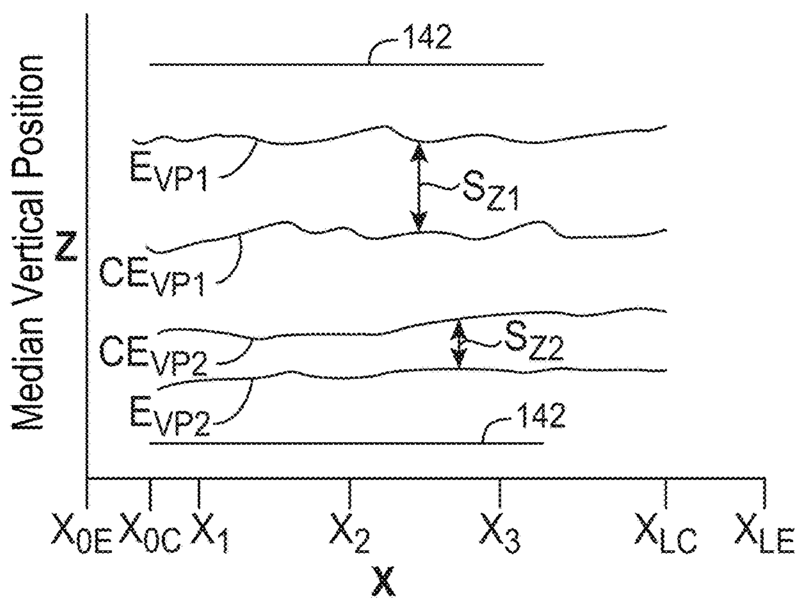
Figure 22C:
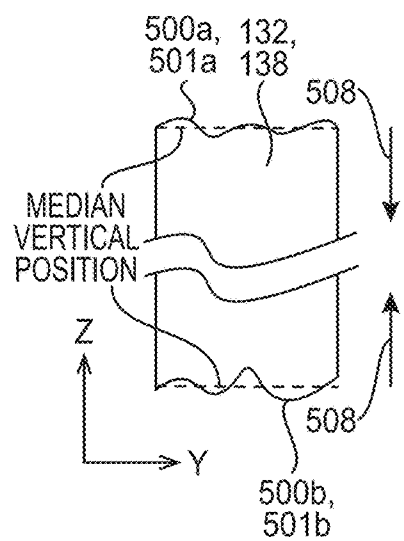

To further clarify the offset and/or separation distance between the first electrode active material layer 132*a* and the first counter-electrode active material layer 138*a* in each unit cell 504, reference is made to FIGS. 22A-C and 23A-C. Specifically, referring to FIGS. 22A-C, an offset and/or separation distance in the vertical direction is described. As depicted in FIG. 22A of this embodiment, the first vertical end surfaces 500*a*, 501*a* of the electrode and the counter-electrode active material layers 132, 138 are on the same side of the electrode assembly 106. Furthermore, a 2D map of the median vertical position of the first opposing vertical end surface 500*a* of the electrode active material 132 in the X-Z plane, along the length $L_E$ of the electrode active material layer, traces a first vertical end surface plot, $E_{VP1}$. That is, as shown by reference to FIG. 22C, for each ZY plane along the transverse direction (X), the median vertical position (z position) of the vertical end surface 500*a* of the electrode active material layer 132 can be determined, by taking the median of the z position for the surface, as a function of y, at the specific transverse position (e.g., $X_1$, $X_2$, $X_3$, etc.) for that ZY plane. FIG. 22C generally depicts an example of a line showing the median vertical position (z position) of the vertical end surface 500*a* for the specific ZY plane at the selected x slice (e.g., slice at $X_1$). (Note that FIG. 22C generally depicts determination of median vertical positions (dashed lines at top and bottom of figures) for vertical end surfaces generally, i.e. of either the first and second vertical end surface 500*a,b* of the electrode active material layer 132, and/or the first and second vertical end surfaces 501*a,b* of the counter-electrode active material layer 138.) FIG. 22B depicts an embodiment where the 2D map of this median vertical position, as determined along the length $L_E$ of the electrode active material (i.e., at each x position $X_1$, $X_2$, $X_3$ along the length $L_E$), traces first vertical end surface plot $E_{VP1}$ that corresponds to the median vertical position (z position) plotted as a function of x (e.g., at $X_1$, $X_2$, $X_3$, etc.). For example, the median vertical position of the vertical end surface 500*a* of the electrode active material layer 132 can be plotted as a function of x (transverse position) for x positions corresponding to $X_{0E}$ at a first transverse end of the electrode active material layer to $X_{LE}$ at a second transverse end of the electrode active material layer, where $X_{LE}$-$X_{L0}$ is equivalent to the Feret diameter of the electrode active material layer 132 in the transverse direction (the length $L_E$ of the electrode active material layer 132).

Similarly, in the case of the first opposing end surface 501*a* of the counter-electrode active material layer 138, a 2D map of the median vertical position of the first opposing vertical end surface 501*a* of the counter-electrode active material layer 138 in the X-Z plane, along the length $L_C$ of the counter-electrode active material layer 138, traces a first vertical end surface plot, $CE_{VP1}$. Referring again to FIG. 22C, it can be understood that for each ZY plane along the transverse direction, the median vertical position (z position) of the vertical end surface 501*a* of the counter-electrode active material layer 138 can be determined, by taking the median of the z position for the surface, as a function of y, at the specific transverse position (e.g., $X_1$, $X_2$, $X_3$, etc.) for that ZY plane. FIG. 22C generally depicts an example of a line showing the median vertical position (z position) of the vertical end surface 501*a* for the specific YZ plane at the selected x slice (e.g., slice at $X_1$). FIG. 22B depicts an embodiment where the 2D map of this median vertical position, as determined along the length $L_C$ of the counter-electrode active material (i.e., at each x position $X_1$, $X_2$, $X_3$ along the length $L_C$), traces first vertical end surface plot $CE_{VP1}$ that corresponds to the median vertical position (z position) plotted as a function of x (e.g., at $X_1$, $X_2$, $X_3$, etc.). For example, the median vertical position of the vertical end surface 501*a* of the counter-electrode active material layer 138 can be plotted as a function of x (transverse position) for x positions corresponding to $X_{0C}$ at a first transverse end of the counter-electrode active material layer to $X_{LC}$ at a second transverse end of the counter-electrode active material layer, where $X_{LC}$-$X_{L0}$ is equivalent to the Feret diameter of the counter electrode active material layer 138 in the transverse direction (the length $L_C$ of the counter-electrode active material layer 138).

Furthermore, the offset and/or separation distance requirements for the vertical separation between the first vertical surfaces 500*a*, 501*a* of the electrode active and counter-electrode active material layers 132, 138 require that, for at least 60% of the length $L_C$ of the first counter-electrode active material layer: (i) the absolute value of the separation distance, $S_{Z1}$, between the plots $E_{VP1}$ and $CE_{VP1}$ measured in the vertical direction is 1000 μm≥$|S_{Z1}|$≥5 μm. Also, in one embodiment, it is required that, for at least 60% of the length $L_C$ of the first counter-electrode active material layer: (ii) as between the first vertical end surfaces 500*a*, 500*b* of the electrode and counter-electrode active material layers 132, 138, the first vertical end surface of the counter-electrode active material layer is inwardly disposed (e.g., inwardly along 508) with respect to the first vertical end surface of the electrode active material layer. That is, by referring to FIG. 22B, it can be seen that the absolute value of the separation distance $S_{z1}$, that corresponds to the distance between the plots $E_{VP1}$ and $CE_{VP1}$ at any given point along x, is required to be no greater than 1000 μm, and no less than 5 μm, for at least 60% of the length $L_C$ of the first counter-electrode active material layer 138, i.e. for at least 60% of the position x from $X_{0C}$ to $X_{LC}$ (60% of the Feret diameter of the counter-electrode active material layer in the transverse direction). Also, it can be seen that the first vertical end surface of the counter-electrode active material layer is inwardly disposed with respect to the first vertical end surface of the electrode active material layer, for at least 60% of the length $L_C$ of the first counter-electrode active material layer 138, i.e. for at least 60% of the position x from $X_{0C}$ to $X_{LC}$ (60% of the Feret diameter of the counter-electrode active material layer in the transverse direction)

In one embodiment, the absolute value of $S_{Z1}$ may be ≥5 μm, such as ≥10 μm, ≥15 μm, ≥20 μm, ≥35 μm, ≥45 μm, ≥50 μm, ≥75 μm, ≥100 μm, ≥150 μm, and ≥200 μm. In another embodiment, the absolute value of $S_{Z1}$ may be ≤1000 microns, such as ≤500 μm, such as ≤475 μm, ≤425 μm, ≤400 μm, ≤375 μm, ≤350 μm, ≤ 325 μm, ≤300 μm, and ≤250 μm. In one embodiment, the absolute value of $S_{Z1}$ may follow the relationship 1000 μm≥$|S_{Z1}|$≥5 μm, and/or 500 μm≥$|S_{Z1}|$≥10 μm, and/or 250 μm≥$|S_{Z1}|$≥20 μm. In yet another embodiment, for a Feret Diameter of the width $W_E$ of the counter-electrode active material layer 132 in the unit cell, the absolute value of $S_{Z1}$ may be in a range of from $5\times W_E \geq |S_{Z1}| \geq 0.05\times W_E$. Furthermore, in one embodiment, any of the above values and/or relationships for $|S_{Z1}|$ may hold true for more than 60% of the length $L_C$ of the first counter-electrode active material layer, such as for at least 65%, at least 70%, at least 75%, at least 80%, at least 85%, at least 90%, and even at least 95% of the length $L_C$ of the first counter-electrode active material layer.

Furthermore, for at least 60% of the position x from $X_{0C}$ to $X_{LC}$ (60% of the Feret diameter of the counter-electrode active material layer in the transverse direction), the first vertical end surface of the of the counter-electrode active material layer is inwardly disposed with respect to the first vertical end surface of the electrode active material layer. That is, the electrode active material layer 132 can be understood to have a median vertical position (position in z in a YZ plane for a specified X slice, as in FIG. 22C) that is closer to the lateral surface, than the counter-electrode active material layer 130, for at least 60% of the length $L_C$ of the counter-electrode active material layer. Stated another way, the counter-electrode active material layer 138 can be understood to have a median vertical position (position in z in a YZ plane for a specified X slice, as in FIG. 22C) that is further along an inward direction 508 of the electrode assembly 106, than the median vertical position of the electrode active material layer 132. This vertical offset of the electrode active material layer 132 with respect to the counter-electrode active material layer 138 can also be seen with respect to the embodiment in FIG. 22A, which depicts a height of the electrode material layer 132 exceeding that of the counter-electrode active material layer 138, and the plots of FIG. 22B, which depicts the median vertical position $E_{VP1}$ of the electrode active material layer 132 exceeding the median vertical position $CE_{VP1}$ of the counter-electrode active material layer along the transverse direction. In one embodiment, the first vertical end surface of the of the counter-electrode active material layer is inwardly disposed with respect to the first vertical end surface of the electrode active material layer for more than 60% of the length $L_C$ of the first counter-electrode active material layer, such as for at least 65%, at least 70%, at least 75%, at least 80%, at least 85%, at least 90%, and even at least 95% of the length $L_C$ of the first counter-electrode active material layer.

In one embodiment, the relationship described above for the separation distance $S_{Z1}$ with respect to the first vertical end surfaces 500*a*, 501*a* of the electrode and counter-electrode active material layers 132, 138, also similarly can be determined for the second vertical surfaces 500*b*, 501*b* of the electrode and counter-electrode active material layers 132, 138 (e.g., as shown in FIG. 31A). That is, the second vertical end surfaces 500*b* and 501*b* are on the same side of the electrode assembly 106 as each other, and oppose the first vertical end surfaces 500*a*, 501*a* of the electrode and counter-electrode active material layers 132, 138, respectively. Furthermore, in analogy to the description given for the separation distance and/or offset $S_{Z1}$ given above, a 2D map of the median vertical position of the second opposing vertical end surface 500*b* of the electrode active material 132 in the X-Z plane, along the length $L_E$ of the electrode active material layer, traces a second vertical end surface plot, $E_{VP2}$. That is, as shown by reference to FIG. 22A-C, for each YZ plane along the transverse direction, the median vertical position (z position) of the second vertical end surface 500*b* of the electrode active material layer 132 can be determined, by taking the median of the z position for the surface, as a function of y, at the specific transverse position (e.g., $X_1$, $X_2$, $X_3$, etc.) for that YZ plane. FIG. 22C generally depicts an example of a line showing the median vertical position (z position) of the second vertical end surface 500*b* for the specific YZ plane at the selected x slice (e.g., slice at $X_1$). FIG. 22B depicts an embodiment where the 2D map of this median vertical position, as determined along the length $L_E$ of the electrode active material (i.e., at each x position $X_1$, $X_2$, $X_3$ along the length $L_E$), traces second vertical end surface plot $E_{VP2}$ that corresponds to the median vertical position (z position) plotted as a function of x (e.g., at $X_1$, $X_2$, $X_3$, etc.). For example, the median vertical position of the second vertical end surface 500*b* of the electrode active material layer 132 can be plotted as a function of x (transverse position) for x positions corresponding to $X_{0E}$ at a first transverse end of the electrode active material layer to $X_{LE}$ at a second transverse end of the electrode active material layer, where $X_{LE}$-$X_{L0}$ is equivalent to the Feret diameter of the electrode active material layer 132 in the transverse direction (the length $L_E$ of the electrode active material layer 132).

Similarly, in the case of the second opposing end surface 501*b* of the counter-electrode active material layer 138, a 2D map of the median vertical position of the second opposing vertical end surface 501*b* of the counter-electrode active material layer 138 in the X-Z plane, along the length $L_C$ of the counter-electrode active material layer 138, traces a second vertical end surface plot, $CE_{VP2}$. Referring again to FIGS. 22A-C, it can be understood that for each YZ plane along the transverse direction, the median vertical position (z position) of the second vertical end surface 501*b* of the counter-electrode active material layer 138 can be determined, by taking the median of the z position for the surface, as a function of y, at the specific transverse position (e.g., $X_1$, $X_2$, $X_3$, etc.) for that YZ plane. FIG. 22C generally depicts an example of a line showing the median vertical position (z position) of the second vertical end surface 501*b* for the specific YZ plane at the selected x slice (e.g., slice at $X_1$). FIG. 22B depicts an embodiment where the 2D map of this median vertical position, as determined along the length $L_C$ of the counter-electrode active material (i.e., at each x position $X_1$, $X_2$, $X_3$ along the length $L_C$), traces second vertical end surface plot $CE_{VP2}$ that corresponds to the median vertical position (z position) plotted as a function of x (e.g., at $X_1$, $X_2$, $X_3$, etc.). For example, the median vertical position of the second vertical end surface 501*b* of the counter-electrode active material layer 138 can be plotted as a function of x (transverse position) for x positions corresponding to $X_{0C}$ at a first transverse end of the counter-electrode active material layer to $X_{LC}$ at a second transverse end of the counter-electrode active material layer, where $X_{LC}$-$X_{L0}$ is equivalent to the Feret diameter of the counter electrode active material layer 138 in the transverse direction (the length $L_C$ of the counter-electrode active material layer 138).

Furthermore, the offset and/or separation distance requirements for the vertical separation between the second vertical surfaces 500*b*, 501*b* of the electrode active and counter-electrode active material layers 132, 138 require that, for at least 60% of the length $L_C$ of the first counter-electrode active material layer: (i) the absolute value of the separation distance, $S_{Z2}$, between the plots $E_{VP2}$ and $CE_{VP2}$ measured in the vertical direction is 1000 μm≥$|S_{Z2}|$≥5 μm. Also, in one embodiment, it is required that, for at least 60% of the length $L_C$ of the first counter-electrode active material layer: (ii) as between the second vertical end surfaces 500*b*, 501*b* of the electrode and counter-electrode active material layers 132, 138, the second vertical end surface of the counter-electrode active material layer is inwardly disposed with respect to the second vertical end surface of the electrode active material layer. That is, by referring to FIG. 22B, it can be seen that the absolute value of the separation distance $S_{Z2}$, that corresponds to the distance between the plots $E_{VP2}$ and $CE_{VP2}$ at any given point along x, is required to be no greater than 1000 μm, and no less than 5 μm, for at least 60% of the length $L_C$ of the first counter-electrode active material layer 138, i.e. for at least 60% of the position x from $X_{0C}$ to $X_{LC}$ (60% of the Feret diameter of the counter-electrode active material layer in the transverse direction). Also, it can be seen that the second vertical end surface of the of the counter-electrode active material layer is inwardly disposed with respect to the second vertical end surface of the electrode active material layer, for at least 60% of the length $L_C$ of the first counter-electrode active material layer 138, i.e. for at least 60% of the position x from $X_{0C}$ to $X_{LC}$ (60% of the Feret diameter of the counter-electrode active material layer in the transverse direction)

In one embodiment, the absolute value of $S_{Z2}$ may be ≥5 μm, such as ≥10 μm, ≥15 μm, ≥20 μm, ≥35 μm, ≥45 μm, ≥50 μm, ≥75 μm, ≥100 μm, ≥150 μm, and >200 μm. In another embodiment, the absolute value of $S_{Z2}$ may be ≤1000 microns, such as ≤500 μm, such as ≤475 μm, ≤425 μm, ≤400 μm, ≤375 μm, ≤350 μm, ≤ 325 μm, ≤300 μm, and ≤250 μm. In one embodiment, the absolute value of $S_{Z2}$ may follow the relationship 1000 μm≥$|S_{Z2}|$≥5 μm, and/or 500 μm≥$|S_{Z2}|$≥10 μm, and/or 250 μm≥$|S_{Z2}|$≥20 μm. In yet another embodiment, for a Feret Diameter of the width $W_E$ of the counter-electrode active material layer 132 in the unit cell, the absolute value of $S_{Z2}$ may be in a range of from $5\times W_E \geq |S_{Z2}| \geq 0.05\times W_E$. Furthermore, in one embodiment, any of the above values and/or relationships for $|S_{Z2}|$ may hold true for more than 60% of the length $L_C$ of the first counter-electrode active material layer, such as for at least 65%, at least 70%, at least 75%, at least 80%, at least 85%, at least 90%, and even at least 95% of the length $L_C$ of the first counter-electrode active material layer. Furthermore, the value and/or relationships described above for $S_{Z2}$ may be the same and/or different than those for $S_{z1}$, and/or may hold true for a different percentage of the length $L_C$ than for $S_{Z1}$.

Furthermore, for at least 60% of the position x from $X_{0C}$ to $X_{Lc}$ (60% of the Feret diameter of the counter-electrode active material layer in the transverse direction), the second vertical end surface of the of the counter-electrode active material layer is inwardly disposed with respect to the second vertical end surface of the electrode active material layer. That is, the electrode active material layer 132 can be understood to have a median vertical position (position in z in a YZ plane for a specified X slice, as in FIG. 22C) that is closer to the lateral surface, than the counter-electrode active material layer 130, for at least 60% of the length $L_C$ of the counter-electrode active material layer. Stated another way, the counter-electrode active material layer 138 can be understood to have a median vertical position (position in z in a YZ plane for a specified X slice, as in FIG. 22C) that is further along an inward direction 508 of the electrode assembly 106, than the median vertical position of the electrode active material layer 132. This vertical offset of the electrode active material layer 132 with respect to the counter-electrode active material layer 138 can also be seen with respect to the embodiment in FIG. 22A, which depicts a height of the electrode material layer 132 exceeding that of the counter-electrode active material layer 138, and the plots of FIG. 22B, which depicts the median vertical position $E_{VP2}$ of the electrode active material layer 132 below the median vertical position $CE_{VP2}$ of the counter-electrode active material layer along the transverse direction. In one embodiment, the second vertical end surface of the of the counter-electrode active material layer is inwardly disposed with respect to the first vertical end surface of the electrode active material layer for more than 60% of the length $L_C$ of the first counter-electrode active material layer, such as for at least 65%, at least 70%, at least 75%, at least 80%, at least 85%, at least 90%, and even at least 95% of the length $L_C$ of the first counter-electrode active material layer. Also, the percentage of the length $L_C$ along which the counter-electrode active material is more inward than the electrode active material may be different at the first vertical surfaces as compared to the second vertical surfaces.

Figure 23A:
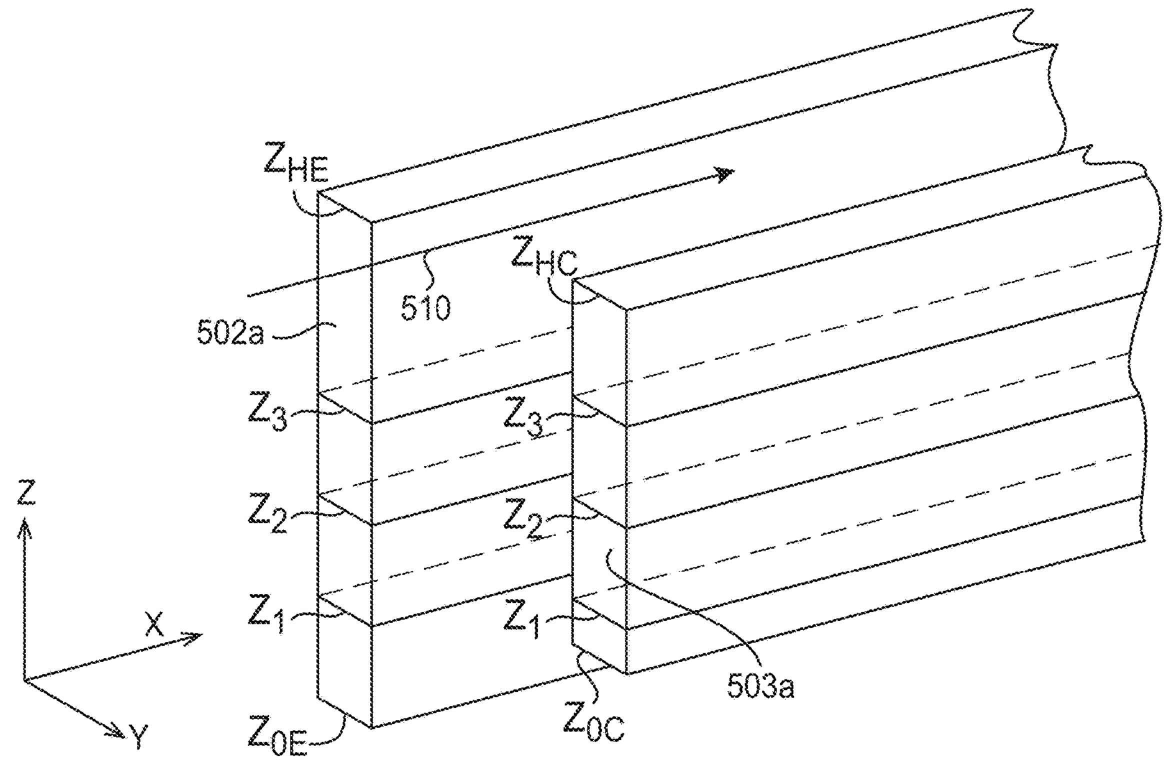
FIGS. 23A-23C illustrate embodiments for the determination of transverse offsets and/or separation distances $S_{X1}$ and $S_{X2}$, between transverse end surfaces of electrode and counter-electrode active material layers.
Figure 23B:
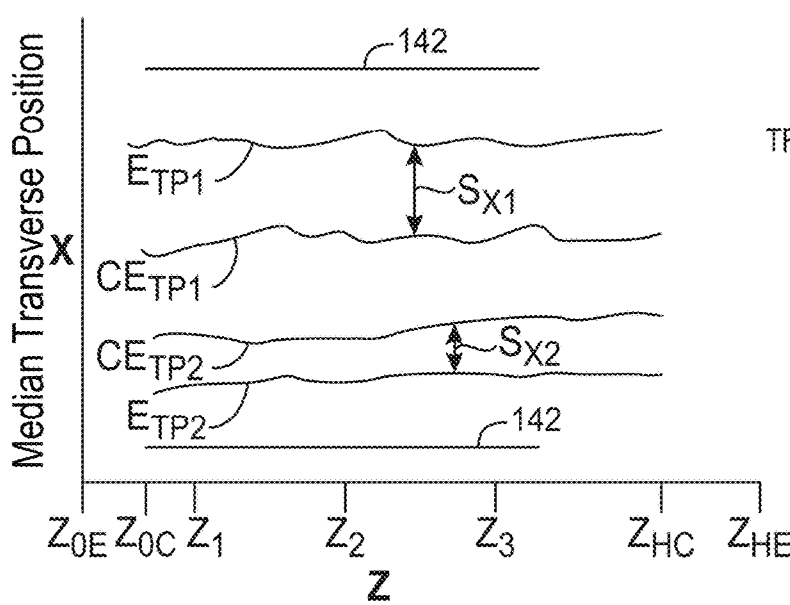
Figure 23C:
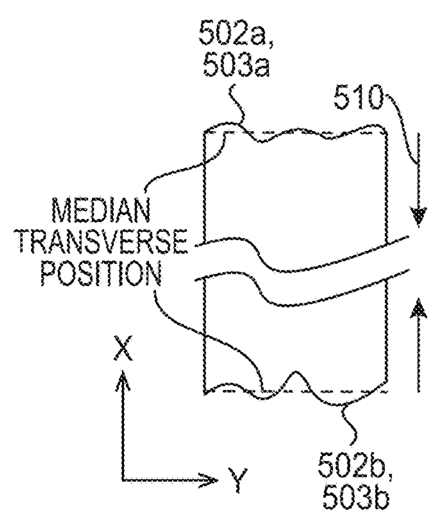

Furthermore, in one embodiment, the electrode assembly 106 further comprises a transverse offset and/or separation distance between transverse ends of the electrode and counter-electrode active material layers 132, 138 in each unit cell. Referring to FIGS. 23A-C, an offset and/or separation distance in the transverse direction is described. As depicted in FIG. 23A of this embodiment, the first transverse end surfaces 502*a*, 503*a* of the electrode and the counter-electrode active material layers 132, 138 are on the same side of the electrode assembly 106 (see, also, FIGS. 26A-26F). Furthermore, a 2D map of the median transverse position of the first opposing transverse end surface 502*a* of the electrode active material 132 in the X-Z plane, along the height $H_E$ of the electrode active material layer, traces a first transverse end surface plot, $E_{TP1}$. That is, as shown by reference to FIG. 23A, for each YX plane along the vertical direction, the median transverse position (x position) of the transverse end surface 502*a* of the electrode active material layer 132 can be determined, by taking the median of the x position for the surface, as a function of y, at the specific vertical position (e.g., $Z_1$, $Z_2$, $Z_3$, etc.) for that YX plane. FIG. 23C generally depicts an example of a line showing the median transverse position (x position) of the first transverse end surface 502*a* for the specific YX plane at the selected z slice (e.g., slice at $Z_1$). (Note that FIG. 23C generally depicts determination of median transverse positions (dashed lines at top and bottom of figures) for transverse end surfaces generally, i.e. of either the first and second transverse end surface 5002*a,b* of the electrode active material layer 132, and/or the first and second transverse end surfaces 503*a,b* of the counter-electrode active material layer 138.) FIG. 23B depicts an embodiment where the 2D map of this median transverse position, as determined along the height $H_E$ of the electrode active material (i.e., at each z position $Z_1$, $Z_2$, $Z_3$ along the height $H_E$), traces first transverse end surface plot $E_{TP1}$ that corresponds to the median transverse position (x position) plotted as a function of z (e.g., at $Z_1$, $Z_2$, $Z_3$, etc.). For example, the median transverse position of the transverse end surface 502*a* of the electrode active material layer 132 can be plotted as a function of z (vertical position) for z positions corresponding to $Z_{0E}$ at a first vertical end of the electrode active material layer to $Z_{HE}$ at a second vertical end of the electrode active material layer, where $Z_{HE}$-$Z_{0E}$ is equivalent to the Feret diameter of the electrode active material layer 132 in the vertical direction (the height $H_E$ of the electrode active material layer 132).

Similarly, in the case of the first transverse end surface 503*a* of the counter-electrode active material layer 138, a 2D map of the median transverse position of the first opposing transverse end surface 503*a* of the counter-electrode active material layer 138 in the X-Z plane, along the height $H_C$ of the counter-electrode active material layer 138, traces a first transverse end surface plot, $CE_{TP1}$. Referring again to FIGS. 23A-C, it can be understood that for each YX plane along the vertical direction, the median transverse position (x position) of the transverse end surface 503*a* of the counter-electrode active material layer 138 can be determined, by taking the median of the x position for the surface, as a function of y, at the specific vertical position (e.g., $Z_1$, $Z_2$, $Z_3$, etc.) for that YX plane. FIG. 23C generally depicts an example of a line showing the median transverse position (x position) of the transverse end surface 503*a* for the specific YX plane at the selected z slice (e.g., slice at $Z_1$). FIG. 23B depicts an embodiment where the 2D map of this median transverse position, as determined along the height $H_C$ of the counter-electrode active material (i.e., at each z position $Z_1$, $Z_2$, $Z_3$ along the height $H_C$), traces first transverse end surface plot $CE_{TP1}$ that corresponds to the median transverse position (x position) plotted as a function of z (e.g., at $Z_1$, $Z_2$, $Z_3$, etc.). For example, the median transverse position of the transverse end surface 503*a* of the counter-electrode active material layer 138 can be plotted as a function of z (vertical position) for z positions corresponding to $Z_{0C}$ at a first vertical end of the counter-electrode active material layer to $Z_{HC}$ at a second vertical end of the counter-electrode active material layer, where $Z_{HC}$-$Z_{0C}$ is equivalent to the Feret diameter of the counter electrode active material layer 138 in the vertical direction (the height $H_C$ of the counter-electrode active material layer 138).

Furthermore, the offset and/or separation distance requirements for the transverse separation between the first transverse surfaces 502*a*, 502*b* of the electrode active and counter-electrode active material layers 132, 138 require that, for at least 60% of the height $H_c$ of the first counter-electrode active material layer: (i) the absolute value of the separation distance, $S_{X1}$, between the plots $E_{TP1}$ and $CE_{TP1}$ measured in the vertical direction is 1000 μm≥$|S_{X1}|$≥5 μm. Also, in one embodiment, it is required that, for at least 60% of the height $H_C$ of the first counter-electrode active material layer: (ii) as between the first transverse end surfaces 502*a*, 503*a* of the electrode and counter-electrode active material layers 132, 138, the first transverse end surface of the counter-electrode active material layer is inwardly disposed with respect to the first transverse end surface of the electrode active material layer. That is, by referring to FIG. 23B, it can be seen that the absolute value of the separation distance $S_{X1}$, that corresponds to the distance between the plots $E_{TP1}$ and $CE_{TP1}$ at any given point along z, is required to be no greater than 1000 μm, and no less than 5 μm, for at least 60% of the height $H_C$ of the first counter-electrode active material layer 138, i.e. for at least 60% of the position z from $Z_{0C}$ to $Z_{Hc}$ (60% of the Feret diameter of the counter-electrode active material layer in the vertical direction). Also, it can be seen that the first transverse end surface of the of the counter-electrode active material layer is inwardly disposed with respect to the first transverse end surface of the electrode active material layer, for at least 60% of the height $H_C$ of the first counter-electrode active material layer 138, i.e. for at least 60% of the position z from $Z_{0C}$ to $Z_{Hc}$ (60% of the Feret diameter of the counter-electrode active material layer in the vertical direction)

In one embodiment, the absolute value of $S_{X1}$ may be ≥5 μm, such as ≥10 μm, ≥15 μm, ≥20 μm, ≥35 μm, ≥45 μm, ≥50 μm, ≥75 μm, ≥100 μm, ≥150 μm, and >200 μm. In another embodiment, the absolute value of $S_{X1}$ may be ≤1000 microns, such as ≤500 μm, such as ≤475 μm, ≤425 μm, ≤400 μm, ≤375 μm, ≤350 μm, ≤ 325 μm, ≤300 μm, and ≤250 μm.

In one embodiment, the absolute value of $S_{X1}$ may follow the relationship 1000 μm≥$|S_{X1}|$≥5 μm, and/or 500 μm≥$|S_{X1}|$≥10 μm, and/or 250 μm≥$|S_{X1}|$≥20 μm. In yet another embodiment, for a Feret Diameter of the width $W_E$ of the counter-electrode active material layer 132 in the unit cell, the absolute value of $S_{X1}$ may be in a range of from $5\times W_E \geq |S_{X1}| \geq 0.05\times W_E$. Furthermore, in one embodiment, any of the above values and/or relationships for $|S_{X1}|$ may hold true for more than 60% of the height $H_C$ of the counter-electrode active material layer, such as for at least 65%, at least 70%, at least 75%, at least 80%, at least 85%, at least 90%, and even at least 95% of the height $H_C$ of the counter-electrode active material layer. Furthermore, the value and/or relationships described above for $S_{X1}$ may be the same and/or different than those for $S_{Z1}$ and/or $S_{Z2}$.

Furthermore, for at least 60% of the position z from $Z_{0C}$ to $Z_{HC}$ (60% of the Feret diameter of the counter-electrode active material layer in the vertical direction), the first transverse end surface of the of the counter-electrode active material layer is inwardly disposed with respect to the first transverse end surface of the electrode active material layer. That is, the electrode active material layer 132 can be understood to have a median transverse position (position in x in a XY plane for a specified Z slice, as in FIG. 23C) that is closer to the lateral surface, than the counter-electrode active material layer 130, for at least 60% of the height $H_C$ of the counter-electrode active material layer. Stated another way, the counter-electrode active material layer 138 can be understood to have a median transverse position (position in x in a XY plane for a specified X slice, as in FIG. 23C) that is further along an inward direction 510 of the electrode assembly 106, than the median transverse position of the electrode active material layer 132. This transverse offset of the electrode active material layer 132 with respect to the counter-electrode active material layer 138 can also be seen with respect to the embodiment in FIG. 23A, which depicts a length of the electrode material layer 132 exceeding that of the counter-electrode active material layer 138, and the plots of FIG. 23B, which depicts the median transverse position $E_{TP1}$ of the electrode active material layer 132 exceeding the median transverse position $CE_{TP1}$ of the counter-electrode active material layer along the vertical direction. In one embodiment, the first transverse end surface of the of the counter-electrode active material layer is inwardly disposed with respect to the first transverse end surface of the electrode active material layer for more than 60% of the height $H_C$ of the first counter-electrode active material layer, such as for at least 65%, at least 70%, at least 75%, at least 80%, at least 85%, at least 90%, and even at least 95% of the height $H_C$ of the first counter-electrode active material layer. Also, the percentage of the height $H_C$ along which the counter-electrode active material is more inward than the electrode active material may be different at the first transverse end surfaces as compared to the second transverse end surfaces.

In one embodiment, the relationship described above for the separation distance $S_{X1}$ with respect to the first transverse end surfaces 502*a*, 503*a* of the electrode and counter-electrode active material layers 132, 138, also can be determined for the second transverse surfaces 502*b*, 503*b* of the electrode and counter-electrode active material layers 132, 138 (e.g., as shown in FIGS. 26A-26F). That is, the second transverse end surfaces 502*b* and 503*b* are on the same side of the electrode assembly 106 as each other, and oppose the first transverse end surfaces 502*a*, 503*a* of the electrode and counter-electrode active material layers 132, 138, respectively. Furthermore, in analogy to the description given for the separation distance and/or offset $S_{X1}$ given above, a 2D map of the median transverse position of the second opposing transverse end surface 502*b* of the electrode active material 132 in the X-Z plane, along the height $H_E$ of the electrode active material layer, traces a second transverse end surface plot, $E_{TP2}$. That is, as shown by reference to FIGS. 23A-C, for each YX plane along the vertical direction, the median transverse position (x position) of the second transverse end surface 502*b* of the electrode active material layer 132 can be determined, by taking the median of the x position for the surface, as a function of y, at the specific vertical position (e.g., $Z_1$, $Z_2$, $Z_3$, etc.) for that YX plane. FIG. 23C generally depicts an example of a line showing the median transverse position (x position) of the second transverse end surface 502*b* for the specific YX plane at the selected a slice (e.g., slice at $Z_1$). FIG. 23B depicts an embodiment where the 2D map of this median transverse position, as determined along the height $H_E$ of the electrode active material (i.e., at each z position $Z_1$, $Z_2$, $Z_3$ along the height $H_E$), traces second transverse end surface plot $E_{TP2}$ that corresponds to the median transverse position (x position) plotted as a function of z (e.g., at $Z_1$, $Z_2$, $Z_3$, etc.). For example, the median transverse position of the second transverse end surface 502*b* of the electrode active material layer 132 can be plotted as a function of z (vertical position) for z positions corresponding to $Z_{0E}$ at a first vertical end of the electrode active material layer to $Z_{HE}$ at a second vertical end of the electrode active material layer, where $Z_{HE}$-$Z_{0E}$ is equivalent to the Feret diameter of the electrode active material layer 132 in the vertical direction (the height $H_E$ of the electrode active material layer 132).

Similarly, in the case of the second opposing transverse end surface 503*b* of the counter-electrode active material layer 138, a 2D map of the median transverse position of the second opposing transverse end surface 503*b* of the counter-electrode active material layer 138 in the X-Z plane, along the height $H_C$ of the counter-electrode active material layer 138, traces a second transverse end surface plot, $CE_{TP2}$. Referring again to FIGS. 23A-C, it can be understood that for each YX plane along the vertical direction, the median transverse position (x position) of the second transverse end surface 503*b* of the counter-electrode active material layer 138 can be determined, by taking the median of the z position for the surface, as a function of y, at the specific vertical position (e.g., $Z_1$, $Z_2$, $Z_3$, etc.) for that YX plane. FIG. 23C generally depicts an example of a line showing the median transverse position (x position) of the second transverse end surface 503*b* for the specific YX plane at the selected z slice (e.g., slice at $Z_1$). FIG. 23B depicts an embodiment where the 2D map of this median transverse position, as determined along the height $H_C$ of the counter-electrode active material (i.e., at each z position $Z_1$, $Z_2$, $Z_3$ along the height Hc), traces second transverse end surface plot $CE_{TP2}$ that corresponds to the median transverse position (x position) plotted as a function of z (e.g., at $Z_1$, $Z_2$, $Z_3$, etc.). For example, the median transverse position of the second transverse end surface 503*b* of the counter-electrode active material layer 138 can be plotted as a function of z (vertical position) for z positions corresponding to $Z_{0C}$ at a first transverse end of the counter-electrode active material layer to $Z_{Hc}$ at a second transverse end of the counter-electrode active material layer, where $Z_{HC}$-$X_{0C}$ is equivalent to the Feret diameter of the counter electrode active material layer 138 in the vertical direction (the height $H_C$ of the counter-electrode active material layer 138).

Furthermore, the offset and/or separation distance requirements for the transverse separation between the second transverse surfaces 502*b*, 503*b* of the electrode active and counter-electrode active material layers 132, 138 require that, for at least 60% of the height $H_C$ of the first counter-electrode active material layer: (i) the absolute value of the separation distance, $S_{X2}$, between the plots $E_{TP2}$ and $CE_{TP2}$ measured in the vertical direction is $1000\ \mu m \geq |S_{X2}| \geq 5\ \mu m$. Also, in one embodiment, it is required that, for at least 60% of the height $H_C$ of the first counter-electrode active material layer: (ii) as between the second transverse end surfaces 502*b*, 503*b* of the electrode and counter-electrode active material layers 132, 138, the second transverse end surface of the counter-electrode active material layer is inwardly disposed with respect to the second transverse end surface of the electrode active material layer. That is, by referring to FIG. 23B, it can be seen that the absolute value of the separation distance $S_{X2}$, that corresponds to the distance between the plots $E_{TP2}$ and $CE_{TP2}$ at any given point along z, is required to be no greater than 1000 μm, and no less than 5 μm, for at least 60% of the height $H_C$ of the first counter-electrode active material layer 138, i.e. for at least 60% of the position z from $Z_{0C}$ to $Z_{Hc}$ (60% of the Feret diameter of the counter-electrode active material layer in the vertical direction). Also, it can be seen that the second transverse end surface of the of the counter-electrode active material layer is inwardly disposed with respect to the second transverse end surface of the electrode active material layer, for at least 60% of the height $H_C$ of the first counter-electrode active material layer 138, i.e. for at least 60% of the position z from $Z_{0C}$ to $Z_{Hc}$ (60% of the Feret diameter of the counter-electrode active material layer in the vertical direction)

In one embodiment, the absolute value of $S_{X2}$ may be ≥5 μm, such as ≥10 μm, ≥15 μm, ≥20 μm, ≥35 μm, ≥45 μm, ≥50 μm, ≥75 μm, ≥100 μm, ≥150 μm, and >200 μm. In another embodiment, the absolute value of $S_{X2}$ may be ≤1000 microns, such as ≤500 μm, such as ≤475 μm, ≤425 μm, ≤400 μm, ≤375 μm, ≤350 μm, ≤ 325 μm, ≤300 μm, and ≤250 μm. In one embodiment, the absolute value of $S_{X2}$ may follow the relationship $1000\ \mu m \geq |S_{X2}| \geq 5\ \mu m$, and/or $500\ \mu m \geq |S_{X2}| \geq 10\ \mu m$, and/or $250\ \mu m \geq |S_{X2}| \geq 20\ \mu m$. In yet another embodiment, for a Feret Diameter of the width $W_E$ of the counter-electrode active material layer 132 in the unit cell, the absolute value of $S_{X2}$ may be in a range of from $5 \times W_E \geq |S_{X2}| \geq 0.05 \times W_E$. Furthermore, in one embodiment, any of the above values and/or relationships for $|S_{X2}|$ may hold true for more than 60% of the height $H_C$ of the counter-electrode active material layer, such as for at least 65%, at least 70%, at least 75%, at least 80%, at least 85%, at least 90%, and even at least 95% of the height $H_C$ of the counter-electrode active material layer. Furthermore, the value and/or relationships described above for $S_{X2}$ may be the same and/or different than those for $S_{X1}$, $S_{Z1}$ and/or $S_{Z2}$.

Furthermore, for at least 60% of the position z from $Z_{0C}$ to $Z_{HC}$ (60% of the Feret diameter of the counter-electrode active material layer in the vertical direction), the second transverse end surface of the of the counter-electrode active material layer is inwardly disposed with respect to the second transverse end surface of the electrode active material layer. That is, the electrode active material layer 132 can be understood to have a median transverse position (position in x in a XY plane for a specified Z slice, as in FIG. 23C) that is closer to the lateral surface, than the counter-electrode active material layer 130, for at least 60% of the height $H_C$ of the counter-electrode active material layer. Stated another way, the counter-electrode active material layer 138 can be understood to have a median transverse position (position in x in a XY plane for a specified X slice, as in FIG. 23C) that is further along an inward direction 510 of the electrode assembly 106, than the median transverse position of the electrode active material layer 132. This transverse offset of the electrode active material layer 132 with respect to the counter-electrode active material layer 138 can also be seen with respect to the embodiment in FIG. 23A, which depicts a length of the electrode material layer 132 exceeding that of the counter-electrode active material layer 138, and the plots of FIG. 10) 23B, which depicts the median transverse position $E_{TP2}$ of the electrode active material layer 132 below the median transverse position $CE_{TP2}$ of the counter-electrode active material layer along the vertical direction. In one embodiment, the second transverse end surface of the of the counter-electrode active material layer is inwardly disposed with respect to the second transverse end surface of the electrode active material layer for more than 60% of the height $H_C$ of the first counter-electrode active material layer, such as for at least 65%, at least 70%, at least 75%, at least 80%, at least 85%, at least 90%, and even at least 95% of the height $H_C$ of the first counter-electrode active material layer. Also, the percentage of the height $H_C$ along which the counter-electrode active material is more inward than the electrode active material may be different at the first transverse end surfaces as compared to the second transverse end surfaces.

According to one embodiment, the offset and/or separation distances in the vertical and/or transverse directions can be maintained by providing a set of electrode constraints 108 that are capable of maintaining and stabilizing the alignment of the electrode active material layers 132 and counter-electrode active material layers 138 in each unit cell, and even stabilizing the position of the electrode structures 110 and counter-electrode structures 112 with respect to each other in the electrode assembly 106. In one embodiment, the set of electrode constraints 108 comprises any of those described herein, including any combination or portion thereof. For example, in one embodiment, the set of electrode constraints 108 comprises a primary constraint system 151 comprising first and second primary growth constraints 154, 156 and at least one primary connecting member 162, the first and second primary growth constraints 154, 156 separated from each other in the longitudinal direction, and the at least one primary connecting member 162 connecting the first and second primary growth constraints 154, 156, wherein the primary constraint system 151 restrains growth of the electrode assembly 106 in the longitudinal direction such that any increase in the Feret diameter of the electrode assembly in the longitudinal direction over 20 consecutive cycles of the secondary battery is less than 20%. In yet another embodiment, the set of electrode constraints 108 further comprises a secondary constraint system 152 comprising first and second secondary growth constraints 158, 160 separated in a second direction and connected by at least one secondary connecting member 166, wherein the secondary constraint system 155 at least partially restrains growth of the electrode assembly 106 in the second direction upon cycling of the secondary battery 106, the second direction being orthogonal to the longitudinal direction. Further embodiments of the set of electrode constraints 108 are described below.

Figure 25B:
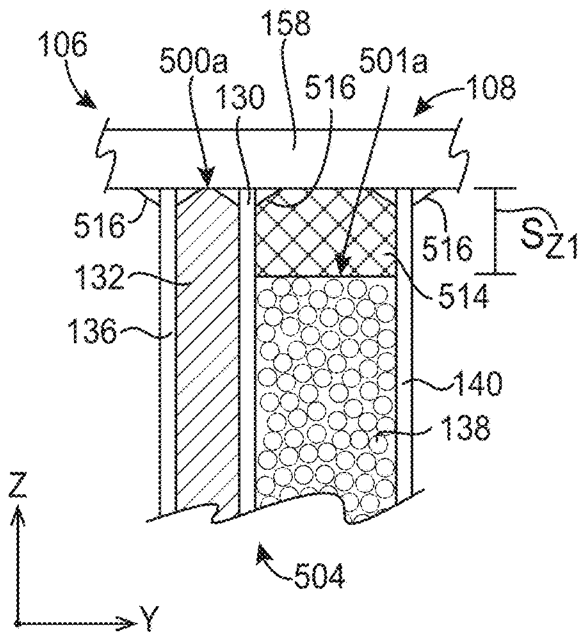
Figure 25C:
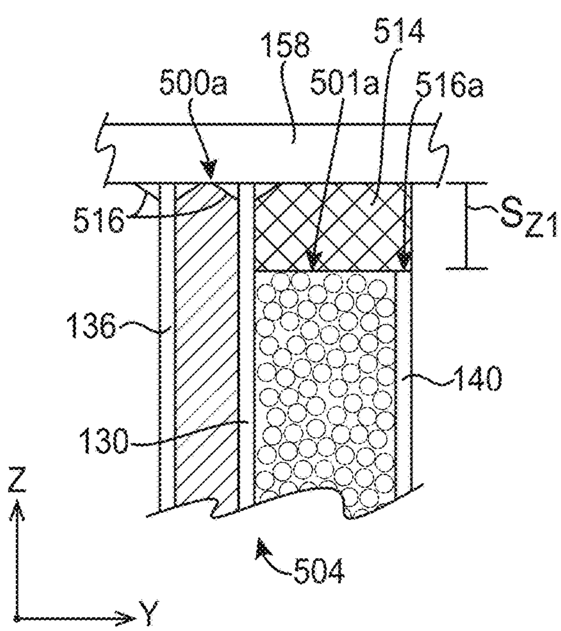
Figure 25D:
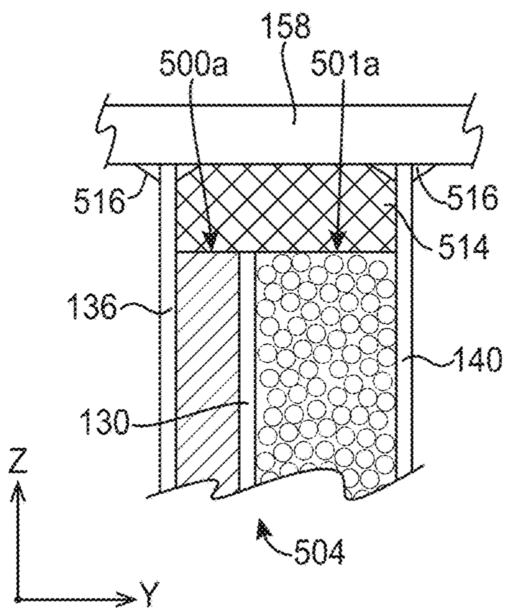
Figure 25E:
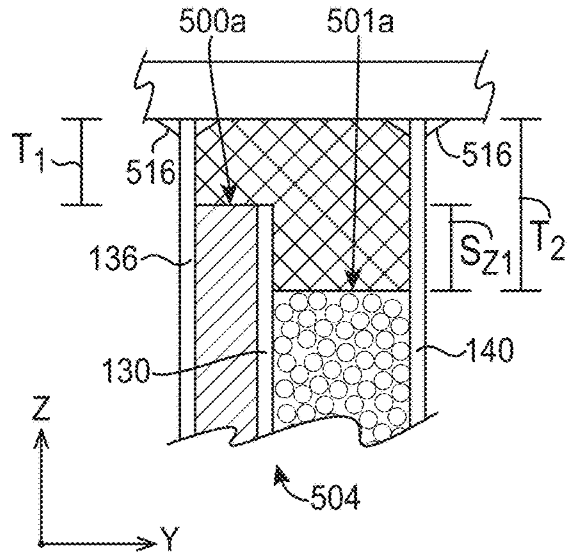
Figure 25F:
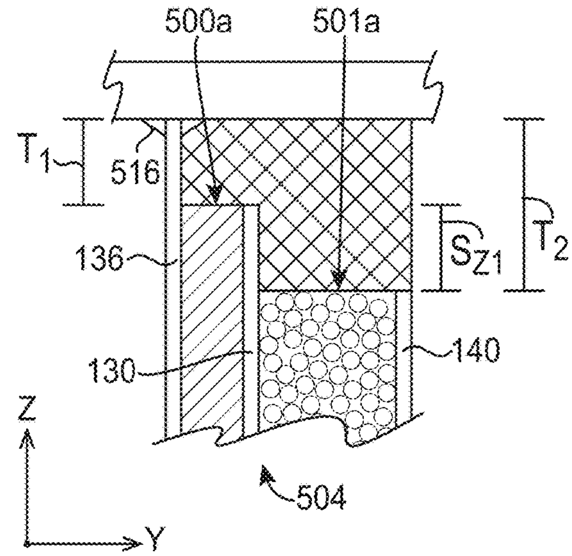
Figure 25G:
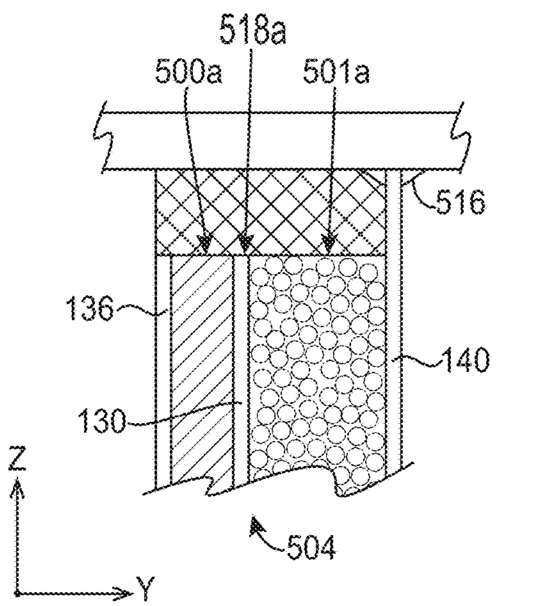
Figure 25H:
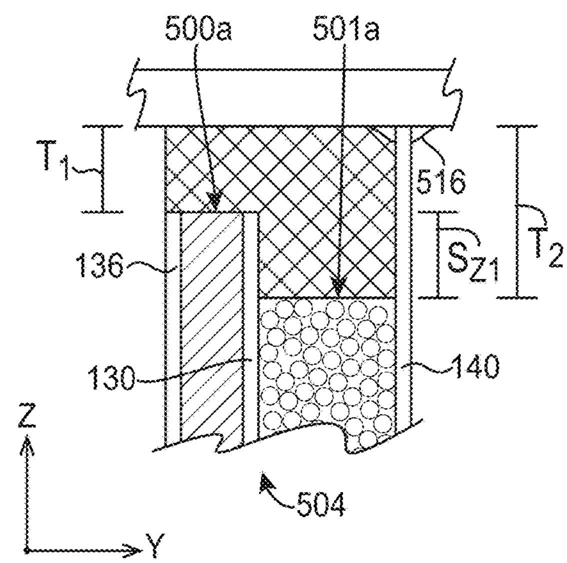

Returning to FIGS. 25A-25H, various different configurations of the unit cells 504, with respect to the vertical separation distance and/or offset are described. In the embodiments as shown, a portion of the set of constraints 108 is positioned at at least one vertical end of the layers 132, and may be connected to one or more structures of the unit cell 504. For example, the set of electrode constraints 108 comprises first and second secondary growth constraints 158, 160, and the growth constraints can be connected to the vertical ends of structures in the unit cell. In the embodiment as shown in FIG. 25A, the first and second growth constraints 158, 160 are attached via adhesive layers 516 that bond structures of the unit cell to the constraints 158, 160 (the cut-away of FIG. 1A shows upper constraint 158). In FIG. 25A, the vertical ends of the electrode current collector 136, separator layer 130 and counter-electrode current collector 140 are bonded via an adhesive layer 516 to the first and second growth constraints 158, 160. Accordingly, as is described in further detail below, one of or more of the electrode current collector 136, separator layer 130 and counter-electrode current collector 140, either individually or collectively, may act as a secondary connecting member 166 connecting the first and second growth constraints, to constrain growth of the electrode assembly 106. FIG. 25B shows a further embodiment where all of the electrode current collector 136, separator layer 130 and counter-electrode current collector 140, of a unit cell 504, are bonded to the first and second secondary growth constraints 158, 160. Alternatively, certain of the structures may be bonded to a first secondary growth constraint 158, while others are bonded to the second secondary growth constraint. In the embodiment as shown in FIG. 25C, the vertical ends of both the electrode current collector 136 and the separator layer 130 are bonded to the first and second secondary growth constraints 158, 160, while the counter-electrode current collector 140 ends before contacting the first and secondary growth constraints in the vertical direction. In the embodiments as shown in FIGS. 25D-25E, the vertical ends of both the electrode current collector 136 and the counter-electrode current collector 140 are bonded to the first and second secondary growth constraints 158, 160, while the separator 130 ends before contacting the first and secondary growth constraints in the vertical direction. In the embodiments as shown in FIG. 25F, the vertical ends of the electrode current collector 136 are bonded to the first and second secondary growth constraints 158, 160, while the separator 130 and counter-electrode current collector 140 end before contacting the first and secondary growth constraints in the vertical direction. In the embodiments as shown in FIGS. 25G-25H, the vertical ends of the counter-electrode current collector 140 are bonded to the first and second secondary growth constraints 158,160, while the separator 130 and electrode current collector 136 end before contacting the first and secondary growth constraints in the vertical direction.

Furthermore, in one embodiment, the unit cells 504 can comprise one or more insulator members 514 disposed between one or more of the first and second vertical surfaces of the electrode active material layer 132 and/or the counter-electrode active material layer. The insulator members 514 may be electrically insulating to inhibit shorting between structures in the unit cell 504. The insulator members may also be non-ionically permeable, or at least less ionically permeable than the separator 130, to inhibit the passage of carrier ions therethrough. That is, the insulator members 514 may be provide to insulate vertical surfaces of the electrode and counter-electrode active material layers 132, 138, from plating out, dendrite formation, and/or other electrochemical reactions that the exposed surfaces may otherwise be susceptible to, to extend the life of the secondary battery 102 having the unit cells 504 with the insulating members 514. For example, the insulating member 514 may have an ionic permeability and/or ionic conductance that is less than that of a separator 130 that is provided in the same unit cell 504. For example, the insulating member 514 may have a permeability and/or conductance to carrier ions that is the same as and/or similar to that of the carrier ion insulating material layer 674 described further below. The insulating member 514 can be prepared from a number of different materials, including ceramics, polymers, glass, and combinations and/or composites thereof.

In the embodiment shown in FIG. 25A, the unit cell 504 does not have an insulating member 514, as both first vertical end surfaces 500*a*, 501*a* of the electrode and counter-electrode active material layers 132, 138 have a vertical dimension z that is close to, and even substantially flush with, the first secondary growth constraint 158. The second vertical end surfaces 500*b*, 501*b* may similarly reach the second secondary growth constraint 160 in the opposing vertical direction (not shown). In certain embodiments, even if an insulating member 514 is not provided at a vertical surface of one or more of the electrode and counter-electrode active material layers 132, 138, the unit cell may comprise predetermined vertical offsets $S_{Z1}$ and $S_{Z2}$, as described above. Accordingly, in one aspect, the embodiment as shown in FIG. 25A may have an offset $S_{Z1}$ and/or $S_{Z2}$ (not explicitly shown), even though no insulating member 514 is provided.

The embodiment shown in FIG. 25B depicts a unit cell 504 having a clear offset $S_{Z1}$ between the first vertical end surfaces 500*a*, 501*a* of the electrode and counter-electrode active material layers, and/or an offset $S_{Z2}$ between the second vertical end surfaces 500*a*, 501*a* of the electrode and counter-electrode active material layers (not shown). In this embodiment, an insulating member 514 is provided between the first vertical end surface 501*a* of the counter-electrode active material layer 138 and an inner surface of the first secondary growth constraint 158, and/or between the second vertical end surface 501*b* of the counter-electrode active material layer 138 and an inner surface of the second secondary growth constraint 160 (not shown). Although not shown in the 2D Z-Y plane shown in FIG. 25B, the insulating member 515 may extend substantially and even entirely over the vertical surface(s) of the counter-electrode active material layer 138, such as in the longitudinal direction (y direction) and the transverse direction (x direction—into the page in FIG. 25B), to cover one or more of the vertical surfaces 501*a,b*. Furthermore, in the embodiment depicted in FIG. 25B, the insulator member 514 is disposed between and/or bounded by the separator 130 at one longitudinal end of the counter-electrode active material layer 138, and the counter-electrode current collector 140 at the other longitudinal end.

The embodiment shown in FIG. 25C also depicts a unit cell 504 having a clear offset $S_{Z1}$ between the first vertical end surfaces 500*a*, 501*a* of the electrode and counter-electrode active material layers, and/or an offset $S_{Z2}$ between the second vertical end surfaces 500*b*, 501*b* of the electrode and counter-electrode active material layers (not shown). Also in this embodiment, an insulating member 514 is provided between the first vertical end surface 500*a* of the counter-electrode active material layer 138 and an inner surface of the first secondary growth constraint 158, and/or between the second vertical end surface 501*b* of the counter-electrode active material layer 138 and an inner surface of the second secondary growth constraint 160 (not shown). Although not shown in the 2D Z-Y plane shown in FIG. 25C, the insulating member 515 may extend substantially and even entirely over the vertical surface(s) of the counter-electrode active material layer 138, such as in the longitudinal direction (y direction) and the transverse direction (x direction—into the page in FIG. 25C), to cover one or more of the vertical surfaces 501*a, b*. Furthermore, in the embodiment depicted in FIG. 25C, the insulator member 514 is bounded by the separator 130 at one longitudinal end of the counter-electrode active material layer, but extends over vertical surface(s) 516*a* of the counter-electrode current collector 140 at the other longitudinal end. That is, the insulating member may extend longitudinally towards and abut a neighboring until cell structure, such as an adjacent counter-electrode active material layer 138 of a neighboring unit cell structure. In one embodiment, the insulating member 514 may extend across one or more vertical surfaces 501*a,b* of adjacent counter-electrode active material layers 138, by passing over a counter-electrode current collector 140 separating the layers 138 in adjacent unit cells 504*a*, 504*b*, and over the vertical surfaces of the adjacent counter-electrode active material layers 138 in the neighboring cells. That is, the insulating member 514 may extend across one or more vertical surfaces 501*a,b* of the counter-electrode active material layer 138 in a first unit cell 504*a*, and over one or more vertical surfaces 501*a,b* of the counter-electrode active material layer 138 in a second unit cell 504*b* adjacent the first unit cell 504*a*, by traversing vertical surface of the counter-electrode current collector 140 separating the unit cells 504*a,b* from one another in the longitudinal direction.

The embodiment shown in FIG. 25D depicts a unit cell 504 where an insulating member 514 is provided between the first vertical end surface 500*a* of the counter-electrode active material layer 138 and an inner surface of the first secondary growth constraint 158, and/or between the second vertical end surface 500*b* of the counter-electrode active material layer 138 and an inner surface of the second secondary growth constraint 160 (not shown), and also extends over one or more vertical surfaces 518*a,b* of the separator 130 to also cover one or more vertical end surfaces 500*a*, 500*b* of the electrode active material layer 138. That is, the insulating member 514 is also provided between the first vertical end surface 500*a* of the electrode active material layer 132 and an inner surface of the first secondary growth constraint 158, and/or between the second vertical end surface 500*b* of the electrode active material layer 132 and an inner surface of the second secondary growth constraint 160 (not shown) (as well as in the space between the first and second secondary growth constraints 158, 160 and the vertical surfaces 518*a,b* of the separator 130). Although not shown in the 2D Z-Y plane shown in FIG. 25D, the insulating member 515 may extend substantially and even entirely over the vertical surface(s) of the electrode and counter-electrode active material layers 132 138, such as in the longitudinal direction (y direction) and the transverse direction (x direction—into the page in FIG. 25D), to cover one or more of the vertical surfaces 500*a,b*, 501*a,b*. Furthermore, in the embodiment depicted in FIG. 25D, the insulator member 514 is disposed between and/or bounded by the electrode current collector 136 at one longitudinal end of the unit cell 504, and the counter-electrode current collector 140 at the other longitudinal end.

The embodiment depicted in FIG. 25D does not clearly depict an offset $S_{V1}$ between the first vertical end surfaces 500*a*, 501*a* of the electrode and counter-electrode active material layers, and/or an offset $S_{V2}$ between the second vertical end surfaces 500*a*, 501*a* of the electrode and counter-electrode active material layers, but aspects of the embodiment depicted in FIG. 25D could also be modified by including one or more of the vertical offsets $S_{Z1}$ and/or $S_{Z2}$, as described herein. For example, the embodiment as shown in FIG. 25E comprises the same and/or similar structures as FIG. 25D, in that the insulating member 514 covers not only one or more vertical end surfaces 501*a,b* of the counter-electrode active material layer 138 but also covers one of more vertical end surfaces 500*a,b* of the electrode active material layer 132. However, FIG. 25E depicts a clear vertical offset and/or separation distance $S_{Z1}$ between the vertical end surfaces 500*a,b* of the electrode active material layer 132 and the vertical end surfaces 501*a,b* of the counter-electrode active material layer 138. Accordingly, in the embodiment as shown, the insulating member 514 comprises a first thickness T1, as measured between inner and outer vertical surfaces of the insulating member 514, over first and second vertical end surfaces 500*a,b* of the electrode active material layer 132, and second thicknesses T2, as measured between inner and outer vertical surfaces of the insulating member 514, over the first and second vertical end surfaces 501*a,b* of the counter-electrode active material layer 138, the first thicknesses T1 being less than the second thicknesses T2. Also, while only a single insulating member 514 is shown, it may also be the case that a plurality of insulating members 514 are provided, such as a first member having a first thickness T1 over the electrode active material layer, and a second insulating member 514 having the second thickness T2 over the counter-electrode active material layer 138. The embodiment depicted in FIG. 25F is similar to that in FIG. 25E, in that the one or more insulating members 514 have thicknesses T1 and T2 with respect to placement over vertical end surfaces of the electrode active material layer and counter-electrode active material layer, respectively. However, in this embodiment, the insulating member 514 extends over one or more vertical surfaces 516 of the counter-electrode current collector 140, and may even extend to cover surfaces in an adjoining unit cell, as described above in reference to FIG. 25C.

The embodiment shown in FIG. 25G depicts a unit cell 504 where an insulating member 514 is provided between the first vertical end surface 500*a* of the counter-electrode active material layer 138 and an inner surface of the first secondary growth constraint 158, and/or between the second vertical end surface 500*b* of the counter-electrode active material layer 138 and an inner surface of the second secondary growth constraint 160 (not shown), and also extends over one or more vertical surfaces 518*a,b* of the separator 130 to also cover one or more vertical end surfaces 500*a*, 500*b* of the electrode active material layer 138. That is, the insulating member 514 is also provided between the first vertical end surface 500*a* of the electrode active material layer 132 and an inner surface of the first secondary growth constraint 158, and/or between the second vertical end surface 500*b* of the electrode active material layer 132 and an inner surface of the second secondary growth constraint 160 (not shown) (as well as in the space between the first and second secondary growth constraints 158,160 and the vertical surfaces 518*a,b* of the separator 130). Although not shown in the 2D Z-Y plane shown in FIG. 25D, the insulating member 515 may extend substantially and even entirely over the vertical surface(s) of the electrode and counter-electrode active material layers 132 138, such as in the longitudinal direction (y direction) and the transverse direction (x direction—into the page in FIG. 25D), to cover one or more of the vertical surfaces 500*a,b*, 501*a,b*. Furthermore, in the embodiment depicted in FIG. 25G, the insulator member 514 is bounded by the counter-electrode current collector 140 at one longitudinal end of the unit cell 504, but extends in the other longitudinal direction over one or more vertical end surfaces 520 of the electrode current collector 136. For example, analogously to FIG. 25C above, the insulating member 514 may extend longitudinally towards and abut a neighboring until cell structure, such as an adjacent electrode active material layer 132 of a neighboring unit cell structure. In one embodiment, the insulating member 514 may extend across one or more vertical surfaces 500*a,b* of adjacent electrode active material layers 132, by passing over an electrode current collector 136 separating the layers 132 between adjacent unit cells 504*a*, 504*b*, and over the vertical surfaces of the adjacent electrode active material layers 132 in the neighboring cells. That is, the insulating member 514 may extend across one or more vertical surfaces 500*a,b* of the electrode active material layer 132 in a first unit cell 504*a*, and over vertical surfaces 500*a,b* of the electrode active material layer 132 in a second unit cell 504*b* adjacent the first unit cell 504*a*, by traversing the vertical end surface 520*a,b* of the counter-electrode current collector 140 separating the unit cells 504*a,b* from one another in the longitudinal direction.

The embodiment depicted in FIG. 25G does not clearly depict an offset $S_{Z1}$ between the first vertical end surfaces 500*a*, 501*a* of the electrode and counter-electrode active material layers, and/or an offset $S_{Z2}$ between the second vertical end surfaces 500*a*, 501*a* of the electrode and counter-electrode active material layers, but aspects of the embodiment depicted in FIG. 25G could also be modified by including one or more of the vertical offsets $S_{Z1}$ and/or $S_{Z2}$, as described herein. For example, the embodiment as shown in FIG. 25H comprises the same and/or similar structures as FIG. 25G, in that the insulating member 514 covers not only one or more vertical end surfaces 501*a,b* of the counter-electrode active material layer 138 but also covers one of more vertical end surfaces 500*a,b* of the electrode active material layer 132. However, FIG. 25H depicts a clear vertical offset and/or separation distance $S_{V1}$ between the vertical end surfaces 500*a, b* of the electrode active material layer 132 and the vertical end surfaces 501*a,b* of the counter-electrode active material layer 138. Accordingly, in the embodiment as shown, the insulating member 514 comprises a first thickness T1, as measured between inner and outer vertical surfaces of the insulating member 514, over first and second vertical end surfaces 500*a,b* of the electrode active material layer 132, and second thicknesses T2, as measured between inner and outer vertical surfaces of the insulating member 514, over the first and second vertical end surfaces 501*a,b* of the counter-electrode active material layer 138, the first thicknesses T1 being less than the second thicknesses T2. Also, while only a single insulating member 514 is shown, it may also be the case that a plurality of insulating members 514 are provided, such as a first member having a first thickness T1 over the electrode active material layer, and a second insulating member 514 having the second thickness T2 over the counter-electrode active material layer 138.

Figure 26A:
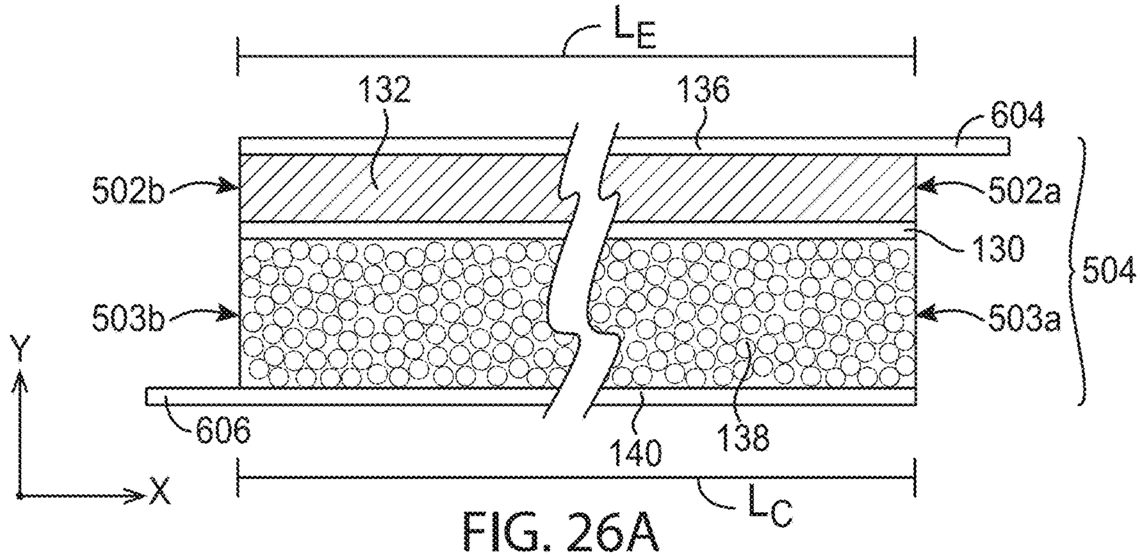
FIGS. 26A-26F illustrate cross-sections in a Y-X plane, of embodiments of unit cells having electrode and counter-electrode active material layers, both with and without transverse offsets and/or separation distances.
Figure 26B:
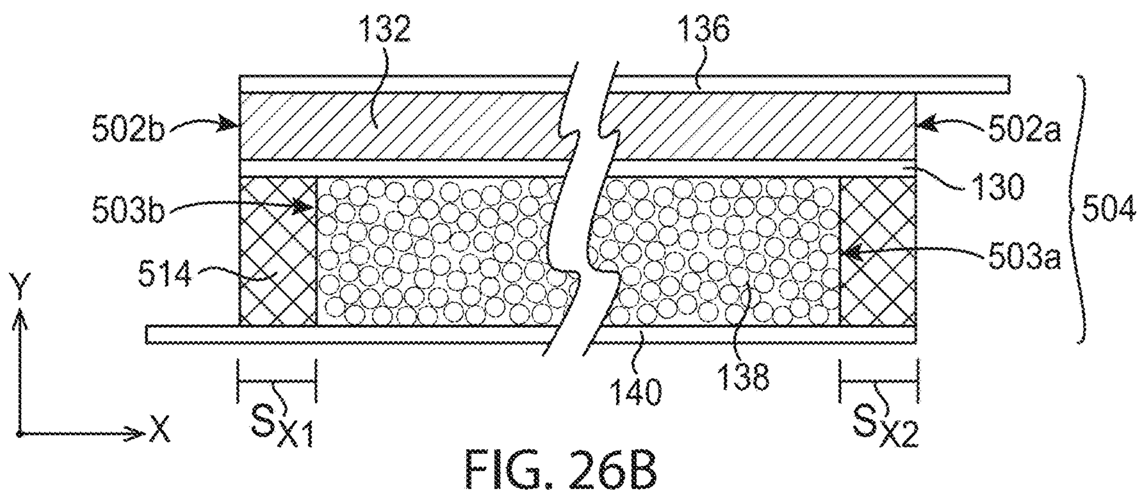

Referring to FIGS. 26A-26F, further embodiments of the unit cells 504, with or without insulating members 514 and/or transverse offsets $S_{X1}$ and $S_{X2}$, are described. In the embodiment shown in FIG. 26A, the electrode active material layer 132 and 138 are depicted without having a discernible transverse offset $S_{X1}$ and/or $S_{X2}$, although the offset and/or separation distance described above can be provided along the x axis, for example as shown in the embodiment of FIG. 26B. As shown via 2D slice in the Y-X plane, the unit cell 504 as depicted in FIG. 26A comprises an electrode current collector 136, an electrode active material layer 132, a separator 130, a counter-electrode active material layer 138, and a counter-electrode current collector 140. While the embodiment in FIG. 26A does not include an insulating member 514, it can be seen that the electrode current collector 136 extends past second transverse ends 502*b*, 503*b* of the electrode and counter-electrode active material layers 132, 138, and may be connected to an electrode busbar 600, for example as shown in FIGS. 27A-27F. Similarly, the counter-electrode current collector 140 extends past first transverse ends 502*a*, 503*a* of the electrode and counter-electrode active material layers 132, 138, and may be connected to a counter-electrode busbar 602, for example as shown in FIGS. 27A-27F.

Referring to the embodiment shown in FIG. 26B, a unit cell configuration with insulating member 514 extending over at least one of the transverse surfaces 503*a,b* of the counter-electrode active material layer 138 is shown. In the embodiment as shown, an insulating member 514 is disposed at either transverse end of the counter-electrode active material layer 138, and is position between (and bounded by) the counter-electrode current collector 140 on one longitudinal end of the unit cell 504, and by the separator 130 at the other longitudinal end of the unit cell. The insulating members have a transverse extent that matches the length $L_E$ of the electrode active material layer 132, in the embodiment as shown, and are separated from the electrode active material layer 132 by a separator having the same length in the transverse direction as the electrode active material layer. The transverse extent of the insulating member 514 in the x direction may, in one embodiment, be the same as the transverse separation distance and/or offset $S_{X1}$, $S_{X2}$, as shown in FIG. 26B. Also, while not shown in the 2D Y-X plane depicted in FIG. 26B, the insulating member may also extend in the z-direction, such as along a height $H_E$ of the counter-electrode active material layer 138, and between opposing vertical end surfaces 501*a,b*.

Figure 26C:
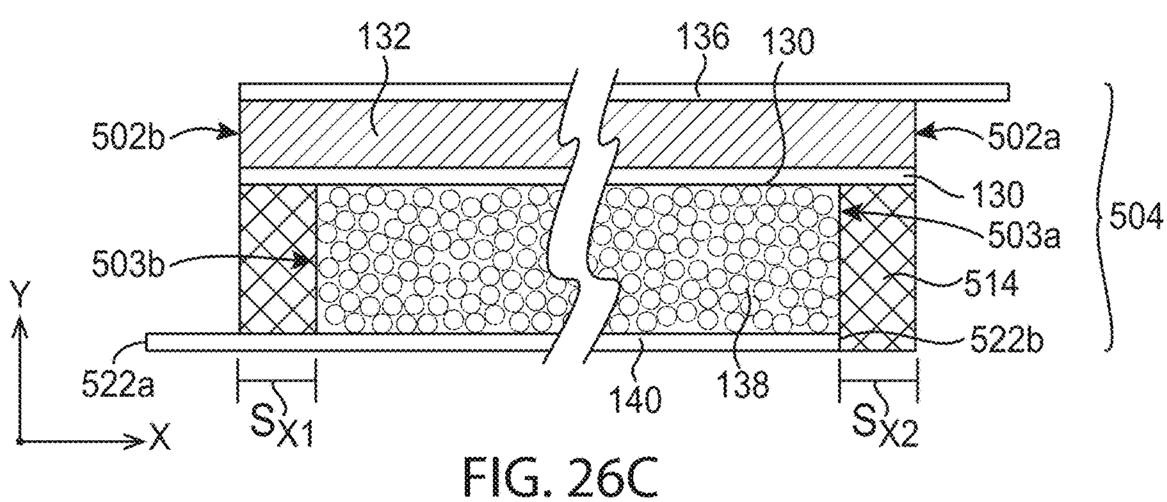

The embodiment shown in FIG. 26C also depicts a unit cell configuration with insulating member 514 extending over at least one of the transverse surfaces 503*a,b* of the counter-electrode active material layer 138. In the embodiment as shown, an insulating member 514 is disposed at either transverse end of the counter-electrode active material layer 138, and has the separator layer 130 on at least one longitudinal end of the unit cell 504. On the other longitudinal end, at least one of the insulating members is further bounded by the counter-electrode current collector 140. However, at least one of the insulating members 514 may also extend over one of the transverse surfaces 522*a,b* of the counter-electrode current collector 140 at the other longitudinal end of the unit cell 504. That is, the insulating member 514 may extend in the longitudinal direction past the transverse end surface of the counter-electrode active material layer 138 to cover the counter-electrode current collector 140, and may even extend to cover a transverse surface of a counter-electrode active layer of a neighboring unit cell. In the embodiment as shown in FIG. 26B, the insulating members 514 have a transverse extent that matches the length $L_E$ of the electrode active material layer 132, and are separated from the electrode active material layer 132 by a separator having the same length in the transverse direction as the electrode active material layer 132. The transverse extent of the insulating member 514 in the x direction may, in one embodiment, be the same as the transverse separation distance and/or offset $S_{X1}$, $S_{X2}$, as shown in FIG. 26C. Also, while not shown in the 2D Y-X plane depicted in FIG. 26C, the insulating member may also extend in the z-direction, such as along a height $H_E$ of the counter-electrode active material layer 138, and between opposing vertical end surfaces 501*a,b*. FIG. 26E has a configuration similar to that of 26C, with the exception that the counter-electrode current collector 140 has a length that extends past transverse surfaces of the insulating member 514, and the length of the current collector 136 also extends past transverse end surfaces of the electrode active material layer.

Figure 26D:
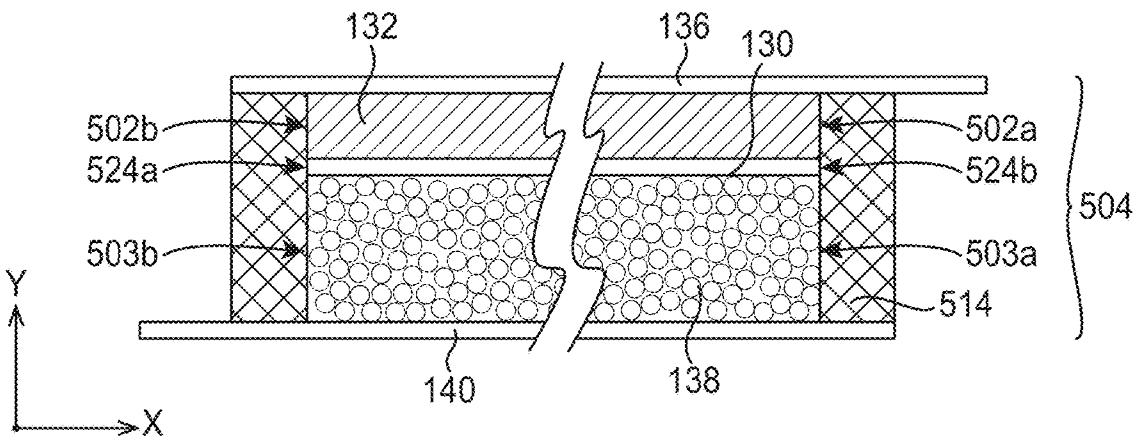
Figure 26E:
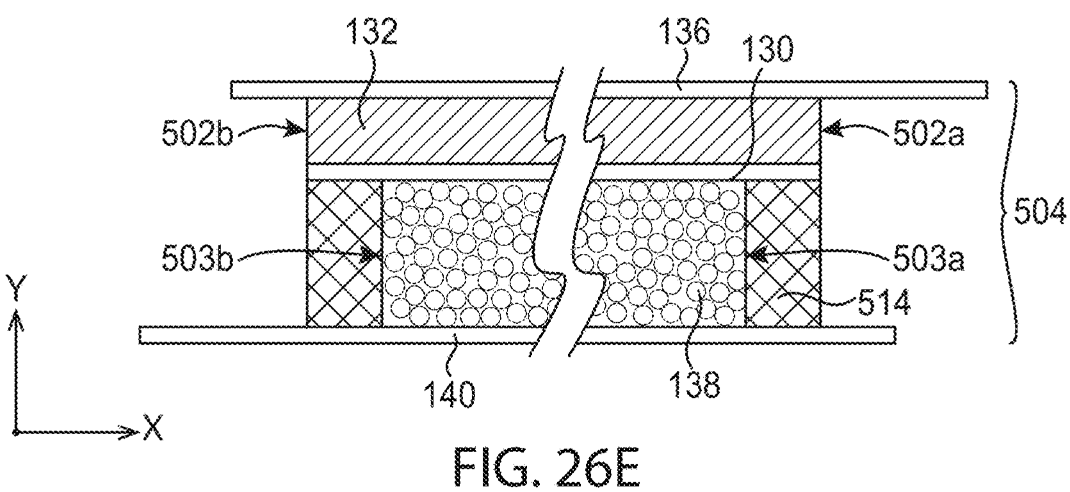

The embodiment shown in FIG. 26D depicts a unit cell configuration with insulating member 514 extending over at least one of the transverse surfaces 502*a,b*, 503*a, b* of the both the electrode active material layer 132 and the counter-electrode active material layer 138. In the embodiment as shown, an insulating member 514 is disposed at either transverse end of the electrode and counter-electrode active material layers 132, 138. The insulating member is disposed between (and bound by) the electrode current collector 136 on one longitudinal end, and the counter-electrode current collector 140 on the other longitudinal end. The insulating member 514 may extend over transverse end surfaces 524*a, b* of the separator 130 to pass over the transverse surfaces of the electrode and counter-electrode layers 132, 138. In the embodiment as shown in FIG. 26D, the insulating members 514 have a transverse extent that matches the length of the electrode current collector 136 on one transverse end, and the length of the counter-electrode current collector 140 on the other transverse end. In the embodiment as shown, the electrode and counter-electrode active material layers 132, 138 are not depicted as having a transverse offset and/or separation distance, although a separation distance and/or offset may also be provided. Also, while not shown in the 2D Y-X plane depicted in FIG. 26D, the insulating member may also extend in the z-direction, such as along a height $H_E$ of the counter-electrode active material layer 138, and between opposing vertical end surfaces 501*a,b*.

Figure 26F:
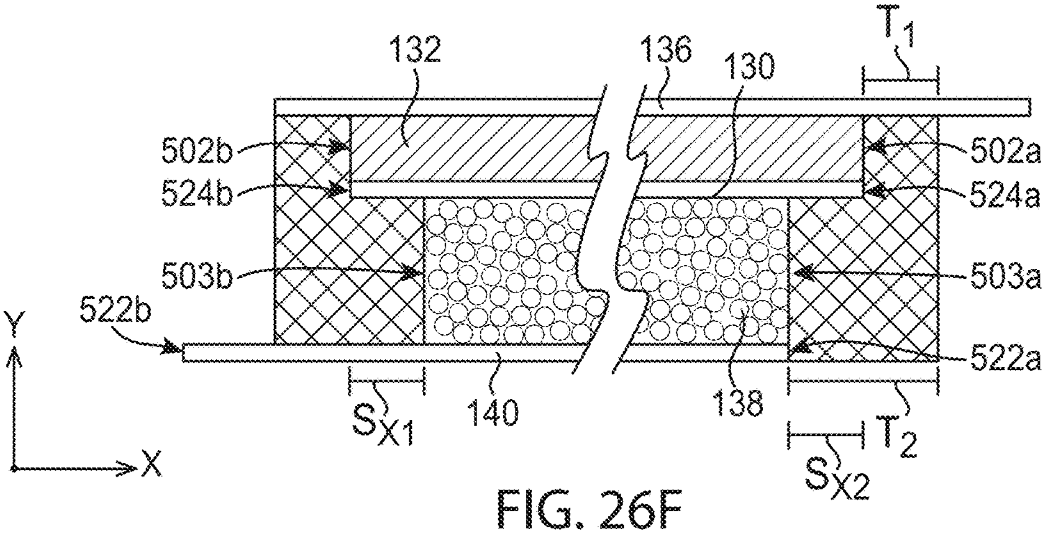

The embodiment shown in FIG. 26F also depicts a unit cell configuration with insulating member 514 extending over at least one of the transverse surfaces 503*a,b* of the counter-electrode active material layer 138. In the embodiment as shown, an insulating member 514 is disposed at either transverse end of the counter-electrode active material layer 138. The insulating member 514 covers transverse surfaces of both the electrode and the counter-electrode active material layer, and is disposed between (bound by), on one longitudinal end, the electrode current collector 136, and on the other end, at at least one transverse end, the counter-electrode current collector 140. In the embodiment as shown, the insulating member further extends over transverse surfaces 524*a,b* of the separator 130, between the electrode and counter-electrode active material layers 132, 138, to extend over these surfaces. In the embodiment as shown, the insulating member 514 has a first transverse thickness T1 extending from the vertical end surface of the electrode active material layer 132, and has a second transverse thickness T2 extending from the vertical end surface of the counter-electrode active material layer 138, with the second transverse thickness being greater than the first transverse thickness. In one embodiment, the difference in the transverse extent of the second thickness T2 minus the first thickness T1 may be equivalent to the transverse offset and/or separation distance, $S_{X1}$ and/or $S_{X2}$. Furthermore, in the embodiment as shown, at least one of the insulating members 514 may also extend over one of the transverse surfaces 522*a,b* of the counter-electrode current collector 138 at one of the longitudinal ends of the unit cell 504. That is, the insulating member 514 may extend in the longitudinal direction past the transverse end surface of the counter-electrode active material layer 138 to cover the counter-electrode current collector 140, and may even extend to cover a transverse surface of a counter-electrode active layer of a neighboring unit cell. The insulating member 514 at the opposing transverse end of the counter-electrode active material layer may, on the other hand, be bounded by the counter-electrode current collector, such that a length of the counter-electrode current collector in the transverse direction exceeds the transverse thickness of the insulating member 514. On the other longitudinal end, the insulating member 514 is bounded by the electrode current collector 136, with the transverse thickness of the insulating member meeting the transverse length of the electrode current collector 136 at one transverse end, and the electrode current collector 136 exceeding the transverse thickness of the insulating member at the other transverse end. Also, while not shown in the 2D Y-X plane depicted in FIG. 26C, the insulating member may also extend in the z-direction, such as along a height $H_E$ of the counter-electrode active material layer 138, and between opposing vertical end surfaces 501*a,b*.

Furthermore, it is noted that for purposes of determining the first and second vertical and/or transverse end surfaces of the electrode active material layer and/or counter-electrode active material layers 132 and 138, only those parts of the layers that contain electrode and/or counter-electrode active that can participate in the electrochemical reactions in each unit cell 504 are considered to be a part of the active material layers 132, 138. That is, if an electrode or counter-electrode active material is modified in a such a way that it can no longer act as electrode or counter-electrode active material, such as for example by covering the active with an ionically insulating material, then that portion of the material that has been effectively removed as a participant in the electrochemical unit cell is not counted as a part of the electrode active and/or counter-electrode active material layers 132, 138. For example, referring to the embodiment in FIG. 37A, for an electrode active material layer 132 having a carrier ion insulating layer 674 extending into the layer, the surface 500*a* of the electrode active material layer 132 is considered to be at the interface 500*a* between the carrier ion insulating layer 674 coated portion and the non-coated portion of the layer 132, as opposed to at a surface 800*a* where the coated electrode active material ends.

Electrode and Counter-Electrode Busbars

Figure 30:
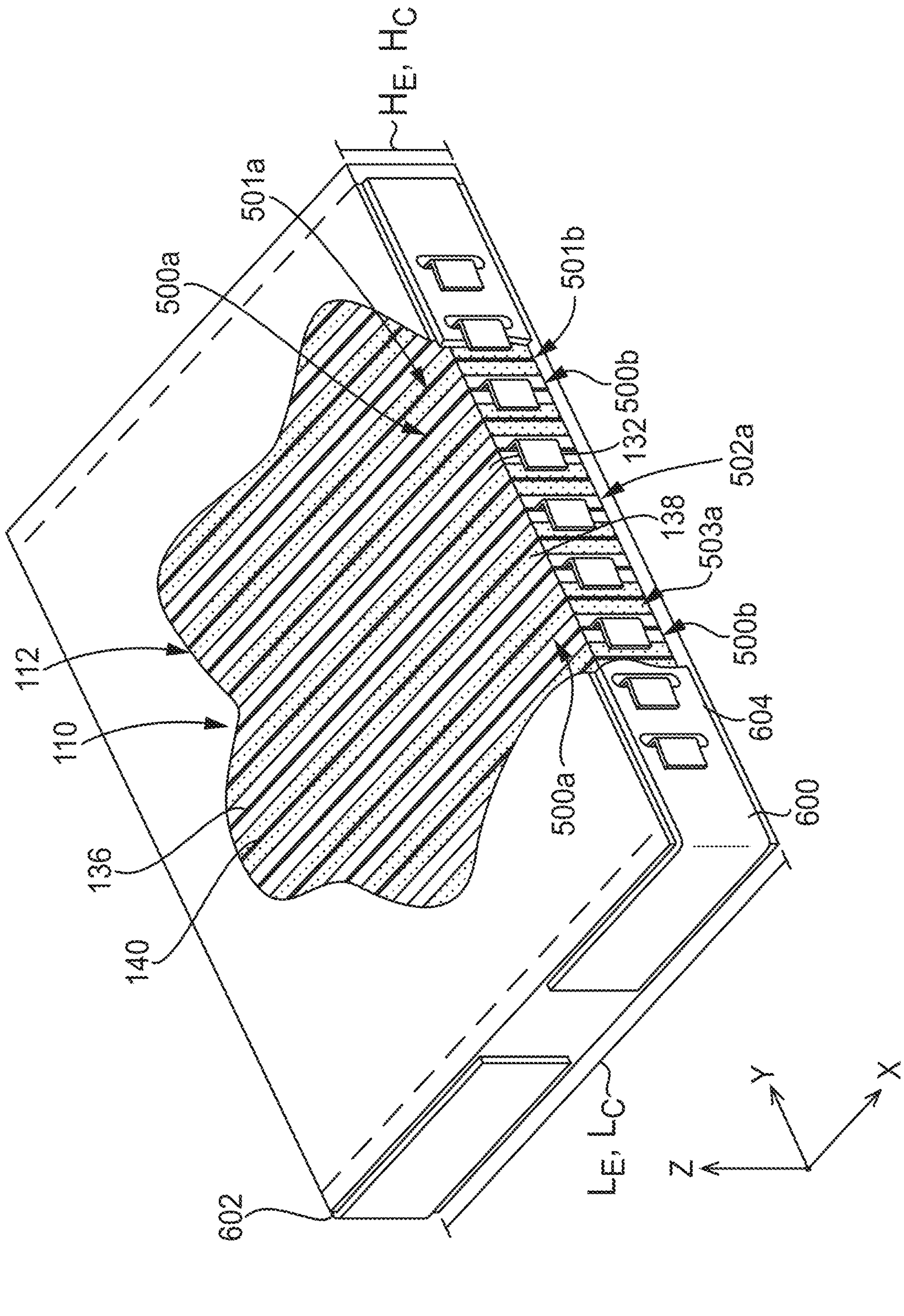
FIG. 30 illustrates an embodiment of a secondary battery having an alternating arrangement of electrode and counter-electrode structures.

In one embodiment, the secondary battery 102 comprises one of more of an electrode busbar 600 and a counter-electrode busbar 602 (e.g., as shown in FIG. 30), to collect current from the electrode current collectors 136 and the counter-electrode current collectors, respectively. As similarly described with respect to embodiments having the offset and/or separation distance above, the electrode assembly 106 can comprise a population of electrode structures, a population of electrode current collectors, a population of separators, a population of counter-electrode structures, a population of counter-electrode collectors, and a population of unit cells wherein members of the electrode and counter-electrode structure populations are arranged in an alternating sequence in the longitudinal direction. Furthermore, each member of the population of electrode structures comprises an electrode current collector and a layer of an electrode active material having a length $L_E$ that corresponds to the Feret diameter of the electrode active material layer as measured in the transverse direction between first and second opposing transverse end surfaces of the electrode active material layer, and a height $H_E$ that corresponds to the Feret diameter of the electrode active material layer as measured in the vertical direction between first and second opposing vertical end surfaces of the electrode active material layer, and a width $W_E$ that corresponds to the Feret diameter of the electrode active material layer as measured in the longitudinal direction between first and second opposing surfaces of the electrode active material layer. Also, each member of the population of counter-electrode structures comprises a counter-electrode current collector and a layer of a counter-electrode active material having a length $L_C$ that corresponds to the Feret diameter of the counter-electrode active material layer as measured in the transverse direction between first and second opposing transverse end surfaces of the counter-electrode active material layer, and a height $H_C$ that corresponds to the Feret diameter of the counter-electrode active material layer as measured in the vertical direction between first and second opposing vertical end surfaces of the counter-electrode active material layer, and a width $W_C$ that corresponds to the Feret diameter of the counter-electrode active material layer as measured in the longitudinal direction between first and second opposing surfaces of the counter-electrode active material layer.

Furthermore, as has also been described elsewhere herein, in one embodiment, the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction.

Referring to FIG. 30, each member of the population of electrode structures 110 comprises an electrode current collector 136 to collect current from the electrode active material layer 132, the electrode current collector extending at least partially along the length $L_E$ of the electrode active material layer 132 in the transverse direction, and comprises an electrode current collector end 604 that extends past the first transverse end surface 503*a* of the counter-electrode active material layer 138. Furthermore, each member of the population of counter-electrode structures 112 comprises a counter-electrode current collector 140 to collect current from the counter-electrode active material layer 138, the counter-electrode current collector 140 extending at least partially along the length $L_C$ of the counter-electrode active material layer 132 in the transverse direction and comprising a counter-electrode current collector end 606 that extends past the second transverse end surface 502*b* of the electrode active material layer in the transverse direction (e.g., as also shown in FIG. 26A). In the embodiment depicted in FIG. 30, the electrode and counter-electrode current collectors 136, 140 are sandwiched in between adjacent layers of electrode active material (in the case of the electrode structures 110) or adjacent layers of counter-electrode active material (in the case of counter-electrode structures 112). However, the current collectors may also be a surface current collector that is present on at least a portion of a surface of the electrode and/or counter-electrode active material layers that is facing the separator 130 in between the electrode and counter-electrode structures 110, 112. Furthermore, in the embodiment as shown in FIG. 30, the electrode busbar 600 and counter-electrode busbar 602 are disposed on opposing transverse sides of the electrode assembly 106, with the electrode current collector ends 604 being electrically and/or physically connected to the electrode busbar 600 at one transverse end, and the counter-electrode current collector ends 606 being electrically and/or physically connected to the counter-electrode busbar 602 at the opposing transverse end.

Also, as similarly described above, each unit cell 504 of the electrode assembly comprises a unit cell portion of a first electrode current collector of the electrode current collector population, a first electrode active material layer of one member of the electrode population, a separator that is ionically permeable to the carrier ions, a first counter-electrode active material layer of one member of the counter-electrode population, and a unit cell portion of a first counter-electrode current collector of the counter-electrode current collector population, wherein (aa) the first electrode active material layer is proximate a first side of the separator and the first counter-electrode material layer is proximate an opposing second side of the separator, and (bb) the separator electrically isolates the first electrode active material layer from the first counter-electrode active material layer, and carrier ions are primarily exchanged between the first electrode active material layer and the first counter-electrode active material layer via the separator of each such unit cell during cycling of the battery between the charged and discharged state.

Figure 27A:
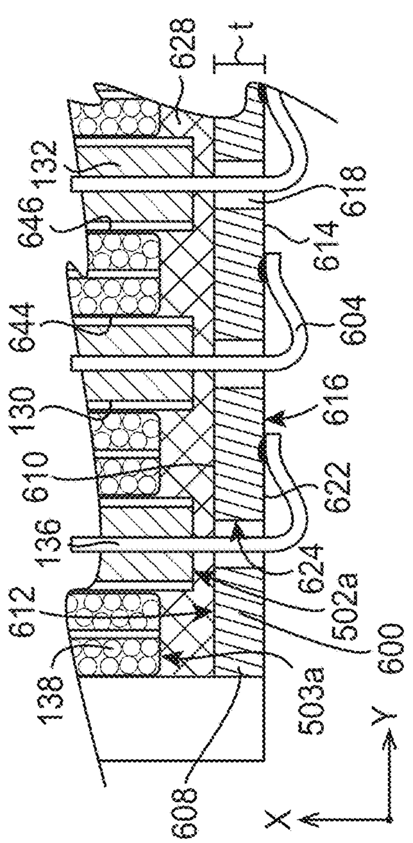
FIGS. 27A-27F illustrate embodiments of electrode assemblies having electrode and/or counter-electrode busbars.

Referring to FIG. 27A, which shows an embodiment of a busbar that may be either an electrode busbar 600 or a counter-electrode busbar 602 (according to whether electrode current collectors or counter-electrode current collectors are attached thereto). That is FIGS. 27A-27F can be understood as depicting structures suitable for either an electrode busbar 600 or counter-electrode busbar 602. FIGS. 27A'-27F' are depicted with respect to an electrode busbar 600, however, it should be understood that the same structures depicted therein are also suitable for the counter-electrode busbar 602, as described herein, even though not specifically shown. The secondary battery can comprise a single electrode busbar 600 and single counter-electrode busbar 602 to connect to all of the electrode current collectors and counter-electrode current collectors, respectively, of the electrode assembly 106, and/or plural busbars and/or counter-electrode busbars can be provided. For example, in the case where FIG. 27A is understood as showing an embodiment of an electrode busbar 600, it can be seen that the electrode busbar 600 comprises at least one conductive segment 608 configured to electrically connect to the population of electrode current collectors 136, and extending in the longitudinal direction (Y direction) between the first and second longitudinal end surfaces 116, 118 of the electrode assembly 106. The conductive segment 608 comprises a first side 610 having an interior surface 612 facing the first transverse end surfaces 503*a* of the counter-electrode active material layers 136, and an opposing second side 614 having an exterior surface 616. Furthermore, the conductive segment 608 optionally comprises a plurality of apertures 618 spaced apart along the longitudinal direction. The conductive segment 608 of the electrode busbar 600 is arranged with respect to the electrode current collector ends 604, such that the electrode current collector ends 604 extend at least partially past a thickness of the conductive segment 608, to electrically connect thereto. The total thickness t of the conductive segment 608 may be measured between the interior 612 and exterior surfaces 616, and the electrode current collector ends 608 may extend at least a distance into the thickness of the conductive segment, such as via apertures 618, and may even extend entirely past the thickness of the conductive segment (i.e., extending past the thickness t as measured in the transverse direction). While an electrode busbar 600 having a single conductive segment 608 is depicted in FIG. 27A, certain embodiments may also comprise plural conductive segments.

Furthermore, in the case where FIG. 27A is understood as showing an embodiment of a counter-electrode busbar 602, it can be seen that the counter-electrode busbar 602 comprises at least one conductive segment 608 configured to electrically connect to the population of counter-electrode current collectors 140, and extends in the longitudinal direction (y direction) between the first and second longitudinal end surfaces 116, 118 of the electrode assembly 106. The conductive segment 608 comprises a first side 610 having an interior surface 612 facing the second transverse end surfaces 502*b* of the electrode active material layers 136, and an opposing second side 614 having an exterior surface 616. Furthermore, the conductive segment 608 optionally comprises a plurality of apertures 618 spaced apart along the longitudinal direction. The conductive segment 608 of the electrode busbar 600 is arranged with respect to the counter-electrode current collector ends 606, such that the counter-electrode current collector ends 606 extend at least partially past a thickness of the conductive segment 608, to electrically connect thereto. The total thickness t of the conductive segment 608 may be measured between the interior 612 and exterior surfaces 616, and the counter-electrode current collector ends 606 may extend at least a distance into the thickness of the conductive segment, such as via apertures 618, and may even extend entirely past the thickness of the conductive segment (i.e., extending past the thickness t as measured in the transverse direction). While the counter-electrode busbar 602 having a single conductive segment 608 is depicted in FIG. 27A, certain embodiments may also comprise plural conductive segments. FIGS. 27B-27F can similarly understood as depicting either electrode and/or counter-electrode busbar embodiments, analogously with the description given for FIG. 27A above.

Furthermore, according to one embodiment, the secondary battery 102 having the busbar and counter-electrode busbar 600, 602 further comprises a set of electrode constraints, such as any of the constraints described herein. For example, in one embodiment, the set of electrode constraints 108 comprises a primary constraint system 151 comprising first and second primary growth constraints 154, 156 and at least one primary connecting member 162, the first and second primary growth constraints 154, 156 separated from each other in the longitudinal direction, and the at least one primary connecting member 162 connecting the first and second primary growth constraints 154, 156, wherein the primary constraint system 151 restrains growth of the electrode assembly 106 in the longitudinal direction such that any increase in the Feret diameter of the electrode assembly in the longitudinal direction over 20 consecutive cycles of the secondary battery is less than 20%. In yet another embodiment, the set of electrode constraints 108 further comprises a secondary constraint system 152 comprising first and second secondary growth constraints 158, 160 separated in a second direction and connected by at least one secondary connecting member 166, wherein the secondary constraint system 155 at least partially restrains growth of the electrode assembly 106 in the second direction upon cycling of the secondary battery 106, the second direction being orthogonal to the longitudinal direction. Further embodiments of the set of electrode constraints 108 are described below.

Further embodiments of the electrode busbar 600 and/or counter-electrode busbar 602 are described with reference to FIGS. 27A-27F. In one embodiment, as shown in FIG. 27A, the electrode busbar 600 comprises a conductive segment 608 having a plurality of apertures 618 spaced apart along the longitudinal direction, wherein each of the plurality of apertures 618 are configured to allow one or more electrode current collector ends 604 to extend at least partially therethrough to electrically connect the one or more electrode current collector ends 604 to the electrode busbar 600. Similarly, the counter-electrode busbar 602 can comprise a conductive segment 608 comprises a plurality of apertures 618 spaced apart along the longitudinal direction, wherein each of the plurality of apertures 618 are configured to allow one or more counter-electrode current collector ends 606 to extend at least partially therethrough to electrically connect the one or more counter-electrode current collector ends 606 to the counter-electrode busbar 602. Referring to the cutaway as shown in FIG. 27A', it can be seen that, on the electrode busbar side, the current collectors 136 of the electrode structures 110 extend past the first transverse surfaces 502*a* of the electrode active material layers 132, and extend through the apertures 618 formed in the conductive segment. The electrode current collector ends 604 are connected to the exterior surface 616 of the electrode busbar 600. Analogously, although not specifically shown, on the other transverse end where the counter-electrode busbar 602 is located, the electrode current collectors 140 of the counter-electrode structures 112 extend past the second transverse surfaces 503*b* of the counter-electrode active material layers 138, and extend through the apertures 618 formed in the conductive segment. The counter-electrode current collector ends 606 are connected to the exterior surface 616 of the counter-electrode busbar 600.

Furthermore, while in one embodiment both the electrode busbar and counter-electrode busbar 600, 602 may both comprise the plurality of apertures 618, in yet another embodiment only the electrode busbar 600 comprises the apertures 618, and in a further embodiment only the counter-electrode busbar 602 comprises the apertures 618. In yet another embodiment, the secondary battery may comprise both an electrode busbar and counter-electrode busbar, whereas in further embodiments the secondary battery may comprise only an electrode busbar or counter-electrode busbar, and current is collected from the remaining current collectors via a different mechanism. In the embodiment as shown in FIG. 27A and FIG. 27A', the apertures 618 are shown as being sized to allow an electrode current collector or counter-electrode current collector therethrough. While in one embodiment, the apertures may be sized and configured to allow only a single current collector through each aperture, in yet another embodiment the apertures may be sized to allow more than one electrode current collector 136 and/or counter-electrode current collector 140 therethrough. Furthermore, in the embodiment as shown in FIG. 27A and FIG. 27A', the electrode current collector ends and/or counter-electrode current collector ends extend entirely through one or more of the apertures 618, and the ends 604, 606 are bent towards an exterior surface 616 of the electrode busbar and/or counter-electrode busbar, to attach to a portion 622 of the exterior surface electrode busbar and/or counter-electrode busbar between apertures 618. The ends 604,608 may also and/or optionally be connected to other parts of the conductive segment 608, such as portions of the conductive segment above or below the apertures in the vertical direction, and/or to an inner surface 624 of the apertures 618 themselves.

Figure 27B:
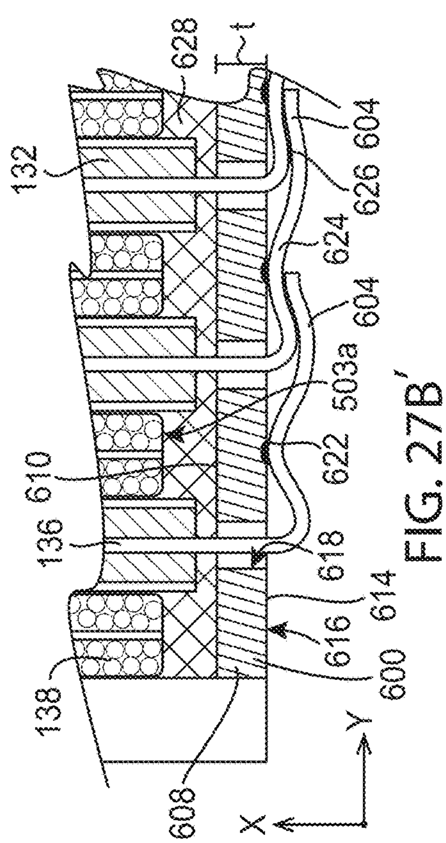
Figure 27A:
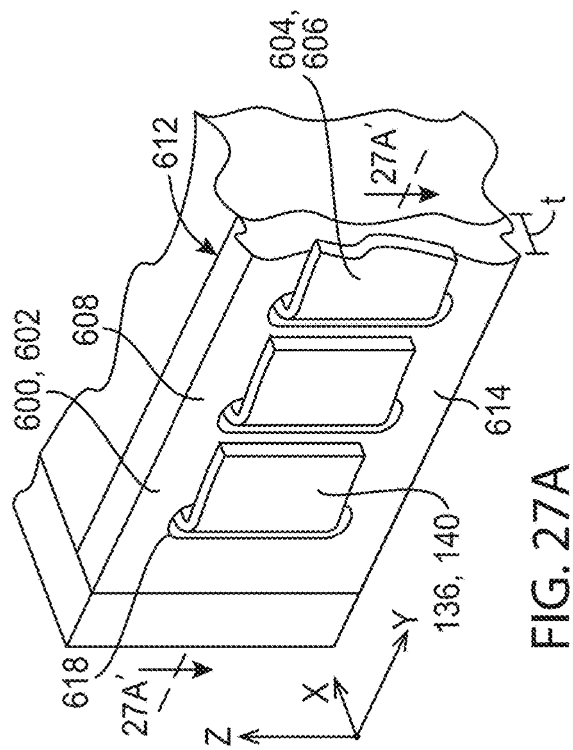
Figure 27B:
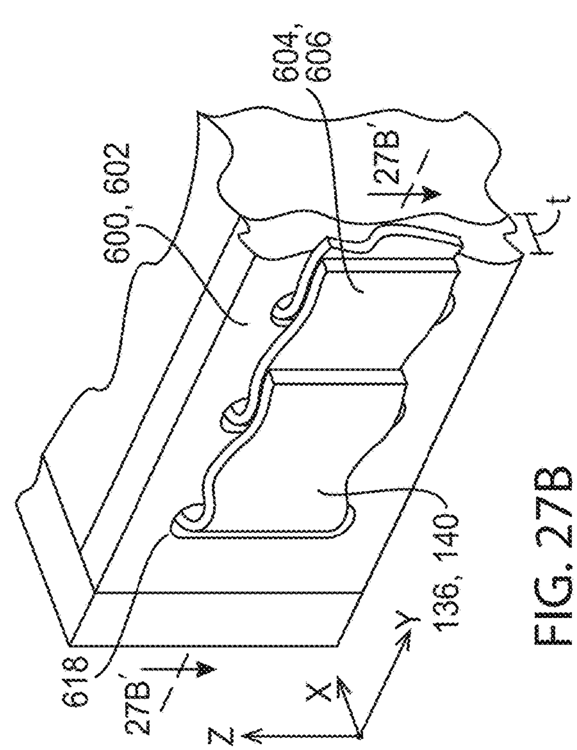

In the embodiment as shown in FIG. 27B and FIG. 27B', the electrode current collector ends and/or counter-electrode current collector ends 604, 606 extend entirely through one or more of the apertures 618, and the ends are bent towards an exterior surface 616 of the electrode busbar and/or counter-electrode busbar. However, in this embodiment, at least one or more of the current collector ends extends at least partially in the longitudinal direction either to or past an adjacent aperture 618 (e.g., past the adjacent aperture as shown in FIG. 27B'), to attach to a separate electrode current collector end and/or counter-electrode current collector end. That is, the ends of the electrode and/or counter-electrode current collectors may be attached to one another. In yet another embodiment, as is also shown in FIG. 27B', the electrode current collector ends and/or counter-electrode current collector ends attach at a first end region 624 to a portion 622 of an exterior surface 616 of the electrode busbar and/or counter-electrode busbar that is between apertures 618, and attach at a second end region 626 to another separate electrode current collector end and/or counter-electrode current collector end.

In one embodiment, the electrode current collector ends 604 and/or counter-electrode current collector ends 606 are attached to one or more of the portion 622 of the exterior surface of the electrode busbar and/or counter-electrode busbar, and/or a separate electrode current collector end and/or counter-electrode current collector end, (such as an adjacent current collector extending through an adjacent aperture) via at least one of an adhesive, welding, crimping, brazing, via rivets, mechanical pressure/friction, clamping and soldering. The ends 604, 604 may also be 30) connected to other parts of the electrode busbar and/or counter-electrode busbar, such as an inner surface 624 of apertures 618 or other parts of the busbars, also via such attachment. Furthermore, the number of current collector ends that are attached to each other versus being attached only to the busbars can be selected according to a preferred embodiment. For example, in one embodiment, each of the electrode current collector ends and counter-electrode current collector ends, in a given population, is separately attached to a portion 622 of the exterior surface 616 of the electrode and/or counter-electrode busbar 600, 602. In yet another embodiment, at least some of the electrode current collector ends and/or counter-electrode current collector ends are attached to each other (e.g., by extending through apertures and then longitudinally towards or past adjacent apertures to connect to adjacent current collector ends extending through the adjacent apertures), while at least one of the electrode current collector ends and/or counter-electrode current collector ends are attached to a portion of the exterior surface of the electrode busbar and/or counter-electrode busbar (e.g., to provide an electrical connection between the busbars and the current collector ends that are attached to one another. In yet another embodiment, all of the current collectors in a population may be individually connected to busbar, without being attached to other current collector ends.

In yet a further embodiment, the electrode current collector ends and/or counter-electrode current collector ends have a surface region (such as the first region 624) that attaches to a surface (such as the exterior surface) of the busbar and/or counter-electrode busbar. For example, the electrode current collector ends and/or counter-electrode current collector ends have a surface region that attaches to at least one of an exterior surface of the electrode busbar and/or counter-electrode busbar, and an inner surface 624 of an aperture 618 of the busbar and/or counter-electrode busbar. In one embodiment, one or more of the ends of the electrode busbar and/or counter-electrode busbar may comprise a surface region that attaches to the interior surface 612 of the busbar and/or counter-electrode busbar. The size of the connecting surface region can be selected according to the type of attachment to be selected for attaching the ends to the electrode and/or counter-electrode busbar. In one embodiment, for example as shown in FIG. 27A' and FIG. 27B', the electrode busbar and/or counter-electrode busbar comprises a layer 628 of insulating material on an interior surface 612 proximate the transverse ends of the electrode and/or counter-electrodes, and layer of conductive material (e.g., the conductive segment 608) on an exterior surface 616 opposing the interior surface. The layer 628 of insulating material may include an insulating member 514 as described elsewhere herein, disposed between the transverse surfaces of the electrode and/or counter-electrode active material layers 132, 138 and the busbar, and/or can comprise a separate layer 632 of insulating material along the interior surface of the busbar to insulate the electrode assembly from the conductive segment of the busbar (see, e.g., FIG. 27C' and FIG. 27D').

In one embodiment, the material and/or physical properties of the electrode and/or counter-electrode current collectors 136, 140, may be selected to provide for good electrical contact to the busbar, while also imparting good structural stability to the electrode assembly. For example, in one embodiment, the electrode current collector ends 604 and/or counter-electrode current collector ends 606 (and optionally, at least a portion and even the entirety of the electrode and/or counter-electrode current collector) comprise the same material as a material making up the electrode busbar and/or counter-electrode busbar. For example, in a case where the busbar and/or counter-electrode busbar comprises aluminum, the electrode and/or counter-electrode current collectors may also comprise aluminum. In one embodiment, the electrode current collector ends and/or counter-electrode current collector ends comprise any selected from the group consisting of aluminum, copper, stainless steel, nickel, nickel alloys, carbon, and combinations/alloys thereof. Furthermore, in one embodiment, the electrode current collector ends and/or counter-electrode current collector ends comprise a material having a conductivity that is relatively close to the conductivity of a material of the electrode bus and/or counter-electrode bus, and/or the electrode and/or counter-electrode current collectors may comprise a same material as that of the electrode and/or counter-electrode bus.

Figure 27C:
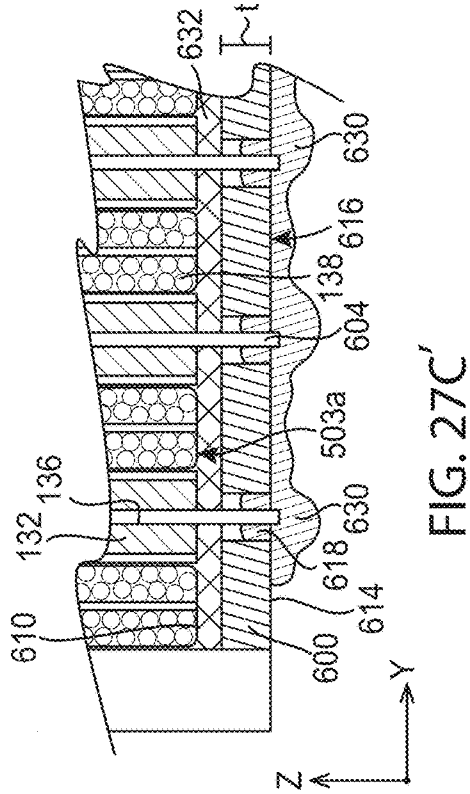
Figure 27D:
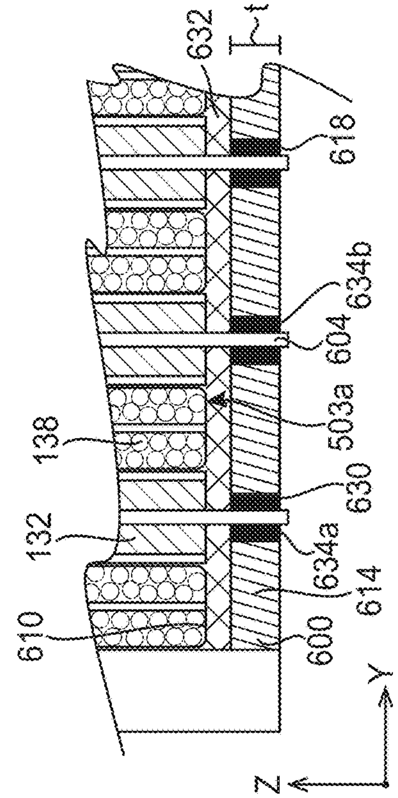
Figure 27C:
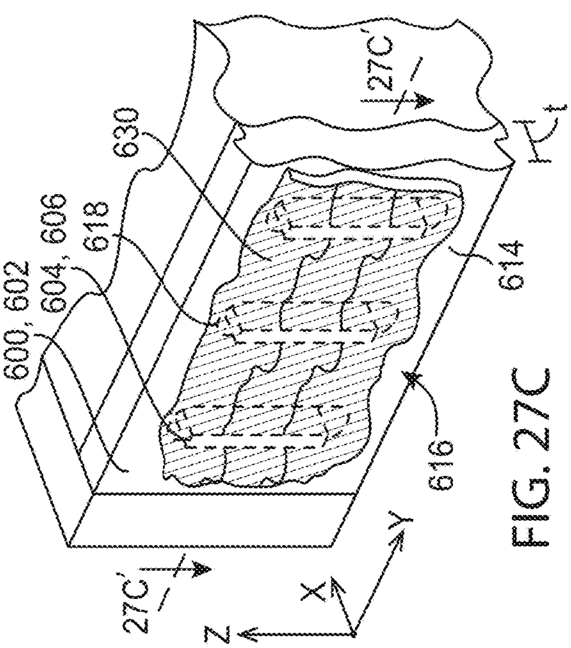
Figure 27D:
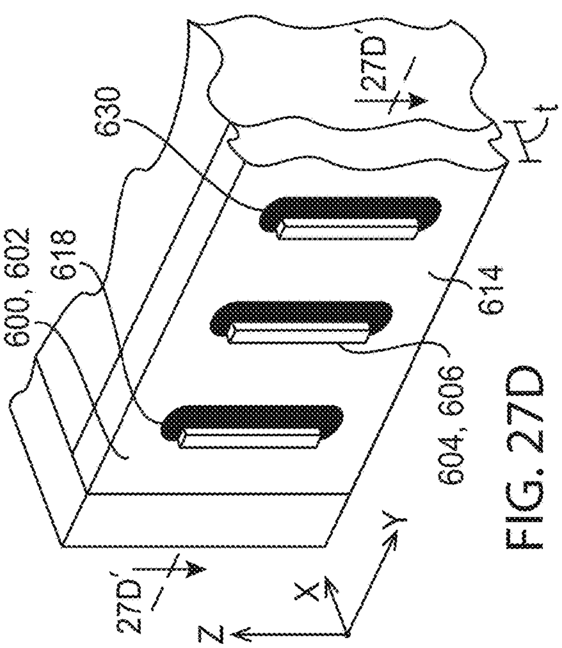

In yet another embodiment, as depicted in FIG. 27C, FIG. 27C', FIG. 27D and FIG. 27D', the electrode current collector ends and/or counter-electrode current collector ends 604, 606 are attached to the electrode busbar and/or counter-electrode busbar 600, 602 via an at least partially conductive material 630 formed about the current collector ends and/or counter-electrode current collector ends 604, 606, to electrically connect the ends to the electrode busbar and/or counter-electrode busbar 600, 602. For example, in the embodiment as shown in FIG. 27D', a coating 630 of a conductive material is formed about the electrode current collector ends and/or counter-electrode current collector ends to electrically connect the ends to the electrode busbar and/or counter-electrode busbar. The coating 632 of the conductive material may be coated onto the exterior surface 616 of the electrode busbar and/or counter-electrode busbar, and can at least partially infiltrate the apertures 618 formed therein, to electrically connect the ends to the electrode busbar and/or counter-electrode busbar. For example, as shown in FIG. 27C, the ends of the current collectors extend at least partially into and even slightly past the apertures 618, and the coating infiltrates the apertures to connect the portion of the ends disposed in the aperture to the adjoining aperture inner surface, as well as to connect a portion of the ends extending above the apertures to busbar exterior surface. In one embodiment, the coating 632 of conductive material comprises a conductive metal selected from the group consisting of aluminum, copper, stainless steel, nickel, nickel alloys, and combinations/alloys thereof.

In yet a further embodiment, the electrode current collector ends and/or counter-electrode current collector ends are attached to the electrode busbar and/or counter-electrode busbar via an at least partially conductive material 630 inserted into apertures 618 in the electrode busbar and/or counter-electrode busbar to electrically connect the ends to the busbar and/or counter-electrode busbar. For example, referring to FIG. 27D and FIG. 27D', in one embodiment the electrode current collector ends and/or counter-electrode current collector ends are attached to the electrode busbar and/or counter-electrode busbar via an at least partially conductive material 630 formed about the current collector ends and/or counter-electrode current collector ends, the at least partially conductive material comprising a polymeric material that is a positive temperature coefficient material, and which exhibits an increased resistance with an increase in temperature. The positive temperature coefficient material may not only advantageously mechanically and/or electrically connect the current collector ends to the busbar, but may also provide a "shut-off" mechanism by which electrical connection to a particular current collector end may be cut off in a case where excessive temperatures arise, thereby inhibiting run-away processes that could otherwise result in failure of the electrode assembly. Furthermore, in the embodiment as shown in FIGS. 27D and 27D', the positive coefficient material may be provided in the form of individual inserts 634 that are each individually inserted into apertures 618. That is, one or more ends of the electrode current collectors and/or counter-electrode current collectors may have individual inserts comprising polymeric positive temperature coefficient material to electrically connect the ends to the electrode busbar and/or counter-electrode busbar, where first individual insert 634*a* about a first end is physically separate from a second individual insert 634*b* about a second end, the first and second ends being electrically connected to the same electrode busbar and/or counter-electrode busbar. In one embodiment, each current collector end that connects to the busbar comprises an individual insert 634 comprising the polymeric positive temperature coefficient material, with each insert being physically separate from the others. In another embodiment, at least two current collector ends share the same insert 634, the insert comprising the polymeric positive temperature coefficient material. For example, in one embodiment, the secondary battery 102 comprises a plurality of inserts 634 comprising polymeric positive temperature coefficient material at least partially inserted into apertures 618 in the electrode busbar and/or counter-electrode busbar 600, 602, the plugs at least partially surrounding a portion of the ends 604, 606 of the electrode current collector and/or counter-electrode current collector that is disposed in the apertures 618 (and optionally also a portion of the ends that extends out of the apertures in the transverse direction).

In yet another embodiment, the ends of the electrode current collectors and/or counter-electrode current collectors extend through apertures 618 of the electrode busbar and/or counter-electrode busbar, and are bent back towards and exterior surface 616 of the electrode busbar and/or counter-electrode bus bar to attach thereto, and wherein a region 624 of the ends that is bent to attach to the exterior surface is substantially planar, for example as shown in FIGS. 27A and 27A'. In yet another embodiment, the ends of the electrode current collectors and/or counter-electrode current collectors extend through apertures 618 of the electrode busbar and/or counter-electrode busbar, and are bent back towards and exterior surface 616 of the electrode busbar and/or counter-electrode bus bar to attach thereto, and wherein a region 624 of the ends that is bent to attach to the exterior surface is curved, as shown for example in FIGS. 27F and 27F'.

Figure 27E:
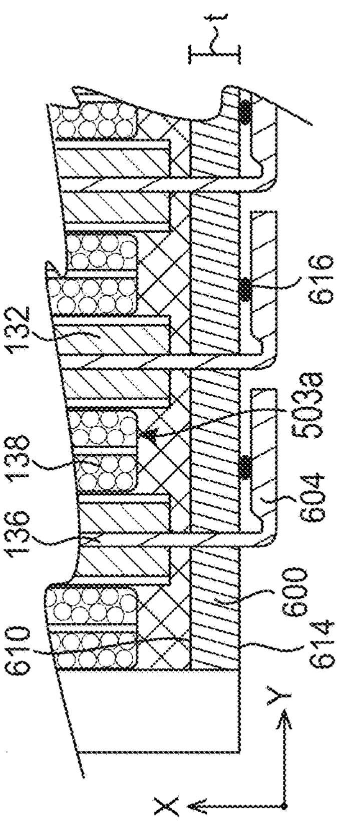

In yet another embodiment, as shown in FIG. 27E and FIG. 27E' the conductive segment 608 of the busbar is configured such that the ends 604, 606 of the electrode current collectors and/or counter-electrode current collectors extend over and/or under the conductive segment 608 of electrode busbar and/or counter-electrode busbar 600, 602 in the vertical direction, to pass over and/or under the conductive segment, and are attached to the exterior surface 616 of the conductive segment 608. That is, referring to FIGS. 27E and 27E', the height of the electrode current collector end 604 and/or counter-electrode current collector end 606 in the vertical direction may exceeds a height $H_{BB}$ of the conductive segment 608 of the electrode busbar and/or counter-electrode busbar 600, 602, and/or the vertical position of the electrode and/or counter-electrode current collector 604, 606 may be offset from the vertical position of the conductive segment 608 of the electrode busbar and/or counter-electrode busbar, such that ends 604, 606 of the electrode current collector and/or counter-electrode current collector can pass over and/or under the conductive segment 608 of the electrode busbar and/or counter-electrode busbar. For example, the ends may pass over an upper and/or lower surfaces 636*a,b* of the conductive segment 608 in the vertical direction. Furthermore, in one embodiment, the ends of the electrode current collector and/or counter-electrode current collector are configured to pass over and/or under the conductive segment of the electrode busbar and/or counter-electrode busbar, and are bent back towards the conductive segment in a vertical direction to attach to an exterior surface 616 of the electrode busbar and/or counter-electrode busbar. In the embodiment as shown in FIG. 27E, the portion of the current collector ends 604, 606 extending over the conductive segment 608 are folded first in a longitudinal direction, and then in a vertical direction, such that the rectangular ends can be shaped into a fold that provides an attachment region for flush connection to the exterior surface 616 of the conductive segment.

Figure 27F:
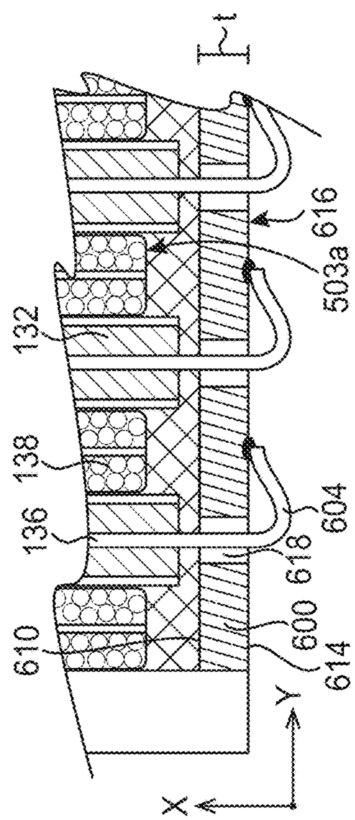
Figure 27E:
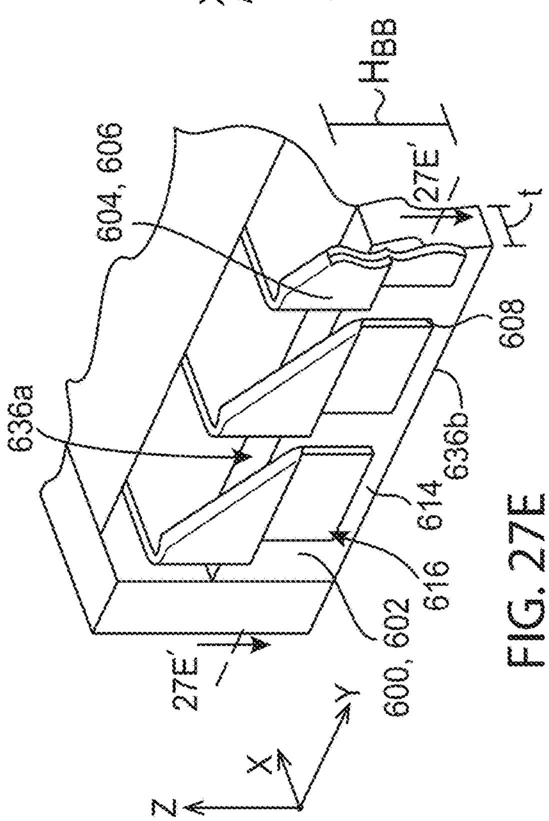
Figure 27F:
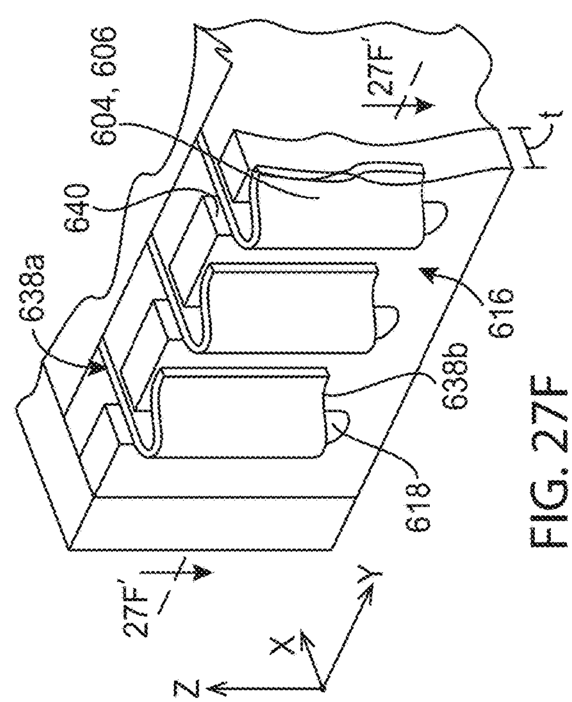

In yet another embodiment as shown in FIGS. 27F and 27F', the conductive segment of the electrode busbar and/or counter-electrode busbar 600, 602 comprises a plurality of apertures 618 therein, with the apertures having openings in both a thickness direction t of the conductive segment, as well as in the vertical direction. In the embodiment as shown, the ends of the electrode current collectors and/or counter-electrode current collectors 604 606 extend through apertures 618 of the electrode busbar and/or counter-electrode busbar, and are bent back towards an exterior surface 616 of the electrode busbar and/or counter-electrode bus bar to attach thereto. Furthermore, in the embodiment as shown, the vertical end surface 638 (either the upper or lower vertical end surface 638*a*, 638*b*) of the current collector ends may be at a same z position, or even higher than (or lower than), an upper or lower surface 636*a,b* of the conductive segment 608, as the vertical end surface 638 of the collector end can pass through the vertical opening 640 in the aperture. In one embodiment, a second electrode assembly 106 stacked vertically above the assembly as shown may have busbars with apertures in a configuration that is the mirror image of that shown in FIGS. 27F and 27F', such that the vertical opening 640 of apertures in the lower electrode assembly align with, and form a complete aperture structure with, the vertical openings facing the opposing direction in the upper electrode assembly. The conductive segments of such adjacent busbars may be electrically and/or physically connected, or may be physically and/or electrically isolated from one another, but may form a common aperture 618 (extending from the lower electrode assembly to the upper electrode assembly) through which the current collector ends may extend.

In yet a further embodiment, the secondary battery further comprises a second electrode busbar and and/or counter-electrode busbar, with a second conductive segment the extends in the longitudinal direction between first and second longitudinal end surfaces of the electrode assembly, to electrically connect to ends of the electrode current collector and/or counter-electrode current collector. However, in one embodiment, at least 50% of the electrode current collectors and/or counter-electrode current collectors of the electrode assembly 106 are electrically connected to and in physical contact with the same electrode busbar and/or counter-electrode busbar, respectively. In yet another embodiment, at least 75% of the electrode current collectors and/or counter-electrode current collectors in the electrode assembly are electrically connected to and in physical contact with the same electrode busbar and/or counter-electrode busbar, respectively. In yet a further embodiment, at least 90% of the electrode current collectors and/or counter-electrode current collectors in the electrode assembly are electrically connected to and in physical contact with the same electrode busbar and/or counter-electrode busbar, respectively. For example, in one embodiment, a significant fraction of the electrode and/or counter-electrode current collectors in the electrode assembly may be individually connected (i.e. in direct physical contact with) the electrode and/or counter-electrode busbars, so that if one current collector were to fail, the remaining current collectors would maintain their individual connection with the electrode and/or counter-electrode busbar. That is, in one embodiment, no more than 25% of the electrode and/or counter-electrode current collectors in the electrode assembly are in indirect contact with the busbars, such as by being connected via attachment to an adjacent current collector, and instead at least 75%, such as at least 80%, 90%, 95%, and even at least 99% of the electrode and/or counter-electrode current collectors are in direct physical contact (e.g., individually attached to) the respective electrode and/or counter-electrode busbar. In one embodiment, the electrode and/or counter-electrode current collectors comprise internal current collectors, and are disposed between layers of electrode active material and/or counter-electrode active material in the electrode structures 110 and/or counter-electrode structures 112, respectively (see, e.g., FIGS. 27A'-27F'). In yet another embodiment, the electrode current collectors 136 and/or counter-electrode current collectors 140 extend along an outer surface 644, 646 (e.g., surface facing the separator 130) of one or more of the layers of electrode material and/or counter-electrode material in the electrode structures and/or counter-electrode structures, respectively. The current collectors may also comprise a combination of "internal" current collectors disposed between active material layers in the electrode and/or counter-electrode structures 110, 112, and "surface" current collectors disposed along the outer surfaces 644, 646 of the layers. Either or both of the "internal" and "surface" current collectors may be connected to the electrode and/or counter-electrode busbars via any of the configurations described herein.

In one embodiment, the electrode current collector and/or counter-electrode current collector 136, 140 extend at least 50% along the length of the layer of electrode material $L_E$ and/or layer of counter-electrode material $L_C$, respectively, in the transverse direction, where $L_E$ and $L_C$ are defined as described above. For example, in one embodiment, the electrode current collector and/or counter-electrode current collector extend at least 60% along the length of the layer of electrode material $L_E$ and/or layer of counter-electrode material $L_C$, respectively, in the transverse direction. In another embodiment, the electrode current collector and/or counter-electrode current collector extend at least 70% along the length of the layer of electrode material $L_E$ and/or layer of counter-electrode material $L_C$, respectively, in the transverse direction. In yet another embodiment, the electrode current collector and/or counter-electrode current collector extend at least 80% along the length of the layer of electrode material $L_E$ and/or layer of counter-electrode material $L_C$, respectively, in the transverse direction. In a further embodiment, the electrode current collector and/or counter-electrode current collector extend at least 90% along the length of the layer of electrode material $L_E$ and/or layer of counter-electrode material $L_C$, respectively, in the transverse direction.

Furthermore, in one embodiment, the electrode current collector and/or counter-electrode current collector extend at least 50% along the height $H_E$ of the layer of electrode material and/or layer of counter-electrode material $H_C$, respectively, in the vertical direction, with $H_E$ and $H_C$ being defined as describe above. For example, in one embodiment, the electrode current collector and/or the counter-electrode current collector extend at least 60% along the height $H_E$ of the layer of electrode material and/or layer of counter-electrode material $H_C$, respectively, in the vertical direction. In another embodiment, the electrode current collector and/or counter-electrode current collector extend at least 70% along the height $H_E$ of the layer of electrode material and/or layer of counter-electrode material $H_C$, respectively, in the vertical direction. In yet another embodiment, the electrode current collector and/or counter-electrode current collector extend at least 80% along the height $H_E$ of the layer of electrode material and/or layer of counter-electrode material $H_C$, respectively, in the vertical direction. In a further embodiment, the electrode current collector and/or counter-electrode current collector extend at least 90% along the height $H_E$ of the layer of electrode material and/or layer of counter-electrode material $H_C$, respectively, in the vertical direction.

Figure 31B:
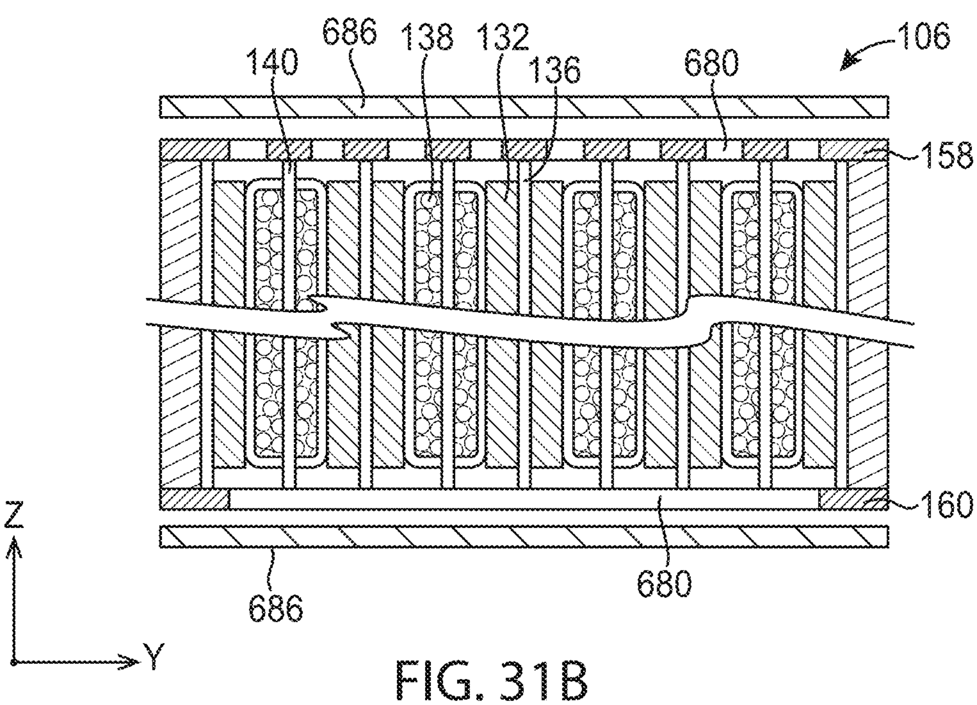

According to yet another embodiment aspect, referring to FIGS. 31A and 31B, the electrode assembly 106 comprises at least one of vertical electrode current collector ends 640 and vertical counter-electrode current collector ends 642 that extend past one or more of first and second vertical surfaces 500*a,b* 501*a,b* of adjacent electrode active material layers 132 and/or counter-electrode active material layers 138. In one embodiment, the vertical current collector ends 640, 642 can also be at least partially coated with a carrier ion insulating material, as described in further detail below, to reduce the likelihood of shorting and/or plating out of carrier ions on the exposed vertical current collector ends.

According to one embodiment, for at least one of members of the electrode population and members of the counter-electrode population, either (I) each member of the population of electrode structures 110 comprises an electrode current collector 136 to collect current from the electrode active material layer 132, the electrode current collector 136 extending at least partially along the height $H_E$ of the electrode active material layer 132 in the vertical direction, and comprising at least one of (a) a first vertical electrode current collector end 640*a* that extends past the first vertical end surface 500*a* of the electrode active material layer 132, and (b) a second vertical electrode current collector end 640*b* that extends past the second vertical end surface 500*b* of the electrode active material layer 132, and/or (II) each member of the population of counter-electrode structures 112 comprises a counter-electrode current collector 140 to collect current from the counter-electrode active material layer 138, the counter-electrode current collector 140 extending at least partially along the height $H_C$ of the counter-electrode active material layer 138 in the vertical direction, and comprising at least one of (a) a first vertical counter-electrode current collector end 642*a* that extends past the first vertical end surface 501*a* of the counter-electrode active material layer 138 in the vertical direction, and (b) a second vertical electrode current collector end 642*b* that extends past the second vertical end surface 501*b* of the electrode active material layer 138. Referring to the embodiment as shown in FIG. 31A, it can be seen that vertical ends 640*a,b*, 642*a, b* of both the electrode current collectors 136 and counter-electrode current collectors 140 extend past first and second vertical end surface of the electrode active and counter-electrode active material layers 132, 138.

Referring to the embodiments in FIGS. 29A-29D, according to one aspect, the vertical ends 640*a,b*, 642*a,b* of the current collectors 136, 140 may be at least partially covered with a carrier ion insulating material 645, to inhibit shorting and/or plating out on the ends. In one embodiment, the carrier ion insulating material 645 may have a permeability to the carrier ions that is less than that of the ionically permeably separator 130 provided in the same unit cell 504 as the current collector. For example, the carrier ion insulating material 645 may form a layer having a conductance for carrier ions does not exceed 10% of that of the ionically permeable separator, such as no more than 5%, 1%, 0.1%, 0.01%, 0.001% and even 0.0001% of that of the ionically permeable separator. In one embodiment, one or more vertical ends 640*a*, 640*b* of members of the population of electrode current collectors 136 comprise the carrier ion insulating material 645, such as either or both of the first and second vertical ends 640*a*, 640. In another embodiment, one or more vertical ends 642*a*, 642*b* of members of the population of counter-electrode current collectors 140 comprise the carrier ion insulating material 645, such as either or both of the first and second vertical ends 640*a*, 640. The carrier ion insulating material 645 may also act as an adhesive material, as is discussed in further detail below, and may also in certain embodiments correspond to any of the carrier ion insulating materials and/or adhesives as otherwise described herein.

In the embodiments as shown in FIGS. 29A-29D, the carrier ion insulating material 645 covers at least a portion of the surfaces 646, 648 at the vertical ends 640*a,b*, 642*a,b* of one or more of the electrode and counter-electrode current collectors 136, 140. For example, referring to the embodiment shown in FIG. 29A, the carrier ion insulating material 645 can cover surfaces 646, 648 at the vertical ends that can include the first and/or second vertical end surfaces 516, 520 of the electrode and counter-electrode current collector, as well as longitudinal surfaces 670*a,b*, 672*a,b* of the electrode and/or counter-electrode current collector that are in a region adjacent the vertical ends surfaces. That is, the carrier ion insulating 645 can be provided in the form of a coating 674 that coats surfaces at the vertical ends of the electrode and/or counter-electrode current collectors, and in particular may coat surfaces 646, 648 at the vertical ends that are exposed by virtue of having a position in z that extends past (i.e., above or below), the adjacent electrode and/or counter-electrode active material layers (e.g., as shown in the embodiment depicted in FIG. 31A). That is, the carrier ion insulating material can comprise a coating and/or layer 674 that at least partially covers surfaces adjacent the vertical ends of the electrode and/or counter-electrode current collectors that extend vertically past the first and/or second vertical end surfaces of adjacent electrode and/or counter-electrode active material layers. Furthermore, the carrier ion insulating material and/or coating can also extend along the transverse direction of the surfaces, along a predetermined distance or at predetermined areas along the electrode and/or counter-electrode length $L_E$, $L_C$. In one embodiment, the coating 674 may cover at least 10% of the surfaces of the members of the electrode current collector population and/or counter-electrode current collector population that extend past the first and/or second vertical end surfaces of adjacent electrode and/or counter-electrode active material layers, such as at least 20%, at least 45%, at least 50%, at least 75%, at least 90%, at least 95% and even at least 98% of such surfaces. Suitable carrier ion insulating materials can comprise, for example, at least one of epoxy, polymer, ceramic, composites, and mixtures of these.

In yet another embodiment, referring again to FIGS. 29A-29D and 31A-31B, one or more of members of the electrode current collector and/or counter-electrode current collector populations comprise attachment sections 676*a,b*, 678*a,b*, disposed respectively at the vertical ends 640*a,b*, 642*a,b* thereof, to attach to at least a portion of the set of electrode constraints 108 that restrain growth of the electrode assembly 106 during charge and/or discharge of the secondary battery 102 having the electrode assembly 106. For example, in one embodiment, the attachment sections 676*a,b* 678*a,b* may be configured to attach to a portion of a secondary constraint system 155, such as one or more of a first and second secondary growth constraint 158, 160. The attachment sections 676*a,b*, 678*a, b* may further extend and/or repeat in a transverse direction along the ends of the electrode and/or counter-electrode current collectors. For example, referring to FIG. 31C, which is a top-down view of the electrode assembly 106, an embodiment is shown where the attachment sections 676*a,b* of the electrode current collector ends may extend continuously in the transverse direction along each end of the population of electrode current collectors, to connect with the first and/or second secondary growth constraint 158, 160. However, the attachment sections 678*a,b* of the ends of the electrode and/or counter-electrode current collectors 136, 140 have discrete start and stopping points along the transverse direction of the ends of the electrode and counter-electrode current collectors 136,140, due to the presence of holes and/or openings 680 in the constraint 158, 160 formed over/under the electrode and/or counter-electrode current collector ends, that may be provided, for example, to allow electrolyte to flow into the electrode assembly 106. That is, the ends of the electrode and/or counter-electrode current collectors 140 may comprise a plurality of attachment sections along a transverse section thereof. Furthermore, the holes and/or openings 680 may be over the counter-electrode current collectors, as shown in the top section of FIG. 31C, or over the electrode current collectors, as shown in the bottom section of FIG. 31C. Conversely, in the embodiment shown in FIG. 31D, the attachment sections 678*a,b* of the counter-electrode current collector ends may extend continuously in the transverse direction, to connect with the first and/or second secondary growth constraint 158, 160. As shown in this embodiment, the attachment sections 676*a,b* of the ends of the electrode current collectors 136 have discrete start and stopping points along the transverse direction of the ends of the electrode current collectors 136, due to the presence of holes and/or openings 680 in the constraint 158, 160 that are formed over/under the electrode current collectors and/or separators, and that may be provided, for example, to allow electrolyte to flow into the electrode assembly 106. In one embodiment, the holes and/or opening are formed over the separator 130, as depicted in the top section of FIG. 31D, and/or continuous holes and/or slots may also be formed over the population of electrodes and/or counter-electrodes, as shown in the bottom section of FIG. 31D. That is, the ends of the electrode current collectors 136 and/or counter-electrode current collectors 140 may comprise a plurality of attachment sections along a transverse section thereof.

Figure 31C:
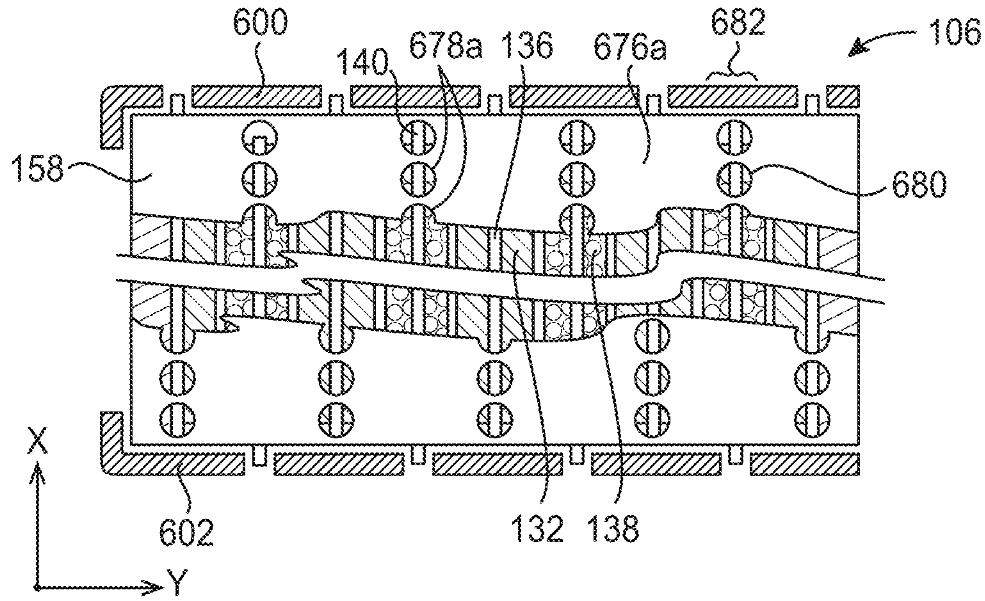
FIGS. 31C-31D illustrate cross-sections in the X-Y plane, of embodiments of an electrode assembly, with configurations of openings and/or slots.
Figure 31D:
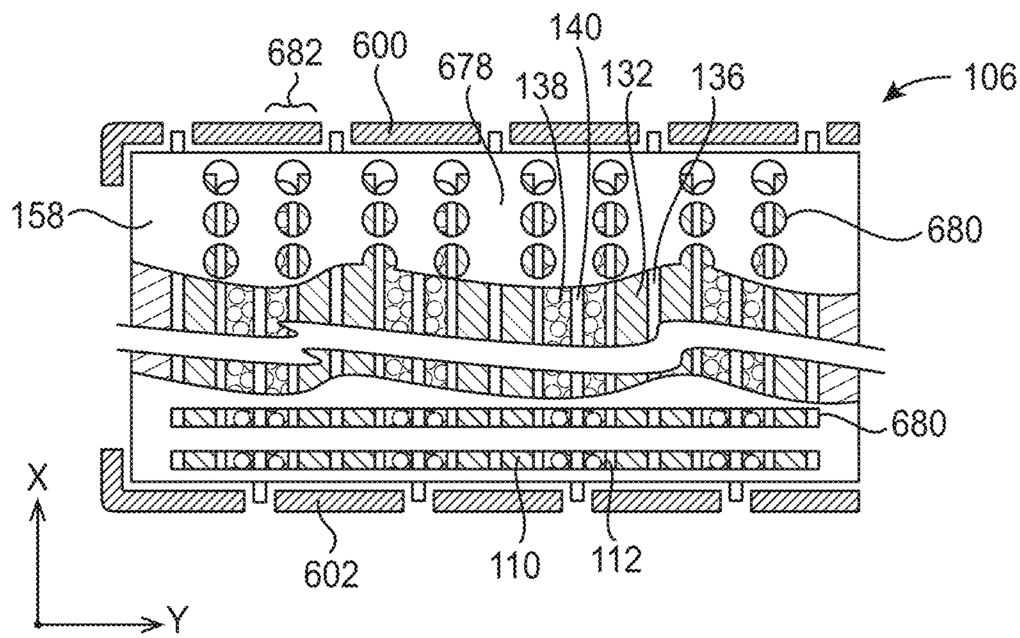

In one embodiment, as shown in FIGS. 31C and 31D, one or more of the constraints 158, 160 can comprise a plurality of openings 680 comprise a plurality of holes spaced apart from one another and extending across the x-direction of the constraint surface to form a column of holes 682 at a plurality of positions in the longitudinal direction. In the embodiments depicted in FIG. 31C, the each column of holes 682 is depicted as being positioned such that the holes are centered about a counter-electrode current collector, the column of holes extending across a length direction thereof, whereas in the embodiment depicted in FIG. 31D, each column of holes 682 is depicted as being positioned such that the holes are centered about an electrode current collector, the column of holes 682 extending across a length direction thereof. In yet another embodiment as depicted in FIG. 31D, the plurality of openings 680 can comprise a plurality of longitudinally oriented slots 684 extending across the constraint 158, 160 in the longitudinal direction, such as across one or even a plurality of members of the electrode and/or counter-electrode members 110,112. The openings 680 may be provided to allow for a flow of electrolyte into the electrode assembly 106 and/or between adjacent electrode assemblies. The openings 680 may also be provided to facilitate replenishment of carrier ions by one or more reference electrodes 686 located outside the constraints 158, 160. That is, one or more auxiliary electrodes 686 can be provided as a replenishment source of carrier ions to replenish the electrode and/or counter-electrode active material layers 132, 138, either before, during or after a charge and/or discharge cycle, and/or to supplement carrier ions during battery formation. The one or more auxiliary electrodes 686 can be electrically connected to the population of electrode structures 110, the population of counter-electrode structures 112, or both. For example, if at least two auxiliary electrodes 686 are provided, they can be independently connected to members of the population of electrode structures, members of the population of counter-electrode structures, and/or each individually to the members of the electrode and/or counter-electrode structures. The auxiliary electrode(s) 686 can be connected by a passive resistor or active circuit, as examples, and can be controlled by applying a current or potential between the auxiliary electrode(s) and electrode and/or counter-electrode structures 110, 112. In the embodiment as depicted in FIGS. 31A-31B, the auxiliary electrodes are located externally to the constraints 158, 160, but adjacent to the openings 680 in the constraint (e.g., extending along the longitudinal direction across a length of the electrode assembly), such that carrier ions from and to the auxiliary electrodes 686 can pass through the openings 680 to reach the electrode and/or counter-electrode structures.

In one embodiment, at least 25%, at least 30%, at least 40%, at least 50%, at least 60%, at least 70%, at least 80%, at least 90%, and even all of the electrode current collectors 136 in the electrode assembly 106 comprise attachment sections 676*a,b* that are attached to one or more of the constraints 158, 160. In another embodiment at least 25%, at least 30%, at least 40%, at least 50%, at least 60%, at least 70%, at least 80%, at least 90%, and even all of the counter-electrode current collectors 136 in the electrode assembly 106 comprise attachment sections 678*a,b* that are attached to one or more of the constraints 158, 160. Furthermore, in one embodiment, the attachment sections 676*a,b* of the members of the electrode current collector population comprise at least 25%, at least 30%, at least 40%, at least 50%, at least 60%, at least 70%, at least 80%, at least 90%, and even the entire length $L_E$ of the members of the population. In another embodiment, the attachment sections 678*a,b* of the members of the counter-electrode current collector population comprise at least 25%, at least 30%, at least 40%, at least 50%, at least 60%, at least 70%, at least 80%, at least 90%, and even the entire length $L_C$ of the members of the population.

Furthermore, in one embodiment, as depicted for example in FIGS. 29A-29D, the attachment sections 676*a,b*, 678*a,b* of the electrode and/or counter-electrode current collector vertical ends can be configured to facilitate attachment thereof to a portion of a constraint system. For example, the attachment sections can comprise any one or combination of structural and/or surface features, such as any one or combination of textured surface, openings extending through the vertical ends in the longitudinal direction, grooves, protrusions, and indentations. The surface and/or structural modifications may be provided, for example, to improve adhesion of the attachment surfaces at the current collector vertical ends to one or more of the first and second secondary constraints 158, 160, and/or to influence the flow of adhesive and/or carrier ion insulating material to flow in a vertical or transverse direction along the electrode and/or counter-electrode current collector. In one embodiment, the surface and/or structural modifications may be provided to improve adhesion by an adhesive layer that is provided to the attachment surface to secure the electrode and/or counter-electrode current collector vertical end to the growth constraint. For example, in one embodiment, one or more of the attachment sections 676*a,b*, 678*a,b* is adhered to a portion of the constraint system by an adhesive layer 516 and/or carrier ion insulating layer that extends from a surface of one or more of the first and second secondary growth constraints 158, 160, and along at least a portion of the surfaces 646, 648 of the attachment sections in the vertical direction, as shown in FIGS. 29A-29D. In one embodiment, the adhesive layer 516 comprises and/or corresponds to the carrier ion insulating material 645 described above. For example, in one embodiment, the adhesive layer 516 extends along the vertical direction to at least partially and even substantially entirely cover an exposed surface of the electrode current collector and/or counter-electrode current collector that extends vertically past the vertical end surfaces of electrode active material layers and/or counter-electrode active material layers, as described for the carrier ion insulating material 645 above. In yet another embodiment, the adhesive layer and/or carrier ion insulating material may even extends in a vertical direction along the surface of the electrode current collector and/or counter-electrode current collector, and to the vertical end surfaces of the electrode active material layers and/or counter-electrode active material layers. In yet another embodiment, the adhesive layer and/or carrier ion insulating material may extend in the vertical direction to the vertical end surfaces of the electrode active material layers and/or counter-electrode active material layers, and may even cover at least a portion or even all of the vertical end surfaces of the electrode active material layers and/or counter-electrode active material layers.

Figure 29A:
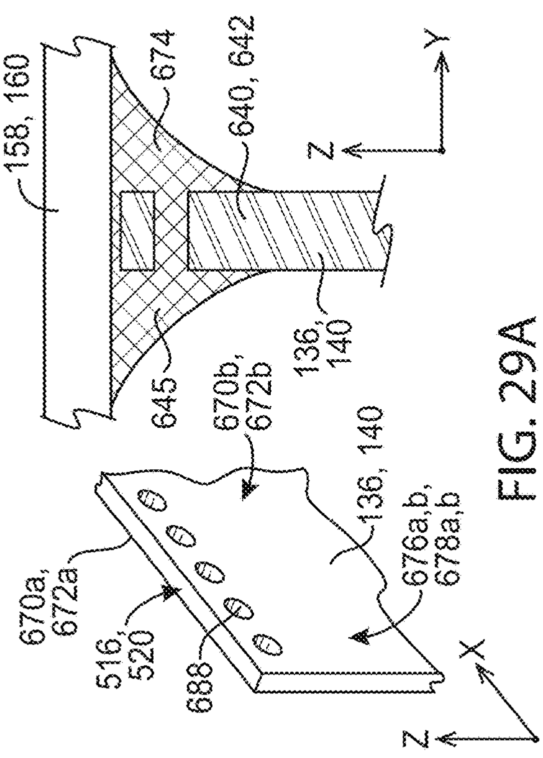
FIGS. 29A-29D illustrate embodiments of electrode and/or counter-electrode current collector ends, and configurations for attachment to a portion of a set of constraints.
Figure 29B:
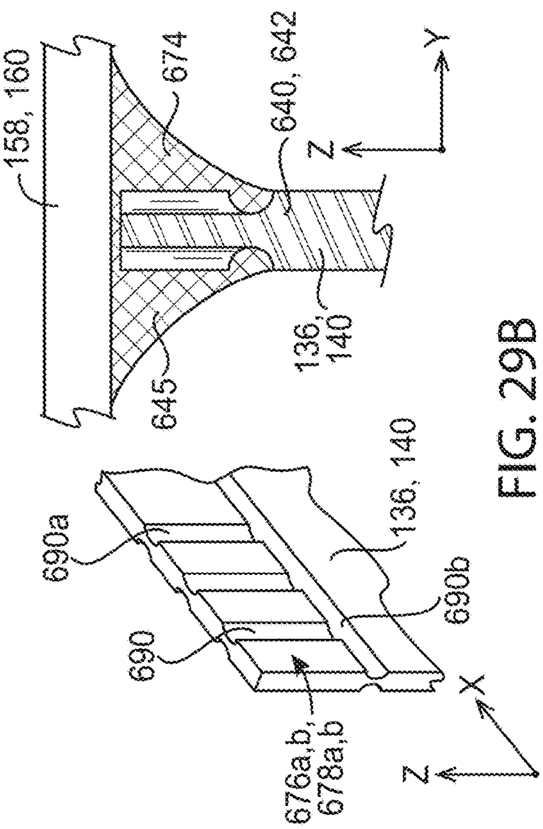
Figure 29C:
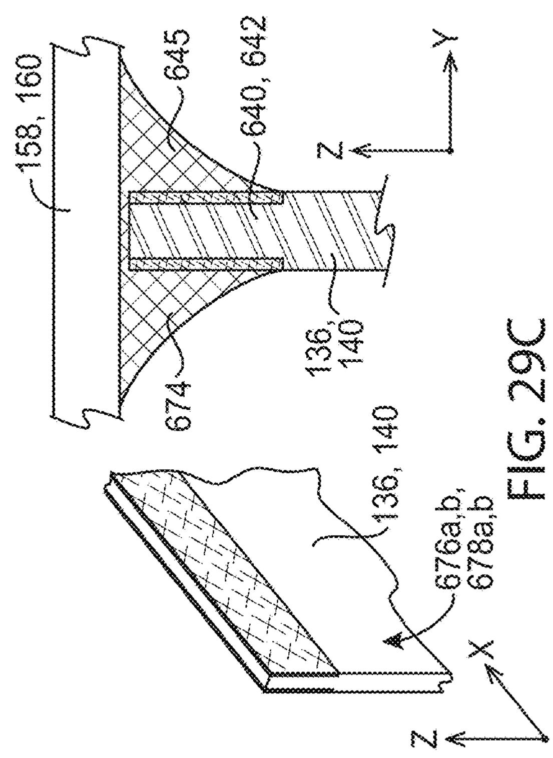
Figure 29D:
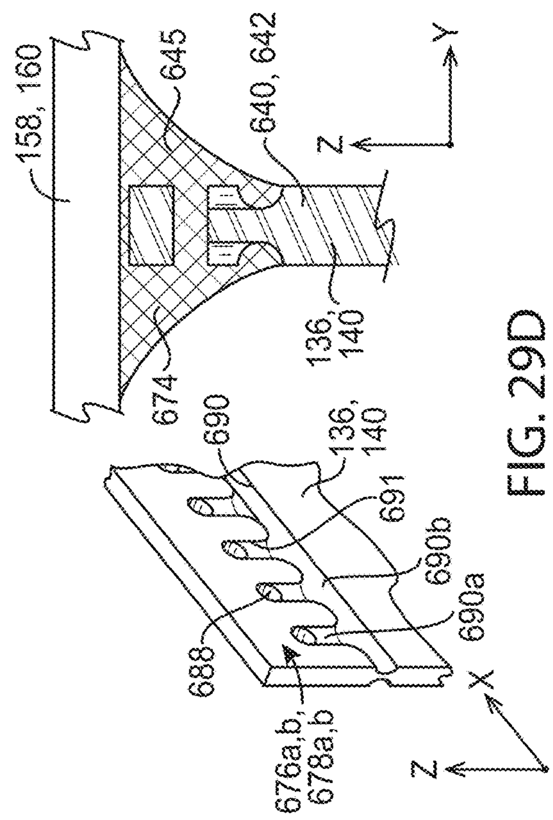

In one embodiment, the attachment sections 676*a,b* 678*a,b* of the electrode current collector and/or counter-electrode current collector are textured to facilitate adhesion of the vertical ends to the portion of the constraint system. For example, the surface of the current collector at the attachment sections can be textured via one or more of texturing, machining, etching of the surface, knurling, crimping embossing, slitting and punching. For example, referring to the embodiment depicted in FIG. 29C, the surface of the attachment section can be surface roughened and/or textured to provide a textured surface portion having a surface roughness. In yet another embodiment, referring to FIG. 29A, the attachment sections 676*a,b*, 678*a,b* of the electrode and/or counter-electrode current collectors 136, 160 can comprise one or more openings 688 therein extending between opposing longitudinal surfaces 670*a,b*, 672*a,b* of the current collector in the longitudinal direction, the openings begin configured to allow the adhesive layer to at least partially infiltrate therein. For example, as shown in the embodiment of FIG. 29A, the attachment section may comprise a plurality of openings 688 that are spaced apart in the transverse direction (e.g., along the width of the current collector), to facilitate infiltration of the adhesive layer and/or carrier ion insulating material thereinto for attachment to the growth constraint 158, 160. According to yet another embodiment, as depicted in FIG. 29B, the attachment sections comprise one or more grooves 690 therein to facilitate attachment of the adhesive to the vertical ends of the current collector. For example, the grooves can comprise one or more of vertically oriented grooves that are spaced apart along the transverse direction of the current collector, and/or can comprise transverse oriented grooves that extend a predetermined transverse length of the current collector. In one embodiment, referring to FIG. 29B, the attachment section comprises a set of first vertically oriented groves 690*a* that are spaced apart from one another along the transverse direction of the vertical ends, and at least one transverse oriented groove 690*b*, and wherein the vertically oriented grooves are arranged with respect to the at least one transverse oriented groove such that ends 691 of the vertically oriented grooves that are distal from the portion of the constraint system 108 to which the current collector is attached, are in communication with and open to the at least one transverse oriented groove 690*b*. In yet another embodiment, referring to FIG. 29D, a plurality of openings 688 are formed in at least a portion of one or more of the vertically and/or transverse oriented grooves. For example, the attachment section may comprise a set of first vertically oriented grooves 690*a*, and at least one transverse oriented groove 690*b* as in FIG. 29B, with the addition of a plurality of openings 688, with each formed in one of the vertically oriented grooves.

Figure 32A:
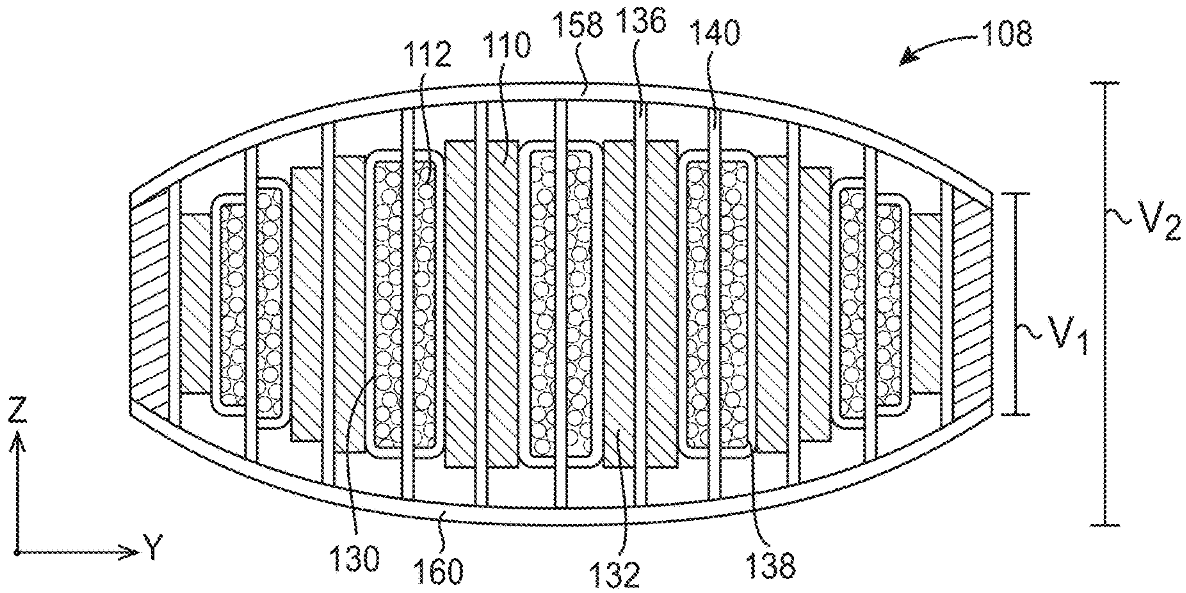
FIGS. 32A-32B illustrate cross-sections in the Z-Y plane, of embodiments of an electrode assembly having varying vertical heights from an end to an interior of the electrode assembly.
Figure 32B:
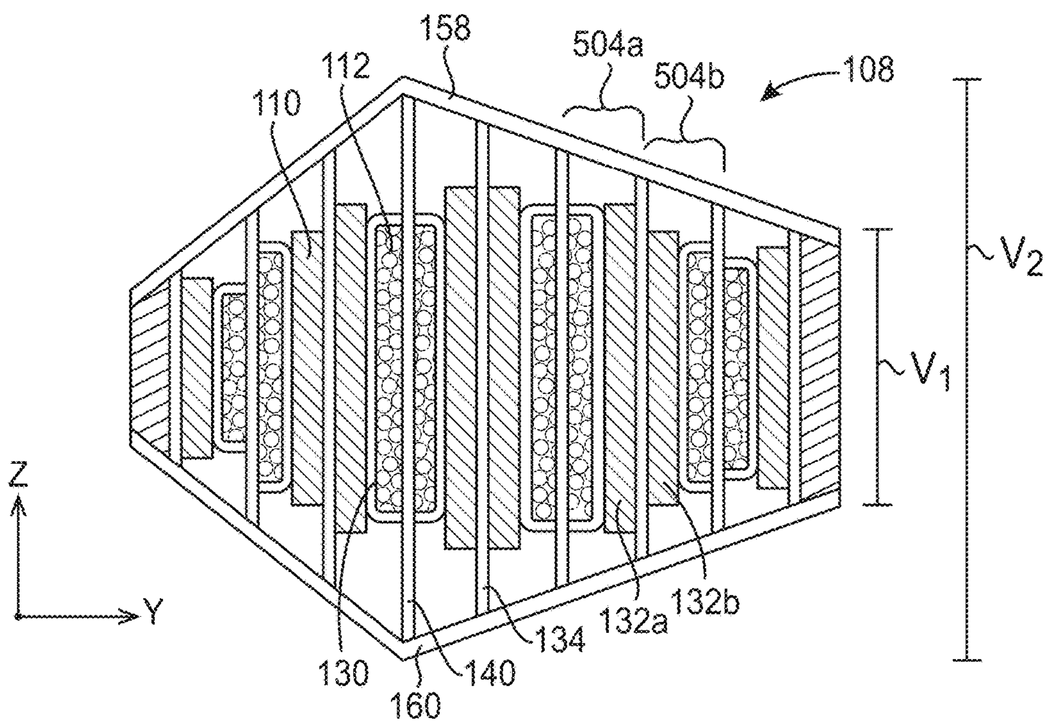

Furthermore, referring to the embodiments as depicted in FIGS. 32A and 32B, according to one aspect, the electrode assembly 106 comprises a vertical dimension that is non-planar. For example, as depicted in FIGS. 32A and 32B, one or more of the first and second secondary growth constraints 158, 160 may be non-planar, such as by being curved in one or more of the longitudinal and/or transverse directions, or having a vertical height towards a center of the electrode assembly that is larger than that at the longitudinal ends. For example, the first and/or second secondary growth constraints 158, 160 may have vertical separation from one another at longitudinal ends of the electrode assembly (V1) that is shorter than a vertical separation towards an interior of the electrode assembly in the longitudinal direction (V2), or that is longer than a vertical separation towards an interior. The vertical dimension of the electrode assembly 106 may also be symmetric in the longitudinal and/or transverse directions (e.g., as shown in FIG. 32A) or may be asymmetric (e.g., as shown in FIG. 32B). In the embodiment shown in FIG. 32A, the vertical separation V1 between the constraints 158, 160 at a first longitudinal end is shorter than a vertical separation at the second opposing longitudinal end. Also, the heights $H_E$ and $H_C$ of the electrode and counter-electrode active material layers 132, 138, may be adjusted and/or staggered to accommodate a non-planar vertical shape, for example with the height $H_E$ of a first electrode active material layer 132*a* in a first unit cell 504*a* being shorter and/or longer than that of a second electrode active material layer 132*b* in an adjacent second unit cell 504*b*.

Insulation of Electrode Current Collector by Carrier Ion Insulating Layer

According to one embodiment, a carrier ion insulating layer 674 is provided to insulate at least a portion of the electrode current collector 136, to inhibit shorting and/or plating onto the electrode current collector 136. Furthermore, by providing the carrier ion insulating layer 674, embodiments of the disclosure may allow for a vertical offset $S_{Z1}$ and/or $SZ_2$ and/or transverse offset $S_{X1}$ and/or $S_{X2}$ between the electrode active material layer 132 and counter-electrode material layer 138 in the same unit cell 504 to be set to provide enhanced effects. In particular, in a case where vertical end surfaces 501*a*, 501*b* of the counter electrode active material layer 138 are further inward than the vertical end surfaces 500*a, b* of the electrode active material layer 138, the vertical offsets $S_{Z1}$, $S_{Z2}$ may be selected to be relatively small, such that the vertical end surfaces 500*a,b*, 501*a,b* are relatively close to one another. In yet another embodiment, providing the carrier ion insulating layer 674 over at least a portion of the exposed surface of the electrode current collector 136 may allow for the vertical end surfaces 500*a,b* of the electrode active material layers 132 to even be flush with the vertical end surfaces 501*a,b* of the counter-electrode active material layer 138 in the same unit cell, or even to be offset such that the vertical end surfaces 500*a,b* of the electrode active material layers 132 are more inwardly positioned than the vertical end surfaces 501*a,b* of the electrode active material layer 132. The same characteristics and/or properties may also be provided for the first and second transverse surfaces 502*a,b*, 503*a,b* of the electrode and counter-electrode active material layers 132, 138. For example, referring to the embodiment shown in FIG. 33A, the first vertical end surface 500*a* may be slightly higher in the z direction, or even flush with or lower in the z direction (as shown), than the first vertical end surface 501*a* of the counter-electrode active material layer 138.

In particular, as has been described above, the electrode assembly 106 having the carrier ion insulating layer 674 may be a part of a secondary battery for cycling between a charged and a discharged state, the secondary battery comprising a battery enclosure, an electrode assembly, and carrier ions within the battery enclosure, and a set of electrode constraints. The battery enclosure may, in one embodiment, be a sealed enclosure comprising components therein, such as portions of, and even the entire set, of the electrode constraints. The battery enclosure may also contain the electrolyte within the enclosure, and as such an interior surface thereof may be at least partly in contact with the electrolyte within the enclosure. In one embodiment, the battery enclosure comprises a hermetically sealed enclosure that contains the carrier ions, electrode assembly, and any other contents of the secondary battery therein. The electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction. The electrode assembly further comprises a population of electrode structures, a population of electrode current collectors, a population of separators, a population of counter-electrode structures, a population of counter-electrode collectors, and a population of unit cells, wherein members of the electrode and counter-electrode structure populations are arranged in an alternating sequence in the longitudinal direction. Furthermore, according to one aspect, each electrode current collector 136 of the population is electrically isolated from each counter-electrode active material layer 138 of the population, and each counter-electrode current collector 140 of the population is electrically isolated from each electrode active material layer 132 of the population.

Furthermore, each member of the population of electrode structures 110 comprises an electrode current collector 136 and a layer of an electrode active material 132 having a length $L_E$ that corresponds to the Feret diameter of the electrode active material layer as measured in the transverse direction between first and second opposing transverse end surfaces of the electrode active material layer 132, as has been described elsewhere herein. The layer of electrode active material also has a width $W_E$ that corresponds to the Feret diameter of the electrode active material layer 132 as measured in the longitudinal direction between first and second opposing surfaces 706*a*, 706*b* of the electrode active material layer 132. Each member of the population of counter-electrode structures comprises a counter-electrode current collector and a layer of a counter-electrode active material has a length $L_C$ that corresponds to the Feret diameter of the counter-electrode active material layer 132 as measured in the transverse direction between first and second opposing transverse end surfaces of the counter-electrode active material layer, as has been defined elsewhere herein, and also comprises a width $W_C$ that corresponds to the Feret diameter of the counter-electrode active material layer 138 as measured in the longitudinal direction between first and second opposing longitudinal end surfaces 708*a,b* of the counter-electrode active material layer 138.

Furthermore, as also described in embodiments above, each unit cell 504 comprises a unit cell portion of a first electrode current collector of the electrode current collector population, a separator that is ionically permeable to the carrier ions, a first electrode active material layer of one member of the electrode population, a unit cell portion of first counter-electrode current collector of the counter-electrode current collector population and a first counter-electrode active material layer of one member of the counter-electrode population, wherein (aa) the first electrode active material layer is proximate a first side of the separator and the first counter-electrode material layer is proximate an opposing second side of the separator, (bb) the separator electrically isolates the first electrode active material layer from the first counter-electrode active material layer and carrier ions are primarily exchanged between the first electrode active material layer and the first counter-electrode active material layer via the separator of each such unit cell during cycling of the battery between the charged and discharged state, and (cc) within each unit cell.

Furthermore, as shown in FIGS. 33A-33D, each member of the population of electrode structures 110 can comprise a carrier ion insulating material, such as a carrier ion insulating layer 674, that is disposed about the electrode current collector so as to at least partially insulate the electrode current collector from carrier ions. The carrier ion insulating layer 674 may be disposed to insulate, for example, surfaces of the electrode current collector that extend in a vertical direction past the first and second end surfaces 500*a*, 500*b* of one or more electrode active material layers 132*a*, 132*b* that are adjacent the electrode current collector 136. For example, referring to FIG. 33A, the carrier ion insulating layer 674 may be provided to insulate first and second vertical end surfaces 640*a,b* of the electrode current collector 136, as well as opposing longitudinal surfaces 670*a,b* of the electrode current collector that extend vertically past the first and second vertical end surfaces 500*a,b* of the adjacent electrode active material layers 132*a,b* in each adjacent unit cell 504*a,b*.

As discussed above, by providing the carrier ion insulating material layer 674 to protect the exposed surfaces of the electrode current collector 136, vertical offsets $S_{Z1}$ and $S_{Z2}$ and/or transverse offsets $S_{X1}$, $S_{X2}$ between the first and second vertical end surfaces of the electrode and counter-electrode active material layers 132, 138 in each cell, can be selected such that an offset is relatively small, and/or may be set such that vertical and/or transverse end surfaces of the electrode active material layers 132 may even be positioned inwardly towards an interior of the electrode assembly 106, as compared to the vertical and/or transverse end surfaces of the counter-electrode active material layers 138. This may be advantageous in certain embodiments, as it may allow for unit cells where relatively less electrode active material can be provided compared to counter-electrode active material, substantially without deleteriously affecting the electrode current collector of the electrode active material layer. That is, it has been discovered that because the electrode current collector is being protected, the vertical and/or transverse extent of the electrode active material layer may be advantageously reduced.

Figure 34A:
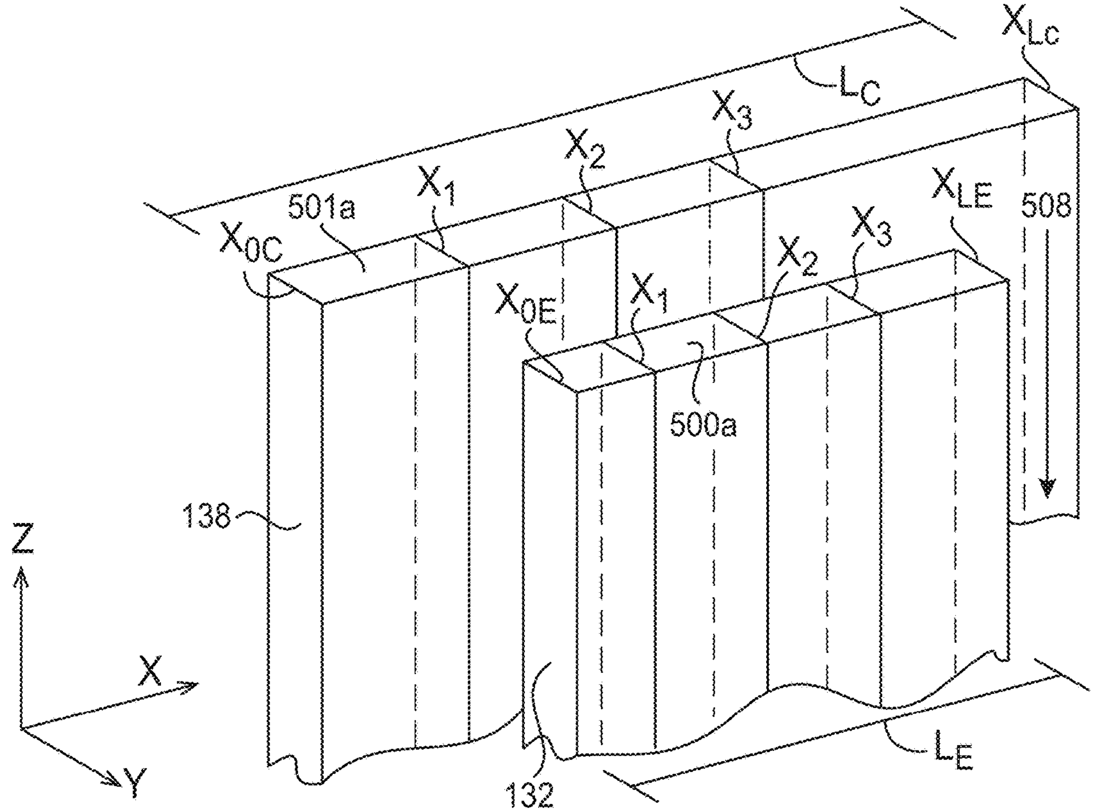
FIGS. 34A-34C illustrate embodiments for the determination of vertical offsets and/or separation distances $S_{Z1}$ and $S_{Z2}$, between vertical end surfaces of electrode and counter-electrode active material layers, for a unit cell having a carrier ion insulating material layer.
Figure 34B:
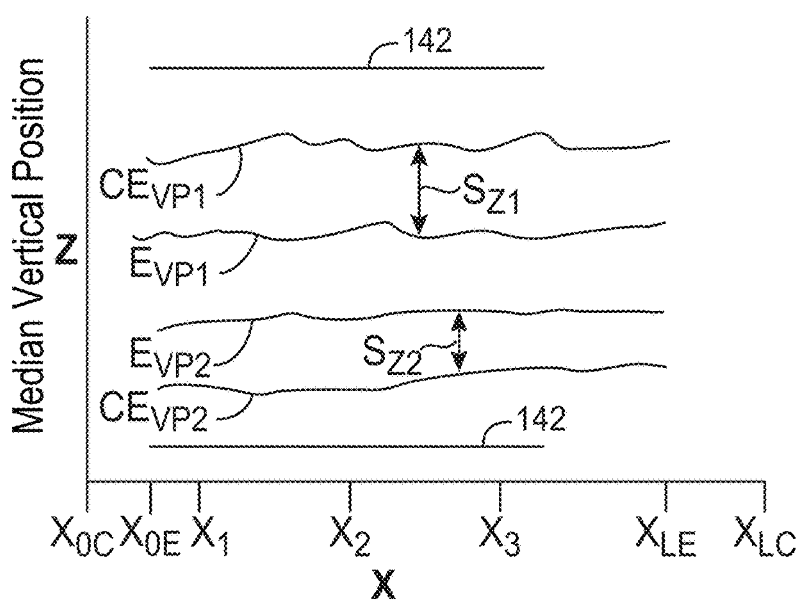
Figure 34C:
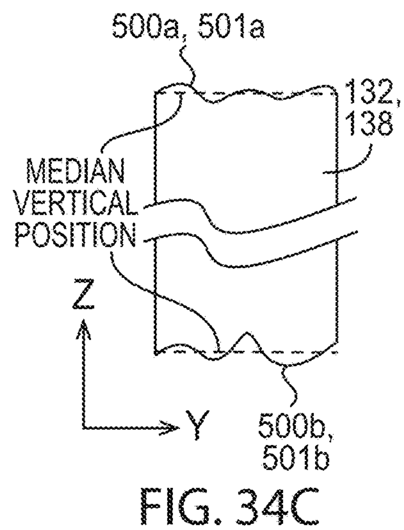

The vertical offsets $S_{Z1}$ and $S_{Z2}$, between the vertical end surfaces of the electrode and counter-electrode active material layers, can be determined as has been discussed elsewhere herein. Specifically, as discussed above (see, e.g., FIGS. 22A-22B), for first vertical end surfaces 500*a*, 501*a* of the electrode and the counter-electrode active material layers 132, 138 on the same side of the electrode assembly 106, a 2D map of the median vertical position of the first opposing vertical end surface 500*a* of the electrode active material 132 in the Z-X plane, along the length $L_E$ of the electrode active material layer 132, traces a first vertical end surface plot, $E_{VP1}$. Similarly, a 2D map of the median vertical position of the first opposing vertical end surface 501*a* of the counter-electrode active material layer 138 in the Z-X plane, along the length $L_C$ of the counter-electrode active material layer 138, traces a first vertical end surface plot, $CE_{VP1}$. An absolute value of the separation distance, $|S_{Z1}|$ is the distance as measured in the vertical direction between the plots $E_{VP1}$ and $CEV_{P1}$ (see, e.g., FIGS. 34A-34C). Similarly, for second vertical end surfaces 500*b*, 501*b* of the electrode and the counter-electrode active material layers 132, 138 on the same side of the electrode assembly 106, and opposing the first vertical end surfaces 500*a*,501*a* of the electrode and counter-electrode active material layers, respectively, a 2D map of the median vertical position of the second opposing vertical end surface 500*b* of the electrode active material 132 in the Z-X plane, along the length $L_E$ of the electrode active material layer 132, traces a second vertical end surface plot, $E_{VP2}$. Similarly, a 2D map of the median vertical position of the second opposing vertical end surface 501*b* of the counter-electrode active material layer 138 in the Z-X plane, along the length $L_C$ of the counter-electrode active material layer 138, traces a second vertical end surface plot, $CE_{VP2}$. An absolute value of the separation distance, $|S_{Z2}|$ is the distance as measured in the vertical direction between the plots $E_{VP2}$ and $CE_{VP2}$ (see, e.g., FIGS. 34A-34C).

Figure 35A:
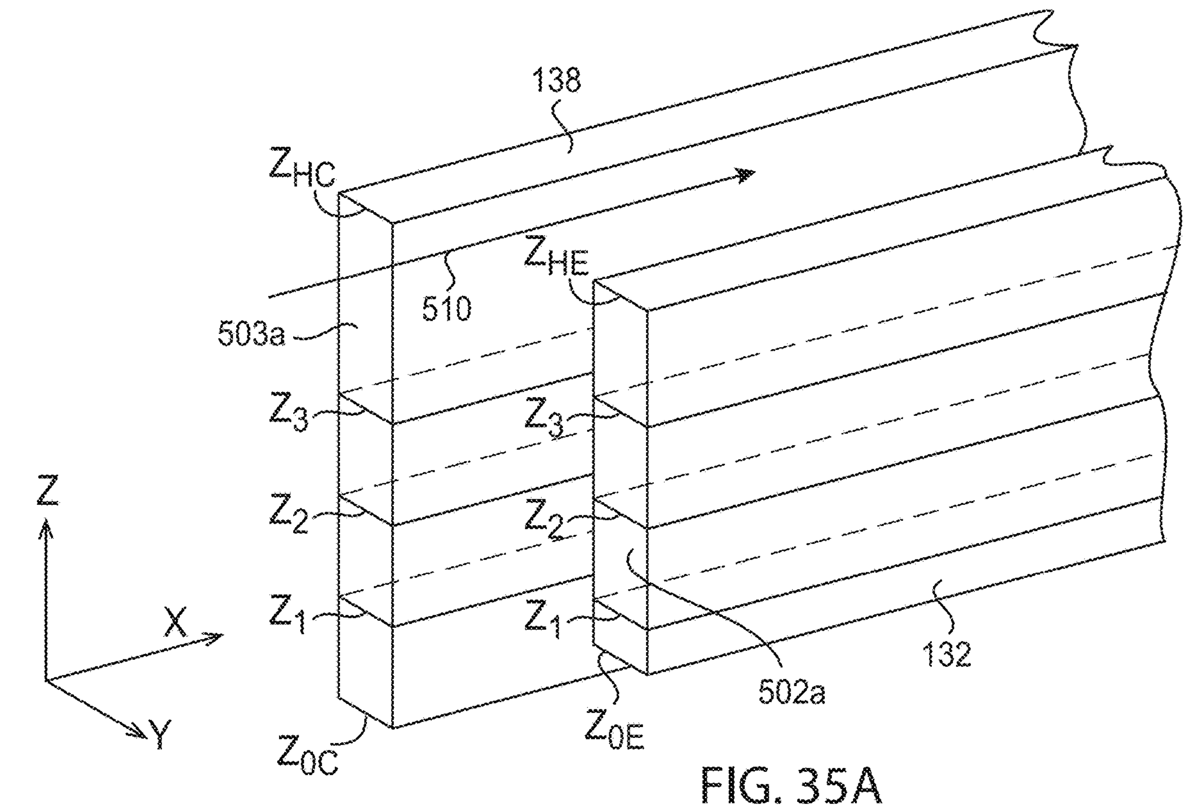
FIGS. 35A-35C illustrate embodiments for the determination of transverse offsets and/or separation distances $S_{X1}$ and $S_{X2}$, between transverse end surfaces of electrode and counter-electrode active material layers, for a unit cell having a carrier ion insulating material layer.
Figure 35B:
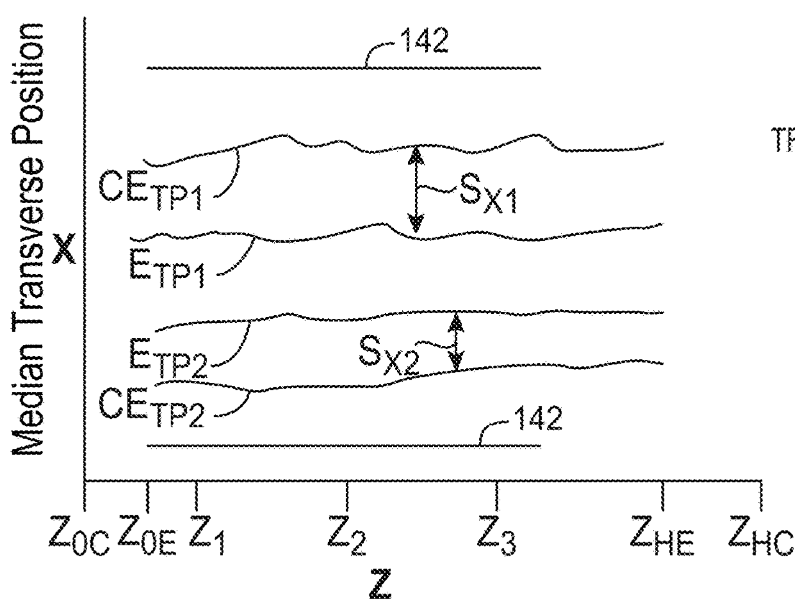
Figure 35C:
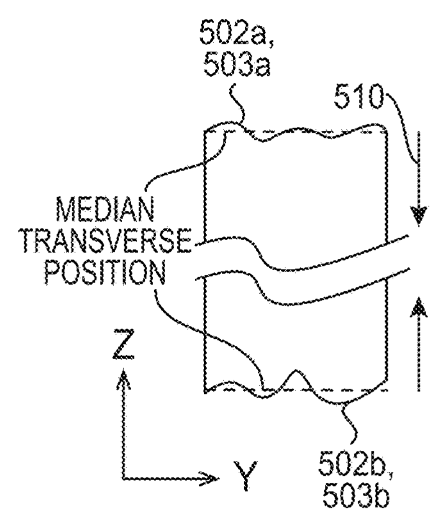

Furthermore, for first transverse end surfaces 502*a*, 503*a* of the electrode and the counter-electrode active material layers 132, 138 on the same side of the electrode assembly 106, a 2D map of the median transvers position of the first opposing transverse end surface 502*a* of the electrode active material 132 in the Y-Z plane, along the length $L_E$ of the electrode active material layer 132, traces a first vertical end surface plot, $E_{TP1}$. Similarly, a 2D map of the median transverse position of the first opposing transverse end surface 503*a* of the counter-electrode active material layer 138 in the Y-Z plane, along the length $L_C$ of the counter-electrode active material layer 138, traces a first transverse end surface plot, $CE_{TP1}$. An absolute value of the separation distance, $|S_{X1}|$ is the distance as measured in the transverse direction between the plots $E_{TP1}$ and $CE_{TP1}$ (see, e.g., FIGS. 35A-35C). Similarly, for second transverse end surfaces 502*b*, 503*b* of the electrode and the counter-electrode active material layers 132, 138 on the same side of the electrode assembly 106, and opposing the first transverse end surfaces 502*a*,503*a* of the electrode and counter-electrode active material layers, respectively, a 2D map of the median transverse position of the second opposing vertical end surface 500*b* of the electrode active material 132 in the Y-Z plane, along the length $L_E$ of the electrode active material layer 132, traces a second transverse end surface plot, $E_{TP2}$. Similarly, a 2D map of the median transverse position of the second opposing transverse end surface 501*b* of the counter-electrode active material layer 138 in the Y-Z plane, along the length $L_C$ of the counter-electrode active material layer 138, traces a second transverse end surface plot, $CE_{TP2}$. An absolute value of the separation distance, $|S_{X2}|$ is the distance as measured in the vertical direction between the plots $E_{TP2}$ and $CE_{TP2}$ (see, e.g., FIG. 35A-35C).

Furthermore, in one embodiment, the carrier ion insulating material layer 674 provided in each unit cell 504 in the population of unit cells has an ionic conductance of carrier ions that does not exceed 10% of the ionic conductance of the separator in that cell for carrier ions, during cycling of the battery. For example, the ionic conductance may not exceed 5%, 1%, 0.1%, 0.01%, 0.001%, and/or even 0.0001% of the conductance of the separator for carrier ions. The carrier ions may be any of those described herein, such as for example Li, Na, Mg ions, among others. Furthermore, the carrier ion insulating material layer 674 may ionically insulate a surface of the electrode current collector layer from the electrolyte that is proximate to and within a distance Dcc of (i) the first transverse end surface of the electrode active material layer, wherein Dcc equals the sum of $2\times W_E$ and $|S_{X1}|$, and/or (ii) second transverse end surface of the electrode active material layer, wherein Dcc equals the sum of $2\times W_E$ and $|S_{X2}|$, and/or (iii) the first vertical end surface of the electrode active material layer, wherein Dcc equals the sum of $2\times W_E$ and $|S_{Z1}|$, and/or (iv) the second vertical end surface of the electrode active material layer wherein Dcc equals the sum of $2\times W_E$ and $|S_{Z2}|$. Furthermore, the carrier ion insulating material layer 674 may ionically insulate a surface of the electrode current collector layer from the electrolyte that is proximate to and within a distance Dcc of (i) the first transverse end surface of the electrode active material layer, wherein Dcc equals the sum of $W_E$ and $|S_{X1}|$, and/or (ii) second transverse end surface of the electrode active material layer, wherein Dcc equals the sum of $W_E$ and $|S_{X2}|$, and/or (iii) the first vertical end surface of the electrode active material layer, wherein Dcc equals the sum of $W_E$ and $|S_{Z1}|$, (iv) the second vertical end surface of the electrode active material layer wherein Dcc equals the sum of $W_E$ and $|S_{Z2}|$.

In yet another embodiment, the carrier ion insulating material layer 674 may ionically insulates a surface of the electrode current collector layer from the electrolyte that is proximate to and within a distance Dcc of (i) the first transverse end surface of the electrode active material layer, wherein (a) in a case where the first transverse end surface of the electrode active material layer is inwardly disposed with respect to the first transverse end surface of the counter-electrode active material, Dcc equals $2\times W_E+|S_{X1}|$, and (b) in a case where the first transverse end surface of the counter-electrode active material layer is inwardly disposed with respect to the first transverse end surface of the electrode active material, Dcc equals $2\times W_E-|S_{X1}|$, and/or (ii) the second transverse end surface of the electrode active material layer, wherein (a) in a case where the second transverse end surface of the electrode active material layer is inwardly disposed with respect to the second transverse end surface of the counter-electrode active material, Dcc equals $2\times W_E+|S_{X2}|$, and (b) in a case where the second transverse end surface of the counter-electrode active material layer is inwardly disposed with respect to the second transverse end surface of the electrode active material, Dcc equals $2\times W_E-|S_{X2}|$, and/or (iii) the first vertical end surface of the electrode active material layer, wherein (a) in a case where the first vertical end surface of the electrode active material layer is inwardly disposed with respect to the first vertical end surface of the counter-electrode active material, Dcc equals $2\times W_E+|S_{Z1}|$, and (b) in a case where the first vertical end surface of the counter-electrode active material layer is inwardly disposed with respect to the first vertical end surface of the electrode active material, Dcc equals $2\times W_E-|S_{Z1}|$, and/or (iv) the second vertical end surface of the electrode active material layer, wherein (a) in a case where the second vertical end surface of the electrode active material layer is inwardly disposed with respect to the second vertical end surface of the counter-electrode active material, Dcc equals $2\times W_E+|S_{Z2}|$, and (b) in a case where the second vertical end surface of the counter-electrode active material layer is inwardly disposed with respect to the second vertical end surface of the electrode active material, Dcc equals $2\times W_E-|S_{Z1}|$ wherein Dcc equals the sum of $2\times W_E$ and $|S_{Z2}|$.

Figure 37A:
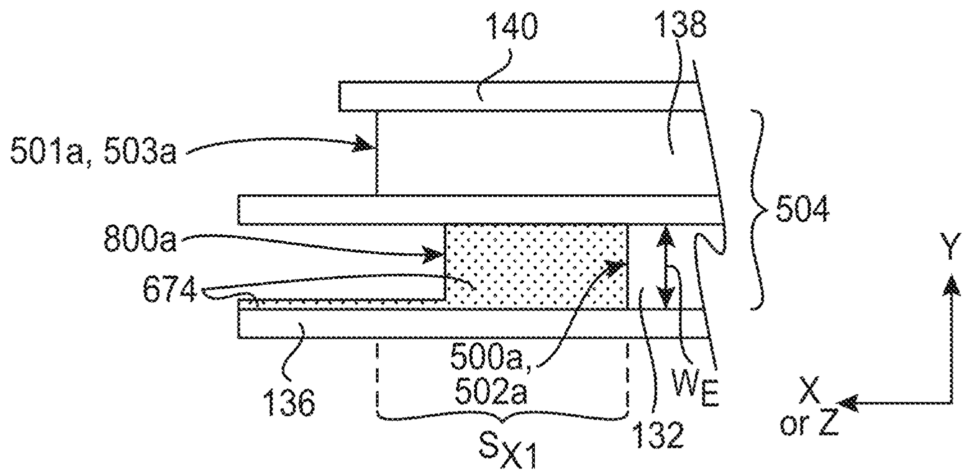
FIGS. 37A-37B depict cross sections in either the XY and/or ZY plane showing embodiments of transverse and/or vertical separation distances and/or offsets for electrode active material layer and counter-electrode active material layers in a unit cell having a carrier ion insulating material layer that insulates at least a portion of a surface of an electrode current collector in the unit cell from carrier ions.
Figure 37B:
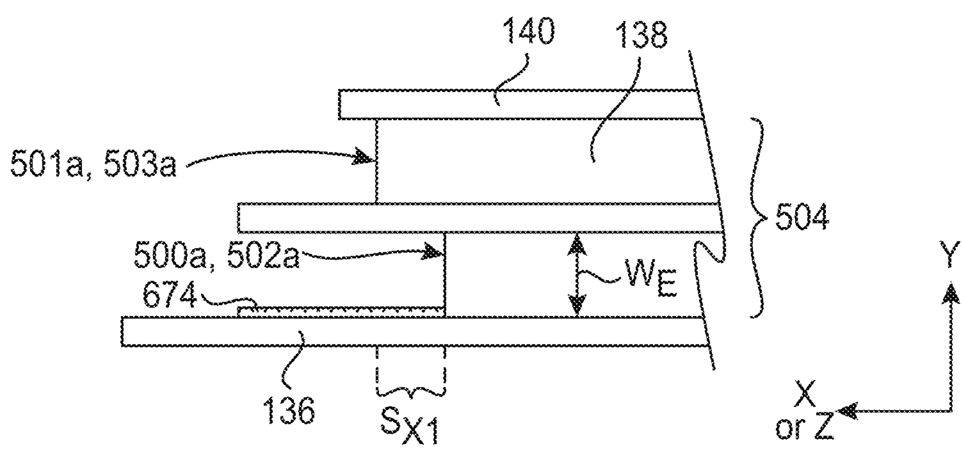

Referring to FIGS. 37A-37B, an embodiment is shown where $S_{X1}$ is the offset between the surface (transverse or vertical) 501*a*, 503*a* of the counter-electrode active material layer 138, and the surface (transverse or vertical) 500*a*, 502*a* of the electrode active material layer 132. The width $W_E$ for the electrode active material layer 132 is shown, and the figures also show the first transverse offset/separation distance $S_{X1}$, although the offsets $S_{X2}$, $S_{Z1}$ and/or $S_{Z2}$ could similarly be provided in a manner as for $S_{X1}$. The distance Dcc as shown is then equal to the offset/separation distance relevant for the surface at hand (e.g., first or second vertical, first or second transverse), plus an amount equivalent to the width or twice the width of the electrode active material $W_E$. That is, the carrier ion insulating material layer 674 is provided to insulate the surface of the electrode current collector 136 at at least a portion of the surface that falls within the range $D_{CC}$. According to one embodiment, each of the offsets $S_{X1}$, $S_{X2}$, $S_{Z1}$ and/or $S_{Z2}$ may be set independently of one another, to different amounts. Furthermore, the offsets $S_{X1}$, $S_{X2}$, $S_{Z1}$ and/or $S_{Z2}$ may be required to be within a predetermined range over an extent of the electrode active material and/or counter-electrode active materials, such as over a length $L_C$, $L_E$ and/or height $H_C$, $H_E$, as has been described, such as over at least 60%, 70%, 80%, 90%, and/or 95% of $L_E$ and/or $L_C$, and/or over at least 60% 60%, 70%, 80%, 90%, and/or 95% of $H_E$ and/or $H_C$. The offsets $S_{X1}$, $S_{X2}$, $S_{Z1}$ and/or $S_{Z2}$ may be set, for example, such that the electrode active material layer is flush with or inwardly disposed with respect to the counter-electrode active material layer, and/or may be set such that the counter-electrode active material is somewhat more inwardly disposed with respect to the electrode active material layer. For example, in one embodiment, at least one of $S_{X1}$, $S_{X2}$, $S_{Z1}$ and/or $S_{Z2}$, as determined by subtracting the more inwardly directed layer from the outer one, may be in the range of from about 100 microns (counter-electrode active material layer being more inward) to −1000 microns (electrode active material layer being more inward), such as from 50 microns to −500 microns. Also, the offsets may be in a range relative to multiples of the electrode active material width $W_E$, such as in a range of from about $2\times W_E$ (counter-electrode active material layer being more inward) or $1\times W_E$ to $-10\times W_E$ (electrode active material layer being more inward).

According to yet another embodiment, as described above, at least a portion of the electrode structure 110 may comprise carrier ion insulating material layer 674 that is permeated into an electrode active material layer 132, and/or may cover opposing surfaces in the longitudinal direction and/or other surfaces of the electrode 10) active material layer 132, as shown for example in FIG. 37A. In this case, those portions of the electrode active material layer 132 that are covered by the layer 674 may be inactive, as they are insulated from carrier ions, and accordingly the surface (vertical and/or transverse end surface) of the electrode active material layer 132 is considered to be at the interface 500*a* between where the covered portion of the layer 132 begins and where uncovered and active material of the layer 132 begins. That is, the distance Dcc in FIG. 37A is measured from 500*a* (where the active electrode material layer is ends) and not 800*a* (where the layer is covered by the layer 674 of carrier ion insulating material).

In one embodiment, the carrier ion insulating material layer 674 is disposed on the surface of the electrode current collector layer 136, to insulate the surface from carrier ions. The carrier ion insulating material layer 674 may also cover a predetermined amount of the distance $D_{CC}$. For example, the carrier ion insulating material layer 674 may extend at least 50% of $D_{CC}$, at least 60%, at least 70%, at least 80%, at least 90%, at least 95%, and even substantially all of $D_{CC}$. The carrier ion insulating material layer 674 may also be provided in one or more segments along $D_{CC}$, and/or may be a single continuous layer along $D_{CC}$. The carrier ion insulating material layer 674 may also extend in a direction that is orthogonal to the offset. For example, for a distance Dcc in relation to the vertical offset, the carrier ion insulating material layer 674 may also extend in a transverse direction across the electrode current collector surface in a least a portion of the region defined vertically by $D_{CC}$. As another example, for a distance Dcc in relation to the transverse offset, the carrier ion insulating material layer 674 may also extend in a vertical direction across the electrode current collector surface in a least a portion of the region defined in the transverse direction by $D_{CC}$.

Figure 36:
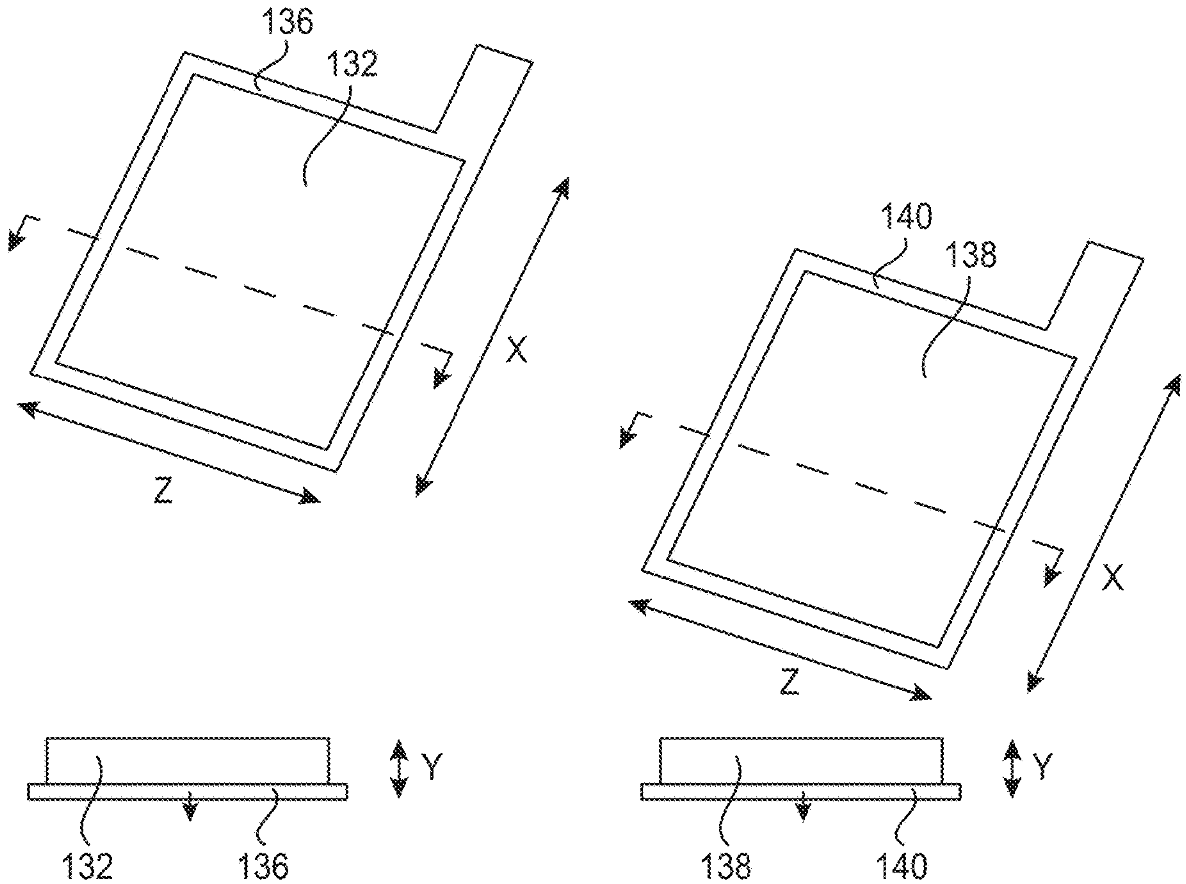
FIG. 36 is an exploded view, with cross sections, of an embodiment of a 2D electrode assembly having 2D electrodes in the shape of sheets.

Furthermore, in one embodiment the carrier ion insulating material layer 674 may be provided to insulate a surface of an electrode current collector 136 in a 3D secondary battery 102, such as a battery having an electrode assembly with electrode structures and counter-electrode structures, where a length $L_E$ of the electrode active material layers 132 of the electrode structures 110 and/or a length $L_C$ of the counter-electrode active material layers 138 is much greater than that of the height $H_C$, $H_E$ and/or width $W_C$, $W_E$ of the electrode and/or counter-electrode layers 132, 138. That is, a length $L_E$ of the electrode active material layer may be at least 5:1, such as at least 8:1, and even at least 10:1 of that of the Width $W_E$ and height $H_E$ of the electrode active material layer. Similarly, a length $L_C$ of the counter-electrode active material layer may be at least 5:1, such as at least 8:1, and even at least 10:1 of that of the width $W_C$ and height $H_C$ of the counter-electrode active material layer. Examples of electrode assemblies 106 having such 3D electrodes are depicted in FIGS. 1B and 2A. In another embodiment, the carrier ion insulating material layer 674 may be provided to insulate a surface of an electrode current collector 136 in a 2D secondary battery 102, such as a battery having an electrode assembly with electrode structures and counter-electrode structures, where a length $L_E$ of the electrode active material layers 132 of the electrode structures 110 and/or a length $L_C$ of the counter-electrode active material layers 138, as well as the height $H_E$ of the electrode active material layers 132 of the electrode structures 110 and/or a height $H_C$ of the counter-electrode active material layers 138 is much greater than that of the width $W_C$, $W_E$ of the electrode and/or counter-electrode layers 132, 138. That is, a length $L_E$ and height $H_E$ of the electrode active material layer may be at least 2:1, such as at least 5:1, and even at least 10:1 of that of the Width $W_E$ of the electrode active material layer. Similarly, a length $L_C$ and height $H_C$ of the counter-electrode active material layer may be at least 2:1, such as at least 5:1, and even at least 10:1 of that of the Width $W_C$ of the counter-electrode active material layer. An example of an electrode assembly 106 having such 2D electrodes (e.g., planar sheet-like electrodes) is depicted in FIG. 36.

According to one embodiment, the electrode assembly having the carrier ion insulating material layer protecting the surfaces of the electrode current collector 136, may further comprise a set of electrode constraints 108, which may correspond to any described herein. For example, the set of electrode constraints can comprise a primary constraint system 151 comprising first and second primary growth constraints 154, 156 and at least one primary connecting member 162, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%. The electrode assembly 106 can also comprise a secondary constraint system 155 configured to constrain growth in a direction orthogonal to the longitudinal direction, such as the vertical direction, as is described in further detail herein.

Figure 33A:
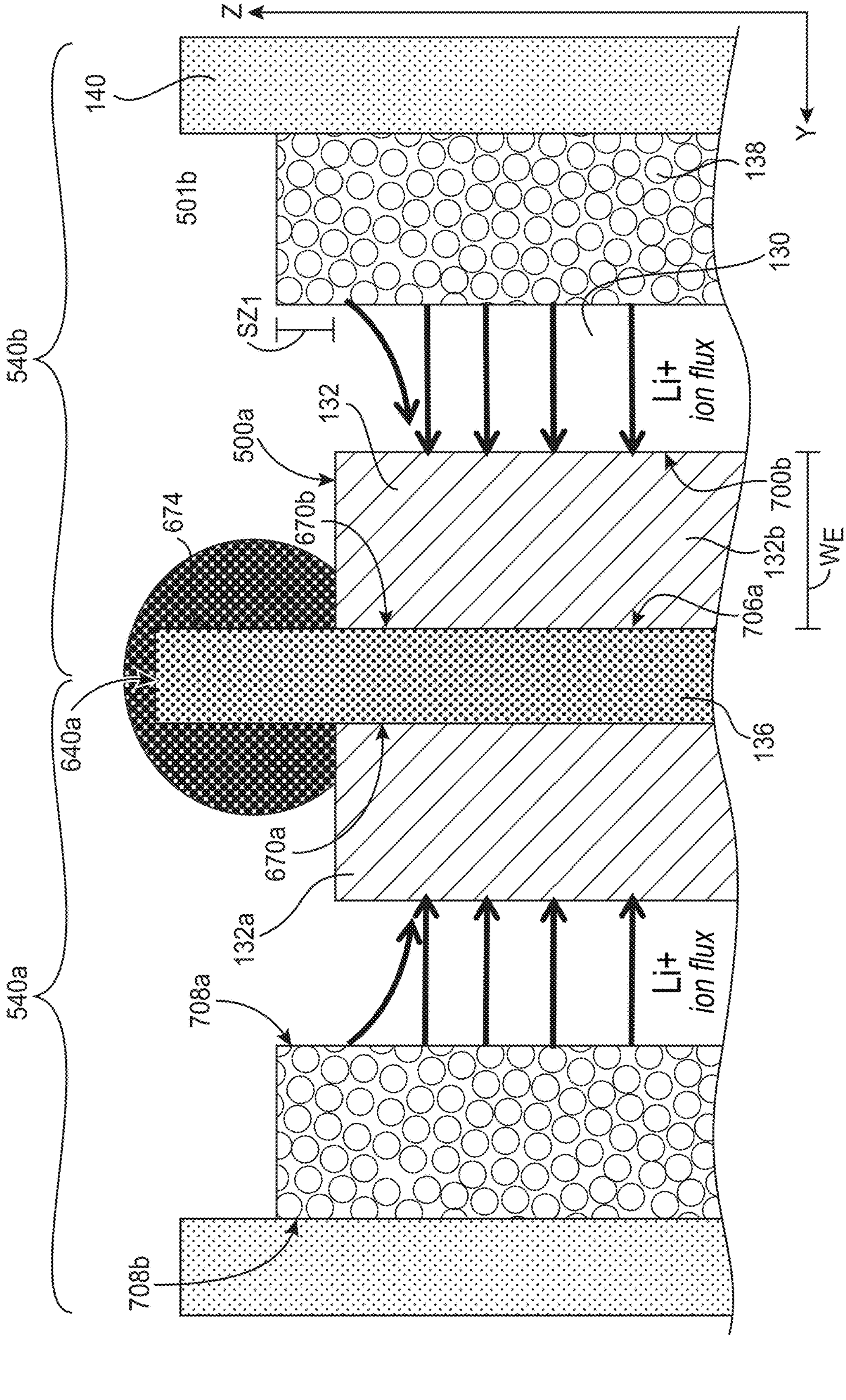
FIGS. 33A-33D illustrate cross-sections in the Z-Y plane, of embodiments of portions of an electrode assembly having a carrier ion insulating material layer to insulate at least a portion of an electrode current collector from carrier ions.
Figure 33B:
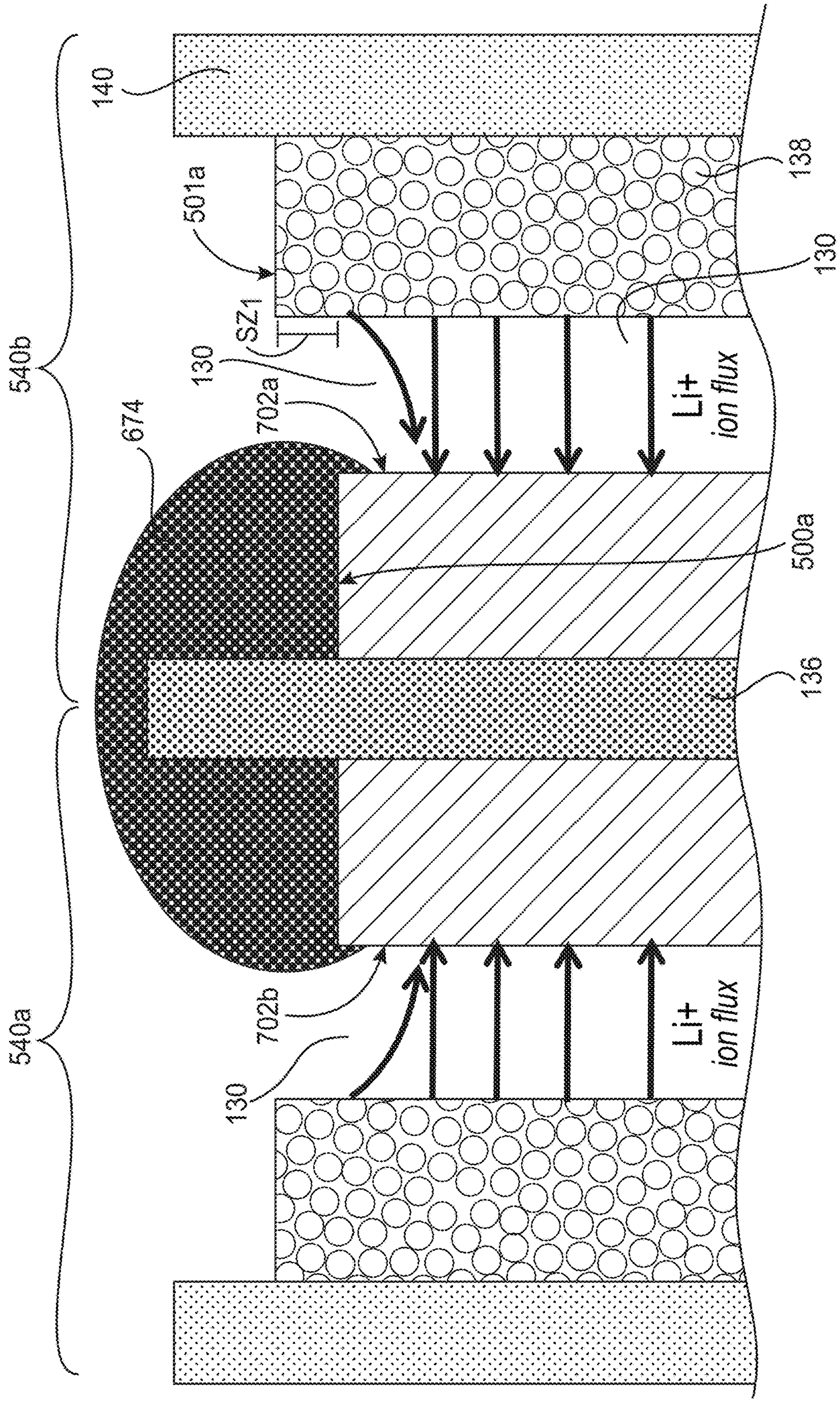
Figure 33C:
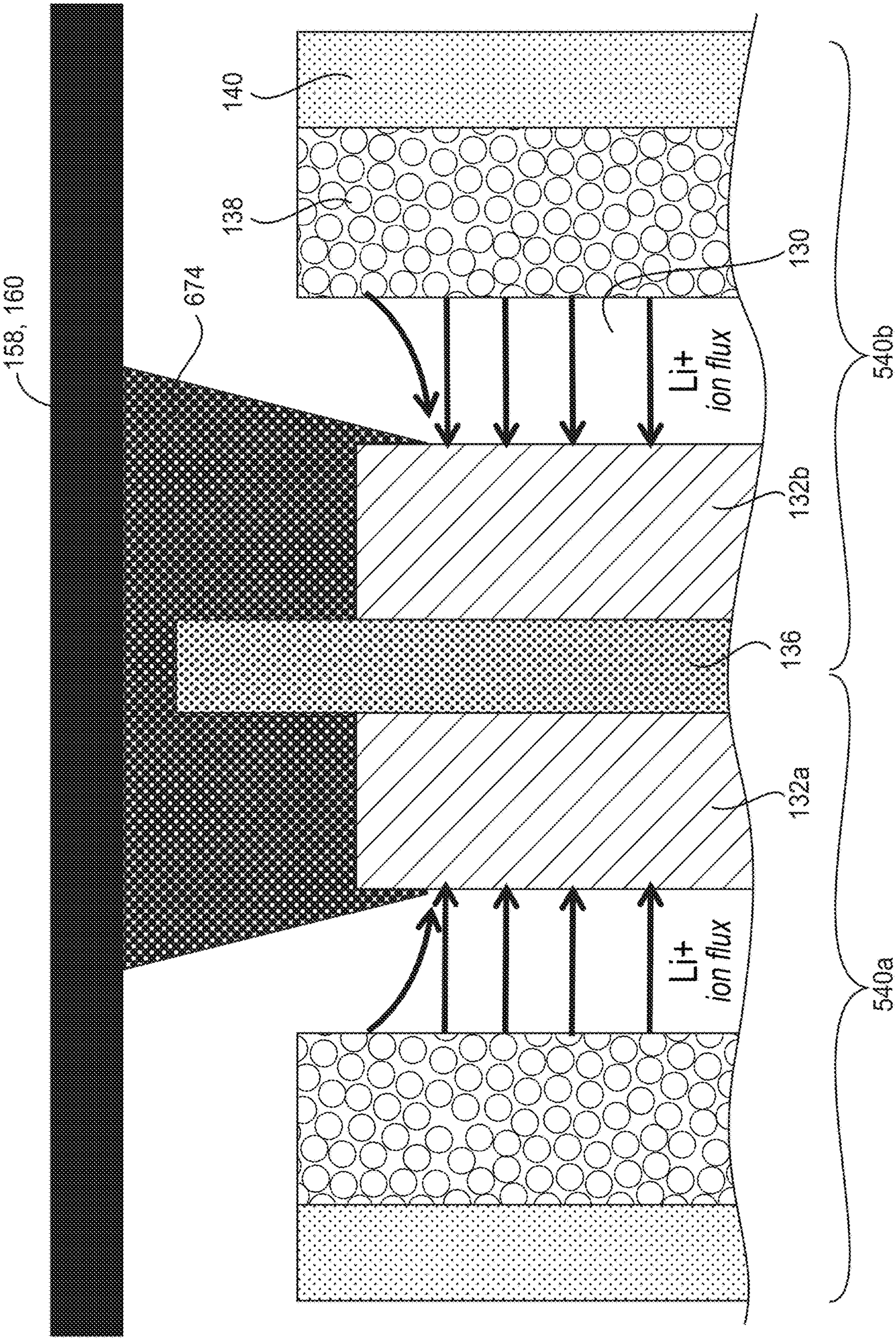

Referring to FIGS. 33A-33C, embodiments of the carrier ion insulating material layer 674 are described. For example, the carrier ion insulating material layer 674 can be provided to cover at least a predetermined percentage of the electrode current collector 136, and may also cover at least a portion of a surface of one or more first and second electrode active material layers 132*a*, 132*b* adjacent the electrode current collector. In the embodiment as shown in FIG. 33A, the carrier ion insulating material 674 is applied over surfaces of the electrode current collector, including vertical end surfaces 640*a,b* and longitudinal side surfaces 670*a,b*, from the vertical end surfaces of the electrode current collector to a point where the longitudinal side surfaces 670*a,b*, meet the first and second vertical end surfaces of one or more of the adjacent first and second electrode active material layers 132*a,b* on either side of the electrode current collector 136. As is also shown in FIG. 33A, the carrier ion insulating material layer may also be provided to cover at least a portion of one or more of the first and/or second vertical end surfaces 500*a,b* of one or more of the adjacent first and second electrode active material layers 132*a,b*. For example, the carrier ion insulating material layer may extend longitudinally from the electrode current collector to cover at least a portion of the first and/or second vertical end surfaces 500*a,b* of one or more of the adjacent first and second electrode active material layers 132*a,b*. That is, the carrier ion insulating material layer may cover at least 10%, at least 20%, at least 50%, at least 75%, at least 90%, at least 95%, and even substantially all of the first and/or second vertical end surfaces 500*a,b* of one or more of the adjacent first and second electrode active material layers 132*a,b*. Referring to FIG. 33B, an embodiment is depicted where the carrier ion insulating material layer not only covers the first and/or second vertical end surfaces of the adjacent electrode active material layers, but also extends beyond an edge of the surfaces and at least partially down a longitudinal side 702*a*, 702*b* of the layers of electrode active material, the longitudinal sides 702*a*, 702*b* of each electrode active material layer 132*a,b* being that side that faces the separator 130 in each unit cell 504*a*, 504*b*. Referring to FIG. 33C, an embodiment is depicted where the carrier ion insulating material comprises a layer of material 674 that covers the exposed surfaces of the electrode current collector 135, as well as the vertical end surfaces and at least a portion of the longitudinal side surfaces of first and second electrode active material layers adjacent the electrode current collector, and also attaches and/or adheres to a portion of the set of constraints 108. For example, in the embodiment depicted in FIG. 33C, the layer 674 of material attaches to first or second secondary growth constraint 158, 160 that constrains growth of the electrode assembly 106 in the vertical direction. That is, the carrier ion insulating material layer can comprise an adhesive material capable of adhering structures of the electrode assembly to portions of the constraint system, as has been described elsewhere herein.

Figure 33D:
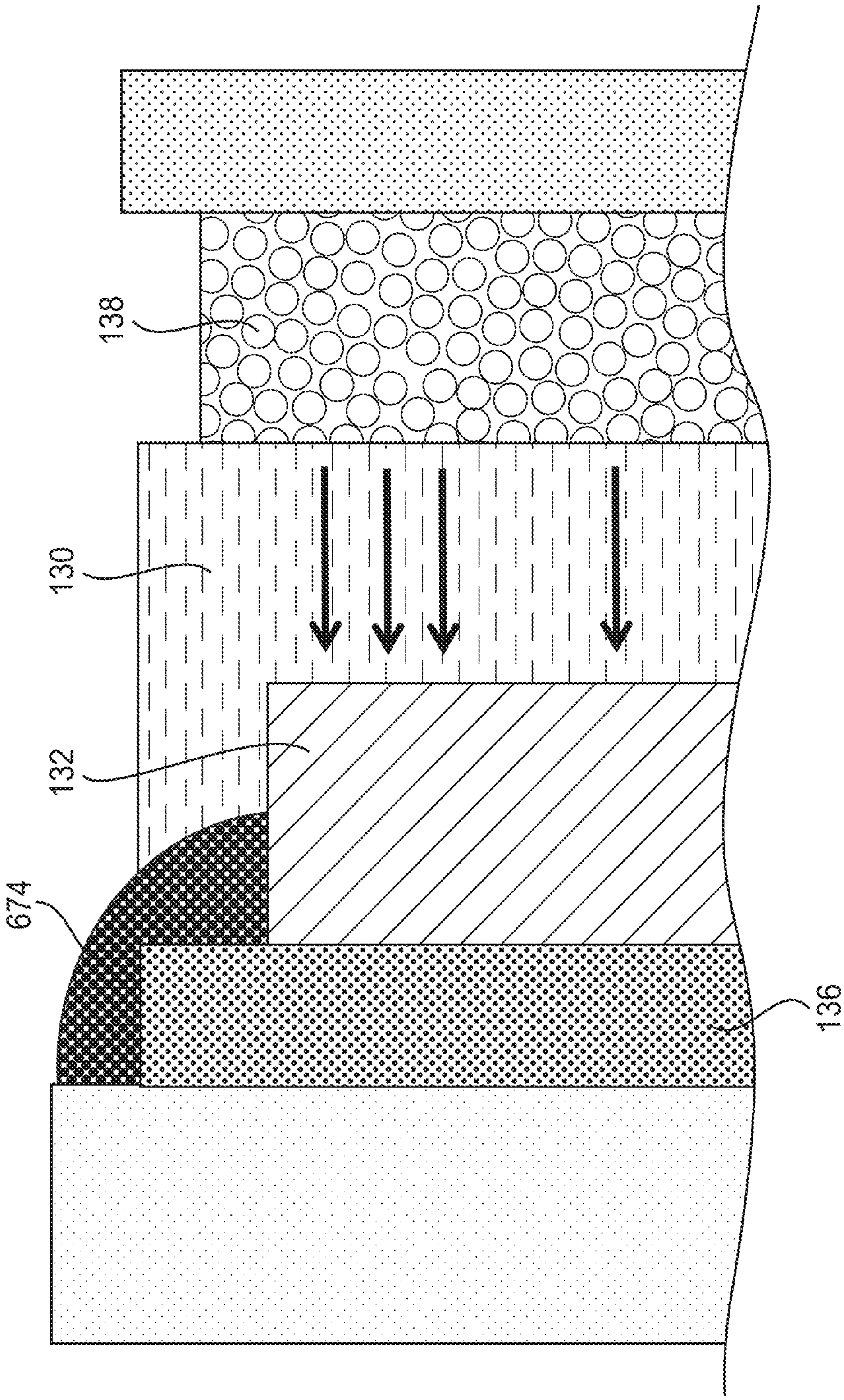

Referring to FIG. 33D, an embodiment is shown for a solid-electrolyte type battery. While a liquid electrolyte can be provided for the embodiments shown herein, such as for example in FIGS. 33A-C, solid electrolyte secondary batteries may also benefit from a carrier ion insulating materials protecting the electrode current collectors 136. In the embodiment as shown, the layer 674 of carrier ion insulating material is provided over exposed surfaces of the electrode current collector 136, and also extends at least partially over first and second vertical end surfaces of an adjacent electrode active material layer 132. The layer 674 thus protects the electrode current collector 136 from shorting and/or plating out by carrier ions passing through the solid-electrolyte-type separator 130 from the counter-electrode active material layer 138.

Separator Configurations

Referring to FIGS. 28A-28D, embodiments of configurations of the separator 130 are described. In certain embodiments, the separator 130 can comprise an ionically permeable, microporous material, that is capable of passing carrier ions therethrough between the electrode active material layer 132 and counter-electrode active material layer 138 in each unit cell 504, while also at least partially insulating the electrode and counter-electrode active material layers 132, 138 from one another, to inhibit electrical shorting between the layers. In the embodiment shown in FIG. 28A, the separator 130 comprises at least one, such as a single sheet, or even plural sheets, of separator material, sandwiched between the electrode active material layer 132 and the counter-electrode active material. The at least one sheet of separator material may extend in the transverse direction at least the length $L_C$ of the counter-electrode active material layer 138, and even at least the height $H_C$ (into the page in FIG. 28A), of the counter-electrode active material layer 138, to electrically insulate the layers 132, 138 from one another. In the embodiment as shown, the separator 130 extends at least partially past the end of the transverse surfaces 502*a,b*, 503*a,b*, of the electrode active material layer 132 and counter-electrode active material layer.

Figure 28A:
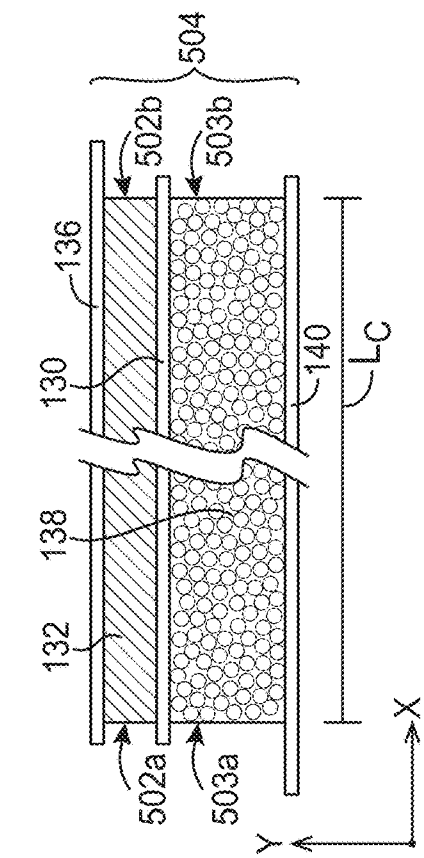
FIGS. 28A-28D illustrate cross-sections in a Y-X plane, of embodiments of unit cells with configurations of a separator disposed between electrode and counter-electrode active material layers.
Figure 28B:
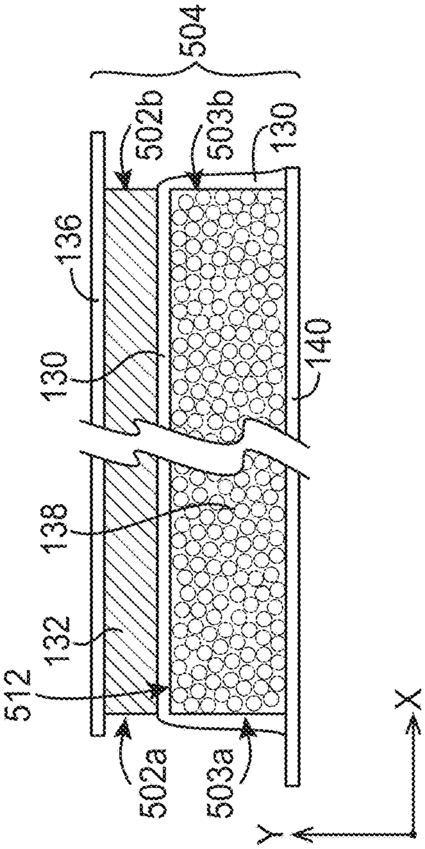
Figure 28C:
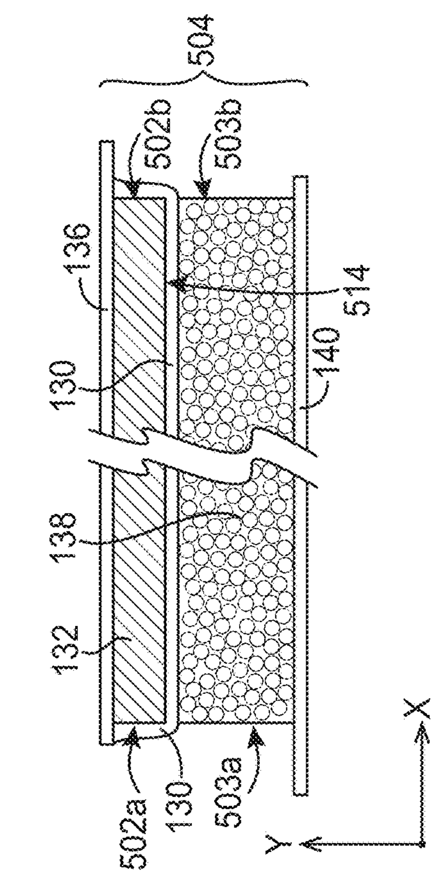

In yet another embodiment, as shown in FIG. 28B, the separator 130 can comprise a layer formed on the surface of the counter-electrode active material layer 138, and may be conformal with the surface of the layer. In the embodiment as shown, a conformal separator layer 130 is formed over an internal surface 512 of the counter-electrode active material layer 138, that faces the electrode active material layer 132, and extends over the transverse ends of the counter-electrode material layer 138 to at least partially and even entirely cover the transverse surfaces 503*a*, 503*b* of the counter-electrode active material layer, as well as optionally the vertical end surfaces 501*a*, 501*b* of the counter-electrode active material layer. In another embodiment, as shown in FIG. 28C, the separator 130 can comprise a layer formed on the surface of the electrode active material layer 132, and may be conformal with the surface of the layer. In the embodiment as shown, a conformal separator layer 130 is formed over an internal surface 514 of the electrode active material layer 132, that faces the counter-electrode active material layer 138, and extends over the transverse ends of the electrode material layer 132 to at least partially and even entirely cover the transverse surfaces 502*a*, 502*b* of the electrode active material layer, as well as optionally the vertical end surfaces 500*a*, 500*b* of the electrode active material layer.

Figure 28D:
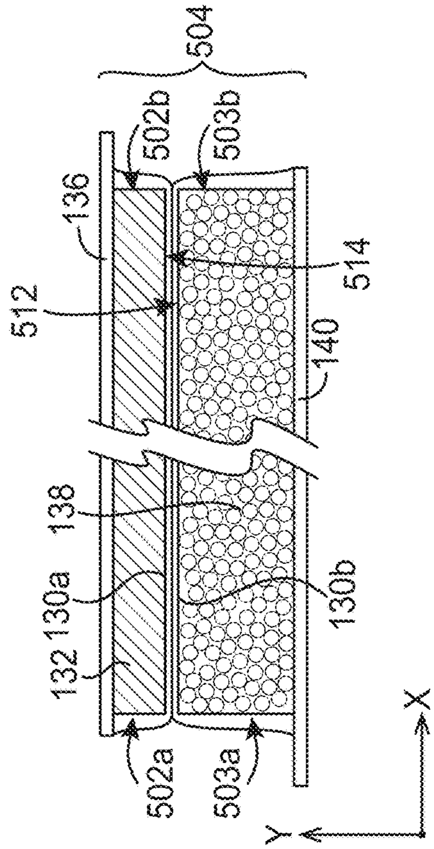

In yet another embodiment as shown in FIG. 28D, the separator 130 can comprise a multi-layer structure with a first layer 130a of separator material conformal with the surface of the electrode active material layer 132, and a second layer 130b of separator material conformal with the surface of the counter electrode active material layer 138. In the embodiment as shown, a first conformal separator layer 130a is formed over an internal surface 514 of the electrode active material layer 132, that faces the counter-electrode active material layer 138, and extends over the transverse ends of the electrode material layer 132 to at least partially and even entirely cover the transverse surfaces 502a, 502b of the electrode active material layer, as well as optionally the vertical end surfaces 500a, 500b of the electrode active material layer. A second conformal separator layer 130b is formed over an internal surface 512 of the counter-electrode active material layer 138 that faces the electrode active material layer 132, and extends over the transverse ends of the counter-electrode material layer 138 to at least partially and even entirely cover the transverse surfaces 503a, 503b of the counter-electrode active material layer, as well as optionally the vertical end surfaces 501a, 501b of the counter-electrode active material layer. In one embodiment, the conformal separator layers 130 can be formed by depositing, spraying, and/or tape casting separator layers onto the surfaces of the electrode and/or counter-electrode active material layers, to form a conformal coating of the separator material on the surface.

The separator 130 may be formed of a separator material that is capable of being permeated with liquid electrolyte for use in a liquid electrolyte secondary battery, such as a non-aqueous liquid electrolyte corresponding to any of those described herein. The separator 130 may also be formed of a separator material suitable for use with any of polymer electrolyte, gel electrolyte and/or ionic liquids. For example, the electrolyte may be liquid (e.g., free flowing at ambient temperatures and/or pressures) or solid, aqueous or non-aqueous. The electrolyte may also be a gel, such as a mixture of liquid plasticizers and polymer to give a semi-solid consistency at ambient temperature, with the carrier ions being substantially solvated by the plasticizers. The electrolyte may also be a polymer, such as a polymeric compound, and may be an ionic liquid, such as a molten salt and/or a liquid at ambient temperature.

Method of Preparing Electrode Assembly

In one embodiment, a method for preparing an electrode assembly 106 comprising a set of constraints 108 is provided, where the electrode assembly 106 may be used as a part of a secondary battery that is configured to cycle between a charged and a discharged state. The method can generally comprise forming a sheet structure, cutting the sheet structure into pieces (and/or pieces), stacking the pieces, and applying a set of constraints. By strip, it is understood that a piece other than one being in the shape of a strip could be used. The pieces comprise an electrode active material layer, an electrode current collector, a counter-electrode active material layer, a counter-electrode current collector, and a separator, and may be stacked so as to provide an alternating arrangement of electrode active material and/or counter-electrode active material. The sheets can comprise, for example, at least one of a unit cell 504 and/or a component of a unit cell 504. For example, the sheets can comprise a population of unit cells, which can be cut to a predetermined size (such as a size suitable for a 3D battery), and then the sheets of unit cells can be stacked to form the electrode assembly 106. In another example, the sheets can comprise one or more components of a unit cell, such as for example at least one of an electrode current collector 136, an electrode active material layer 132, a separator 130, a counter-electrode active material layer 138, and a counter-electrode current collector 140. The sheets of components can be cut to predetermined sizes to form the pieces (such as sizes suitable for a 3D battery), and then stacked to form an alternating arrangement of the electrode and counter-electrode active material layer components.

In yet another embodiment, the set of constraints 108 that are applied may correspond to any of those described herein, such as for example a set of constraints comprising a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%. Furthermore, the set of electrode constraints can comprise a secondary constraint system comprising first and second secondary growth constraints separated in a direction orthogonal to the longitudinal direction (such as the vertical or transverse direction) and connected by at least one secondary connecting member, wherein the secondary constraint system at least partially restrains growth of the electrode assembly in the vertical direction upon cycling of the secondary battery. At least one of the primary connecting member, or first and/or second primary growth constraints of the primary constraint system, and the secondary connecting member, or first and/or second secondary growth constraints of the secondary constraint system, can be one or more of the assembly components that make up the pieces, such as for example at least one of the electrode active material layer, electrode current collector, counter-electrode active material layer, counter-electrode current collector, and separator. For example, in one embodiment, the secondary connecting member of the secondary constraint system, can be one or more of the assembly components that make up the pieces, such as for example at least one of the electrode active material layer, electrode current collector, counter-electrode active material layer, counter-electrode current collector, and separator. That is, the application of the constraints may involve applying the first and second primary growth constraints to a primary member that is one of the structures in the stack of pieces. A secondary constraint system, such as any of those described elsewhere herein, may also be provided.

As an example, in one embodiment, the method may involve preparing sheets of electrode active material, counter-electrode active material, electrode current collector material, and counter-electrode current collector material, such as for example by dicing the sheets into the length, height and width dimensions suitable for an electrode active material layer 132, a counter-electrode active material layer 138, an electrode current collector 136, and a counter-electrode current collector 140. For example, in one method, the sheets are preparing by dicing and/or cutting the electrode and/or counter-electrode active material layers into sheets having a ratio of the length dimension $L_E$, $L_C$ to the height $H_E$, $H_C$ and width dimensions $W_E$, $W_C$ of at least 5:1, such as at least 8:1 and even at least 10:1. A ratio of $W_E$, $W_C$ to $H_E$, H may be in the range of 1:1 to 5:1, and typically not more than 20:1. In yet another embodiment, sheets comprising unit cells having each of the components may be formed, and then diced and/or cut to the predetermined size, such as for example to provide the electrode and/or counter-electrode active material layer ratios above or otherwise described elsewhere herein.

As yet a further example, the method can further comprise layering the sheets of electrode active material with sheets of electrode current collector material to form electrode structures 110, and layering the sheets of counter-electrode active material with sheets of counter-electrode current collector material to form counter-electrode structures 112. The method further comprises arranging an alternating stack of the electrode structures 110 and counter-electrode structures 112, with layers of separator material 130 separating each electrode structure from each counter-electrode structure. While the dicing of the sheets to form the proper layer size is described above as occurring before the layering process, it is also possible that dicing to form proper electrode and/or counter-electrode can be performed after layering; or a combination of before and after layering.

Furthermore, the method as described above may be used to form electrode assemblies 106 and secondary batteries 102 having the structures and structural elements as are elsewhere described herein.

Figure 21:
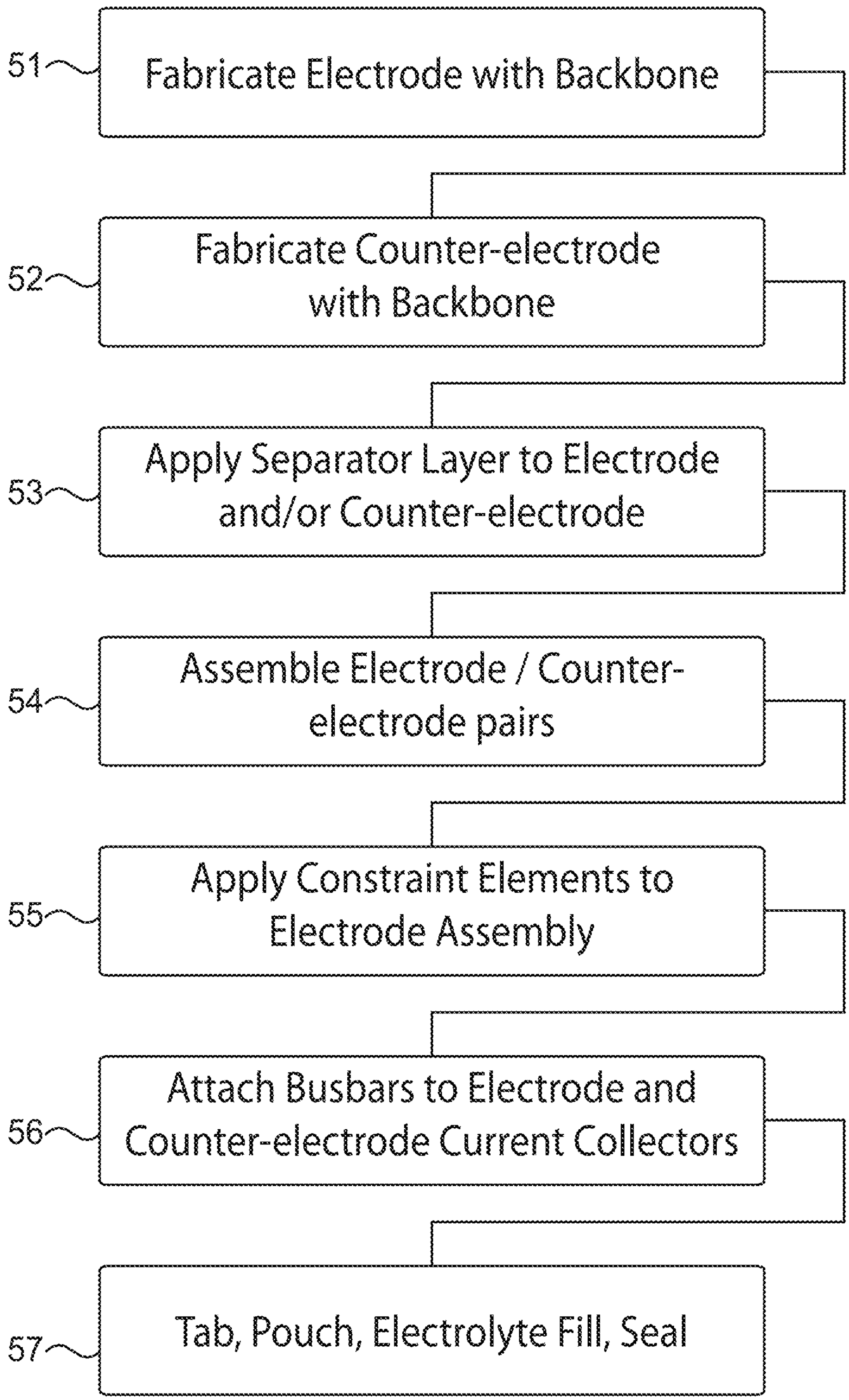
FIG. 21 illustrates an embodiment of a flowchart for one embodiment of the general assembly of an energy storage device or a secondary battery utilizing one embodiment of a set of growth constraints.

FIG. 21 depicts a specific embodiment of the method. In the embodiment of FIG. 21, in Step S1, an electrode structure 110 is fabricated having an electrode structure backbone 134. For example, referring to the embodiment shown in FIG. 5, an electrode structure 110 can be fabricated having layers 132 of electrode active material that are disposed on opposite sides of a backbone, and where the backbone corresponds to an electrode current collector 136. In Step S2, a counter electrode structure 112 is fabricated having a counter-electrode structure backbone 134. For example, referring again to the embodiment shown in FIG. 30, a counter-electrode structure 112 can be fabricated having layers 138 of counter-electrode active material on opposite sides of a backbone, where the backbone corresponds to a counter-electrode current collector 140. In step S3, at least one separator layer 130 is added to the electrode structure and/or counter-electrode structure 110, 112, such as for example via any of the methods depicted in the embodiments of FIGS. 28A-28D. In Step S4, the electrode structures 110 and counter-electrode structures 112, including the separator layer 130 formed in Step S3, are combined into electrode and counter-electrode pairs. That is, the electrode structures 110 and counter-electrode structures 112 are provided in a longitudinal stack, with the separator layer 130 in between each electrode structure 110 and counter-electrode structure 112, thereby forming the electrode assembly 106. In Step S5, the constraint elements are applied to the electrode assembly 106, for example the set of electrode constraints 108 including both the primary constraint system 151 and secondary constraints system 155 may be applied. As yet another example, in Step S5, application of the constraint elements may include applying the first and second secondary growth constraints 158, 160, such as for example to constrain growth in the vertical direction. For example, in the embodiment as shown in FIGS. 28A-28D, one or more vertical ends 638, 640 of electrode and/or counter-electrode current collectors 136, 140 may be connected to the first and second secondary growth constraints 158, 160, such as for example by adhering the ends thereto. In Step S6, the electrode bus bar and/or counter-electrode busbars 600, 602 are attached, for example by electrically and/or physically connecting to the respective electrode and/or counter-electrode current collectors 136, 140. For example, the electrode and/or counter-electrode busbars 600, 602 can comprise any of the structures and/or connecting arrangements as shown in any of the embodiments as shown in FIGS. 27A-27F. In Step S7, final steps for preparation of the secondary battery 106 are performed, including any final tabbing steps, pouching, filling with electrolyte, and sealing.

Electrode Constraints

In one embodiment, a set of electrode constraints 108 is provided that that restrains overall macroscopic growth of the electrode assembly 106, as illustrated for example in FIG. 1A. The set of electrode constraints 108 may be capable of restraining growth of the electrode assembly 106 along one or more dimensions, such as to reduce swelling and deformation of the electrode assembly 106, and thereby improve the reliability and cycling lifetime of an energy storage device 100 having the set of electrode constraints 108. As discussed above, without being limited to any one particular theory, it is believed that carrier ions traveling between the electrode structures 110 and counter electrode structures 112 during charging and/or discharging of a secondary battery 102 can become inserted into electrode active material, causing the electrode active material and/or the electrode structure 110 to expand. This expansion of the electrode structure 110 can cause the electrodes and/or electrode assembly 106 to deform and swell, thereby compromising the structural integrity of the electrode assembly 106, and/or increasing the likelihood of electrical shorting or other failures. In one example, excessive swelling and/or expansion and contraction of the electrode active material layer 132 during cycling of an energy storage device 100 can cause fragments of electrode active material to break away and/or delaminate from the electrode active material layer 132, thereby compromising the efficiency and cycling lifetime of the energy storage device 100. In yet another example, excessive swelling and/or expansion and contraction of the electrode active material layer 132 can cause electrode active material to breach the electrically insulating microporous separator 130, thereby causing electrical shorting and other failures of the electrode assembly 106. Accordingly, the set of electrode constraints 108 inhibit this swelling or growth that can otherwise occur with cycling between charged and discharged states to improve the reliability, efficiency, and/or cycling lifetime of the energy storage device 100.

According to one embodiment, the set of electrode constraints 108 comprises a primary growth constraint system 151 to restrain growth and/or swelling along the longitudinal axis (e.g., Y-axis in FIG. 1A) of the electrode assembly 106. In another embodiment, the set of electrode constraints 108 may include a secondary growth constraint system 152 that restrains growth along the vertical axis (e.g., Z-axis in FIG. 1A). In yet another embodiment, the set of electrode constraints 108 may include a 20 tertiary growth constraint system 155 that restrains growth along the transverse axis (e.g., X-axis in FIG. 4C). In one embodiment, the set of electrode constraints 108 comprises primary growth and secondary growth constraint systems 151, 152, respectively, and even tertiary growth constraint systems 155 that operate cooperatively to simultaneously restrain growth in one or more directions, such as along the longitudinal and vertical axis (e.g., Y axis and Z axis), and even simultaneously along all of the longitudinal, vertical, and transverse axes (e.g., Y, Z, and X axes). For example, the primary growth constraint system 151 may restrain growth that can otherwise occur along the stacking direction D of the electrode assembly 106 during cycling between charged and discharged states, while the secondary growth constraint system 152 may restrain swelling and growth that can occur along the vertical axis, to prevent buckling or other deformation of the electrode assembly 106 in the vertical direction. By way of further example, in one embodiment, the secondary growth constraint system 152 can reduce swelling and/or expansion along the vertical axis that would otherwise be exacerbated by the restraint on growth imposed by the primary growth constraint system 151. The tertiary growth constraint system 155 can also optionally reduce swelling and/or expansion along the transverse axis that could occur during cycling processes. That is, according to one embodiment, the primary growth and secondary growth constraint systems 151, 152, respectively, and optionally the tertiary growth constraint system 155, may operate together to cooperatively restrain multi-dimensional growth of the electrode assembly 106.

Figure 4A:
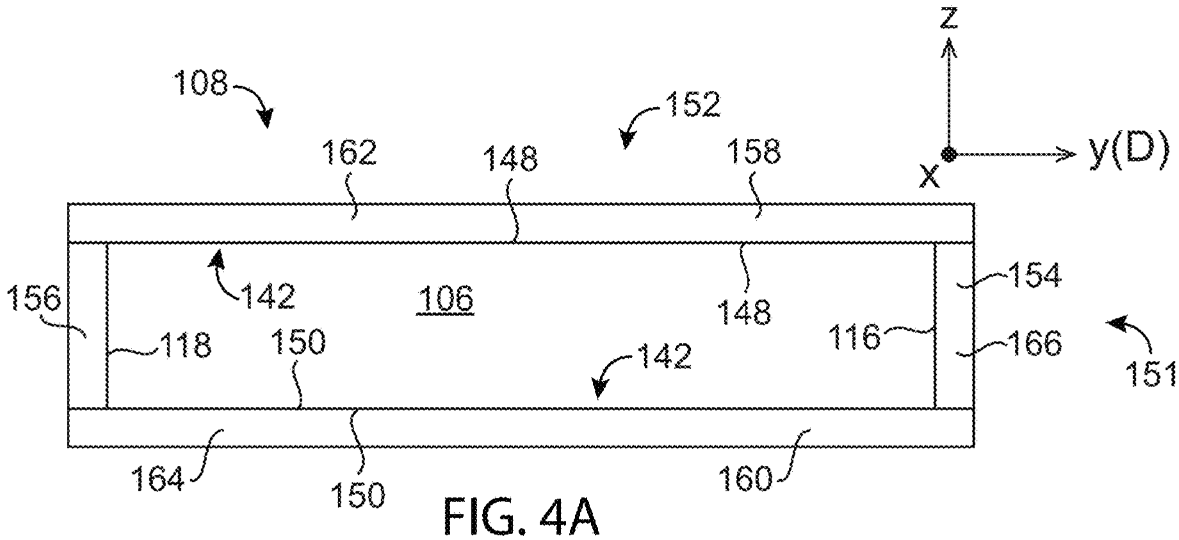
FIG. 4A illustrates a cross-section of an embodiment of the electrode assembly taken along the line A-A' as shown in FIG. 1A, and further illustrates elements of the primary and secondary growth constraint systems.
Figure 4B:
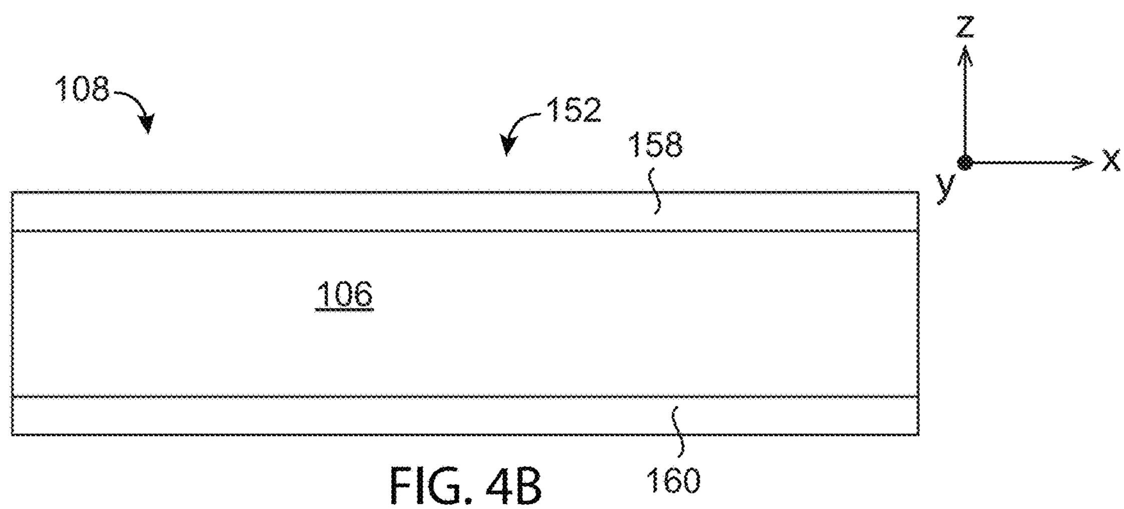
FIG. 4B illustrates a cross-section of an embodiment of the electrode assembly taken along the line B-B' as shown in FIG. 1A, and further illustrates elements of the primary and secondary growth constraint systems.

Referring to FIGS. 4A-4B, an embodiment of a set of electrode constraints 108 is shown having a primary growth constraint system 151 and a secondary growth constraint system 152 for an electrode assembly 106. FIG. 4A shows a cross-section of the electrode assembly 106 in FIG. 1A taken along the longitudinal axis (Y axis), such that the resulting 2-D cross-section is illustrated with the vertical axis (Z axis) 10) and longitudinal axis (Y axis). FIG. 4B shows a cross-section of the electrode assembly 106 in FIG. 1A taken along the transverse axis (X axis), such that the resulting 2-D cross-section is illustrated with the vertical axis (Z axis) and transverse axis (X axis). As shown in FIG. 4A, the primary growth constraint system 151 can generally comprise first and second primary growth constraints 154, 156, respectively, that are separated from one another along the longitudinal direction (Y axis). For example, in one embodiment, the first and second primary growth constraints 154, 156, respectively, comprise a first primary growth constraint 154 that at least partially or even entirely covers a first longitudinal end surface 116 of the electrode assembly 106, and a second primary growth constraint 156 that at least partially or even entirely covers a second longitudinal end surface 118 of the electrode assembly 106. In yet another version, one or more of the first and second primary growth constraints 154, 156 may be interior to a longitudinal end 117, 119 of the electrode assembly 106, such as when one or more of the primary growth constraints comprise an internal structure of the electrode assembly 106. The primary growth constraint system 151 can further comprise at least one primary connecting member 162 that connects the first and second primary growth constraints 154, 156, and that may have a principal axis that is parallel to the longitudinal direction. For example, the primary growth constraint system 151 can comprise first and second primary connecting members 162, 164, respectively, that are separated from each other along an axis that is orthogonal to the longitudinal axis, such as along the vertical axis (Z axis) as depicted in the embodiment. The first and second primary connecting members 162, 164, respectively, can serve to connect the first and second primary growth constraints 154, 156, respectively, to one another, and to maintain the first and second primary growth constraints 154, 156, respectively, in tension with one another, so as to restrain growth along the longitudinal axis of the electrode assembly 106.

According to one embodiment, the set of electrode constraints 108 including the primary growth constraint system 151 may be capable of restraining growth of the electrode assembly 106 in the longitudinal direction (i.e., electrode stacking direction, D) such that any increase in the Feret diameter of the electrode assembly in the longitudinal direction over 20 consecutive cycles of the secondary battery is less than 20% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction such that any increase in the Feret diameter of the electrode assembly in the longitudinal direction over 500 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery to less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 20%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction such that any increase in the Feret diameter of the electrode assembly in the longitudinal direction over 800 consecutive cycles of the secondary battery is less than 10% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 10%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction over 5 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery, is less than 5. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 5% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 5% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 5%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction per cycle of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 5 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 1% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery to less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery to less than 1%.

By charged state it is meant that the secondary battery 102 is charged to at least 75% of its rated capacity, such as at least 80% of its rated capacity, and even at least 90% of its rated capacity, such as at least 95% of its rated capacity, and even 100% of its rated capacity. By discharged state it is meant that the secondary battery is discharged to less than 25% of its rated capacity, such as less than 20% of its rated capacity, and even less than 10%, such as less than 5%, and even 0% of its rated capacity. Furthermore, it is noted that the actual capacity of the secondary battery 102 may vary over time and with the number of cycles the battery has gone through. That is, while the secondary battery 102 may initially exhibit an actual measured capacity that is close to its rated capacity, the actual capacity of the battery will decrease over time, with the secondary battery 102 being considered to be at the end of its life when the actual capacity drops below 80% of the rated capacity as measured in going from a charged to a discharged state.

Further shown in FIGS. 4A and 4B, the set of electrode constraints 108 can further comprise the secondary growth constraint system 152, that can generally comprise first and second secondary growth constraints 158, 160, respectively, that are separated from one another along a second direction orthogonal to the longitudinal direction, such as along the vertical axis (Z axis) in the embodiment as shown. For example, in one embodiment, the first secondary growth constraint 158 at least partially extends across a first region 148 of the lateral surface 142 of the electrode assembly 106, and the second secondary growth constraint 160 at least partially extends across a second region 150 of the lateral surface 142 of the electrode assembly 106 that opposes the first region 148. In yet another version, one or more of the first and second secondary growth constraints 154, 156 may be interior to the lateral surface 142 of the electrode assembly 106, such as when one or more of the secondary growth constraints comprise an internal structure of the electrode assembly 106. In one embodiment, the first and second secondary growth constraints 158, 160, respectively, are connected by at least one secondary connecting member 166, which may have a principal axis that is parallel to the second direction, such as the vertical axis. The secondary connecting member 166 may serve to connect and hold the first and second secondary growth constraints 158, 160, respectively, in tension with one another, so as to restrain growth of the electrode assembly 106 along a direction orthogonal to the longitudinal direction, such as for example to restrain growth in the vertical direction (e.g., along the Z axis). In the embodiment depicted in FIG. 4A, the at least one secondary connecting member 166 can correspond to at least one of the first and second primary growth constraints 154, 156. However, the secondary connecting member 166 is not limited thereto, and can alternatively and/or in addition comprise other structures and/or configurations.

According to one embodiment, the set of constraints including the secondary growth constraint system 152 may be capable of restraining growth of the electrode assembly 106 in a second direction orthogonal to the longitudinal direction, such as the vertical direction (Z axis), such that any increase in the Feret diameter of the electrode assembly in the second direction over 20 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary 30) battery is less than 20%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 20%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 20%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 20% between charged and discharged states.

In embodiment, the set of constraints including the secondary growth constraint system 152 may be capable of restraining growth of the electrode assembly 106 in the second direction such that any increase in the Feret diameter of the electrode assembly in the second direction over 10 consecutive cycles of the secondary battery is less than 10% between charged and discharged states. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 10%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 10%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 10%.

In embodiment, the set of constraints including the secondary growth constraint system 152 may be capable of restraining growth of the electrode assembly 106 in the second direction such that any increase in the Feret diameter of the electrode assembly in the second direction over 5 consecutive cycles of the secondary battery is less than 5% between charged and discharged states. By way of further example, in one embodiment the secondary growth constraint system 152 may be capable of restraining growth of the electrode assembly 106 in the second direction such that any increase in the Feret diameter of the electrode assembly in the second direction over 10 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 5%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 5%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 5%.

In embodiment, the set of constraints including the secondary growth constraint system 152 may be capable of restraining growth of the electrode assembly 106 in the second direction such that any increase in the Feret diameter of the electrode assembly in the second direction per cycle of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 5 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 10 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 1%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 1% between charged and discharged states. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 1%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 1%.

Figure 4C:
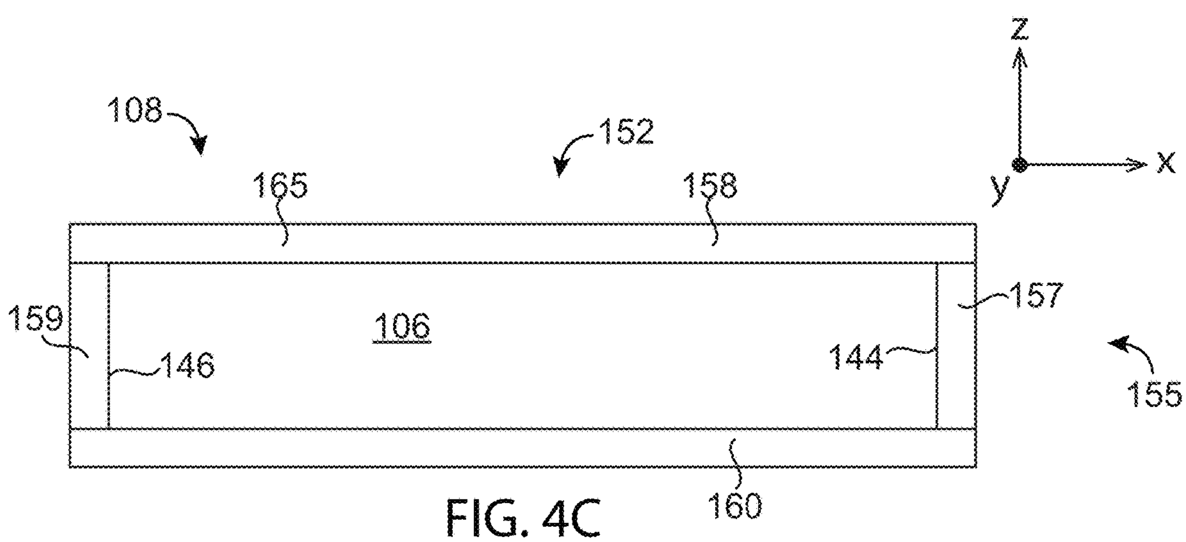
FIG. 4C illustrates a cross-section of an embodiment of the electrode assembly taken along the line B-B' as shown in FIG. 1A, and further illustrates elements 5 of the primary and secondary growth constraint systems.

FIG. 4C shows an embodiment of a set of electrode constraints 108 that further includes a tertiary growth constraint system 155 to constrain growth of the electrode assembly in a third direction that is orthogonal to the longitudinal and second directions, such as the transverse direction (X) direction. The tertiary growth constraint system 155 can be provided in addition to the primary and secondary growth constraint systems 151, 152, respectively, to constrain overall growth of the electrode assembly 106 in three dimensions, and/or may be provided in combination with one of the primary or secondary growth constraint systems 151, 152, respectively, to constrain overall growth of the electrode assembly 106 in two dimensions. FIG. 4C shows a cross-section of the electrode assembly 106 in FIG.

1A taken along the transverse axis (X axis), such that the resulting 2-D cross-section is illustrated with the vertical axis (Z axis) and transverse axis (X axis). As shown in FIG. 4C, the tertiary growth constraint system 155 can generally comprise first and second tertiary growth constraints 157, 159, respectively, that are separated from one another along the third direction such as the transverse direction (X axis). For example, in one embodiment, the first tertiary growth constraint 157 at least partially extends across a first region 144 of the lateral surface 142 of the electrode assembly 106, and the second tertiary growth constraint 159 at least partially extends across a second region 146 of the lateral surface 142 of the electrode assembly 106 that opposes the first region 144 in the transverse direction. In yet another version, one or more of the first and second tertiary growth constraints 157, 159 may be interior to the lateral surface 142 of the electrode assembly 106, such as when one or more of the tertiary growth constraints comprise an internal structure of the electrode assembly 106. In one embodiment, the first and second tertiary growth constraints 157, 159, respectively, are connected by at least one tertiary connecting member 165, which may have a principal axis that is parallel to the third direction. The tertiary connecting member 165 may serve to connect and hold the first and second tertiary growth constraints 157, 159, respectively, in tension with one another, so as to restrain growth of the electrode assembly 106 along a direction orthogonal to the longitudinal direction, for example, to restrain growth in the transverse direction (e.g., along the X axis). In the embodiment depicted in FIG. 4C, the at least one tertiary connecting member 165 can correspond to at least one of the first and second secondary growth constraints 158, 160. However, the tertiary connecting member 165 is not limited thereto, and can alternatively and/or in addition comprise other structures and/or configurations. For example, the at least one tertiary connecting member 165 can, in one embodiment, correspond to at least one of the first and second primary growth constraints 154, 156 (not shown).

According to one embodiment, the set of constraints having the tertiary growth constraint system 155 may be capable of restraining growth of the electrode assembly 106 in a third direction orthogonal to the longitudinal direction, such as the transverse direction (X axis), such that any increase in the Feret diameter of the electrode assembly in the third direction over 20 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 20%. 30) By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 20%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 20%.

In one embodiment, the set of constraints having the tertiary growth constraint system 155 may be capable of restraining growth of the electrode assembly 106 in the third direction such that any increase in the Feret diameter of the electrode assembly in the third direction over 10 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 10%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 10% between charged and discharged states. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 10%.

In one embodiment, the set of constraints having the tertiary growth constraint system 155 may be capable of restraining growth of the electrode assembly 106 in the third direction such that any increase in the Feret diameter of the electrode assembly in the third direction over 5 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 10 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 5%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 5%.

In one embodiment, the set of constraints having the tertiary growth constraint system 155 may be capable of restraining growth of the electrode assembly 106 in the third direction such that any increase in the Feret diameter of the electrode assembly in the third direction per cycle of the secondary battery is less than 1%. By way of further example, in one embodiment the tertiary growth constraint system 155 may be 10) capable of restraining growth of the electrode assembly 106 in the third direction such that any increase in the Feret diameter of the electrode assembly in the third direction over 5 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 10 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 1%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 1% between charged and discharged states. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is 30 less than 1%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 1%.

According to one embodiment, the primary and secondary growth constraint systems 151, 152, respectively, and optionally the tertiary growth constraint system 155, are configured to cooperatively operate such that portions of the primary growth constraint system 151 cooperatively act as a part of the secondary growth constraint system 152, and/or portions of the secondary growth constraint system 152 cooperatively act as a part of the primary growth constraint system 151, and the portions of any of the primary and/or secondary constraint systems 151, 152, respectively, may also cooperatively act as a part of the tertiary growth constraint system, and vice versa. For example, in the embodiment shown in in FIGS. 4A and 4B, the first and second primary connecting members 162, 164, respectively, of the primary growth constraint system 151 can serve as at least a portion of, or even the entire structure of, the first and second secondary growth constraints 158, 160 that constrain growth in the second direction orthogonal to the longitudinal direction. In yet another embodiment, as mentioned above, one or more of the first and second primary growth constraints 154, 156, respectively, can serve as one or more secondary connecting members 166 to connect the first and second secondary growth constrains 158, 160, respectively. Conversely, at least a portion of the first and second secondary growth constraints 158, 160, respectively, can act as first and second primary connecting members 162, 164, respectively, of the primary growth constraint system 151, and the at least one secondary connecting member 166 of the secondary growth constraint system 152 can, in one embodiment, act as one or more of the first and second primary growth constraints 154, 156, respectively. In yet another embodiment, at least a portion of the first and second primary connecting members 162, 164, respectively, of the primary growth constraint system 151, and/or the at least one secondary connecting member 166 of the secondary growth constraint system 152 can serve as at least a portion of, or even the entire structure of, the first and second tertiary growth constraints 157, 159, respectively, that constrain growth in the transverse direction orthogonal to the longitudinal direction. In yet another embodiment, one or more of the first and second primary growth constraints 154, 156, respectively, and/or the first and second secondary growth constraints 158, 160, respectively, can serve as one or more tertiary connecting members 166 to connect the first and second tertiary growth constraints 157, 159, respectively. Conversely, at least a portion of the first and second tertiary growth constraints 157, 159, respectively, can act as first and second primary connecting members 162, 164, respectively, of the primary growth constraint system 151, and/or the at least one secondary connecting member 166 of the secondary growth constraint system 152, and the at least one tertiary connecting member 165 of the tertiary growth constraint system 155 can in one embodiment act as one or more of the first and second primary growth constraints 154, 156, respectively, and/or one or more of the first and second secondary growth constraints 158, 160, respectively. Alternatively and/or additionally, the primary and/or secondary and/or tertiary growth constraints can comprise other structures that cooperate to restrain growth of the electrode assembly 106. Accordingly, the primary and secondary growth constraint systems 151, 152, respectively, and optionally the tertiary growth constraint system 155, can share components and/or structures to exert restraint on the growth of the electrode assembly 106.

In one embodiment, the set of electrode constraints 108 can comprise structures such as the primary and secondary growth constraints, and primary and secondary connecting members, that are structures that are external to and/or internal to the battery enclosure 104, or may be a part of the battery enclosure 104 itself. For example, the set of electrode constraints 108 can comprise a combination of structures that includes the battery enclosure 104 as well as other structural components. In one such embodiment, the battery enclosure 104 may be a component of the primary growth constraint system 151 and/or the secondary growth constraint system 152; stated differently, in one embodiment, the battery enclosure 104, alone or in combination with one or more other structures (within and/or outside the battery enclosure 104, for example, the primary growth constraint system 151 and/or a secondary growth constraint system 152) restrains growth of the electrode assembly 106 in the electrode stacking direction D and/or in the second direction orthogonal to the stacking direction, D. For example, one or more of the primary growth constraints 154, 156 and secondary growth constraints 158, 160 can comprise a structure that is internal to the electrode assembly. In another embodiment, the primary growth constraint system 151 and/or secondary growth constraint system 152 does not include the battery enclosure 104, and instead one or more discrete structures (within and/or outside the battery enclosure 104) other than the battery enclosure 104 restrains growth of the electrode assembly 106 in the electrode stacking direction, D, and/or in the second direction orthogonal to the stacking direction, D. In another embodiment, the primary and secondary growth constraint systems, and optionally also a tertiary growth constraint system, are within the battery enclosure, which may be a sealed battery enclosure, such as a hermetically sealed battery enclosure. The electrode assembly 106 may be restrained by the set of electrode constraints 108 at a pressure that is greater than the pressure exerted by growth and/or swelling of the electrode assembly 106 during repeated cycling of an energy storage device 100 or a secondary battery having the electrode assembly 106.

In one exemplary embodiment, the primary growth constraint system 151 includes one or more discrete structure(s)

within the battery enclosure 104 that restrains growth of the electrode structure 110 in the stacking direction D by exerting a pressure that exceeds the pressure generated by the electrode structure 110 in the stacking direction D upon repeated cycling of a secondary battery 102 having the electrode structure 110 as a part of the electrode assembly 106. In another exemplary embodiment, the primary growth constraint system 151 includes one or more discrete structures within the battery enclosure 104 that restrains growth of the counter-electrode structure 112 in the stacking direction D by exerting a pressure in the stacking direction D that exceeds the pressure generated by the counter-electrode structure 112 in the stacking direction D upon repeated cycling of a secondary battery 102 having the counter-electrode structure 112 as a part of the electrode assembly 106. The secondary growth constraint system 152 can similarly include one or more discrete structures within the battery enclosure 104 that restrain growth of at least one of the electrode structures 110 and counter-electrode structures 112 in the second direction orthogonal to the stacking direction D, such as along the vertical axis (Z axis), by exerting a pressure in the second direction that exceeds the pressure generated by the electrode or counter-electrode structure 110, 112, respectively, in the second direction upon repeated cycling of a secondary battery 102 having the electrode or counter electrode structures 110, 112, respectively.

In yet another embodiment, the first and second primary growth constraints 154, 156, respectively, of the primary growth constraint system 151 restrain growth of the electrode assembly 106 by exerting a pressure on the first and second longitudinal end surfaces 116, 118 of the electrode assembly 106, meaning, in a longitudinal direction, that exceeds a pressure exerted by the first and second primary growth constraints 154, 156 on other surfaces of the electrode assembly 106 that would be in a direction orthogonal to the longitudinal direction, such as opposing first and second regions of the lateral surface 142 of the electrode assembly 106 along the transverse axis and/or vertical axis. That is, the first and second primary growth constraints 154, 156 may exert a pressure in a longitudinal direction (Y axis) that exceeds a pressure generated thereby in directions orthogonal thereto, such as the transverse (X axis) and vertical (Z axis) directions. For example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D, by a factor of at least 3. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D by a factor of at least 4. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

Similarly, in one embodiment, the first and second secondary growth constraints 158, 160, respectively, of the primary growth constraint system 151 restrain growth of the electrode assembly 106 by exerting a pressure on first and second opposing regions of the lateral surface 142 of the electrode assembly 106 in a second direction orthogonal to the longitudinal direction, such as first and second opposing surface regions along the vertical axis 148, 150, respectively (i.e., in a vertical direction), that exceeds a pressure exerted by the first and second secondary growth constraints 158, 160, respectively, on other surfaces of the electrode assembly 106 that would be in a direction orthogonal to the second direction. That is, the first and second secondary growth constraints 158, 160, respectively, may exert a pressure in a vertical direction (Z axis) that exceeds a pressure generated thereby in directions orthogonal thereto, such as the transverse (X axis) and longitudinal (Y axis) directions. For example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 by the secondary growth constraint system 152 in at least one, or even both, of the two directions that are perpendicular thereto, by a factor of at least 3. By way of further example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 by the secondary growth constraint system 152 in at least one, or even both, of the two directions that are perpendicular thereto, by a factor of at least 4. By way of further example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 in at least one, or even both, of the two directions that are perpendicular thereto, by a factor of at least 5.

In yet another embodiment, the first and second tertiary growth constraints 157, 159, respectively, of the tertiary growth constraint system 155 restrain growth of the electrode assembly 106 by exerting a pressure on first and second opposing regions of the lateral surface 142 of the electrode assembly 106 in a direction orthogonal to the longitudinal direction and the second direction, such as first and second opposing surface regions along the transverse axis 161, 163, respectively (i.e., in a transverse direction), that exceeds a pressure exerted by the tertiary growth constraint system 155 on other surfaces of the electrode assembly 106 that would be in a direction orthogonal to the transverse direction. That is, the first and second tertiary growth constraints 157, 159, respectively, may exert a pressure in a transverse direction (X axis) that exceeds a pressure generated thereby in directions orthogonal thereto, such as the vertical (Z axis) and longitudinal (Y axis) directions. For example, in one such embodiment, the tertiary growth constraint system 155 restrains growth of the electrode assembly 106 with a pressure on first and second opposing surface regions 144, 146 (i.e., in the transverse direction) that exceeds the pressure maintained on the electrode assembly 106 by the tertiary growth constraint system 155 in at least one, or even both, of the two directions that are perpendicular thereto, by a factor of at least 3. By way of further example, in one such embodiment, the tertiary growth constraint system 155 restrains growth of the electrode assembly 106 with a pressure on first and second opposing surface regions 144, 146, respectively (i.e., in the transverse direction), that exceeds the pressure maintained on the electrode assembly 106 by the tertiary growth constraint system 155 in at least one, or even both, of the two directions that are perpendicular thereto, by a factor of at least 4. By way of further example, in one such embodiment, the tertiary growth constraint system 155 restrains growth of the electrode assembly 106 with a pressure on first and second opposing surface regions 144, 146, respectively (i.e., in the transverse direction), that exceeds the pressure maintained on the electrode assembly 106 in at least one, or even both, of the two directions that are perpendicular thereto, by a factor of at least 5.

In one embodiment, the set of electrode constraints 108, which may include the primary growth constraint system 151, the secondary growth constraint system 152, and optionally the tertiary growth constraint system 155, is configured to exert pressure on the electrode assembly 106 along two or more dimensions thereof (e.g., along the longitudinal and vertical directions, and optionally along the transverse direction), with a pressure being exerted along the longitudinal direction by the set of electrode constraints 108 being greater than any pressure(s) exerted by the set of electrode constraints 108 in any of the directions orthogonal to the longitudinal direction (e.g., the Z and X directions). That is, when the pressure(s) exerted by the primary, secondary, and optionally tertiary growth constraint systems 151, 152, 155, respectively, making up the set of electrode constraints 108 are summed together, the pressure exerted on the electrode assembly 106 along the longitudinal axis exceeds the pressure(s) exerted on the electrode assembly 106 in the directions orthogonal thereto. For example, in one such embodiment, the set of electrode constraints 108 exerts a pressure on the first and second longitudinal end surfaces 116, 118 (i.e., in the stacking direction D) that exceeds the pressure maintained on the electrode assembly 106 by the set of electrode constraints 108 in at least one or even both of the two directions that are perpendicular to the stacking direction D, by a factor of at least 3. By way of further example, in one such embodiment, the set of electrode constraints 108 exerts a pressure on first and second longitudinal end surfaces 116, 118 (i.e., in the stacking direction D) that exceeds the pressure maintained on the electrode assembly 106 by the set of electrode constraints 108 in at least one, or even both, of the two directions that are perpendicular to the stacking direction D by a factor of at least 4. By way of further example, in one such embodiment, the set of electrode constraints 108 exerts a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

According to one embodiment, the first and second longitudinal end surfaces 116, 118, respectively, have a combined surface area that is less than a predetermined amount of the overall surface area of the entire electrode assembly 106. For example, in one embodiment, the electrode assembly 106 may have a geometric shape corresponding to that of a rectangular prism with first and second longitudinal end surfaces 116, 118, respectively, and a lateral surface 142 extending between the end surfaces 116, 118, respectively, that makes up the remaining surface of the electrode assembly 106, and that has opposing surface regions 144, 146 in the X direction (i.e., the side surfaces of the rectangular prism) and opposing surface regions 148, 150 in the Z direction (i.e., the top and bottom surfaces of the rectangular prism, wherein X, Y and Z are dimensions measured in directions corresponding to the X, Y, and Z axes, respectively). The overall surface area is thus the sum of the surface area covered by the lateral surface 142 (i.e., the surface area of the opposing surfaces 144, 146, 148, and 150 in X and Z), added to the surface area of the first and second longitudinal end surfaces 116, 118, respectively. In accordance with one aspect of the present disclosure, the sum of the surface areas of the first and second longitudinal end surfaces 116, 118, respectively, is less than 33% of the surface area of the total surface of the electrode assembly 106. For example, in one such embodiment, the sum of the surface areas of the first and second longitudinal end surfaces 116, 118, respectively, is less than 25% of the surface area of the total surface of the electrode assembly 106. By way of further example, in one embodiment, the sum of the surface areas of the first and second longitudinal end surfaces 116, 118, respectively, is less than 20% of the surface area of the total surface of the electrode assembly. By way of further example, in one embodiment, the sum of the surface areas of the first and second longitudinal end surfaces 116, 118, respectively, is less than 15% of the surface area of the total surface of the electrode assembly. By way of further example, in one embodiment, the sum of the surface areas of the first and second longitudinal end surfaces 116, 118, respectively, is less than 10% of the surface area of the total surface of the electrode assembly.

In yet another embodiment, the electrode assembly 106 is configured such that a surface area of a projection of the electrode assembly 106 in a plane orthogonal to the stacking direction (i.e., the longitudinal direction), is smaller than the surface areas of projections of the electrode assembly 106 onto other orthogonal planes. For example, referring to the electrode assembly 106 embodiment shown in FIG. 2A (e.g., a rectangular prism), it can be seen that surface area of a projection of the electrode assembly 106 into a plane orthogonal to the stacking direction (i.e., the X-Z plane) corresponds to $L_{EA}\times H_{EA}$. Similarly, a projection of the electrode assembly 106 into the Z-Y plane corresponds to $W_{EA}\times H_{EA}$, and a projection of the electrode assembly 106 into the X-Y plane corresponds to $L_{EA}\times W_{EA}$. Accordingly, the electrode assembly 106 is configured such that the stacking direction intersects the plane in which the projection having the smallest surface area lies. Accordingly, in the embodiment in FIG. 2A, the electrode assembly 106 is positioned such that the stacking direction intersects the X-Z plane in which the smallest surface area projection corresponding to $H_{EA}\times L_{EA}$ lies. That is, the electrode assembly is positioned such that the projection having the smallest surface area (e.g., $H_{EA}\times L_{EA}$) is orthogonal to the stacking direction.

In yet another embodiment, the secondary battery 102 can comprise a plurality of electrode assemblies 106 that are stacked together to form an electrode stack, and can be constrained by one or more shared electrode constraints. For example, in one embodiment, at least a portion of one or more of the primary growth constraint system 151 and the secondary growth constraint system 152 can be shared by a plurality of electrode assemblies 106 forming the electrode assembly stack. By way of further example, in one embodiment, a plurality of electrode assemblies forming an electrode assembly stack may be constrained in a vertical direction by a secondary growth constraint system 152 having a first secondary growth constraint 158 at a top electrode assembly 106 of the stack, and a second secondary growth constraint 160 at a bottom electrode assembly 106 of the stack, such that the plurality of electrode assemblies 106 forming the stack are constrained in the vertical direction by the shared secondary growth constraint system. Similarly, portions of the primary growth constraint system 151 could also be shared. Accordingly, in one embodiment, similarly to the single electrode assembly described above, a surface area of a projection of the stack of electrode assemblies 106 in a plane orthogonal to the stacking direction (i.e., the longitudinal direction), is smaller than the surface areas of projections of the stack of electrode assemblies 106 onto other orthogonal planes. That is, the plurality of electrode assemblies 106 may be configured such that the stacking direction (i.e., longitudinal direction) intersects and is orthogonal to a plane that has a projection of the stack of electrode assemblies 106 that is the smallest of all the other orthogonal projections of the electrode assembly stack.

According to one embodiment, the electrode assembly 106 further comprises electrode structures 110 that are configured such that a surface area of a projection of the electrode structures 110 into a plane orthogonal to the stacking direction (i.e., the longitudinal direction), is larger than the surface areas of projections of the electrode structures 100 onto other orthogonal planes. For example, referring to the embodiments as shown in FIGS. 2 and 7, the electrodes 110 can each be understood to have a length $L_{ES}$ measured in the transverse direction, a width WES measured in the longitudinal direction, and a height $H_{ES}$ measured in the vertical direction. The projection into the X-Z plane as shown in FIGS. 2 and 7 thus has a surface area $L_{ES}\times H_{ES}$, the projection into the Y-Z plane has a surface area $W_{ES}\times H_{ES}$, and the projection into the XY plane has a surface area $L_{ES}\times W_{ES}$. Of these, the plane corresponding to the projection having the largest surface area is the one that is selected to be orthogonal to the stacking direction. Similarly, the electrodes 110 may also be configured such that a surface area of a projection of the electrode active material layer 132 into a plane orthogonal to the stacking direction is larger than the surface areas of projections of the electrode active material layer onto other orthogonal planes. For example, in the embodiments shown in FIGS. 2 and 7, the electrode active material layer may have a length $L_A$ measured in the transverse direction, a width $W_A$ measured in the longitudinal direction, and a height $H_A$ measured in the vertical direction, from the surface areas of projections can be calculated ($L_{ES}$, $L_A$, $W_{ES}$, $W_A$ $H_{ES}$ and $H_A$ may also correspond to the maximum of these dimensions, in a case where the dimensions of the electrode structure and/or electrode active material layer 132 vary along one or more axes). In one embodiment, by positioning the electrode structures 110 such that the plane having the highest projection surface area of the electrode structure 100 and/or electrode active material layer 132 is orthogonal to the stacking direction, a configuration can be achieved whereby the surface of the electrode structure 110 having the greatest surface area of electrode active material faces the direction of travel of the carrier ions, and thus experiences the greatest growth during cycling between charged and discharged states due to intercalation and/or alloying.

In one embodiment, the electrode structure 110 and electrode assembly 106 can be configured such that the largest surface area projection of the electrode structure 110 and/or electrode active material layer 132, and the smallest surface area projection of the electrode assembly 106 are simultaneously in a plane that is orthogonal to the stacking direction. For example, in a case as shown in FIGS. 2 and 7, where the projection of the electrode active material layer 132 in the X-Z plane ($L_A\times H_A$) of the electrode active material layer 132 is the highest, the electrode structure 110 and/or electrode active material layer 132 is positioned with respect to the smallest surface area projection of the electrode assembly ($L_{EA}\times H_{EA}$) such the projection plane for both projections is orthogonal to the stacking direction. That is, the plane having the greatest surface area projection of the electrode structure 110 and/or electrode active material is parallel to (and/or in the same plane with) the plane having the smallest surface area projection of the electrode assembly 106. In this way, according to one embodiment, the surfaces of the electrode structures that are most likely to experience the highest volume growth, i.e., the surfaces having the highest content of electrode active material layer, and/or surfaces that intersect (e.g., are orthogonal to) a direction of travel of carrier ions during charge/discharge of a secondary battery, face the surfaces of the electrode assembly 106 having the lowest surface area. An advantage of providing such a configuration may be that the growth constraint system used to constrain in this greatest direction of growth, e.g. along the longitudinal axis, can be implemented with growth constraints that themselves have a relatively small surface area, as compared to the area of other surfaces of the electrode assembly 106, thereby reducing the volume required for implementing a constraint system to restrain growth of the electrode assembly.

In one embodiment, the set of constraints are capable of resisting a pressure of greater than of equal to 2 MPa exerted by the electrode assembly during cycling of the secondary battery between charged and discharged states. In another embodiment, the set of constraints are capable of resisting a pressure of greater than or equal to 5 MPa exerted by the electrode assembly during cycling of the secondary battery between charged and discharged states. In another embodiment, the set of constraints are capable of resisting a pressure of greater than or equal to 7 MPa exerted by the electrode assembly during cycling of the secondary battery between charged and discharged states. In yet another embodiment, set of constraints are capable of resisting a pressure of greater than or equal to 10 MPa exerted by the electrode assembly during cycling of the secondary battery between charged and discharged states. The set of constraints may be capable of resisting and withstanding such pressures, substantially without breaking or failure of the set of constraints. Furthermore, in some embodiments, the set of constraints are capable of resisting the pressure while also providing a relatively small volume in the secondary battery 102, as described below.

In one embodiment, the constraint system 108 occupies a relatively low volume % of the combined volume of the electrode assembly 106 and constraint system 108. That is, the electrode assembly 106 can be understood as having a volume bounded by its exterior surfaces (i.e., the displacement volume), namely the volume enclosed by the first and second longitudinal end surfaces 116, 118 and the lateral surface 42 connecting the end surfaces. Portions of the constraint system 108 that are external to the electrode assembly 106 (i.e., external to the longitudinal end surfaces 116, 118 and the lateral surface), such as where first and second primary growth constraints 154, 156 are located at the longitudinal ends 117, 119 of the electrode assembly 106, and first and second secondary growth constraints 158, 160 are at the opposing ends of the lateral surface 142, the portions of the constrain system 108 similarly occupy a volume corresponding to the displacement volume of the constraint system portions. Accordingly, in one embodiment, the external portions of the set of electrode constraints 108, which can include external portions of the primary growth constraint system 151 (i.e., any of the first and second primary growth constraints 154, 156 and at least one primary connecting member that are external, or external portions thereof), as well as external portions of the secondary growth constraint system 152 (i.e., any of the first and second secondary growth constraints 158, 160 and at least one secondary connecting member that are external, or external portions thereof) occupies no more than 80% of the total combined volume of the electrode assembly 106 and external portion of the set of electrode constraints 108. By way of further example, in one embodiment the external portions of the set of electrode constraints occupies no more than 60% of the total combined volume of the electrode assembly 106 and the external portion of the set of electrode constraints. By way of yet a further example, in one embodiment the external portion of the set of electrode constraints 106 occupies no more than 40% of the total combined volume of the electrode assembly 106 and the external portion of the set of electrode constraints. By way of yet a further example, in one embodiment the external portion of the set of electrode constraints 106 occupies no more than 20% of the total combined volume of the electrode assembly 106 and the external portion of the set of electrode constraints. In yet another embodiment, the external portion of the primary growth constraint system 151 (i.e., any of the first and second primary growth constraints 154, 156 and at least one primary connecting member that are external, or external portions thereof) occupies no more than 40% of the total combined volume of the electrode assembly 106 and the external portion of the primary growth constraint system 151. By way of further example, in one embodiment the external portion of the primary growth constraint system 151 occupies no more than 30% of the total combined volume of the electrode assembly 106 and the external portion of the primary growth constraint system 151. By way of yet a further example, in one embodiment the external portion of the primary growth constraint system 151 occupies no more than 20% of the total combined volume of the electrode assembly 106 and the external portion of the primary growth constraint system 151. By way of yet a further example, in one embodiment the external portion of the primary growth constraint system 151 occupies no more than 10% of the total combined volume of the electrode assembly 106 and the external portion of the primary growth constraint system 151. In yet another embodiment, the external portion of the secondary growth constraint system 152 (i.e., any of the first and second secondary growth constraints 158, 160 and at least one secondary connecting member that are external, or external portions thereof) occupies no more than 40% of the total combined volume of the electrode assembly 106 and the external portion of the secondary growth constraint system 152. By way of further example, in one embodiment, the external portion of the secondary growth constraint system 152 occupies no more than 30% of the total combined volume of the electrode assembly 106 and the external portion of the secondary growth constraint system 152. By way of yet another example, in one embodiment, the external portion of the secondary growth constraint system 152 occupies no more than 20% of the total combined volume of the electrode assembly 106 and the external portion of the secondary growth constraint system 152. By way of yet another example, in one embodiment, the external portion of the secondary growth constraint system 152 occupies no more than 10% of the total combined volume of the electrode assembly 106 and the external portion of the secondary growth constraint system 152.

Figure 8A:
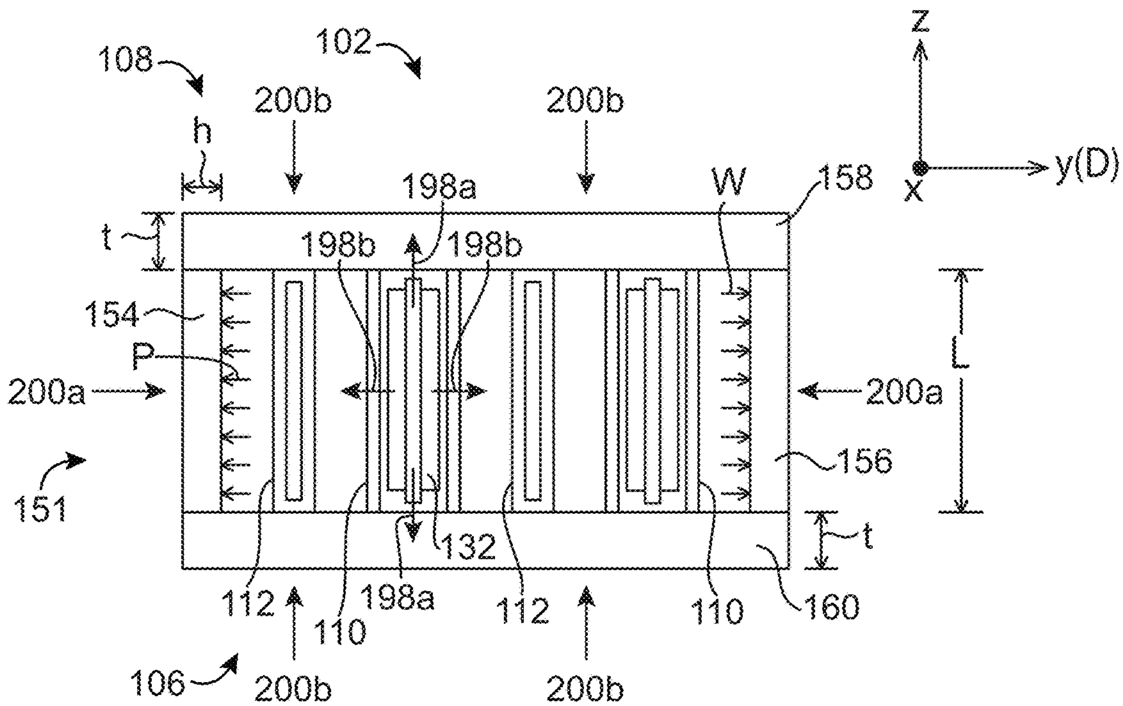
FIGS. 8A-8B illustrate a force schematics, according to one embodiment, showing the forces exerted on the electrode assembly by the set of electrode constraints, as well as the forces being exerted by electrode structures upon repeated cycling of a battery containing the electrode assembly.
Figure 8B:
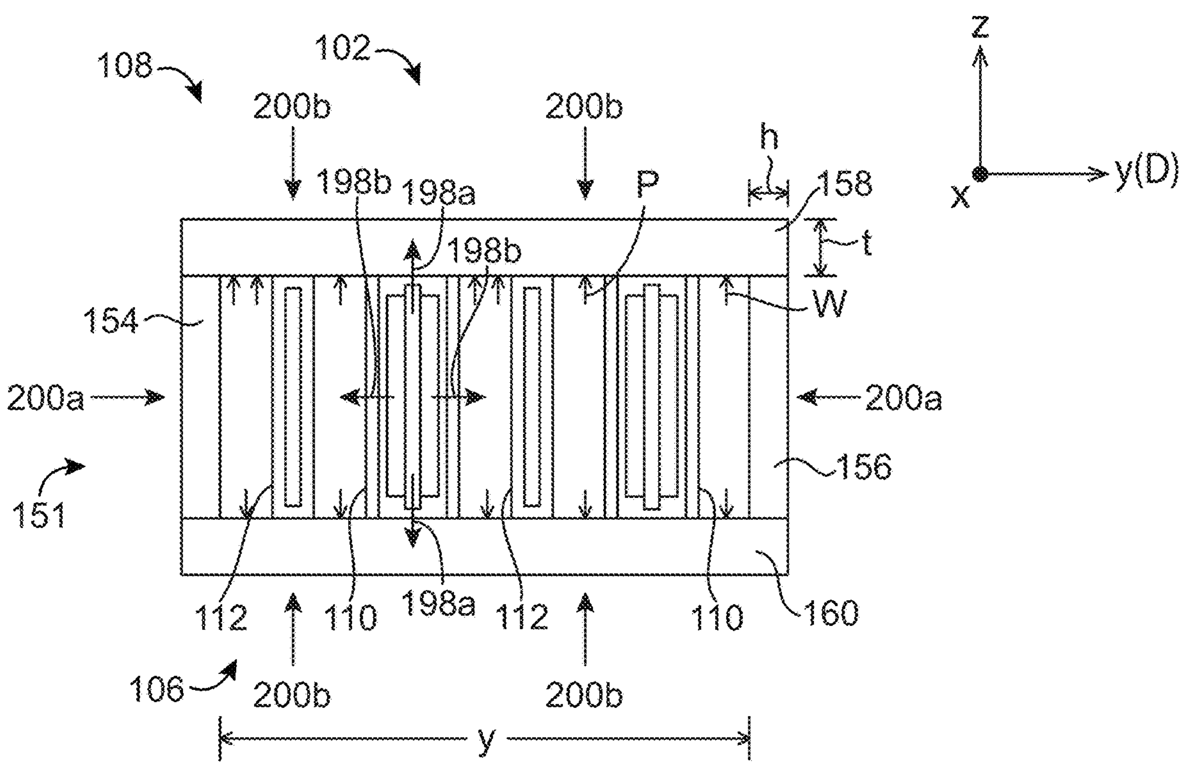

According to one embodiment, a rationale for the relatively low volume occupied by portions of the set of electrode constraints 108 can be understood by referring to the force schematics shown in FIGS. 8A and 8B. FIG. 8A depicts an embodiment showing the forces exerted on the first and second primary growth constraints 154, 156 upon cycling of the secondary battery 102, due to the increase in volume of the electrode active material layers 132. The arrows 198*b* depict the forces exerted by the electrode active material layers 132 upon expansion thereof, where w shows the load applied to the first and second primary growth constraints 154, 156, due to the growth of the electrode active material layers 132, and P shows the pressure applied to the first and second primary growth constraints 154, 156 as a result of the increase in volume of the electrode active material layers 132. Similarly, FIG. 8B depicts an embodiment showing the forces exerted on the first and second secondary growth constraints 158, 160 upon cycling of the secondary battery 102, due to the increase in volume of the electrode active material layers 132. The arrows 198*a* depict the forces exerted by the electrode active material layers 132 upon expansion thereof, where w shows the load applied to the first and second secondary growth constraints 158, 160, due to the growth of the electrode active material layers 132, and P shows the pressure applied to the first and second secondary growth constraints 158, 160 as a result of the increase in volume of the electrode active material layers 132. While the electrode active material expands isotropically (i.e., in all directions), during cycling of the secondary battery, and thus the pressure P in each direction is the same, the load w exerted in each direction is different. By way of explanation, referring to the embodiment depicted in FIGS. 8A and 8B, it can be understood that the load in the X-Z plane on a first or secondary primary growth constraint 154, 156 is proportional to $P \times L_{ES} \times H_{ES}$, where P is the pressure exerted due to the expansion of the electrode active material layers 132 on the primary growth constraints 154, 156, $L_{ES}$ is length of the electrode structures 110 in the transverse direction, and $H_{ES}$ is the height of the electrode structures 110 in the vertical direction. Similarly, the load in the X-Y plane on a first or second secondary growth constraint 158, 160 is proportional to $P \times L_{ES} \times W_{ES}$, where P is the pressure exerted due to the expansion of the electrode active material layers 132 on the secondary growth constraints 158, 160, $L_{ES}$ is length of the electrode structures 110 in the transverse direction, and $W_{ES}$ is the width of the electrode structures 110 in the longitudinal direction. In a case where a tertiary constraint system is provided, the load in the Y-Z plane on a first or secondary tertiary growth constraint 157, 159 is proportional to $P \times H_{ES} \times W_{ES}$, where P is the pressure exerted due to the expansion of the electrode active material layers 132 on the tertiary growth constraints 157, 159, $H_{ES}$ is height of the electrode structures 110 in the vertical direction, and $W_{ES}$ is the width of the electrode structures in the longitudinal direction. Accordingly, in a case where $L_{ES}$ is greater than both $W_{ES}$ and $H_{ES}$, the load in the Y-Z plane will be the least, and in a case where $H_{ES} > W_{ES}$, the load in the X-Y plane will be less than the load in the X-Z plane, meaning that the X-Z plane has the highest load to be accommodated among the orthogonal planes.

Furthermore, according to one embodiment, if a primary constraint is provided in the X-Z plane in a case where the load in that plane is the greatest, as opposed to providing a primary constraint in the X-Y plane, then the primary constraint in the X-Z plane may require a much lower volume that the primary constraint would be required to have if it were in the X-Y plane. This is because if the primary constraint were in the X-Y plane instead of the X-Z plane, then the constraint would be required to be much thicker in order to have the stiffness against growth that would be required. In particular, as is described herein in further detail below, as the distance between primary connecting members increases, the buckling deflection can also increase, and the stress also increases. For example, the equation governing the deflection due to bending of the primary growth constraints 154, 156 can be written as:

$$\delta=60wL^4/Eh^3$$

where w=total distributed load applied on the primary growth constraint 154, 156 due to the electrode expansion; L=distance between the primary connecting members 158, 160 along the vertical direction; E=elastic modulus of the primary growth constraints 154, 156, and h=thickness (width) of the primary growth constraints 154, 156. The stress on the primary growth constraints 154, 156 due to the expansion of the electrode active material 132 can be calculated using the following equation:

$$\sigma=3wL^2/4h^2$$

where w=total distributed load applied on the primary growth constraints 154, 156 due to the expansion of the electrode active material layers 132; L=distance between primary connecting members 158, 160 along the vertical direction; and h=thickness (width) of the primary growth constraints 154, 156. Thus, if the primary growth constraints were in the X-Y plane, and if the primary connecting members were much further apart (e.g., at longitudinal ends) than they would otherwise be if the primary constraint were in the X-Z plane, this can mean that the primary growth constraints would be required to be thicker and thus occupy a larger volume that they otherwise would if they were in the X-Z plane.

According to one embodiment, a projection of the members of the electrode and counter-electrode populations onto first and second longitudinal end surfaces 116, 118 circumscribes a first and second projected areas 2002*a*, 2002*b*. In general, first and second projected areas 2002*a*, 2002*b* will typically comprise a significant fraction of the surface area of the first and second longitudinal end surfaces 122, 124, respectively. For example, in one embodiment the first and second projected areas each comprise at least 50% of the surface area of the first and second longitudinal end surfaces, respectively. By way of further example, in one such embodiment the first and second projected areas each comprise at least 75% of the surface area of the first and second longitudinal end surfaces, respectively. By way of further example, in one such embodiment the first and second projected areas each comprise at least 90% of the surface area of the first and second longitudinal end surfaces, respectively.

In certain embodiments, the longitudinal end surfaces 116, 118 of the electrode assembly 106 will be under a significant compressive load. For example, in some embodiments, each of the longitudinal end surfaces 116, 118 of the electrode assembly 106 will be under a compressive load of at least 0.7 kPa (e.g., averaged over the total surface area of each of the longitudinal end surfaces, respectively). For example, in one embodiment, each of the longitudinal end surfaces 116, 118 of the electrode assembly 106 will be under a compressive load of at least 1.75 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 2.8 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 3.5 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 5.25 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 7 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 8.75 kPa (e.g., averaged over the total surface area of each of the longitudinal end surfaces, respectively). In general, however, the longitudinal end surfaces 116, 118 of the electrode assembly 106 will be under a compressive load of no more than about 10 kPa (e.g., averaged over the total surface area of each of the longitudinal end surfaces, respectively). The regions of the longitudinal end surface of the electrode assembly that are coincident with the projection of members of the electrode and counter-electrode populations onto the longitudinal end surfaces (i.e., the projected surface regions) may also be under the above compressive loads (as averaged over the total surface area of each projected surface region, respectively). In each of the foregoing exemplary embodiments, the longitudinal end surfaces 116, 118 of the electrode assembly 106 will experience such compressive loads when an energy storage device 100 having the electrode assembly 106 is charged to at least about 80% of its rated capacity.

According to one embodiment, the secondary growth constraint system 152 is capable of restraining growth of the electrode assembly 106 in the vertical direction (Z direction) by applying a restraining force at a predetermined value, and without excessive skew of the growth restraints. For example, in one embodiment, the secondary growth constraint system 152 may restrain growth of the electrode assembly 106 in the vertical direction by applying a restraining force to opposing vertical regions 148, 150 of greater than 1000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 5% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 3% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 1% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 in the vertical direction with less than 15% displacement at less than or equal to 10,000 psi and a skew of less than 0.2 mm/m after 50 battery cycles. By way of further example, in one embodiment, the secondary growth constraint system 152 may restrain growth of the electrode assembly 106 in the vertical direction by applying a restraining force to opposing vertical regions 148, 150 with less than 5% displacement at less than or equal to 10,000 psi and a skew of less than 0.2 mm/m after 150 battery cycles.

Figure 5:
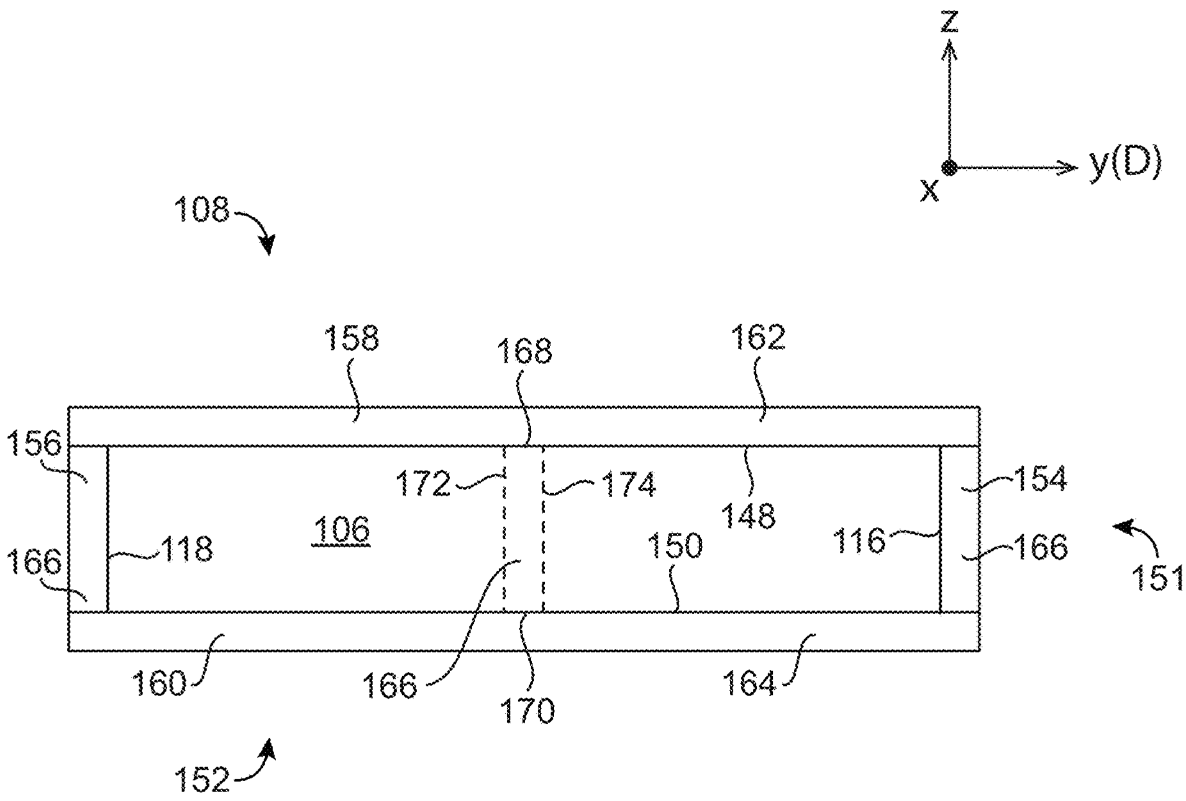
FIG. 5 illustrates a cross section of an embodiment of the electrode assembly taken along the line A-A1' as shown in FIG. 1A.

Referring now to FIG. 5, an embodiment of an electrode assembly 106 with a set of electrode constraints 108 is shown, with a cross-section taken along the line A-A' as shown in FIG. 1A. In the embodiment shown in FIG. 5, the primary growth constraint system 151 can comprise first and second primary growth constraints 154, 156, respectively, at the longitudinal end surfaces 116, 118 of the electrode assembly 106, and the secondary growth constraint system 152 comprises first and second secondary growth constraints 158, 160 at the opposing first and second surface regions 148, 150 of the lateral surface 142 of the electrode assembly 106. According to this embodiment, the first and second primary growth constraints 154, 156 can serve as the at least one secondary connecting member 166 to connect the first and second secondary growth constrains 158, 160 and maintain the growth constraints in tension with one another in the second direction (e.g., vertical direction) that is orthogonal to the longitudinal direction. However, additionally and/or alternatively, the secondary growth constraint system 152 can comprise at least one secondary connecting member 166 that is located at a region other than the longitudinal end surfaces 116, 118 of the electrode assembly 106. Also, the at least one secondary connecting member 166 can be understood to act as at least one of a first and second primary growth constraint 154, 156 that is internal to the longitudinal ends 116, 118 of the electrode assembly, and that can act in conjunction with either another internal primary growth restraint and/or a primary growth restraint at a longitudinal end 116, 118 of the electrode assembly 106 to restrain growth. Referring to the embodiment shown in FIG. 5, a secondary connecting member 166 can be provided that is spaced apart along the longitudinal axis away from the first and second longitudinal end surfaces 116, 118, respectively, of the electrode assembly 106, such as toward a central region of the electrode assembly 106. The secondary connecting member 166 can connect the first and second secondary growth constraints 158, 160, respectively, at an interior position from the electrode assembly end surfaces 116, 118, and may be under tension between the secondary growth constraints 158, 160 at that position. In one embodiment, the secondary connecting member 166 that connects the secondary growth constraints 158, 160 at an interior position from the end surfaces 116, 118 is provided in addition to one or more secondary connecting members 166 provided at the electrode assembly end surfaces 116, 118, such as the secondary connecting members 166 that also serve as primary growth constraints 154, 156 at the longitudinal end surfaces 116, 118. In another embodiment, the secondary growth constraint system 152 comprises one or more secondary connecting members 166 that connect with first and second secondary growth constraints 158, 160, respectively, at interior positions that are spaced apart from the longitudinal end surfaces 116, 118, with or without secondary connecting members 166 at the longitudinal end surfaces 116, 118. The interior secondary connecting members 166 can also be understood to act as first and second primary growth constraints 154, 156, according to one embodiment. For example, in one embodiment, at least one of the interior secondary connecting members 166 can comprise at least a portion of an electrode or counter electrode structure 110, 112, as described in further detail below.

More specifically, with respect to the embodiment shown in FIG. 5, secondary growth constraint system 152 may include a first secondary growth constraint 158 that overlies an upper region 148 of the lateral surface 142 of electrode assembly 106, and an opposing second secondary growth constraint 160 that overlies a lower region 150 of the lateral surface 142 of electrode assembly 106, the first and second secondary growth constraints 158, 160 being separated from each other in the vertical direction (i.e., along the Z-axis). Additionally, secondary growth constraint system 152 may further include at least one interior secondary connecting member 166 that is spaced apart from the longitudinal end surfaces 116, 118 of the electrode assembly 106. The interior secondary connecting member 166 may be aligned parallel to the Z axis and connects the first and second secondary growth constraints 158, 160, respectively, to maintain the growth constraints in tension with one another, and to form at least a portion of the secondary constraint system 152. In one embodiment, the at least one interior secondary connecting member 166, either alone or with secondary connecting members 166 located at the longitudinal end surfaces 116, 118 of the electrode assembly 106, may be under tension between the first and secondary growth constraints 158, 160 in the vertical direction (i.e., along the Z axis), during repeated charge and/or discharge of an energy storage device 100 or a secondary battery 102 having the electrode assembly 106, to reduce growth of the electrode assembly 106 in the vertical direction. Furthermore, in the embodiment as shown in FIG. 5, the set of electrode constraints 108 further comprises a primary growth constraint system 151 having first and second primary growth constraints 154, 156, respectively, at the longitudinal ends 117, 119 of the electrode assembly 106, that are connected by first and second primary connecting members 162, 164, respectively, at the upper and lower lateral surface regions 148, 150, respectively, of the electrode assembly 106. In one embodiment, the secondary interior connecting member 166 can itself be understood as acting in concert with one or more of the first and second primary growth constraints 154, 156, respectively, to exert a constraining pressure on each portion of the electrode assembly 106 lying in the longitudinal direction between the secondary interior connecting member 166 and the longitudinal ends 117, 119 of the electrode assembly 106 where the first and second primary growth constraints 154, 156, respectively, can be located.

In one embodiment, one or more of the primary growth constraint system 151 and secondary growth constraint system 152 includes first and secondary primary growth constraints 154, 156, respectively, and/or first and second secondary growth constraints 158, 160, respectively, that include a plurality of constraint members. That is, each of the primary growth constraints 154, 156 and/or secondary growth constraints 158, 160 may be a single unitary member, or a plurality of members may be used to make up one or more of the growth constraints. For example, in one embodiment, the first and second secondary growth constraints 158, 160, respectively, can comprise single constraint members extending along the upper and lower surface regions 148, 150, respectively, of the electrode assembly lateral surface 142. In another embodiment, the first and second secondary growth constraints 158, 160, respectively, comprise a plurality of members extending across the opposing surface regions 148, 150, of the lateral surface. Similarly, the primary growth constraints 154, 156 may also be made of a plurality of members, or can each comprise a single unitary member at each electrode assembly longitudinal end 117, 119. To maintain tension between each of the primary growth constraints 154, 156 and secondary growth constraints 158, 160, the connecting members (e.g., 162, 164, 165, 166) are provided to connect the one or plurality of members comprising the growth constraints to the opposing growth constraint members in a manner that exerts pressure on the electrode assembly 106 between the growth constraints.

In one embodiment, the at least one secondary connecting member 166 of the secondary growth constraint system 152 forms areas of contact 168, 170 with the first and second secondary growth constraints 158, 160, respectively, to maintain the growth constraints in tension with one another. The areas of contact 168, 170 are those areas where the surfaces at the ends 172, 174 of the at least one secondary connecting member 166 touches and/or contacts the first and second secondary growth constraints 158, 160, respectively, such as where a surface of an end of the at least one secondary connecting member 166 is adhered or glued to the first and second secondary growth constraints 158, 160, respectively. The areas of contact 168, 170 may be at each end 172, 174 and may extend across a surface area of the first and second secondary growth constraints 158, 160, to provide good contact therebetween. The areas of contact 168, 170 provide contact in the longitudinal direction (Y axis) between the second connecting member 166 and the growth constraints 158, 160, and the areas of contact 168, 170 can also extend into the transverse direction (X-axis) to provide good contact and connection to maintain the first and second secondary growth constraints 158, 160 in tension with one another. In one embodiment, the areas of contact 168, 170 provide a ratio of the total area of contact (e.g., the sum of all areas 168, and the sum of all areas 170) of the one or more secondary connecting members 166 in the longitudinal direction (Y axis) with the growth constraints 158, 160, per $W_{EA}$ of the electrode assembly 106 in the longitudinal direction that is at least 1%. For example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction is at least 2%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 5%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 10%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 25%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 50%. In general, a ratio of the total area of contact of the one or more secondary connecting members 166 in the longitudinal direction (Y axis) with the growth constraints 158, 160, per $W_{EA}$ of the electrode assembly 106 in the longitudinal direction, will be less than 100%, such as less than 90%, and even less than 75%, as the one or more connecting members 166 typically do not have an area of contact 168, 170 that extends across the entire longitudinal axis. However, in one embodiment, an area of contact 168, 170 of the secondary connecting members 166 with the growth constraints 158, 160, may extend across a significant portion of the transverse axis (X axis), and may even extend across the entire $L_{EA}$ of the electrode assembly 106 in the transverse direction. For example, a ratio of the total area of contact (e.g., the sum of all areas 168, and the sum of all areas 170) of the one or more secondary connecting members 166 in the transverse direction (X axis) with the growth constraints 158, 160, per $L_{EA}$ of the electrode assembly 106 in the transverse direction, may be at least about 50%. By way of further example, a ratio of the total area of contact of the one or more secondary connecting members 166 in the transverse direction (X axis) with the growth constraints 158, 160, per $L_{EA}$ of the electrode assembly 106 in the transverse direction (X-axis), may be at least about 75%. By way of further example, a ratio of the total area of contact of the one or more secondary connecting members 166 in the transverse direction (X axis) with the growth constraints 158, 160, per $L_{EA}$ of the electrode assembly 106 in the transverse direction (X axis), may be at least about 90%. By way of further example, a ratio of the total area of contact of the one or more secondary connecting members 166 in the transverse direction (X axis) with the growth constraints 158, 160, per $L_{EA}$ of the electrode assembly 106 in the transverse direction (X axis), may be at least about 95%.

According to one embodiment, the areas of contact 168, 170 between the one or more secondary connecting members 166 and the first and second secondary growth constraints 158, 160, respectively, are sufficiently large to provide for adequate hold and tension between the growth constraints 158, 160 during cycling of an energy storage device 100 or a secondary battery 102 having the electrode assembly 106. For example, the areas of contact 168, 170 may form an area of contact with each growth constraint 158, 160 that makes up at least 2% of the surface area of the lateral surface 142 of the electrode assembly 106, such as at least 10% of the surface area of the lateral surface 142 of the electrode assembly 106, and even at least 20% of the surface area of the lateral surface 142 of the electrode assembly 106. By way of further example, the areas of contact 168, 170 may form an area of contact with each growth constraint 158, 160 that makes up at least 35% of the surface area of the lateral surface 142 of the electrode assembly 106, and even at least 40% of the surface area of the lateral surface 142 of the electrode assembly 106. For example, for an electrode assembly 106 having upper and lower opposing surface regions 148, 150, respectively, the at least one secondary connecting member 166 may form areas of contact 168, 170 with the growth constraints 158, 160 along at least 5% of the surface area of the upper and lower opposing surface regions 148, 150, respectively, such as along at least 10% of the surface area of the upper and lower opposing surface regions 148, 150, respectively, and even at least 20% of the surface area of the upper and lower opposing surface regions 148, 150, respectively. By way of further example, an electrode assembly 106 having upper and lower opposing surface regions 148, 150, respectively, the at least one secondary connecting member 166 may form areas of contact 168, 170 with the growth constraints 158, 160 along at least 40% of the surface area of the upper and lower opposing surface regions 148, 150, respectively, such as along at least 50% of the surface area of the upper and lower opposing surface regions 148, 150, respectively. By forming a contact between the at least one connecting member 166 and the growth constraints 158, 160 that makes up a minimum surface area relative to a total surface area of the electrode assembly 106, proper tension between the growth constraints 158, 160 can be provided. Furthermore, according to one embodiment, the areas of contact 168, 170 can be provided by a single secondary connecting member 166, or the total area of contact may be the sum of multiple areas of contact 168, 170 provided by a plurality of secondary connecting members 166, such as one or a plurality of secondary connecting members 166 located at longitudinal ends 117, 119 of the electrode assembly 106, and/or one or a plurality of interior secondary connecting members 166 that are spaced apart from the longitudinal ends 117, 119 of the electrode assembly 106.

Further still, in one embodiment, the primary and secondary growth constraint systems 151, 152, respectively, (and optionally the tertiary growth constraint system) are capable of restraining growth of the electrode assembly 106 in both the longitudinal direction and the second direction orthogonal to the longitudinal direction, such as the vertical direction (Z axis) (and optionally in the third direction, such as along the X axis), to restrain a volume growth % of the electrode assembly.

Figure 6A:
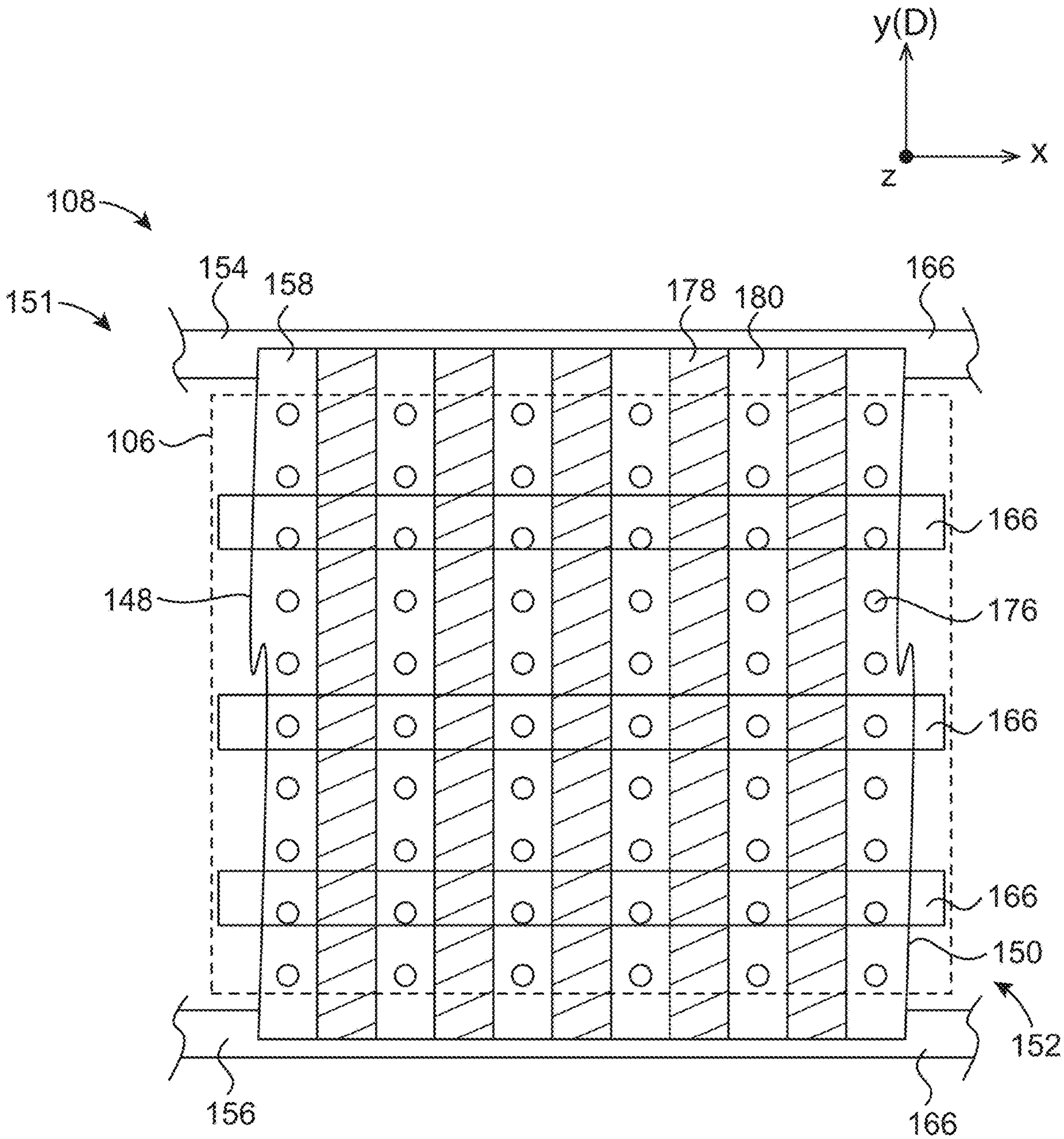
FIG. 6A illustrates one embodiment of a top view of a porous secondary growth constraint over an electrode assembly, and one embodiment for adhering the secondary growth constraint to the electrode assembly.

In certain embodiments, one or more of the primary and secondary growth constraint systems 151, 152, respectively, comprises a member having pores therein, such as a member made of a porous material. For example, referring to FIG. 6A depicting a top view of a secondary growth constraint 158 over an electrode assembly 106, the secondary growth constraint 158 can comprise pores 176 that permit electrolyte to pass therethrough, so as to access an electrode assembly 106 that is at least partially covered by the secondary growth constraint 158. In one embodiment, the first and second secondary growth constraints 158, 160, respectively, have the pores 176 therein. In another embodiment, each of the first and second primary growth constraints 154, 156, respectively, and the first and second secondary growth constraints 158, 160, respectively, have the pores 176 therein. In yet another embodiment, only one or only a portion of the first and second secondary growth constraints 158, 160, respectively, contain the pores therein. In yet a further embodiment, one or more of the first and second primary connecting members 162, 164, respectively, and the at least one secondary connecting member 166 contains pores therein. Providing the pores 176 may be advantageous, for example, when the energy storage device 100 or secondary battery 102 contains a plurality of electrode assemblies 106 stacked together in the battery enclosure 104, to permit electrolyte to flow between the different electrode assemblies 106 in, for example, the secondary battery 102 as shown in the embodiment depicted in FIG. 20. For example, in one embodiment, a porous member making up at least a portion of the primary and secondary growth constraint system 151, 152, respectively, may have a void fraction of at least 0.25. By way of further example, in some embodiments, a porous member making up at least a portion of the primary and secondary growth constraint systems 151, 152, respectively, may have a void fraction of at least 0.375. By way of further example, in some embodiments, a porous member making up at least a portion of the primary and secondary growth constraint systems 151, 152, respectively, may have a void fraction of at least 0.5. By way of further example, in some embodiments, a porous member making up at least a portion of the primary and secondary growth constraint systems 151, 152, respectively, may have a void fraction of at least 0.625. By way of further example, in some embodiments, a porous member making up at least a portion of the primary and secondary growth constraint systems 151, 152, respectively, may have a void fraction of at least 0.75.

In one embodiment, the set of electrode constraints 108 may be assembled and secured to restrain growth of the electrode assembly 106 by at least one of adhering, bonding, and/or gluing components of the primary growth constraint system 151 to components of the secondary growth constraint system 152. For example, components of the primary growth constraint system 151 may be glued, welded, bonded, or otherwise adhered and secured to components of the secondary growth constraint system 152. For example, as shown in FIG. 4A, the first and second primary growth constraints 154, 156, respectively, can be adhered to first and second primary connecting members 162, 164, respectively, that may also serve as first and second secondary growth constraints 158, 160, respectively. Conversely, the first and second secondary growth constraints 158, 150, respectively, can be adhered to at least one secondary connecting member 166 that serves as at least one of the first and second primary growth constraints 154, 156, respectively, such as growth constraints at the longitudinal ends 117, 119 of the electrode assembly 106. Referring to FIG. 5, the first and second secondary growth constraints 158, 160, respectively, can also be adhered to at least one secondary connecting member 166 that is an interior connecting member 166 spaced apart from the longitudinal ends 117, 119. In one embodiment, by securing portions of the primary and secondary growth constraint systems 151, 152, respectively, to one another, the cooperative restraint of the electrode assembly 106 growth can be provided.

FIGS. 6A-6D illustrate embodiments for securing one or more of the first and second secondary growth constraints 158, 160, respectively, to one or more secondary connecting members 166. FIGS. 6A-6D provide a top view of an embodiment of the electrode assembly 106 having the first secondary growth constraint 158 over an upper surface region 148 of the lateral surface 142 of the electrode assembly 106. Also shown are first and second primary growth constraints 154, 156, respectively, spaced apart along a longitudinal axis (Y axis). A secondary connecting member 166 which may correspond to at least a part of an electrode structure 110 and/or counter electrode structure 112 is also shown. In the embodiment as shown, the first secondary growth constraint 158 has pores 176 therein to allow electrolyte and carrier ions to reach the electrode 110 and counter-electrode 112 structures. As described above, in certain embodiments, the first and second primary growth constraints 154, 156, respectively, can serve as the at least one secondary connecting member 166 to connect the first and second secondary growth constraints 158, 160, respectively. Thus, in the version as shown, the first and second secondary growth constraints 158, 160, respectively, can be connected at the periphery of the electrode assembly 106 to the first and second primary growth constraints 154, 156, respectively. However, in one embodiment, the first and second secondary growth constraints 158, 160, respectively, can also be connected via a secondary connecting member 166 that is an interior secondary connecting member 166. In the version as shown, the first secondary growth constraint 158 comprises bonded regions 178 where the growth constraint 158 is bonded to an underlying interior secondary connecting member 166, and further comprises non-bonded regions 180 where the growth constraint 158 is not bonded to an underlying secondary connecting member 166, so as to provide areas of contact 168 between the growth constraint 158 and underlying secondary connecting member 166 in the form of columns of bonded regions 178 that alternate with areas of non-bonded regions 180. In one embodiment, the non-bonded regions 180 further contain open pores 176 where electrolyte and carrier ions can pass. According to one embodiment, the first and second secondary growth constraints 158, 160, respectively, are adhered to a secondary connecting member 166 that comprises at least a portion of an electrode 110 or counter electrode 112 structure, or other interior structure of the electrode assembly 106. The first and second secondary growth constraints 158, 160, respectively, in one embodiment, can be adhered to the top and bottom ends of the counter-electrode structures 112 or electrode structures 110, other interior structures forming the secondary connecting member 166, to form columns of adhered areas 178 corresponding to where the constraint is adhered to an electrode structure 110 and/or counter-electrode 112 or other interior structure, and columns of non-adhered areas 180 between the counter-electrode 112 or other interior structures. Furthermore, the first and second secondary growth constraints 158, 160, respectively, may be bonded or adhered to the electrode structure 110 and/or counter-electrode structure 112 or other structure forming the at least one secondary connecting member 166 such that pores 176 remain open at least in the non-bonded areas 180, and may also be adhered such that pores 176 in the bonded regions 178 can remain relatively open to allow electrolyte and carrier ions to pass therethrough.

Figure 6B:
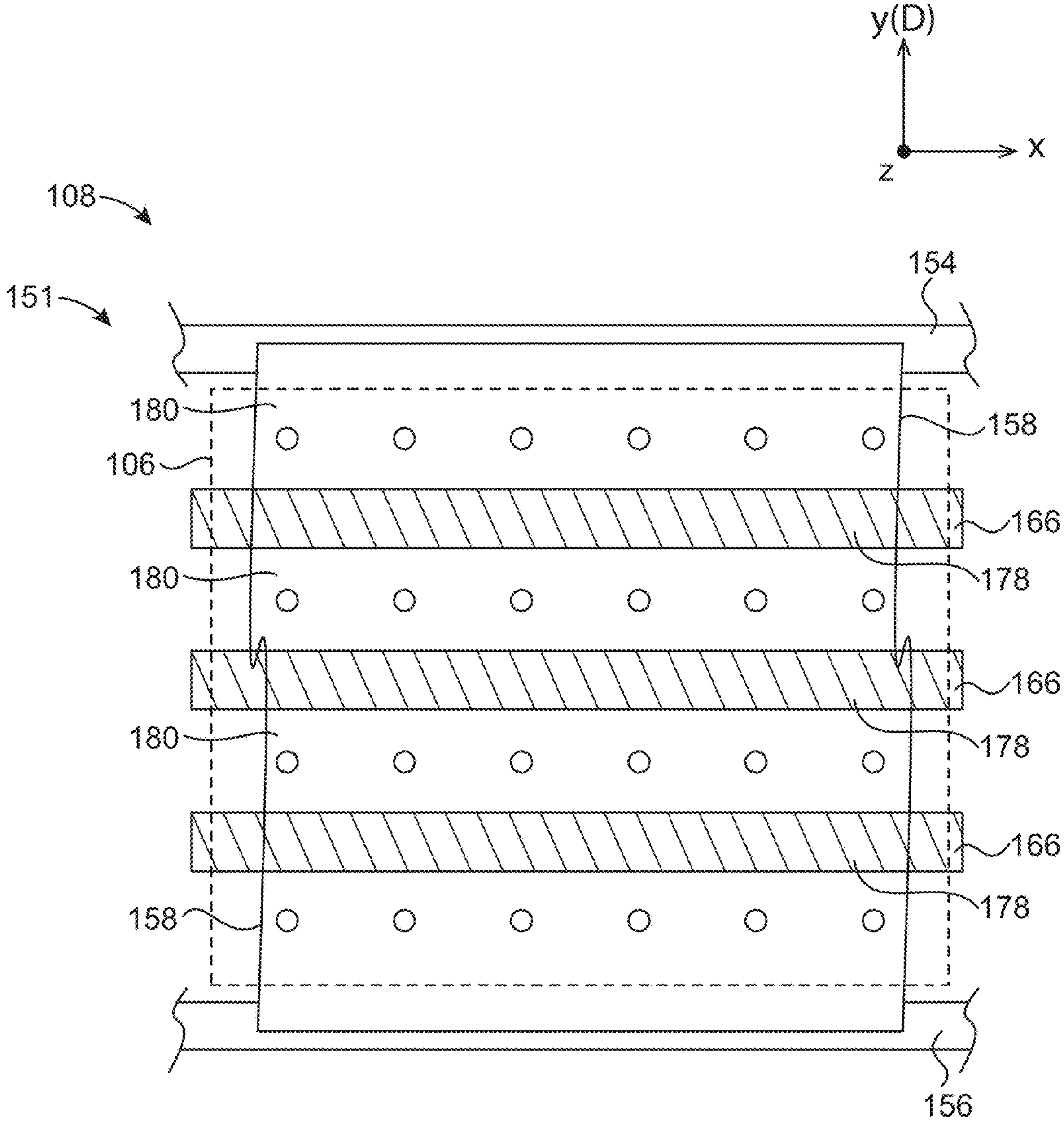
FIG. 6B illustrates one embodiment of a top view of a porous secondary growth constraint over an electrode assembly, and another embodiment for adhering the secondary growth constraint to the electrode assembly.

In yet another embodiment as shown in FIG. 6B, the first and second secondary growth constraints 158, 160, respectively, are connected at the periphery of the electrode assembly 106 to the first and second primary growth constraints 154, 156, respectively, and may also be connected via a secondary connecting member 166 that is an interior secondary connecting member 166. In the version as shown, the first secondary growth constraint 158 comprises bonded regions 178 where the growth constraint 158 is bonded to an underlying interior secondary connecting member 166, and further comprises non-bonded regions 180 where the growth constraint 158 is not bonded to an underlying secondary connecting member 166, so as to provide areas of contact 168 between the growth constraint 158 and underlying secondary connecting member 166 in the form of rows of bonded regions 178 that alternate with areas of non-bonded regions 180. These bonded and non-bonded regions 178, 180, respectively, in this embodiment can extend across a dimension of the secondary connecting member 166, which may be in the transverse direction (X axis) as shown in FIG. 6B, as opposed to in the longitudinal direction (Y axis) as in FIG. 6A. Alternatively, the bonded and non-bonded regions 178, 180, respectively, can extend across both longitudinal and transverse directions in a predetermined pattern. In one embodiment, the non-bonded regions 180 further contain open pores 176 where electrolyte and carrier ions can pass. The first and second secondary growth constraints 158, 160, respectively, can in one embodiment, be adhered to the top and bottom ends of the counter-electrode structures 112 or other interior structures forming the secondary connecting member 166, to form rows of adhered areas 178 corresponding to where the growth constraint is adhered to an electrode structure 110 and/or counter-electrode 112 or other interior structure, and areas of non-adhered areas 180 between the electrode structure 110 and/or counter-electrode 112 or other interior structures. Furthermore, the first and second secondary growth constraints 158, 160, respectively, may be bonded or adhered to the electrode structure 110 and/or counter-electrode structure 112 or other structure forming the at least one secondary connecting member 166 such that pores 176 remain open at least in the non-bonded areas 180, and may also be adhered such that pores 176 in the bonded regions 178 can remain relatively open to allow electrolyte and carrier ions to pass therethrough.

Figure 6C:
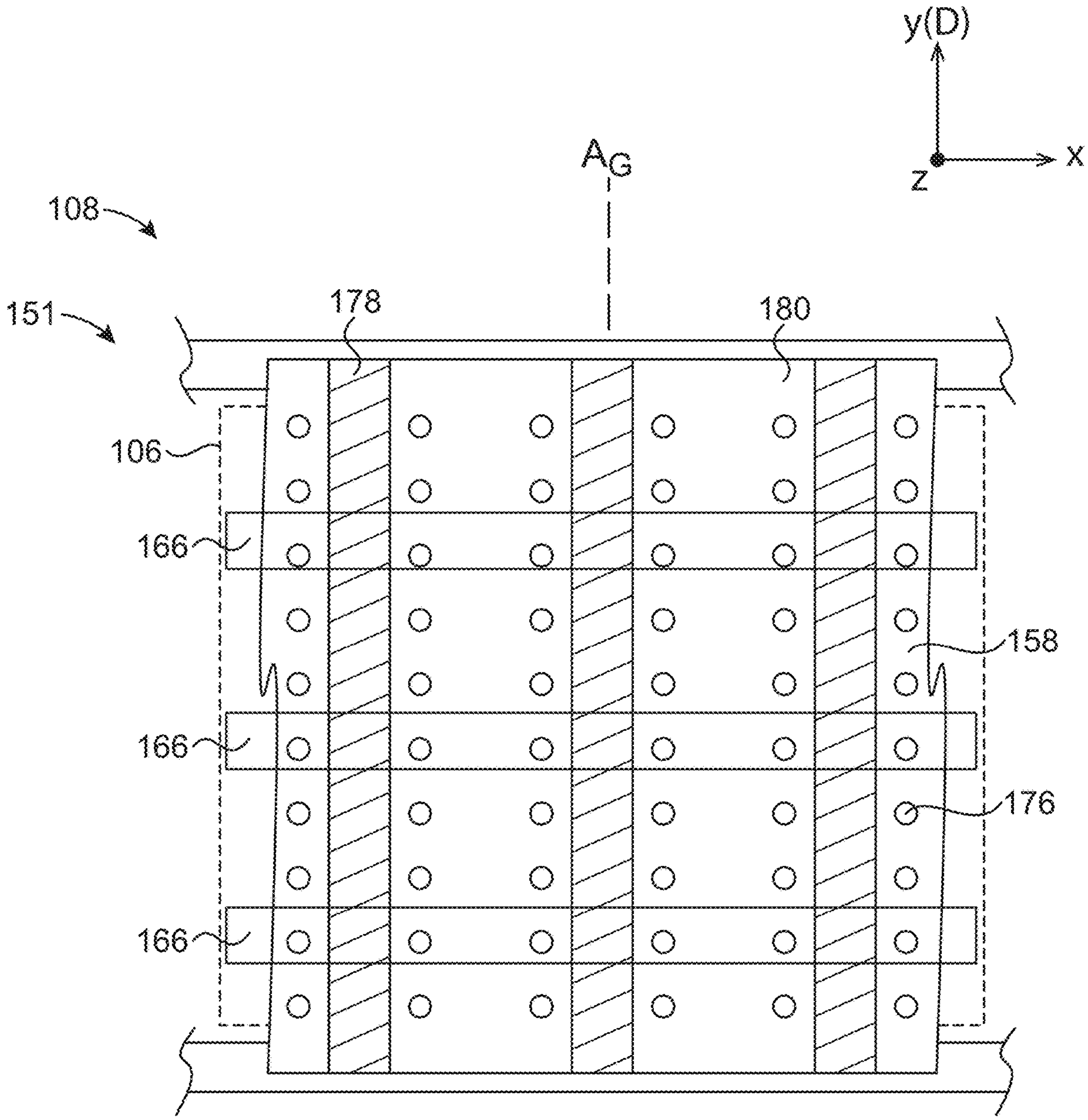
FIG. 6C illustrates one embodiment of a top view of a porous secondary growth constraint over an electrode assembly, and yet another embodiment for adhering the secondary growth constraint to the electrode assembly.

In yet another embodiment as shown in FIG. 6C, an alternative configuration for connection of the first and second secondary growth constraint members 158, 160, respectively, to the at least one secondary connecting member 166 is shown. More specifically, the bonded and non-bonded regions 178, 180, respectively, of the secondary growth constraints 158, 160 are shown to be symmetric about an axis of adhesion $A_G$ located towards the center of the electrode assembly 106 in the longitudinal direction (Y axis). As shown in this embodiment, the first and second secondary growth constraints 158, 160, respectively, are attached to the ends of secondary connecting members 166 that comprise an electrode 110, counter-electrode 112, or other interior electrode assembly structure, but the columns of bonded and non-bonded areas are not of equal size. That is, the growth constraints 158, 160 can be selectively bonded to interior secondary connecting members 166 in an alternating or other sequence, such that the amount of non-bonded area 180 exceeds the amount of bonded area 178, for example, to provide for adequate numbers of pores 176 open for passage of electrolyte therethrough. That is, the first and second secondary growth constraints 158, 160, respectively, may be bonded to every other counter-electrode 112 or other interior structure making up the secondary connecting members 166, or to one of every 1+n structures (e.g., counter-electrodes 112), according to an area of the bonded to non-bonded region to be provided.

Figure 6D:
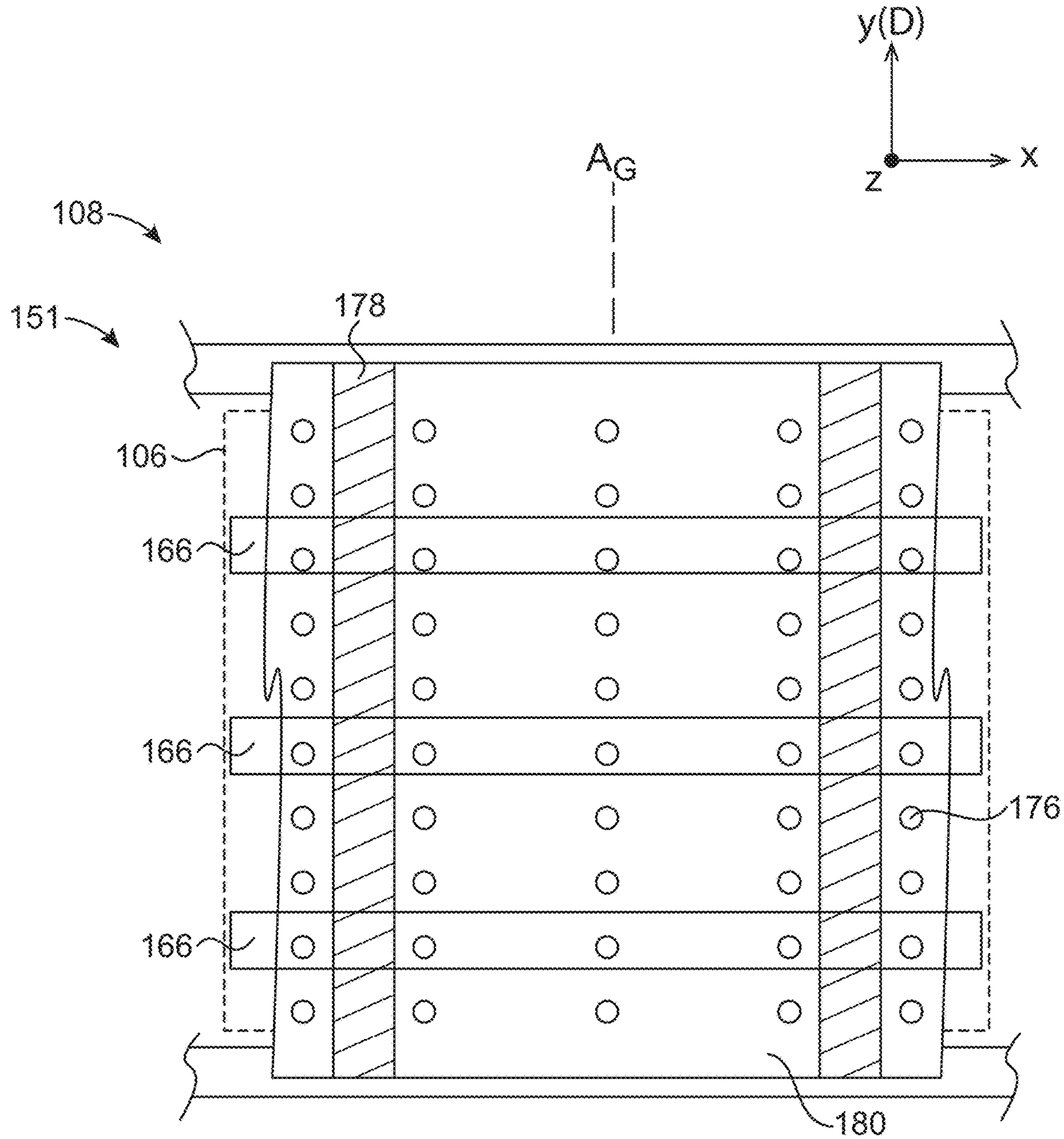
FIG. 6D illustrates one embodiment of a top view of a porous secondary growth constraint over and electrode assembly, and still yet another embodiment for adhering the secondary growth constraint to the electrode assembly.

FIG. 6D illustrates yet another embodiment of an alternative configuration for connection of the first and second secondary growth constraint members 158, 160, respectively, to the at least one secondary connecting member 166. In this version, the bonded and non-bonded regions 178, 180, respectively, of the first and second secondary growth constraints 158, 160, respectively, form an asymmetric pattern of columns about the axis of adhesion $A_G$. That is, the first and second secondary growth constraints 158, 160, respectively, can be adhered to the secondary connecting member 166 corresponding to the electrode 110 or counter-electrode 112 structure or other internal structure in a pattern that is non-symmetric, such as by skipping adhesion to interior structures according to a random or other non-symmetric pattern. In the pattern in the embodiment as shown, the bonded and non-bonded regions 178, 180, respectively, form alternating columns with different widths that are not symmetric about the axis of adhesion $A_G$. Furthermore, while an axis of adhesion $A_G$ is shown herein as lying in a longitudinal direction (Y axis), the axis of adhesion $A_G$ may also lie along the transverse direction (X axis), or there may be two axes of adhesion along the longitudinal and transverse directions, about which the patterns of the bonded and non-bonded regions 178, 180, respectively, can be formed. Similarly, for each pattern described and/or shown with respect to FIGS. 6A-6D, it is understood that a pattern shown along the longitudinal direction (Y axis) could instead be formed along the transverse direction (X axis), or vice versa, or a combination of patterns in both directions can be formed.

In one embodiment, an area of a bonded region 178 of the first or second secondary growth constraints 158, 160, respectively, along any secondary connecting member 166, and/or along at least one of the first or second primary growth constraints 154, 156, respectively, to a total area of the bonded and non-bonded regions along the constraint, is at least 50%, such as at least 75%, and even at least 90%, such as 100%. In another embodiment, the first and second secondary growth constraints 158, 160, 10) respectively, can be adhered to a secondary connecting member 166 corresponding to an electrode 110 or counter-electrode 112 structure or other interior structure of the electrode assembly 106 in such a way that the pores 176 in the bonded regions 178 remain open. That is, the first and second secondary growth constraints 158, 160, respectively, can be bonded to the secondary connecting member 166 such that the pores 176 in the growth constraints are not occluded by any adhesive or other means used to adhere the growth constraint(s) to the connecting member(s). According to one embodiment, the first and second secondary growth constraints 158, 160, respectively, are connected to the at least one secondary connecting members 166 to provide an open area having the pores 176 of at least 5% of the area of the growth constraints 158, 160, and even an open area having the pores 176 of at least 10% of the area of the growth constraints 158, 160, and even an open area having the pores 176 of at least 25% of the area of the growth constraints 158, 160, such as an open area having the pores 176 of at least 50% of the area of the growth constraints 158, 160.

While the embodiments described above may be characterized with the pores 176 aligned as columns along the Y axis, it will be appreciated by those of skill in the art that the pores 176 may be characterized as being oriented in rows along the X axis in FIGS. 6A-6D, as well, and the adhesive or other means of adhesion may be applied horizontally or along the X axis to assemble the set of electrode constraints 108. Furthermore, the adhesive or other bonding means may be applied to yield mesh-like air pores 176. Further, the axis of adhesion AG, as described above, may also be oriented horizontally, or along the X axis, to provide analogous symmetric and asymmetric adhesion and/or bonding patterns.

Further, while the pores 176 and non-bonded regions 180 have been described above as being aligned in columns along the Y axis and in rows along the X axis (i.e., in a linear fashion), it has been further contemplated that the pores 176 and/or non-bonded regions 180 may be arranged in a non-linear fashion. For example, in certain embodiments, the pores 176 may be distributed throughout the surface of the first and second secondary growth constraints 158, 160, respectively, in a non-organized or random fashion. Accordingly, in one embodiment, adhesive or other adhesion means may be applied in any fashion, so long as the resulting structure has adequate pores 176 that are not excessively occluded, and contains the non-bonded regions 180 having the non-occluded pores 176.

Secondary Constraint System Sub-Architecture

According to one embodiment, as discussed above, one or more of the first and second secondary growth constraints 158, 160, respectively, can be connected together via a secondary connecting member 166 that is a part of an interior structure of the electrode assembly 106, such as a part of an electrode 110 and/or counter-electrode structure 112. In one embodiment, by providing connection between the constraints via structures within the electrode assembly 106, a tightly constrained structure can be realized that adequately compensates for strain produced by growth of the electrode structure 110. For example, in one embodiment, the first and second secondary growth constraints 158, 160, respectively, may constrain growth in a direction orthogonal to the longitudinal direction, such as the vertical direction, by being placed in tension with one another via connection through a connecting member 166 that is a part of an electrode 110 or counter-electrode structure 112. In yet a further embodiment, growth of an electrode structure 110 (e.g., an anode structure) can be countered by connection of the secondary growth constraints 158, 160 through an electrode structure 110 (e.g., negative electrode current collector layer) that serves as the secondary connecting member 166. In yet a further embodiment, growth of an electrode structure 110 (e.g., an anode structure) can be countered by connection of the secondary growth constraints 158, 160 through a counter-electrode structure 112 (e.g., positive electrode current collector layer) that serves as the secondary connecting member 166.

In general, in certain embodiments, components of the primary growth constraint system 151 and the secondary growth constraint system 152 may be attached to the electrode 110 and/or counter-electrode structures 112, respectively, within an electrode assembly 106, and components of the secondary growth constraint system 152 may also be embodied as the electrode 110 and/or counter-electrode structures 112, respectively, within an electrode assembly 106, not only to provide effective restraint but also to more efficiently utilize the volume of the electrode assembly 106 without excessively increasing the size of an energy storage device 110 or a secondary battery 102 having the electrode assembly 106. For example, in one embodiment, the primary growth constraint system 151 and/or secondary growth constraint system 152 may be attached to one or more electrode structures 110. By way of further example, in one embodiment, the primary growth constraint system 151 and/or secondary growth constraint system 152 may be attached to one or more counter-electrode structures 112. By way of further example, in certain embodiments, the at least one secondary connecting member 166 may be embodied as the population of electrode structures 110. By way of further example, in certain embodiments, the at least one secondary connecting member 166 may be embodied as the population of counter-electrode structures 112.

Referring now to FIG. 7, a Cartesian coordinate system is shown for reference having a vertical axis (Z axis), a longitudinal axis (Y axis), and a transverse axis (X axis); wherein the X axis is oriented as coming out of the plane of the page; and a designation of the stacking direction D, as described above, co-parallel with the Y axis. More specifically, FIG. 7 shows a cross section, along the line A-A' as in FIG. 1A, of a set of electrode constraints 108, including one embodiment of both a primary growth constraint system 151 and one embodiment of a secondary growth constraint system 152. Primary growth constraint system 151 includes a first primary growth constraint 154 and a second primary growth constraint 156, as described above, and a first primary connecting member 162 and a second primary connecting member 164, as described above. Secondary growth constraint system 152 includes a first secondary growth constraint 158, a second secondary growth constraint 160, and at least one secondary connecting member 166 embodied as the population of electrode structures 110 and/or the population of counter-electrode structures 112;

therefore, in this embodiment, the at least one secondary connecting member 166, electrode structures 110, and/or counter-electrode structures 112 can be understood to be interchangeable. Furthermore, the separator 130 may also form a portion of a secondary connecting member 166. Further, in this embodiment, first primary connecting member 162 and first secondary growth constraint 158 are interchangeable, as described above. Further still, in this embodiment, second primary connecting member 164 and second secondary growth constraint 160 are interchangeable, as described above. More specifically, illustrated in FIG. 7 is one embodiment of a flush connection of the secondary connecting member 166 corresponding to the electrode 110 or counter-electrode structure 112 with the first secondary growth constraint 158 and second secondary growth constraint 160. The flush connection may further include a layer of glue 182 between the first secondary growth constraint 158 and secondary connecting member 166, and a layer of glue 182 between the second secondary growth constraint 160 and secondary connecting member 166. The layers of glue 182 affix first secondary growth constraint 158 to secondary connecting members 166, and affix the second secondary growth constraint 160 to secondary connecting member 166.

Figure 10:
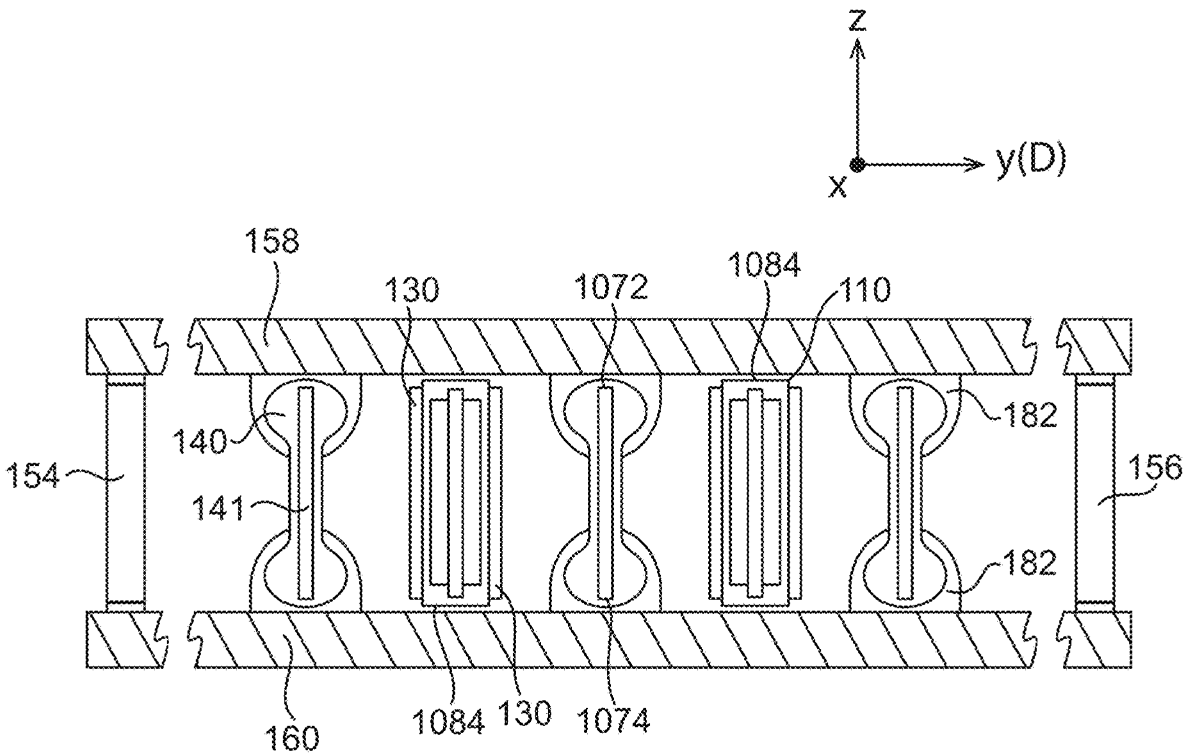
FIG. 10 illustrates a cross-section of an embodiment of the electrode assembly taken along the line A-A' as shown in FIG. 1A, further including a set of electrode constraints, including still yet another embodiment of a primary growth constraint system and still yet another embodiment of a secondary growth constraint system where the counter-electrode current collectors are used for assembling the set of electrode constraints.

Also, one or more of the first and second primary growth constraints 154, 156, first and second primary connecting members 162, 164, first and second secondary growth constraints 158, 160, and at least one secondary connecting member 166 may be provided in the form of a plurality of segments 1088 or parts that can be joined together to form a single member. For example, as shown in the embodiment as illustrated in FIG. 10) 7, a first secondary growth constraint 158 is provided in the form of a main middle segment 1088*a* and first and second end segments 1088*b* located towards the longitudinal ends 117, 119 of the electrode assembly 106, with the middle segment 1088*a* being connected to each first and second end segment 1088*b* by a connecting portion 1089 provided to connect the segments 1088, such as notches formed in the segments 1088 that can be interconnected to join the segments 1088 to one another. A second secondary growth constraint 160 may similarly be provided in the form of a plurality of segments 1088 that can be connected together to form the constraint, as shown in FIG. 7. In one embodiment, one or more of the secondary growth constraints 158, 160, at least one primary connecting member 162, and/or at least one secondary connecting member 166 may also be provided in the form of a plurality of segments 1088 that can be connected together via a connecting portions such as notches to form the complete member. According to one embodiment, the connection of the segments 1088 together via the notch or other connecting portion may provide for pre-tensioning of the member formed of the plurality of segments when the segments are connected.

Further illustrated in FIG. 7, in one embodiment, are members of the electrode population 110 having an electrode active material layer 132, an ionically porous electrode current collector 136, and an electrode backbone 134 that supports the electrode active material layer 132 and the electrode current collector 136. Similarly, in one embodiment, illustrated in FIG. 7 are members of the counter-electrode population 112 having a counter-electrode active material layer 138, a counter-electrode current collector 140, and a counter-electrode backbone 141 that supports the counter-electrode active material layer 138 and the counter-electrode current collector 140.

In certain embodiments (e.g., as in FIG. 7), members of the electrode population 110 include an electrode active material layer 132, an electrode current collector 136, and an electrode backbone 134 that supports the electrode active material layer 132 and the electrode current collector 136. In another embodiment, as shown in FIG. 1B, the members of the electrode population 110 include electrode active material layers 132, and an electrode current collector 136 disposed in between adjacent electrode active material layers 132. Similarly, in certain embodiments (e.g., in FIG. 7), members of the counter-electrode population 112 include a counter-electrode active material layer 138, a counter-electrode current collector 140, and a counter-electrode backbone 141 that supports the counter-electrode active material layer 138 and the counter-electrode current collector 140. In another embodiment, as shown in FIG. 1B, the members of the counter-electrode population 112 include counter-electrode active material layers 138, and counter-electrode current collector 140 disposed in between adjacent electrode active material layers 138.

While members of the electrode population 110 have been illustrated and described herein (in FIG. 7) to include the electrode active material layer 132 being directly adjacent to the electrode backbone 134, and the electrode current collector 136 directly adjacent to and effectively surrounding the electrode backbone 134 and the electrode active material layer 132, those of skill in the art will appreciate other arrangements of the electrode population 110 have been contemplated. For example, in one embodiment (not shown), the electrode population 110 may include the electrode active material layer 132 being directly adjacent to the electrode current collector 136, and the electrode current collector 136 being directly adjacent to the electrode backbone 134. Stated alternatively, the electrode backbone 134 may be effectively surrounded by the electrode current collector 136, with the electrode active material layer 132 flanking and being directly adjacent to the electrode current collector 136. In another embodiment, as shown in FIG. 1B, the members of the electrode population 110 include electrode active material layers 132, and an electrode current collector 136 disposed in between adjacent electrode active material layers 132. As will be appreciated by those of skill in the art, any suitable configuration of the electrode population 110 and/or the counter-electrode population 112 may be applicable to the inventive subject matter described herein, so long as the electrode active material layer 132 is separated from the counter-electrode active material layer 138 via separator 130. Also, the electrode current collector 136 is required to be ion permeable if it is located between the electrode active material layer 132 and separator 130; and the counter-electrode current collector 140 is required to be ion permeable if it is located between the counter-electrode active material layer 138 and separator 130.

For ease of illustration, only three members of the electrode population 110 and four members of the counter-electrode population 112 are depicted; in practice, however, an energy storage device 100 or secondary battery 102 using the inventive subject matter herein may include additional members of the electrode 110 and counter-electrode 112 populations depending on the application of the energy storage device 100 or secondary battery 102, as described above. Further still, illustrated in FIG. 7 (and FIG. 1B) is a microporous separator 130 electrically insulating the electrode active material layer 132 from the counter-electrode active material layer 138.

As described above, in certain embodiments, each member of the population of electrode structures 110 may expand upon insertion of carrier ions (not shown) within an electrolyte (not shown) into the electrode structures 110, and contract upon extraction of carrier ions from electrode structures 110. For example, in one embodiment, the electrode structures 110 may be anodically active. By way of further example, in one embodiment, the electrode structures 110 may be cathodically active.

Furthermore, to connect the first and second secondary growth constraints 158, 160, respectively, the constraints 158, 160 can be attached to the at least one connecting member 166 by a suitable means, such as by gluing as shown, or alternatively by being welded, such as by being welded to the current collectors 136, 140. For example, the first and/or second secondary growth constraints 158, 160, respectively, can be attached to a secondary connecting member 166 corresponding to at least one of an electrode structure 110 and/or counter-electrode structure 112, such as at least one of an electrode and/or counter-electrode backbone 134, 141, respectively, an electrode and/or counter-electrode current collector 136, 140, respectively, by at least one of adhering, gluing, bonding, welding, and the like. According to one embodiment, the first and/or second secondary growth constraints 158, 160, respectively, can be attached to the secondary connecting member 166 by mechanically pressing the first and/or second secondary growth constraint 158, 160, respectively, to an end of one or more secondary connecting member 166, such as ends of the population of electrode 100 and/or counter-electrode structures 112, while using a glue or other adhesive material to adhere one or more ends of the electrode 110 and/or counter-electrode structures 112 to at least one of the first and/or second secondary growth constraints 158, 160, respectively.

FIGS. 8A-B depict force schematics, according to one embodiment, showing the forces exerted on the electrode assembly 106 by the set of electrode constraints 108, as well as the forces being exerted by electrode structures 110 upon repeated cycling of a secondary battery 102 containing the electrode assembly 106. As shown in FIGS. 8A-B, repeated cycling through charge and discharge of the secondary battery 102 can cause growth in electrode structures 110, such as in electrode active material layers 132 of the electrode structures 110, due to intercalation and/or alloying of ions (e.g., Li) into the electrode active material layers 132 of the electrode structures 110. Thus, the electrode structures 110 can exert opposing forces 198*a* in the vertical direction, as well as opposing forces 198*b* in the longitudinal direction, due to the growth in volume of the electrode structure 110. While not specifically shown, the electrode structure 110 may also exert opposing forces in the transverse direction due to the change in volume. To counteract these forces, and to restrain overall growth of the electrode assembly 106, in one embodiment, the set of electrode constraints 108 includes the primary growth constraint system 151 with the first and second primary growth constraints 154, 156, respectively, at the longitudinal ends 117, 119 of the electrode assembly 106, which exert forces 200*a* in the longitudinal direction to counter the longitudinal forces 198*b* exerted by the electrode structure 110. Similarly, in one embodiment, the set of electrode constraints 108 includes the secondary growth constraint system 152 with the first and second secondary growth constraints 158, 160, respectively, at opposing surfaces along the vertical direction of the electrode assembly 106, which exert forces 200*b* in the vertical direction to counter the vertical forces 198*a* exerted by the electrode structure 110. Furthermore, a tertiary growth constraint system 155 (not shown) can also be provided, alternatively or in addition, to one or more of the first and second growth constraint systems 151, 152, respectively, to exert counter forces in the transverse direction to counteract transverse forces exerted by volume changes of the electrode structures 110 in the electrode assembly 106. Accordingly, the set of electrode constraints 108 may be capable of at least partially countering the forces exerted by the electrode structure 110 by volume change of the electrode structure 110 during cycling between charge and discharge, such that an overall macroscopic growth of the electrode assembly 106 can be controlled and restrained.

Population of Electrode Structures

Referring again to FIG. 7, each member of the population of electrode structures 110 may also include a top 1052 adjacent to the first secondary growth constraint 158, a bottom 1054 adjacent to the second secondary growth constraint 160, and a lateral surface (not marked) surrounding a vertical axis $A_{ES}$ (not marked) parallel to the Z axis, the lateral surface connecting the top 1052 and the bottom 1054. The electrode structures 110 further include a length $L_{ES}$, a width $W_{ES}$, and a height $H_{ES}$. The length $L_{ES}$ being bounded by the lateral surface and measured along the X axis. The width $W_{ES}$ being bounded by the lateral surface and measured along the Y axis, and the height $H_{ES}$ being measured along the vertical axis $A_{ES}$ or the Z axis from the top 1052 to the bottom 1054.

The $L_{ES}$ of the members of the electrode population 110 will vary depending upon the energy storage device 100 or the secondary battery 102 and their intended use(s). In general, however, the members of the electrode population 110 will typically have a $L_{ES}$ in the range of about 5 mm to about 500 mm. For example, in one such embodiment, the members of the electrode population 110 have a $L_{ES}$ of about 10 mm to about 250 mm. By way of further example, in one such embodiment, the members of the electrode population 110 have a $L_{ES}$ of about 20 mm to about 100 mm.

The $W_{ES}$ of the members of the electrode population 110 will also vary depending upon the energy storage device 100 or the secondary battery 102 and their intended use(s). In general, however, each member of the electrode population 110 will typically have a $W_{ES}$ within the range of about 0.01 mm to 2.5 mm. For example, in one embodiment, the Wes of each member of the electrode population 110 will be in the range of about 0.025 mm to about 2 mm. By way of further example, in one embodiment, the $W_{ES}$ of each member of the electrode population 110 will be in the range of about 0.05 mm to about 1 mm.

The $H_{ES}$ of the members of the electrode population 110 will also vary depending upon the energy storage device 100 or the secondary battery 102 and their intended use(s). In general, however, members of the electrode population 110 will typically have a $H_{ES}$ within the range of about 0.05 mm to about 10 mm. For example, in one embodiment, the $H_{ES}$ of each member of the electrode population 110 will be in the range of about 0.05 mm to about 5 mm. By way of further example, in one embodiment, the $H_{ES}$ of each member of the electrode population 110 will be in the range of about 0.1 mm to about 1 mm.

In another embodiment, each member of the population of electrode structures 110 may include an electrode structure backbone 134 having a vertical axis $A_{ESB}$ parallel to the Z axis. The electrode structure backbone 134 may also include a layer of electrode active material 132 surrounding the electrode structure backbone 134 about the vertical axis $A_{ESB}$. Stated alternatively, the electrode structure backbone 134 provides mechanical stability for the layer of electrode active material 132, and may provide a point of attachment for the primary growth constraint system 151 and/or secondary constraint system 152. In other embodiments, as shown in the embodiment of FIG. 1B, the electrode current collector 136 may provide mechanical stability for the layer of electrode active material 132, and may provide a point of attachment for the primary growth constraint system 151 and/or secondary constraint system 152. That is, in certain embodiments, the electrode current collector 136 may serve as an electrode structure backbone. In certain embodiments, the layer of electrode active material 132 expands upon insertion of carrier ions into the layer of electrode active material 132, and contracts upon extraction of carrier ions from the layer of electrode active material 132. For example, in one embodiment, the layer of electrode active material 132 may be anodically active. By way of further example, in one embodiment, the layer of electrode active material 132 may be cathodically active. The electrode structure backbone 134 may also include a top 1056 adjacent to the first secondary growth constraint 158, a bottom 1058 adjacent to the second secondary growth constraint 160, and a lateral surface (not marked) surrounding the vertical axis $A_{ESB}$ and connecting the top 1056 and the bottom 1058. The electrode structure backbone 134 further includes a length LESB, a width $W_{ESB}$, and a height $H_{ESB}$. The length $L_{ESB}$ being bounded by the lateral surface and measured along the X axis. The width $W_{ESB}$ being bounded by the lateral surface and measured along the Y axis, and the height $H_{ESB}$ being measured along the Z axis from the top 1056 to the bottom 1058.

The $L_{ESB}$ of the electrode structure backbone 134 will vary depending upon the energy storage device 100 or the secondary battery 102 and their intended use(s). In general, however, the electrode structure backbone 134 will typically have a $L_{ESB}$ in the range of about 5 mm to about 500 mm. For example, in one such embodiment, the electrode structure backbone 134 will have a $L_{ESB}$ of about 10 mm to about 250 mm. By way of further example, in one such embodiment, the electrode structure backbone 134 will have a $L_{ESB}$ of about 20 mm to about 100 mm. According to one embodiment, the electrode structure backbone 134 may be the substructure of the electrode structure 110 that acts as the at least one connecting member 166.

The $W_{ESB}$ of the electrode structure backbone 134 will also vary depending upon the energy storage device 100 or the secondary battery 102 and their intended use(s). In general, however, each electrode structure backbone 134 will typically have a $W_{ESB}$ of at least 1 micrometer. For example, in one embodiment, the $W_{ESB}$ of each electrode structure backbone 134 may be substantially thicker, but generally will not have a thickness in excess of 500 micrometers. By way of further example, in one embodiment, the $W_{ESB}$ of each electrode structure backbone 134 will be in the range of about 1 to about 50 micrometers.

The $H_{ESB}$ of the electrode structure backbone 134 will also vary depending upon the energy storage device 100 or the secondary battery 102 and their intended use(s). In general, however, the electrode structure backbone 134 will typically have a $H_{ESB}$ of at least about 50 micrometers, more typically at least about 100 micrometers. Further, in general, the electrode structure backbone 134 will typically have a $H_{ESB}$ of no more than about 10,000 micrometers, and more typically no more than about 5,000 micrometers. For example, in one embodiment, the $H_{ESB}$ of each electrode structure backbone 134 will be in the range of about 0.05 mm to about 10 mm. By way of further example, in one embodiment, the $H_{ESB}$ of each electrode structure backbone 134 will be in the range of about 0.05 mm to about 5 mm. By way of further example, in one embodiment, the $H_{ESB}$ of each electrode structure backbone 134 will be in the range of about 0.1 mm to about 1 mm.

Depending upon the application, electrode structure backbone 134 may be electrically conductive or insulating. For example, in one embodiment, the electrode structure backbone 134 may be electrically conductive and may include electrode current collector 136 for electrode active material 132. In one such embodiment, electrode structure backbone 134 includes an electrode current collector 136 having a conductivity of at least about 103 Siemens/cm. By way of further example, in one such embodiment, electrode structure backbone 134 includes an electrode current collector 136 having a conductivity of at least about 104 Siemens/cm. By way of further example, in one such embodiment, electrode structure backbone 134 includes an electrode current collector 136 having a conductivity of at least about 105 Siemens/cm. In other embodiments, electrode structure backbone 134 is relatively nonconductive. For example, in one embodiment, electrode structure backbone 134 has an electrical conductivity of less than Siemens/cm. By way of further example, in one embodiment, electrode structure backbone 134 has an electrical conductivity of less than 1 Siemens/cm. By way of further example, in one embodiment, electrode structure backbone 134 has an electrical conductivity of less than 10-1 Siemens/cm.

In certain embodiments, electrode structure backbone 134 may include any material that may be shaped, such as metals, semiconductors, organics, ceramics, and glasses. For example, in certain embodiments, materials include semiconductor materials such as silicon and germanium. Alternatively, however, carbon-based organic materials, or metals, such as aluminum, copper, nickel, cobalt, titanium, and tungsten, may also be incorporated into electrode structure backbone 134. In one exemplary embodiment, electrode structure backbone 134 comprises silicon. The silicon, for example, may be single crystal silicon, polycrystalline silicon, amorphous silicon, or a combination thereof.

In certain embodiments, the electrode active material layer 132 may have a thickness of at least one micrometer. Typically, however, the electrode active material layer 132 thickness will not exceed 500 micrometers, such as not exceeding 200 micrometers. For example, in one embodiment, the electrode active material layer 132 may have a thickness of about 1 to 50 micrometers. By way of further example, in one embodiment, the electrode active material layer 132 may have a thickness of about 2 to about 75 micrometers. By way of further example, in one embodiment, the electrode active material layer 132 may have a thickness of about 10 to about 100 micrometers. By way of further example, in one embodiment, the electrode active material layer 132 may have a thickness of about 5 to about 50 micrometers.

In certain embodiments, the electrode current collector 136 includes an ionically permeable conductor material that has sufficient ionic permeability to carrier ions to facilitate the movement of carrier ions from the separator 130 to the electrode active material layer 132, and sufficient electrical conductivity to enable it to serve as a current collector. In embodiments where the electrode current collector 136 is positioned between the electrode active material layer 132 and the separator 130, the electrode current collector 136 may facilitate more uniform carrier ion transport by distributing current from the electrode current collector 136 across the surface of the electrode active material layer 132. This, in turn, may facilitate more uniform insertion and extraction of carrier ions and thereby reduce stress in the electrode active material layer 132 during cycling; since the electrode current collector 136 distributes current to the surface of the electrode active material layer 132 facing the separator 130, the reactivity of the electrode active material layer 132 for carrier ions will be the greatest where the carrier ion concentration is the greatest.

The electrode current collector 136 can include an ionically permeable conductor material that is both ionically and electrically conductive. Stated differently, the electrode current collector 136 may have a thickness, an electrical conductivity, and an ionic conductivity for carrier ions that facilitates the movement of carrier ions between an immediately adjacent electrode active material layer 132 on one side of the ionically permeable conductor layer and an immediately adjacent separator layer 130 on the other side of the electrode current collector 136 in an electrochemical stack or electrode assembly 106. In yet another embodiment, the electrode current collector 136 may comprise a conductor material that is electrically conductive, without regard to any ionic conductivity (e.g., the material may or may not possess ionic conductivity), such as in a case where the electrode current collector 136 forms an interior backbone of an electrode structure 110, as in FIG. 1B. In such an embodiment, the electrode current collector may be positioned internally within the electrode structure 100 such that it does not inhibit the movement of carrier ions to negative electrode active material and so the ability to conduct ions may not be essential. On a relative basis, the electrode current collector 136 has an electrical conductance that is greater than its ionic conductance when there is an applied current to store energy in the device 100 or an applied load to discharge the device 100. For example, the ratio of the electrical conductance to the ionic conductance (for carrier ions) of the electrode current collector 136 will typically be at least 1,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 is at least 5,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 is at least 10,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 layer is at least 50,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 is at least 100,000:1, respectively, when there is an applied current to store energy in the device 100 or an applied load to discharge the device 100.

In one embodiment, and when there is an applied current to store energy in the device 100 or an applied load to discharge the device 100, such as when a secondary battery 102 is charging or discharging, the electrode current collector 136 has an ionic conductance that is comparable to the ionic conductance of an adjacent separator layer 130. For example, in one embodiment, the electrode current collector 136 has an ionic conductance (for carrier ions) that is at least 50% of the ionic conductance of the separator layer 130 (i.e., a ratio of 0.5:1, respectively) when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 1:1 when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 1.25:1 when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 1.5:1 when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 2:1 when there is an applied current to store energy in the device 100 or an applied load to discharge the device 100.

In one embodiment, the electrode current collector 136 also has an electrical conductance that is substantially greater than the electrical conductance of the electrode active material layer 132. For example, in one embodiment, the ratio of the electrical conductance of the electrode current collector 136 to the electrical conductance of the electrode active material layer 132 is at least 100:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 500:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 1000:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 5000:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 10,000:1 when there is an applied current to store energy in the device 100 or an applied load to discharge the device 100.

The thickness of the electrode current collector layer 136 in the longitudinal direction (i.e., the shortest distance between the separator 130 and, in one embodiment, the anodically active material layer (e.g., electrode active material layer 132) between which the electrode current collector layer 136 is sandwiched, or the thickness as measured between adjacent electrode active material layers between which the electrode current collector is sandwiched, as in the embodiment in FIG. 1B) in certain 10) embodiments will depend upon the composition of the layer 136 and the performance specifications for the electrochemical stack. In general, when an electrode current collector layer 136 is an ionically permeable conductor layer, it will have a thickness of at least about 300 Angstroms. For example, in some embodiments, it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the electrode current collector layer 136 will have a thickness in the range of about 0.1 to about 10 micrometers. By way of further example, in some embodiments, the electrode current collector layer 136 will have a thickness in the range of about 0.1 to about 5 micrometers. By way of further example, in some embodiments, the electrode current collector layer 136 will have a thickness in the range of about 0.5 to about 3 micrometers. In other embodiments, including where the electrode current collector layer 136 is an internal structure of the electrode structure 110, such as an internal layer sandwiched between adjacent electrode active material layers (e.g., as in the embodiment shown in FIG. 1B), the thickness may generally be as described for an ionically permeable conductor layer, and may more generally be in the range of less than microns, such as in the range of from 2 microns to 20 microns, from 6 microns to 18 microns, and/or from 8 microns to 14 microns. That is, the thickness of the electrode current collector may be less than 20 microns, such as less than 18 microns, and even less than 14 microns, and may generally be at least 2 microns, such as at least 6 microns, and even at least 8 microns. In general, it may be preferred that the thickness of the electrode current collector layer 136 be approximately uniform. For example, in one embodiment, it is preferred that the electrode current collector layer 136 have a thickness non-uniformity of less than about 25%. In certain embodiments, the thickness variation is even less. For example, in some embodiments, the electrode current collector layer 136 has a thickness non-uniformity of less than about 20%. By way of further example, in some embodiments, the electrode current collector layer 136 has a thickness non-uniformity of less than about 15%. In some embodiments the ionically permeable conductor layer has a thickness non-uniformity of less than about 10%.

In one embodiment, the electrode current collector layer 136 is an ionically permeable conductor layer including an electrically conductive component and an ion conductive component that contribute to the ionic permeability and electrical conductivity. Typically, the electrically conductive component will include a continuous electrically conductive material (e.g., a continuous metal or metal alloy) in the form of a mesh or patterned surface, a film, or composite material comprising the continuous electrically conductive material (e.g., a continuous metal or metal alloy). Additionally, the ion conductive component will typically comprise pores, for example, interstices of a mesh, spaces between a patterned metal or metal alloy containing material layer, pores in a metal film, or a solid ion conductor having sufficient diffusivity for carrier ions. In certain embodiments, the ionically permeable conductor layer includes a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In the embodiment illustrated in FIG. 7, electrode current collector layer 136 is the sole anode current collector for electrode active material layer 132. Stated differently, electrode structure backbone 134 may include an anode current collector. In certain other embodiments, however, electrode structure backbone 134 may optionally not include an anode current collector. In yet other embodiments, as shown for example in FIG. 1B, the electrode current collector layer 136 is an internal structure of electrode structure 110, and may serve as a core or backbone structure of the electrode structure 110, with electrode active material layers 132 being disposed on opposing sides of the internal electrode current collector layer 136.

Population of Counter-Electrode Structures

Referring again to FIG. 7, each member of the population of counter-electrode structures 112 may also include a top 1068 adjacent to the first secondary growth constraint 158, a bottom 1070 adjacent to the second secondary growth constraint 160, and a lateral surface (not marked) surrounding a vertical axis $A_{CES}$ (not marked) parallel to the Z axis, the lateral surface connecting the top 1068 and the bottom 1070. The counter-electrode structures 112 further include a length $L_{CES}$, a width $W_{CES}$, and a height $H_{CES}$. The length $L_{CES}$ being bounded by the lateral surface and measured along the X axis. The width $W_{CES}$ being bounded by the lateral surface and measured along the Y axis, and the height $H_{CES}$ being measured along the vertical axis Aces or the Z axis from the top 1068 to the bottom 1070.

The $L_{CES}$ of the members of the counter-electrode population 112 will vary depending upon the energy storage device 100 or the secondary battery 102 and their intended use(s). In general, however, the members of the counter-electrode population 112 will typically have a $L_{CES}$ in the range of about 5 mm to about 500 mm. For example, in one such embodiment, the members of the counter-electrode population 112 have a $L_{CES}$ of about 10 mm to about 250 mm. By way of further example, in one such embodiment, the members of the counter-electrode population 112 have a $L_{CES}$ of about 25 mm to about 100 mm.

The $W_{CES}$ of the members of the counter-electrode population 112 will also vary depending upon the energy storage device 100 or the secondary battery 102 and their intended use(s). In general, however, each member of the counter-electrode population 112 will typically have a $W_{CES}$ within the range of about 0.01 mm to 2.5 mm. For example, in one embodiment, the $W_{CES}$ of each member of the counter-electrode population 112 will be in the range of about 0.025 mm to about 2 mm. By way of further example, in one embodiment, the $W_{CES}$ of each member of the counter-electrode population 112 will be in the range of about 0.05 mm to about 1 mm.

The $H_{CES}$ of the members of the counter-electrode population 112 will also vary depending upon the energy storage device 100 or the secondary battery 102 and their intended use(s). In general, however, members of the counter-electrode population 112 will typically have a $H_{CES}$ within the range of about 0.05 mm to about 10 mm. For example, in one embodiment, the $H_{CES}$ of each member of the counter-electrode population 112 will be in the range of about 0.05 mm to about 5 mm. By way of further example, in one embodiment, the $H_{CES}$ of each member of the electrode population 112 will be in the range of about 0.1 mm to about 1 mm.

In another embodiment, each member of the population of counter-electrode structures 112 may include a counter-electrode structure backbone 141 having a vertical axis $A_{CESB}$ parallel to the Z axis. The counter-electrode structure backbone 141 may also include a layer of counter-electrode active material 138 surrounding the counter-electrode structure backbone 141 about the vertical axis $A_{CESB}$. Stated alternatively, the counter-electrode structure backbone 141 provides mechanical stability for the layer of counter-electrode active material 138, and may provide a point of attachment for the primary growth constraint system 151 and/or secondary growth constraint system 152. In yet another embodiment, as shown in FIG. 1B, the counter-electrode current collector 140 may provide mechanical stability for the layer of counter-electrode active material 138, and may provide a point of attachment for the primary growth constraint system 151 and/or secondary growth constraint system 152. That is, the counter-electrode current collector 140 may, in certain embodiments, serve as a counter-electrode structure backbone. In certain embodiments, the layer of counter-electrode active material 138 expands upon insertion of carrier ions into the layer of counter-electrode active material 138, and contracts upon extraction of carrier ions from the layer of counter-electrode active material 138. For example, in one embodiment, the layer of counter-electrode active material 138 may be anodically active. By way of further example, in one embodiment, the layer of counter-electrode active material 138 may be cathodically active. The counter-electrode structure backbone 141 may also include a top 1072 adjacent to the first secondary growth constraint 158, a bottom 1074 adjacent to the second secondary growth constraint 160, and a lateral surface (not marked) surrounding the vertical axis $A_{CESB}$ and connecting the top 1072 and the bottom 1074. The counter-electrode structure backbone 141 further includes a length $L_{CESB}$, a width $W_{CESB}$, and a height $H_{CESB}$. The length $L_{CESB}$ being bounded by the lateral surface and measured along the X axis. The width $W_{CES}$B being bounded by the lateral surface and measured along the Y axis, and the height $H_{CESB}$ being measured along the Z axis from the top 1072 to the bottom 1074.

The $L_{CESB}$ of the counter-electrode structure backbone 141 will vary depending upon the energy storage device 100 or the secondary battery 102 and their intended use(s). In general, however, the counter-electrode structure backbone 141 will typically have a $L_{CESB}$ in the range of about 5 mm to about 500 mm. For example, in one such embodiment, the counter-electrode structure backbone 141 will have a $L_{ESB}$ of about 10 mm to about 250 mm. By way of further example, in one such embodiment, the counter-electrode structure backbone 141 will have a $L_{ESB}$ of about 20 mm to about 100 mm.

The $W_{CESB}$ of the counter-electrode structure backbone 141 will also vary depending upon the energy storage device 100 or the secondary battery 102 and their intended use(s). In general, however, each counter-electrode structure backbone 141 will typically have a $W_{CESB}$ of at least 1 micrometer. For example, in one embodiment, the $W_{CESB}$ of each counter-electrode structure backbone 141 may be substantially thicker, but generally will not have a thickness in excess of 500 micrometers. By way of further example, in one embodiment, the $W_{ESB}$ of each counter-electrode structure backbone 141 will be in the range of about 1 to about 50 micrometers.

The $H_{CESB}$ of the counter-electrode structure backbone 141 will also vary depending upon the energy storage device 100 or the secondary battery 102 and their intended use(s). In general, however, the counter-electrode structure backbone 141 will typically have a $H_{CESB}$ of at least about 50 micrometers, more typically at least about 100 micrometers. Further, in general, the counter-electrode structure backbone 141 will typically have a $H_{CESB}$ of no more than about 10,000 micrometers, and more typically no more than about 5,000 micrometers. For example, in one embodiment, the $H_{CESB}$ of each counter-electrode structure backbone 141 will be in the range of about 0.05 mm to about 10 mm. By way of further example, in one embodiment, the $H_{CES}$B of each counter-electrode structure backbone 141 will be in the range of about 0.05 mm to about 5 mm. By way of further example, in one embodiment, the $H_{CESB}$ of each counter-electrode structure backbone 141 will be in the range of about 0.1 mm to about 1 mm.

Depending upon the application, counter-electrode structure backbone 141 may be electrically conductive or insulating. For example, in one embodiment, the counter-electrode structure backbone 141 may be electrically conductive and may include counter-electrode current collector 140 for counter-electrode active material 138. In one such embodiment, counter-electrode structure backbone 141 includes a counter-electrode current collector 140 having a conductivity of at least about 103 Siemens/cm. By way of further example, in one such embodiment, counter-electrode structure backbone 141 includes a counter-electrode current collector 140 having a conductivity of at least about 104 Siemens/cm. By way of further example, in one such embodiment, counter-electrode structure backbone 141 includes a counter-electrode current collector 140 having a conductivity of at least about 105 Siemens/cm. In other embodiments, counter-electrode structure backbone 141 is relatively nonconductive. For example, in one embodiment, counter-electrode structure backbone 141 has an electrical conductivity of less than 10 Siemens/cm. By way of further example, in one embodiment, counter-electrode structure backbone 141 has an electrical conductivity of less than 1 Siemens/cm. By way of further example, in one embodiment, counter-electrode structure backbone 141 has an electrical conductivity of less than 10-1 Siemens/cm.

In certain embodiments, counter-electrode structure backbone 141 may include any material that may be shaped, such as metals, semiconductors, organics, ceramics, and glasses. For example, in certain embodiments, materials include semiconductor materials such as silicon and germanium. Alternatively, however, carbon-based organic materials, or metals, such as aluminum, copper, nickel, cobalt, titanium, and tungsten, may also be incorporated into counter-electrode structure backbone 141. In one exemplary embodiment, counter-electrode structure backbone 141 comprises silicon. The silicon, for example, may be single crystal silicon, polycrystalline silicon, amorphous silicon, or a combination thereof.

In certain embodiments, the counter-electrode active material layer 138 may have a thickness of at least one micrometer. Typically, however, the counter-electrode active material layer 138 thickness will not exceed 200 micrometers. For example, in one embodiment, the counter-electrode active material layer 138 may have a thickness of about 1 to 50 micrometers. By way of further example, in one embodiment, the counter-electrode active material layer 138 may have a thickness of about 2 to about 75 micrometers. By way of further example, in one embodiment, the counter-electrode active material layer 138 may have a thickness of about 10 to about 100 micrometers. By way of further example, in one embodiment, the counter-electrode active material layer 138 may have a thickness of about 5 to about 50 micrometers.

In certain embodiments, the counter-electrode current collector 140 includes an ionically permeable conductor that has sufficient ionic permeability to carrier ions to facilitate the movement of carrier ions from the separator 130 to the counter-electrode active material layer 138, and sufficient electrical conductivity to enable it to serve as a current collector. Whether or not positioned between the counter-electrode active material layer 138 and the separator 130, the counter-electrode current collector 140 may facilitate more uniform carrier ion transport by distributing current from the counter-electrode current collector 140 across the surface of the counter-electrode active material layer 138. This, in turn, may facilitate more uniform insertion and extraction of carrier ions and thereby reduce stress in the counter-electrode active material layer 138 during cycling; since the counter-electrode current collector 140 distributes current to the surface of the counter-electrode active material layer 138 facing the separator 130, the reactivity of the counter-electrode active material layer 138 for carrier ions will be the greatest where the carrier ion concentration is the greatest.

The counter-electrode current collector 140 may include an ionically permeable conductor material that is both ionically and electrically conductive. Stated differently, the counter-electrode current collector 140 may have a thickness, an electrical conductivity, and an ionic conductivity for carrier ions that facilitates the movement of carrier ions between an immediately adjacent counter-electrode active material layer 138 on one side of the ionically permeable conductor layer and an immediately adjacent separator layer 130 on the other side of the counter-electrode current collector 140 in an electrochemical stack or electrode assembly 106. In yet another embodiment, the counter-electrode current collector 140 may comprise a conductor material that is electrically conductive, without regard to any ionic conductivity (e.g., the material may or may not possess ionic conductivity), such as in a case where the counter-electrode current collector 140 forms an interior backbone of a counter-electrode structure 111, as in FIG. 1B. In such an embodiment, the electrode current collector may be positioned internally within the electrode structure 100 such that it does not inhibit the movement of carrier ions to negative electrode active material and so the ability to conduct ions may not be essential. On a relative basis, the counter-electrode current collector 140 has an electrical conductance that is greater than its ionic conductance when there is an applied current to store energy in the device 100 or an applied load to discharge the device 100. For example, the ratio of the electrical conductance to the ionic conductance (for carrier ions) of the counter-electrode current collector 140 will typically be at least 1,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 is at least 5,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 is at least 10,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 layer is at least 50,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 is at least 100,000:1, respectively, when there is an applied current to store energy in the device 100 or an applied load to discharge the device 100.

In one embodiment, and when there is an applied current to store energy in the device 100 or an applied load to discharge the device 100, such as when an energy storage device 100 or a secondary battery 102 is charging or discharging, the counter-electrode current collector 140 has an ionic conductance that is comparable to the ionic conductance of an adjacent separator layer 130. For example, in one embodiment, the counter-electrode current collector 140 has an ionic conductance (for carrier ions) that is 10) at least 50% of the ionic conductance of the separator layer 130 (i.e., a ratio of 0.5:1, respectively) when there is an applied current to store energy in the device 100 or an applied load to discharge the device 100. By way of further example, in some embodiments, the ratio of the ionic conductance (for carrier ions) of the counter-electrode current collector 140 to the ionic conductance (for carrier ions) of the separator layer 130 is at least 1:1 when there is an applied current to store energy in the device 100 or an applied load to discharge the device 100. By way of further example, in some embodiments, the ratio of the ionic conductance (for carrier ions) of the counter-electrode current collector 140 to the ionic conductance (for carrier ions) of the separator layer 130 is at least 1.25:1 when there is an applied current to store energy in the device 100 or an applied load to discharge the device 100. By way of further example, in some embodiments, the ratio of the ionic conductance (for carrier ions) of the counter-electrode current collector 140 to the ionic conductance (for carrier ions) of the separator layer 130 is at least 1.5:1 when there is an applied current to store energy in the device 100 or an applied load to discharge the device 100. By way of further example, in some embodiments, the ratio of the ionic conductance (for carrier ions) of the counter-electrode current collector 140 to the ionic conductance (for (anode current collector layer) carrier ions) of the separator layer 130 is at least 2:1 when there is an applied current to store energy in the device 100 or an applied load to discharge the device 100.

In one embodiment, the counter-electrode current collector 140 also has an electrical conductance that is substantially greater than the electrical conductance of the counter-electrode active material layer 138. For example, in one embodiment, the ratio of the electrical conductance of the counter-electrode current collector 140 to the electrical conductance of the counter-electrode active material layer 138 is at least 100:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 500:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 1000:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 5000:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 10,000:1 when there is an applied current to store energy in the device 100 or an applied load to discharge the device 100.

The thickness of the counter-electrode current collector layer 140 (i.e., the shortest distance between the separator 130 and, in one embodiment, the cathodically active material layer (e.g., counter-electrode active material layer 138) between which the counter-electrode current collector layer 140 is sandwiched) in certain embodiments will depend upon the composition of the layer 140 and the performance specifications for the electrochemical stack. In general, when an counter-electrode current collector layer 140 is an ionically permeable conductor layer, it will have a thickness of at least about 300 Angstroms. For example, in some embodiments, it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the counter-electrode current collector layer 140 will have a thickness in the range of about 0.1 to about 10 micrometers. By way of further example, in some embodiments, the counter-electrode current collector layer 140 will have a thickness in the range of about 0.1 to about 5 micrometers. By way of further example, in some embodiments, the counter-electrode current collector layer 140 will have a thickness in the range of about 0.5 to about 3 micrometers. In other embodiments, including where the counter-electrode current collector layer 140 is an internal structure of the counter-electrode structure 112, such as an internal layer sandwiched between adjacent counter-electrode active material layers (e.g., as in the embodiment shown in FIG. 1B), the thickness may generally be as described for an ionically permeable conductor layer, and may more generally be in the range of less than 20 microns, such as in the range of from 2 microns to 20 microns, from 6 microns to 18 microns, and/or from 8 microns to 14 microns. That is, the thickness of the counter-electrode current collector may be less than 20 microns, such as less than 18 microns, and even less than 14 microns, and may generally be at least 2 microns, such as at least 6 microns, and even at least 8 microns. In general, it is preferred that the thickness of the counter-electrode current collector layer 140 be approximately uniform. For example, in one embodiment, it is preferred that the counter-electrode current collector layer 140 have a thickness non-uniformity of less than about 25%. In certain embodiments, the thickness variation is even less. For example, in some embodiments, the counter-electrode current collector layer 140 has a thickness non-uniformity of less than about 20%. By way of further example, in some embodiments, the counter-electrode current collector layer 140 has a thickness non-uniformity of less than about 15%. In some embodiments, the counter-electrode current collector layer 140 has a thickness non-uniformity of less than about 10%.

In one embodiment, the counter-electrode current collector layer 140 is an ionically permeable conductor layer including an electrically conductive component and an ion conductive component that contributes to the ionic permeability and electrical conductivity. Typically, the electrically conductive component will include a continuous electrically conductive material (e.g., a continuous metal or metal alloy) in the form of a mesh or patterned surface, a film, or composite material comprising the continuous electrically conductive material (e.g., a continuous metal or metal alloy). Additionally, the ion conductive component will typically comprise pores, for example, interstices of a mesh, spaces between a patterned metal or metal alloy containing material layer, pores in a metal film, or a solid ion conductor having sufficient diffusivity for carrier ions. In certain embodiments, the ionically permeable conductor layer includes a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In the embodiment illustrated in FIG. 7, counter-electrode current collector layer 140 is the sole cathode current collector for counter-electrode active material layer 138. Stated differently, counter-electrode structure backbone 141 may include a cathode current collector 140. In certain other embodiments, however, counter-electrode structure backbone 141 may optionally not include a cathode current collector 140. In yet other embodiments, as shown for example in FIG. 1B, the electrode current collector layer 136 is an internal structure of electrode structure 110, and may serve as a core or backbone structure of the electrode structure 110, with electrode active material layers 132 being disposed on opposing sides of the internal electrode current collector layer 136.

In one embodiment, first secondary growth constraint 158 and second secondary growth constraint 160 each may include an inner surface 1060 and 1062, respectively, and an opposing outer surface 1064 and 1066, respectively, separated along the z-axis thereby defining a first secondary growth constraint 158 height $H_{158}$ and a second secondary growth constraint 160 height $H_{160}$. According to aspects of the disclosure, increasing the heights of either the first and/or second secondary growth constraints 158, 160, respectively, can increase the stiffness of the constraints, but can also require increased volume, thus causing a reduction in energy density for an energy storage device 100 or a secondary battery 102 containing the electrode assembly 106 and set of constraints 108. Accordingly, the thickness of the constraints 158, 160 can be selected in accordance with the constraint material properties, the strength of the constraint required to offset pressure from a predetermined expansion of an electrode 100, and other factors. For example, in one embodiment, the first and second secondary growth constraint heights $H_{158}$ and $H_{160}$, respectively, may be less than 50% of the height $H_{ES}$. By way of further example, in one embodiment, the first and second secondary growth constraint heights $H_{158}$ and $H_{160}$, respectively, may be less than 25% of the height $H_{ES}$. By way of further example, in one embodiment, the first and second secondary growth constraint heights $H_{158}$ and $H_{160}$, respectively, may be less than 10% of the height $H_{ES}$. By way of further example, in one embodiment, the first and second secondary growth constraint heights $H_{158}$ and $H_{160}$ may be may be less than about 5% of the height $H_{ES}$. In some embodiments, the first secondary growth constraint height $H_{158}$ and the second secondary growth constraint height $H_{160}$ may be different, and the materials used for each of the first and second secondary growth constraints 158, 160 may also be different.

In certain embodiments, the inner surfaces 1060 and 1062 may include surface features amenable to affixing the population of electrode structures 110 and/or the population of counter-electrode structures 112 thereto, and the outer surfaces 1064 and 1066 may include surface features amenable to the stacking of a plurality of constrained electrode assemblies 106 (i.e., inferred within FIG. 7, but not shown for clarity). For example, in one embodiment, the inner surfaces 1060 and 1062 or the outer surfaces 1064 and 1066 may be planar. By way of further example, in one embodiment, the inner surfaces 1060 and 1062 or the outer surfaces 1064 and 1066 may be non-planar. By way of further example, in one embodiment, the inner surfaces 1060 and 1062 and the outer surfaces 1064 and 1066 may be planar. By way of further example, in one embodiment, the inner surfaces 1060 and 1062 and the outer surfaces 1064 and 1066 may be non-planar. By way of further example, in one embodiment, the inner surfaces 1060 and 1062 and the outer surfaces 1064 and 1066 may be substantially planar.

As described elsewhere herein, modes for affixing the at least one secondary connecting member 166 embodied as electrode structures 110 and/or counter-electrodes 112 to the inner surfaces 1060 and 1062 may vary depending upon the energy storage device 100 or secondary battery 102 and their intended use(s). As one exemplary embodiment shown in FIG. 7, the top 1052 and the bottom 1054 of the population of electrode structures 110 (i.e., electrode current collector 136, as shown) and the top 1068 and bottom 1070 of the population of counter-electrode structures 112 (i.e., counter-electrode current collector 140, as shown) may be affixed to the inner surface 1060 of the first secondary growth constraint 158 and the inner surface 1062 of the second secondary growth constraint 160 via a layer of glue 182. Similarly, a top 1076 and a bottom 1078 of the first primary growth constraint 154, and a top 1080 and a bottom 1082 of the second primary growth constraint 156 may be affixed to the inner surface 1060 of the first secondary growth constraint 158 and the inner surface 1062 of the second secondary growth constraint 160 via a layer of glue 182.

Stated alternatively, in the embodiment shown in FIG. 7, the top 1052 and the bottom 1054 of the population of electrode structures 110 include a height $H_{ES}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment. In addition, the top 1068 and the bottom 1070 of the population of counter-electrode structures 112 include a height $H_{CES}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment.

Further, in another exemplary embodiment, a top 1056 and a bottom 1058 of the electrode backbones 134, and a top 1072 and a bottom 1074 of the counter-electrode backbones 141 may be affixed to the inner surface 1060 of the first secondary growth constraint 158 and the inner surface 1062 of the second secondary growth constraint 160 via a layer of glue 182 (not illustrated). Similarly, a top 1076 and a bottom 1078 of the first primary growth constraint 154, and a top 1080 and a bottom 1082 of the second primary growth constraint 156 may be affixed to the inner surface 1060 of the first secondary growth constraint 158 and the inner surface 1062 of the second secondary growth constraint 160 via a layer of glue 182 (not illustrated with respect to the embodiment described in this paragraph). Stated alternatively, the top 1056 and the bottom 1058 of the electrode backbones 134 include a height $H_{ESB}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment. In addition, the top 1072 and the bottom 1074 of the counter-electrode backbones 141 include a height $H_{CESB}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment.

Accordingly, in one embodiment, at least a portion of the population of electrode 110 and/or counter electrode structures 112, and/or the separator 130 may serve as one or more secondary connecting members 166 to connect the first and second secondary growth constraints 158, 160, respectively, to one another in a secondary growth constraint system 152, thereby providing a compact and space-efficient constraint system to restrain growth of the electrode assembly 106 during cycling thereof. According to one embodiment, any portion of the electrode 110 and/or counter-electrode structures 112, and/or separator 130 may serve as the one or more secondary connecting members 166, with the exception of any portion of the electrode 110 and/or counter-electrode structure 112 that swells in volume with charge and discharge cycles. That is, that portion of the electrode 110 and/or counter-electrode structure 112, such as the electrode active material 132, that is the cause of the volume change in the electrode assembly 106, typically will not serve as a part of the set of electrode constraints 108. In one embodiment, first and second primary growth constraints 154, 156, respectively, provided as a part of the primary growth constraint system 151 further inhibit growth in a longitudinal direction, and may also serve as secondary connecting members 166 to connect the first and second secondary growth constraints 158, 160, respectively, of the secondary growth constraint system 152, thereby providing a cooperative, synergistic constraint system (i.e., set of electrode constraints 108) for restraint of electrode growth/swelling.

Connections Via Counter-Electrode Structures

Figure 9A:
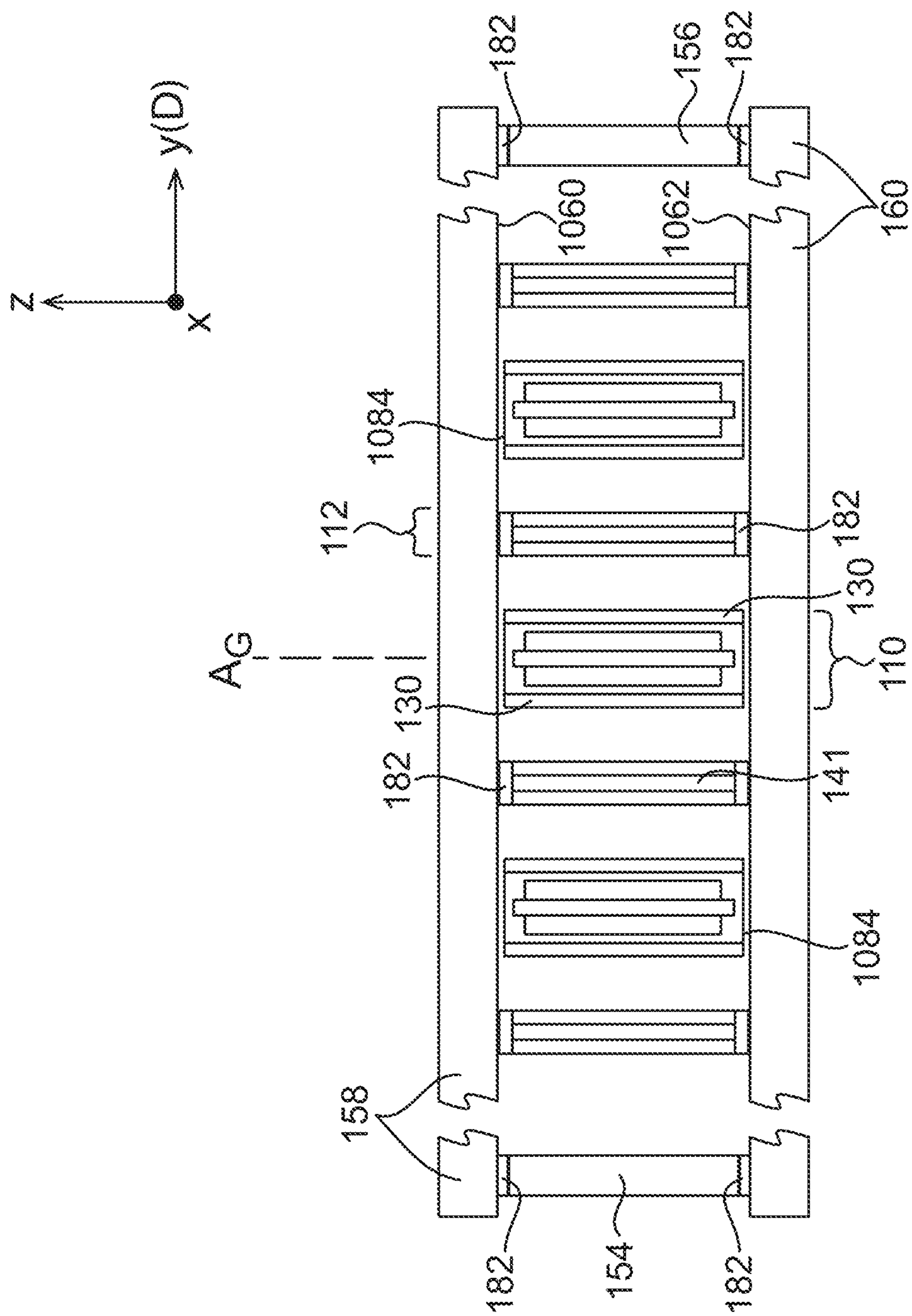
FIG. 9A illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the counter-electrode backbones are used for assembling the set of electrode constraints.
Figure 9B:
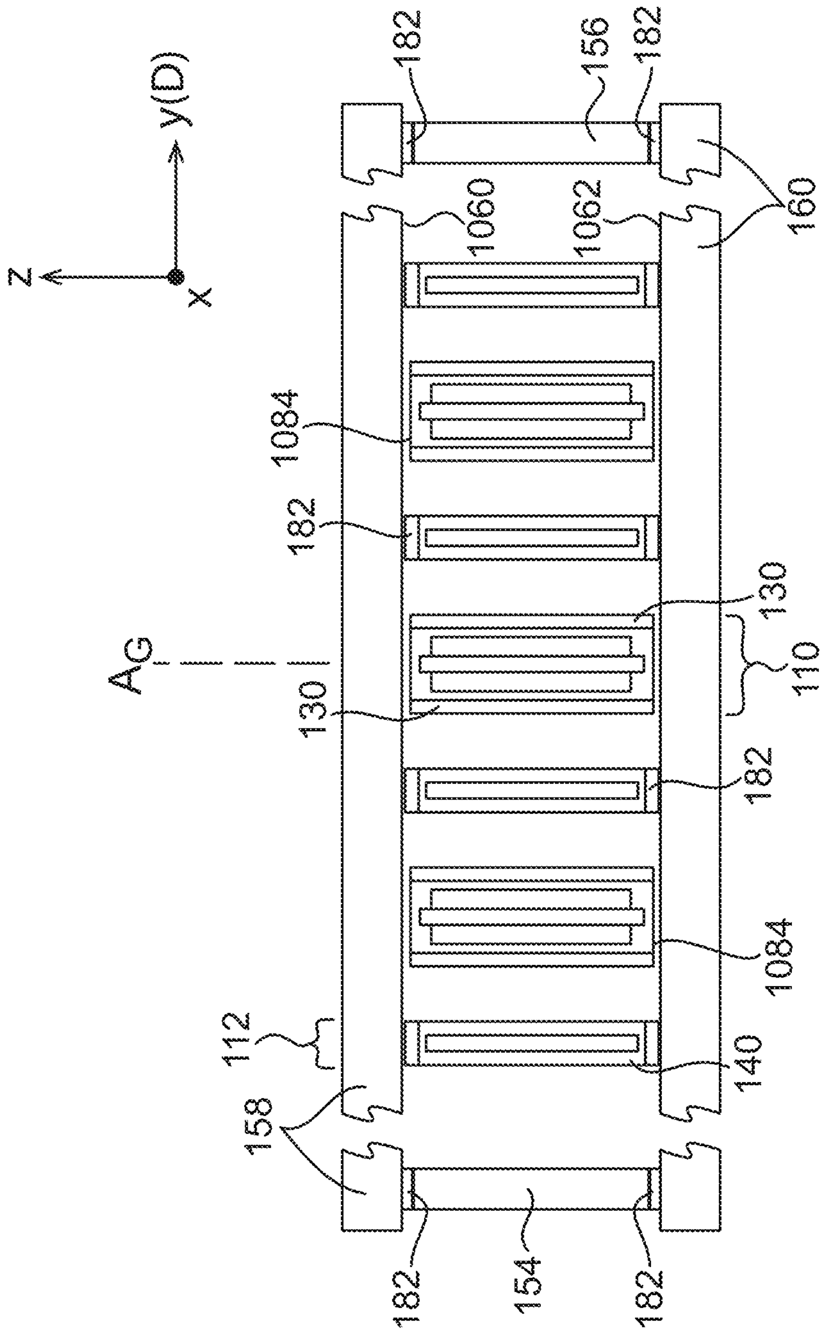
FIG. 9B illustrates a cross-section of an embodiment of the electrode assembly taken along the line A-A' as shown in FIG. 1A, further including a set of electrode constraints, including another embodiment of a primary growth constraint system and another embodiment of a secondary growth constraint system where the counter-electrode current collectors are used for assembling the set of electrode constraints.
Figure 9C:
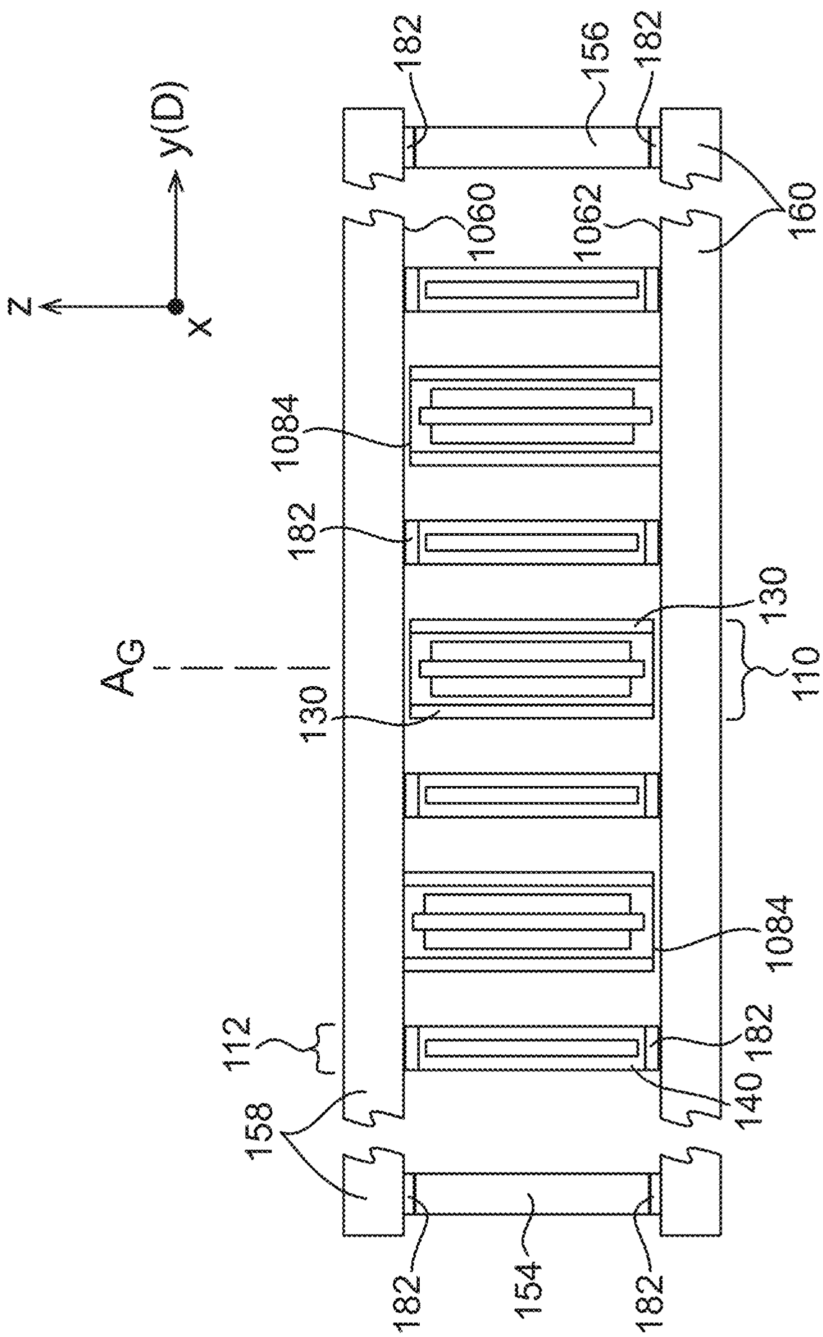
FIG. 9C illustrates a cross-section of an embodiment of the electrode assembly taken along the line A-A' as shown in FIG. 1A, further including a set of electrode constraints, including yet another embodiment of a primary growth constraint system and yet another embodiment of a secondary growth constraint system where the counter-electrode current collectors are used for assembling the set of electrode constraints.

Referring now to FIGS. 9A-9C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, and co-parallel with the Y axis. More specifically, FIGS. 9A-9C each show a cross section, along the line A-A' as in FIG. 1A, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 9A-9C, non-affixed electrode structures 110 may include electrode gaps 1084 between their tops and the first secondary growth constraint 158, and their bottoms and the second secondary growth constraint 160. Stated alternatively, in certain embodiments, the top and the bottom 1052, 1054, respectively, of each electrode structure 110 may have a gap between the first and second secondary growth constraints 158, 160, respectively. Further, in certain embodiments as shown in FIG. 9C, the top 1052 of the electrode structure 110 may be in contact with, but not affixed to, the first secondary growth constraint 158, the bottom 1054 of the electrode structure 110 may be in contact with, but not affixed to, the second secondary growth constraint 160, or the top 1052 of the electrode structure 110 may be in contact with, but not affixed to, the first secondary growth constraint 158 and the bottom 1054 of the electrode structure 110 may in in contact with, but not affixed to, the second secondary growth constraint 160 (not illustrated).

More specifically, in one embodiment, as shown in FIG. 9A, a plurality of counter-electrode backbones 141 may be affixed to the inner surface 1160 of the first secondary growth constraint 158 and the inner surface 1062 of the second secondary growth constraint 160 via a layer of glue 182. In certain embodiments, the plurality of counter-electrode backbones 112 affixed to the first and second secondary growth constraints 158, 160, respectively, may include a symmetrical pattern about a gluing axis $A_G$ with respect to affixed counter-electrode backbones 141. In certain embodiments, the plurality of counter-electrode backbones 141 affixed to the first and second secondary growth constraints 158, 160, respectively, may include an asymmetric or random pattern about a gluing axis $A_G$ with respect to affixed counter-electrode backbones 141.

In one exemplary embodiment, a first symmetric attachment pattern unit may include two counter-electrode backbones 141 affixed to the first secondary growth constraint 158 and the second secondary growth constraint 160, as above, where the two affixed counter-electrode backbones 141 flank one electrode structure 110. Accordingly, the first symmetric attachment pattern unit may repeat, as needed, along the stacking direction D depending upon the energy storage device 100 or the secondary battery 102 and the intended use(s) thereof. In another exemplary embodiment, a second symmetric attachment pattern unit may include two counter-electrode backbones 141 affixed to the first secondary growth constraint 158 and the second secondary growth constraint 160, as above, the two affixed counter-electrode backbones 141 flanking two or more electrode structures 110 and one or more non-affixed counter-electrode backbones 141. Accordingly, the second symmetric attachment pattern unit may repeat, as needed, along the stacking direction D depending upon the energy storage device 100 or the secondary battery 102 and the intended use(s) thereof. Other exemplary symmetric attachment pattern units have been contemplated, as would be appreciated by a person having skill in the art.

In one exemplary embodiment, a first asymmetric or random attachment pattern may include two or more counter-electrode backbones 141 affixed to the first secondary growth constraint 158 and the second secondary growth constraint 160, as above, where the two or more affixed counter-electrode backbones 141 may be individually designated as affixed counter-electrode backbone 141A, affixed counter-electrode backbone 141B, affixed counter-electrode backbone 141C, and affixed counter-electrode backbone 141D. Affixed counter-electrode backbone 141A and affixed counter-electrode backbone 141B may flank (1+x) electrode structures 110, affixed counter-electrode backbone 141B and affixed counter-electrode backbone 141C may flank (1+y) electrode structures 110, and affixed counter-electrode backbone 141C and affixed counter-electrode backbone 141D may flank (1+z) electrode structures 110, wherein the total amount of electrode structures 110 (i.e., x, y, or z) between any two affixed counter-electrode backbones 141A-141D are non-equal (i.e., x≠y≠z) and may be further separated by non-affixed counter-electrode backbones 141. Stated alternatively, any number of counter-electrode backbones 141 may be affixed to the first secondary growth constraint 158 and the second secondary growth constraint 160, as above, whereby between any two affixed counter-electrode backbones 141 may include any non-equivalent number of electrode structures 110 separated by non-affixed counter-electrode backbones 141. Other exemplary asymmetric or random attachment patterns have been contemplated, as would be appreciated by a person having skill in the art.

More specifically, in one embodiment, as shown in FIG. 9B, a plurality of counter-electrode current collectors 140 may be affixed to the inner surface 1160 of the first secondary growth constraint 158 and the inner surface 1062 of the second secondary growth constraint 160 via a layer of glue 182. In certain embodiments, the plurality of counter-electrode current collectors 140 affixed to the first and second secondary growth constraints 158 and 160 may include a symmetrical pattern about a gluing axis $A_G$ with respect to affixed counter-electrode current collectors 140. In certain embodiments, the plurality of counter-electrode current collectors 140 affixed to the first and second secondary growth constraints 158 and 160, respectively, may include an asymmetric or random pattern about a gluing axis $A_G$ with respect to affixed counter-electrode current collectors 140.

In one exemplary embodiment, a first symmetric attachment pattern unit may include two counter-electrode current collectors 140 affixed to the first secondary growth constraint 158 and the second secondary growth constraint 160, as above, where the two affixed counter-electrode current collectors 140 flank one electrode structure 110. Accordingly, the first symmetric attachment pattern unit may repeat, as needed, along the stacking direction D depending upon the energy storage device 100 or the secondary battery 102 and the intended use(s) thereof. In another exemplary embodiment, a second symmetric attachment pattern unit may include two counter-electrode current collectors 140 affixed to the first secondary growth constraint 158 and the second secondary growth constraint 160, as above, the two affixed counter-electrode current collectors 140 flanking two or more electrode structures 110 and one or more non-affixed counter-electrode current collectors 140. Accordingly, the second symmetric attachment pattern unit may repeat, as needed, along the stacking direction D depending upon the energy storage device 100 or the secondary battery 102 and the intended use(s) thereof. Other exemplary symmetric attachment pattern units have been contemplated, as would be appreciated by a person having skill in the art.

In one exemplary embodiment, a first asymmetric or random attachment pattern may include two or more counter-electrode current collectors 140 affixed to the first secondary growth constraint 158 and the second secondary growth constraint 160, as above, where the two or more affixed counter-electrode current collectors 140 may be individually designated as affixed counter-electrode current collector 140A, affixed counter-electrode current collector 140B, affixed counter-electrode current collector 140C, and affixed counter-electrode current collector 140D. Affixed counter-electrode current collector 140A and affixed counter-electrode structure current collector 140B may flank (1+x) electrode structures 110, affixed counter-electrode current collector 140B and affixed counter-electrode current collector 140C may flank (1+y) electrode structures 110, and affixed counter-electrode current collector 140C and affixed counter-electrode current collector 140D may flank (1+z) electrode structures 110, wherein the total amount of electrode structures 110 (i.e., x, y, or z) between any two affixed counter-electrode current collectors 140A-140D are non-equal (i.e., x≠y≠z) and may be further separated by non-affixed counter-electrode current collectors 140. Stated alternatively, any number of counter-electrode current collectors 140 may be affixed to the first secondary growth constraint 158 and the second secondary growth constraint 160, as above, whereby between any two affixed counter-electrode current collectors 140 may include any non-equivalent number of electrode structures 110 separated by non-affixed counter-electrode current collectors 140. Other exemplary asymmetric or random attachment patterns have been contemplated, as would be appreciated by a person having skill in the art.

Referring now to FIG. 10, a Cartesian coordinate system is shown for reference having a vertical axis (Z axis), a longitudinal axis (Y axis), and a transverse axis (X axis); wherein the X axis is oriented as coming out of the plane of the page); and a designation of the stacking direction D, as described above, co-parallel with the Y axis. More specifically, FIG. 10 shows a cross section, along the line A-A' as in FIG. 1A, having the first and second primary growth constraints 154, 166, respectively, affixed to the first and second secondary growth constraints 158, 160, respectively, via glue 182, as described above. Further, in one embodiment, illustrated is a plurality of counter-electrode current collectors 140 affixed to the first and second secondary growth constraints 158, 160, respectively, via glue 182. More specifically, the plurality of counter-electrode current collectors 140 may include a bulbous or dogbone shaped cross section. Stated alternatively, the counter-electrode current collectors 140 may have increased current collector 140 width near the top 1072 and the bottom 1074 of the counter-electrode backbone 141 with respect to a width of the current collector 140 near a midpoint between the top 1072 and the bottom 1074 of the counter-electrode backbone 141. That is, the bulbous cross-section of the counter-electrode current collector 140 width towards the top of the current collector 140 may taper towards the middle of the counter-electrode current collector 140, and increase again to provide a bulbous cross-section towards the bottom of the counter-electrode current collector 140. Accordingly, the application of glue 182 may surround the bulbous or dogbone portions of counter-electrode current collector 140 and affix counter-electrode current collector 140 to first and second secondary growth constraints 158, 160, respectively, as described above. In this embodiment, the bulbous or dogbone shaped counter-electrode current collector 140 may provide an increased strength of attachment to the first and second secondary growth constraints 158, 160, respectively, compared to other embodiments described herein. Also illustrated in FIG. 10 are electrode structures 110 with corresponding electrode gaps 1084, each as described above, and separators 130. Further, in this embodiment, the plurality of counter-electrode current collectors 140 may be affixed in a symmetric or asymmetric pattern as described above. Further still, in this embodiment, electrode structures 110 may be in contact with, but not affixed to, the first and second secondary growth constraints 158, 160, respectively, as described above.

Figure 11A:
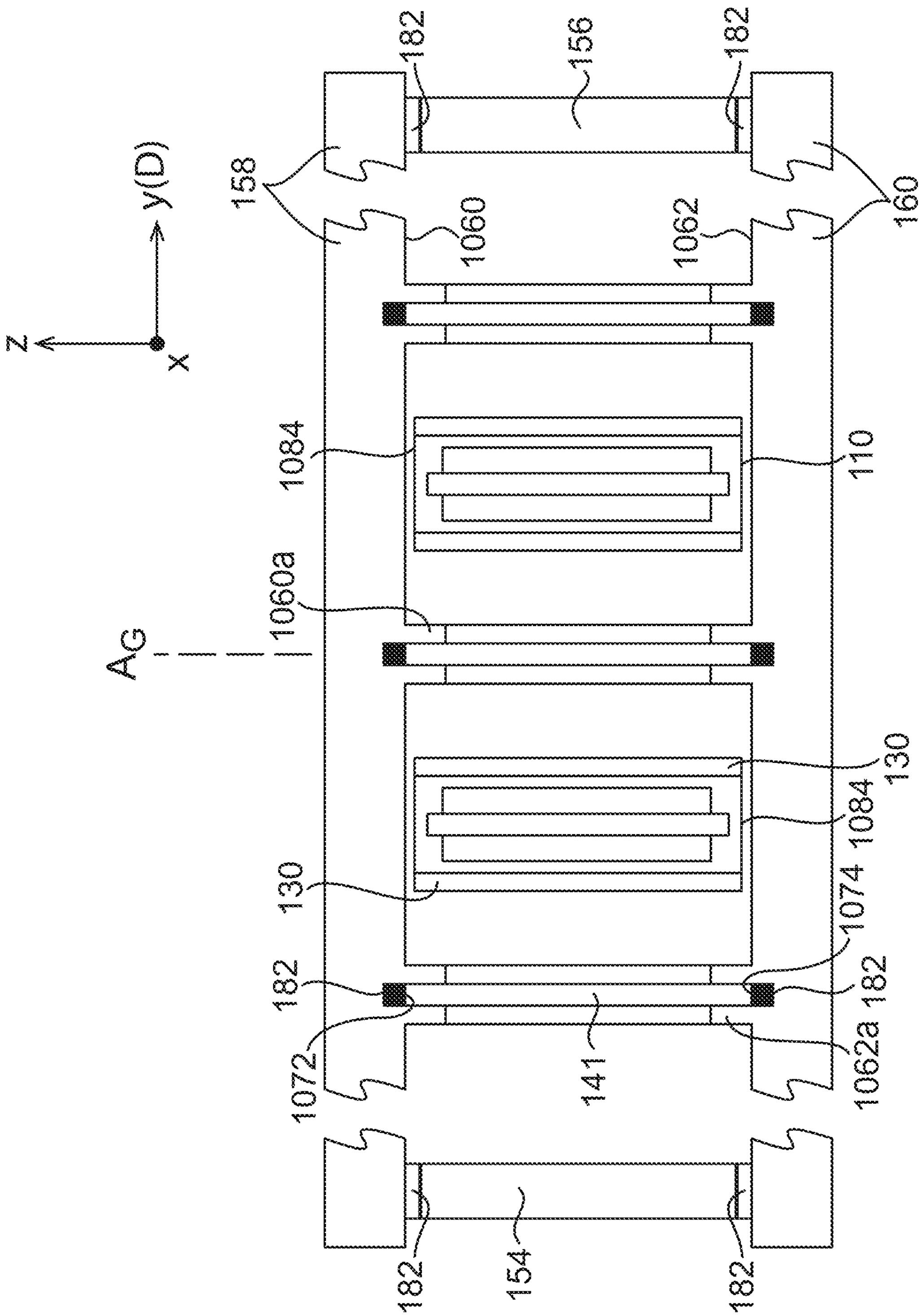
FIG. 11A illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the counter-electrode backbones are used for assembling the set of electrode constraints via notches.
Figure 11B:
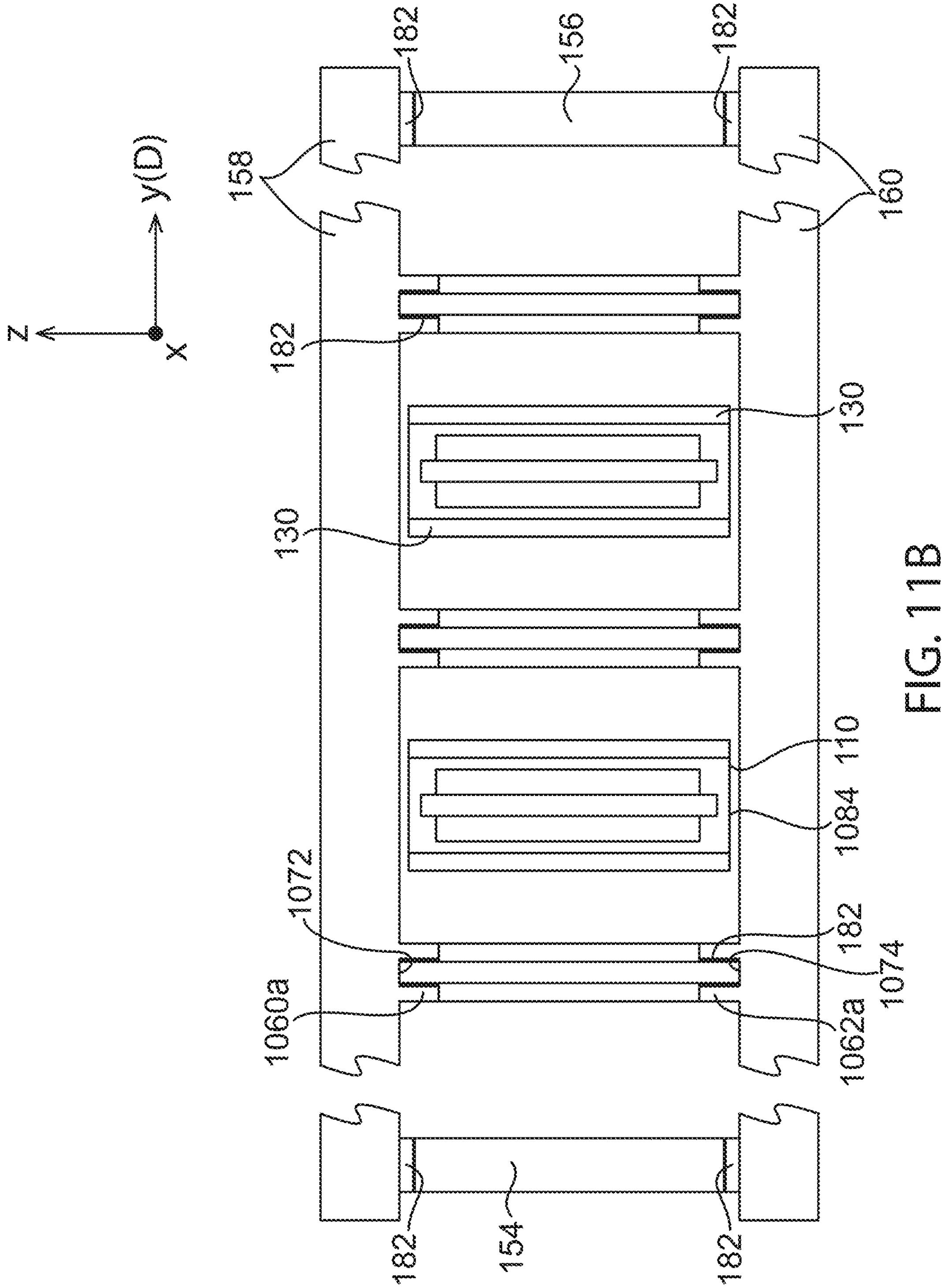
FIG. 11B illustrates a cross-section of an embodiment of the electrode assembly taken along the line A-A' as shown in FIG. 1A, further including a set of electrode constraints, including another embodiment of a primary growth constraint system and another embodiment of a secondary growth constraint system where the counter-electrode backbones are used for assembling the set of electrode constraints via notches.
Figure 11C:
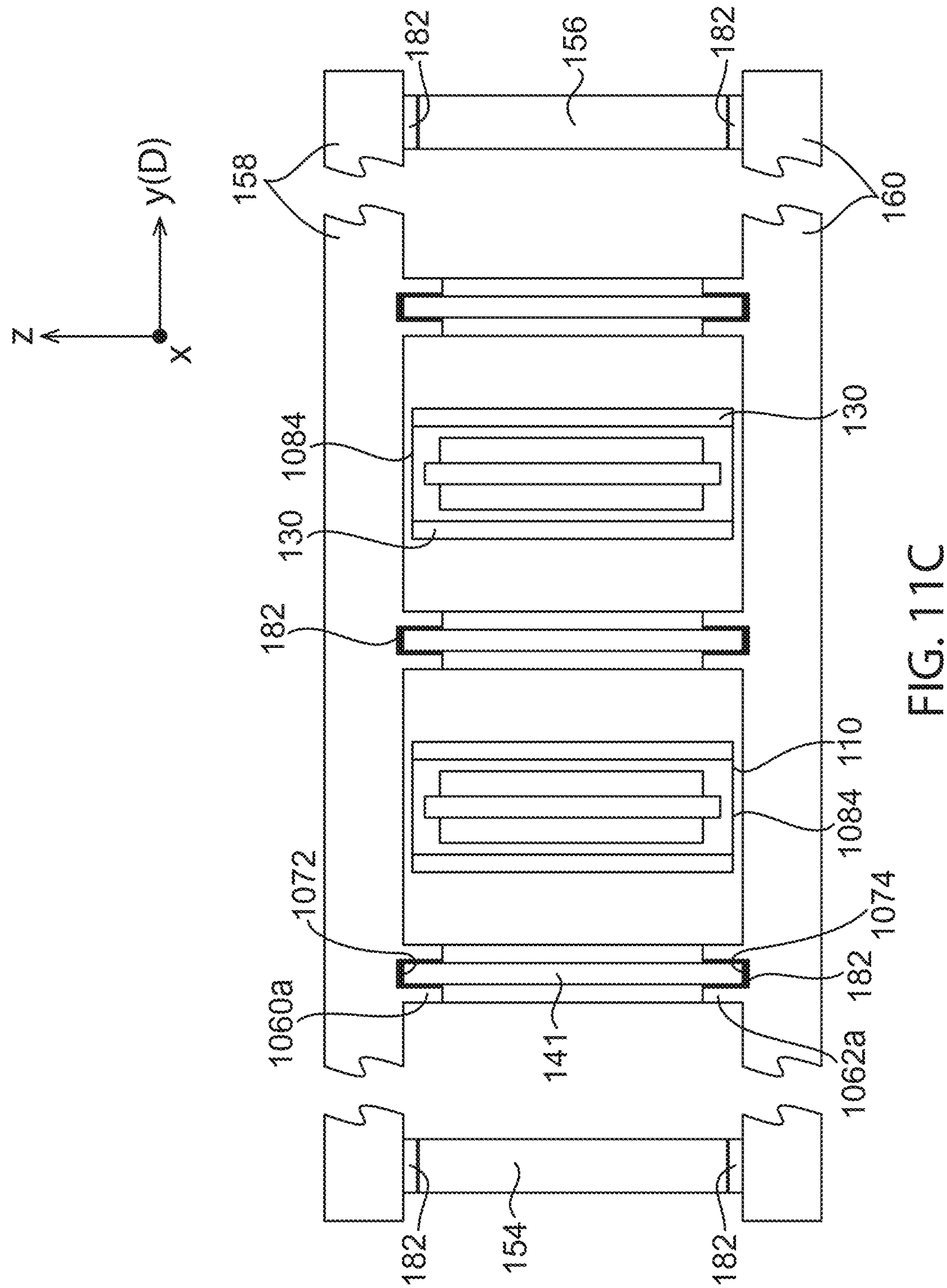
FIG. 11C illustrates a cross-section of an embodiment of the electrode assembly taken along the line A-A' as shown in FIG. 1A, further including a set of electrode constraints, including yet another embodiment of a primary growth constraint system and yet another embodiment of a secondary growth constraint system where the counter-electrode backbones are used for assembling the set of electrode constraints via notches.

Another mode for affixing the counter-electrode structures 112 to the first and second secondary growth constraints 158, 160, respectively, via glue 182 includes the use of notches within the inner surface 1060 of the first secondary growth constraint 158 and the inner surface 1062 of the second secondary growth constraint 160. Referring now to FIGS. 11A-11C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 11A-11C each show a cross section, along the line A-A' as in FIG. 1A, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 11A-11C, non-affixed electrode structures 110 may include electrode gaps 1084 between their tops and the first secondary growth constraint 158, and their bottoms and the second secondary growth constraint 160, as described in more detail above.

More specifically, in one embodiment, as shown in FIG. 11A, a plurality of counter-electrode backbones 141 may be affixed to the inner surface 1060 of the first secondary growth constraint 158 and the inner surface 1062 of the second secondary growth constraint 160 via a notch **1060*a* and 1062*a*, and a layer of glue 182. Accordingly, in certain embodiments, the plurality of counter-electrode backbones 141 affixed to the first and second secondary growth constraints 158, 160, respectively, via notches 1060*a*, 1062*a* may include a symmetrical pattern about a gluing axis $A_G$ with respect to affixed counter-electrode backbones 141, as described above. In certain embodiments, the plurality of counter-electrode backbones 141 affixed to the first and second secondary growth constraints 158, 160, respectively, via notches 1060*a*, 1062*a* may include an asymmetric or random pattern about a gluing axis $A_G$ with respect to affixed counter-electrode backbones 141**, as described above.

In certain embodiments, notches **1060*a*, 1062*a* may have a depth within the first and second secondary growth constraints 158, 160, respectively. For example, in one embodiment, a notch 1060*a* or 1062*a* may have a depth within the first and second secondary growth constraints 158, 160, respectively, of 25% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a* or 1062*a* may have a depth within the first and second secondary growth constraints 158, 160, respectively, of 50% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a* or 1060*b* may have a depth within the first and second secondary growth constraints 158, 160, respectively, of 75% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060***a* or 1062*a* may have a depth within the first and second secondary growth constraints 158, 160, respectively, of 90% of the height of the first and the second secondary growth constraints 158, 160, respectively (i.e., the heights of the first and second secondary growth constraints in this embodiment may be analogous to $H_{158}$ and $H_{160}$, as described above). Alternatively stated, each member of the plurality of the counter-electrode backbones 141 may include a height $H_{CESB}$ that effectively meets and extends into both the inner surface 1060 of the first secondary growth constraint 158 and the inner surface 1062 of the second secondary growth constraint 160, and may be affixed into the notch 1060*a* of the first secondary growth constraint 158 and into the notch 1062*a* of the second secondary growth constraint 160 via glue 182 in a notched embodiment.

Further, FIGS. 11A-11C also depict different embodiments for gluing the plurality of the counter-electrode backbones 141 in a notched embodiment. For example, in one embodiment depicted in FIG. 11A, the plurality of counter-electrode backbones 141 may be glued 182 via a counter-electrode backbone top 1072 and a counter-electrode backbone bottom 1074. By way of further example, in one embodiment depicted in FIG. 11B, the plurality of counter-electrode backbones 141 may be glued 182 via the lateral surfaces of the counter-electrode backbones 141. By way of further example, in one embodiment depicted in FIG. 11C, the plurality of counter-electrode backbones 141 may be glued 182 via the top 1072, the bottom 1074, and the lateral surfaces of the counter-electrode backbones 141.

Figure 12A:
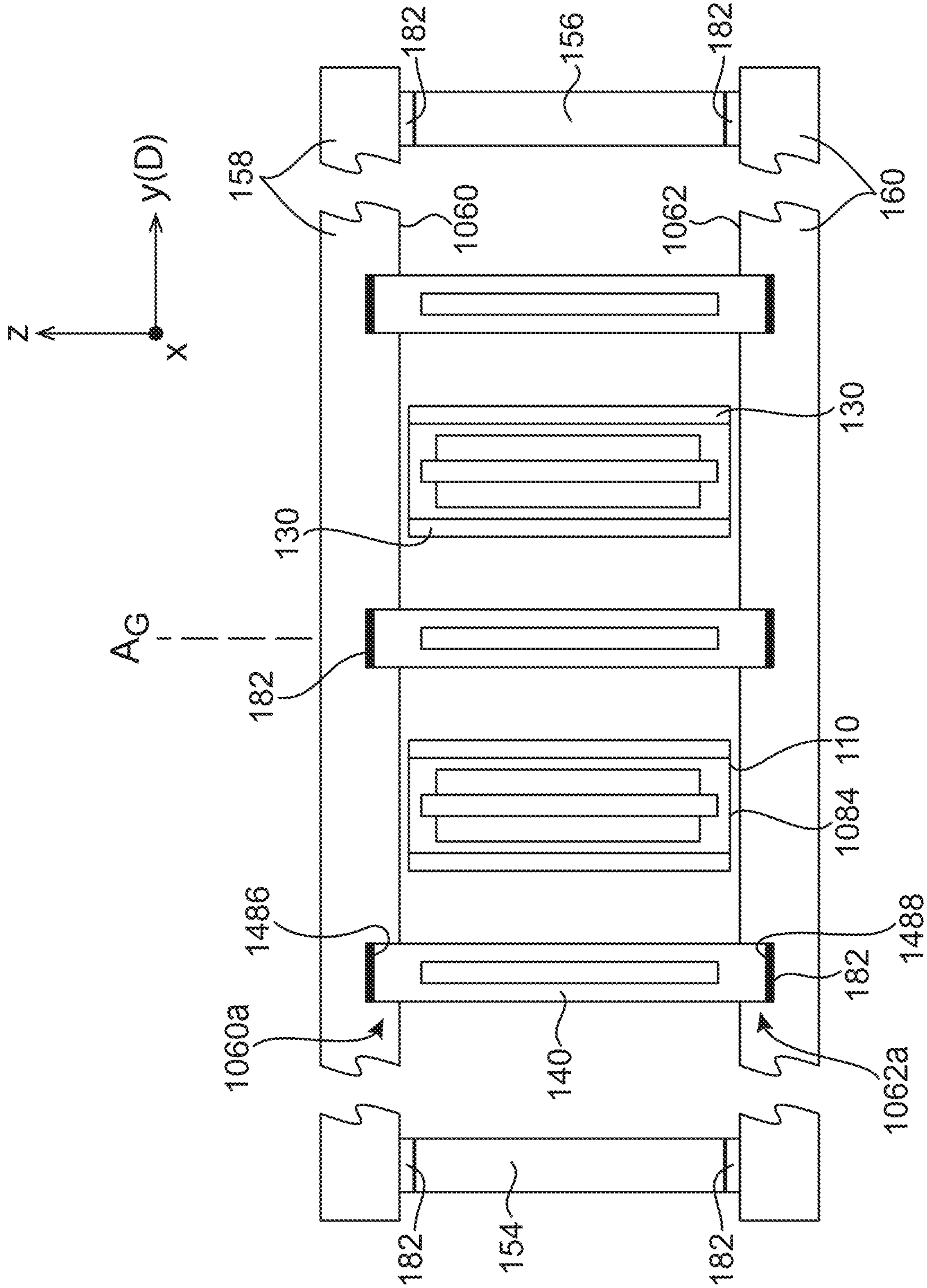
FIG. 12A illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the counter-electrode current collectors are used for assembling the set of electrode constraints via notches.
Figure 12B:
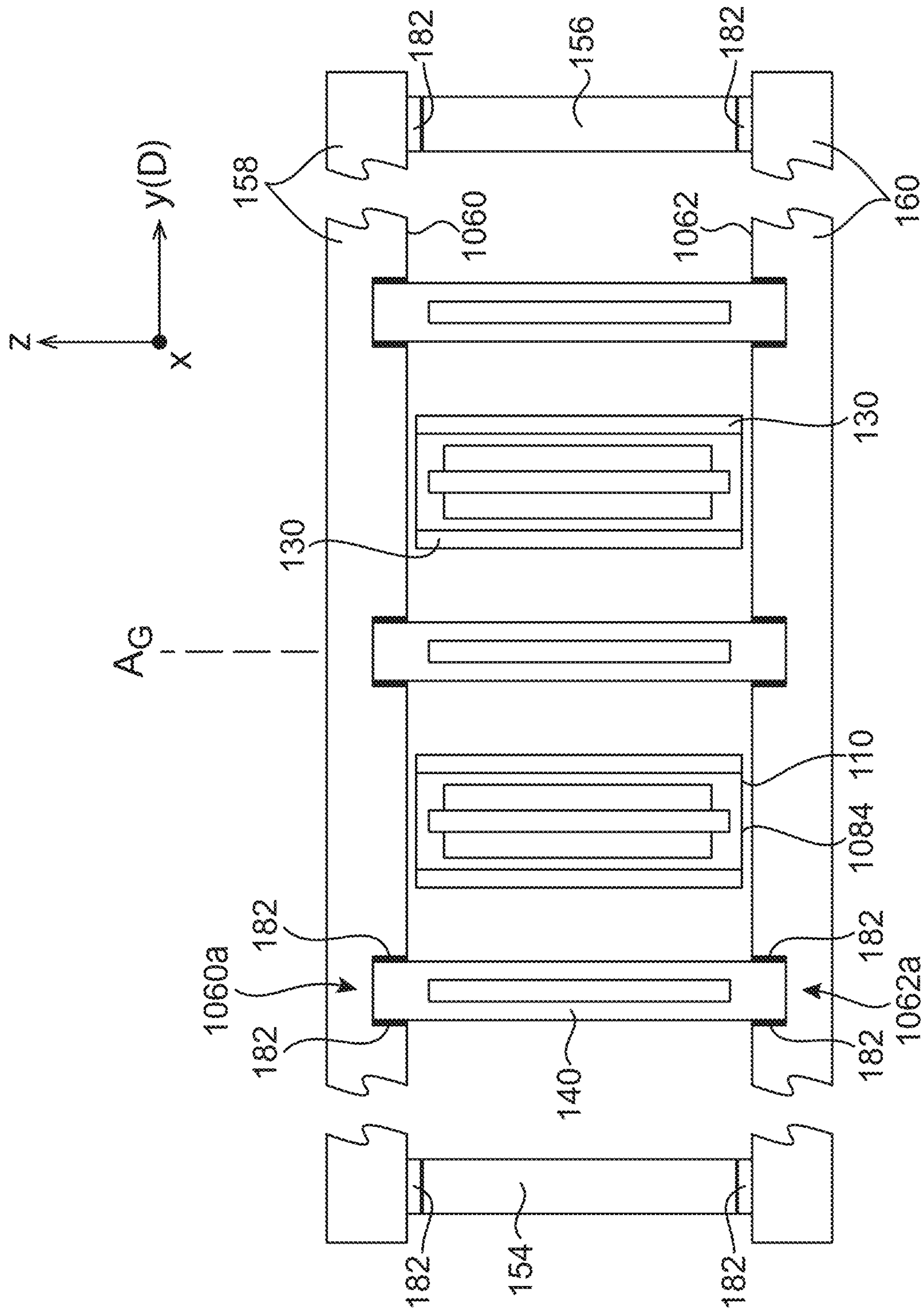
FIG. 12B illustrates a cross-section of an embodiment of the electrode assembly taken along the line A-A' as shown in FIG. 1A, further including a set of electrode constraints, including another embodiment of a primary growth constraint system and another embodiment of a secondary growth constraint system where the counter-electrode current collectors are used for assembling the set of electrode constraints via notches.
Figure 12C:
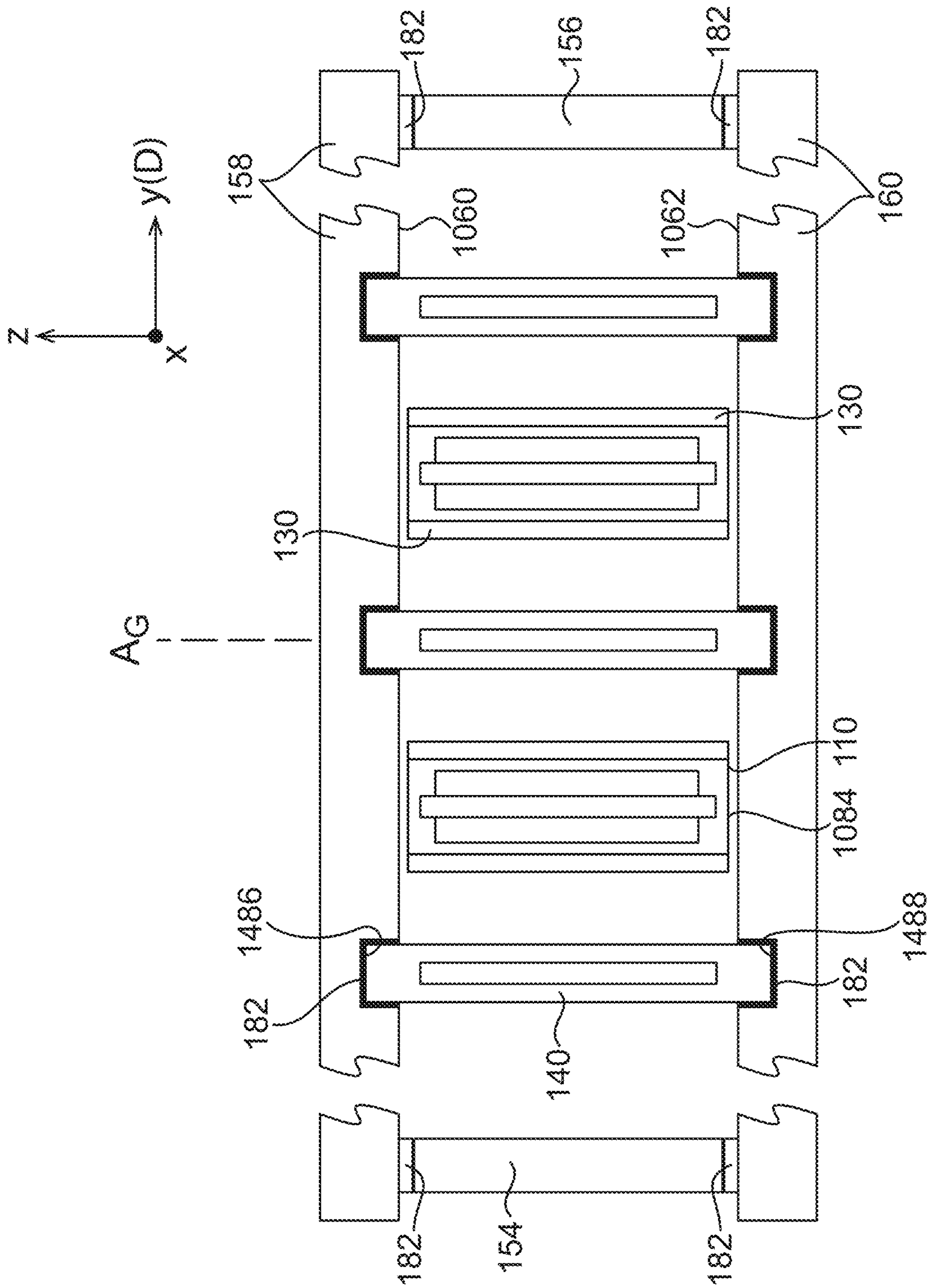
FIG. 12C illustrates a cross-section of an embodiment of the electrode assembly taken along the line A-A' as shown in FIG. 1A, further including a set of electrode constraints, including yet another embodiment of a primary growth constraint system and yet another embodiment of a secondary growth constraint system where the counter-electrode current collectors are used for assembling the set of electrode constraints via notches.

Further, another mode for affixing the counter-electrode structures 112 to the first and second secondary growth constraints 158, 160, respectively, via glue 182 includes, again, the use of notches 1060*a* and 1062*a* within the inner surface 1060 of the first secondary growth constraint 158 and the inner surface 1062 of the second secondary growth constraint 160. Referring now to FIGS. 12A-12C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 12A-12C each show a cross section, along the line A-A' as in FIG. 1A, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 12A-12C, non-affixed electrode structures 110 may include electrode gaps 1084 between their tops 1052 and the first secondary growth constraint 158, and their bottoms 1054 and the second secondary growth constraint 160, as described in more detail above.

More specifically, in one embodiment, as shown in FIG. 12A, a plurality of counter-electrode current collectors 140 may be affixed to the inner surface 1060 of the first secondary growth constraint 158 and the inner surface 1062 of the second secondary growth constraint 160 via a notch 1060*a* and 1062*a*, and a layer of glue 182. Accordingly, in certain embodiments, the plurality of counter-electrode current collectors 140 affixed to the first and second secondary growth constraints 158, 160, respectively, via notches 1060*a*, 1062*a* may include a symmetrical pattern about a gluing axis $A_G$ with respect to affixed counter-electrode current collectors 140, as described above. In certain embodiments, the plurality of counter-electrode current collectors 140 affixed to the first and second secondary growth constraints 158, 160, respectively, via notches 1060*a*, 1062*a* may include an asymmetric or random pattern about a gluing axis $A_G$ with respect to affixed counter-electrode current collectors 140, as described above.

In certain embodiments, notches 1060*a*, 1062*a* may have a depth within the first and second secondary growth constraints 158, 160, respectively. For example, in one embodiment, a notch 1060*a* or 1062*a* may have a depth within the first and second secondary growth constraints 158, 160, respectively, of 25% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a* or 1062*a* may have a depth within the first and second secondary growth constraints 158, 160, respectively, of 50% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a* or 1062*a* may have a depth within the first and second secondary growth constraints 158, 160, respectively, of 75% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a* or 1062*a* may have a depth within the first and second secondary growth constraints 158, 160, respectively, of 90% of the height of the first and the second secondary growth constraints 158, 160, respectively (i.e., the heights of the first and second secondary growth constraints in this embodiment may be analogous to $H_{158}$ and $H_{160}$, as described above). Alternatively stated, each member of the plurality of the counter-electrode current collectors 140 may effectively meet and extend into both the inner surface 1060 of the first secondary growth constraint 158 and the inner surface 1062 of the second secondary growth constraint 160 (akin to the height $H_{CESB}$, as described above), and may be affixed into the notch 1060*a* of the first secondary growth constraint 158 and into the notch 1062*a* of the second secondary growth constraint 160 via glue 182 in a notched embodiment.

Further, FIGS. 12A-12C also depict different embodiments for gluing the plurality of the counter-electrode current collectors 140 in a notched embodiment. For example, in one embodiment depicted in FIG. 12A, the plurality of counter-electrode current collectors 140 may be glued 182 via a counter-electrode current collector top 1486 and a counter-electrode current collector bottom 1488. By way of further example, in one embodiment depicted in FIG. 12B, the plurality of counter-electrode current collectors 140 may be glued 182 via the lateral surfaces of the counter-electrode current collectors 140 (akin to the lateral surfaces of the counter-electrode backbones 141, as described above). By way of further example, in one embodiment depicted in FIG. 12C, the plurality of counter-electrode current collectors 140 may be glued 182 via the top 1486, the bottom 1488, and the lateral surfaces of the counter-electrode current collectors 140.

In certain embodiments, a plurality of counter-electrode backbones 141 or a plurality of counter-electrode current collectors 140 may be affixed to the first secondary growth constraint 158 and the second secondary growth constraint 160 via a slot in each of the first secondary growth constraint 158 and the second secondary growth constraint 160, via an interlocking connection embodiment. Referring now to FIGS. 13A-13C and 14, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 13A-13C and 14 each show a cross section, along the line A-A' as in FIG. 1A, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 13A-13C and 14, non-affixed electrode structures 110 may include electrode gaps 1084 between their tops 1052 and the first secondary growth constraint 158, and their bottoms 1054 and the second secondary growth constraint 160, as described in more detail above.

Figure 13A:
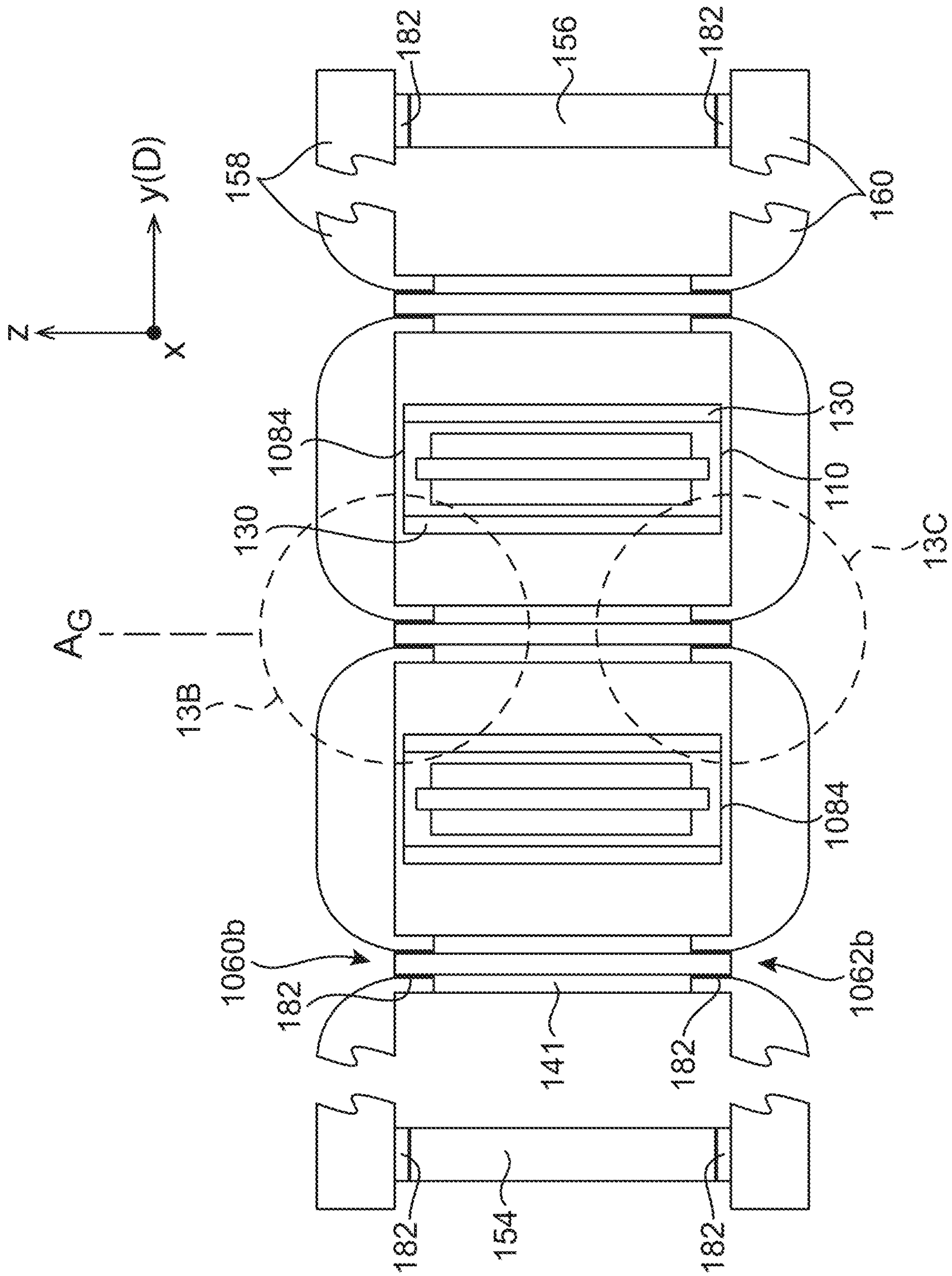
FIG. 13A illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the counter-electrode backbones are used for assembling the set of electrode constraints via slots.

More specifically, in one embodiment shown in FIG. 13A, a plurality of counter-electrode backbones 141 may be affixed to the first secondary growth constraint 158 and the second secondary growth constraint 160 via a slot 1060*b* and 1062*b*, and a layer of glue 182. Accordingly, in certain embodiments, the plurality of counter-electrode backbones 141 affixed to the first and second secondary growth constraints 158, 160, respectively, via slots 1060*b* and 1062*b* may include a symmetrical pattern about a gluing axis $A_G$ with respect to affixed counter-electrode backbones 141, as described above. In certain embodiments, the plurality of counter-electrode backbones 141 affixed to the first and second secondary growth constraints 158, 160, respectively, via slots 1060*b* and 1062*b* may include an asymmetric or random pattern about a gluing axis $A_G$ with respect to affixed counter-electrode backbones 141, as described above.

In certain embodiments, slots 1060*b* and 1062*b* in each of the first secondary growth constraint 158 and the second secondary growth constraint 160 may extend through the first secondary growth constraint 158 and the second secondary growth constraint 160, respectively, in order to receive the plurality of counter-electrode backbones 141 in an interlocked embodiment. Stated alternatively, the plurality of counter-electrode backbones 141 include a height $H_{CESB}$ that meets and extends entirely through both the first secondary growth constraint height $H_{158}$, as described above, via slot 1060*b* and the second secondary growth constraint height $H_{160}$, as described above via slot 1062*b*, thereby interlocking with both the first secondary growth constraint 158 and the second secondary growth constraint 160 in an interlocked embodiment. In certain embodiments, glue 182 may be used to affix or reinforce the interlocking connection between the lateral surfaces of the plurality of counter-electrode backbones 141 and the slots 1060*b*, 1062*b*, respectively.

Figure 13B:
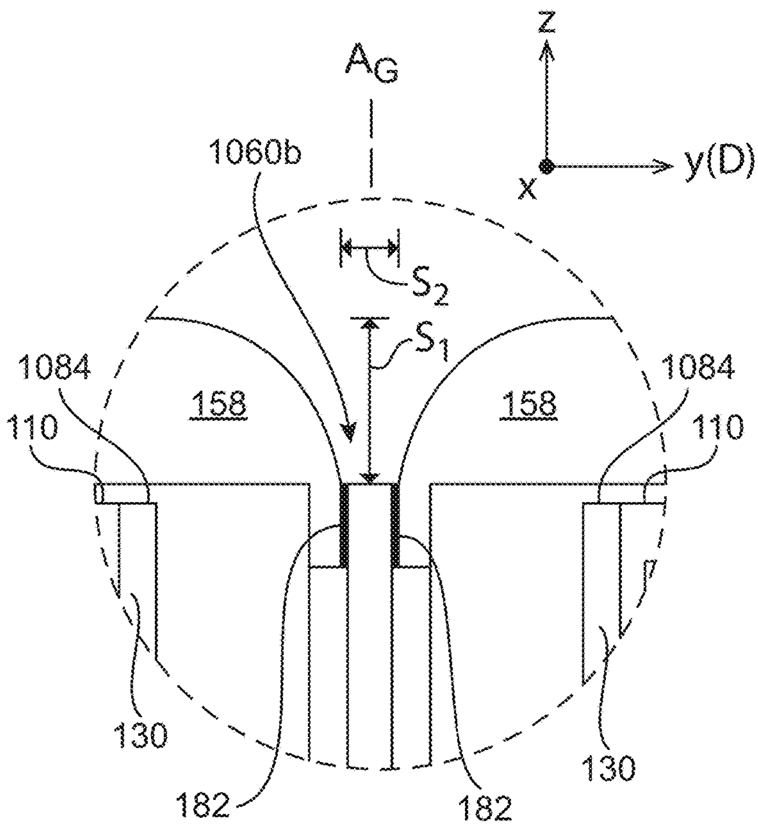
FIG. 13B illustrates a inset cross-section from FIG. 13A of an embodiment of the electrode assembly taken along the line A-A' as shown in FIG. 1A, further including a set of electrode constraints, including one embodiment of a primary growth constraint system and one embodiment of a secondary growth constraint system where the counter-electrode backbones are used for assembling the set of electrode constraints via slots.
Figure 13C:
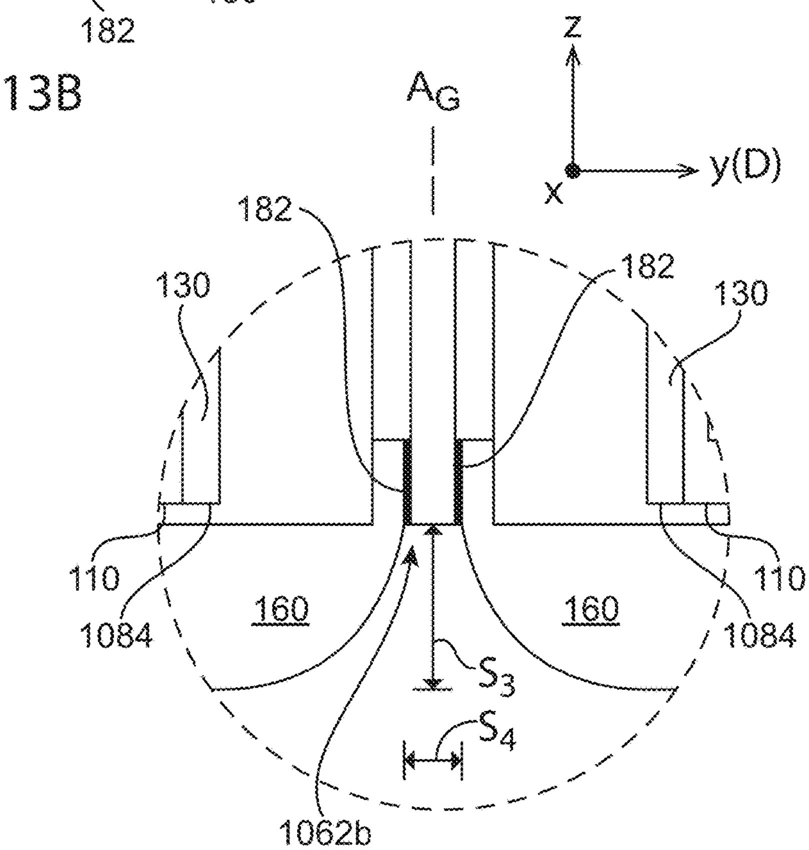
FIG. 13C illustrates a inset cross-section from FIG. 13A of an embodiment of the electrode assembly taken along the line A-A' as shown in FIG. 1A, further including a set of electrode constraints, including one embodiment of a primary growth constraint system and one embodiment of a secondary growth constraint system where the counter-electrode backbones are used for assembling the set of electrode constraints via slots.

More specifically, as illustrated by FIGS. 13B-13C, slots 1060*b* and 1062*b* may be characterized by an aspect ratio. For example, in certain embodiments as illustrated in FIG. 13B, slot 1060*b* may include a first dimension $S_1$ defined as the distance between the top 1072 of the counter-electrode backbone 141 and the outer surface 1064 of the first secondary growth constraint 158, and a second dimension $S_2$ defined as the distance between two lateral surfaces of the counter-electrode backbone 141, as described above. Accordingly, for example, in one embodiment $S_1$ may be the same and/or similar dimension as the secondary growth constraint heights $H_{158}$ and $H_{160}$ described above, which in turn may have a height selected in relation to a counter-electrode structure height $H_{CES}$. For example, in one embodiment, $S_1$ may be less than 50% of a counter-electrode height $H_{CES}$. By way of further example, in one embodiment, $S_1$ may be less than 25% of a counter-electrode height $H_{CES}$. By way of further example, in one embodiment, $S_1$ may be less than 10% of a counter-electrode height $H_{CES}$, such as less than 5% of a counter-electrode height $H_{CES}$. Accordingly, for a counter-electrode height $H_{CES}$ in the range of 0.05 mm to 10 mm, $S_1$ may have a value in the range of 0.025 mm to 0.5 mm. Furthermore, in one embodiment, $S_2$ may be at least 1 micrometer. By way of further example, in one embodiment, $S_2$ may generally not exceed 500 micrometers. By way of further example, in one embodiment, $S_2$ may be in the range of 1 to about 50 micrometers. As such, for example, in one embodiment, the aspect ratio $S_1$:$S_2$ may be in a range of from 0.05 to 500. By way of further example, in one embodiment, the aspect ratio $S_1$:$S_2$ may be in a range of from 0.5 to 100.

Further, as illustrated in FIG. 13C, slot 1062*b* may include a first dimension $S_3$ defined as the distance between the bottom 1074 of the counter-electrode backbone 141 and the outer surface 1066 of the second secondary growth constraint 160, and a second dimension $S_4$ defined as the distance between two lateral surfaces of the counter-electrode backbone 141, as described above. In one embodiment, $S_3$ may be the same and/or similar dimension as the secondary growth constraint heights $H_{158}$ and $H_{160}$ described above, which in turn may have a height selected in relation to a counter-electrode height $H_{CES}$. For example, in one embodiment, $S_3$ may be less than 50% of a counter-electrode height $H_{CES}$. By way of further example, in one embodiment, $S_3$ may be less than 25% of a counter-electrode height $H_{CES}$. By way of further example, in one embodiment, $S_3$ may be less than 10% of a counter-electrode height $H_{CES}$, such as less than 5% of a counter-electrode height $H_{CES}$. Furthermore, in one embodiment $S_2$ may be at least 1 micrometer. By way of further example, in one embodiment, $S_2$ may generally not exceed 500 micrometers. By way of further example, in one embodiment, $S_2$ may be in the range of 1 to about 50 micrometers. As such, for example, in one embodiment, the aspect ratio $S_3$:$S_4$ may be in a range of from 0.05 to 500. By way of further example, in one embodiment, the aspect ratio $S_3$:$S_4$ may be in a range of from 0.5 to 100.

Figure 14:
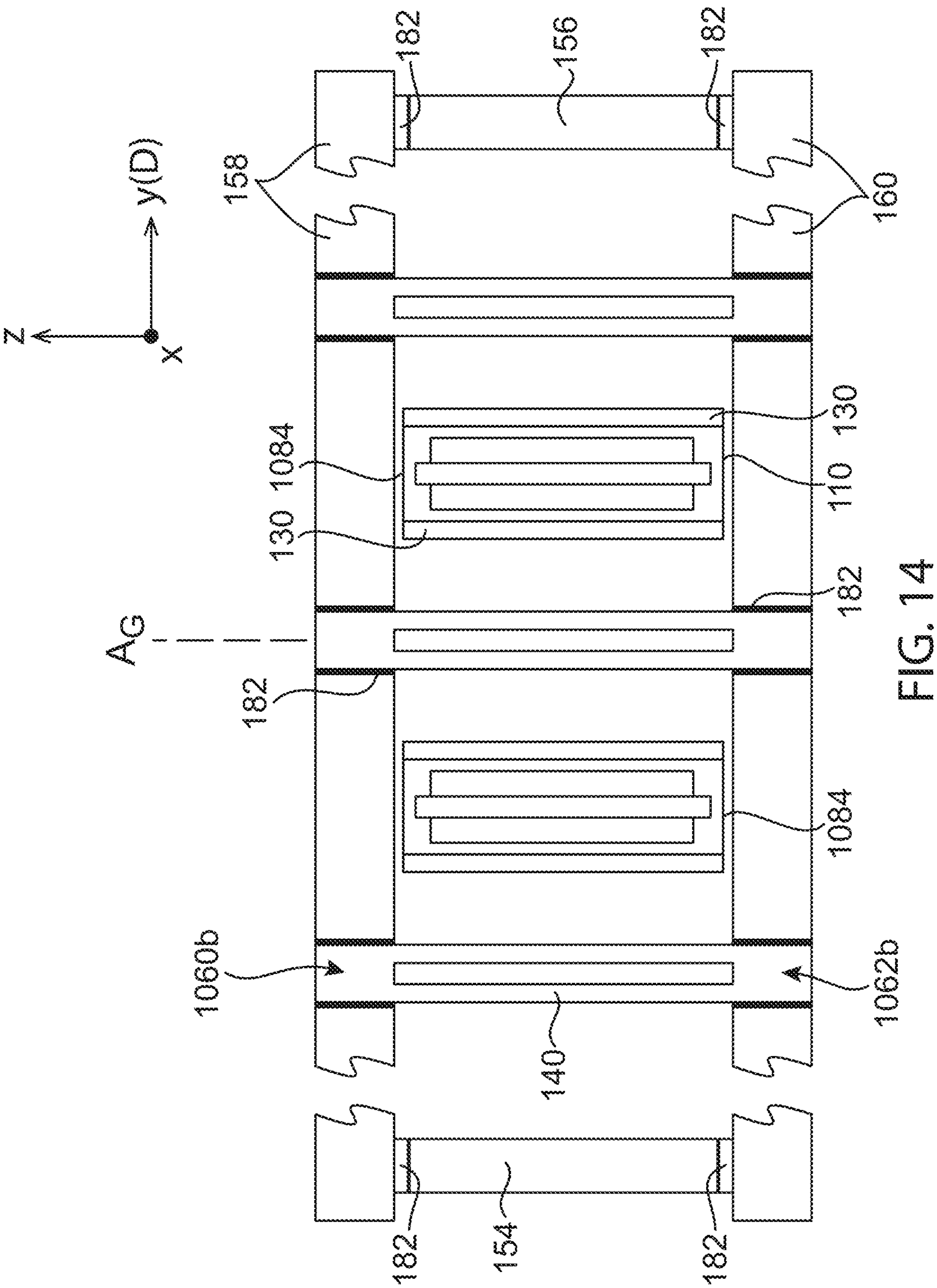
FIG. 14 illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the counter-electrode current collectors are used for assembling the set of electrode constraints via slots.

Referring now to FIG. 14, in another embodiment, a plurality of counter-electrode current collectors 140 may be affixed to the first secondary growth constraint 158 and the second secondary growth constraint 160 via a slot 1060*b* and 1062*b*, and a layer of glue 182. Accordingly, in certain embodiments, the plurality of counter-electrode current collectors 140 affixed to the first and second secondary growth constraints 158, 160, respectively, via slots 1060*b*, 1062*b* may include a symmetrical pattern about a gluing axis $A_G$ with respect to affixed counter-electrode current collectors 140, as described above. In certain embodiments, the plurality of counter-electrode current collectors 140 affixed to the first and second secondary growth constraints 158, 160, respectively, via slots 1060*b*, 1062*b* may include an asymmetric or random pattern about a gluing axis $A_G$ with respect to affixed counter-electrode current collectors 140, as described above.

In certain embodiments, slots 1060*b*, 1062*b* in each of the first secondary growth constraint 158 and the second secondary growth constraint 160 may extend through the first secondary growth constraint 158 and the second secondary growth constraint 160, respectively, in order to receive the plurality of counter-electrode current collectors 140 in another interlocked embodiment. Stated alternatively, the plurality of counter-electrode current collectors 140 may effectively meet and extend entirely through both the first secondary growth constraint 158 and the second secondary growth constraint 160 (akin to the height $H_{CESB}$, as described above), and may be affixed into slots 1060*b* and 1062*b* via glue 182 in another interlocked embodiment.

Connections Via Electrode Structures

Figure 15A:
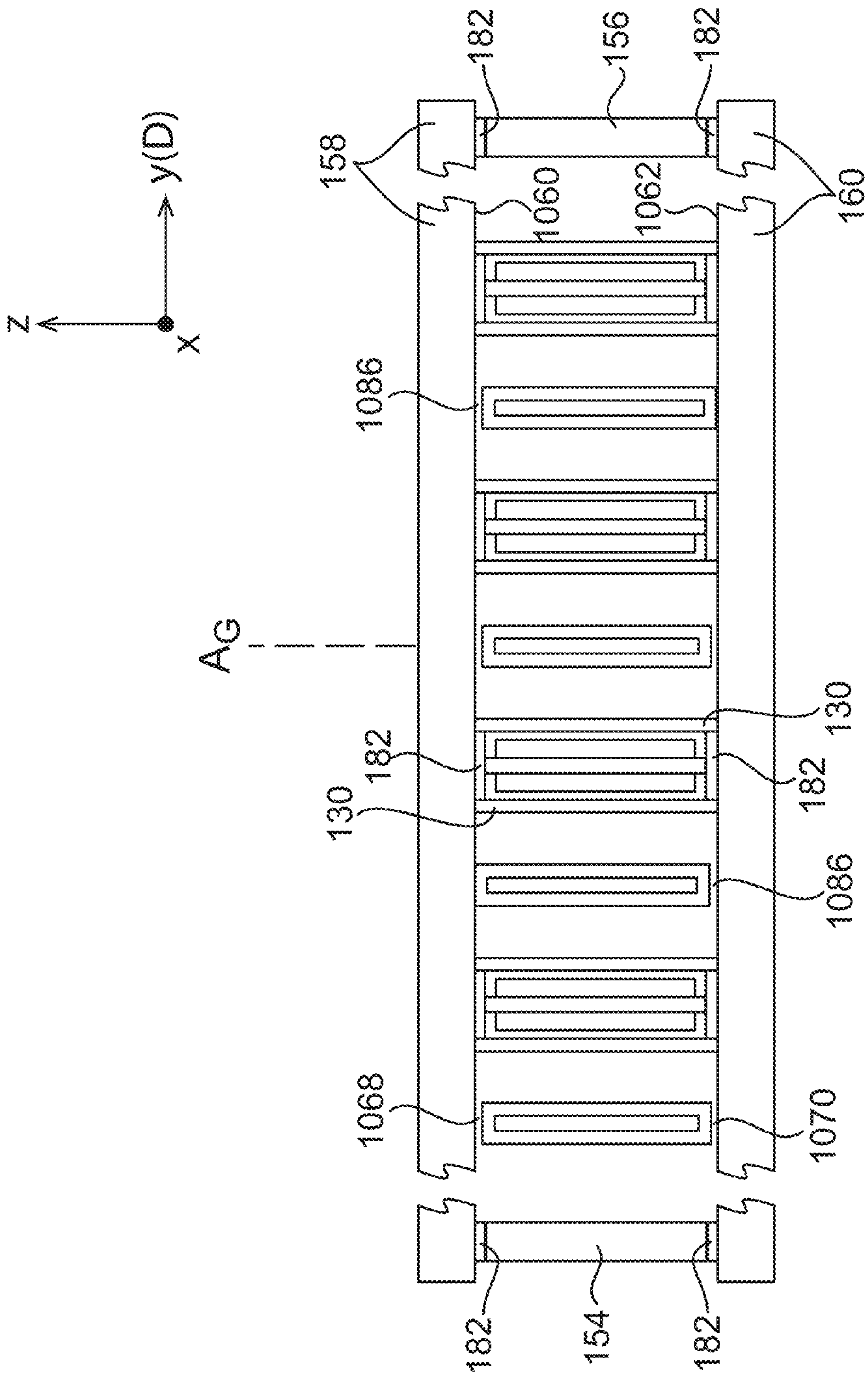
FIG. 15A illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the electrode backbones are used for assembling the set of electrode constraints.
Figure 15B:
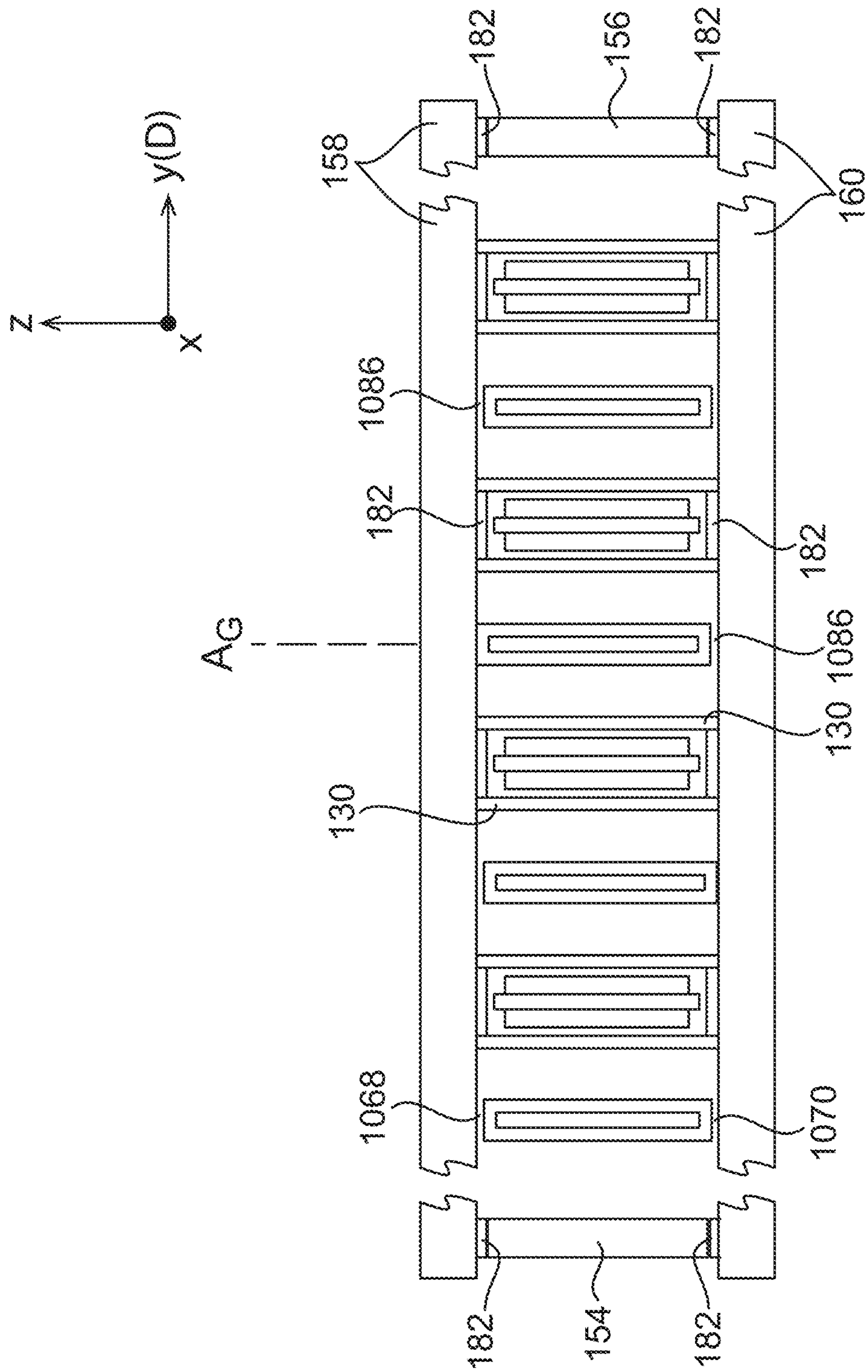
FIG. 15B illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the electrode current collectors are used for assembling the set of electrode constraints.

In alternative embodiments described below, the electrode structures 110 may also be independently affixed to the first and second secondary growth constraints 158, 160, respectively. Referring now to FIGS. 15A-15B, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 15A-15B each show a cross section, along the line A-A' as in FIG. 1A, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 15A-15B, non-affixed counter-electrode structures 112 may include counter-electrode gaps 1086 between their tops 1068 and the first secondary growth constraint 158, and their bottoms 1070 and the second secondary growth constraint 160. Stated alternatively, in certain embodiments, the top 1068 and the bottom 1070 of each counter-electrode structure 112 may have a gap 1086 between the first and second secondary constraints 158, 160, respectively. Further, in certain embodiments, also shown in FIGS. 15A-15B, the top 1068 of the counter-electrode structure 112 may be in contact with, but not affixed to, the first secondary growth constraint 158, the bottom 1070 of the counter-electrode structure 112 may be in contact with, but not affixed to, the second secondary growth constraint 160, or the top 1068 of the counter-electrode structure 112 may be in contact with, but not affixed to, the first secondary growth constraint 158 and the bottom 1070 of the counter-electrode structure 112 may in in contact with, but not affixed to, the second secondary growth constraint 160 (not illustrated).

More specifically, in one embodiment, as shown in FIG. 15A, a plurality of electrode backbones 134 may be affixed to the inner surface 1060 of the first secondary growth constraint 158 and the inner surface 1062 of the second secondary growth constraint 160 via a layer of glue 182. In certain embodiments, the plurality of electrode backbones 134 affixed to the first and second secondary growth constraints 158, 160, respectively, may include a symmetrical pattern about a gluing axis $A_G$ with respect to affixed electrode backbones 134. In certain embodiments, the plurality of electrode backbones 134 affixed to the first and second secondary growth constraints 158, 160, respectively, may include an asymmetric or random pattern about a gluing axis $A_G$ with respect to affixed electrode backbones 134. In certain embodiments, the electrode backbones 134 may comprise the electrode current collectors 136, and/or electrode current collectors 136 may be provided in place of electrode backbones, as shown for example in the embodiment shown in FIG. 1B.

In one exemplary embodiment, a first symmetric attachment pattern unit may include two electrode backbones 134 affixed to the first secondary growth constraint 158 and the second secondary growth constraint 160, as above, where the two affixed electrode backbones 134 flank one counter-electrode structure 112. Accordingly, the first symmetric attachment pattern unit may repeat, as needed, along the stacking direction D depending upon the energy storage device 100 or the secondary battery 102 and their intended use(s) thereof. In another exemplary embodiment, a second symmetric attachment pattern unit may include two electrode backbones 134 affixed to the first secondary growth constraint 158 and the second secondary growth constraint 160, as above, the two affixed electrode backbones 134 flanking two or more counter-electrode structures 112 and one or more non-affixed electrode backbones 134. Accordingly, the second symmetric attachment pattern unit may repeat, as needed, along the stacking direction D depending upon the energy storage device 100 or the secondary battery 102 and their intended use(s) thereof. Other exemplary symmetric attachment pattern units have been contemplated, as would be appreciated by a person having skill in the art.

In one exemplary embodiment, a first asymmetric or random attachment pattern may include two or more electrode backbones 134 affixed to the first secondary growth constraint 158 and the second secondary growth constraint 160, as above, where the two or more affixed electrode backbones 134 may be individually designated as affixed electrode backbone 134A, affixed electrode backbone 134B, affixed electrode backbone 134C, and affixed electrode backbone 134D. Affixed electrode backbone 134A and affixed electrode backbone 134B may flank (1+x) counter-electrode structures 112, affixed electrode backbone 134B and affixed electrode backbone 134C may flank (1+y) counter-electrode structures 112, and affixed electrode backbone 134C and affixed electrode backbone 134D may flank (1+z) counter-electrode structures 112, wherein the total amount of counter-electrode structures 112 (i.e., x, y, or z) between any two affixed electrode backbones 134A-134D are non-equal (i.e., $x \neq y \neq z$) and may be further separated by non-affixed electrode backbones 134. Stated alternatively, any number of electrode backbones 134 may be affixed to the first secondary growth constraint 158 and the second secondary growth constraint 160, as above, whereby between any two affixed electrode backbones 134 may include any non-equivalent number of counter-electrode structures 112 separated by non-affixed electrode backbones 134. Other exemplary asymmetric or random attachment patterns have been contemplated, as would be appreciated by a person having skill in the art.

More specifically, in one embodiment, as shown in FIG. 15B, a plurality of electrode current collectors 136 may be affixed to the inner surface 1060 of the first secondary growth constraint 158 and the inner surface 1062 of the second secondary growth constraint 160 via a layer of glue 182. In certain embodiments, the plurality of electrode current collectors 136 affixed to the first and second secondary growth constraints 158, 160, respectively, may include a symmetrical pattern about a gluing axis $A_G$ with respect to affixed electrode current collectors 136. In certain embodiments, the plurality of electrode current collectors 136 affixed to the first and second secondary 20 growth constraints 158, 160, respectively, may include an asymmetric or random pattern about a gluing axis $A_G$ with respect to affixed electrode current collectors 136.

In one exemplary embodiment, a first symmetric attachment pattern unit may include two electrode current collectors 136 affixed to the first secondary growth constraint 158 and the second secondary growth constraint 160, as above, where the two affixed electrode current collectors 136 flank one counter-electrode structure 112. Accordingly, the first symmetric attachment pattern unit may repeat, as needed, along the stacking direction D depending upon the energy storage device 100 or the secondary battery 102 and their intended use(s) thereof. In another exemplary embodiment, a second symmetric attachment pattern unit may include two electrode current collectors 136 affixed to the first secondary growth constraint 158 and the second secondary growth constraint 160, as above, the two affixed electrode current collectors 136 flanking two or more counter-electrode structures 112 and one or more non-affixed electrode current collectors 136. Accordingly, the second symmetric attachment pattern unit may repeat, as needed, along the stacking direction D depending upon the energy storage device 100 or the secondary battery 102 and their intended use(s) thereof. Other exemplary symmetric attachment pattern units have been contemplated, as would be appreciated by a person having skill in the art.

In one exemplary embodiment, a first asymmetric or random attachment pattern may include two or more electrode current collectors 136 affixed to the first secondary growth constraint 158 and the second secondary growth constraint 160, as above, where the two or more affixed electrode current collectors 136 may be individually designated as affixed electrode current collector 136A, affixed electrode current collector 136B, affixed electrode current collector 136C, and affixed electrode current collector 136D. Affixed electrode current collector 136A and affixed electrode current collector 136B may flank (1+x) counter-electrode structures 112, affixed electrode current collector 136B and affixed electrode current collector 136C may flank (1+y) counter-electrode structures 112, and affixed electrode current collector 136C and affixed electrode current collector 136D may flank (1+z) counter-electrode structures 112, wherein the total amount of counter-electrode structures 112 (i.e., x, y, or z) between any two affixed electrode current collectors 136A-136D are non-equal (i.e., x≠y≠z) and may be further separated by non-affixed electrode current collectors 136. Stated alternatively, any number of electrode current collectors 136 may be affixed to the first secondary growth constraint 158 and the second secondary growth constraint 160, as above, whereby between any two affixed electrode current collectors 136 may include any non-equivalent number of counter-electrode structures 112 separated by non-affixed electrode current collectors 136. Other exemplary asymmetric or random attachment patterns have been contemplated, as would be appreciated by a person having skill in the art.

Figure 16A:
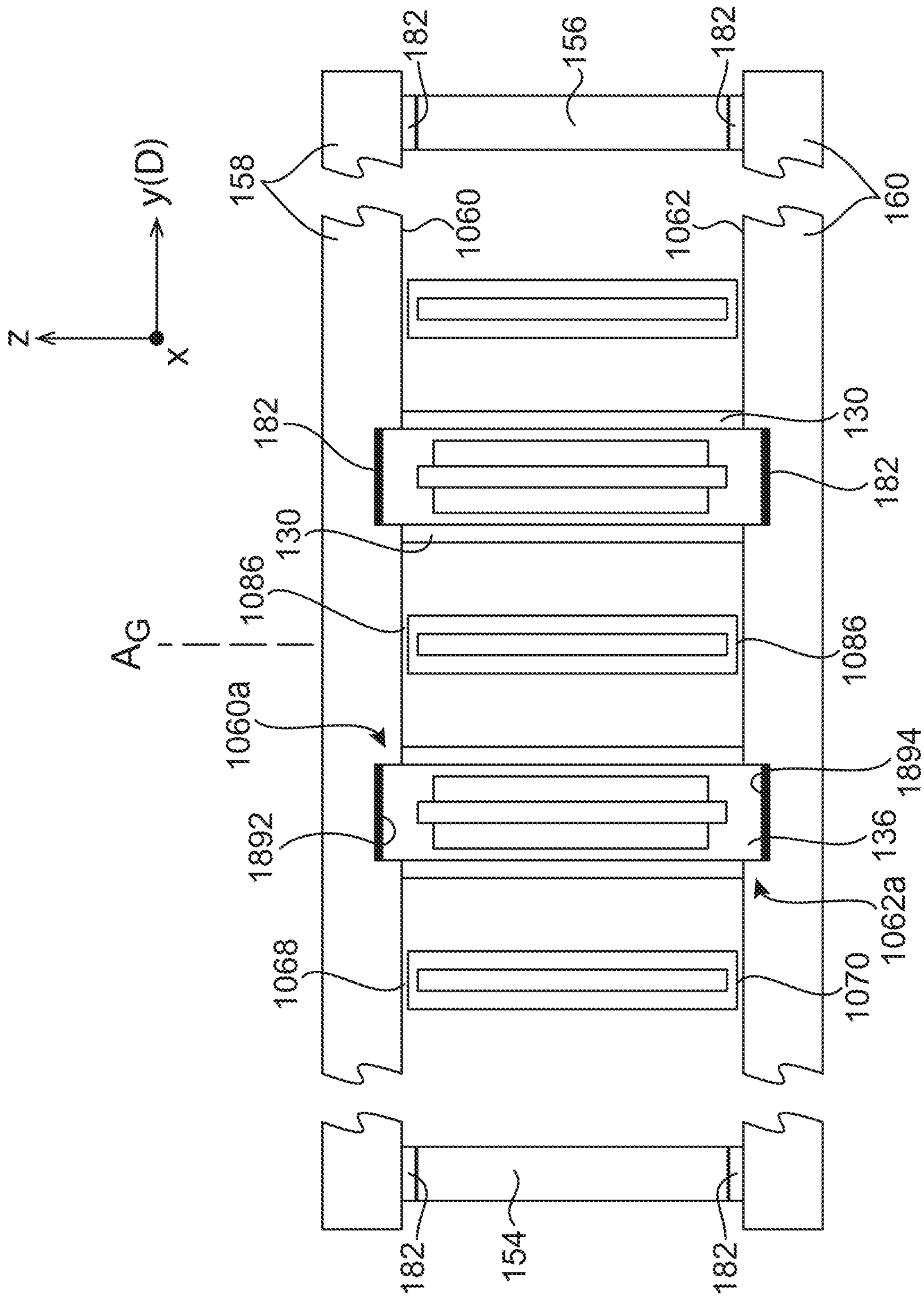
FIG. 16A illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the electrode current collectors are used for assembling the set of electrode constraints via notches.
Figure 16B:
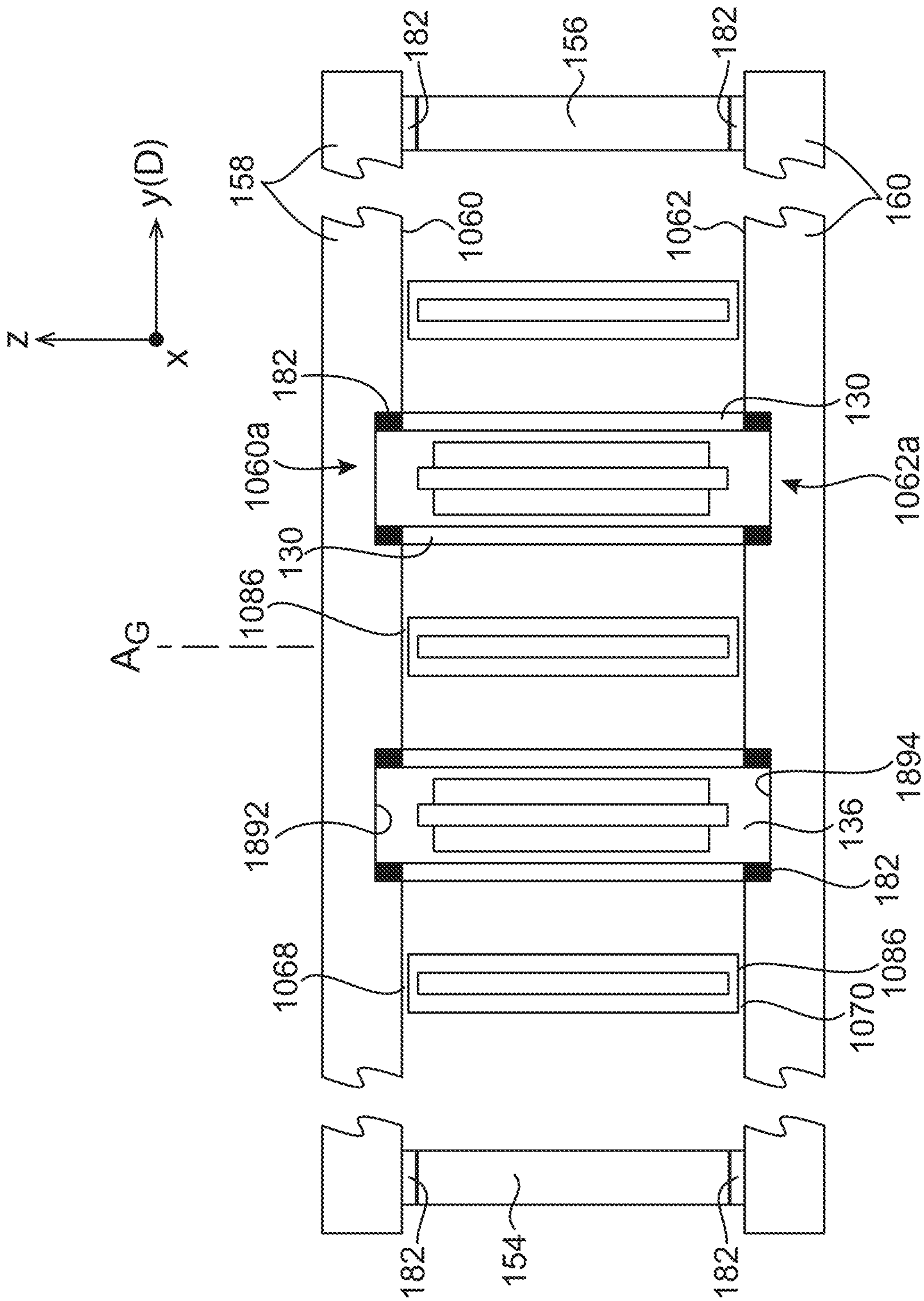
FIG. 16B illustrates a cross-section of an embodiment of the electrode assembly taken along the line A-A' as shown in FIG. 1A, further including a set of electrode constraints, including another embodiment of a primary growth constraint system and another embodiment of a secondary growth constraint system where the electrode current collectors are used for assembling the set of electrode constraints via notches.
Figure 16C:
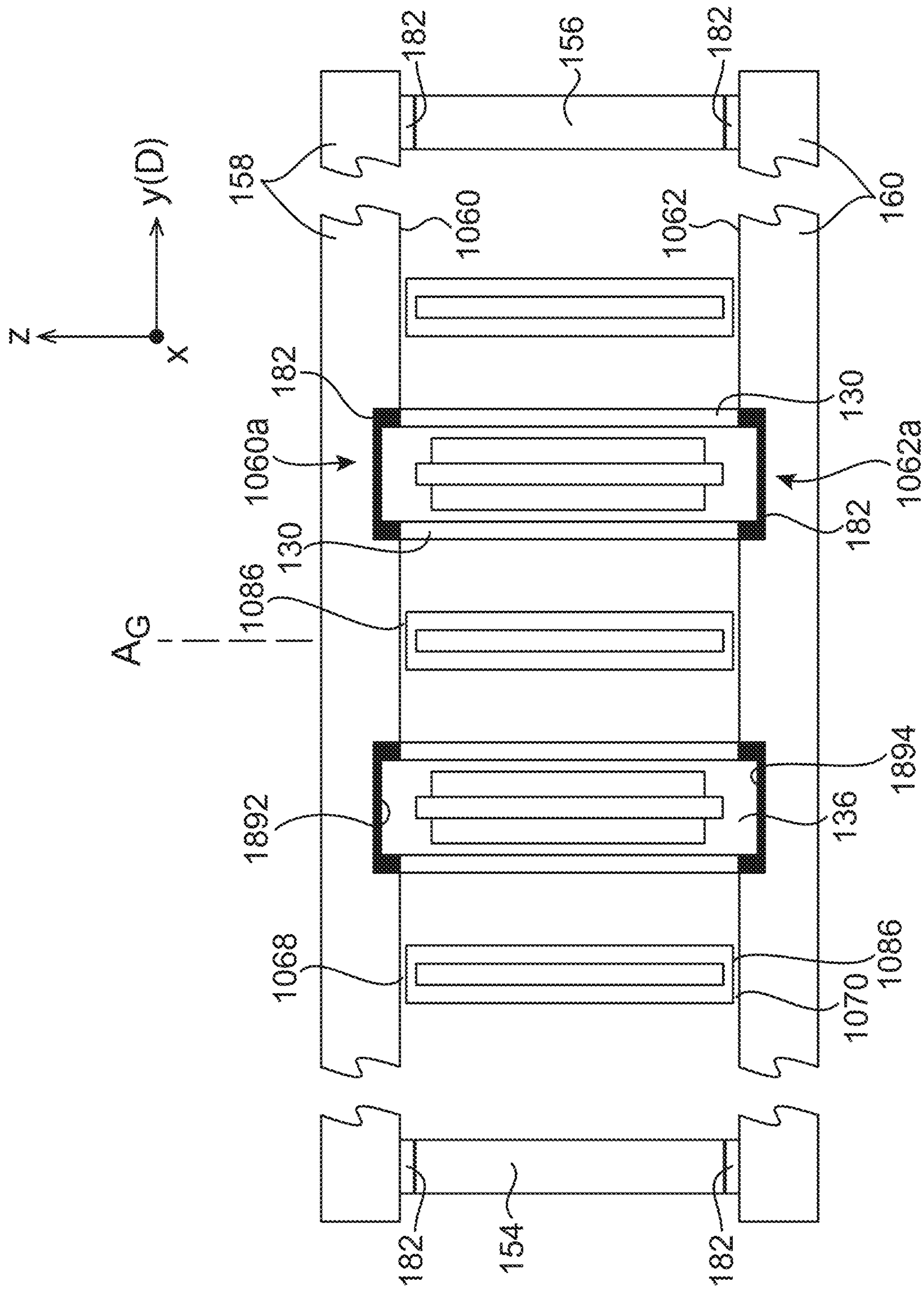
FIG. 16C illustrates a cross-section of an embodiment of the electrode assembly taken along the line A-A' as shown in FIG. 1A, further including a set of electrode constraints, including yet another embodiment of a primary growth constraint system and yet another embodiment of a secondary growth constraint system where the electrode current collectors are used for assembling the set of electrode constraints via 30 notches.

Another mode for affixing the electrode structures 110 to the first and second secondary growth constraints 158, 160, respectively, via glue 182 includes the use of notches 1060*a*, 1062*a* within the inner surface 1060 of the first secondary growth constraint 158 and the inner surface 1062 of the second secondary growth constraint 160. Referring now to FIGS. 16A-16C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 16A-16C each show a cross section, along the line A-A' as in FIG. 1A, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 16A-16C, non-affixed counter-electrode structures 112 may include counter-electrode gaps 1086 between their tops 1068 and the first secondary growth constraint 158, and their bottoms 1070 and the second secondary growth constraint 160, as described in more detail above.

More specifically, in one embodiment, as shown in FIG. 16A, a plurality of electrode current collectors 136 may be affixed to the inner surface 1060 of the first secondary growth constraint 158 and the inner surface 1062 of the second secondary growth constraint 160 via a notch 1060*a* and 1062*a*, and a layer of glue 182. Accordingly, in certain embodiments, the plurality of electrode current collectors 136 affixed to the first and second secondary growth constraints 158, 160, respectively, via notches 1060*a*, 1062*a* may include a symmetrical pattern about a gluing axis $A_G$ with respect to affixed electrode current collectors 136, as described above. In certain embodiments, the plurality of electrode current collectors 136 affixed to the first and second secondary growth constraints 158, 160, respectively, via notches 1060*a*, 1062*a* may include an asymmetric or random pattern about a gluing axis $A_G$ with respect to affixed electrode current collectors 136, as described above.

In certain embodiments, notches 1060*a*, 1062*a* may have a depth within the first and second secondary growth constraints 158, 160, respectively. For example, in one embodiment, a notch 1060*a*, 1062*a* may have a depth within the first and second secondary growth constraints 158, 160, respectively, of 25% of the height of the first and second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a*, 1062*a* may have a depth within the first and second secondary growth constraints 158, 160, respectively, of 50% of the height of the first and second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a*, 1062*a* may have a depth within the first and second secondary growth constraints 158, 160, respectively, of 75% of the height of the first and second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060*a*, 1062*a* may have a depth within the first and second secondary growth constraints 158, 160, respectively, of 90% of the height of the first and second secondary growth constraints 158, 160, respectively (i.e., the heights of the first and second secondary growth constraints in this embodiment may be analogous to $H_{158}$ and $H_{160}$, as described above). Alternatively stated, each member of the plurality of the electrode current collectors 136 may effectively meet and extend into both the inner surface 1060 of the first secondary growth constraint 158 and the inner surface 1062 of the second secondary growth constraint 160 (akin to the height $H_{CESB}$, as described above), and may be affixed into the notch 1060*a* of the first secondary growth constraint 158 and into the notch 1062*a* of the second secondary growth constraint 160 via glue 182 in a notched embodiment.

Further, FIG. 16A-16C also depict different embodiments for gluing the plurality of the electrode current collectors 136 in a notched embodiment. For example, in one embodiment depicted in FIG. 16A, the plurality of electrode current collectors 136 may be glued 182 via an electrode current collector top 1892 and an electrode current collector bottom 1894. By way of further example, in one embodiment depicted in FIG. 16B, the plurality of electrode current collectors 136 may be glued 182 via the lateral surfaces of the electrode current collectors 136 (akin to the lateral surfaces of the electrode backbones 134, as described above). By way of further example, in one embodiment depicted in FIG. 16C, the plurality of electrode current collectors 136 may be glued 182 via the top 1892, the bottom 1894, and the lateral surfaces of the electrode current collectors 136.

Figure 17:
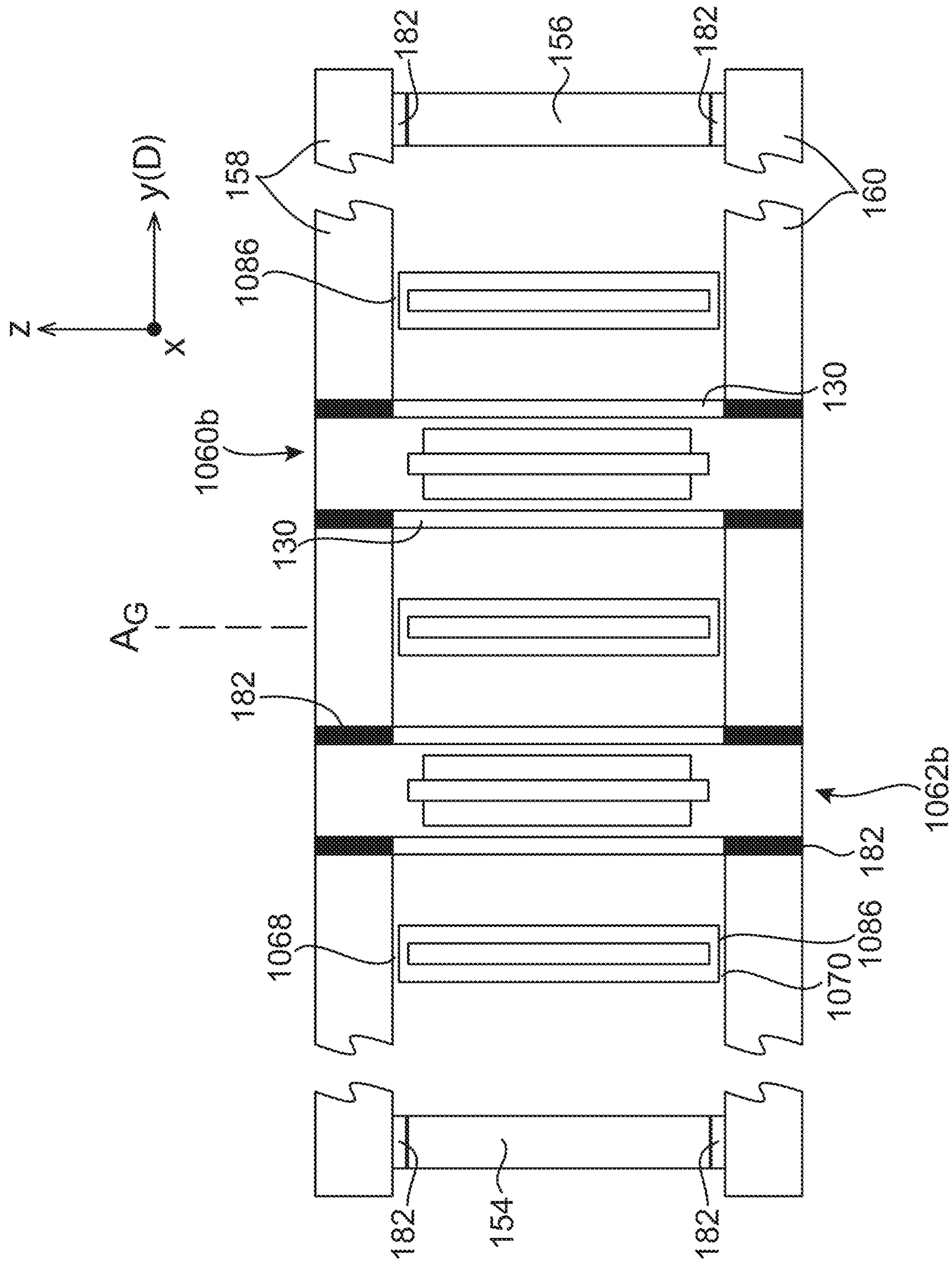
FIG. 17 illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the electrode current collectors are used for assembling the set of electrode constraints via slots.

In certain embodiments, a plurality of electrode current collectors 136 may be affixed to the first secondary growth constraint 158 and the second secondary growth constraint 160 via a slot 1060*b*, 1062*b* in each of the first secondary growth constraint 158 and the second secondary growth constraint 160, via an interlocking connection embodiment. Referring now to FIG. 17, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIG. 17 shows a cross section, along the line A-A' as in FIG. 1A, where first primary growth constraint 154 and second primary growth constraint 156 may be attached via a layer of glue 182 to the first secondary growth constraint 158 and second secondary growth constraint 160, as described above. In certain embodiments, as shown in FIG. 17, non-affixed counter-electrode structures 112 may include counter-electrode gaps 1086 between their tops 1068 and the first secondary growth constraint 158, and their bottoms 1070 and the second secondary growth constraint 160, as described in more detail above.

More specifically, in one embodiment shown in FIG. 17, a plurality of electrode current collectors 136 may be affixed to the first secondary growth constraint 158 and the second secondary growth constraint 160 via a slot 1060*b* and 1062*b* and a layer of glue 182. Accordingly, in certain embodiments, the plurality of electrode current collectors 136 affixed to the first and second secondary growth constraints 158, 160, respectively, via slots 1060*b*, 1062*b* may include a symmetrical pattern about a gluing axis $A_G$ with respect to affixed electrode current collectors 136, as described above. In certain embodiments, the plurality of electrode current collectors 136 affixed to the first and second secondary growth constraints 158, 160, respectively, via slots 1060*b*, 1062*b* may include an asymmetric or random pattern about a gluing axis $A_G$ with respect to affixed electrode current collectors 136, as described above.

In certain embodiments, slots 1060*b*, 1062*b* in each of the first secondary growth constraint 158 and the second secondary growth constraint 160 may extend through the first secondary growth constraint 158 and the second secondary growth constraint 160, respectively, in order to receive the plurality of electrode current collectors 136 in an interlocked embodiment. Stated alternatively, the plurality of electrode current collectors 136 may effectively meet and extend entirely through both the first secondary growth constraint 158 and the second secondary growth constraint 160 (akin to the height $H_{CESB}$, as described above), and may be affixed into slots 1060*b* and 1062*b* via glue 182 in another interlocked embodiment.

Connections Via Primary Growth Constraints

Figure 18A:
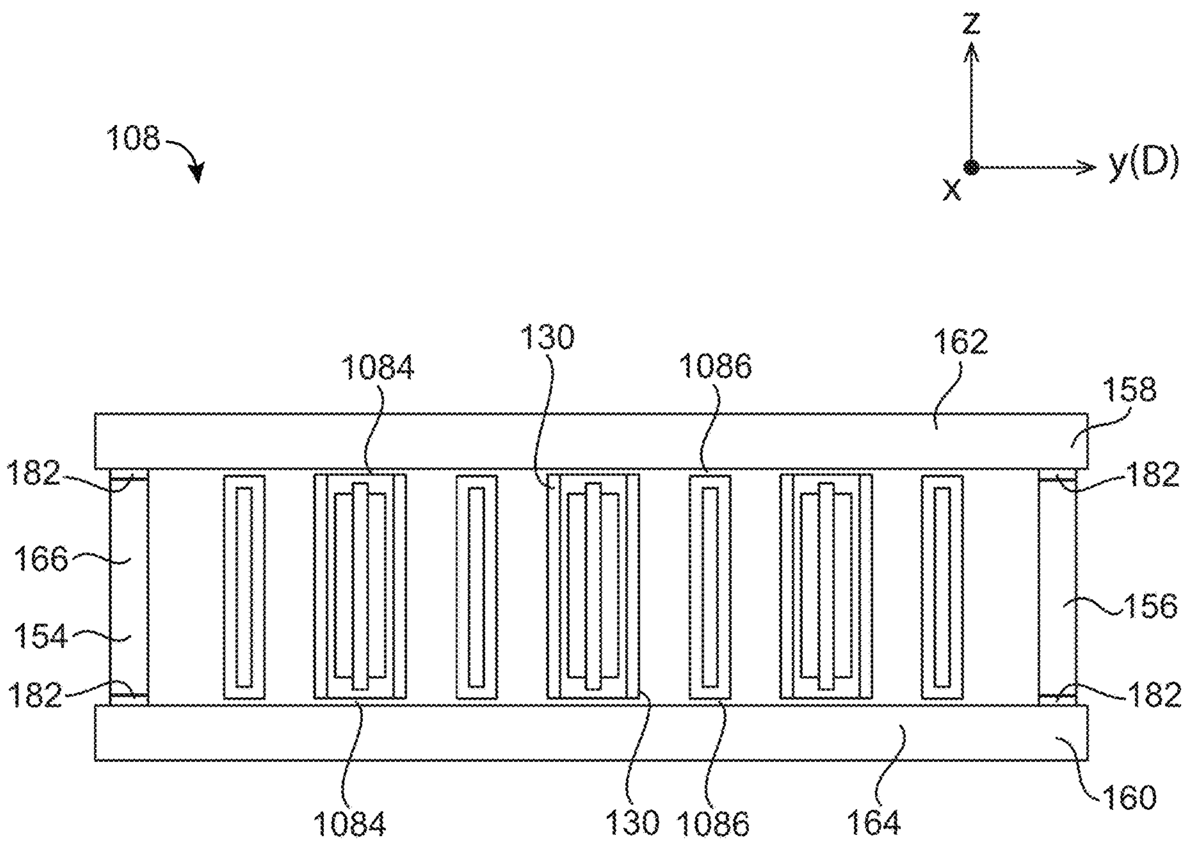
FIG. 18A illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the primary growth constraint system is hybridized with the secondary growth constraint system and used for assembling the set of electrode constraints.
Figure 18B:
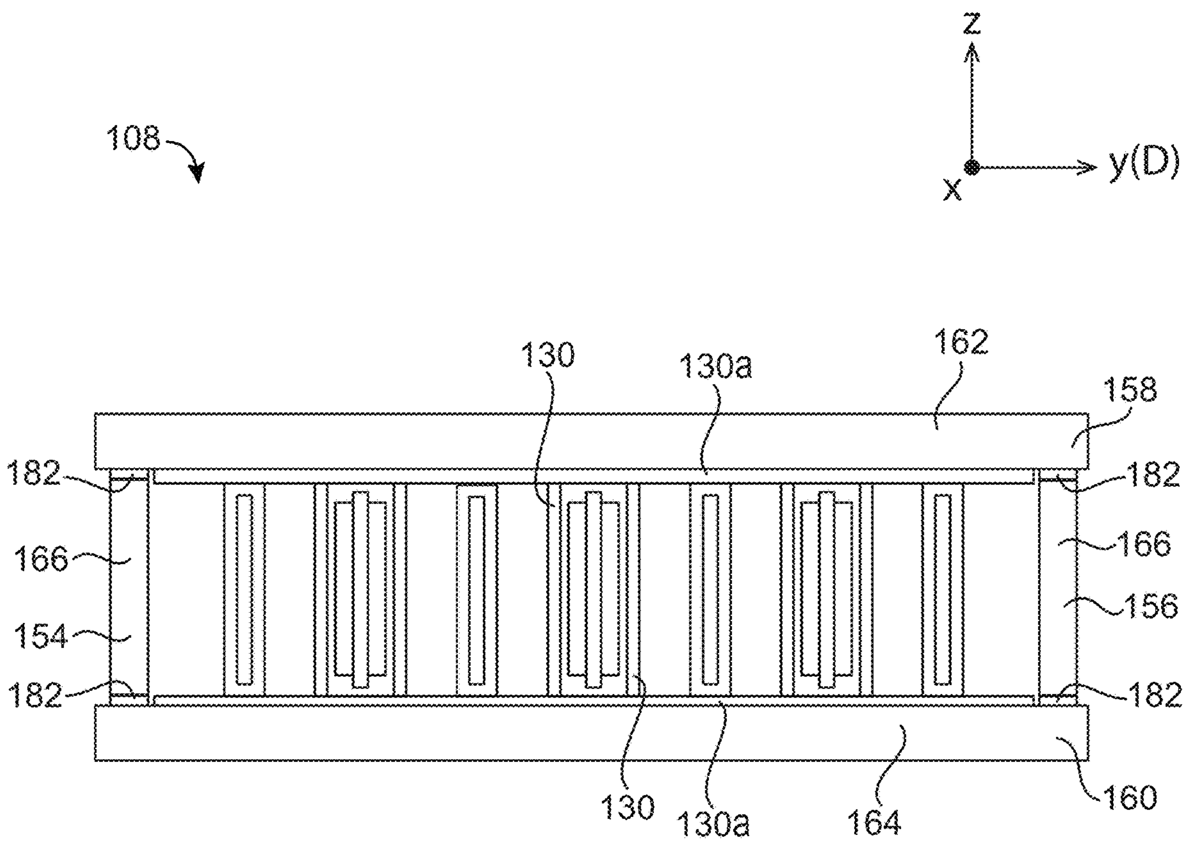
FIG. 18B illustrates a cross-section of an embodiment of the electrode assembly taken along the line A-A' as shown in FIG. 1A, further including a set of electrode constraints, including another embodiment of a primary growth constraint system and another embodiment of a secondary growth constraint system where the primary growth constraint system is hybridized with the secondary growth constraint system and used for assembling the set of electrode constraints.

In another embodiment, a constrained electrode assembly 106 may include a set of electrode constraints 108 wherein the secondary connecting member 166 includes the first and second primary growth constraints 154, 156 respectively, and yet still restrains growth of an electrode assembly 106 in both the longitudinal direction (i.e., along the Y axis) and/or the stacking direction D, and the vertical direction (i.e., along the Z axis) simultaneously, as described above. Referring now to FIGS. 18A-18B, a Cartesian coordinate system is shown for reference having a vertical axis (Z axis), a longitudinal axis (Y axis), and a transverse axis (X axis); wherein the X axis is oriented as coming out of the plane of the page; a separator 130, and a designation of the stacking direction D, as described above, co-parallel with the Y axis. More specifically, FIGS. 18A-18B each show a cross section, along the line A-A' as in FIG. 1A, of a set of electrode constraints 108, including one embodiment of both a primary growth constraint system 151 and one embodiment of a secondary growth constraint system 152. Primary growth constraint system 151 includes a first primary growth constraint 154 and a second primary growth constraint 156, as described above, and a first primary connecting member 162 and a second primary connecting member 164, as described above. Secondary growth constraint system 152 includes a first secondary growth constraint 158, a second secondary growth constraint 160, and a secondary connecting member 166 embodied as first primary growth constraint 154 and/or second primary growth constraint 156; therefore, in this embodiment, secondary connecting member 166, first primary growth constraint 154, and second primary growth constraint 156 are interchangeable. Further, in this embodiment, first primary connecting member 162 and first secondary growth constraint 158 are interchangeable, as described above. Further still, in this embodiment, second primary connecting member 164 and second secondary growth constraint 160 are interchangeable, as described above.

First primary growth constraint 154 and second primary growth constraint 156 may be attached via a layer of glue 182 to the first secondary growth constraint 158 and second secondary growth constraint 160, as described above. Stated alternatively, in the embodiments shown in FIGS. 18A-18B, the set of electrode constraints 108 include a first primary connecting member 162 that may be the first secondary growth constraint 158 in a hybridized embodiment, and a second primary connecting member 164 that may be the second secondary growth constraint 160 in a hybridized embodiment. As such, the first and second primary connecting members 162, 164, respectively, may be under tension when restraining growth in the longitudinal direction, and may also function as first and second secondary growth constraints 158, 160, respectively (i.e., compression members) when restraining growth in the vertical direction.

More specifically, in one embodiment as shown in FIG. 18A, non-affixed electrode structures 110 and non-affixed counter-electrode structures 1128 may include corresponding electrode gaps 1084 and corresponding counter-electrode gaps 1086 between each of their tops, respectively (i.e., 1052 and 1068), and the first secondary growth constraint 158, and each of their bottoms, respectively (i.e., 1054 and 1070), and the second secondary growth constraint 160, as described in more detail above.

More specifically, in one embodiment as shown in FIG. 18B, the set of electrode constraints 108 further includes a second separator 130*a* adjacent to both the hybridized first secondary growth constraint 158/first primary connecting member 162 and the hybridized second secondary growth constraint 160/second primary connecting member 164.

Fused Constraint System

Figure 19:
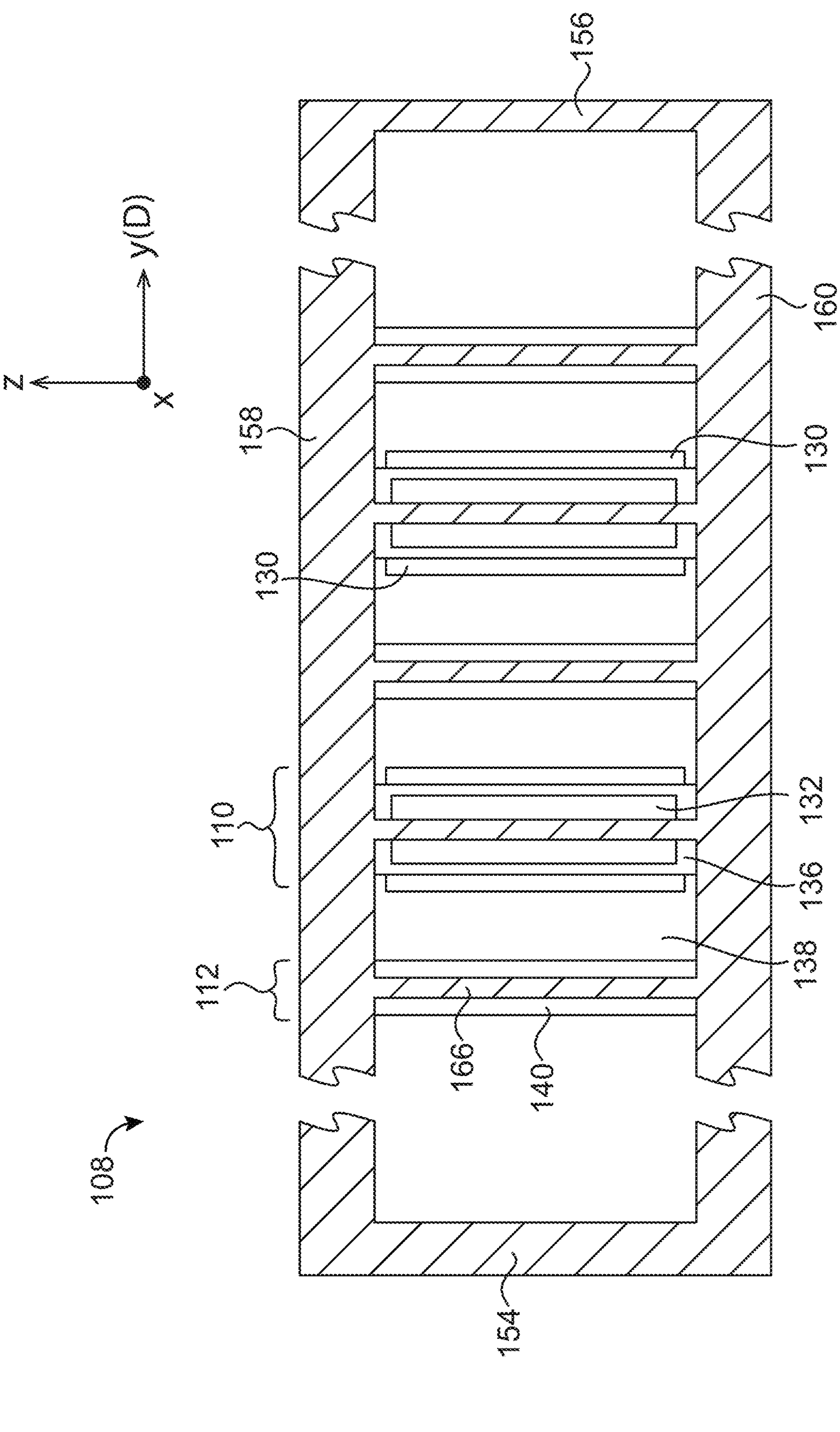
FIG. 19 illustrates a cross-section of an embodiment of the electrode assembly taken along the line A-A' as shown in FIG. 1A, further including a set of electrode constraints, including one embodiment of a primary growth constraint system and one embodiment of a secondary growth constraint system where the primary growth constraint system is fused with the secondary growth constraint system and used for assembling the set of electrode constraints.

In some embodiments, a set of electrode constraints 108 may be fused together. For example, in one embodiment, the primary growth constraint system 151 may be fused with the secondary growth constraint system 152. By way of further example, in one embodiment, the secondary growth constraint system 152 may be fused with the primary growth constraint system 151. Stated alternatively, aspects of the primary growth constraint system 151 (e.g., the first and second primary growth constraints 154, 156, respectively) may coexist (i.e., may be fused with) aspects of the secondary growth constraint system 152 (e.g., the first and second secondary growth constraints 158, 160, respectively) in a unibody-type system. Referring now to FIG. 19, a Cartesian coordinate system is shown for reference having a vertical axis (Z axis), a longitudinal axis (Y axis), and a transverse axis (X axis); wherein the X axis is oriented as coming out of the plane of the page; a separator 130, and a designation of the stacking direction D, as described above, co-parallel with the Y axis. More specifically, FIG. 19 shows a cross section, along the line A-A' as in FIG. 1A, of a fused electrode constraint 108, including one embodiment of a primary growth constraint system 151 fused with one embodiment of a secondary growth constraint system 152.

Further illustrated in FIG. 19, in one embodiment, are members of the electrode population 110 having an electrode active material layer 132, and an electrode current collector 136. Similarly, in one embodiment, illustrated in FIG. 19 are members of the counter-electrode population 112 having a counter-electrode active material layer 138, and a counter-electrode current collector 140. For ease of illustration, only two members of the electrode population 110 and three members of the counter-electrode population 112 are depicted; in practice, however, an energy storage device 100 or a secondary battery 102 using the inventive subject matter herein may include additional members of the electrode 110 and counter-electrode 112 populations depending on the application of the energy storage device 100 or secondary battery 102, as described above. More specifically, illustrated in the fused embodiment of FIG. 19, the secondary connecting member 166 may be embodied as the electrode and/or counter-electrode backbones 134, 141, respectively, as described above, but each may be fused to each of the first and second secondary growth constraints 158, 160, respectively, as described above. Similarly, the first primary growth constraint 154 and the second primary growth constraint 156 may be fused to the first and second secondary growth constraints 158, 160, respectively, thereby ultimately forming a fused or unibody constraint 108.

Secondary Battery

Referring now to FIG. 20, illustrated is an exploded view of one embodiment of a secondary battery 102 having a plurality of sets of electrode constraints 108*a* of the present disclosure. The secondary battery 102 includes battery enclosure 104 and a set of electrode assemblies 106*a* within the battery enclosure 104, each of the electrode assemblies 106 having a first longitudinal end surface 116, an opposing second longitudinal end surface 118 (i.e., separated from first longitudinal end surface 116 along the Y axis the Cartesian coordinate system shown), as described above. Each electrode assembly 106 includes a population of electrode structures 110 and a population of counter-electrode structures 112, stacked relative to each other within each of the electrode assemblies 106 in a stacking direction D; stated differently, the populations of electrode 110 and counter-electrode 112 structures are arranged in an alternating series of electrodes 110 and counter-electrodes 112 with the series progressing in the stacking direction D between first and second longitudinal end surfaces 116, 118, respectively (see, e.g., FIG. 2A; as illustrated in FIG. 2A and FIG. 20, stacking direction D parallels the Y axis of the Cartesian coordinate system(s) shown), as described above. In addition, the stacking direction D within an individual electrode assembly 106 is perpendicular to the direction of stacking of a collection of electrode assemblies 106 within a set 106*a* (i.e., an electrode assembly stacking direction); stated differently, the electrode assemblies 106 are disposed relative to each other in a direction within a set 106*a* that is perpendicular to the stacking direction D within an individual electrode assembly 106 (e.g., the electrode assembly stacking direction is in a direction corresponding to the Z axis of the Cartesian coordinate system shown, whereas the stacking direction D within individual electrode assemblies 106 is in a direction corresponding to the Y axis of the Cartesian coordinate system shown).

While the set of electrode assemblies 106*a* depicted in the embodiment shown in FIG. 20 contains individual electrode assemblies 106 having the same general size, one or more of the individual electrode assemblies 106 may also and/or alternatively have different sizes in at least one dimension thereof, than the other electrode assemblies 106 in the set 106*a*. For example, according to one embodiment, the electrode assemblies 106 that are stacked together to form the set 106*a* provided in the secondary battery 102 may have different maximum widths $W_{EA}$ in the longitudinal direction (i.e., stacking direction D) of each assembly 106. According to another embodiment, the electrode assemblies 106 making up the stacked set 106*a* provided in the secondary battery 102 may have different maximum lengths $L_{EA}$ along the transverse axis that is orthogonal to the longitudinal axis. By way of further example, in one embodiment, each electrode assembly 106 that is stacked together to form the set of electrode assemblies 106*a* in the secondary battery 102 has a maximum width $W_{EA}$ along the longitudinal axis and a maximum length $L_{EA}$ along the transverse axis that is selected to provide an area of $L_{EA} \times W_{EA}$ that decreases along a direction in which the electrode assemblies 106 are stacked together to form the set of electrode assemblies 106*a*. For example, the maximum width $W_{EA}$ and maximum length $L_{EA}$ of each electrode assembly 106 may be selected to be less than that of an electrode assembly 106 adjacent thereto in a first direction in which the assemblies 106 are stacked, and to be greater than that of an electrode assembly 106 adjacent thereto in a second direction that is opposite thereto, such that the electrode assemblies 106 are stacked together to form a secondary battery 102 having a set of electrode assemblies 106*a* in a pyramidal shape. Alternatively, the maximum lengths $L_{EA}$ and maximum widths $W_{EA}$ for each electrode assembly 106 can be selected to provide different shapes and/or configurations for the stacked electrode assembly set 106*a*. The maximum vertical height $H_{EA}$ for one or more of the electrode assemblies 106 can also and/or alternatively be selected to be different from other assemblies 106 in the set 106*a* and/or to provide a stacked set 106*a* having a predetermined shape and/or configuration.

Tabs 190, 192 project out of the battery enclosure 104 and provide an electrical connection between the electrode assemblies 106 of set 106*a* and an energy supply or consumer (not shown). More specifically, in this embodiment tab 190 is electrically connected to tab extension 191 (e.g., using an electrically conductive glue), and tab extension 191 is electrically connected to the electrodes 110 comprised by each of the electrode assemblies 106. Similarly, tab 192 is electrically connected to tab extension 193 (e.g., using an electrically conductive glue), and tab extension 193 is electrically connected to the counter-electrodes 112 comprised by each of electrode assemblies 106.

Each electrode assembly 106 in the embodiment illustrated in FIG. 20 has an associated primary growth constraint system 151 to restrain growth in the longitudinal direction (i.e., stacking direction D). Alternatively, in one embodiment, a plurality of electrode assemblies 106 making up a set 106*a* may share at least a portion of the primary growth constraint system 151. In the embodiment as shown, each primary growth constraint system 151 includes first and second primary growth constraints 154, 156, respectively, that may overlie first and second longitudinal end surfaces 116, 118, respectively, as described above; and first and second opposing primary connecting members 162, 164, respectively, that may overlie lateral surfaces 142, as described above. First and second opposing primary connecting members 162, 164, respectively, may pull first and second primary growth constraints 154, 156, respectively, towards each other, or alternatively stated, assist in restraining growth of the electrode assembly 106 in the longitudinal direction, and primary growth constraints 154, 156 may apply a compressive or restraint force to the opposing first and second longitudinal end surfaces 116, 118, respectively. As a result, expansion of the electrode assembly 106 in the longitudinal direction is inhibited during formation and/or cycling of the battery 102 between charged and discharged states. Additionally, primary growth constraint system 151 exerts a pressure on the electrode assembly 106 in the longitudinal direction (i.e., stacking direction D) that exceeds the pressure maintained on the electrode assembly 106 in either of the two directions that are mutually perpendicular to each other and are perpendicular to the longitudinal direction (e.g., as illustrated, the longitudinal direction corresponds to the direction of the Y axis, and the two directions that are mutually perpendicular to each other and to the longitudinal direction correspond to the directions of the X axis and the Z axis, respectively, of the illustrated Cartesian coordinate system).

Further, each electrode assembly 106 in the embodiment illustrated in FIG. 20 has an associated secondary growth constraint system 152 to restrain growth in the vertical direction (i.e., expansion of the electrode assembly 106, electrodes 110, and/or counter-electrodes 112 in the vertical direction (i.e., along the Z axis of the Cartesian coordinate system)). Alternatively, in one embodiment, a plurality of electrode assemblies 106 making up a set 106*a* share at least a portion of the secondary growth constraint system 152. Each secondary growth constraint system 152 includes first and second secondary growth constraints 158, 160, respectively, that may overlie corresponding lateral surfaces 142, respectively, and at least one secondary connecting member 166, each as described in more detail above. Secondary connecting members 166 may pull first and second secondary growth constraints 158, 160, respectively, towards each other, or alternatively stated, assist in restraining growth of the electrode assembly 106 in the vertical direction, and first and second secondary growth constraints 158, 160, respectively, may apply a compressive or restraint force to the lateral surfaces 142), each as described above in more detail. As a result, expansion of the electrode assembly 106 in the vertical direction is inhibited during formation and/or cycling of the battery 102 between charged and discharged states. Additionally, secondary growth constraint system 152 exerts a pressure on the electrode assembly 106 in the vertical direction (i.e., parallel to the Z axis of the Cartesian coordinate system) that exceeds the pressure maintained on the electrode assembly 106 in either of the two directions that are mutually perpendicular to each other and are perpendicular to the vertical direction (e.g., as illustrated, the vertical direction corresponds to the direction of the Z axis, and the two directions that are mutually perpendicular to each other and to the vertical direction correspond to the directions of the X axis and the Y axis, respectively, of the illustrated Cartesian coordinate system).

Further still, each electrode assembly 106 in the embodiment illustrated in FIG. 20 has an associated primary growth constraint system 151—and an associated secondary growth constraint system 152—to restrain growth in the longitudinal direction and the vertical direction, as described in more detail above. Furthermore, according to certain embodiments, the electrode and/or counter-electrode tabs 190, 192, respectively, and tab extensions 191, 193 can serve as a part of the tertiary growth constraint system 155. For example, in certain embodiments, the tab extensions 191, 193 may extend along the opposing transverse surface regions 144, 146 to act as a part of the tertiary constraint system 155, such as the first and second tertiary growth constraints 157, 159. The tab extensions 191, 193 can be connected to the primary growth constraints 154, 156 at the longitudinal ends 117, 119 of the electrode assembly 106, such that the primary growth constraints 154, 156 serve as the at least one tertiary connecting member 165 that places the tab extensions 191, 193 in tension with one another to compress the electrode assembly 106 along the transverse direction, and act as first and second tertiary growth constraints 157, 159, respectively. Conversely, the tabs 190, 192 and/or tab extensions 191, 193 can also serve as the first and second primary connecting members 162, 164, respectively, for the first and second primary growth constraints 154, 156, respectively, according to one embodiment. In yet another embodiment, the tabs 190, 192 and/or tab extensions 191, 193 can serve as a part of the secondary growth constraint system 152, such as by forming a part of the at least one secondary connecting member 166 connecting the secondary growth constraints 158, 160. Accordingly, the tabs 190, 192 and/or tab extensions 191, 193 can assist in restraining overall macroscopic growth of the electrode assembly 106 by either serving as a part of one or more of the primary and secondary constraint systems 151, 152, respectively, and/or by forming a part of a tertiary growth constraint system 155 to constrain the electrode assembly 106 in a direction orthogonal to the direction being constrained by one or more of the primary and secondary growth constraint systems 151, 152, respectively.

To complete the assembly of the secondary battery 102, battery enclosure 104 is filled with a non-aqueous electrolyte (not shown) and lid 104*a* is folded over (along fold line, FL) and sealed to upper surface 104*b*. When fully assembled, the sealed secondary battery 102 occupies a volume bounded by its exterior surfaces (i.e., the displacement volume), the secondary battery enclosure 104 occupies a volume corresponding to the displacement volume of the battery (including lid 104*a*) less its interior volume (i.e., the prismatic volume bounded by interior surfaces 104*c*, 104*d*, 104*e*, 104*f*, 104*g* and lid 104*a*) and each growth constraint 151, 152 of set 106*a* occupies a volume corresponding to its respective displacement volume. In combination, therefore, the battery enclosure 104 and growth constraints 151, 152 occupy no more than 75% of the volume bounded by the outer surface of the battery enclosure 104 (i.e., the displacement volume of the battery). For example, in one such embodiment, the growth constraints 151, 152 and battery enclosure 104, in combination, occupy no more than 60% of the volume bounded by the outer surface of the battery enclosure 104. By way of further example, in one such embodiment, the constraints 151, 152 and battery enclosure 104, in combination, occupy no more than 45% of the volume bounded by the outer surface of the battery enclosure 104. By way of further example, in one such embodiment, the constraints 151, 152 and battery enclosure 104, in combination, occupy no more than 30% of the volume bounded by the outer surface of the battery enclosure 104. By way of further example, in one such embodiment, the constraints 151, 152 and battery enclosure 104, in combination, occupy no more than 20% of the volume bounded by the outer surface of the battery enclosure.

For ease of illustration in FIG. 20, secondary battery 102 includes only one set 106*a* of electrode assemblies 106 and the set 106*a* includes only six electrode assemblies 106. In practice, the secondary battery 102 may include more than one set of electrode assemblies 106*a*, with each of the sets 106*a* being disposed laterally relative to each other (e.g., in a relative direction lying within the X-Y plane of the Cartesian coordinate system of FIG. 20) or vertically relative to each other (e.g., in a direction substantially parallel to the Z axis of the Cartesian coordinate system of FIG. 20). Additionally, in each of these embodiments, each of the sets of electrode assemblies 106*a* may include one or more electrode assemblies 106. For example, in certain embodiments, the secondary battery 102 may comprise one, two, or more sets of electrode assemblies 106*a*, with each such set 106*a* including one or more electrode assemblies 106 (e.g., 1, 2, 3, 4, 5, 6, 10, 15, or more electrode assemblies 106 within each such set 106*a*) and, when the battery 102 includes two or more such sets 106*a*, the sets 106*a* may be laterally or vertically disposed relative to other sets of electrode assemblies 106*a* included in the secondary battery 102. In each of these various embodiments, each individual electrode assembly 106 may have its own growth constraint (s), as described above (i.e., a 1:1 relationship between electrode assemblies 106 and constraints 151, 152), two more electrode assemblies 106 may have a common growth constraint(s) 151, 152, as described above (i.e., a set of constraints 108 for two or more electrode assemblies 106), or two or more electrode assemblies 106 may share components of a growth constraint(s) 151, 152 (i.e., two or more electrode assemblies 106 may have a common compression member (e.g., second secondary growth constraint 158) and/or tension members 166, for example, as in the fused embodiment, as described above).

Other Battery Components

In certain embodiments, the set of electrode constraints 108, including a primary growth constraint system 151 and a secondary growth constraint system 152, as described above, may be derived from a sheet 2000 having a length $L_1$, width $W_1$, and thickness $t_1$, as shown for example in FIG. 20. More specifically, to form a primary growth constraint system 151, a sheet 2000 may be wrapped around an electrode assembly 106 and folded at folded at edges 2001 to enclose the electrode assembly 106. Alternatively, in one embodiment, the sheet 2000 may be wrapped around a plurality of electrode assemblies 106 that are stacked to form an electrode assembly set 106*a*. The edges of the sheet may overlap each other, and are welded, glued, or otherwise secured to each other to form a primary growth constraint system 151 including first primary growth constraint 154 and second primary growth constraint 156, and first primary connecting member 162 and second primary connecting member 164. In this embodiment, the primary growth constraint system 151 has a volume corresponding to the displacement volume of sheet 2000 (i.e., the multiplication product of $L_1$, $W_1$ and $t_1$). In one embodiment, the at least one primary connecting member is stretched in the stacking direction D to place the member in tension, which causes a compressive force to be exerted by the first and second primary growth constraints. Alternatively, the at least one secondary connecting member can be stretched in the second direction to place the member in tension, which causes a compressive force to be exerted by the first and second secondary growth constraints. In an alternative embodiment, instead of stretching the connecting members to place them in tension, the connecting members and/or growth constraints or other portion of one or more of the primary and secondary growth constraint systems may be pre-tensioned prior to installation over and/or in the electrode assembly. In another alternative embodiment, the connecting members and/or growth constraints and/or other portions of one or more of the primary and secondary growth constraint systems are not initially under tension at the time of installation into and/or over the electrode assembly, but rather, formation of the battery causes the electrode assembly to expand and induce tension in portions of the primary and/or secondary growth constraint systems such as the connecting members and/or growth constraints. (i.e., self-tensioning).

Sheet 2000 may comprise any of a wide range of compatible materials capable of applying the desired force to the electrode assembly 106. In general, the primary growth constraint system 151 and/or secondary growth constraint system 155 will typically comprise a material that has an ultimate tensile strength of at least 10,000 psi (>70 MPa), that is compatible with the battery electrolyte, does not significantly corrode at the floating or anode potential for the battery 102, and does not significantly react or lose mechanical strength at 45° C., and even up to 70° C. For example, the primary growth constraint system 151 and/or secondary growth constraint system may comprise any of a wide range of metals, alloys, ceramics, glass, plastics, or a combination thereof (i.e., a composite). In one exemplary embodiment, primary growth constraint system 151 and/or secondary growth constraint system 155 comprises a metal such as stainless steel (e.g., SS 316, 440C or 440C hard), aluminum (e.g., aluminum 7075-T6, hard $H_{18}$), titanium (e.g., 6Al-4V), beryllium, beryllium copper (hard), copper ($O_2$ free, hard), nickel; in general, however, when the primary growth constraint system 151 and/or secondary growth constraint system 155 comprises metal it is generally preferred that it be incorporated in a manner that limits corrosion and limits creating an electrical short between the electrodes 110 and counter-electrodes 112. In another exemplary embodiment, the primary growth constraint system 151 and/or secondary growth constraint system 155 comprises a ceramic such as alumina (e.g., sintered or Coorstek AD96), zirconia (e.g., Coorstek YZTP), yttria-stabilized zirconia (e.g., ENrG E-Strate®). In another exemplary embodiment, the primary growth constraint system 151 comprises a glass such as Schott D263 tempered glass. In another exemplary embodiment, the primary growth constraint system 151 and/or secondary growth constraint system 155 comprises a plastic such as polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®). In another exemplary embodiment, the primary growth constraint system 151 and/or secondary growth constraint system comprises a composite such as E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy. In another exemplary embodiment, the primary growth constraint system 151 and/or secondary growth constraint system 155 comprises fibers such as Kevlar 49 Aramid Fiber, S Glass Fibers, Carbon Fibers, Vectran UM LCP Fibers, Dyneema, Zylon.

Thickness ($t_1$) of the primary growth constraint system 151 will depend upon a range of factors including, for example, the material(s) of construction of the primary growth constraint system 151, the overall dimensions of the electrode assembly 106, and the composition of a battery anode and cathode. In some embodiments, for example, the primary growth constraint system 151 will comprise a sheet having a thickness in the range of about 10 to about 100 micrometers. For example, in one such embodiment, the primary growth constraint system 151 comprises a stainless steel sheet (e.g., SS316) having a thickness of about 30 μm. By way of further example, in another such embodiment, the primary growth constraint system 151 comprises an aluminum sheet (e.g., 7075-T6) having a thickness of about 40 μm. By way of further example, in another such embodiment, the primary growth constraint system 151 comprises a zirconia sheet (e.g., Coorstek YZTP) having a thickness of about 30 μm. By way of further example, in another such embodiment, the primary growth constraint system 151 comprises an E Glass UD/Epoxy 0 deg sheet having a thickness of about 75 μm. By way of further example, in another such embodiment, the primary growth constraint system 151 comprises 12 μm carbon fibers at >50% packing density.

Without being bound to any particular theory, methods for gluing, as described herein, may include gluing, soldering, bonding, sintering, press contacting, brazing, thermal spraying joining, clamping, or combinations thereof. Gluing may include joining the materials with conductive materials such as conducting epoxies, conducting elastomers, mixtures of insulating organic glue filled with conducting metals, such as nickel filled epoxy, carbon filled epoxy etc. Conductive pastes may be used to join the materials together and the joining strength could be tailored by temperature (sintering), light (UV curing, cross-linking), chemical curing (catalyst based cross linking). Bonding processes may include wire bonding, ribbon bonding, ultrasonic bonding. Welding processes may include ultrasonic welding, resistance welding, laser beam welding, electron beam welding, induction welding, and cold welding. Joining of these materials can also be performed by using a coating process such as a thermal spray coating such as plasma spraying, flame spraying, arc spraying, to join materials together. For example, a nickel or copper mesh can be joined onto a nickel bus using a thermal spray of nickel as a glue.

Members of the electrode 110 and counter-electrode 112 populations include an electroactive material capable of absorbing and releasing a carrier ion such as lithium, sodium, potassium, calcium, magnesium or aluminum ions. In some embodiments, members of the electrode structure 110 population include an anodically active electroactive material (sometimes referred to as a negative electrode) and members of the counter-electrode structure 112 population include a cathodically active electroactive material (sometimes referred to as a positive electrode). In other embodiments, members of the electrode structure 110 population include a cathodically active electroactive material and members of the counter-electrode structure 112 population comprise an anodically active electroactive material. In each of the embodiments and examples recited in this paragraph, negative electrode active material may be, for example, a particulate agglomerate electrode, an electrode active material formed from a particulate material, such as by forming a slurry of the particulate material and casting into a layer shape, or a monolithic electrode.

Exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include graphite, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon, silicon oxide, or an alloy thereof.

In yet further embodiment, anodically active material can comprise lithium metals, lithium alloys, carbon, petroleum cokes, activated carbon, graphite, silcon compounds, tin compounds, and alloys thereof. In one embodiment, the anodically active material comprises carbon such as non-graphitizable carbon, graphite-based carbon, etc.; a metal complex oxide such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0<x \le 1$; $1 \le y \le 3$; $1 \le z \le 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, etc. In one embodiment, the anodically active material can comprise carbon-based active material include crystalline graphite such as natural graphite, synthetic graphite and the like, and amorphous carbon such as soft carbon, hard carbon and the like. Other examples of carbon material suitable for anodically active material can comprise graphite, Kish graphite, pyrolytic carbon, mesophase pitch-based carbon fibers, meso-carbon microbeads, mesophase pitches, graphitized carbon fiber, and high-temperature sintered carbon such as petroleum or coal tar pitch derived cokes. In one embodiment, the negative electrode active material may comprise tin oxide, titanium nitrate and silicon. In another embodiment, the negative electrode can comprise lithium metal, such as a lithium metal film, or lithium alloy, such as an alloy of lithium and one or more types of metals selected from the group consisting of Na, K, Rb, Cs, Fr, Be, Mg, Ca, Sr, Ba, Ra, Al and Sn. In yet another embodiment, the anodically active material can comprise a metal compound capable of alloying and/or intercalating with lithium, such as Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Si alloy, a Sn alloy, an Al alloy or the like; a metal oxide capable of doping and dedoping lithium ions such as $SiO_v$ ($0<v<2$), $SnO_2$, vanadium oxide or lithium vanadium oxide; and a composite including the metal compound and the carbon material such as a Si—C composite or a Sn—C composite. For example, in one embodiment, the material capable of alloying/intercalating with lithium may be a metal, such as lithium, indium, tin, aluminum, or silicon, or an alloy thereof; a transition metal oxide, such as $Li_4/3Ti_5/3O_4$ or SnO; and a carbonaceous material, such as artificial graphite, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite. In yet another embodiment, the negative electrode active material can comprise a composition suitable for a carrier ion such as sodium or magnesium. For example, in one embodiment, the negative electrode active material can comprise a layered carbonaceous material; and a composition of the formula $Na_xSn_{y-z}M_z$ disposed between layers of the layered carbonaceous material, wherein M is Ti, K, Ge, P, or a combination thereof, and $0<x\leq15$, $1\leq y\leq5$, and $0\leq z\leq1$.

In one embodiment, the negative electrode active material may further comprise a conductive material and/or conductive aid, such as carbon-based materials, carbon black, graphite, graphene, active carbon, carbon fiber, carbon black such as acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like. In addition, metallic fibers such as metal mesh; metallic powders such as copper, silver, nickel and aluminum; or organic conductive materials such as polyphenylene derivatives may also be used. In yet another embodiment, a binder may be provided, such as for example one or more of polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture.

Exemplary cathodically active materials include any of a wide range of cathode active materials. For example, for a lithium-ion battery, the cathodically active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof. Furthermore, compounds for the cathodically active material layers can comprise lithium-containing compounds further comprising metal oxides or metal phosphates such as compounds comprising lithium, cobalt and oxygen (e.g., $LiCoO_2$), compounds comprising lithium, manganese and oxygen (e.g., $LiMn_2O_4$) and compound comprising lithium iron and phosphate (e.g., LiFePO). In one embodiment, the cathodically active material comprises at least one of lithium manganese oxide, lithium cobalt oxide, lithium nickel oxide, lithium iron phosphate, or a complex oxide formed from a combination of aforesaid oxides. In another embodiment, the cathodically active material can comprise one or more of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (where, x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$ etc.; Ni site-type lithium nickel oxide represented by the chemical formula of $LiNi_{1-x}M_xO_2$ (where, M=Co, Mn, Al, Cu, Fe, Mg, B or Ga, and x=0.01 to 0.3); lithium manganese complex oxide represented by the chemical formula of $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ in which a portion of Li is substituted with alkaline earth metal ions; a disulfide compound; $Fe_2(MoO_4)_3$, and the like. In one embodiment, the cathodically active material can comprise a lithium metal phosphate having an olivine crystal structure of Formula 2: $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $-0.5\leq a\leq+0.5$, $0\leq x\leq0.5$, and $0\leq b\leq0.1$, such at least one of $LifePO_4$, $Li(Fe, Mn)PO_4$, $Li(Fe, Co)PO_4$, $Li(Fe, Ni)PO_4$, or the like. In one embodiment, the cathodically active material comprises at least one of $LiCoO_2$, $LiNiO_2$, $LiMnO_2$, $LiMn_2O_4$, $LiNi_{1-y}CO_yO_2$, $LiCo_{1-y}Mn_yO_2$, $LiNi_{1-y}Mn_yO_2$ ($0\leq y\leq1$), $Li(Ni_aCO_bMn_c)O_4$($0<a<2$, $0<b<2$, $0<c<2$, and $a+b+c=2$), $LiMn_{2-z}Ni_zO_4$, $LiMn_{2-z}CO_zO_4$ ($0<z<2$), $LiCoPO_4$ and $LiFePO_4$, or a mixture of two or more thereof.

In yet another embodiment, a cathodically active material can comprise elemental sulfur (S8), sulfur series compounds or mixtures thereof. The sulfur series compound may specifically be $Li_2Sn$ ($n\geq1$), an organosulfur compound, a carbon-sulfur polymer ($(C_2S_x)_n$: x=2.5 to 50, $n\geq2$) or the like. In yet another embodiment, the cathodically active material can comprise an oxide of lithium and zirconium.

In yet another embodiment, the cathodically active material can comprise at least one composite oxide of lithium and metal, such as cobalt, manganese, nickel, or a combination thereof, may be used, and examples thereof are $Li_aA_{1-b}M_bD_2$ (wherein, $0.90\leq a\leq1$, and $0\leq b\leq0.5$); $Li_aE_{1-b}M_bO_{2-c}D_c$ (wherein, $0.90\leq a\leq1$, $0\leq b\leq0.5$, and $0\leq c\leq0.05$); $LiE_{2-b}M_bO_{4-c}D_c$ (wherein, $0\leq b\leq0.5$, and $0\leq c\leq0.05$); $Li_aNi_{1-b-c}CO_bM_cD_a$ (wherein, $0.90\leq a\leq1$, $0\leq b\leq0.5$, $0\leq c\leq0.05$, and $0<a\leq2$); $Li_aNi_{1-b-c}CO_bM_cO_{2-a}X_a$ (wherein, $0.90\leq a\leq1$, $0\leq b\leq0.5$, $0\leq c\leq0.05$, and $0<a<2$); $Li_aNi_{1-b-c}CO_bM_cO_{2-a}X_2$ (wherein, $0.90\leq a\leq1$, $0\leq b\leq0.5$, $0\leq c\leq0.05$, and $0<a<2$); $Li_aNi_{1-b-c}Mn_bM_cD_a$ (wherein, $0.90\leq a\leq1$, $0\leq b\leq0.5$, $0\leq c\leq0.05$, and $0<a\leq2$); $Li_aNi_{1-b-c}Mn_bM_cO_{2-a}X_a$ (wherein, $0.90\leq a\leq1$, $0\leq b\leq0.5$, $0\leq c\leq0.05$, and $0<a<2$); $Li_aNi_{1-b-c}Mn_bM_cO_{2-a}X_2$ (wherein, $0.90\leq a\leq1$, $0\leq b\leq0.5$, $0\leq c\leq0.05$, and $0<a<2$); $Li_aNi_bE_cG_dO_2$ (wherein, $0.90\leq a\leq1$, $0\leq b\leq0.9$, $0\leq c\leq0.5$, and $0.001\leq d\leq0.1$); $Li_aNi_bCo_cMn_dGeO_2$ (wherein, $0.90\leq a\leq1$, $0\leq b\leq0.9$, $0\leq c\leq0.5$, $0\leq d\leq0.5$, and $0.001\leq e\leq0.1$); $Li_aNiG_bO_2$ (wherein, $0.90\leq a\leq1$ and $0.001\leq b\leq0.1$); $Li_aCoG_bO_2$ (wherein, $0.90\leq a\leq1$ and $0.001\leq b\leq0.1$); $Li_aMnG_bO_2$ (wherein, $0.90\leq a\leq1$ and $0.001\leq b\leq0.1$); $Li_aMn_2GbO_4$ (wherein, $0.90\leq a\leq1$ and $0.001\leq b\leq0.1$); $QO_2$; $QS_2$; $LiQS_2$; $V_2O_5$; $LiV_2O_5$; $LiX'O_2$; $LiNiVO_4$; $Li_{(3-f)}J_2(PO_4)_3$ ($0\leq f\leq2$); $Li_{(3-f)}Fe_2(PO_4)_3$ ($0\leq f\leq2$); and $LiFePO_4$. In the formulas above, A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof. For example, $LiCoO_2$, $LiMn_xO_{2x}$ (x=1 or 2), $LiNi_{1-x}Mn_xO_{2x}$($0<x<1$), $LiNi_{1-x-y}Co_xMn_yO_2$ ($0\leq x\leq 0.5$, $0\leq y\leq 0.5$), or $FePO_4$ may be used. In one embodiment, the cathodically active material comprises at least one of a lithium compound such as lithium cobalt oxide, lithium nickel oxide, lithium nickel cobalt oxide, lithium nickel cobalt aluminum oxide, lithium nickel cobalt manganese oxide, lithium manganese oxide, or lithium iron phosphate; nickel sulfide; copper sulfide; sulfur; iron oxide; or vanadium oxide.

In one embodiment, the cathodically active material can comprise a sodium containing material, such as at least one of an oxide of the formula $NaM^1{}_aO_2$ such as $NaFeO_2$, $NaMnO_2$, $NaNiO_2$, or $NaCoO_2$; or an oxide represented by the formula $NaMn_{1-a}M^1{}_aO_2$, wherein $M^1$ is at least one transition metal element, and $0\leq a<1$. Representative positive active materials include $Na[Ni_{1/2}Mn_{1/2}]O_2$, $Na_{2/3}[Fe_{1/2}Mn_{1/2}]O_2$, and the like; an oxide represented by $Na_{0.44}Mn_{1-a}M^1{}_aO_2$, an oxide represented by $Na_{0.7}Mn_{1-a}M^1{}_aO_{2.05}$ an (wherein $M^1$ is at least one transition metal element, and $0\leq a<1$); an oxide represented by $Na_bM^2{}_cSi_{12}O_{30}$ as $Na_6Fe_2Si_{12}O_{30}$ or $Na_2Fe_5Si_{12}O$ (wherein $M^2$ is at least one transition metal element, $2\leq b\leq 6$, and $2\leq c\leq 5$); an oxide represented by $Na_dM^3{}_eSi_6O_{18}$ such as $Na_2Fe_2Si_6O_{18}$ or $Na_2MnFeSi_6O_{18}$ (wherein $M^3$ is at least one transition metal element, $3\leq d\leq 6$, and $1\leq e\leq 2$); an oxide represented by $Na_fM^4{}_gSi_2O_6$ such as $Na_2FeSiO_6$ (wherein $M^4$ is at least one element selected from transition metal elements, magnesium (Mg) and aluminum (Al), $1\leq f\leq 2$ and $1\leq g\leq 2$); a phosphate such as $NaFePO_4$, $Na_3Fe_2(PO_4)_3$, $Na_3V_2(PO_4)_3$, $Na_4CO_3(PO_4)_2P_2O_7$ and the like; a borate such as $NaFeBO_4$ or $Na_3Fe_2(BO_4)_3$; a fluoride represented by $Na_hM^5F_6$ such as $Na_3FeF_6$ or $Na_2MnF_6$ (wherein $M^5$ is at least one transition metal element, and $2\leq h\leq 3$), a fluorophosphate such as $Na_3V_2(PO_4)_2F_3$, $Na_3V_2(PO_4)_2FO_2$ and the like. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}Mn_{1/2}]O_2$ and $Na_{2/3}[Fe_{1/2}Mn_{1/2}]O_2$, a phosphate cathode such as $Na_3V_2(PO_4)_3$ and $Na_4CO_3(PO_4)_2P_2O_7$, or a fluorophosphate cathode such as $Na_3V_2(PO_4)_2F_3$ and $Na_3V_2(PO_4)_2FO_2$.

In one embodiment, the negative electrode current collector 136 can comprise a suitable conductive material, such as a metal material. For example, in one embodiment, the negative electrode current collector can comprise at least one of copper, nickel, aluminum, stainless steel, titanium, palladium, baked carbon, calcined carbon, indium, iron, magnesium, cobalt, germanium, lithium a surface treated material of copper or stainless steel with carbon, nickel, titanium, silver, an aluminum-cadmium alloy, and/or other alloys thereof. As another example, in one embodiment, the negative electrode current collector comprises at least one of copper, stainless steel, aluminum, nickel, titanium, baked carbon, a surface treated material of copper or stainless steel with carbon, nickel, titanium, silver, an aluminum-cadmium alloy, and/or other alloys thereof. In one embodiment, the negative electrode current collector comprises at least one of copper and stainless steel.

In one embodiment, the positive electrode current collector 140 can comprise a suitable conductive material, such as a metal material. In one embodiment, the positive electrode current collector comprises at least one of stainless steel, aluminum, nickel, titanium, baked carbon, sintered carbon, a surface treated material of aluminum or stainless steel with carbon, nickel, titanium, silver, and/or an alloy thereof. In one embodiment, the positive electrode current collector comprises aluminum.

In yet another embodiment, the cathodically active material can further comprise one or more of a conductive aid and/or binder, which for example may be any of the conductive aids and/or binders described for the anodically active material herein.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of the negative electrode active material is at least 0.1. Typically, however, the void volume fraction of the negative electrode active material is not greater than 0.8. For example, in one embodiment, the void volume fraction of the negative electrode active material is about 0.15 to about 0.75. By way of the further example, in one embodiment, the void volume fraction of the negative electrode active material is about 0.2 to about 0.7. By way of the further example, in one embodiment, the void volume fraction of the negative electrode active material is about 0.25 to about 0.6.

Depending upon the composition of the microstructured negative electrode active material and the method of its formation, the microstructured negative electrode active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the negative electrode active material contains voids having openings at the lateral surface of the negative electrode active material through which lithium ions (or other carrier ions) can enter or leave the negative electrode active material; for example, lithium ions may enter the negative electrode active material through the void openings after leaving the positive electrode active material. In another embodiment, the void volume comprises closed voids, that is, the negative electrode active material contains voids that are enclosed by negative electrode active material. In general, open voids can provide greater interfacial surface area for the carrier ions whereas closed voids tend to be less susceptible to solid electrolyte interface while each provides room for expansion of the negative electrode active material upon the entry of carrier ions. In certain embodiments, therefore, it is preferred that the negative electrode active material 30) comprise a combination of open and closed voids.

In one embodiment, negative electrode active material comprises porous aluminum, tin or silicon or an alloy thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous negative electrode active material will generally have a porosity fraction of at least about 0.1, but less than 0.8 and have a thickness of about 1 to about 100 micrometers. For example, in one embodiment, negative electrode active material comprises porous silicon, has a thickness of about 5 to about 100 micrometers, and has a porosity fraction of about 0.15 to about 0.75. By way of further example, in one embodiment, negative electrode active material comprises porous silicon, has a thickness of about 10 to about 80 micrometers, and has a porosity fraction of about 0.15 to about 0.7. By way of further example, in one such embodiment, negative electrode active material comprises porous silicon, has a thickness of about 20 to about 50 micrometers, and has a porosity fraction of about 0.25 to about 0.6. By way of further example, in one embodiment, negative electrode active material comprises a porous silicon alloy (such as nickel silicide), has a thickness of about to about 100 micrometers, and has a porosity fraction of about 0.15 to about 0.75.

In another embodiment, negative electrode active material comprises fibers of aluminum, tin or silicon, or an alloy thereof. Individual fibers may have a diameter (thickness dimension) of about 5 nm to about 10,000 nm and a length generally corresponding to the thickness of the negative electrode active material. Fibers (nanowires) of silicon may be formed, for example, by chemical vapor deposition or other techniques known in the art such as vapor liquid solid (VLS) growth and solid liquid solid (SLS) growth. Additionally, the negative electrode active material will generally have a porosity fraction of at least about 0.1, but less than 0.8 and have a thickness of about 1 to about 200 micrometers. For example, in one embodiment, negative electrode active material comprises silicon nanowires, has a thickness of about 5 to about 100 micrometers, and has a porosity fraction of about 0.15 to about 0.75. By way of further example, in one embodiment, negative electrode active material comprises silicon nanowires, has a thickness of about 10 to about 80 micrometers, and has a porosity fraction of about 0.15 to about 0.7. By way of further example, in one such embodiment, negative electrode active material comprises silicon nanowires, has a thickness of about to about 50 micrometers, and has a porosity fraction of about 0.25 to about 0.6. By way of further example, in one embodiment, negative electrode active material comprises nanowires of a silicon alloy (such as nickel silicide), has a thickness of about 5 to about 100 micrometers, and has a porosity fraction of about 0.15 to about 0.75.

In one embodiment, each member of the electrode 110 population has a bottom, a top, and a longitudinal axis ($A_E$) extending from the bottom to the top thereof and in a direction generally perpendicular to the direction in which the alternating sequence of electrode structures 110 and counter-electrode structures 112 progresses. Additionally, each member of the electrode 110 population has a length ($L_E$) measured along the longitudinal axis ($A_E$) of the electrode, a width ($W_E$) measured in the direction in which the alternating sequence of electrode structures and counter-electrode structures progresses, and a height ($H_E$) measured in a direction that is perpendicular to each of the directions of measurement of the length ($L_E$) and the width ($W_E$). Each member of the electrode population also has a perimeter ($P_E$) that corresponds to the sum of the length(s) of the side(s) of a projection of the electrode in a plane that is normal to its longitudinal axis.

The length ($L_E$) of the members of the electrode population will vary depending upon the energy storage device and its intended use. In general, however, the members of the electrode population will typically have a length ($L_E$) in the range of about 5 mm to about 500 mm. For example, in one such embodiment, the members of the electrode population have a length ($L_E$) of about 10 mm to about 250 mm. By way of further example, in one such embodiment the members of the electrode population have a length ($L_E$) of about 25 mm to about 100 mm.

The width ($W_E$) of the members of the electrode population will also vary depending upon the energy storage device and its intended use. In general, however, each member of the electrode population will typically have a width ($W_E$) within the range of about 0.01 mm to 2.5 mm. For example, in one embodiment, the width ($W_E$) of each member of the electrode population will be in the range of about 0.025 mm to about 2 mm. By way of further example, in one embodiment, the width ($W_E$) of each member of the electrode population will be in the range of about 0.05 mm to about 1 mm.

The height ($H_E$) of the members of the electrode population will also vary depending upon the energy storage device and its intended use. In general, however, members of the electrode population will typically have a height ($H_E$) within the range of about 0.05 mm to about 10 mm. For example, in one embodiment, the height ($H_E$) of each member of the electrode population will be in the range of about 0.05 mm to about 5 mm. By way of further example, in one embodiment, the height ($H_E$) of each member of the electrode population will be in the range of about 0.1 mm to about 1 mm. According to one embodiment, the members of the electrode population include one or more first electrode members having a first height, and one or more second electrode members having a second height that is other than the first. For example, in one embodiment, the one or more first electrode members may have a height selected to allow the electrode members to contact a portion of the secondary constraint system in the vertical direction (Z axis). For example, the height of the one or more first electrode members may be sufficient such that the first electrode members extend between and contact both the first and second secondary growth constraints 158, 160 along the vertical axis, such as when at least one of the first electrode members or a substructure thereof serves as a secondary connecting member 166. Furthermore, according to one embodiment, one or more second electrode members may have a height that is less than the one or more first electrode members, such that for example the one or more second electrode members do not fully extend to contact both of the first and second secondary growth constraints 158, 160. In yet another embodiment, the different heights for the one or more first electrode members and one or more second electrode members may be selected to accommodate a predetermined shape for the electrode assembly 106, such as an electrode assembly shape having a different heights along one or more of the longitudinal and/or transverse axis, and/or to provide predetermined performance characteristics for the secondary battery.

The perimeter ($P_E$) of the members of the electrode population will similarly vary depending upon the energy storage device and its intended use. In general, however, members of the electrode population will typically have a perimeter ($P_E$) within the range of about 0.025 mm to about 25 mm. For example, in one embodiment, the perimeter ($P_E$) of each member of the electrode population will be in the range of about 0.1 mm to about 15 mm. By way of further example, in one embodiment, the perimeter ($P_E$) of each member of the electrode population will be in the range of about 0.5 mm to about 10 mm.

In general, members of the electrode population have a length ($L_E$) that is substantially greater than each of its width ($W_E$) and its height ($H_E$). For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the electrode population. By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the electrode population.

Additionally, it is generally preferred that members of the electrode population have a length ($L_E$) that is substantially greater than its perimeter ($P_E$); for example, in one embodiment, the ratio of $L_E$ to $P_E$ is at least 1.25:1, respectively, for each member of the electrode population. By way of further example, in one embodiment the ratio of $L_E$ to $P_E$ is at least 2.5:1, respectively, for each member of the electrode population. By way of further example, in one embodiment, the ratio of $L_E$ to $P_E$ is at least 3.75:1, respectively, for each member of the electrode population.

In one embodiment, the ratio of the height ($H_E$) to the width ($W_E$) of the members of the electrode population is at least 0.4:1, respectively. For example, in one embodiment, the ratio of $H_E$ to $W_E$ will be at least 2:1, respectively, for each member of the electrode population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the electrode population.

Each member of the counter-electrode population has a bottom, a top, and a longitudinal axis ($A_{CE}$) extending from the bottom to the top thereof and in a direction generally perpendicular to the direction in which the alternating sequence of electrode structures and counter-electrode structures progresses. Additionally, each member of the counter-electrode population has a length ($L_{CE}$) measured along the longitudinal axis ($A_{CE}$), a width ($W_{CE}$) measured in the direction in which the alternating sequence of electrode structures and counter-electrode structures progresses, and a height ($H_{CE}$) measured in a direction that is perpendicular to each of the directions of measurement of the length ($L_{CE}$) and the width ($W_{CE}$). Each member of the counter-electrode population also has a perimeter ($P_{CE}$) that corresponds to the sum of the length(s) of the side(s) of a projection of the counter-electrode in a plane that is normal to its longitudinal axis.

The length ($L_{CE}$) of the members of the counter-electrode population will vary depending upon the energy storage device and its intended use. In general, however, each member of the counter-electrode population will typically have a length ($L_{CE}$) in the range of about 5 mm to about 500 mm. For example, in one such embodiment, each member of the counter-electrode population has a length ($L_{CE}$) of about 10 mm to about 250 mm. By way of further example, in one such embodiment each member of the counter-electrode population has a length ($L_{CE}$) of about 25 mm to about 100 mm.

The width ($W_{CE}$) of the members of the counter-electrode population will also vary depending upon the energy storage device and its intended use. In general, however, members of the counter-electrode population will typically have a width ($W_{CE}$) within the range of about 0.01 mm to 2.5 mm. For example, in one embodiment, the width ($W_{CE}$) of each member of the counter-electrode population will be in the range of about 0.025 mm to about 2 mm. By way of further example, in one embodiment, the width ($W_{CE}$) of each member of the counter-electrode population will be in the range of about 0.05 mm to about 1 mm.

The height ($H_{CE}$) of the members of the counter-electrode population will also vary depending upon the energy storage device and its intended use. In general, however, members of the counter-electrode population will typically have a height ($H_{CE}$) within the range of about 0.05 mm to about 10 mm. For example, in one embodiment, the height ($H_{CE}$) of each member of the counter-electrode population will be in the range of about 0.05 mm to about 5 mm. By way of further example, in one embodiment, the height ($H_{CE}$) of each member of the counter-electrode population will be in the range of about 0.1 mm to about 1 mm. According to one embodiment, the members of the counter-electrode population include one or more first counter-electrode members having a first height, and one or more second counter-electrode members having a second height that is other than the first. For example, in one embodiment, the one or more first counter-electrode members may have a height selected to allow the counter-electrode members to contact a portion of the secondary constraint system in the vertical direction (Z axis). For example, the height of the one or more first counter-electrode members may be sufficient such that the first counter-electrode members extend between and contact both the first and second secondary growth constraints 158, 160 along the vertical axis, such as when at least one of the first counter-electrode members or a substructure thereof serves as a secondary connecting member 166. Furthermore, according to one embodiment, one or more second counter-electrode members may have a height that is less than the one or more first counter-electrode members, such that for example the one or more second counter-electrode members do not fully extend to contact both of the first and second secondary growth constraints 158, 160. In yet another embodiment, the different heights for the one or more first counter-electrode members and one or more second counter-electrode members may be selected to accommodate a predetermined shape for the electrode assembly 106, such as an electrode assembly shape having a different heights along one or more of the longitudinal and/or transverse axis, and/or to provide predetermined performance characteristics for the secondary battery.

The perimeter ($P_{CE}$) of the members of the counter-electrode population will also vary depending upon the energy storage device and its intended use. In general, however, members of the counter-electrode population will typically have a perimeter ($P_{CE}$) within the range of about 0.025 mm to about 25 mm. For example, in one embodiment, the perimeter ($P_{CE}$) of each member of the counter-electrode population will be in the range of about 0.1 mm to about 15 mm. By way of further example, in one embodiment, the perimeter ($P_{CE}$) of each member of the counter-electrode population will be in the range of about 0.5 mm to about 10 mm.

In general, each member of the counter-electrode population has a length ($L_{CE}$) that is substantially greater than width ($W_{CE}$) and substantially greater than its height ($H_{CE}$). For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each member of the counter-electrode population. By way of further example, in one embodiment the ratio of $L_{CE}$ to each of $W_{CE}$ and $H_E$ is at least 10:1 for each member of the counter-electrode population. By way of further example, in one embodiment, the ratio of $L_{CE}$ to each of $W_{CE}$ and $H_{CE}$ is at least 15:1 for each member of the counter-electrode population. By way of further example, in one embodiment, the ratio of $L_{CE}$ to each of $W_{CE}$ and $H_{CE}$ is at least 20:1 for each member of the counter-electrode population.

Additionally, it is generally preferred that members of the counter-electrode population have a length ($L_{CE}$) that is substantially greater than its perimeter ($P_{CE}$); for example, in one embodiment, the ratio of $L_{CE}$ to $P_{CE}$ is at least 1.25:1, respectively, for each member of the counter-electrode population. By way of further example, in one embodiment the ratio of $L_{CE}$ to $P_{CE}$ is at least 2.5:1, respectively, for each member of the counter-electrode population. By way of further example, in one embodiment, the ratio of $L_{CE}$ to $P_{CE}$ is at least 3.75:1, respectively, for each member of the counter-electrode population.

In one embodiment, the ratio of the height ($H_{CE}$) to the width ($W_{CE}$) of the members of the counter-electrode population is at least 0.4:1, respectively. For example, in one embodiment, the ratio of $H_{CE}$ to $W_{CE}$ will be at least 2:1, respectively, for each member of the counter-electrode population. By way of further example, in one embodiment the ratio of $H_{CE}$ to $W_{CE}$ will be at least 10:1, respectively, for each member of the counter-electrode population. By way of further example, in one embodiment the ratio of $H_{CE}$ to $W_{CE}$ will be at least 20:1, respectively, for each member of the counter-electrode population. Typically, however, the ratio of $H_{CE}$ to $W_{CE}$ will generally be less than 1,000:1, respectively, for each member of the electrode population. For example, in one embodiment the ratio of $H_{CE}$ to $W_{CE}$ will be less than 500:1, respectively, for each member of the counter-electrode population. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each member of the counter-electrode population.

In one embodiment the negative electrode current conductor layer 136 comprised by each member of the negative electrode population has a length $L_{NC}$ that is at least 50% of the length $L_{NE}$ of the member comprising such negative electrode current collector. By way of further example, in one embodiment the negative electrode current conductor layer 136 comprised by each member of the negative electrode population has a length $L_{NC}$ that is at least 60% of the length $L_{NE}$ of the member comprising such negative electrode current collector. By way of further example, in one embodiment the negative electrode current conductor layer 136 comprised by each member of the negative electrode population has a length $L_{NC}$ that is at least 70% of the length $L_{NE}$ of the member comprising such negative electrode current collector. By way of further example, in one embodiment the negative electrode current conductor layer 136 comprised by each member of the negative electrode population has a length $L_{NC}$ that is at least 80% of the length $L_{NE}$ of the member comprising such negative electrode current collector. By way of further example, in one embodiment the negative electrode current conductor 136 comprised by each member of the negative electrode population has a length $L_{NC}$ that is at least 90% of the length $L_{NE}$ of the member comprising such negative electrode current collector.

In one embodiment, the positive electrode current conductor 140 comprised by each member of the positive electrode population has a length $L_{PC}$ that is at least 50% of the length $L_{PE}$ of the member comprising such positive electrode current collector. By way of further example, in one embodiment the positive electrode current conductor 140 comprised by each member of the positive electrode population has a length $L_{PC}$ that is at least 60% of the length $L_{PE}$ of the member comprising such positive electrode current collector. By way of further example, in one embodiment the positive electrode current conductor 140 comprised by each member of the positive electrode population has a length $L_{PC}$ that is at least 70% of the length $L_{PE}$ of the member comprising such positive electrode current collector. By way of further example, in one embodiment the positive electrode current conductor 140 comprised by each member of the positive electrode population has a length $L_{PC}$ that is at least 80% of the length $L_{PE}$ of the member comprising such positive electrode current collector. By way of further example, in one embodiment the positive electrode current conductor 140 comprised by each member of the positive electrode population has a length $L_{PC}$ that is at least 90% of the length $L_{PE}$ of the member comprising such positive electrode current collector.

In certain embodiments, by being positioned between the negative electrode active material layer and the separator, negative electrode current collector 136 may facilitate more uniform carrier ion transport by distributing current from the negative electrode current collector across the surface of the negative electrode active material layer. This, in turn, may facilitate more uniform insertion and extraction of carrier ions and thereby reduce stress in the negative electrode active material during cycling; since negative electrode current collector 136 distributes current to the surface of the negative electrode active material layer facing the separator, the reactivity of the negative electrode active material layer for carrier ions will be the greatest where the carrier ion concentration is the greatest. In yet another embodiment, the positions of the negative electrode current collector 136 and the negative electrode active material layer may be reversed, as for example shown in FIG. 1B.

According to one embodiment, each member of the positive electrodes has a positive electrode current collector 140 that may be disposed, for example, between the positive electrode backbone and the positive electrode active material layer. Furthermore, one or more of the negative electrode current collector 136 and positive electrode current collector 140 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, positive electrode current collector 140 comprises gold or an alloy thereof such as gold silicide. By way of further example, in one embodiment, positive electrode current collector 140 comprises nickel or an alloy thereof such as nickel silicide. In yet another embodiment, the positive electrode current collector 140 may be disposed between adjacent positive electrode active material layers 136, as shown for example in FIG. 1B.

In an alternative embodiment, the positions of the positive electrode current collector layer and the positive electrode active material layer may be reversed, for example such that that the positive electrode current collector layer is positioned between the separator layer and the positive electrode active material layer. In such embodiments, the positive electrode current collector 140 for the immediately adjacent positive electrode active material layer comprises an ionically permeable conductor having a composition and construction as described in connection with the negative electrode current collector layer; that is, the positive electrode current collector layer comprises a layer of an ionically permeable conductor material that is both ionically and electrically conductive. In this embodiment, the positive electrode current collector layer has a thickness, an electrical conductivity, and an ionic conductivity for carrier ions that facilitates the movement of carrier ions between an immediately adjacent positive electrode active material layer on one side of the positive electrode current collector layer and an immediately adjacent separator layer on the other side of the positive electrode current collector layer in an electrochemical stack.

Electrically insulating separator layers 130 may surround and electrically isolate each member of the electrode structure 110 population from each member of the counter-electrode structure 112 population. Electrically insulating separator layers 130 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%. Additionally, the microporous separator material may be permeated with a non-aqueous electrolyte to permit conduction of carrier ions between adjacent members of the electrode and counter-electrode populations. In certain embodiments, for example, and ignoring the porosity of the microporous separator material, at least 70 vol % of electrically insulating separator material between a member of the electrode structure 110 population and the nearest member(s) of the counter-electrode structure 112 population (i.e., an "adjacent pair") for ion exchange during a charging or discharging cycle is a microporous separator material; stated differently, microporous separator material constitutes at least 70 vol % of the electrically insulating material between a member of the electrode structure 110 population and the nearest member of the counter-electrode 112 structure population. By way of further example, in one embodiment, and ignoring the porosity of the microporous separator material, microporous separator material constitutes at least 75 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 80 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 85 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 90 vol % of the electrically insulating separator material layer between adjacent pairs of members of the electrode structure 110 population and member of the counter-electrode structure 112 population, respectively. By way of further example, in one embodiment, and ignoring the porosity of the microporous separator material, the microporous separator material constitutes at least 95 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 99 vol % of the electrically insulating separator material layer between adjacent pairs of members of the electrode structure 110 population and members of the counter-electrode structure 112 population, respectively.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one 30 embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile and polyethylene oxide. In another embodiment, the binder is selected from the group consisting of acrylates, styrenes, epoxies, and silicones. Other suitable binders may be selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide or mixtures thereof. In yet another embodiment, the binder may be selected from any of polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations thereof. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1\times10^{-4}$ S/cm. By way of further example, in one embodiment, the particulate material has a conductivity for carrier ions of less than $1\times10^{-5}$ S/cm. By way of further example, in one embodiment, the particulate material has a conductivity for carrier ions of less than $1\times10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, BaO, ZnO, $ZrO_2$, BN, $Si_3N_4$, $Ge_3N_4$. See, for example, P. Arora and J. Zhang, "Battery Separators" Chemical Reviews 2004, 104, 4419-4462). Other suitable particles can comprise $BaTiO_3$, $Pb(Zr, Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or mixtures thereof. In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

Microporous separator materials may be deposited, for example, by electrophoretic deposition of a particulate separator material in which particles are coalesced by surface energy such as electrostatic attraction or van der Waals forces, slurry deposition (including spin or spray coating) of a particulate separator material, screen printing, dip coating, and electrostatic spray deposition. Binders may be included in the deposition process; for example, the particulate material may be slurry deposited with a dissolved binder that precipitates upon solvent evaporation, electrophoretically deposited in the presence of a dissolved binder material, or co-electrophoretically deposited with a binder and insulating particles etc. Alternatively, or additionally, binders may be added after the particles are deposited into or onto the electrode structure; for example, the particulate material may be dispersed in an organic binder solution and dip coated or spray-coated, followed by drying, melting, or cross-linking the binder material to provide adhesion strength.

In an assembled energy storage device, the microporous separator material is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. As yet another example, the electrolyte can comprise sodium ions dissolved therein, such as for example any one or more of $NaClO_4$, $NaPF_6$, $NaBF_4$, $NaCF_3SO_3$, $NaN(CF_3SO_2)_2$, $NaN(C_2F_5SO_2)_2$, $NaC(CF_3SO_2)_3$ Salts of magnesium and/or potassium can similarly be provided. For example magnesium salts such as magnesium chloride ($MgCl_2$), magnesium bromide $MgBr_2$), or magnesium iodide ($MgI_2$) may be provided, and/or as well as a magnesium salt that may be at least one selected from the group consisting of magnesium perchlorate ($Mg(ClO_4)_2$), magnesium nitrate ($Mg(NO_3)_2$), magnesium sulfate ($MgSO_4$), magnesium tetrafluoroborate ($Mg(BF_4)_2$), magnesium tetraphenylborate ($Mg(B(C_6H_5)_4)_2$, magnesium hexafluorophosphate ($Mg(PF_6)_2$), magnesium hexafluoroarsenate ($Mg(AsF_6)_2$), magnesium perfluoroalkylsulfonate (($Mg(R_{f1}SO_3)_2$), in which $R_{f1}$ is a perfluoroalkyl group), magnesium perfluoroalkylsulfonylimide ($Mg((R_{f2}SO_2)_2N)_2$, in which $R_{f2}$ is a perfluoroalkyl group), and magnesium hexaalkyl disilazide (($Mg(HRDS)_2$), in which R is an alkyl group). Exemplary organic solvents to dissolve the lithium salt include cyclic esters, chain esters, cyclic ethers, and chain ethers. Specific examples of the cyclic esters include propylene carbonate, ethylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include 30 tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

In yet another embodiment, the secondary battery 102 can comprise electrolyte that may be any of an organic liquid electrolyte, an inorganic liquid electrolyte, a solid polymer electrolyte, a gel polymer electrolyte, an inorganic solid electrolyte, a molten-type inorganic electrolyte or the like. In yet another embodiment, where the electrolyte is a solid electrolyte, the solid electrolyte may itself be capable of providing insulation between the electrodes and passage of carrier ions therethrough, such that a separate separator layer may not be required. That is, in certain embodiments, the solid electrolyte may take the place of the separator 130 described in embodiments herein. In one embodiment, a solid polymer electrolyte can comprise any of a polymer formed of polyethylene oxide (PEO)-based, polyvinyl acetate (PVA)-based, polyethyleneimine (PEI)-based, polyvinylidene fluoride (PVDF)-based, polyacrylonitrile (PAN)-based, LiPON, and polymethyl methacrylate (PMMA)-based polymers or copolymers thereof. In another embodiment, a sulfide-based solid electrolyte may be provided, such as a sulfide-based solid electrolyte comprising at least one of lithium and/or phosphorous, such as at least one of $Li_2S$ and $P_2S_5$, and/or other sulfides such as $SiS_2$, $GeS_2$, $Li_3PS_4$, $Li_4P_2S_7$, $Li_4SiS_4$, $Li_2S—P_2S_5$, and $50Li_4SiO_4{\cdot}50Li_3BO_3$, and/or $B_2S_3$. Yet other embodiments of solid electrolyte can include nitrides, halides and sulfates of lithium (Li) such as $Li_3N$, LiI, $Li_5NI_2$, $Li_3N—LiI—LiOH$, $LiSiO_4$, $LiSiO_4—LiI—LiOH$, $Li_2SiS_3$, $Li_4SiO_4$, $Li_4SiO_4—LiI—LiOH$, and $Li_3PO_4—Li_2S—SiS_2$.

Furthermore, according to one embodiment, components of the secondary battery 102 including the microporous separator 130 and other electrode 110 and/or counter-electrode 112 structures comprise a configuration and composition that allow the components to function, even in a case where expansion of electrode active material 132 occurs during charge and discharge of the secondary battery 102. That is, the components may be structured such that failure of the components due to expansion of the electrode active material 132 during charge/discharge thereof is within acceptable limits.

Electrode Constraint Parameters

According to one embodiment, the design of the set of electrode constraints 108 depends on parameters including: (i) the force exerted on components of the set of electrode constraints 108 due to the expansion of the electrode active material layers 132; and (ii) the strength of the set of electrode constraints 108 that is required to counteract force exerted by the expansion of the electrode active material layers 132. For example, according to one embodiment, the forces exerted on the system by the expansion of the electrode active material are dependent on the cross-sectional electrode area along a particular direction. For example, the force exerted in the longitudinal direction will be proportional to the length of the electrode ($L_E$) multiplied by the height of the electrode ($H_E$); in the vertical direction, the force would be proportional to the length of the electrode ($L_E$) multiplied by the width of the electrode ($W_E$), and the force in the transverse direction would be proportional to the width of the electrode ($W_E$) multiplied by the height of the electrode ($H_E$).

The design of the primary growth constraints 154, 156 may be dependent on a number of variables. The primary growth constraints 154, 156 restrain macroscopic growth of the electrode assembly 106 that is due to expansion of the electrode active material layers 132 in the longitudinal direction. In the embodiment as shown in FIG. 8A, the primary growth constraints 154, 156 act in concert with the at least one primary connecting member 158 (e.g., first and second primary connecting members 158 and 160), to restrain growth of the electrode structures 110 having the electrode active material layers 132. In restraining the growth, the at least one connecting member 158 places the primary growth constraints 154, 156 in tension with one another, such that they exert a compressive force to counteract the forces exerted by growth of the electrode active material layers 132. According to one embodiment, when a force is exerted on the primary growth constraints 154, 156, depending on the tensile strength of the primary connecting members 158, the primary growth constraints 154, 156 can do at least one of: (i) translate away from each other (move apart in the longitudinal direction); (ii) compress in thickness; and (iii) bend and/or deflect along the longitudinal direction, to accommodate the force. The extent of translation of the primary growth constraints 154, 156 away from each other may depend on the design of the primary connecting members 158, 160. The amount the primary growth constraints 154, 156 can compress is a function of the primary growth constraint material properties, e.g., the compressive strength of the material that forms the primary growth constraints 154, 156. According to one embodiment, the amount that the primary growth constraints 154, 156 can bend may depends on the following: (i) the force exerted by the growth of the electrode structures 110 in the longitudinal direction, (ii) the elastic modulus of the primary growth constraints 154, 156; (iii) the distance between primary connecting members 158, 160 in the vertical direction; and (iv) the thickness (width) of the primary growth constraints 154, 156. In one embodiment, a maximum deflection of the primary growth constraints 154, 156 may occur at the midpoint of the growth constraints 154, 156 in a vertical direction between the primary connecting members 158, 160. The deflection increases with the fourth power of the distance between the primary connecting members 158, 160 along the vertical direction, decreases linearly with the constraint material modulus, and decreases with the $3^{rd}$ power of the primary growth constraint thickness (width). The equation governing the deflection due to bending of the primary growth constraints 154, 156 can be written as:

$$\delta=60wL^4/Eh^3$$

where w=total distributed load applied on the primary growth constraint 154, 156 due to the electrode expansion; L=distance between the primary connecting members 158, 160 along the vertical direction; E=elastic modulus of the primary growth constraints 154, 156, and h=thickness (width) of the primary growth constraints 154, 156.

In one embodiment, the stress on the primary growth constraints 154, 156 due to the expansion of the electrode active material 132 can be calculated using the following equation:

$$\sigma=3wL^2/4h^2$$

where w=total distributed load applied on the primary growth constraints 154, 156 due to the expansion of the electrode active material layers 132; L=distance between primary connecting members 158, 160 along the vertical direction; and h=thickness (width) of the primary growth constraints 154, 156. In one embodiment, the highest stress on the primary growth constraints 154, 156 is at the point of attachment of the primary growth constraints 154, 156 to the primary connecting members 158, 160. In 20 one embodiment, the stress increases with the square of the distance between the primary connecting members 158, 160, and decreases with the square of the thickness of the primary growth constraints 154, 156.

Variables Affecting Primary Connecting Member Design

A number of variables may affect the design of the at least one primary connecting member 158, such as the first and second primary connecting members 158, 160 as shown in the embodiment depicted in FIG. 8A. In one embodiment, the primary connecting members 158, 160 may provide sufficient resistance to counteract forces that could otherwise result in the primary growth constraints 154, 156 translating away from each other (moving apart). In one embodiment, the equation that governs the tensile stress on the primary connecting members 158, 160 can be written as follows:

$$\sigma=PL/2t$$

where P=pressure applied due to expansion of the electrode active material layers 132 on the primary growth constraints; L=distance between the primary connecting members 158, 160 along the vertical direction, and t=thickness of the connecting members 158, 160 in the vertical direction.

Variables Affecting Secondary Growth Constraint Design

A number of variables may affect the design of the first and second secondary growth constraints 158, 160, as shown in the embodiment depicted in FIG. 8B. In one embodiment, the variables affecting the design of the secondary growth constraints 158, 160 are similar to the variables affecting the design of the primary growth constraints 154, 156, but translated into the orthogonal direction. For example, in one embodiment, the equation governing the deflection due to bending of the secondary growth constraints 158, 160 can be written as:

$$\delta=60wy^4/Et^3$$

where w=total distributed load applied on the secondary growth constraints 158, 160 due to the expansion of the electrode active material layers 132; y=distance between the secondary connecting members 166 (such as first and second primary growth constraints 154, 156 acting as secondary connecting members 166) in the longitudinal direction; E=elastic modulus of the secondary growth constraints 158, 160, and t=thickness of the secondary growth constraints 158, 160. In another embodiment, the stress on the secondary growth constraints 158, 160 can be written as:

$$\sigma=3wy^2/4t^2$$

where w=total distributed load applied on the secondary growth constraints 158, 160 due to the expansion of the electrode active material layers 132; y=distance between the secondary connecting members 154, 156 along the longitudinal direction; and t=thickness of the secondary growth constraints 158, 160.

Variables Affecting Secondary Connecting Member Design

A number of variables may affect the design of the at least one secondary connecting member 166, such as first and second secondary connecting members 154, 156, as shown in the embodiment depicted in FIG. 8B. In one embodiment, the tensile stress on secondary connecting members 154, 156 can be written similarly to that for the primary connecting members 158, 160 as follows:

$$\sigma=Py/2h,$$

where P=pressure applied due to the expansion of the electrode active material layers 132 on the secondary growth constraints 158, 160; y=distance between the connecting members 154, 156 along the longitudinal direction, and h=thickness of the secondary connecting members 154, 156 in the longitudinal direction.

In one embodiment, the at least one connecting member 166 for the secondary growth constraints 158, 160 are not located at the longitudinal ends 117, 119 of the electrode assembly 106, but may instead be located internally within the electrode assembly 106. For example, a portion of the counter electrode structures 112 may act as secondary connecting members 166 that connect the secondary growth constraints 158, 160 to one another. In such a case where the at least one secondary connecting member 166 is an internal member, and where the expansion of the electrode active material layers 132 occurs on either side of the secondary connecting member 166, the tensile stress on the internal secondary connecting members 166 can be calculated as follows:

$$\sigma=Py/h$$

where P=pressure applied due to expansion of the electrode active material on regions of the secondary growth constraints 158, 160 that are in between the internal first and second secondary connecting members 166 (e.g., counter electrode structures 112 separated from each other in the longitudinal direction); y=distance between the internal secondary connecting members 166 along the longitudinal direction, and h=thickness of the internal secondary connecting members 166 in the longitudinal direction. According to this embodiment, only one half of the thickness of the internal secondary connecting member 166 (e.g., counter-electrode structure 112) contributes towards restraining the expansion due to the electrode active material on one side, with the other half of the thickness of the internal secondary connecting member 166 contributing to the restraining of the expansion due to the electrode active material on the other side.

Li-Ion Secondary Battery

Referring again to FIG. 1B, in one embodiment, a lithium ion secondary battery is provided that comprises a silicon-containing electrode active material. The lithium ion secondary battery 102 is capable of cycling between a charged and discharged state, and the secondary battery comprises a battery enclosure 104, an electrode assembly 106, and carrier ions comprising lithium ions within the battery enclosure, and a set of electrode constraints 108. In the embodiment, the electrode assembly of the secondary battery has mutually perpendicular transverse, longitudinal and vertical axes corresponding to the x, y and z axes, respectively, of an imaginary three-dimensional cartesian coordinate system, a first longitudinal end surface 116 and a second longitudinal end surface 118 separated from each other in the longitudinal direction, and a lateral surface 142 surrounding an electrode assembly longitudinal axis $A_{EA}$ and connecting the first and second longitudinal end surfaces (e.g., as depicted in FIG. 2A), the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, wherein a ratio of the maximum length $L_{EA}$ and the maximum width $W_{EA}$ to the maximum height $H_{EA}$ is at least 2:1 (e.g., as depicted, in FIG. 2A).

According to one embodiment, the electrode assembly 106 comprises a series of layers 800 stacked in a stacking direction that parallels the longitudinal axis within the electrode assembly 106, wherein the stacked series of layers 800 comprises a population of negative electrode active material layers 132, a population of negative electrode current collector layers 136, a population of separator material layers 130, a population of positive electrode active material layers 138, and a population of positive electrode current collector layers 140. According to the embodiment, each member of the population of negative electrode active material layers has a length $L_E$ that corresponds to the Feret diameter of the negative electrode active material layer 132 as measured in the transverse direction between first and second opposing transverse end surfaces of the negative electrode active material layer 132, and a height $H_E$ that corresponds to the Feret diameter of the negative electrode active material layer 132 as measured in the vertical direction between first and second opposing vertical end surfaces of the negative electrode active material layer 132, and a width $W_E$ that corresponds to the Feret diameter of the negative electrode active material layer 132 as measured in the longitudinal direction between first and second opposing surfaces of the negative electrode active material layer 132, wherein a ratio of $L_E$ to $H_E$ and $W_E$ is at least 5:1. Furthermore, each member of the population of positive electrode active material layers 138 has a length $L_C$ that corresponds to the Feret diameter of the positive electrode active material layer 138 as measured in the transverse direction between first and second opposing transverse end surfaces of the positive electrode active material layer, and a height $H_C$ that corresponds to the Feret diameter of the positive electrode active material layer 138 as measured in the vertical direction between first and second opposing vertical end surfaces of the positive electrode active material layer 138, and a width $W_C$ that corresponds to the Feret diameter of the positive electrode active material layer as measured in the longitudinal direction between first and second opposing surfaces of the positive electrode active material layer, wherein a ratio of $L_C$ to $H_C$ and $W_C$ is at least 5:1.

In one embodiment, the set of electrode constraints 108 provided for the lithium ion secondary batter comprises the primary constraint system 151 and the secondary constraint system 155. The primary constraint system 151 comprises the first and second primary growth constraints 154, 156 and at least one primary connecting member 162, the first and second primary growth constraints separated from each other in the longitudinal direction, and the at least one primary connecting member connecting the first and second primary growth constraints to at least partially restrain growth of the electrode assembly in the longitudinal direction. The secondary constraint system 155 comprises first and second secondary growth constraints 158, 160 separated in a second direction and connected by members of the stacked series of layers 800, wherein the secondary constraint system 155 at least partially restrains growth of the electrode assembly in the second direction upon cycling of the secondary battery, the second direction being orthogonal to the longitudinal direction. For example, referring to FIG. 1B, the first and second secondary growth constraints 158, 160 may be connected to each other by any one or more of members of the population of negative electrode current collector layers 136, members of the population of positive electrode current collector layers 140, members of the population of negative electrode active material layers 132, members of the population of positive electrode active material layers 138, members of the population of separator layers 130, or any combination thereof. Referring to FIGS. 1B and 29A-D, in one embodiment the first and second secondary growth constraints 158, 160 may be connected via one or more of the population of negative electrode current collector layers 136 and/or members of the population of positive electrode current collector layers 140. Furthermore, according to one embodiment, the primary constraint system maintains a pressure on the electrode assembly in the stacking direction that exceeds the pressure maintained on the electrode assembly in each of two directions that are mutually perpendicular and perpendicular to the stacking direction.

In yet another embodiment, the lithium-ion secondary battery 102 can comprise the offset between negative electrode active material layers 132 and positive electrode material layers 138 within a same unit cell 504, as discussed elsewhere herein. For example, in one embodiment, the electrode assembly 106 comprises a population of unit cells 504, wherein each unit cell 504 comprises a unit cell portion of a first member of the electrode current collector layer population, a member of the separator population that is ionically permeable to the carrier ions, a first member of the electrode active material layer population, a unit cell portion of first member of the counter-electrode current collector population and a first member of the counter-electrode active material layer population. The first member of the electrode active material layer population is proximate a first side of the separator layer and the first member of the counter-electrode material layer population is proximate an opposing second side of the separator layer. The separator electrically isolates the first member of the electrode active material layer population from the first member of the counter-electrode active material layer population and carrier ions are primarily exchanged between the first member of the electrode active material layer population and the first member of the counter-electrode active material layer population via the separator of each such unit cell during cycling of the battery between the charged and discharged state.

Furthermore within each unit cell, the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vertical end surface plot, $E_{VP1}$, a 2D map of the median vertical position of the first opposing vertical end surface of the counter-electrode active material layer in the X-Z plane, along the length $L_C$ of the counter-electrode active material layer, traces a first vertical end surface plot, $CE_{VP1}$, wherein for at least 60% of the length $L_C$ of the first counter-electrode active material layer (i) the absolute value of a separation distance, $S_{Z1}$, between the plots $E_{VP1}$ and $CE_{VP1}$ measured in the vertical direction is 1000 μm≥$|S_{Z1}|$≥5 μm, and (ii) as between the first vertical end surfaces of the electrode and counter-electrode active material layers, the first vertical end surface of the counter-electrode active material layer is inwardly disposed with respect to the first vertical end surface of the electrode active material layer.

Furthermore, according to one embodiment, within each unit cell, the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, $E_{VP2}$, a 2D map of the median vertical position of the second opposing vertical end surface of the counter-electrode active material layer in the X-Z plane, along the length $L_C$ of the counter-electrode active material layer, traces a second vertical end surface plot, $CE_{VP2}$, wherein for at least 60% of the length $L_C$ of the counter-electrode active material layer (i) the absolute value of a separation distance, $S_{Z2}$, between the plots $E_{VP2}$ and $CE_{VP2}$ as measured in the vertical direction is 1000 $\mu m \geq |S_{Z2}| \geq 5$ μm, and (ii) as between the second vertical end surfaces of the electrode and counter-electrode active material layers, the second vertical end surface of the counter-electrode active material layer is inwardly disposed with respect to the second vertical end surface of the electrode active material layer.

According to yet another embodiment, within each unit cell, the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, wherein for at least 60% of the height $H_C$ of the counter electrode active material layer (i) the absolute value of a separation distance, $S_{X1}$, between the plots $E_{TP1}$ and $CE_{TP1}$ measured in the transverse direction is 1000 $\mu m \geq |S_{X1}| \geq 5$ μm, and (ii) as between the first transverse end surfaces of the electrode and counter-electrode active material layers, the first transverse end surface of the counter-electrode active material layer is inwardly disposed with respect to the first transverse end surface of the electrode active material layer. Furthermore, the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, wherein for at least 60% of the height $H_C$ of the counter-electrode active material layer (i) the absolute value of a separation distance, $S_{X2}$, between the plots $E_{TP2}$ and $CE_{TP2}$ measured in the transverse direction is 1000 $\mu m \geq |S_{X2}| \geq 5$ μm, and (ii) as between the second transverse end surfaces of the electrode and counter-electrode active material layers, the second transverse end surface of the counter-electrode active material layer is inwardly disposed with respect to the second transverse end surface of the electrode active material layer.

In yet another embodiment, the lithium ion secondary battery 102 may be one manufactured according to any manufacturing method described herein, such as by a manufacturing method where weakened regions of negative electrode and/or positive electrode sheets and/or subunits are provided as a part of the manufacturing process. Accordingly, in certain embodiments, the stacked series of layers 800 comprises layers with opposing end surfaces that are spaced apart from one another in the transverse direction, wherein a plurality of the opposing end surfaces of the layers exhibit plastic deformation and fracturing oriented in the transverse direction, due to elongation and narrowing of the layers of material at the opposing end surfaces. For example, referring to FIG. 55, in one embodiment one or more of a negative and/or positive electrode current collector layer 136, 140 comprises opposing end surfaces 978*a, b*, 982*a,b* having a region 705 thereof that exhibits plastic deformation and fracturing, due separation at the weakened region proximate to the region 705.

In one embodiment, the lithium ion secondary battery comprises members of the negative electrode active material layer population that comprise a particulate material having at least 60 wt % of negative electrode active material, less than 20 wt % conductive aid, and binder material. In one embodiment, the members of the negative electrode active material layer population comprise a particulate material having at least 80 wt % of negative electrode active material. In another embodiment, members of the negative electrode active material layer population comprise a particulate material having at least 90 wt % of negative electrode active material. In yet another embodiment, members of the negative electrode active material layer population comprise a particulate material having at least 95 wt % of negative electrode active material. Furthermore, in one embodiment, members of the negative electrode active material layer population comprise less than 10 wt % conductive aid, and at least 1 wt % conductive aid. In one embodiment, the electrode active material comprising the silicon-containing material comprises at least one of silicon, silicon oxide, and mixtures thereof. For example, in one embodiment, the electrode active material layer comprises a compact of the silicon-containing particulate electrode active material. In another embodiment, the members of the negative electrode active material layer population comprise conductive aid comprising at least one of copper, nickel and carbon. In another embodiment, the members of the positive electrode active material layer population comprise positive electrode active material comprising a transition metal oxide material containing lithium and at least one of cobalt and nickel.

In one embodiment, wherein the first and second secondary growth constraints separated in the second direction are connected to each other by members of the stacked series of layers 800 comprising members of the population of negative electrode current collector layers 136, as shown for example in FIGS. 1B-1D and 29A-D. For example, referring to FIG. 1B, the first and second secondary growth constraints separated in the second direction may be connected to each other by members of the stacked series of layers 800 comprising members of the population of negative electrode current collector layers 136, and wherein the negative electrode current collector layers 136 form negative electrode backbone layers for the electrode structures 110 of which they are a part. That is, the members of the negative electrode current collector layer population 136 may form a backbone of the electrode structures 110, with at least one negative electrode active material layer 132 being disposed on a surface thereof, and may even form a core of the electrode structures 110, with electrode active material layers 132 being disposed on both opposing surfaces thereof.

According to one embodiment, the members of the negative electrode current collector layer population 136 that serve to connect the first and second secondary constraints 158, 160 (e.g., serve as connecting members 166), may comprise a material having a suitable conductivity and compressive strength to resist excessive compression, such as one or more of copper and stainless steel, and in one embodiment the negative electrode current collector layers 136 are formed of copper films. A thickness of the negative electrode current collectors may also be selected to provide a suitable conductance for the overall layer as well as compressive strength, such as a thickness of at least 2 microns, but typically less than 20 microns, such as from 6 microns to 18 microns, and/or from 8 microns to 14 microns.

In one embodiment, the members of the population of negative electrode current collector layers comprise copper-containing layers, and the stacked series of layers 800 comprise the members of the population of negative electrode current collector layers in a stacked sequence with members of the population of negative electrode active material layers disposed on opposing sides of the negative electrode current collector layers. In yet another embodiment, members of the population of negative electrode active material layers comprise a compact of particulate silicon-containing material, and the members of the population of negative electrode active material layers are disposed on opposing sides of copper-containing negative electrode current collectors that form a negative electrode backbone. Furthermore, according to one embodiment, members of the population of electrode active material layers comprising a height dimension $H_E$ that is at least 2.5 mm, such as at least 3 mm.

According to yet another embodiment, the lithium ion secondary battery comprises the first and second secondary growth constraints separated in the second direction, which are connected to each other by members of the stacked series of layers 800 comprising members of the population of positive electrode current collector layers 140. Similarly to the negative electrode current collectors above, the materials and properties of the positive electrode current collectors may be selected to provide for a suitable conductance while also imparting sufficient compressive strength to resist excessive compression. In one embodiment, the members of the positive electrode current collector layer comprise aluminum. A thickness of the positive electrode current collector may be at least 2 microns, but typically less than 20 microns, such as from 6 microns to 18 microns, and/or from 8 microns to 14 microns According to yet another embodiment, the lithium ion secondary battery comprises the first and second secondary growth constraints separated in the second direction, which are connected to each other by members of the stacked series of layers 800 comprising members of the population of negative electrode active material layers 132. In yet another embodiment, the first and second secondary growth constraints are connected to each other by members of the stacked series of layers comprising members of the population of positive electrode active material layers. In yet another embodiment, the first and second secondary growth constraints are connected to each other by members of the stacked series of layers comprising members of the population of separator material layers. That is, the first and second secondary growth constraints may be connected to one another via members of the population of negative electrode current collector layers, in addition to at least some members of the population of positive electrode current collector layers, and even at least some members of the population of separator material layers, or some other combination of the layers making up the stacked series of layers 800.

In certain embodiments, as discussed above, the battery enclosure 104 containing the electrode assembly 106 may be hermetically sealed. Furthermore, at least a portion and even all of the set of electrode constraints may be within the hermetically sealed enclosure, such as one or more of the primary and secondary constraint systems, or at least a portion thereof. According to yet another embodiment, the secondary battery may further comprise a tertiary constraint system to constrain in a third direction, as discussed above, such as in the X direction, at least a portion or even all of which tertiary constraint system may also be provided within the sealed enclosure.

According to one embodiment, the lithium ion secondary battery comprises a set of constraints 108 that are capable of constraining growth to an extent as has been discussed above. For example, in one embodiment, wherein the primary constraint system restrains growth of the electrode assembly in the longitudinal direction such that any increase in the Feret diameter of the electrode assembly in the longitudinal direction over 20 consecutive cycles of the secondary battery is less than 20%, where the charged state of the secondary battery is at least 75% of a rated capacity of the secondary battery, and the discharged state of the secondary battery is less than 25% of the rated capacity of the secondary battery. In another embodiment, the primary constraint array restrains growth of the electrode assembly in the longitudinal direction such that any increase in the Feret diameter of the electrode assembly in the longitudinal direction over 50 consecutive cycles of the secondary battery is less than 20%. In yet another embodiment, the primary constraint array restrains growth of the electrode assembly in the longitudinal direction to less than 20% over 100 consecutive cycles of the secondary battery. In a further embodiment, the primary constraint array restrains growth of the electrode assembly in the longitudinal direction such that any increase in the Feret diameter of the electrode assembly in the longitudinal direction over 10 consecutive cycles of the secondary battery is less than 10%. In yet another embodiment, the primary constraint array restrains growth of the electrode assembly in the longitudinal direction such that any increase in the Feret diameter of the electrode assembly in the longitudinal direction over 30 consecutive cycles of the secondary battery is less than 10%. In another embodiment, the primary constraint array restrains growth of the electrode assembly in the longitudinal direction such that any increase in the Feret diameter of the electrode assembly in the longitudinal direction over 80 consecutive cycles of the secondary battery is less than 10%. In yet another embodiment, the primary constraint array restrains growth of the electrode assembly in the longitudinal direction such that any increase in the Feret diameter of the electrode assembly in the longitudinal direction over 5 consecutive cycles of the secondary battery is less than 5%. In a further embodiment, the secondary battery as in any preceding claim, wherein the primary constraint array restrains growth of the electrode assembly in the longitudinal direction such that any increase in the Feret diameter of the electrode assembly in the longitudinal direction over 20 consecutive cycles of the secondary battery is less than 5%. In another embodiment, the primary constraint array restrains growth of the electrode assembly in the longitudinal direction such that any increase in the Feret diameter of the electrode assembly in the longitudinal direction over 50 consecutive cycles of the secondary battery is less than 5%.

In another embodiment, the primary constraint array restrains growth of the electrode assembly in the longitudinal direction such that any increase in the Feret diameter of the electrode assembly in the longitudinal direction per cycle of the secondary battery is less than 1%. Furthermore, in one embodiment, the secondary growth constraint system restrains growth of the electrode assembly in the second direction such that any increase in the Feret diameter of the electrode assembly in the second direction over 20 consecutive cycles upon repeated cycling of the secondary battery is less than 20%. In another embodiment, the secondary growth constraint system restrains growth of the electrode assembly in the second direction such that any increase in the Feret diameter of the electrode assembly in the second direction over 5 consecutive cycles of the secondary battery is less than 5%. In yet another embodiment, the secondary growth constraint system restrains growth of the electrode assembly in the second direction such that any increase in the Feret diameter of the electrode assembly in the second direction per cycle of the secondary battery is less than 1%.

Secondary Battery with Void Space

In yet another embodiment, a secondary battery 102 is provided having a region with a void space or void fraction, located between a separator material layer 130 and a negative electrode layer 1300, which may be, for example, a multilaminate layer having a negative electrode active material layer and a negative electrode current collector layer. The void space and/or void fraction provided between the separator material layer 130 and the negative electrode layer 1300 may, in certain embodiments, facilitate manufacture of the secondary battery having the set of constraints 108, by providing a volume into which an expanding negative electrode active material can grow upon charging of the secondary battery, such as during an initial charging process performed as a part of formation of the secondary battery 102. In certain embodiments, the void space and/or void fraction may reduce the strain exerted on the set of constraints during such a formation process, to inhibit breaking and deformation of the structures in the set of constraints 108.

In one embodiment, the secondary battery 102 having the void space and/or void fraction may comprise structures as described elsewhere herein, and in particular may comprise an enclosure 104, an electrode assembly 106, carrier ions within the battery enclosure, and a set of electrode constraints 108. The electrode assembly 106 can comprise a series of stacked layers 800 that are stacked in a stacking direction to form a stacked population, the stacked population comprising a population of negative electrode layers 1300, a population of positive electrode layers 1302, a population of separator material layers 130. The negative electrode layers 1300 may in certain embodiments be multilaminate layers, including, e.g., a negative electrode current collector and a negative electrode active material layer, and/or may be simply a single layer negative electrode sheet. Similarly, the positive electrode layers 1302 may in certain embodiments be multilaminate layers, including, e.g., a positive electrode current collector and a positive electrode active material layer, and/or may be simply a single layer positive electrode sheet.

Figure 58:
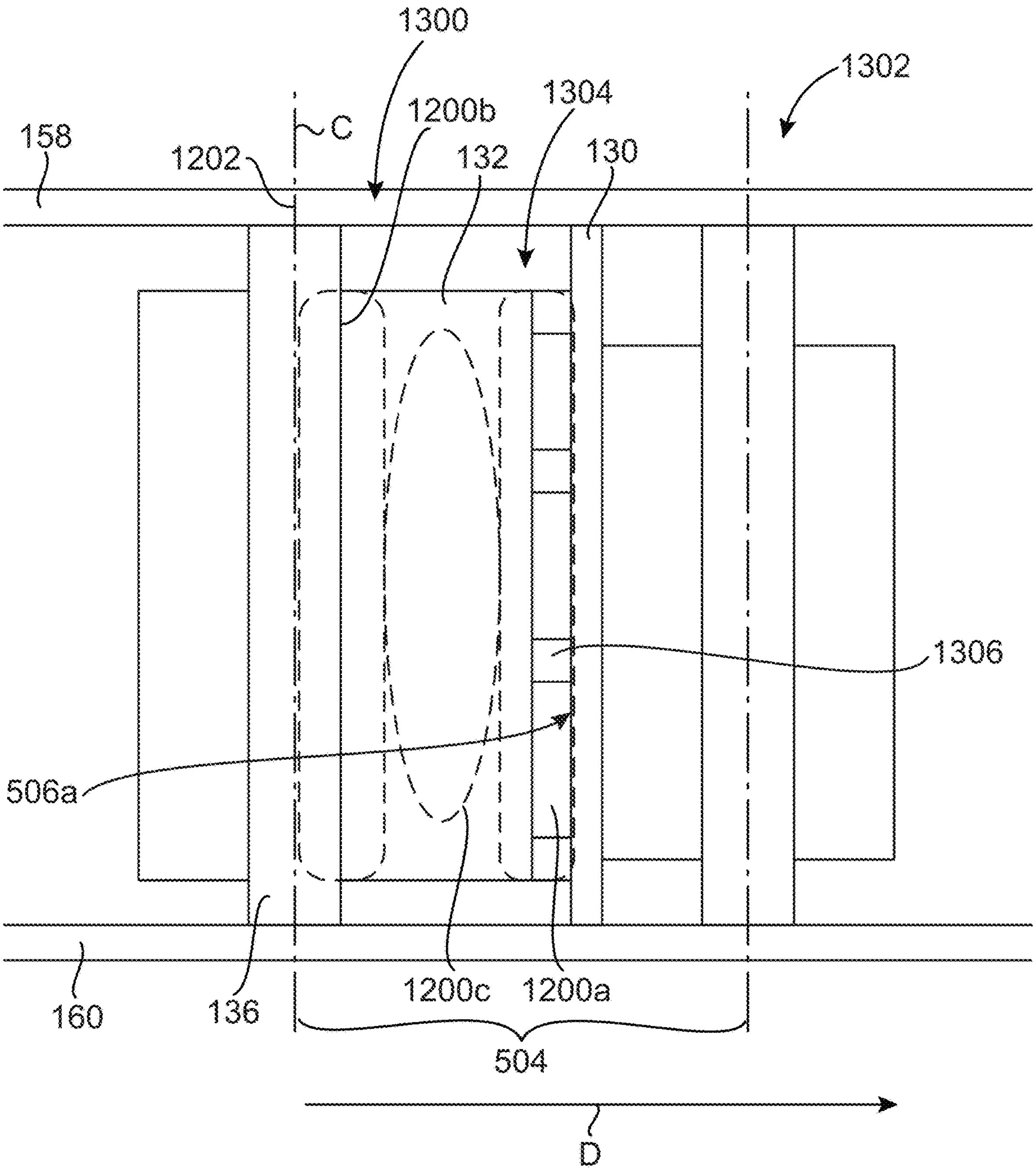
FIG. 58 illustrates an embodiment of an electrode assembly having a unit cell with a unit cell volume, and having a first region adjacent a separator with a first void fraction, and a second region adjacent a centerline of a negative electrode layer with a second void fraction.

Referring to FIG. 58, in one embodiment the electrode assembly 106 also comprises a population of unit cells 504, wherein each unit cell 504 comprises a unit cell portion of a first member of the negative electrode layers 1300, a member of the population of separator material layers 130 that is ionically permeable to the carrier ions, and a unit cell portion of a first member of the positive electrode layers 1302, wherein the negative electrode layer 1300 is proximate a first side 506*a* of the separator material layer, and the positive electrode layer 1302 is proximate an opposing second side 506*b* of the separator material layer 130, and the separator electrically isolates the negative electrode layer 1300 from the positive electrode layer 1302, and carrier ions are primarily exchanged between the first member of the negative electrode layers and the first member of the positive electrode layers via the separator material layer of each such unit cell during cycling of the battery between the charged and discharged state.

The secondary battery 102 may also have a set of constraints 108 corresponding to any described herein. For example, the secondary battery 102 can comprise a primary constraint system 151 and a secondary constraint system 155 wherein the primary constraint system 151 comprises first and second primary growth constraints 154, 156 and at least one primary connecting member 162, the first and second primary growth constraints 154, 165 separated from each other in the stacking direction D, and the at least one primary connecting member 162 connecting the first and second primary growth constraints to at least partially restrain growth of the electrode assembly in the stacking direction. The secondary battery 102 can further comprise a secondary constraint system comprising first and second secondary growth constraints 158, 160 separated in a second direction and connected by secondary connecting members 166 comprising at least a portion of the negative electrode layers 1300, wherein the secondary constraint system 166 at least partially restrains growth of the electrode assembly 106 in the second direction, the second direction being orthogonal to the stacking direction. As in embodiments of the set of constraints 108 described elsewhere herein, the primary constraint system may maintain a pressure on the electrode assembly in the stacking direction that exceeds the pressure maintained on the electrode assembly in each of two directions that are mutually perpendicular and perpendicular to the stacking direction. In one embodiment, the negative electrode layer 1300 comprises a negative electrode current collector layer 136 and a negative electrode active material layer 132 disposed on at least one surface of the negative electrode current collector 136, where the negative electrode current collector layer 136 connects the first and second secondary growth constraints 158, 160

Referring to FIG. 58, in one embodiment, each member of the unit cell population 504 comprises a cell volume 1304 in which a void volume and/or void fraction is provided. The cell volume 1304 may be bounded by a centerline 1202 of the negative electrode layer 1300, which centerline can be understood as a reference plane that is located in a plane orthogonal to the stacking direction (i.e., in the X-Z plane), and which is located at the center of the negative electrode layer 1300, such as for example bisecting the negative electrode layer 1300 in the stacking direction. In one embodiment, the centerline coincides with the negative electrode current collector layer, such as by bisecting the negative electrode current collector layer in the X-Z plane. The void fraction within this cell volume 1304 may be selected, in certain embodiments, to be larger in regions of the cell volume 1304 that are closer to the separator layer 130, and lower in regions of the cell volume 1304 that are closer to the centerline 1202, such that a void volume may be provided in the cell volume 1304 that can accommodate expansion of portions of the negative electrode layer 1300. For example, in one embodiment, the cell volume 1304 can comprise a first region 1200*a* that is adjacent the separator surface 506*a* facing the negative electrode layer 1300, and a second region 1200*b* that is adjacent the centerline 1202. The first region 1200*a* adjacent the separator can comprise a higher void fraction than the second region 1200*b* that is adjacent the centerline, meaning that a void fraction is lower in the second region 1200*b* that is located more centrally about the negative electrode layer 1300, and is higher of the cell volume 1304 that are closer to an interface between the separator layer 130 and the negative electrode layer 1300.

In one embodiment, the cell volume 1304 comprises a first region 1200*a* that is adjacent the separator surface 506*a*, and a second region 1200*b* that is adjacent the centerline 1202, and wherein the first region comprises at least 10% of the cell volume, and the second region also comprises at least 10% of cell volume. The first and second regions may be separate, non-overlapping regions. That is, the first region may make up a region corresponding to at least 10% of the cell volume 1304, which region is adjacent to the separator surface 506*a*, and the second region may make up a region corresponding to at least 10% of the cell volume 1304, which region is adjacent to the centerline 1202. Furthermore, in the first region 1200*a*, the void fraction may be greater than 85%, whereas in the second region the void fraction is less than 60%. For example, the void fraction may be high in areas of the cell volume that are filled with the negative electrode layer (e.g., filled with negative electrode active material layer and/or negative electrode current collector layer), and may decrease in any regions where any spaces and/or voids have been provided at an interface between the negative electrode layer 1300 and the separator 130. Accordingly, conversely, in certain embodiments, the density of material such as negative electrode active material, may decrease (e.g., proportionately to the increase in void fraction), in a direction from the second region adjacent the centerline 1202 to the first region adjacent the separator 130. In one embodiment, the void fraction in the second region 1202*b* may be less than 55%, such as less than 50%, less than 45%, less than 40%, and/or even less than 35%. In another embodiment, the void fraction in the first region may be greater than 90%, such as greater than 95%, greater than 98%, and/or even greater than 99%.

In one embodiment, the cell volume 304 further comprises a third region 1202*c* disposed between the first and second regions, which may have a void fraction between that of the first and second region. For example, the void fraction may be high in areas of the cell volume that are filled with the negative electrode layer (e.g., filled with negative electrode active material layer and/or negative electrode current collector layer), and may decrease in any regions where the negative electrode layer becomes more porous, and further drop where any spaces and/or voids have been provided at an interface between the negative electrode layer 1300 and the separator 130. In one embodiment, the void fraction of the unit cell 304 as measured in any given region may monotonically decrease from the centerline 1202 in a direction towards the separator layer 130.

Figure 59:
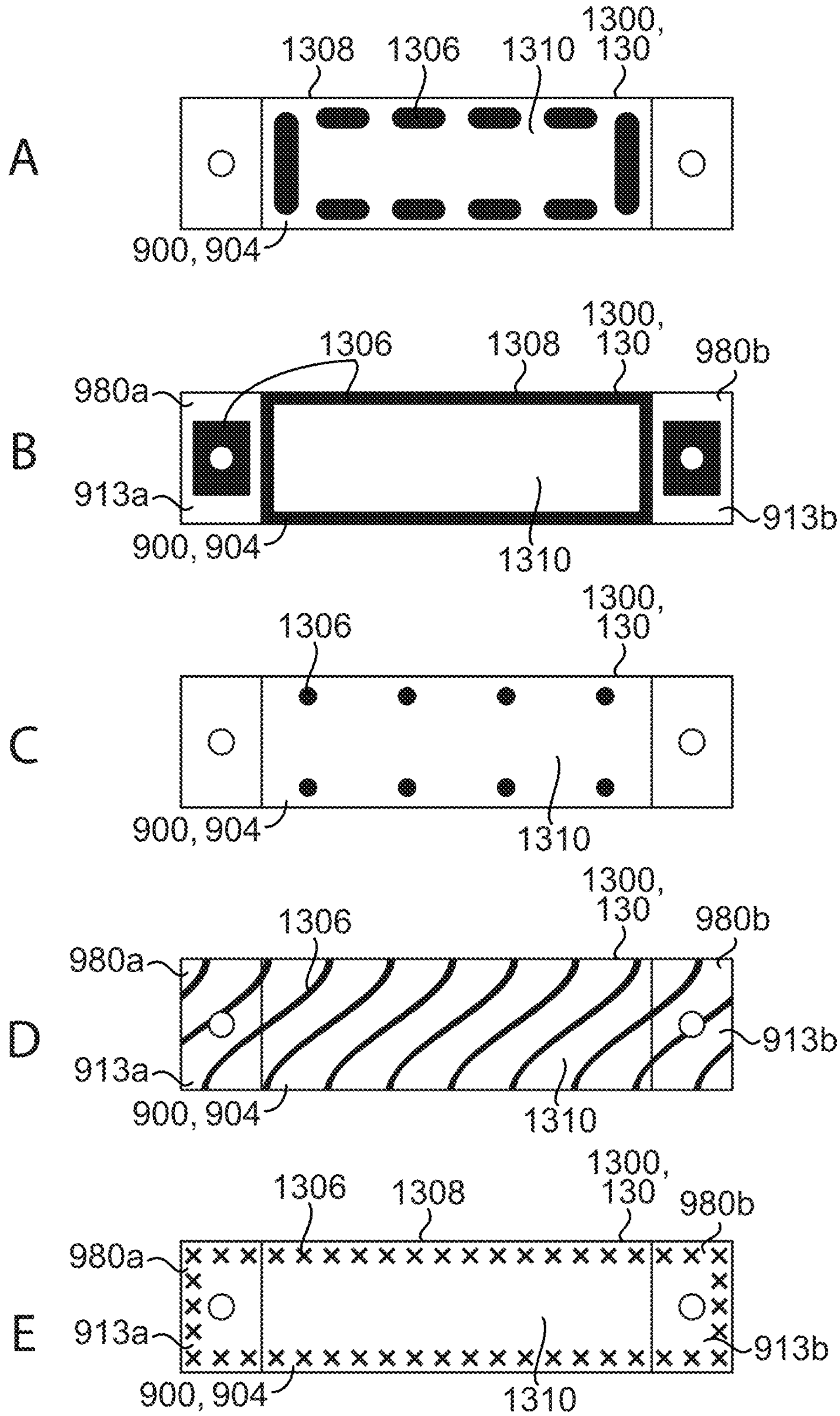
FIGS. 59A-E illustrate embodiments of negative electrode and/or separator layer subunits having different configurations of protrusions thereon.

The electrode assembly 106 comprising spacer and/or void region can be provided via a number of different configurations. For example, referring to FIG. 58, the higher void fraction at the interface between the negative electrode layer 1300 and the separator 130 may be provided via one or more protrusions 1306 provided on a surface of the negative electrode layer 1300, which protrusions may extend towards the separator layer 130 in the stacking direction and serve to provide void spaces in between the protrusions 1306 and between the negative electrode layer 1300 and separator layer 130. For example, the protrusions 1306 may contact the surface 506*a* of the separator layer 130 when the negative electrode layer 1300 and separator layer 130 are stacked together in the stacked series of layers 800 to form the electrode assembly 106. In yet another embodiment, the protrusions 1306 may be formed on a surface 506*a* of the separator layer 130, and may extend towards the negative electrode layer 1300 in the stacking direction. In a further embodiment, both the negative electrode layer 1300 and separator layer 130 may have protrusions that extend towards one another, to provide the void spaces. In one embodiment, the protrusions 1306 may be formed of a same material as the negative electrode layer 1300, and for example may be formed of the same material as a negative electrode active material of the negative electrode layer 1300. In yet another embodiment, the protrusions may be formed of a same material as the separator layer 130. In a further embodiment, the protrusions may be formed of a sacrificial material that can be removed at a point post-formation, such as for example by dissolving the sacrificial material In another embodiment, the protrusions 1306 may take a variety of shapes and forms. For example, referring to FIGS. 59A-E, a number of embodiments with different protrusion distribution, shapes and configurations, can be seen, as disposed on a surface 1310 of a layer that may be one or more of the negative electrode layer 1300 and the separator layer 130. In one embodiment, as shown in FIG. 59A, the protrusions comprise a series of raised bumps positioned about a periphery 1308 of the layer 1300, 130, such as about a periphery of the electrode active material layer 132, and/or about a periphery of the separator layer 130. By providing the protrusions and/or bumps about the periphery 1308, in certain embodiments the structure may stabilize the layers about the void spaces, so that the separator layer and negative electrode material layer remain spaced apart from one another, for example substantially without bending or deformation of the layers into the void space. In the embodiment shown in FIG. 59B, the protrusions comprise a raised ridge about a periphery of the layer 1300, 130. The protrusions can also optionally be provided at end margins 980*a,b*, 913*a,b* of an electrode subunit 900 and/or separator layer subunit 904 comprising the layer, prior to removal of portion of the subunit at the end margins thereof. The protrusions provided in the end margins can be provided in combination with other protrusions formed at other points along the layer, or the protrusions may be formed solely in the end margins, such that they may be removed after forming the stacked series of layers by removal of the portions of the subunits at the weakened regions.

In a further embodiment, as shown in FIG. 59C, the plurality of protrusions 1306 may comprise a plurality of columns or other raised features that are distributed across different points on the surface of the layer 1300, 130, such as across a surface of an electrode active material layer 132, or across a surface of a layer of separator material. By distributing the protrusions across the surface, bending and/or deformation of the layer 1300, 130 having the protrusions may be inhibited, as the protrusions may contact the adjacent layer (i.e., the separator layer 130 in the case where protrusions are formed on the negative electrode layer 1300, and the negative electrode layer 1300 in a case where the protrusions are formed on the separator layer), to maintain a separation between the layers, even under the pressures of stacking when placed in the stacked series. Further embodiments are shown in FIGS. 59D and 59E, which show protrusions comprising a series of ridges formed on the surface of the layer and extending diagonally across one or more dimensions of the layer (59D), such as across a height and a length of the layer, and a series of cross-shaped protrusions formed about a periphery 1308 of the layer and extending into the end margins 980*a,b*, 913*a,b* (59E).

In further embodiments, other configurations that may be capable of imparting a void space in the cell volume 1304 of the electrode assembly may be provided, such as by forming depressions in one or more of the negative electrode layer 1300 and/or separator layer 130. That is, the depressions can be formed in the surface 1310 of one or more of the layer 1300, 130, and may be sized and configured such that when the layers 1300, 130 of the unit cell 504 are stacked adjacent to one another in the stacked series 800, a void fraction is provided in the first region adjacent the separator layer 130 that is sufficiently high to meet the criteria described herein (e.g., at least 85% void fraction in a region adjacent the separator layer 130 comprising 10% of the cell volume 304). In yet another embodiment, the desired void fraction in the first region may be provided by imparting a sufficient surface roughness to one or more of the negative electrode layer 1300 and the separator layer 130 that results in the void fraction.

In yet a further embodiment, the desired void fraction in the first region adjacent the separator layer 130 is provided by leaving a gap in between the negative electrode layer 1300 and separator layer 130 in the unit cell 504. For example, referring to FIG. 54, spacer units 909*a,b* can be provided in the end margins of one or more of an electrode subunit 900 and/or separator layer subunit 904 when forming the stacked series of layers, which spacer units space apart and form a gap between the electrode subunit and the separator layer subunit 904. Removal of the end portions of the subunits at the weakened regions thus removes the spacer units 909*a,b*, leaving behind a gap between the subunits, which may be retained in unit cells 504 of the stacked series. The resulting electrode assembly thus comprises a gap between the negative electrode layer 1300 and separator layer 130 at the first region adjacent the separator layer 130, which may provide the void fraction of at least 85% (e.g., 100%) in the first region.

In one embodiment, the secondary battery comprising the spacer/void region may be a battery that is in a pre-formation state, or in other words a secondary battery that has not yet been subjected to a formation process in which the secondary is run through a charging cycle for a first time following manufacture thereof. In another embodiment, the secondary battery may be in a post-formation state, such as after having undergone an initial formation process involving one or more charging cycles, and may provide a void region that is capable of accommodating expansion of the negative electrode layer 1300 in the secondary battery during charge and discharge cycles.

According to yet another embodiment, a method of manufacturing an electrode assembly having the spacer/void region can be provided, such as in the manufacture of a secondary battery 102 having the electrode assembly 106. Such a method of manufacture can comprise processes and/or structures described elsewhere herein, and incorporate steps and/or structures that result in an electrode assembly 106 having the void fractions in the first and second regions that corresponds to that described herein.

In one embodiment, a method for the preparation of an electrode assembly, comprises removing the population of negative electrode subunits 900 from the negative electrode sheet 906, the negative electrode sheet comprising the negative electrode sheet edge margin and at least one negative electrode sheet weakened region 908 that is internal to the negative electrode sheet edge margin, the at least one negative electrode sheet weakened region at least partially defining the boundary of the negative electrode subunit population within the negative electrode sheet, the negative electrode subunit of each member of the negative electrode subunit population having the negative electrode subunit centroid. The method further comprises removing the population of separator layer subunits 904 from the separator sheet 912, the separator sheet comprising the separator sheet edge margin and at least one separator sheet weakened region that is internal to the separator sheet edge margin, the at least one separator sheet weakened region at least partially defining the boundary of the separator layer subunit population, each member of the separator layer subunit population having opposing surfaces. The method also comprises removing the population of positive electrode subunits 902 from the positive electrode sheet 918, the positive electrode sheet comprising the positive electrode edge margin and at least one positive electrode sheet weakened region that is internal to the positive electrode sheet edge margin, the at least one positive electrode sheet weakened region at least partially defining the boundary of the positive electrode subunit population within the positive electrode sheet, the positive electrode subunit of each member of the positive electrode subunit population having the positive electrode subunit centroid.

Embodiments of the method can further comprise stacking members of the negative electrode subunit population, the separator layer subunit population and the positive electrode subunit population in the stacking direction to form the stacked population of unit cells, each unit cell in the stacked population comprising at least the unit cell portion of the negative electrode subunit, the separator layer of the stacked member of the separator layer subunit population, and the unit cell portion of the positive electrode subunit. The member can be stacked such that the negative electrode subunit and positive electrode subunit face opposing surfaces of the separator layer comprised by such stacked unit cell population member. As in embodiments discussed above, the separator layer comprised by such stacked unit cell population member is adapted to electrically isolate the portion of the negative electrode subunit and the portion of the positive electrode subunit comprised by such stacked unit cell while permitting an exchange of carrier ions between the negative electrode subunit and the positive electrode subunit comprised by such stacked unit cell.

Furthermore, in one embodiment, the method may further comprise affixing the set of electrode constraints 108 to the stacked population of unit cells, the set of electrode constraints comprising the primary constraint system 151 and the secondary constraint system 152. The primary constraint system 151 can comprise first and second growth constraints 154, 156 and at least one primary connecting member 162, the first and second primary growth constraints separated from each other in the stacking direction, and the at least one primary connecting member connecting the first and second primary growth constraints to at least partially restrain growth of the electrode assembly in the stacking direction. Furthermore, the secondary constraint system 155 can comprise first and second secondary growth constraints 158, 160 separated in a second direction and connected by secondary connecting members 166 comprising at least the portion of the negative electrode subunit 900 (e.g., a negative electrode current collector), wherein the secondary constraint system 155 at least partially restrains growth of the electrode assembly 106 in the second direction, the second direction being orthogonal to the stacking direction. As in embodiments discussed above the primary constraint system may also maintains a pressure on the electrode assembly in the stacking direction that exceeds the pressure maintained on the electrode assembly in each of two directions that are mutually perpendicular and perpendicular to the stacking direction.

Embodiments of the method of manufacture may further comprise providing, for each member of the population of unit cells 504, the cell volume 1304 in that unit cell 504 that is bounded by a centerline 1202 of the negative electrode subunit 900, the centerline comprising a reference plane that is located in a plane orthogonal to the stacking direction, and by a surface of the separator material subunit 904 that faces the negative electrode subunit, as well as by the first and second secondary growth constraints 158, 160 that are connected to one another by at least a portion of the negative electrode subunit 900. Similarly to the discussion of the secondary battery above, in one embodiment the centerline may coincide with a negative electrode current collector layer of the negative electrode subunit, such as by bisecting the negative electrode current collector layer in the X-Z plane, as in FIG. 58. Furthermore, the method of manufacture may comprise providing a cell volume comprising a first region 1202*a* that is adjacent the surface of the separator subunit, and a second region 1202*b* that is adjacent the centerline, and wherein the first region comprises at least 10% of the cell volume and has a void fraction greater than 85%, and the second region comprises at least 10% of the cell volume and has a void fraction of less than 60%. Furthermore, the void fraction in the second region 1202*b* may be less than 55%, such as less than 50%, less than 45%, less than 40%, and/or even less than 35%. In another embodiment, the void fraction in the first region may be greater than 90%, such as greater than 95%, greater than 98%, and/or even greater than 99%.

In one embodiment, the first and second regions 1200*a, b* having the void fractions may be formed by a method that comprises removing a population of negative electrode subunits 900 having protrusions 1306 formed thereon, such as for example as shown in FIGS. 59A-E. The negative electrodes subunits 900 may then be stacked in the stacked population of unit cells, such that the protrusions 1306 are disposed between the negative electrode subunits and the separator layer subunits 904. In yet another embodiment, the method can comprise removing a population of negative electrode subunits 900 having protrusions and/or spacers 909*a,b* at the end margins thereof, as shown for example in FIG. 54 and FIGS. 59B and D-E, and then stacking members of the population of negative electrode subunits in the stacked population of unit cells such that the protrusions are disposed between the negative electrode subunits and the separator layer subunits. In yet another embodiment, the method can comprise removing a population of separator subunits having protrusions on at least one surface thereof, and/or at the end margins thereof, and stacking members of the population negative electrode subunits in the stacked population of unit cells such that the protrusions are disposed between the negative electrode subunits and the separator layer subunits. In yet another embodiment, a population of spacer subunits 909*a*, 909*b* may be removed from a separate spacer sheet, followed by stacking members of the population of spacer subunits in the stacked population of unit cells such that members of the population of spacer subunits are disposed between the negative electrode subunits and the separator layer subunits.

Furthermore, the method of manufacture can comprise providing the first and second regions having the first and second void fractions that are formed by providing negative electrode subunits and/or separator layer subunits that have been configure to provide the void fractions, as discussed for the negative electrode layer 1300 and separator layer above. For example, in one embodiment, a population of negative electrode subunits is provided that comprises protrusions formed on the surface of the negative electrode subunit opposing the separator layer subunit, the protrusions serving to space apart the surface of the negative electrode subunit from the surface of the separator layer subunit, as shown in FIGS. 58 and 59A-E. In one embodiment, the protrusions may be formed of a material that is the same as that in the negative electrode subunit, such as for example the negative electrode active material. In another embodiment, a population of separator layer subunits is provided that comprises protrusions formed on the surface of the separator layer subunit opposing the negative electrode subunit, the protrusions serving to space apart the surface of the negative electrode subunit from the surface of the separator layer subunit. In one embodiment, the protrusions may be formed of a material that is the same as that in the separator layer subunit, such as for example separator material. In yet further embodiments, one or more of the negative electrode subunit and/or separator layer subunit may comprise one or more depressions formed therein that impart a desired void fraction, and/or the surfaces of one or more of the subunits may be surface roughened. In yet a further embodiment, a spacer layer may be provided in between the negative electrode subunit and separator layer subunit that comprises a sacrificial material, and that is removable from the electrode assembly following stacking to form the stacked population.

Furthermore, while FIG. 58 illustrates an embodiment where a gap and/or higher void fraction is provided in the vicinity of the interface between the separator 130 and negative electrode layer (such as between the separator and negative electrode active material layer 132), the gap and/or area of increased void fraction may also be located in other areas of the unit cell 504 and/or stacked population of layers. For example, the gap and/or area of increased void fraction (e.g., the first region referred to above, having at least 85% void fraction), may be in the vicinity of the interface between the positive electrode layer and the separator (such as between the separator and positive electrode active material layer 138). In yet another embodiment, the gap and/or area of increased void fraction (e.g., the first region referred to above, having at least 85% void fraction), may be in the vicinity of the interface between the negative electrode active material layer and the negative electrode current collector 136. For example, a spacer may be provided between the negative electrode active material layer and the negative electrode current collector layer to crate a gap and/or area of increased void fraction between the negative electrode active material layer and negative electrode current collector layer. The spacer can comprise an electrically conductive material so as to maintain electrical connection between the negative electrode current collector layer and negative electrode active material layer. The spacer disposed between the negative electrode current collector layer and negative electrode active material layer may also comprise protrusions, a surface roughness, or other features that impart the intended void fraction in a region about the interface, as described for the first region in the area of the interface between the separator layer and negative electrode layer above. In yet a further embodiment, the gap and/or area of increased void fraction (e.g., the first region referred to above, having at least 85% void fraction), may be in the vicinity of the interface between the positive electrode active material layer and the positive electrode current collector 136. For example, a spacer may be provided between the positive electrode active material layer and the positive electrode current collector layer to create a gap and/or area of increased void fraction between the positive electrode active material layer and positive electrode current collector layer. The spacer can comprise an electrically conductive material so as to maintain electrical connection between the positive electrode current collector layer and positive electrode active material layer. The spacer disposed between the positive electrode current collector layer and positive electrode active material layer may also comprise protrusions, a surface roughness, or other features that impart the intended void fraction in a region about the interface, as described for the first region in the area of the interface between the separator layer and negative electrode layer above. In one embodiment, the spacer comprises any one or more of the materials described herein for the negative electrode active materials, positive electrode active materials, negative electrode current collector materials, positive electrode current collector materials, and separator materials. While in certain embodiments the spacer can comprise a layer and/or portion of material that is separate from other structures in the stacked population of layers, such as the negative electrode layer, positive electrode layer, and/or separator, in other embodiments the spacer can comprise a portion of the structures, such as protrusions formed on the surface of the negative electrode active material layer, separator layer, negative electrode current collector, positive electrode active material layer, and positive electrode current collector, as well as any other features formed on these layers that are capable of acting as a spacer to provide a gap and/or increased void fraction at the intended region as described herein.

In yet another embodiment, the gap and/or area of increased void fraction (e.g., the first region referred to above, having at least 85% void fraction), may be disposed within one or more of the positive electrode current collector 140 and the negative electrode current collector 136. For example, one or more of the positive electrode current collector 140 and negative electrode current collector 136 may be split or segmented, such as along the X-Z plane (e.g., split the thickness of the current collector), such as by being split in half or some other fraction, and the gap and/or area of increased void fraction may be disposed therebetween. In one embodiment, the gap and/or area of increased void fraction may simply comprise an open space between the current collector sections. In another embodiment, a spacer may be provided between the split portions of the current collector layer to create a gap and/or area of increased void fraction between the sections of the current collector. The spacer can comprise any of those discussed above, and may be electrically conductive or electrically insulating. The spacer disposed between the current collector layer segments may also comprise protrusions, a surface roughness, or other features that impart the intended void fraction, as described for the first region in the area of the interface between the separator layer and negative electrode layer above. In one embodiment, the spacer comprises any one or more of the materials described herein for the negative electrode active materials, positive electrode active materials, negative electrode current collector materials, positive electrode current collector materials, and separator materials. While in certain embodiments the spacer can comprise a layer and/or portion of material that is separate from the current collector layers, in other embodiments the spacer can comprise a portion of the current collector layer structures, such as protrusions formed on the surface of the current collector segments, and/or any other features formed on the current collector segments that are capable of acting as a spacer to provide a gap and/or increased void fraction at the intended region as described herein.

Furthermore, in yet another embodiment, the spacer used to effect the gap and/or void fraction as described in embodiments herein, may comprise a material that is one or more ionically, electrically, and electrochemically compatible (e.g., does not corrode) with adjacent structures (e.g., negative electrode active materials, negative electrode current collectors, positive electrode active materials, positive electrode current collectors, separators), or with electrolyte and/or carrier ions in the secondary battery. Furthermore, in a case where the structures (e.g., negative electrode active materials, negative electrode current collectors, positive electrode active materials, positive electrode current collectors, separators) are themselves provided with protrusions and/or other features (e.g. surface roughness) that serve a spacer function to effect a gap and/or increased void fraction in a certain region (e.g., in the vicinity of the interface of the separator and negative electrode active material layer), the protrusions and/or other features may be similarly compatible with adjacent structures, electrolyte and/or carrier ions in the secondary battery.

In yet another embodiment, the gap and/or void fraction may be a cumulative gap and/or void fraction provided over a plurality of unit cells. For example, in one embodiment, the gap and/or void fraction in a single unit cell in a given population may be less than an overall gap and/or void fraction intended for the plurality of unit cells (or may even be zero), but other unit cells in the population may comprise larger gaps and/or void fractions to accommodate the smaller gaps and/or void fraction in certain unit cells. For example, in one embodiment, every other unit cell in a population may comprise a gap and/or void fraction that is 2× to accommodate other unit cells having substantially no gap and/or void fraction, where a cumulative gap over the population of unit cells is intended to be N times x (where N is the number of unit cells in the population). In another embodiment, every $5^{th}$ unit cell in a population may comprise a gap and/or void fraction that is 5× to accommodate other unit cells having substantially no gap and/or void fraction, where a cumulative gap over the population of unit cells is intended to be N times x (where N is the number of unit cells in the population). In yet another embodiment, every 10th unit cell in a population may comprise a gap and/or void fraction that is 10× to accommodate other unit cells having substantially no gap and/or void fraction, where a cumulative gap over the population of unit cells is intended to be N times x (where N is the number of unit cells in the population). In yet a further embodiment, for a cumulative gap over the population of unit cells that is intended to be N times x (where N is the number of unit cells in the population), the gap and/or void fraction in a unit cell in the population may be at least 1%, at least 5%, at least 10%, and/or at least 15% of the average gap and/or void space intended for the population (e.g., (N times x)/(number of unit cells in the population)), and may be less than 90%, less than 80%, less than 75%, less than 50%, less than 35%, less than 20%, less than 10%, and/or less than 5% of the average gap and/or void space intended for the population (e.g., (N times x)/(number of unit cells in the population)). The number of unit cells N in the population may be, for example, at least 2, 5, 8, 10, 15, 20, 25, 30, 40, 50, 75, 80, 80, 100, 150, 200, 300, 500, 800, 1000, or even greater, and/or the number N of unit cells may correspond to the entire number of unit cells in the secondary battery.

EXAMPLES

The present examples demonstrate a method of fabricating an electrode assembly 106 having the set of constraints 108 for a secondary battery 102. Specific examples of a process for forming an electrode assembly 106 and/or secondary battery 102 according to aspects of the disclosure are provided below. These examples are provided for the purposes of illustrating aspects of the disclosure, and are not intended to be limiting.

Example 1: LMO/Si with Spray-on Separator

In this example, an electrode active material layer 132 comprising Si is coated on both sides of Cu foil, which is provided as the electrode current collector 136. Examples of suitable active Si-containing materials for use in the electrode active material layer 132 can include Si, Si/C composites, Si/graphite blends, SiOx, porous Si, and intermetallic Si alloys. A separator material is sprayed on top of the Si-containing electrode active material layer 132. The Si-containing electrode active material layer/Cu foil/separator combination is diced to a predetermined length and height (e.g., a predetermined $L_E$ and $H_E$), to form the electrode structures 110. Furthermore, a region of the Cu foil may be left exposed (e.g., uncoated by the Si-containing electrode active material layer 132), to provide transverse electrode current collector ends that can be connected to an electrode busbar 600.

Furthermore, a counter-electrode active material layer 138 comprising a lithium containing metal oxide (LMO), such as lithium cobalt oxide (LCO), lithium nickel cobalt aluminum oxide (NCA), lithium nickel manganese cobalt oxide (NMC), or combinations thereof, is coated on both sides of an Al foil, which is provided as the counter-electrode current collector 140. A separator material is sprayed on top of the LMO-containing counter-electrode active material layer 138 The LMO-containing counter-electrode active material layer/Al foil/separator combination is diced to a predetermined length and height (e.g., a predetermined $L_E$ and $H_E$), to form the counter-electrode structures 110. Furthermore, a region of the Al foil may be left exposed (e.g., uncoated by the LMO-containing counter-electrode active material layer 13 138), to provide transverse counter-electrode current collector ends that can be connected to a counter-electrode busbar 602. The anode structures 110 and cathode structures 112 with separator layers are stacked in an alternating fashion to form a repeating structure of separator/Si/Cu foil/Si/separator/LMO/Al foil/LMO/separator. Also, in the final stacked structure, the counter-electrode active material layers 138 may be provided with vertical and/or transverse offsets with respect to the electrode active material layers 132, as has been described herein.

While stacking, the transverse ends of the electrode current collectors can be attached to an electrode busbar by, for example, being inserted through apertures and/or slots in a bus bar. Similarly, transverse ends of the counter-electrode current collectors can be attached to a counter-electrode busbar by, for example, being inserted through apertures and/or slots in a counter-electrode bus bar. For example, each current collector and/or counter-current collector end may be individually inserted into a separate aperture, or multiple ends may be inserted through the same aperture. The ends can be attached to the busbar by a suitable attachment methods such as welding (e.g., stich, laser, ultrasonic).

Furthermore, constraint material (e.g., fiberglass/epoxy composite, or other materials) are diced to match the XY dimensions of stacked electrode assembly 106, to provide first and second secondary growth constraints at vertical ends of the electrode assembly. The constraints may be provided with holes therein, to allow free flow of electrolyte to the stacked electrodes (e.g., as depicted in the embodiments shown in FIGS. 6C and 6D). Also, the vertical constraints may be attached to a predetermined number of "backbones" of the electrode and/or counter-electrode structures 110, 112, which in this example may be the Cu and/or Al foils forming the electrode and counter-electrode current collectors 136, 140. The first and second vertical constraints can be attached to the vertical ends of the predetermined number of electrode and/or counter-electrode current collectors 136, 140, for example via an adhesive such as epoxy.

The entire electrode assembly, constraint, bus bars, and tab extensions can be placed in the outer packaging material, such as metallized laminate pouch. The pouch is sealed, with the bus bar ends protruding through one of the pouch seals. Alternatively, the assembly is placed in a can. The busbar extensions are attached to the positive and negative connections of the can. The can is sealed by welding or a crimping method.

In yet another embodiment, a third auxiliary electrode capable of releasing Li is placed on the outside of the top constraint system, prior to placing the assembly in the pouch. Alternatively, an additional Li releasing electrode is also placed on the outside of the bottom constraint system. One or both of the auxiliary electrodes are connected to a tab. The system may be initially formed by charging electrode vs. counter-electrode. After completing the formation process, the pouch may be opened, auxiliary electrode may be removed, and the pouch is resealed.

Example 2: LMO/Graphite with Spray on Separator

In this example, an electrode active material layer 132 comprising graphite is coated on both sides of Cu foil, which is provided as the electrode current collector 136. A separator material is sprayed on top of the graphite-containing electrode active material layer 132. The graphite-containing electrode active material layer/Cu foil/separator combination is diced to a predetermined length and height (e.g., a predetermined $L_E$ and $H_E$), to form the electrode structures 110. Furthermore, a region of the Cu foil may be left exposed (e.g., uncoated by the graphite-containing electrode active material layer 132), to provide transverse electrode current collector ends that can be connected to an electrode busbar 600.

Furthermore, a counter-electrode active material layer 138 comprising a lithium containing metal oxide (LMO), such as LCO, NCA, NMC, is coated on both sides of an Al foil, which is provided as the counter-electrode current collector 140. A separator material is sprayed on top of the LMO-containing counter-electrode active material layer 138 The LMO-containing counter-electrode active material layer/Al foil/separator 10) 138 combination is diced to a predetermined length and height (e.g., a predetermined $L_E$ and $H_E$), to form the counter-electrode structures 110. Furthermore, a region of the Al foil may be left exposed (e.g., uncoated by the LMO-containing counter-electrode active material layer 13 138), to provide transverse counter-electrode current collector ends that can be connected to a counter-electrode busbar 602. The anode structures 110 and cathode structures 112 with separator layers are stacked in an alternating fashion to form a repeating structure of separator/graphite/Cu foil/Si/separator/LMO/Al foil/LMO/separator. Also, in the final stacked structure, the counter-electrode active material layers 138 may be provided with vertical and/or transverse offsets with respect to the electrode active material layers 132, as has been described herein.

While stacking, the transverse ends of the electrode current collectors can be attached to an electrode busbar by, for example, being inserted through apertures and/or slots in a bus bar. Similarly, transverse ends of the counter-electrode current collectors can be attached to a counter-electrode busbar by, for example, being inserted through apertures and/or slots in a counter-electrode bus bar. For example, each current collector and/or counter-current collector end may be individually inserted into a separate aperture, or multiple ends may be inserted through the same aperture. The ends can be attached to the busbar by a suitable attachment methods such as welding (e.g., stich, laser, ultrasonic).

Furthermore, constraint material (e.g., fiberglass/epoxy composite, or other materials) are diced to match the XY dimensions of stacked electrode assembly 106, to provide first and second secondary growth constraints at vertical ends of the electrode assembly. The constraints may be provided with holes therein, to allow free flow of electrolyte to the stacked electrodes (e.g., as depicted in the embodiments shown in FIGS. 6C and 6D). Also, the vertical constraints may be attached to a predetermined number of "backbones" of the electrode and/or counter-electrode structures 110, 112, which in this example may be the Cu and/or Al foils forming the electrode and counter-electrode current collectors 136, 140. The first and second vertical constraints can be attached to the vertical ends of the predetermined number of electrode and/or counter-electrode current collectors 136, 140, for example via an adhesive such as epoxy.

The entire electrode assembly, constraint, bus bars, and tab extensions can be placed in the outer packaging material, such as metallized laminate pouch. The pouch is sealed, with the bus bar ends protruding through one of the pouch seals. Alternatively, the assembly is placed in a can. The busbar extensions are attached to the positive and negative connections of the can. The can is sealed by welding or a crimping method.

Furthermore, in one embodiment, two or more electrode assemblies prepared by any of the methods described above may be stacked together, with an insulating material therebetween which can form a portion of the constraint system. The tabs from busbars 600, 602 of each electrode assembly can be gathered and attached, such as by welding, and the stacked electrode assemblies can be sealed in an outer container, such as a pouch or can. In yet another embodiment, two or more electrode assemblies can be arranged side by side, and attached by the welding of tabs of the busbars 600, 602 to one another (e.g., in series), with the final tabs of an end electrode assembly remaining free to connect to outer packaging. The assemblies thus connected can be sealed in an outer container, such as a pouch or can.

Example 3: Active Material on Metal-Coated Substrate, Free-Standing Separator Film, Busbar with Insulating Base Material In this example, the steps as described in Example 1 and/or 2 are performed, with the exception that a metallized polyimide is used in place of the Cu and/or Al foils described therein. In particular, a polyimide film may be coated with Cu through a method such as electroless plating (e.g., for the electrode current collector 136), and the polyimide film may be coated with Al through a method such as evaporation (e.g., for a counter-electrode current collector 140). The remaining process steps may be performed as in Example 1 and/or 2 above.

The following embodiments are provided to illustrate aspects of the disclosure, although the embodiments are not intended to be limiting and other aspects and/or embodiments may also be provided.

Embodiment 1. A secondary battery for cycling between a charged and a discharged state, the secondary battery comprising a battery enclosure and an electrode assembly, carrier ions, and electrode and counter-electrode busbars for collecting current from the electrode assembly within the battery enclosure, wherein:

(a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to carrier ions, a population of counter-electrode structures, a population of counter-electrode collectors, and a population of unit cells wherein (i) members of the electrode and counter-electrode structure populations are arranged in an alternating sequence in the longitudinal direction, (ii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a height $H_E$ that corresponds to the Feret diameter of the electrode active material layer as measured in the vertical direction between first and second opposing vertical end surfaces of the electrode active material layer, and a width $W_E$ that corresponds to the Feret diameter of the electrode active material layer as measured in the longitudinal direction between first and second opposing surfaces of the electrode active material layer, and each member of the population of counter-electrode structures comprises a layer of a counter-electrode active material having a length $L_C$ that corresponds to the Feret diameter of the counter-electrode active material layer as measured in the transverse direction between first and second opposing transverse end surfaces of the counter-electrode active material layer, and a height $H_C$ that corresponds to the Feret diameter of the counter-electrode active material layer as measured in the vertical direction between first and second opposing vertical end surfaces of the counter-electrode active material layer, and a width $W_C$ that corresponds to the Feret diameter of the counter-electrode active material layer as measured in the longitudinal direction between first and second opposing surfaces of the counter-electrode active material layer (iii) each unit cell comprises a unit cell portion of a first member of the electrode current collector of the electrode current collector population, a first electrode active material layer of one member of the electrode population, a member of the separator population that is ionically permeable to the carrier ions, a first counter-electrode active material layer of one member of the counter-electrode population, and a unit cell portion of a first member of the counter-electrode current collector of the counter-electrode current collector population, wherein (aa) the first electrode active material layer is proximate a first side of the separator and the first counter-electrode material layer is proximate an opposing second side of the separator, and (bb) the separator electrically isolates the first electrode active material layer from the first counter-electrode active material layer, and carrier ions are primarily exchanged between the first electrode active material layer and the first counter-electrode active material layer via the separator of each such unit cell during cycling of the battery between the charged and discharged state, (cc) the first member of the electrode current collector population extends at least partially along the length $L_E$ of the electrode active material layer in the transverse direction and comprises an electrode current collector end that extends past the first transverse end surface of the counter-electrode active material layer of each such unit cell, and (dd) the counter-electrode current collector extends at least partially along the length $L_C$ of the counter-electrode active material layer in the transverse direction and comprises a counter-electrode current collector end that extends past the second transverse end surface of the electrode active material layer in the transverse direction of each such unit cell, and (c)(i) the electrode busbar comprises at least one conductive segment configured to electrically connect to the population of electrode current collectors, and extending in the longitudinal direction of the electrode assembly, the conductive segment comprising a first side having an interior surface facing the first transverse end surfaces of the counter-electrode active material layers, and an opposing second side having an exterior surface, the conductive segment optionally comprising a plurality of apertures spaced apart on along the longitudinal direction, the conductive segment of the electrode bus bar being arranged with respect to the electrode current collector ends such that the electrode current collector ends extend at least partially past a thickness of the conductive segment, to electrically connect thereto, the thickness of the conductive segment being measured between the interior and exterior surfaces, and (c)(ii) the counter-electrode busbar comprises at least one conductive segment configured to electrically connect to the population of counter-electrode current collectors, and extending in the longitudinal direction of the electrode assembly, the conductive segment comprising a first side having an interior surface facing the second transverse end surfaces of the electrode active material layers, and an opposing second side having an exterior surface, the conductive segment optionally comprising a plurality of apertures spaced apart on along the longitudinal direction, the conductive segment of the counter-electrode bus bar being arranged with respect to the counter-electrode current collector ends such that the counter-electrode current collector ends extend at least partially past a thickness of the conductive segment, to electrically connect thereto, the thickness of the conductive segment being measured between the interior and exterior surfaces.

Embodiment 2. The secondary battery according to Embodiment 1, further comprising a set of electrode constraints, wherein the set of electrode constraints comprises a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%.

Embodiment 3. The secondary battery according to any preceding embodiment, wherein each unit cell of the unit cell population comprises a carrier ion insulating material layer, having an ionic conductance that does not exceed 10% of the ionic conductance of the separator of carrier ions during cycling of the battery, and wherein the carrier ion insulating material layer insulates a surface of the electrode current collector layer from the electrolyte.

Embodiment 4. A secondary battery for cycling between a charged and a discharged state, the secondary battery comprising a battery enclosure, an electrode assembly, and carrier ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to the carrier ions, a population of counter-electrode structures, a population of counter-electrode collectors, and a population of unit cells wherein (i) members of the electrode and counter-electrode structure populations are arranged in an alternating sequence in the longitudinal direction, (ii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a height $H_E$ that corresponds to the Feret diameter of the electrode active material layer as measured in the vertical direction between first and second opposing vertical end surfaces of the electrode active material layer, and a width $W_E$ that corresponds to the Feret diameter of the electrode active material layer as measured in the longitudinal direction between first and second opposing surfaces of the electrode active material layer, and each member of the population of counter-electrode structures comprises a layer of a counter-electrode active material having a length $L_C$ that corresponds to the Feret diameter of the counter-electrode active material layer as measured in the transverse direction between first and second opposing transverse end surfaces of the counter-electrode active material layer, and a height $H_C$ that corresponds to the Feret diameter of the counter-electrode active material layer as measured in the vertical direction between first and second opposing vertical end surfaces of the counter-electrode active material layer, and a width $W_C$ that corresponds to the Feret diameter of the counter-electrode active material layer as measured in the longitudinal direction between first and second opposing surfaces of the counter-electrode active material layer, (iii) each unit cell comprises a unit cell portion of a first member of the electrode current collector population, a member of the separator population that is ionically permeable to the carrier ions, a first electrode active material layer of one member of the electrode population, a unit cell portion of first member of the counter-electrode current collector population and a first counter-electrode active material layer of one member of the counter-electrode population, wherein (aa) the first electrode active material layer is proximate a first side of the separator and the first counter-electrode material layer is proximate an opposing second side of the separator, (bb) the separator electrically isolates the first electrode active material layer from the first counter-electrode active material layer and carrier ions are primarily exchanged between the first electrode active material layer and the first counter-electrode active material layer via the separator of each such unit cell during cycling of the battery between the charged and discharged state, and (cc) within each unit cell, a. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, wherein for at least 60% of the height $H_C$ of the counter electrode active material layer (i) the absolute value of a separation distance, $S_{X1}$, between the plots $E_{TP1}$ and $CE_{TP1}$ measured in the transverse direction is 1000 $\mu m \geq |S_{X1}| \geq 5$ $\mu m$, and (ii) as between the first transverse end surfaces of the electrode and counter-electrode active material layers, the first transverse end surface of the counter-electrode active material layer is inwardly disposed with respect to the first transverse end surface of the electrode active material layer, b. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, wherein for at least 60% of the height $H_C$ of the counter-electrode active material layer (i) the absolute value of a separation distance, $S_{X2}$, between the plots $E_{TP2}$ and $CE_{TP2}$ measured in the transverse direction is 1000 $\mu m \geq |S_{X2}| \geq 5$ $\mu m$, and (ii) as between the second transverse end surfaces of the electrode and counter-electrode active material layers, the second transverse end surface of the counter-electrode active material layer is inwardly disposed with respect to the second transverse end surface of the electrode active material layer, c. the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vertical end surface plot, $E_{VP1}$, a 2D map of the median vertical position of the first opposing vertical end surface of the counter-electrode active material layer in the X-Z plane, along the length $L_C$ of the counter-electrode active material layer, traces a first vertical end surface plot, $CE_{VP1}$, wherein for at least 60% of the length $L_C$ of the first counter-electrode active material layer (i) the absolute value of a separation distance, $S_{Z1}$, between the plots $E_{VP1}$ and $CE_{VP1}$ measured in the vertical direction is 1000 $\mu m \geq |S_{Z1}| \geq 5$ $\mu m$, and (ii) as between the first vertical end surfaces of the electrode and counter-electrode active material layers, the first vertical end surface of the counter-electrode active material layer is inwardly disposed with respect to the first vertical end surface of the electrode active material layer, d. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, $E_{VP2}$, a 2D map of the median vertical position of the second opposing vertical end surface of the counter-electrode active material layer in the X-Z plane, along the length $L_C$ of the counter-electrode active material layer, traces a second vertical end surface plot, $CE_{VP2}$, wherein for at least 60% of the length $L_C$ of the counter-electrode active material layer (i) the absolute value of a separation distance, $S_{Z2}$, between the plots $E_{VP2}$ and $CE_{VP2}$ as measured in the vertical direction is 1000 μm≥|$S_{Z2}$|≥5 μm, and (ii) as between the second vertical end surfaces of the electrode and counter-electrode active material layers, the second vertical end surface of the counter-electrode active material layer is inwardly disposed with respect to the second vertical end surface of the electrode active material layer, (c) the set of electrode constraints comprises a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%.

Embodiment 5. The secondary battery according to Embodiment 4, comprising:

(a) an electrode busbar comprises at least one conductive segment configured to electrically connect to the population of electrode current collectors, and extending in the longitudinal direction of the electrode assembly, the conductive segment comprising a first side having an interior surface facing the first transverse end surfaces of the counter-electrode active material layers, and an opposing second side having an exterior surface, the conductive segment optionally comprising a plurality of apertures spaced apart on along the longitudinal direction, the conductive segment of the electrode bus bar being arranged with respect to the electrode current collector ends such that the electrode current collector ends extend at least partially past a thickness of the conductive segment, to electrically connect thereto, the thickness of the conductive segment being measured between the interior and exterior surfaces, and (b) the counter-electrode busbar comprises at least one conductive segment configured to electrically connect to the population of counter-electrode current collectors, and extending in the longitudinal direction of the electrode assembly, the conductive segment comprising a first side having an interior surface facing the second transverse end surfaces of the electrode active material layers, and an opposing second side having an exterior surface, the conductive segment optionally comprising a plurality of apertures spaced apart on along the longitudinal direction, the conductive segment of the counter-electrode bus bar being arranged with respect to the counter-electrode current collector ends such that the counter-electrode current collector ends extend at least partially past a thickness of the conductive segment, to electrically connect thereto, the thickness of the conductive segment being measured between the interior and exterior surfaces.

Embodiment 6. The secondary battery according to Embodiment 4 or 5, wherein each unit cell of the unit cell population comprises a carrier ion insulating material, having an ionic conductance that does not exceed 10% of the ionic conductance of the separator of carrier ions during cycling of the battery, and wherein the carrier ion insulating material layer insulates a surface of the electrode current collector layer from the electrolyte.

Embodiment 7. A secondary battery for cycling between a charged and a discharged state, the secondary battery comprising a battery enclosure, an electrode assembly, and carrier ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to carrier ions, a population of counter-electrode structures, a population of counter-electrode collectors, a carrier ion insulating material layer, and a 30) population of unit cells, wherein (i) each electrode current collector of the population is electrically isolated from each counter-electrode active material layer of the population, and each counter-electrode current collector of the population is electrically isolated from each electrode active material layer of the population, (ii) members of the electrode and counter-electrode structure populations are arranged in an alternating sequence in the longitudinal direction, (iii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a width $W_E$ that corresponds to the Feret diameter of the electrode active material layer as measured in the longitudinal direction between first and second opposing surfaces of the electrode active material layer, and a height $H_E$ that corresponds to the Feret diameter of the electrode active material layer as measured in the vertical direction between first and second opposing vertical end surfaces of the electrode active material layer, and each member of the population of counter-electrode structures comprises a layer of a counter-electrode active material having a length $L_C$ that corresponds to the Feret diameter of the counter-electrode active material layer as measured in the transverse direction between first and second opposing transverse end surfaces of the counter-electrode active material layer, and a width $W_C$ that corresponds to the Feret diameter of the counter-electrode active material layer as measured in the longitudinal direction between first and second opposing longitudinal end surfaces of the counter-electrode active material layer, and a height $H_C$ that corresponds to the Feret diameter of the counter-electrode active material layer as measured in the vertical 20) direction between first and second opposing vertical end surfaces of the counter-electrode active material layer, (iv) each unit cell comprises a unit cell portion of a first member of the electrode current collector population, a member of the separator population that is ionically permeable to the carrier ions, a first electrode active material layer of one member of the electrode population, a unit cell portion of a first member of the counter-electrode current collector population and a first counter-electrode active material layer of one member of the counter-electrode population, wherein (aa) the first electrode active material layer is proximate a first side of the separator and the first counter-electrode material layer is proximate an opposing second side of the separator, (bb) the separator electrically isolates the first electrode active material layer from the first counter-electrode active material layer and carrier ions are primarily exchanged between the first electrode active material layer and the first counter-electrode active material layer via the separator of each such unit cell during cycling of the battery between the charged and discharged state, and (cc) within each unit cell, a. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, and wherein an absolute value of a separation distance, $|S_{X1}|$ is the distance as measured in the transverse direction between the plots $E_{TP1}$ and $CE_{TP1}$ b. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, and wherein an absolute value of a separation distance, $|S_{X2}|$ is the distance as measured in the transverse direction between the plots $E_{TP2}$ and $CE_{TP2}$, c. the first vertical end surfaces of the electrode and the counter-electrode active material layers are on the same side of the electrode assembly, a 2D map of the median vertical position of the first opposing vertical end surface of the electrode active material in the Y-Z plane, along the length $L_E$ of the electrode active material layer, traces a first vertical end surface plot, $E_{VP1}$, a 2D map of the median vertical position of the first opposing vertical end surface of the counter-electrode active material layer in the Y-Z plane, along the length $L_C$ of the counter-electrode active material layer, traces a first vertical end surface plot, $CE_{VP1}$, and wherein an absolute value of a separation distance, $|S_{Z1}|$ is the distance as measured in the transverse direction between the plots $E_{VP1}$ and $CE_{VP1}$.

d. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the Y-Z plane, along the length $L_E$ of the electrode active material layer, traces a second vertical end surface plot, $E_{VP2}$, a 2D map of the median vertical position of the second opposing vertical end surface of the counter-electrode active material layer in the Y-Z plane, along the length $L_C$ of the counter-electrode active material layer, traces a second vertical end surface plot, $CE_{VP2}$, and wherein an absolute value of a separation distance, $|S_{Z2}|$ is the distance as measured in the transverse direction between the plots $E_{VP2}$ and $CE_{VP2}$, e. the carrier ion insulating material layer has an ionic conductance of carrier ions that does not exceed 10% of the ionic conductance of the separator of carrier ions during cycling of the battery, and ionically insulates a surface of the electrode current collector layer from the electrolyte that is proximate to and within a distance Dcc of (i) the first transverse end surface of the electrode active material layer, wherein Dcc equals the sum of $2\times W_E$ and $|S_{X1}|$, and/or (ii) second transverse end surface of the electrode active material layer, wherein Dcc equals the sum of $2\times W_E$ and $|S_{X2}|$, and/or (iii) the first vertical end surface of the electrode active material layer, wherein Dcc equals the sum of $2\times W_E$ and $|S_{Z1}|$, (iv) the second vertical end surface of the electrode active material layer wherein Dcc equals the sum of $2\times W_E$ and $|S_{Z2}|$.

Embodiment 8. A secondary battery for cycling between a charged and a discharged state, the secondary battery comprising a battery enclosure, an electrode assembly, and carrier ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to carrier ions, a population of counter-electrode structures, a population of counter-electrode collectors, a carrier ion insulating material layer, and a population of unit cells, wherein (i) each electrode current collector of the population is electrically isolated from each counter-electrode active material layer of the population, and each counter-electrode current collector of the population is electrically isolated from each electrode active material layer of the population, (ii) members of the electrode and counter-electrode structure populations are arranged in an alternating sequence in the longitudinal direction, (iii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a width $W_E$ that corresponds to the Feret diameter of the electrode active material layer as measured in the longitudinal direction between first and second opposing surfaces of the electrode active material layer, and a height $H_E$ that corresponds to the Feret diameter of the electrode active material layer as measured in the vertical direction between first and second opposing vertical end surfaces of the electrode active material layer, and each member of the population of counter-electrode structures comprises a layer of a counter-electrode active material having a length $L_C$ that corresponds to the Feret diameter of the counter-electrode active material layer as measured in the transverse direction between first and second opposing transverse end surfaces of the counter-electrode active material layer, and a width $W_C$ that corresponds to the Feret diameter of the counter-electrode active material layer as measured in the longitudinal direction between first and second opposing longitudinal end surfaces of the counter-electrode active material layer, and a height $H_C$ that corresponds to the Feret diameter of the counter-electrode active material layer as measured in the vertical direction between first and second opposing vertical end surfaces of the counter-electrode active material layer, (iv) each unit cell comprises a unit cell portion of a first member of the electrode current collector population, a member of the separator population that is ionically permeable to the carrier ions, a first electrode active material layer of one member of the electrode population, a unit cell portion of a first member of the counter-electrode current collector population and a first counter-electrode active material layer of one member of the counter-electrode population, wherein (aa) the first electrode active material layer is proximate a first side of the separator and the first counter-electrode material layer is proximate an opposing second side of the separator, (bb) the separator electrically isolates the first electrode active material layer from the first counter-electrode active material layer and carrier ions are primarily exchanged between the first electrode active material layer and the first counter-electrode active material layer via the separator of each such unit cell during cycling of the battery between the charged and discharged state, and (cc) within each unit cell, a. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, and wherein an absolute value of a separation distance, $|S_{X1}|$ is the distance as measured in the transverse direction between the plots $E_{TP1}$ and $CE_{TP1}$ b. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, and wherein an absolute value of a separation distance, $|S_{X2}|$ is the distance as measured in the transverse direction between the plots $E_{TP2}$ and $CE_{TP2}$, c. the first vertical end surfaces of the electrode and the counter-electrode active material layers are on the same side of the electrode assembly, a 2D map of the median vertical position of the first opposing vertical end surface of the electrode active material in the Y-Z plane, along the length $L_E$ of the electrode active material layer, traces a first vertical end surface plot, $E_{VP1}$, a 2D map of the median vertical position of the first opposing vertical end surface of the counter-electrode active material layer in the Y-Z plane, along the length $L_C$ of the counter-electrode active material layer, traces a first vertical end surface plot, $CE_{VP1}$, and wherein an absolute value of a separation distance, $|S_{Z1}|$ is the distance as measured in the transverse direction between the plots $E_{VP1}$ and $CE_{VP1}$.

d. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the Y-Z plane, along the length $L_E$ of the electrode active material layer, traces a second vertical end surface plot, $E_{VP2}$, a 2D map of the median vertical position of the second opposing vertical end surface of the counter-electrode active material layer in the Y-Z plane, along the length $L_C$ of the counter-electrode active material layer, traces a second vertical end surface plot, $CE_{VP2}$, and wherein an absolute value of a separation distance, $|S_{Z2}|$ is the distance as measured in the transverse direction between the plots $E_{VP2}$ and $CE_{VP2}$, e. the carrier ion insulating material layer has an ionic conductance of carrier ions that does not exceed 10% of the ionic conductance of the separator of carrier ions during cycling of the battery, and ionically insulates a surface of the electrode current collector layer from the electrolyte that is proximate to and within a distance Dcc of (i) the first transverse end surface of the electrode active material layer, wherein (a) in a case where the first transverse end surface of the electrode active material layer is inwardly disposed with respect to the first transverse end surface of the counter-electrode active material, Dcc equals $2\times W_E+|S_{X1}|$, and (b) in a case where the first transverse end surface of the counter-electrode active material layer is inwardly disposed with respect to the first transverse end surface of the electrode active material, Dcc equals $2\times W_E-|S_{X1}|$, and/or (ii) the second transverse end surface of the electrode active material layer, wherein (a) in a case where the second transverse end surface of the electrode active material layer is inwardly disposed with respect to the second transverse end surface of the counter-electrode active material, Dcc equals $2\times W_E+|S_{X2}|$, and (b) in a case where the second transverse end surface of the counter-electrode active material layer is inwardly disposed with respect to the second transverse end surface of the electrode active material, Dcc equals $2\times W_E-|S_{X2}|$, and/or (iii) the first vertical end surface of the electrode active material layer, wherein (a) in a case where the first vertical end surface of the electrode active material layer is inwardly disposed with respect to the first vertical end surface of the counter-electrode active material, Dcc equals $2\times W_E+|S_{Z1}|$, and (b) in a case where the first vertical end surface of the counter-electrode active material layer is inwardly disposed with respect to the first vertical end surface of the electrode active material, Dcc equals $2\times W_E-|S_{Z1}|$, and/or (iv) the second vertical end surface of the electrode active material layer, wherein (a) in a case where the second vertical end surface of the electrode active material layer is inwardly disposed with respect to the second vertical end surface of the counter-electrode active material, Dcc equals $2\times W_E+|S_{Z2}|$, and (b) in a case where the second vertical end surface of the counter-electrode active material layer is inwardly disposed with respect to the second vertical end surface of the electrode active material, Dcc equals $2\times W_E-|S_{Z1}|$ wherein Dcc equals the sum of $2\times W_E$ and $|S_{Z2}|$.

Embodiment 9. The secondary battery according to Embodiment 7 or 8, further comprising a set of electrode constraints, wherein the set of electrode constraints comprises a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%.

Embodiment 10. The secondary battery according to Embodiment 7-9, wherein each unit cell of the unit cell population comprises a carrier ion insulating material, having an ionic conductance that does not exceed 10% of the ionic conductance of the separator of carrier ions during cycling of the battery, and wherein the carrier ion insulating material layer insulates a surface of the electrode current collector layer from the electrolyte.

Embodiment 11. The secondary battery according to any of Embodiments 7-10, comprising:

(a) an electrode busbar comprises at least one conductive segment configured to electrically connect to the population of electrode current collectors, and extending in the longitudinal direction between the first and second longitudinal end surfaces of the electrode assembly, the conductive segment comprising a first side having an interior surface facing the first transverse end surfaces of the counter-electrode active material layers, and an opposing second side having an exterior surface, the conductive segment optionally comprising a plurality of apertures spaced apart on along the longitudinal direction, the conductive segment of the electrode bus bar being arranged with respect to the electrode current collector ends such that the electrode current collector ends extend at least partially past a thickness of the conductive segment, to electrically connect thereto, the thickness of the conductive segment being measured between the interior and exterior surfaces, and (b) the counter-electrode busbar comprises at least one conductive segment configured to electrically connect to the population of counter-electrode current collectors, and extending in the longitudinal direction between the first and second longitudinal end surfaces of the electrode assembly, the conductive segment comprising a first side having an interior surface facing the second transverse end surfaces of the electrode active material layers, and an opposing second side having an exterior surface, the conductive segment optionally comprising a plurality of apertures spaced apart on along the longitudinal direction, the conductive segment of the counter-electrode bus bar being arranged with respect to the counter-electrode current collector ends such that the counter-electrode current collector ends extend at least partially past a thickness of the conductive segment, to electrically connect thereto, the thickness of the conductive segment being measured between the interior and exterior surfaces.

Embodiment 12. A method for preparing an electrode assembly comprising a constraint for a secondary battery configured to cycle between a charged and a discharged state, the method comprising:

forming a sheet structure;

cutting the sheet structure into pieces;

stacking the pieces; and applying a set of constraints to the stacked pieces, wherein the sheet structure comprises at least one of a unit cell and a component of a unit cell, wherein the pieces comprise an electrode active material layer, an electrode current collector, a counter-electrode active material layer, a counter-electrode current collector, and a separator, wherein the set of constraints comprise a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%, and wherein one or more of the first and second primary growth constraints are attached to at least one of the electrode active material layer, electrode current collector, counter-electrode active material layer, counter-electrode current collector, and separator.

Embodiment 13. The method according to Embodiment 12, wherein each unit cell of the unit cell population comprises a carrier ion insulating material, having an ionic conductance that does not exceed 10% of the ionic conductance of the separator of carrier ions during cycling of the battery, and wherein the carrier ion insulating material layer insulates a surface of the electrode current collector layer from the electrolyte.

Embodiment 14. The method according to any of Embodiments 12-13, comprising providing electrode and counter-electrode busbars as a part of the method for preparing the electrode assembly, wherein (a) the electrode busbar comprises at least one conductive segment configured to electrically connect to the population of electrode current collectors, and extending in the longitudinal direction of the electrode assembly, the conductive segment comprising a first side having an interior surface facing the first transverse end surfaces of the counter-electrode active material layers, and an opposing second side having an exterior surface, the conductive segment optionally comprising a plurality of apertures spaced apart on along the longitudinal direction, the conductive segment of the electrode bus bar being arranged with respect to the electrode current collector ends such that the electrode current collector ends extend at least partially past a thickness of the conductive segment, to electrically connect thereto, the thickness of the conductive segment being measured between the interior and exterior surfaces, and (b) the counter-electrode busbar comprises at least one conductive segment configured to electrically connect to the population of counter-electrode current collectors, and extending in the longitudinal direction of the electrode assembly, the conductive segment comprising a first side having an interior surface facing the second transverse end surfaces of the electrode active material layers, and an opposing second side having an exterior surface, the conductive segment optionally comprising a plurality of apertures spaced apart on along the longitudinal direction, the conductive segment of the counter-electrode bus bar being arranged with respect to the counter-electrode current collector ends such that the counter-electrode current collector ends extend at least partially past a thickness of the conductive segment, to electrically connect thereto, the thickness of the conductive segment being measured between the interior and exterior surfaces.

Embodiment 15. The secondary battery and/or method according to any of the preceding Embodiments, wherein at least one of $|S_{Z1}|$, $|S_{Z2}|$, $|S_{X1}|$, and $|S_{X2}|$, is any of ≥5 μm, ≥10 μm, ≥15 μm, ≥20 μm, ≥35 μm, ≥45 μm, ≥50 μm, ≥75 μm, ≥100 μm, ≥150 μm, and/or ≥200 μm.

Embodiment 16. The secondary battery and/or method according to any of the preceding Embodiments, wherein at least one of $|S_{Z1}|$, $|S_{Z2}|$, $|S_{X1}|$, and $|S_{X2}|$, has a value that is any of ≤1000 microns, ≤500 μm, such as ≤475 μm, ≤425 μm, ≤400 μm, ≤375 μm, ≤350 μm, ≤325 μm, ≤300 μm, and/or ≤250 μm.

Embodiment 17. The secondary battery and/or method according to any of the preceding Embodiments, wherein at least one of $|S_{Z1}|$, $|S_{Z2}|$, $|S_{X1}|$, and $|S_{X2}|$ has a value in the range of greater than or equal to 5 μm to less than or equal to 1000 μm, in the range of from greater than or equal to 10 μm to less than or equal to 500 μm, and/or greater than or equal to 20 μm to less than or equal to 250 μm.

Embodiment 18. The secondary battery and/or method according to any of the preceding Embodiments, wherein the value of at least one of $|S_{Z1}|$, $|S_{Z2}|$, $|S_{X1}|$, and $|S_{X2}|$, is for at least 60%, at least 65%, at least 70%, at least 75%, at least 80%, at least 85%, at least 90%, and/or at least 95% of the length $L_C$ of the first counter-electrode active material layer.

Embodiment 19. The secondary battery and/or method according to any of the preceding Embodiments, wherein at least one of $|S_{Z1}|$, $|S_{Z2}|$, $|S_{X1}|$, and $|S_{X2}|$, is in the range of greater than or equal to $0.05\times W_E$ to less then or equal to $5\times W_E$.

Embodiment 20. The secondary battery and/or method according to any of the preceding Embodiments, wherein the set of electrode constraints further comprises a secondary constraint system comprising first and second secondary growth constraints separated in a second direction and connected by at least one secondary connecting member, wherein the secondary constraint system at least partially restrains growth of the electrode assembly in the second direction upon cycling of the secondary battery, the 30 second direction being orthogonal to the longitudinal direction.

Embodiment 21. The secondary battery and/or method according to any of the preceding Embodiments, wherein the electrode active material has the capacity to accept more than one mole of carrier ion per mole of electrode active material when the secondary battery is charged from a discharged state to a charged state, the charged state is at least 75% of a rated capacity of the secondary battery, and the discharged state is less than 25% of the rated capacity of the secondary battery.

Embodiment 22. The secondary battery and/or method according to any of the preceding Embodiments wherein the separator comprised by the members of the unit cell population comprises a porous material.

Embodiment 23. The secondary battery and/or method according to any of the preceding Embodiments wherein the separator comprised by the members of the unit cell population comprises at least one of (i) a single sheet of separator material sandwiched in between the electrode active material layer and the counter-electrode active material layer, (ii) a layer of separator material deposited on, and conformal with, the electrode active material layer, (iii) a layer of separator material deposited on, and conformal with, the counter-electrode active material layer, and (iv) a multilayer structure comprising a first layer of separator material deposited on, and conformal with, the electrode active material layer, and a second layer of separator material deposited on, and conformal with, the counter-electrode active material layer.

Embodiment 24. The secondary battery and/or method according to any of the preceding Embodiments wherein the separator comprised by the members of the unit cell population comprises is permeated with a liquid electrolyte.

Embodiment 25. The secondary battery and/or method according to any of the preceding Embodiments wherein the separator comprised by the members of the unit cell population is permeated with a non-aqueous liquid electrolyte.

Embodiment 26. The secondary battery and/or method according to any of the preceding Embodiments wherein the separator comprised by the members of the unit cell population is permeated with at least one of a gel, polymer and/or ionic liquid electrolyte.

Embodiment 27. The secondary battery and/or method according to any of the preceding Embodiments wherein the electrolyte is a solid electrolyte.

Embodiment 28. The secondary battery and/or method according to any of the preceding Embodiments, wherein the ratio of each of $L_{EA}$ and $W_{EA}$ to $H_{EA}$ is at least 2:1, respectively.

Embodiment 29. The secondary battery and/or method according to any of the preceding Embodiments, wherein contiguous members of the unit cell population may share a common electrode current collector or a common counter-electrode current collector.

Embodiment 30. The secondary battery and/or method according to any of the preceding Embodiments, wherein the population of electrode structures comprises a population of anode structures having a layer of anode active material, and wherein the population of counter-electrode structures comprises a population of cathode structures having a layer of cathode active material.

Embodiment 31. The secondary battery and/or method according to any of the preceding Embodiments, wherein the population of electrode structures comprises a population of cathode structures having a layer of cathode active material, and wherein the population of electrode structures comprises a population of anode structures having a layer of anode active material.

Embodiment 32. The secondary battery and/or method according to any of the preceding Embodiments, wherein the electrode active material layer comprises anode active material selected from the group consisting of graphite, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof.

Embodiment 33. The secondary battery and/or method of any of the preceding Embodiments, wherein the set of electrode constraints further comprises a secondary constraint system comprising first and second secondary growth constraints separated in the vertical direction and connected by at least one secondary connecting member, wherein the secondary constraint system at least partially restrains growth of the electrode assembly in the vertical direction upon cycling of the secondary battery, and wherein members of the population of unit cells of the secondary battery further comprise:

- electrically insulating and non-ionically permeable insulators between the first and second vertical surfaces of the counter-electrode active material layer and the first and second secondary growth constraints.

Embodiment 34. The secondary battery and/or method according to any of the preceding Embodiments, wherein the insulators are disposed between the separator layer and a counter-electrode current collector at the vertical end surfaces of the counter-electrode active material layer.

Embodiment 35. The secondary battery and/or method according to any of the preceding Embodiments, wherein the insulators extend over first and second vertical end surfaces of the counter-electrode current collector in the unit cell.

Embodiment 36. The secondary battery and/or method according to any of the preceding Embodiments, wherein the insulators extend over first and second vertical end surfaces of the electrode active material layer.

Embodiment 37. The secondary battery and/or method according to any of the preceding Embodiments wherein the insulators comprise first thicknesses over first and second vertical end surfaces of the electrode active material layer, and second thicknesses over first and second vertical end surfaces of the counter-electrode active material layer, the first thicknesses being less than the second thicknesses.

Embodiment 38. The secondary battery and/or method according to any of the preceding Embodiments, wherein the insulators extend over first and second 10) vertical end surfaces of the microporous separator layer.

Embodiment 39. The secondary battery and/or method according to any of the preceding Embodiments, wherein the set of electrode constraints further comprises a secondary constraint system comprising first and second secondary growth constraints separated in the vertical direction and connected by at least one secondary connecting member, wherein the secondary constraint system at least partially restrains growth of the electrode assembly in the vertical direction upon cycling of the secondary battery, and wherein:

- the secondary connecting member comprises at least one of the electrode current collector and the counter-electrode current collector of the members of the unit cell population.

Embodiment 40. The secondary battery and/or method according to any of the preceding Embodiments, wherein the secondary connecting member comprises the electrode current collector of the members of the unit cell population.

Embodiment 41. The secondary battery and/or method according to any of the preceding Embodiments, wherein the secondary connecting member comprises the counter-electrode current collector of the members of the unit cell population.

Embodiment 42. The secondary battery and/or method according to any of the preceding Embodiments, wherein the secondary battery comprises an insulator extending over the first and second transverse surfaces of the counter-electrode active 30 material layer.

Embodiment 43. The secondary battery and/or method according to any of the preceding Embodiments, wherein at least one of the insulators extends over a transverse surface of a counter-electrode current collector.

Embodiment 44. The secondary battery and/or method according to any of the preceding Embodiments, wherein at least one of the insulators extends over first and/or second transverse end surfaces of the separator layer.

Embodiment 45. The secondary battery and/or method according to any preceding Embodiments, wherein at least one of the electrode current collector and counter-electrode current collector extends past the transverse surfaces of the insulator layer and/or electrode active material layer.

Embodiment 46. The secondary battery and/or method according to any of the preceding Embodiments, wherein the insulators comprise first thicknesses at first and second transverse end surfaces of the electrode active material layer, and second thicknesses at first and second transverse end surfaces of the counter-electrode active material layer, the first thicknesses being less than the second thicknesses.

Embodiment 47. The secondary battery and/or method according to any of the preceding Embodiments, wherein insulators extend to a same transverse length of at least one of the electrode current collector, the counter-electrode current collector, and the separator layer.

Embodiment 48. The secondary battery and/or method according to any of the preceding Embodiments, wherein in the case of an electrode busbar (i) the conductive segment comprises a plurality of apertures spaced apart along the longitudinal direction, wherein each of the plurality of apertures are configured to allow one or more electrode current collector ends to extend at least partially therethrough to electrically connect the one or more electrode current collector ends to the electrode busbar, and wherein in the case of a counter-electrode busbar (ii) the conductive segment comprises a plurality of apertures spaced apart along the longitudinal direction, wherein each of the plurality of apertures are configured to allow one or more counter-electrode current collector ends to extend at least partially therethrough to electrically connect the one or more counter-electrode current collector ends to the counter-electrode busbar.

Embodiment 49. The secondary battery and/or method according to any of the preceding Embodiments wherein the electrode busbar comprises at least one conductive segment configured to electrically connect to the population of electrode current collectors, and extending in the longitudinal direction of the electrode assembly, at a first side of the electrode assembly proximate the first transverse end surfaces of the electrode active material layers, the conductive segment comprising a plurality of apertures spaced apart along the longitudinal direction, wherein each of the plurality of apertures are configured to allow one or more electrode current collector ends to extend at least partially therethrough to electrically connect the one or more electrode current collector ends to the electrode busbar.

Embodiment 50. The secondary battery and/or method according to any of the preceding Embodiments wherein the counter-electrode busbar comprises at least one conductive segment configured to electrically connect to the population of counter-electrode current collectors, and extending in the longitudinal direction of the electrode assembly, at a second side of the electrode assembly proximate the second transverse end surfaces of the counter-electrode active material layers, the conductive segment comprising a plurality of apertures spaced apart along the longitudinal direction, wherein each of the plurality of apertures are configured to allow one or more counter-electrode current collector ends to extend at least partially therethrough to electrically connect the one or more counter-electrode current collector ends to the counter-electrode busbar.

Embodiment 51. The secondary battery and/or method according to any of the preceding Embodiments, wherein the secondary battery comprises both an electrode busbar to electrically connect to the population of electrode current collectors and a counter-electrode busbar to electrically connect to the population of counter-electrode current collectors.

Embodiment 52. The secondary battery and/or method according to any of the preceding Embodiments, wherein at least some of the plurality of apertures of the electrode busbar and/or counter-electrode busbar are sized and configured to allow more than one electrode current collector end and/or counter electrode current collector end to pass therethrough.

Embodiment 53. The secondary battery and/or method according to any of the preceding Embodiments, wherein the plurality of apertures of the electrode busbar and/or counter-electrode busbar are sized and configured to allow only a single electrode current collector end and/or counter electrode current collector end to pass therethrough.

Embodiment 54. The secondary battery and/or method according to any of the preceding Embodiments, wherein the electrode current collector ends and/or counter-electrode current collector ends extend entirely through one or more of the apertures, and wherein the ends are bent towards an exterior surface of the electrode busbar and/or counter-electrode busbar to attach to a portion of the exterior surface electrode busbar and/or counter-electrode busbar between apertures.

Embodiment 55. The secondary battery and/or method according to any of the preceding Embodiments, wherein the electrode current collector ends and/or counter-electrode current collector ends extend entirely through one or more of the apertures, and wherein the ends are bent towards an exterior surface of the electrode busbar and/or counter-electrode busbar, and extend at least partially in the longitudinal direction either to or past an adjacent aperture, to attach to a separate electrode current collector end and/or counter-electrode current collector end.

Embodiment 56. The secondary battery and/or method according to any of the preceding Embodiments, wherein the electrode current collector ends and/or counter-electrode current collector ends attach at a first end region to a portion of an exterior surface of the electrode busbar and/or counter-electrode busbar that is between apertures, and attach at a second end region to a separate electrode current collector end and/or counter-electrode current collector end.

Embodiment 57. The secondary battery and/or method according to any of the preceding Embodiments, wherein the electrode current collector ends and/or counter-electrode current collector ends are attached to one or more of the portion of the exterior surface of the electrode busbar and/or counter-electrode busbar, and/or a separate electrode current collector end and/or counter-electrode current collector end, via at least one of an adhesive, welding, brazing, and soldering.

Embodiment 58. The secondary battery and/or method according to any of the preceding Embodiments, wherein each of the electrode current collector ends and/or counter-electrode current collector ends is separately attached to a portion of the exterior surface of the electrode busbar and/or counter-electrode busbar.

Embodiment 59. The secondary battery and/or method according to any of the preceding Embodiments, wherein at least some of the electrode current collector ends and/or counter-electrode current collector ends are attached to each other, and at least one of the electrode current collector ends and/or counter-electrode current collector ends are attached to a portion of the exterior surface of the electrode busbar and/or counter-electrode busbar.

Embodiment 60. The secondary battery and/or method according to any of the preceding Embodiments, wherein the electrode current collector ends and/or counter-electrode current collector ends comprise the same material as a material making up the electrode busbar and/or counter-electrode busbar.

Embodiment 61. The secondary battery and/or method according to any of the preceding Embodiments, wherein the electrode current collector ends and/or counter-electrode current collector ends comprise any selected from the group consisting of aluminum, copper, nickel, stainless steel, nickel plated steel, carbon, titanium, and alloys and combinations thereof.

Embodiment 62. The secondary battery and/or method according to any of the preceding Embodiments, wherein the electrode current collector ends and/or counter-electrode current collector ends have a surface region that attaches to a surface of the busbar and/or counter-electrode busbar.

Embodiment 63. The secondary battery and/or method according to any of the preceding Embodiments, wherein the electrode current collector ends and/or counter-electrode current collector ends have a surface region that attaches to at least one of an exterior surface of the electrode busbar and/or counter-electrode busbar, an interior surface of the busbar and/or counter-electrode busbar, and an interior surface with an aperture of the busbar and/or counter-electrode busbar, the interior surface being 10) proximate the transverse ends of the electrode and/or counter-electrode, and the exterior surface opposing the interior surface.

Embodiment 64. The secondary battery and/or method according to any of the preceding Embodiments, wherein the electrode busbar and/or counter-electrode busbar comprises a layer of insulating material on an interior surface proximate the transverse ends of the electrode and/or counter-electrodes, and layer of conductive material on an exterior surface opposing the interior surface.

Embodiment 65. The secondary battery and/or method according to any of the preceding Embodiments, wherein the electrode current collector ends and/or counter-electrode current collector ends are attached to the electrode busbar and/or counter-electrode busbar via an at least partially conductive material formed about the current collector ends and/or counter-electrode current collector ends to electrically connect the ends to the electrode busbar and/or counter-electrode busbar.

Embodiment 66. The secondary battery and/or method according to any of the preceding Embodiments, wherein a coating of a conductive material is formed about the electrode current collector ends and/or counter-electrode current collector ends to electrically connect the ends to the electrode busbar and/or counter-electrode busbar.

Embodiment 67. The secondary battery and/or method according to any of the preceding Embodiments, wherein a coating of a conductive material is coated on the electrode busbar and/or counter-electrode busbar and at least partially infiltrates apertures therein, to electrically connect the ends to the electrode busbar and/or counter-electrode busbar.

Embodiment 68. The secondary battery and/or method according to any of the preceding Embodiments, wherein a coating of a conductive material is formed about the electrode current collector ends and/or counter-electrode current collector ends to electrically connect the ends to the electrode busbar and/or counter-electrode busbar, the coating comprising a conductive metal selected from the group consisting of aluminum, copper, stainless steel, nickel, nickel alloys, and combinations/alloys thereof.

Embodiment 69. The secondary battery and/or method according to any of the preceding Embodiments, wherein the electrode current collector ends and/or counter-electrode current collector ends are attached to the electrode busbar and/or counter-electrode busbar via an at least partially conductive material inserted into apertures in the electrode busbar and/or counter-electrode busbar to electrically connect the ends to the busbar and/or counter-electrode busbar.

Embodiment 70. The secondary battery and/or method according to any of the preceding Embodiments, wherein the electrode current collector ends and/or counter-electrode current collector ends are attached to the electrode busbar and/or counter-electrode busbar via an at least partially conductive material formed about the current collector ends and/or counter-electrode current collector ends, the at least partially conductive material comprising a polymeric material that is a positive temperature coefficient material, and which exhibits an increase resistance with an increase in temperature.

Embodiment 71. The secondary battery and/or method according to any of the preceding Embodiments, wherein one or more ends of the electrode current collectors and/or counter-electrode current collectors have individual inserts comprising polymeric positive temperature coefficient material to electrically connect the ends to the electrode bus-bar and/or counter-electrode busbar, and wherein a first individual insert about a first end is physically separate from a second individual insert about a second end, the first and second ends being electrically connected to the same electrode busbar and/or counter-electrode busbar.

Embodiment 72. The secondary battery and/or method according to any of the preceding Embodiments, wherein each end comprises an individual insert comprising the polymeric positive temperature coefficient material, with each insert being physically separate from the others.

Embodiment 73. The secondary battery and/or method according to any of the preceding Embodiments, wherein at least two ends share the same insert comprising the polymeric positive temperature coefficient material.

Embodiment 74. The secondary battery and/or method according to any of the preceding Embodiments, comprising a plurality of inserts comprising polymeric positive temperature coefficient material at least partially inserted into apertures in the electrode busbar and/or counter-electrode busbar, the plugs at least partially surrounding a portion of the ends of the electrode current collector and/or counter-electrode current collector in the apertures.

Embodiment 75. The secondary battery and/or method according to any of the preceding Embodiments, wherein the ends of the electrode current collectors and/or counter-electrode current collectors extend through apertures of the electrode busbar and/or counter-electrode busbar, and are bent back towards and exterior surface of the electrode busbar and/or counter-electrode bus bar to attach thereto, and wherein a region of the ends that is bent to attach to the exterior surface is substantially planar.

Embodiment 76. The secondary battery and/or method according to any of the preceding Embodiments, wherein the ends of the electrode current collectors and/or counter-electrode current collectors extend through apertures of the electrode busbar and/or counter-electrode busbar, and are bent back towards and exterior surface of the electrode busbar and/or counter-electrode bus bar to attach thereto, and wherein the apertures have openings in both the thickness direction and the vertical direction of the busbar and/or counterelectrode busbar.

Embodiment 77. The secondary battery and/or method according to any of the preceding Embodiments, wherein the ends of the electrode current collectors and/or counter-electrode current collectors extend through apertures of the electrode busbar and/or counter-electrode busbar, and are bent back towards and exterior surface of the electrode busbar and/or counter-electrode bus bar to attach thereto, and wherein a region of the ends that is bent to attach to the exterior surface is curved.

Embodiment 78. The secondary battery and/or method according to any of the preceding Embodiments, wherein the ends of the electrode current collectors and/or counter-electrode current collectors extend over and/or under the conductive segment of electrode busbar and/or counter-electrode busbar in the vertical direction, to pass over and/or under the conductive segment, and are attached to an exterior surface of the conductive segment.

Embodiment 79. The secondary battery and/or method according to any of the preceding Embodiments, wherein a height of the current collector in the vertical direction exceeds a height of the conductive segment of the electrode busbar and/or counter-electrode busbar, and/or the vertical position of the current collector is offset from the vertical position of the conductive segment of the electrode busbar and/or counter-electrode busbar, such that ends of the electrode current collector and/or counter-electrode current collector can pass over and/or under the conductive segment of the electrode busbar and/or counter-electrode busbar.

Embodiment 80. The secondary battery and/or method according to any of the preceding Embodiments, wherein the ends of the electrode current collector and/or counter-electrode current collector are configured to pass over and/or under the conductive segment of the electrode busbar and/or counter-electrode busbar, and are bent back towards the conductive segment in a vertical direction to attach to an exterior surface of the electrode busbar and/or counter-electrode busbar.

Embodiment 81. The secondary battery and/or method according to any of the preceding Embodiments, further comprising a second electrode busbar and/or counter-electrode busbar with a second conductive segment the extends in the longitudinal direction of the electrode assembly, to electrically connect to ends of the electrode current collector and/or counter-electrode current collector.

Embodiment 82. The secondary battery and/or method according to any of the preceding Embodiments, wherein at least 50% of the electrode current collectors and/or counter-electrode current collectors are electrically connected to the same electrode busbar and/or counter-electrode busbar, respectively.

Embodiment 83. The secondary battery and/or method according to any of the preceding Embodiments, wherein at least 75% of the electrode current collectors and/or counter-electrode current collectors are electrically connected to the same electrode busbar and/or counter-electrode busbar, respectively.

Embodiment 84. The secondary battery and/or method according to any of the preceding Embodiments, wherein at least 90% of the electrode current collectors and/or counter-electrode current collectors are electrically connected to the same electrode busbar and/or counter-electrode busbar, respectively.

Embodiment 85. The secondary battery and/or method according to any of the preceding Embodiments, wherein the electrode current collectors and/or counter-electrode current collectors are disposed in between layers of electrode material and/or counter-electrode material in the electrode structures/counter-electrode structures, respectively.

Embodiment 86. The secondary battery and/or method according to any of the preceding Embodiments, wherein the electrode current collectors and/or counter-electrode current collectors extend along an outer surface of the layers of electrode material and/or counter-electrode material in the electrode structures and/or counter-electrode structures, respectively.

Embodiment 87. The secondary battery and/or method according to any of the preceding Embodiments, wherein the population of electrode structures comprised both (i) internal electrode current collectors and/or counter-electrode current collectors disposed in between layers of electrode material and/or counter-electrode material in the electrode structures/counter-electrode structures, respectively, and (ii) surface electrode current collectors and/or counter-electrode current collectors extend along an outer surface of the layers of electrode material and/or counter-electrode material in the electrode structures and/or counter-electrode structures, respectively, and wherein the internal and surface electrode current collectors and/or counter-electrode current collectors are electrically connected to the electrode busbar and/or counter-electrode busbar.

Embodiment 88. The secondary battery and/or method according to any of the preceding Embodiments, wherein the electrode current collector and/or counter-electrode current collector extend at least 50% along the length of the layer of electrode material $L_E$ and/or layer of counter-electrode material, respectively, in the transverse direction.

Embodiment 89. The secondary battery and/or method according to any of the preceding Embodiments, wherein the electrode current collector and/or counter-electrode current collector extend at least 60% along the length of the layer of electrode material $L_E$ and/or layer of counter-electrode material, respectively, in the transverse direction.

Embodiment 90. The secondary battery and/or method according to any of the preceding Embodiments, wherein the electrode current collector and/or counter-electrode current collector extend at least 70% along the length of the layer of electrode material $L_E$ and/or layer of counter-electrode material, respectively, in the transverse direction.

Embodiment 91. The secondary battery and/or method according to any of the preceding Embodiments, wherein the electrode current collector and/or counter-electrode current collector extend at least 80% along the length of the layer of electrode material $L_E$ and/or layer of counter-electrode material, respectively, in the transverse 30) direction.

Embodiment 92. The secondary battery and/or method according to any of the preceding Embodiments, wherein the electrode current collector and/or counter-electrode current collector extend at least 90% along the length of the layer of electrode material $L_E$ and/or layer of counter-electrode material $L_C$, respectively, in the transverse direction.

Embodiment 93. The secondary battery and/or method according to any of the preceding Embodiments, wherein the electrode current collector and/or counter-electrode current collector extend at least 50% along the height $H_E$ of the layer of electrode material and/or layer of counter-electrode material $H_C$, respectively, in the vertical direction.

Embodiment 94. The secondary battery and/or method according to any of the preceding Embodiments, wherein the electrode current collector and/or counter-electrode current collector extend at least 60% along the height $H_E$ of the layer of electrode material and/or layer of counter-electrode material $H_C$, respectively, in the vertical direction.

Embodiment 95. The secondary battery and/or method according to any of the preceding Embodiments, wherein the electrode current collector and/or counter-electrode current collector extend at least 70% along the height $H_E$ of the layer of electrode material and/or layer of counter-electrode material $H_C$, respectively, in the vertical direction.

Embodiment 96. The secondary battery and/or method according to any of the preceding Embodiments, wherein the electrode current collector and/or counter-electrode current collector extend at least 80% along the height $H_E$ of the layer of electrode material and/or layer of counter-electrode material $H_C$, respectively, in the vertical direction.

Embodiment 97. The secondary battery and/or method according to any of the preceding Embodiments, wherein the electrode current collector and/or counter-electrode current collector extend at least 90% along the height $H_E$ of the layer of electrode material and/or layer of counter-electrode material $H_C$, respectively, in the vertical direction.

Embodiment 98. The secondary battery and/or method according to any of the preceding Embodiments, comprising a layer of insulating material between an interior surface of the electrode busbar and/or counter-electrode busbar and the respective first and second transverse ends of the layer of electrode active material and/or counter-electrode active material.

Embodiment 99. The secondary battery and/or method according to any of the preceding Embodiments, wherein the carrier ion insulating material has an ionic conductance for carrier ions that does not exceed at least one of 10%, 5%, 1%, 0.1%, 0.01%, 0.001%, and/or 0.0001% of the ionic conductance of the separator of carrier ions during cycling of the battery.

Embodiment 100. The secondary battery and/or method according to any of the preceding Embodiments, wherein at least one of $|S_{X1}|$, $|S_{X2}|$, $|S_{Z1}|$ and $|S_{Z2}|$, is in the range of greater than or equal to $-10\times W_E$ and greater than or equal to $W_E$.

Embodiment 101. The secondary battery and/or method according to any of the preceding Embodiments, wherein at least one of the following is provided: 100 microns $\geq S_{X1} \geq -1000$ microns, 100 microns $\geq S_{X2} \geq -1000$ microns, 100 microns $\geq S_{Z1} \geq -1000$ microns, and 100 microns $\geq S_{Z2} \geq -1000$ microns.

Embodiment 102. The secondary battery and/or method according to any of the preceding Embodiments, wherein the carrier ions comprise at least one of lithium, sodium and magnesium.

Embodiment 103. The secondary battery and/or method according to any of the preceding Embodiments, wherein an aspect ratio of the length $L_E$ of the electrode active material layer, to both the height $H_E$ and width $W_E$ of the electrode active material layer, is at least 5:1, at least 8:1 and/or at least 10:1.

Embodiment 104. The secondary battery and/or method according to any of the preceding Embodiments, wherein an aspect ratio of the length $L_C$ of the counter-electrode active material layer, to both the height $H_C$ and width $W_C$ of the counter-electrode active material layer, is at least 5:1, at least 8:1 and/or at least 10:1.

Embodiment 105. The secondary battery and/or method according to any of the preceding Embodiments, wherein an aspect ratio of the length $L_E$ of the electrode active material layer and the height $H_E$ of the electrode active material layer, to the width $W_E$ of the electrode active material layer, is at least 2:1, at least 5:1 and/or at least 10:1.

Embodiment 106. The secondary battery and/or method according to any of the preceding Embodiments, wherein an aspect ratio of the length $L_C$ of the counter-electrode active material layer and the height $H_C$ of the counter-electrode active material layer, to the width $W_C$ of the counter-electrode active material layer, is at least 2:1, at least 5:1 and/or at least 10:1.

Embodiment 107. The secondary battery and/or method according to any of the preceding Embodiments, wherein the carrier ion insulating layer insulates a region of the surface of the electrode current collector corresponding to at least 50%, at least 60%, at least 70%, at least 80%, at least 90%, and even substantially all of $D_{CC}$.

Embodiment 108. The secondary battery and/or method according to any of the preceding Embodiment, wherein the carrier ion insulating layer comprises a single layer segment material, and/or a plurality of layer segments.

Embodiment 109. The secondary battery and/or method according to any of the preceding Embodiments, wherein the electrode current collector and/or counter-electrode current collector extend at least partially along the height $H_E$ and/or $H_C$ of the layer of electrode active material and/or counter-electrode active material, respectively, and wherein the electrode current collector and/or counter-electrode current collector comprise vertical ends that extend past the vertical end surfaces of the electrode active material layer and/or counter-electrode active material layer, respectively.

Embodiment 110. The secondary battery and/or method according to any of the preceding Embodiments, wherein vertical ends of the members of the electrode current collectors comprise the carrier ion insulating material.

Embodiment 111. The secondary battery and/or method according to any of the preceding Embodiments, wherein vertical ends of members of the counter-electrode current collectors comprise the carrier ion insulating material.

Embodiment 112. The secondary battery and/or method according to any of the preceding Embodiments, wherein vertical ends of members of both the electrode current collectors and counter-electrode current collectors comprise the carrier ion insulating material.

Embodiment 113. The secondary battery and/or method according to any of the preceding Embodiments, wherein the carrier ion insulating material comprises a coating that at least partially covers surfaces adjacent the vertical ends of the electrode and/or counter-electrode current collectors that extend vertically past the first and/or second vertical end surfaces of adjacent electrode and/or counter-electrode active material layers.

Embodiment 114. The secondary battery and/or method according to any of the preceding Embodiments, wherein the coating comprising the carrier ion insulating material covers at least 10%, at least 20%, at least 45%, at least 50%, at least 75%, at least 90%, at least 95% and/or even at least 98% of surfaces adjacent the vertical ends of the electrode and/or counter-electrode current collectors that vertically extend past the first and/or second vertical end surfaces of adjacent electrode and/or counter-electrode active material layers.

Embodiment 115. The secondary battery and/or method according to any of the preceding Embodiments, wherein the electrode current collector and/or counter-electrode current collector comprise attachment sections configured to secure the electrode current collector and/or counter-electrode current collector to a portion of an electrode constraint system that is configured to constrain growth of the electrode assembly in the vertical direction.

Embodiment 116. The secondary battery and/or method according to any of the preceding Embodiments, wherein the attachment sections of at least one of the electrode and counter-electrode current collectors comprise a portion of a secondary connecting member of the electrode constraint system that attaches to the first and second secondary growth constraints to at least partially restrain growth of the electrode assembly in the vertical direction.

Embodiment 117. The secondary battery and/or method according to any of the preceding Embodiments, wherein the attachment section extends in a transverse direction along the current collector vertical end.

Embodiment 118. The secondary battery and/or method according to any of the preceding Embodiments, wherein the attachment section extends continuously along of the length $L_E$ of the electrode current collector and/or the length $L_C$ of the counter-electrode current collector.

Embodiment 119. The secondary battery and/or method according to any of the preceding Embodiments, wherein the vertical ends of the electrode and/or counter-electrode current collector members comprise a plurality of attachment sections along a transverse direction of the electrode and/or counter-electrode current collector members.

Embodiment 120. The secondary battery and/or method according to any of the preceding Embodiments, wherein at least 25%, at least 30%, at least 40%, at least 50%, at least 60%, at least 70%, at least 80%, at least 90%, and even all of the electrode current collectors in the electrode assembly 106 comprise attachment sections that are attached to one or more secondary growth constraints of the secondary constraint system, and/or at least 25%, at least 30%, at least 40%, at least 50%, at least 60%, at least 70%, at least 80%, at least 90%, and even all of the counter-electrode current collectors in the electrode assembly comprise attachment sections that are attached to one or more secondary growth constraints of the secondary constraint system.

Embodiment 121. The secondary battery and/or method according to any of the preceding Embodiments, wherein the attachments sections of one or more of the electrode and/or current collector population member comprise at least 25%, at least 30%, at least 40%, at least 50%, at least 60%, at least 70%, at least 80%, at least 90%, and even the entire length $L_E$ and/or $L_C$ of the members of the population.

Embodiment 122. The secondary battery and/or method according to any of the preceding Embodiments, wherein the attachment section comprises any one or combination of a textured surface, openings extending through the vertical ends in the longitudinal direction, grooves, protrusions, and indentations.

Embodiment 123. The secondary battery and/or method according to any of the preceding Embodiments, wherein one or more of the attachment sections is adhered to a portion constraint system by an adhesive layer that extends from a surface of one or more of the first and second secondary growth constraints, and along at least a portion of the surface of the attachment section in the vertical direction.

Embodiment 124. The secondary battery and/or method according to any of the preceding Embodiments, wherein the adhesive layer comprises a carrier ion insulating material having an ionic conductance for carrier ions that is no more than 10% of that of the separator.

Embodiment 125. The secondary battery and/or method according to any of the preceding Embodiments, wherein the adhesive layer extends along the vertical direction to substantially cover a surface of the electrode current collector and/or counter-electrode current collector that extends vertically past the vertical end surfaces of electrode active material layers and/or counter-electrode active material layers.

Embodiment 126. The secondary battery and/or method according to any of the preceding Embodiments, wherein the adhesive layer extends in a vertical direction along the surface of the electrode current collector and/or counter-electrode current collector, and covers at least a portion of the vertical end surfaces of the electrode active material layers and/or counter-electrode active material layers.

Embodiment 127. The secondary battery and/or method according to any of the preceding Embodiments, wherein the attachment sections of the electrode current collector and/or counter-electrode current collector are textured to facilitate adhesion of the vertical ends to the portion of the constraint system.

Embodiment 128. The secondary battery and/or method according to any of the preceding Embodiments, wherein the surface of the current collector at the attachment sections is textured via one or more of texturing, machining, etching of the surface, crimping, knurling, embossing, slitting and punching.

Embodiment 129. The secondary battery and/or method according to any of the preceding Embodiments, wherein the attachment sections of the electrode current collector and/or counter-electrode current collector comprise one or more openings therein extending between opposing surfaces of the current collector in the longitudinal direction, the openings begin configured to allow the adhesive layer to at least partially infiltrate therein.

Embodiment 130. The secondary battery and/or method according to any of the preceding Embodiments, wherein the attachment section comprises a plurality of openings spaced apart along a transverse direction.

Embodiment 131. The secondary battery and/or method according to any of the preceding Embodiments, wherein the surface of the collectors at the attachment sections comprise one or more grooves therein to facilitate attachment of the adhesive to the vertical ends of the current collector.

Embodiment 132. The secondary battery and/or method according to any of the preceding Embodiments, wherein the grooves comprise one or more of vertically oriented and transverse oriented grooves.

Embodiment 133. The secondary battery and/or method according to any of the preceding Embodiments, wherein the attachment section comprises a set of first vertically oriented groves that are spaced apart from one another along the transverse direction of the vertical ends, and at least one transverse oriented grooves, and wherein the vertically oriented grooves are arranged with respect to the at least one transverse oriented groove such that ends of the vertically oriented grooves that are distal from the portion of the constraint system to which the current collector is attached, are in communication with and open to the at least one transverse oriented groove.

Embodiment 134. The secondary battery and/or method according to any of the preceding Embodiments, further comprising a plurality of openings spaced apart along the transverse direction, the plurality of openings being formed in at least a portion of one or more of the vertically and/or transverse oriented grooves.

Embodiment 135. The secondary battery and/or method according to any of the preceding Embodiments, wherein the attachment sections are attached to first and/or second secondary growth constraints that are non-planar.

Embodiment 136. The secondary battery and/or method according to any of the preceding Embodiments, wherein the first and/or second secondary growth constraints are curved in one or more of the longitudinal and transverse directions.

Embodiment 137. The secondary battery and/or method according to any of the preceding Embodiments, wherein the first and/or second secondary growth constraints have vertical separation from one another at longitudinal ends of the electrode assembly that is shorter than a vertical separation towards an interior of the electrode assembly in the longitudinal direction.

Embodiment 138. The secondary battery and/or method according to any of the preceding Embodiments, wherein in the method of preparing the electrode assembly, the sheets structures comprise unit cells comprising an electrode current collector, electrode active material layer, separator, counter-electrode active material layer, and counter-electrode current collector.

Embodiment 139. The secondary battery and/or method according to any of the preceding Embodiments, wherein cutting the sheet structures comprises cutting sheets of unit cells into pieces of unit cells, and wherein stacking the pieces comprises stacking the unit cells to form an alternating arrangement of a population of anode structures and a population of cathode structures.

Embodiment 140. The secondary battery and/or method according to any of the preceding Embodiments, wherein in the method of preparing the electrode assembly, the sheets structures comprise individual layers of any of an electrode current collector, electrode active material layer, separator, counter-electrode active material layer, and counter-electrode current collector.

Embodiment 141. The secondary battery and/or method according to any of the preceding Embodiments, wherein cutting the sheet structures comprises cutting sheets of individual layers of components into pieces of component, and wherein stacking the pieces comprises stacking the components to form unit cells that are stacked together to provide an alternating arrangement of a population of anode structures and a population of cathode structures.

Embodiment 142. The secondary battery and/or method according to any of the preceding Embodiments, wherein in the method of preparing the electrode assembly, the sheets structures comprise both individual layers of components and unit cells.

Embodiment 143. The secondary battery and/or method according to any of the preceding Embodiments, wherein the set of electrode constraints further comprising a secondary constraint system comprising first and second secondary growth constraints separated in a second direction and connected by at least one secondary connecting member, wherein the secondary constraint system at least partially restrains growth of the electrode assembly in the second direction upon cycling of the secondary battery, the second direction being orthogonal to the longitudinal direction.

wherein the primary constraint array restrains growth of the electrode assembly in the longitudinal direction such that any increase in the Feret diameter of the electrode assembly in the longitudinal direction over 30 consecutive cycles of the secondary battery is less than 20%.

Embodiment 144. The secondary battery and/or method according to any of the preceding Embodiments, wherein the primary constraint array restrains growth of the electrode assembly in the longitudinal direction such that any increase in the Feret diameter of the electrode assembly in the longitudinal direction over 50 consecutive cycles of the secondary battery is less than 20%.

Embodiment 145. The secondary battery and/or method according to any of the preceding Embodiments, wherein the primary constraint array restrains growth of the electrode assembly in the longitudinal direction such that any increase in the Feret diameter of the electrode assembly in the longitudinal direction over 80 consecutive cycles of the secondary battery is less than 20%.

Embodiment 146. The secondary battery and/or method according to any of the preceding Embodiments, wherein the primary constraint array restrains growth of the electrode assembly in the longitudinal direction to less than 20% over 100 consecutive cycles of the secondary battery.

Embodiment 147. The secondary battery and/or method according to any of the preceding Embodiments, wherein the primary constraint array restrains growth of the electrode assembly in the longitudinal direction such that any increase in the Feret diameter of the electrode assembly in the longitudinal direction over 1000 consecutive cycles of the secondary battery is less than 20%.

Embodiment 148. The secondary battery and/or method according to any of the preceding Embodiments, wherein the primary constraint array restrains growth of the electrode assembly in the longitudinal direction such that any increase in the Feret diameter of the electrode assembly in the longitudinal direction over 10 consecutive cycles of the secondary battery is less than 10%.

Embodiment 149. The secondary battery and/or method according to any of the preceding Embodiments, wherein the primary constraint array restrains growth of the electrode assembly in the longitudinal direction such that any increase in the Feret diameter of the electrode assembly in the longitudinal direction over 20 consecutive cycles of the secondary battery is less than 10%.

Embodiment 150. The secondary battery and/or method according to any of the preceding Embodiments, wherein the primary constraint array restrains growth of the electrode assembly in the longitudinal direction such that any increase in the Feret diameter of the electrode assembly in the longitudinal direction over 30 consecutive cycles of the secondary battery is less than 10%.

Embodiment 151. The secondary battery and/or method according to any of the preceding Embodiments, wherein the primary constraint array restrains growth of the electrode assembly in the longitudinal direction such that any increase in the Feret diameter of the electrode assembly in the longitudinal direction over 50 consecutive cycles of the secondary battery is less than 10%.

Embodiment 152. The secondary battery and/or method according to any of the preceding Embodiments, wherein the primary constraint array restrains growth of the electrode assembly in the longitudinal direction such that any increase in the Feret diameter of the electrode assembly in the longitudinal direction over 80 consecutive cycles of the secondary battery is less than 10%.

Embodiment 153. The secondary battery and/or method according to any of the preceding Embodiments, wherein the primary constraint array restrains growth of the electrode assembly in the longitudinal direction such that any increase in the Feret diameter of the electrode assembly in the longitudinal direction over 100 consecutive cycles of the secondary battery is less than 10%.

Embodiment 154. The secondary battery and/or method according to any of the preceding Embodiments, wherein the primary constraint array restrains growth of the electrode assembly in the longitudinal direction such that any increase in the Feret diameter of the electrode assembly in the longitudinal direction over 5 consecutive cycles of the secondary battery is less than 5%.

Embodiment 155. The secondary battery and/or method according to any of the preceding Embodiments, wherein the primary constraint array restrains growth of the electrode assembly in the longitudinal direction such that any increase in the Feret diameter of the electrode assembly in the longitudinal direction over 10 consecutive cycles of the secondary battery is less than 5%.

Embodiment 156. The secondary battery and/or method according to any of the preceding Embodiments, wherein the primary constraint array restrains growth of the electrode assembly in the longitudinal direction such that any increase in the Feret diameter of the electrode assembly in the longitudinal direction over 20 consecutive cycles of the secondary battery is less than 5%.

Embodiment 157. The secondary battery and/or method according to any of the preceding Embodiments, wherein the primary constraint array restrains growth of the electrode assembly in the longitudinal direction such that any increase in the Feret diameter of the electrode assembly in the longitudinal direction over 30 consecutive cycles of the secondary battery is less than 5%.

Embodiment 158. The secondary battery and/or method according to any of the preceding Embodiments, wherein the primary constraint array restrains growth of the electrode assembly in the longitudinal direction such that any increase in the Feret diameter of the electrode assembly in the longitudinal direction over 50 consecutive cycles of the secondary battery is less than 5%.

Embodiment 159. The secondary battery and/or method according to any of the preceding Embodiments, wherein the primary constraint array restrains growth of the electrode assembly in the longitudinal direction such that any increase in the Feret diameter of the electrode assembly in the longitudinal direction over 80 consecutive cycles of the secondary battery is less than 5%.

Embodiment 160. The secondary battery and/or method according to any of the preceding Embodiments, wherein the primary constraint array restrains growth of the electrode assembly in the longitudinal direction such that any increase in the Feret diameter of the electrode assembly in the longitudinal direction per cycle of the secondary battery is less than 1%.

Embodiment 161. The secondary battery and/or method according to any of the preceding Embodiments, wherein the secondary growth constraint system restrains growth of the electrode assembly in the second direction such that any increase in the Feret diameter of the electrode assembly in the second direction over 20 consecutive cycles upon repeated cycling of the secondary battery is less than 20%.

Embodiment 162. The secondary battery and/or method according to any of the preceding Embodiments, wherein the secondary growth constraint system restrains growth of the electrode assembly in the second direction such that any increase in the Feret diameter of the electrode assembly in the second direction over 10 consecutive cycles of the secondary battery is less than 10%.

Embodiment 163. The secondary battery and/or method according to any of the preceding Embodiments, wherein the secondary growth constraint system restrains growth of the electrode assembly in the second direction such that any increase in the Feret diameter of the electrode assembly in the second direction over 5 consecutive cycles of the secondary battery is less than 5%.

Embodiment 164. The secondary battery and/or method according to any of the preceding Embodiments, wherein the secondary growth constraint system restrains growth of the electrode assembly in the second direction such that any increase in the Feret diameter of the electrode assembly in the second direction per cycle of the secondary battery is less than 1%.

Embodiment 165. The secondary battery and/or method according to any of the preceding Embodiments, wherein the first primary growth constraint at least partially covers the first longitudinal end surface of the electrode assembly, and the second primary growth constraint at least partially covers the second longitudinal end surface of the electrode assembly.

Embodiment 166. The secondary battery and/or method according to any of the preceding Embodiments, wherein a surface area of a projection of the electrode assembly in a plane orthogonal to the stacking direction, is smaller than the surface areas of projections of the electrode assembly onto other orthogonal planes.

Embodiment 167. The secondary battery and/or method according to any of the preceding Embodiments, wherein a surface area of a projection of an electrode structure in a plane orthogonal to the stacking direction, is larger than the surface areas of projections of the electrode structure onto other orthogonal planes.

Embodiment 168. The secondary battery and/or method according to any of the preceding Embodiments, wherein at least a portion of the primary growth constraint system is pre-tensioned to exert a compressive force on at least a portion of the electrode assembly in the longitudinal direction, prior to cycling of the secondary battery between charged and discharged states.

Embodiment 169. The secondary battery and/or method according to any of the preceding Embodiments, wherein the primary constraint system comprises first and second primary connecting members that are separated from each other in the first direction and connect the first and second primary growth constraints.

Embodiment 170. The secondary battery and/or method according to any of the preceding Embodiments, wherein the first primary connecting member is the first secondary growth constraint, the second primary connecting member is the second secondary growth constraint, and the first primary growth constraint or the second primary growth constraint is the first secondary connecting member.

Embodiment 171. The secondary battery and/or method according to any of the preceding Embodiments, wherein the at least one secondary connecting member comprises a member that is interior to longitudinal first and second ends of the electrode assembly along the longitudinal axis.

Embodiment 172. The secondary battery and/or method according to any of the preceding Embodiments, wherein the at least one secondary connecting member comprises at least a portion of one or more of the electrode and counter electrode structures.

Embodiment 173. The secondary battery and/or method according to any of the preceding Embodiments, wherein the at least one secondary connecting member comprises a portion of at least one of an electrode backbone structure and a counter-electrode backbone structure.

Embodiment 174. The secondary battery and/or method according to any of the preceding Embodiments, wherein the at least one secondary connecting member comprises a portion of one or more of an electrode current collector and a counter-electrode current collector.

Embodiment 175. The secondary battery and/or method according to any of the preceding Embodiments, wherein at least one of the first and second primary growth constraints is interior to longitudinal first and second ends of the electrode assembly along the longitudinal axis.

Embodiment 176. The secondary battery and/or method according to any of the preceding Embodiments, wherein at least one of the first and second primary growth constraints comprises at least a portion of one or more of the electrode and counter electrode structures.

Embodiment 177. The secondary battery and/or method according to any of the preceding Embodiments, wherein at least one of the first and second primary growth constraints comprises a portion of at least one of an electrode backbone structure and a counter-electrode backbone structure.

Embodiment 178. The secondary battery and/or method according to any of the preceding Embodiments, wherein at least one of the first and second primary growth constraints comprises a portion of one or more of an electrode current collector and a counter-electrode current collector.

Embodiment 179. The secondary battery and/or method according to any of the preceding Embodiments, further comprising a tertiary constraint system comprising first and second tertiary growth constraints separated in a third direction and connected by at least one tertiary connecting member wherein the tertiary constraint system restrains growth of the electrode assembly in the third direction in charging of the secondary battery from the discharged state to the charged state, the third direction being orthogonal to the longitudinal direction and second direction.

Embodiment 180. The secondary battery and/or method according to any of the preceding Embodiments wherein the electrode active material is anodically active and the counter-electrode active material is cathodically active.

Embodiment 181. The secondary battery and/or method according to any of the preceding Embodiments wherein each member of the population of electrode structures comprises a backbone.

Embodiment 182. The secondary battery and/or method according to any of the preceding Embodiments wherein each member of the population of counter-electrode structures comprises a backbone.

Embodiment 183. The secondary battery and/or method according to any of the preceding Embodiments wherein the secondary constraint system restrains growth of the electrode assembly in the vertical direction with a restraining force of greater than 1000 psi and a skew of less than 0.2 mm/m.

Embodiment 184. The secondary battery and/or method according to any of the preceding Embodiments wherein the secondary growth constraint restrains growth of the electrode assembly in the vertical direction with less than 5% displacement at less than or equal to 10,000 psi and a skew of less than 0.2 mm/m.

Embodiment 185. The secondary battery and/or method according to any of the preceding Embodiments wherein the secondary growth constraint restrains growth of the electrode assembly in the vertical direction with less than 3% displacement at less than or equal to 10,000 psi and a skew of less than 0.2 mm/m.

Embodiment 186. The secondary battery and/or method according to any of the preceding Embodiments wherein the secondary growth constraint restrains growth of the electrode assembly in the vertical direction with less than 1% displacement at less than or equal to 10,000 psi and a skew of less than 0.2 mm/m.

Embodiment 187. The secondary battery and/or method according to any of the preceding Embodiments wherein the secondary growth constraint restrains growth of the electrode assembly in the vertical direction with less than 15% displacement at less than or equal to 10,000 psi and a skew of less than 0.2 mm/m after 50 battery cycles.

Embodiment 188. The secondary battery and/or method according to any of the preceding Embodiments wherein the secondary growth constraint restrains growth of the electrode assembly in the vertical direction with less than 5% displacement at less than or equal to 10,000 psi and a skew of less than 0.2 mm/m after 150 battery cycles.

Embodiment 189. The secondary battery and/or method according to any of the preceding Embodiments wherein members of the population of counter-electrode structures comprise a top adjacent to the first secondary growth constraint, a bottom adjacent to the second secondary growth constraint, a vertical axis $A_{CES}$ parallel to and in the vertical direction extending from the top to the bottom, a lateral electrode surface surrounding the vertical axis Aces and connecting the top and the bottom, the lateral electrode surface having opposing first and second regions on opposite sides of the vertical axis and separated in a first direction that is orthogonal to the vertical axis, a length $L_{CES}$, a width $W_{CES}$, and a height $H_{CES}$, the length $L_{CES}$ being bounded by the lateral electrode surface and measured in the transverse direction, the width $W_{CES}$ being bounded by the lateral electrode surface and measured in the longitudinal direction, and the height $H_{CES}$ being measured in the direction of the vertical axis $A_{CES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being affixed to the top and bottom of the population of electrode structures.

Embodiment 190. The secondary battery and/or method according to any of the preceding Embodiments wherein the inner surfaces of each of the first and second secondary growth constraints comprise a notch, and the population of counter-electrode structures height $H_{CES}$ extends into and is affixed within the notch, the notch having a depth defined along the vertical direction of 25% of the first and second secondary growth constraint heights.

Embodiment 191. The secondary battery and/or method according to any of the preceding Embodiments wherein the inner surfaces of each of the first and second secondary growth constraints comprise a notch, and the population of counter-electrode structures height $H_{CES}$ extends into and is affixed within the notch, the notch having a depth defined along the vertical direction of 50% of the first and second secondary growth constraint heights.

Embodiment 192. The secondary battery and/or method according to any of the preceding Embodiments wherein the inner surfaces of each of the first and second secondary growth constraints comprise a notch, and the population of counter-electrode structures height $H_{CES}$ extends into and is affixed within the notch, the notch having a depth defined along the vertical direction of 75% of the first and second secondary growth constraint heights.

Embodiment 193. The secondary battery and/or method according to any of the preceding Embodiments wherein the inner surfaces of each of the first and second secondary growth constraints comprise a notch, and the population of counter-electrode structures height $H_{CES}$ extends into and is affixed within the notch, the notch having a depth defined along the vertical direction of 90% of the first and second secondary growth constraint heights.

Embodiment 194. The secondary battery and/or method according to any of the preceding Embodiments wherein each of the first and second secondary growth constraints comprise a slot, and the population of counter-electrode structures height extends through and is affixed within the slot forming an interlocking connection between the population of electrode structures and each of the first and second secondary growth constraints.

Embodiment 195. The secondary battery and/or method according to any of the preceding Embodiments wherein members of the population of electrode structures comprise a top adjacent to the first secondary growth constraint, a bottom adjacent to the second secondary growth constraint, a vertical axis $A_{ES}$ parallel to and in the vertical direction extending from the top to the bottom, a lateral electrode surface surrounding the vertical axis $A_{ES}$ and connecting the top and the bottom, the lateral electrode surface having opposing first and second regions on opposite sides of the vertical axis and separated in a first direction that is orthogonal to the vertical axis, a length $L_{ES}$, a width $W_{ES}$, and a height $H_{ES}$, the length $L_{ES}$ being bounded by the lateral electrode surface and measured in the transverse direction, the width $W_{ES}$ being bounded by the lateral electrode surface and measured in the longitudinal direction, and the height $H_{ES}$ being measured in the direction of the vertical axis $A_{ES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being affixed to the top and bottom of the population of electrode structures.

Embodiment 196. The secondary battery and/or method according to any of the preceding Embodiments wherein the inner surfaces of each of the first and second secondary growth constraints comprise a notch, and the population of electrode structures height $H_{ES}$ extends into and is affixed within the notch, the notch having a depth defined along the vertical direction of 25% of the first and second secondary growth constraint heights.

Embodiment 197. The secondary battery and/or method according to any of the preceding Embodiments wherein the inner surfaces of each of the first and second secondary growth constraints comprise a notch, and the population of electrode structures height $H_{ES}$ extends into and is affixed within the notch, the notch having a depth defined along the vertical direction of 50% of the first and second secondary growth constraint heights.

Embodiment 198. The secondary battery and/or method according to any of the preceding Embodiments wherein the inner surfaces of each of the first and second secondary growth constraints comprise a notch, and the population of electrode structures height $H_{ES}$ extends into and is affixed within the notch, the notch having a depth defined along the vertical direction of 75% of the first and second secondary growth constraint heights.

Embodiment 199. The secondary battery and/or method according to any of the preceding Embodiments wherein the inner surfaces of each of the first and second secondary growth constraints comprise a notch, and the population of electrode structures height $H_{ES}$ extends into and is affixed within the notch, the notch having a depth defined along the vertical direction of 90% of the first and second secondary growth constraint heights.

Embodiment 200. The secondary battery and/or method according to any of the preceding Embodiments wherein each of the first and second secondary growth constraints comprise a slot, and the population of electrode structures height extends through and is affixed within the slot forming an interlocking connection between the population of electrode structures and each of the first and second secondary growth constraints.

Embodiment 201. A secondary battery and/or method according to any of the preceding Embodiments, wherein the set of electrode constraints further comprising a fused secondary constraint system comprising first and second secondary growth constraints separated in a second direction and fused with at least one first secondary connecting member.

Embodiment 202. The secondary battery and/or method according to any of the preceding Embodiments wherein members of the population of counter-electrode structures comprise a top adjacent to the first secondary growth constraint, a bottom adjacent to the second secondary growth constraint, a vertical axis Aces parallel to and in the vertical direction extending from the top to the bottom, a lateral electrode surface surrounding the vertical axis Aces and connecting the top and the bottom, the lateral electrode surface having opposing first and second regions on opposite sides of the vertical axis and separated in a first direction that is orthogonal to the vertical axis, a length $L_{CES}$, a width $W_{CES}$, and a height $H_{CES}$, the length $L_{CES}$ being bounded by the lateral electrode surface and measured in the transverse direction, the width $W_{CES}$ being bounded by the lateral electrode surface and measured in the longitudinal direction, and the height $H_{CES}$ being measured in the direction of the vertical axis Aces from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being fused to the top and bottom of the population of counter-electrode structures.

Embodiment 203. The secondary battery and/or method according to any of the preceding Embodiments wherein members of the population of electrode structures comprise a top adjacent to the first secondary growth constraint, a bottom adjacent to the second secondary growth constraint, a vertical axis $A_{ES}$ parallel to and in the vertical direction extending from the top to the bottom, a lateral electrode surface surrounding the vertical axis $A_{ES}$ and connecting the top and the bottom, the lateral electrode surface having opposing first and second regions on opposite sides of the vertical axis and separated in a first direction that is orthogonal to the vertical axis, a length $L_{ES}$, a width $W_{ES}$, and a height $H_{ES}$, the length $L_{ES}$ being bounded by the lateral electrode surface and measured in the transverse direction, the width $W_{ES}$ being bounded by the lateral electrode surface and measured in the longitudinal direction, and the height $H_{ES}$ being measured in the direction of the vertical axis $A_{ES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being fused to the top and bottom of the population of electrode structures.

Embodiment 204. The secondary battery and/or method according to any of the preceding Embodiments wherein at least one of an electrode structure and counter-electrode structure comprise a top adjacent to the first secondary growth constraint, a bottom adjacent to the second secondary growth constraint, a vertical axis AEs parallel to and in the vertical direction extending from top to bottom, a lateral electrode surface surrounding the vertical axis and connecting top and bottom, the lateral electrode surface having a width $W_{ES}$ bounded by the lateral surface and measured in the longitudinal direction, wherein the width Wes tapers from a first width adjacent the top to a second width that is smaller than the first width at a region along the vertical axis between the top and bottom.

Embodiment 205. The secondary battery and/or method according to any of the preceding Embodiments, wherein the at least one secondary connecting member corresponds to at least one of the first and second primary growth constraints at the longitudinal ends of the electrode assembly.

Embodiment 206. The secondary battery and/or method according to any of the preceding Embodiments wherein the electrically insulating microporous separator material comprises a particulate material and a binder, has a void fraction of at least 20 vol. %, and is permeated by the non-aqueous liquid electrolyte.

Embodiment 207. The secondary battery and/or method according to any of the preceding Embodiments wherein the carrier ions are selected from the group consisting of lithium, potassium, sodium, calcium, and magnesium.

Embodiment 208. The secondary battery and/or method according to any of the preceding Embodiments wherein the non-aqueous liquid electrolyte comprises a lithium salt dissolved in an organic solvent.

Embodiment 209. The secondary battery and/or method according to any of the preceding Embodiments wherein the first and second secondary growth constraints each comprise a thickness that is less than 50% of the electrode or counter-electrode height.

Embodiment 210. The secondary battery and/or method according to any of the preceding Embodiments wherein the first and second secondary growth constraints each comprise a thickness that is less than 20% of the electrode or counter-electrode height.

Embodiment 211. The secondary battery and/or method according to any of the preceding Embodiments wherein the first and second secondary growth constraints each comprise a thickness that is less than 10% of the electrode or counter-electrode height.

Embodiment 212. The secondary battery and/or method according to any of the preceding Embodiments wherein the set of electrode constraints inhibits expansion of the electrode active material layers in the vertical direction upon insertion of the carrier ions into the electrode active material as measured by scanning electron microscopy (SEM).

Embodiment 213. The secondary battery and/or method according to any of the preceding Embodiments wherein the first and second primary growth constraints impose an average compressive force to each of the first and second longitudinal ends of at least 0.7 kPa, averaged over the surface area of the first and second longitudinal ends, respectively.

Embodiment 214. The secondary battery and/or method according to any of the preceding Embodiments wherein the first and second primary growth constraints impose an average compressive force to each of the first and second longitudinal ends of at least 1.75 kPa, averaged over the surface area of the first and second longitudinal ends, respectively.

Embodiment 215. The secondary battery and/or method according to any of the preceding Embodiments wherein the first and second primary growth constraints imposes an average compressive force to each of the first and second longitudinal ends of at least 2.8 kPa, averaged over the surface area of the first and second longitudinal ends, respectively.

Embodiment 216. The secondary battery and/or method according to any of the preceding Embodiments wherein the first and second primary growth constraints imposes an average compressive force to each of the first and second longitudinal ends of at least 3.5 kPa, averaged over the surface area of the first and second longitudinal ends, respectively.

Embodiment 217. The secondary battery and/or method according to any of the preceding Embodiments wherein the first and second primary growth constraints imposes an average compressive force to each of the first and second longitudinal ends of at least 5.25 kPa, averaged over the surface area of the first and second longitudinal ends, respectively.

Embodiment 218. The secondary battery and/or method according to any of the preceding Embodiments wherein the first and second primary growth constraints imposes an average compressive force to each of the first and second longitudinal ends of at least 7 kPa, averaged over the surface area of the first and second longitudinal ends, respectively.

Embodiment 219. The secondary battery and/or method according to any of the preceding Embodiments wherein the first and second primary growth constraints imposes an average compressive force to each of the first and second longitudinal ends of at least 8.75 kPa, averaged over the surface area of the first and second projected longitudinal ends, respectively.

Embodiment 220. The secondary battery and/or method according to any of the preceding Embodiments wherein the first and second primary growth constraints imposes an average compressive force to each of the first and second longitudinal ends of at least 10 kPa, averaged over the surface area of the first and second longitudinal ends, respectively.

Embodiment 221. The secondary battery and/or method according to any of the preceding Embodiments wherein the surface area of the first and second longitudinal end surfaces is less than 25% of the surface area of the electrode assembly.

Embodiment 222. The secondary battery and/or method according to any of the preceding Embodiments wherein the surface area of the first and second longitudinal end surfaces is less than 20% of the surface area of the electrode assembly.

Embodiment 223. The secondary battery and/or method according to any of the preceding Embodiments wherein the surface area of the first and second longitudinal end surfaces is less than 15% of the surface area of the electrode assembly.

Embodiment 224. The secondary battery and/or method according to any of the preceding Embodiments wherein the surface area of the first and second longitudinal end surfaces is less than 10% of the surface area of the electrode assembly.

Embodiment 225. The secondary battery and/or method according to any of the preceding Embodiments wherein the constraint and enclosure have a combined volume that is less than 60% of the volume enclosed by the battery enclosure.

Embodiment 226. The secondary battery and/or method according to any of the preceding Embodiments wherein the constraint and enclosure have a combined volume that is less than 45% of the volume enclosed by the battery enclosure.

Embodiment 227. The secondary battery and/or method according to any of the preceding Embodiments wherein the constraint and enclosure have a combined volume that is less than 30% of the volume enclosed by the battery enclosure.

Embodiment 228. The secondary battery and/or method according to any of the preceding Embodiments wherein the constraint and enclosure have a combined volume that is less than 20% of the volume enclosed by the battery enclosure.

Embodiment 229. The secondary battery and/or method according to any of the preceding Embodiments. The secondary battery of any preceding claim wherein the first and second longitudinal end surfaces are under a compressive load when the secondary battery is charged to at least 80% of its rated capacity.

Embodiment 230. The secondary battery and/or method according to any of the preceding Embodiments wherein the secondary battery comprises a set of electrode assemblies, the set comprising at least two electrode assemblies.

Embodiment 231. The secondary battery and/or method according to any of the preceding Embodiments wherein the electrode assembly comprises at least 5 electrode structures and at least 5 counter-electrode structures.

Embodiment 232. The secondary battery and/or method according to any of the preceding Embodiments wherein the electrode assembly comprises at least 10 electrode structures and at least 10 counter-electrode structures.

Embodiment 233. The secondary battery and/or method according to any of the preceding Embodiments wherein the electrode assembly comprises at least 50 electrode structures and at least 50 counter-electrode structures.

Embodiment 234. The secondary battery and/or method according to any of the preceding Embodiments wherein the electrode assembly comprises at least 100 electrode structures and at least 100 counter-electrode structures.

Embodiment 235. The secondary battery and/or method according to any of the preceding Embodiments wherein the electrode assembly comprises at least 500 electrode structures and at least 500 counter-electrode structures.

Embodiment 236. The secondary battery and/or method according to any of the preceding Embodiments wherein at least one of the primary and secondary constraint systems comprises a material having an ultimate tensile strength of at least 10,000 psi (>70 MPa).

Embodiment 237. The secondary battery and/or method according to any of the preceding Embodiments wherein at least one of the primary and secondary constraint systems comprises a material that is compatible with the battery electrolyte.

Embodiment 238. The secondary battery and/or method according to any of the preceding Embodiments wherein at least one of the primary and secondary constraint systems comprises a material that does not significantly corrode at the floating or anode potential for the battery.

Embodiment 239. The secondary battery and/or method according to any of the preceding Embodiments wherein at least one of the primary and secondary constraint systems comprises a material that does not significantly react or lose mechanical strength at 45° C.

Embodiment 240. The secondary battery and/or method according to any of the preceding Embodiments wherein at least one of the primary and secondary constraint systems comprises a material that does not significantly react or lose mechanical strength at 70° C.

Embodiment 241. The secondary battery and/or method according to any of the preceding Embodiments wherein at least one of the primary and secondary constraint systems comprises metal, metal alloy, ceramic, glass, plastic, or a combination thereof.

Embodiment 242. The secondary battery and/or method according to any of the preceding Embodiments wherein at least one of the primary and secondary constraint systems comprises a sheet of material having a thickness in the range of about 10 to about 100 micrometers.

Embodiment 243. The secondary battery and/or method according to any of the preceding Embodiments wherein at least one of the primary and secondary constraint systems comprises a sheet of material having a thickness in the range of about 30 to about 75 micrometers.

Embodiment 244. The secondary battery and/or method according to any of the preceding Embodiments wherein at least one of the primary and secondary constraint systems comprises carbon fibers at >50% packing density.

Embodiment 245. The secondary battery and/or method according to any of the preceding Embodiments wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 3.

Embodiment 246. The secondary battery and/or method according to any of the preceding Embodiments wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 3.5.

Embodiment 247. The secondary battery and/or method according to any of the preceding Embodiments wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 4.

Embodiment 248. The secondary battery and/or method according to any of the preceding Embodiments wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 5.

Embodiment 249. The secondary battery and/or method according to any of the preceding Embodiments, wherein portions of the set of electrode constraints that are external to the electrode assembly occupy no more than 80% of the total combined volume of the electrode assembly and the external portions of the electrode constraints.

Embodiment 250. The secondary battery and/or method according to any of the preceding Embodiments, wherein portions of the primary growth constraint system that are external to the electrode assembly occupy no more than 40% of the total combined volume of the electrode assembly and external portions of the primary growth constraint system.

Embodiment 251. The secondary battery and/or method according to any of the preceding Embodiments, wherein portions of the secondary growth constraint system that are external to the electrode assembly occupy no more than 40% of the total combined volume of the electrode assembly and external portions of the secondary growth constraint system.

Embodiment 252. The secondary battery and/or method according to any of the preceding Embodiments, wherein a projection of the members of the electrode population and the counter-electrode populations onto the first longitudinal end surface circumscribes a first projected area, and a projection of the members of the electrode population and the counter-electrode populations onto the second longitudinal end surface circumscribes a second projected area, and wherein the first and second projected areas each comprise at least 50% of the surface area of the first and second longitudinal end surfaces, respectively.

Embodiment 253. The secondary battery and/or method according to any of the preceding Embodiments, wherein the first and second primary growth constraints deflect upon repeated cycling of the secondary battery between charged and discharged states according to the following formula:

$$\delta=60wL^4/Eh^3,$$

wherein w is total distributed load applied to the first and second primary growth constraints upon repeated cycling of the secondary battery between charged and discharged states, L is the distance between first and second primary connecting members in the vertical direction, E is the elastic modulus of the first and second primary growth constraints, and h is the thickness of the first and second primary growth constraints.

Embodiment 254. The secondary battery and/or method according to any of the preceding Embodiments, wherein the stress on the first and second primary growth constraints upon repeated cycling of the secondary battery between charged and discharged states is as follows:

$$\sigma=3wL^2/4h^2$$

wherein w is total distributed load applied on the first and second primary growth constraints upon repeated cycling of the secondary battery between charged and discharged states, L is the distance between first and second primary connecting members in the vertical direction, and h is the thickness of the first and second primary growth constraints.

Embodiment 255. The secondary battery and/or method according to any of the preceding Embodiments, wherein the tensile stress on the first and second primary connecting members is as follows:

$$\sigma=PL/2t$$

wherein P is pressure applied due to the first and second primary growth constraints upon repeated cycling of the secondary battery between charged and discharged states, L is the distance between the first and second primary connecting members along the vertical direction, and t is the thickness of the first and second primary connecting members in the vertical direction.

Embodiment 256. The secondary battery and/or method according to any of the preceding claims, wherein the first and second secondary growth constraints deflect upon repeated cycling of the secondary battery between charged and discharged states according to the following formula $$\delta=60wy^4/Et^3,$$

wherein w is the total distributed load applied on the first and second secondary growth constraints upon repeated cycling of the secondary battery between charged and discharged states, y is the distance between the first and second secondary connecting members in the longitudinal direction, E is the elastic modulus of the first and second secondary growth constraints, and t is the thickness of the first and second secondary growth constraints.

Embodiment 257. The secondary battery and/or method according to any of the preceding claims, wherein the stress on the first and second secondary growth constraints is as follows:

$$\sigma=3wy^2/4t^2$$

wherein w is the total distributed load applied on the first and second secondary growth constraints upon repeated cycling of the secondary battery between charged and discharged states, y is the distance between the first and second secondary connecting members along the longitudinal direction, and t is the thickness of the first and second secondary growth constraints.

Embodiment 258. The secondary battery and/or method according to any of the preceding Embodiments, wherein the tensile stress on the first and second secondary connecting members is as follows:

$$\sigma=Py/2h,$$

wherein P is the pressure applied on the first and second secondary growth constraints upon repeated cycling of the secondary battery, y is the distance between the first and second secondary connecting members along the longitudinal direction, and h is the thickness of the first and second secondary connecting members in the longitudinal direction.

Embodiment 259. The secondary battery and/or method according to any of the preceding Embodiments, wherein the tensile stress on internal secondary connecting members is as follows:

$$\sigma=Py/h$$

wherein P is the pressure applied to the first and second secondary growth constraints upon cycling of the of the secondary battery between charged and discharge states, due to expansion of the electrode active material on regions that are in between internal first and second secondary connecting members, y is the distance between the internal first and second secondary connecting members along the longitudinal direction, and h is the thickness of the internal first and second secondary connecting members in the longitudinal direction.

Embodiment 260. A method for the preparation of an electrode assembly, the method comprising:

removing a population of negative electrode subunits from a negative electrode sheet, the negative electrode sheet comprising a negative electrode sheet edge margin and at least one negative electrode sheet weakened region that is internal to the negative electrode sheet edge margin, the at least one negative electrode sheet weakened region at least partially defining a boundary of the negative electrode subunit population within the negative electrode sheet, the negative electrode subunit of each member of the negative electrode subunit population having a negative electrode subunit centroid, removing a population of separator layer subunits from a separator sheet, the separator sheet comprising a separator sheet edge margin and at least one separator sheet weakened region that is internal to the separator sheet edge margin, the at least one separator sheet weakened region at least partially defining a boundary of the separator layer subunit population, each member of the separator layer subunit population having opposing surfaces, removing a population of positive electrode subunits from a positive electrode sheet, the positive electrode sheet comprising a positive electrode edge margin and at least one positive electrode sheet weakened region that is internal to the positive electrode sheet edge margin, the at last one positive electrode sheet weakened region at least partially defining a boundary of the positive electrode subunit population within the positive electrode sheet, the positive electrode subunit of each member of the positive electrode subunit population having a positive electrode subunit centroid, stacking members of the negative electrode subunit population, the separator layer subunit population and the positive electrode subunit population in a stacking direction to form a stacked population of unit cells, each unit cell in the stacked population comprising at least a unit cell portion of the negative electrode subunit, the separator layer of a stacked member of the separator layer subunit population, and a unit cell portion of the positive electrode subunit, wherein (i) the negative electrode subunit and positive electrode subunit face opposing surfaces of the separator layer comprised by such stacked unit cell population member, and (ii) the separator layer comprised by such stacked unit cell population member is adapted to electrically isolate the portion of the negative electrode subunit and the portion of the positive electrode subunit comprised by such stacked unit cell while permitting an exchange of carrier ions between the negative electrode subunit and the positive electrode subunit comprised by such stacked unit cell.

Embodiment 261. The method of Embodiment 260, wherein members of the negative electrode subunit population each comprise a multi-layer negative electrode subunit having a negative electrode active material layer on at least one side of a negative electrode current collector layer.

Embodiment 262. The method of any of Embodiments 260-263, wherein the negative electrode active material layer comprises a negative electrode active material layer centroid.

Embodiment 263. The method of any of Embodiments 260-262, wherein members of the positive electrode subunit population each comprise a multi-layer positive electrode subunit comprising a positive electrode active material layer on at least one side of a positive-electrode current collector layer.

Embodiment 264. The method of Embodiment 263, wherein the positive electrode active material layer comprises a positive electrode active material layer centroid.

Embodiment 265. The method of any of Embodiments 260-264, wherein members of the negative electrode subunit population each comprise a multi-layer negative electrode subunit having an electrode active material layer on at least one side of a negative electrode current collector layer, and members of the positive electrode subunit population each comprise a multi-layer positive electrode subunit comprising a positive electrode active material layer on at least one side of a positive electrode current collector layer, and wherein each unit cell in the stacked population comprising at least a unit cell portion of the negative electrode current collector layer and the negative electrode active material layer of a stacked member of the negative electrode multi-layer subunit population, the separator layer of a stacked member of the separator layer subunit population, and the positive electrode active material layer and a unit cell portion of the positive electrode current collector layer of a stacked member of the positive electrode multilayer subunits, wherein (i) the negative electrode active material and positive electrode active material layers comprised by a member of the stacked unit cell population face opposing surfaces of the separator layer comprised by such stacked unit cell population member, and (ii) the separator layer comprised by such stacked unit cell population member is adapted to electrically isolate the negative electrode active material and positive electrode active material layers comprised by such stacked unit cell while permitting an exchange of carrier ions between the negative electrode active material and positive electrode active material layers comprised by such stacked unit cell.

Embodiment 266. The method of any of Embodiments 260-265, wherein each member of the stacked population of unit cells has a centroid separation distance wherein the centroid separation distance for an individual member of the population is the distance between the centroid of the unit cell portion of the negative electrode subunit and the centroid of the unit cell portion of the positive electrode subunit comprised by such individual member projected onto an imaginary plane that is orthogonal to the stacking direction, and the centroid distance is within a predetermined limit.

Embodiment 267. The method of any of Embodiments 260-266, wherein members of the stacked population of unit cells have a centroid separation distance between first and second members, and wherein the centroid separation distance between first and second members of the population is the absolute value of the distance between the centroid of the unit cell portion of the negative electrode subunit of the first member and the centroid of the unit cell portion of the negative electrode subunit of the second member, and/or the absolute value of the distance between the centroid of the unit cell portion of the positive electrode subunit of the first member and the centroid of the unit cell portion of the positive electrode subunit of the second member, and the centroid distance is within a predetermined limit.

Embodiment 268. The method of any of Embodiments 260-267, wherein the centroid separation distance for an individual member of the population is the distance between a centroid of the negative electrode active material layer and a centroid of the positive electrode active material layer comprised by such individual member projected onto an imaginary plane that is orthogonal to the stacking direction, and the centroid distance is within a predetermined limit.

Embodiment 269. The method of any of Embodiments 260-268, wherein members of the stacked population of unit cells have a centroid separation distance between either or both of negative electrode active material layers and/or positive electrode active material layers of first and second members, and wherein the centroid separation distance between first and second members of the population is the absolute value of the distance between the centroid of the unit cell portion of the negative electrode active material layer of the first member and the centroid of the unit cell portion of the negative electrode active material layer of the second member, and/or the absolute value of the distance between the centroid of the unit cell portion of the positive electrode active material layer of the first member and the centroid of the unit cell portion of the positive electrode active material layer of the second member, and the centroid distance is within a predetermined limit.

Embodiment 270. The method of any of Embodiments 260-269, wherein the absolute value of the centroid separation distance for unit cell portions of negative electrode and positive electrode subunits in an individual member of the population $S_D$ is within a predetermined limit corresponding to either less than 500 microns, or in a case where 2% of the largest dimension of the negative electrode subunit is less than 500 microns, then within a predetermined limit of less than 2% of the largest dimension of the negative electrode subunit.

Embodiment 271. The method of any of Embodiments 260-270, wherein the absolute value of the centroid separation distance for unit cell portions of negative electrode and positive electrode active material layers in an individual member of the population $S_D$ is within a predetermined limit corresponding to either less than 500 microns, or in a case where 2% of the largest dimension of the negative electrode active material layer is less than 500 microns, then within a predetermined limit of less than 2% of the largest dimension of the negative electrode active material layer.

Embodiment 272. The method of any of Embodiments 260-271, wherein the absolute value of the centroid separation distance for unit cell portions of negative electrode subunits in first and second members of the population Sp is within a predetermined limit corresponding to either less than 500 microns, or in a case where 2% of the largest dimension of the negative electrode subunit in either of the members is less than 500 microns, then within a predetermined limit of less than 2% of the largest dimension of the largest negative electrode subunit in the first and second members, and wherein the absolute value of the centroid separation distance for unit cell portions of positive electrode subunits in first and second members of the population Sp is within a predetermined limit corresponding to either less than 500 microns, or in a case where 2% of the largest dimension of the positive electrode subunit in either of the members is less than 500 microns, then within a predetermined limit of less than 2% of the largest dimension of the largest positive electrode subunit in the first and second members.

Embodiment 273. The method of any of Embodiments 260-272, wherein the absolute value of the centroid separation distance for unit cell portions of negative electrode active material layers in first and second members of the population Sp is within a predetermined limit corresponding to either less than 500 microns, or in a case where 2% of the largest dimension of the negative electrode active material in either of the members is less than 500 microns, then within a predetermined limit of less than 2% of the largest dimension of the largest negative electrode active material layer in the first and second members, and wherein the absolute value of the centroid separation distance for unit cell portions of positive electrode active material layers in first and second members of the population Sp is within a predetermined limit corresponding to either less than 500 microns, or in a case where 2% of the largest dimension of the positive electrode active material layer in either of the members is less than 500 microns, then within a predetermined limit of less than 2% of the largest dimension of the largest positive electrode active material layer in the first and second members.

Embodiment 274. The method of any of Embodiments 260-273, wherein an average centroid separation distance for at least 5 unit cells in the stacked population is within the predetermined limit.

Embodiment 275. The method of any of Embodiments 260-274, wherein the average centroid separation distance is within the predetermined limit for at least 10 unit cells, at least 15 unit cells, at least 20 unit cells, and/or at least 25 unit cells in the stacked population.

Embodiment 276. The method of any of Embodiments 260-275, wherein the average centroid separation distance is within the predetermined limit for at least 75%, at least 80%, at least 90% and/or at least 95% of the unit cell members of the stacked population of unit cells.

Embodiment 277. The method of any of Embodiments 260-276, wherein the negative electrode sheet comprises a continuous web having the negative electrode subunits formed therein, and/or wherein the positive electrode sheet comprises a continuous web having the positive electrode subunits formed therein, and/or wherein the separator sheet comprises a continuous web having the separator layer subunits formed therein.

Embodiment 278. The method of any of Embodiments 260-277, wherein the positive electrode subunits, separator layer subunits, and/or negative electrode subunits are removed from their respective positive electrode sheets, separator sheet, and/or negative electrode sheet, by detaching the subunits from the sheets at the at least one weakened region.

Embodiment 279. The method of any of Embodiments 260-278, wherein the negative electrode subunits, separator layer subunits, and/or positive electrode subunits are removed from their respective negative electrode sheet, separator sheet, and/or positive electrode sheet, by exerting a force on the subunit that is orthogonal to a plane of the sheet, to separate the subunit from the sheet at the weakened region.

Embodiment 280. The method of any of Embodiments 260-279, wherein the positive electrode sheet, negative electrode sheet, and/or separator sheet is tensioned in one or more directions that are parallel to a plane of the sheet during removal of the one or more subunits therefrom.

Embodiment 281. The method of any of Embodiments 260-280, wherein each of the negative electrode sheet, separator sheet, and/or positive electrode sheet comprises a plurality of negative electrode subunits, separator layer subunits, and/or positive electrode subunits, respectfully, each of a same type for each sheet, formed sequentially along a length of the sheet.

Embodiment 282. The method of any of Embodiments 260-281, wherein at least two of the negative electrode sheet, separator sheet, and/or positive electrode sheet are merged with respect to each other, prior to removal of the subunits.

Embodiment 283. The method of any of Embodiments 260-282, comprising feeding a continuous web comprising the negative electrode sheet, a continuous web comprising the separator sheet, and/or a continuous web comprising the positive electrode sheet together such that the sheets are aligned in a merged fashion to form a merged web, and removing the subunits therefrom to form the stacked population comprising negative electrode subunits, separator layer units, and positive electrode subunits.

Embodiment 284. The method of any of Embodiments 260-283, comprising feeding the negative electrode sheet, the separator sheet, and/or the positive electrode sheet together such that the sheets are aligned in a merged fashion to form a merged sheet stack, and removing the subunits therefrom to form the stacked population comprising negative electrode subunits, separator layer units, and positive electrode subunits.

Embodiment 285. The method of claim any of Embodiments 260-284, wherein the sheets comprise sheet alignment features, and wherein the method comprises aligning the sheets with respect to one another using the alignment features, to provide alignment of one or more of the subunits in the sheets with respect to one another.

Embodiment 286. The method of any of Embodiments 260-285, wherein the sheet alignment features comprise a plurality of apertures formed in a peripheral region of the sheets outside an outer boundary defining the subunits formed in each sheet.

Embodiment 287. The method of any of Embodiments 260-286, wherein the sheets are merged and aligned prior to removal of the subunits therein.

Embodiment 288. The method of any of Embodiments 260-287, comprising merging at least two of the negative electrode sheet, positive electrode sheet and/or separator sheet with respect to one another, prior to removal of the subunits therein.

Embodiment 289. The method of any of Embodiments 260-288, comprising merging at least two of the negative electrode sheet, positive electrode sheet and/or separator sheet with respect to one another, prior to removal of the subunits therein.

Embodiment 290. The method of any of Embodiments 260-289, comprising simultaneously removing at least two, and even at least three, of the negative electrode subunit, positive electrode-subunit, and separator layer subunit, from their respective negative electrode sheet, positive electrode sheet and/or separator layer sheet, to form the stacked population.

Embodiment 291. The method of any of Embodiments 260-290, comprising sequentially removing at least at least two, and even at least three, of the negative electrode subunit, positive electrode-subunit, and separator layer subunit, from their respective negative electrode sheet, positive electrode sheet and/or separator layer sheet, to form the stacked population.

Embodiment 292. The method of any of Embodiments 260-291, wherein the negative electrode sheet, positive electrode sheet, and/or separator layer sheet comprise a plurality of subunits formed along a length direction of the sheet.

Embodiment 293. The method of any of Embodiments 260-292, wherein the boundaries of the subunits are at least partially defined by weakened regions extending in a length direction of the sheet on opposing sides of the subunits.

Embodiment 294. The method of any of Embodiments 260-293, wherein the at least one weakened region comprises a region that is perforated and/or comprises a thinner cross-section as compared to other regions of the sheet.

Embodiment 295. The method of any of Embodiments 260-294, comprising simultaneously removing at least one negative electrode subunit, at least one separator layer subunit, and at least one positive electrode subunit, from their respective sheets, to form the stacked population.

Embodiment 296. The method of any of Embodiments 260-295, wherein the at least one negative electrode subunit, the at least one separator subunit, and at least one positive electrode subunit are sequentially removed from their respective sheets.

Embodiment 297. The method of any of Embodiments 260-296, comprising removing the subunits from the sheets, following by advancing of the sheets in the feeding direction, and subsequently removing further subunits from the sheets.

Embodiment 298. The method of any of Embodiments 260-297, comprising simultaneously removing a set of subunits separated from the sheet that are separated from one another in the width direction of the sheet that is orthogonal to the sheet feeding direction.

Embodiment 299. The method of any of Embodiments 260-298, wherein in the stacked population, (i) the negative electrode subunit has a first set of two opposing end surfaces, and opposing end margins adjacent each of the first set of opposing end surfaces, (ii) the positive electrode subunit has a second set of opposing end surfaces, and opposing end margins adjacent each of the second set of opposing end surfaces, (iii) one or more of the negative electrode subunit and positive electrode subunit have at least one weakened region in at least one of the opposing end margins thereof, wherein the method further comprises applying tension to at least one of the opposing end margins of one or more of the negative electrode subunit and positive electrode subunit in the tensioning direction, to remove a portion of one or more of the negative electrode subunit and positive electrode subunit that is adjacent the weakened location in the at least one opposing end margin, such that one or more of the first set of opposing end surfaces of the negative electrode subunit and the second set of opposing end surfaces of the positive electrode subunit comprise at least one end surface exposed by removal of the portion.

Embodiment 300. The method of any of Embodiments 260-299, wherein in the stacked population, the opposing end margins of the negative electrode subunit and the positive electrode subunit at least partially overlie one another, and wherein following removal of the portion of one or more of the negative electrode subunit and the positive electrode subunit, at least a portion of one or more of the opposing end surfaces in the first set of opposing end surfaces of the negative electrode subunit are offset relative to at least a portion of one or more of the opposing end surfaces in the second set of opposing end surfaces of the positive electrode subunit, in one or more of the tensioning direction and a third direction orthogonal to both the tensioning direction and the stacking direction.

Embodiment 301. The method of any of Embodiments 260-300, wherein in the stacked population, an interior portion of the negative electrode subunit and an interior portion of the positive electrode subunit are aligned with respect to each other in a tensioning direction that is orthogonal to the stacking direction, and further comprising maintaining an alignment of the stacked population while the tension is applied.

Embodiment 302. The method of any of Embodiments 260-301, wherein the alignment is maintained by compressing the stacked population between compression plates.

Embodiment 303. The method of any of Embodiments 260-302, wherein the alignment is maintained by attaching a plurality of the negative electrode current collectors and/or positive electrode current collectors in the stacked population to one or more constraint members on a face of the stacked population that is in a plane of the stacking direction.

Embodiment 304. The method according of any of Embodiments 260-303, wherein the alignment is maintained by attaching a plurality of the electrode current collectors and/or positive-electrode current collectors in the stacked population to one or more constraint members on a face of the stacked population that is in a plane of the stacking direction.

Embodiment 305. The method of any of Embodiments 260-304, wherein removal of the portion provides electrical tabs capable of being connected to a busbar.

Embodiment 306. The method of any of Embodiments 260-305, wherein following removal of the portion of one or more of the positive electrode subunit and the negative electrode subunit, each positive electrode subunit in the stacked population comprises a predetermined position with respect to the other positive electrode subunits in the tensioning direction and the third direction, and/or each negative electrode subunit in the negative electrode sheet comprises a predetermined position with respect to the other negative electrode sheets in the tensioning direction and the third direction.

Embodiment 307. The method of any of Embodiments 260-306, wherein following removal of the portion of one or more of the negative electrode subunit and the positive electrode subunit, each negative electrode subunit in the stacked population comprises a predetermined position with respect to each positive electrode subunit in the stacked population in the tensioning direction.

Embodiment 308. The method of any of Embodiments 260-307, wherein in the stacked population, following removal of the portion of the one or more of the positive electrode subunit and the negative electrode subunit, the centroid separation distance between a positive electrode subunit centroid and a negative electrode subunit centroid is within a predetermined limit.

Embodiment 309. The method of any of Embodiments 260-308, wherein the stacked population, following removal of the portion of one or more of the positive electrode subunit and the negative electrode subunit, a centroid separation distance for each unit cell member of the population is the distance between a centroid of the negative electrode active material layer and a centroid of the positive electrode active material layer comprised by such individual member projected onto an imaginary plane that is orthogonal to the stacking direction, and the centroid distance is within a predetermined limit.

Embodiment 310. The method of any of Embodiments 260-309, wherein in the stacked population, following removal of the portion of one or more of the positive electrode subunit and the negative electrode subunit, a centroid separation distance for each unit cell member of the population is the distance between a centroid of the negative electrode subunit and a centroid of the positive electrode subunit comprised by such individual member projected onto an imaginary plane that is orthogonal to the stacking direction, and the centroid distance is within a predetermined limit.

Embodiment 311. The method of any of Embodiments 260-309, wherein in the stacked population, following removal of the portion of one or more of the positive electrode subunit and the negative electrode subunit, the members of the stacked population of unit cells have a centroid separation distance between either or both of negative electrode active material layers and/or positive electrode active material layers of first and second members, and wherein the centroid separation distance between first and second members of the population is the absolute value of the distance between the centroid of the unit cell portion of the negative electrode active material layer of the first member and the centroid of the unit cell portion of the negative electrode active material layer of the second member, and/or the absolute value of the distance between the centroid of the unit cell portion of the positive electrode active material layer of the first member and the centroid of the unit cell portion of the positive electrode active material layer of the second member, and the centroid distance is within a predetermined limit.

Embodiment 312. The method of any of Embodiments 260-311, wherein following removal of the portion of one or more of the positive electrode subunit and the negative electrode subunit, the absolute value of the centroid separation distance for unit cell portions of negative electrode and positive electrode subunits in an individual member of the population Sp is within a predetermined limit corresponding to either less than 500 microns, or in a case where 2% of the largest dimension of the negative electrode subunit is less than 500 microns, then within a predetermined limit of less than 2% of the largest dimension of the negative electrode subunit.

Embodiment 313. The method of any of Embodiments 260-312, wherein following removal of the portion of one or more of the positive electrode subunit and the negative electrode subunit, the absolute value of the centroid separation distance for unit cell portions of negative electrode and positive electrode active material layers in an individual member of the population Sp is within a predetermined limit corresponding to either less than 500 microns, or in a case where 2% of the largest dimension of the negative electrode active material layer is less than 500 microns, then within a predetermined limit of less than 2% of the largest dimension of the negative electrode active material layer.

Embodiment 314. The method of any of Embodiments 260-313, wherein following removal of the portion of one or more of the positive electrode subunit and the negative electrode subunit, the absolute value of the centroid separation distance for unit cell portions of negative electrode subunits in first and second members of the population Sp is within a predetermined limit corresponding to either less than 500 microns, or in a case where 2% of the largest dimension of the negative electrode subunit in either of the members is less than 500 microns, then within a predetermined limit of less than 2% of the largest dimension of the largest negative electrode subunit in the first and second members, and wherein the absolute value of the centroid separation distance for unit cell portions of positive electrode subunits in first and second members of the population $S_D$ is within a predetermined limit corresponding to either less than 500 microns, or in a case where 2% of the largest dimension of the positive electrode subunit in either of the members is less than 500 microns, then within a predetermined limit of less than 2% of the largest dimension of the largest positive electrode subunit in the first and second members.

Embodiment 315. The method of any of Embodiments 260-314, wherein following removal of the portion of one or more of the positive electrode subunit and the negative electrode subunit, the absolute value of the centroid separation distance for unit cell portions of negative electrode active material layers in first and second members of the population Sp is within a predetermined limit corresponding to either less than 500 microns, or in a case where 2% of the largest dimension of the negative electrode active material in either of the members is less than 500 microns, then within a predetermined limit of less than 2% of the largest dimension of the largest negative electrode active material layer in the first and second members, and wherein the absolute value of the centroid separation distance for unit cell portions of positive electrode active material layers in first and second members of the population $S_D$ is within a predetermined limit corresponding to either less than 500 microns, or in a case where 2% of the largest dimension of the positive electrode active material layer in either of the members is less than 500 microns, then within a predetermined limit of less than 2% of the largest dimension of the largest positive electrode active material layer in the first and second members.

Embodiment 316. The method of any of Embodiments 260-315, wherein following removal of the portion of one or more of the positive electrode subunit and the negative electrode subunit, an average centroid separation distance for at least unit cells in the stacked population is within the predetermined limit.

Embodiment 317. The method of any of Embodiments 260-316, wherein the average centroid separation distance is within the predetermined limit for at least 10 unit cells, at least 15 unit cells, at least 20 unit cells, and/or at least 25 unit cells in the stacked population.

Embodiment 318. The method of any of Embodiments 260-317, wherein the average centroid separation distance is within the predetermined limit for at least 75%, at least 80%, at least 90% and/or at least 95% of the unit cell members of the stacked population of unit cells.

Embodiment 319. The method of any of Embodiments 260-318, wherein the negative electrode subunit has the at least one weakened location in an opposing end margin thereof, and wherein tension is applied to the opposing end margin of the negative electrode subunit having the weakened region to remove the portion of the negative electrode subunit, such that the first set of opposing end surfaces of the negative electrode subunit comprise the at least one end surface exposed by removal of the portion.

Embodiment 320. The method of any of Embodiments 260-319, wherein the positive electrode subunit has the at least one weakened location in at least one opposing end margin thereof, and wherein tension is applied to the opposing end margin having the weakened region of the positive electrode subunit to remove the portion of the positive electrode subunit, such that the second set of opposing end surfaces of the negative electrode subunit comprise the at least one end surface exposed by removal of the portion.

Embodiment 321. The method of any of Embodiments 260-320, wherein both the negative electrode subunit and the positive electrode subunit have the at least one weakened region in at least one opposing end margin thereof, and wherein tension is applied to the opposing end margins having the at least one weakened region of the negative electrode and positive electrode subunits to remove the portions of the negative electrode subunit and positive electrode subunit, such that both the first set of opposing end surfaces of the negative electrode subunit and the second set of opposing end surfaces of the positive electrode subunit comprise at least one end surface exposed by removal of the portions therefrom.

Embodiment 322. The method of any of Embodiments 260-321, wherein the opposing end margin having the at least one weakened region of the negative electrode subunit is on a same side in the tensioning direction as the opposing margin having the at least one weakened region of the positive electrode subunit.

Embodiment 323. The method of any of Embodiments 260-322, wherein the opposing end margin having the at least one weakened region of the negative electrode subunit is on an opposing side in the tensioning direction as the opposing margin having the at least one weakened region of the positive electrode subunit.

Embodiment 324. The method of any of Embodiments 260-323, wherein at least one of the negative electrode subunit and positive electrode subunit comprises weakened end regions at both opposing end margins thereof.

Embodiment 325. The method of any of Embodiments 260-324, wherein both the negative electrode subunit and the positive electrode subunit comprise weakened end regions at both opposing end margins thereof.

Embodiment 326. The method of any of Embodiments 260-325, wherein one or more of the negative electrode subunit and the positive electrode subunit comprise a multi-layer sheet.

Embodiment 327. The method of any of Embodiments 260-326, wherein at least one of the negative electrode subunit and the positive electrode subunit comprise a layer of sacrificial material having at least one weakened region therein.

Embodiment 328. The method of any of Embodiments 260-327, wherein the negative electrode subunit and/or the positive electrode subunit comprise the layer of sacrificial material between layers of negative or positive electrode current collector material formed on either side of the sacrificial material layer in the stacking direction.

Embodiment 329. The method of any of Embodiments 260-328, wherein at least a portion of the stacked population is formed prior to removal of the portion of one or more of the positive electrode subunit and the negative electrode subunit.

Embodiment 330. The method of any of Embodiments 260-329, wherein the stacked population is entirely formed prior to removal of the portion of one or more of the positive electrode subunit and the negative electrode subunit.

Embodiment 331. The method of any of Embodiments 260-330, wherein a portion of the stacked population is formed prior to removal of the portion of one or more of the positive electrode subunit and the negative electrode subunit, and wherein the removal of the portion of one or more of the positive electrode subunit and the negative electrode subunit is followed by forming stacking further members of one or more of the negative electrode subunit population, the separator layer subunit population, and the positive electrode subunit population to form the stacked population.

Embodiment 332. The method of any of Embodiments 260-331, comprising stacking to form the stacked population by stacking a plurality of negative electrode subunits and positive electrode subunits, optionally with a plurality of separator sheets, to form at least one unit cell, at least two unit cells, at least three unit cells, at least four unit cells, at least 5 unit cells, at least 6 unit cells, at least 7 unit cells, at least 8 unit cells, at least 9 unit cells, at least 10 unit cells, at least 11 unit cells, at least 12 unit cells, at least 13 unit cells, at least 14 unit cells, at least 15 unit cells and/or at least 16 unit cells of a battery.

Embodiment 333. The method of any of Embodiments 260-332, comprising forming the stacked population by stacking at least 1 negative electrode subunit and at least 1 positive electrode subunit, stacking at least 2 negative electrode subunits and at least 2 positive electrode subunits, stacking at least 3 negative electrode subunits and at least 3 positive electrode subunits, stacking at least 4 negative electrode subunits and at least 4 positive electrode subunits, stacking at least negative electrode subunits and at least 5 positive electrode subunits, stacking at least 6 negative electrode subunits and at least 6 positive electrode subunits, stacking at least 7 negative electrode subunits and at least 7 positive electrode subunits, stacking at least 8 negative electrode subunits and at least 8 positive electrode subunits, stacking at least 9 negative electrode subunits and at least 9 positive electrode subunits, stacking at least 10 negative electrode subunits and at least 10 positive electrode subunits, stacking at least 11 negative electrode subunits and at least 11 positive electrode subunits, stacking at least 12 negative electrode subunits and at least 12 positive electrode subunits, stacking at least 13 negative electrode subunits and at least 13 positive electrode subunits, stacking at least 14 negative electrode subunits and at least 14 positive electrode subunits, stacking at least 15 negative electrode subunits and at least 15 positive electrode subunits, and/or stacking at least 16 negative electrode subunits and at least 16 positive electrode subunits.

Embodiment 334. The method of any of Embodiments 260-333, wherein the at least one subunit weakened region comprise a region where the cross-sectional area of the negative electrode subunit and/or positive electrode subunit in the stacking direction has been reduced, such that applying tension to the weakened region in the tensioning direction causes the weakened region to rupture.

Embodiment 335. The method of any of Embodiments 260-334, wherein the at least one subunit weakened region comprises one or more of perforations, holes and/or apertures formed in the positive electrode and/or negative electrode subunit.

Embodiment 336. The method of any of Embodiments 260-335, wherein the at least one subunit weakened region comprises a smaller thickness in the stacking direction than other regions of the positive electrode subunit and/or negative electrode subunit.

Embodiment 337. The method of any of Embodiments 260-336, wherein the at least one subunit weakened region is formed in a negative electrode current collector layer of a negative electrode subunit, and/or the at least one subunit weakened region is formed in a positive electrode current collector layer of a positive electrode subunit.

Embodiment 338. The method of any of Embodiments 260-337, wherein the at least one subunit weakened region is formed in a negative electrode active material layer of a negative electrode subunit, and/or the at least one subunit weakened region is formed in a positive electrode active material layer of a positive electrode subunit.

Embodiment 339. The method of any of Embodiments 260-338, wherein the at least one subunit weakened region is formed in multiple layers of the subunit.

Embodiment 340. The method of any of Embodiments 260-339, wherein the at least one subunit weakened region extends through a thickness of the subunit in the stacking direction.

Embodiment 341. The method of any of Embodiments 260-340, wherein the at least one subunit weakened region traverses at least a portion of height of the positive electrode and/or negative electrode subunit in the third direction orthogonal to the stacking direction and the tensioning direction, between first and second opposing surfaces thereof.

Embodiment 342. The method of any of Embodiments 260-341, wherein the at least one subunit weakened region traverses at least a portion of a substantially straight line between first and second opposing surfaces of the negative electrode subunit and/or positive electrode subunit in the third direction.

Embodiment 343. The method of any of Embodiments 260-342, wherein the at least one subunit weakened region traverses at least a portion of a diagonal line between first and second opposing surfaces of the negative electrode subunit and/or positive electrode subunit in the third direction.

Embodiment 344. The method of any of Embodiments 260-343, wherein the at least one subunit weakened region traverses at least a portion of curved line between first and second opposing surfaces of the negative electrode subunit and/or positive electrode subunit in the third direction.

Embodiment 345. The method of any of Embodiments 260-344, wherein the at least one subunit weakened region comprises a combination of weakened features.

Embodiment 346. The method of any of Embodiments 260-345, wherein the negative electrode subunit and/or positive electrode subunit comprises one or more separated regions, with one or more regions where the negative electrode subunit and/or positive electrode subunit comprises perforations and/or thinning of the subunit in the stacking direction.

Embodiment 347. The method of any of Embodiments 260-346, wherein the at least one subunit weakened region at least partially traces a tab feature of the negative electrode subunit and/or positive electrode subunit.

Embodiment 348. The method of any of Embodiments 260-347, wherein the at least one subunit weakened region at least partially traces a tab protrusion of the negative subunit and/or positive electrode subunit.

Embodiment 349. The method of any of Embodiments 260-348, wherein the at least one subunit weakened region at least partially traces one or more tab protrusions and a tab indentation of the negative electrode subunit and/or positive electrode subunit.

Embodiment 350. The method of any of Embodiments 260-349, wherein the at least one subunit weakened region at least partially traces a hook-shaped tab protrusion of the negative electrode subunit and/or positive electrode subunit.

Embodiment 351. The method of any of Embodiments 260-350, wherein the at least one subunit weakened region in the negative electrode subunit at least partially traces one or more tab protrusions in the negative electrode subunit, and the at least one subunit weakened region in the positive electrode subunit at least partially traces one or more tab protrusions in the positive electrode subunit, and wherein the one or more negative electrode tabs are offset from the one or more positive-electrode tabs in one or more of the tensioning and third directions.

Embodiment 352. The method of any of Embodiments 260-351, wherein the one or more negative electrode tabs are on a first side of the negative electrode subunit, and the one or more positive electrode tabs are on a second side of the positive electrode subunit, the first side opposing the second side in the tensioning direction.

Embodiment 353. The method of any of Embodiments 260-352, wherein the one or more negative electrode tabs are on a same side as the one or more positive electrode tabs in the tensioning direction, and the one or more negative electrode tabs comprise at least a portion thereof that is offset in the third direction from at least a portion of the one or more positive electrode tabs.

Embodiment 354. The method of any of Embodiments 260-353, comprising simultaneously applying tension to both opposing end margins on both sides of the negative electrode subunit and/or positive electrode subunit, to remove portions of the negative electrode and/or positive electrode subunits adjacent the weakened regions at both opposing end margins.

Embodiment 355. The method of any of Embodiments 260-354, sequentially, applying tension to a first end margin on a first side of the negative electrode subunit and/or positive electrode subunit, followed by applying tension to a second end margin on a second side of the negative electrode subunit and/or positive electrode subunit, to remove portions of the negative electrode subunit and/or positive electrode subunits adjacent the weakened regions at both opposing end margins.

Embodiment 356. The method of any of Embodiments 260-355, comprising, while maintaining the alignment of the interior portions of the negative electrode subunit and positive electrode subunit with respect to one another in the tensioning direction, simultaneously applying tension to a first opposing end margin on a first side of the negative electrode subunit, and applying tension to a second opposing end margin on a second side of the positive electrode subunit, to remove a portion of the negative electrode subunit at the first end margin on the first side and a portion of the positive electrode subunit at the second end margin at the second side.

Embodiment 357. The method of any of Embodiments 260-356, comprising, while maintaining the alignment of the interior portions of the negative electrode subunit and positive electrode subunit with respect to one another in the tensioning direction, sequentially, applying tension to a first opposing end margin on a first side of the negative electrode subunit, followed by applying tension to a second opposing end margin on a second side of the positive electrode subunit, to remove a portion of the negative electrode subunit at the first end margin on the first side and a portion of the positive electrode subunit at the second end margin at the second side.

Embodiment 358. The method of any of Embodiments 260-357, comprising, while maintaining the alignment of the interior portions of the negative electrode subunit and positive electrode subunit with respect to one another in the tensioning direction, sequentially, applying tension to a first opposing end margin on a first side of the positive electrode subunit, followed by applying tension to a second opposing end margin on a second side of the negative electrode subunit, to remove a portion of the positive electrode subunit at the first end margin on the first side and a portion of the negative electrode subunit at the second end margin at the second side.

Embodiment 359. The method of any of Embodiments 260-358, wherein alignment of the interior portions of the negative electrode subunit and positive electrode subunit with respect to one another in the tensioning direction is maintained, while the tension is applied, by applying a compressive force between upper and lower surfaces of the stacked population in the stacking direction, with the interior portions of the negative electrode and positive electrode subunits being aligned with respect to each other at a predetermined alignment position in the tensioning direction under application of the compressive force.

Embodiment 360. The method of any of Embodiments 260-359, wherein alignment of the interior portions of the negative electrode subunit and positive electrode subunit with respect to one another in the tensioning direction is maintained, while the tension is applied, by adhering the negative electrode subunit to the positive electrode subunit at a predetermined alignment position of the interior portions of the negative electrode and positive electrode subunit with respect to one another in the tensioning direction.

Embodiment 361. The method of any of Embodiments 260-360, wherein at least one of the negative electrode subunit and positive electrode subunit comprises an alignment feature formed in at least one of the opposing end margins thereof.

Embodiment 362. The method of any of Embodiments 260-361, wherein at least one of the negative electrode subunit and the positive electrode subunit comprise alignment features formed in both opposing end margins thereof.

Embodiment 363. The method of any of Embodiments 260-362, wherein both the negative electrode subunit and the positive electrode subunit comprise alignment features formed in at least one of the opposing end margins thereof.

Embodiment 364. The method of any of Embodiments 260-363, wherein both the negative electrode subunit and the positive electrode subunit comprise alignment features formed in both opposing end margins thereof.

Embodiment 365. The method of any of Embodiments 260-364, wherein the alignment feature comprises an aperture and/or passing formed through a thickness of the negative electrode subunit and/or positive electrode subunit in the stacking direction.

Embodiment 366. The method of any of Embodiments 260-365, further comprising stacking the negative electrode subunit and/or positive electrode subunit by stacking the subunits on at least one alignment pin that passes through the alignment features of the negative electrode subunit and/or positive electrode subunit.

Embodiment 367. The method of any of Embodiments 260-366, further comprising stacking the negative electrode subunit and/or positive electrode subunit by stacking the subunit s on a set of alignment pins that pass through alignment features formed on opposing ends of the negative electrode subunit and/or positive electrode subunit in the tensioning direction.

Embodiment 368. The method of any of Embodiments 260-367, wherein the set of alignment pins passes through alignment features formed in first margins at a first end of both the negative electrode subunit and positive electrode subunit.

Embodiment 369. The method of any of Embodiments 260-368, wherein the set of alignment pins passes through first alignment features formed in first margins at a first end of the negative electrode subunit, and second alignment features formed in the second margins at a second opposing end of the positive electrode subunit in the tensioning direction.

Embodiment 370. The method of any of Embodiments 260-369, wherein the set of alignment pins passes through the first alignment features formed in first margins at a first end of the negative electrode subunit and positive electrode subunit, and second alignment features formed in the second margins at the second opposing end of the negative electrode subunit and positive electrode subunit.

Embodiment 371. The method of any of Embodiments 260-370, wherein the tensioning force is applied to remove the portion of the negative electrode subunit and/or positive electrode subunit adjacent the weakened region in the at least one end margin, by pulling the at least one alignment pin placed in an alignment feature at one end of the negative electrode subunit and/or positive electrode subunit, in the tensioning direction and away from the second end of the negative electrode subunit and/or positive electrode subunit.

Embodiment 372. The method of any of Embodiments 260-371, wherein the tensioning force is applied to remove the portion of the negative electrode subunit and/or positive electrode subunit adjacent the weakened region in the at least one end margin, by simultaneously pulling alignment pins in alignment features on opposing ends of the negative electrode subunit and/or positive electrode subunit in opposing directions in the tensioning direction.

Embodiment 373. The method of any of Embodiments 260-372, wherein the alignment feature is formed in an opposing end margin that is removed upon application of the tension.

Embodiment 374. The method of any of Embodiments 260-373, wherein the alignment feature is formed in an end margin that opposes an end margin where a portion adjacent a subunit weakened region is removed.

Embodiment 375. The method of any of Embodiments 260-374, wherein the negative electrode subunit and positive electrode subunit both comprise alignment features in at least one end margin thereof, and wherein an alignment feature in at least one of the negative electrode subunit and positive electrode subunit comprises a slot having a translation dimension in the tensioning direction, such when an alignment pin inserted into the alignment features of the negative electrode subunit and positive electrode subunit on a first side is pulled outwardly in a tensioning direction away from the second side of the negative electrode subunit and positive electrode subunit, the alignment pin applies a tension to the end margin of the negative electrode subunit and/or positive-electrode subunit having the smaller dimension of the alignment feature via tension applied to the negative electrode subunit alignment feature, while the alignment pin translates through the translation dimension of the slot in the tensioning direction in the other of the negative electrode subunit and/or positive electrode subunit.

Embodiment 376. The method of any of Embodiments 260-375, wherein the alignment feature of the negative electrode subunit and/or positive electrode subunit is formed in the same end margin as the at least one weakened region, and wherein applying tension via the alignment pin results in removal of the portion of the end margin comprising the alignment feature in the negative electrode subunit and/or positive electrode subunit.

Embodiment 377. The method of any of Embodiments 260-376, wherein the alignment feature of the negative electrode subunit and/or positive electrode subunit is formed in an end margin opposing an end margin where an at least one subunit weakened region is formed, and wherein applying tension via the alignment pin results in removal of the portion of the end margin of the negative electrode subunit and/or positive electrode subunit opposing the end margin where the alignment feature is located.

Embodiment 378. The method of any of Embodiments 260-377, wherein alignment features are formed in end margins having the at least one subunit weakened region on a same side of both the negative electrode subunit and positive electrode subunit, and wherein applying tension via the alignment pin results in removal of the portions of the end margins comprising the alignment features on the same sides in the negative electrode subunits and positive electrode subunits.

Embodiment 379. The method of any of Embodiments 260-378, wherein alignment features are formed in end margins on a same side of both the negative electrode subunit and positive electrode subunit that oppose end margins where the at least one weakened region is formed in each negative electrode subunit and positive electrode subunit, and wherein applying tension via the alignment pin results in removal of the portions of the end margins of the negative electrode subunits and positive electrode subunits opposing the end margins where the alignment features are located.

Embodiment 380. The method of any of Embodiments 260-379, wherein both the negative electrode subunit and positive electrode subunit comprise alignment features at opposing end margins of each sheet thereof, and wherein at least one of the negative electrode subunit and positive electrode subunit comprises an alignment feature formed in an end margin comprising the at least one weakened region therein, and the other of the negative electrode subunit and positive electrode subunit comprise an alignment feature comprising a slot having a translation dimension in the tensioning direction that is greater than that of the alignment feature in the other of the negative electrode subunit and/or positive electrode subunit, the alignment feature comprising the slot being on a same side as the alignment feature formed in the end margin having the at least one subset weakened region, such that applying of tension via insertion of a set of alignment pins into the alignment features on both sides of the stacked population results in removal of the portion of the negative electrode and/or positive electrode subunit in the end margin having the subset weakened region, and translation of the pin in the translation dimension of the alignment feature comprising the slot of the other of the negative electrode subunit and/or positive electrode subunit.

Embodiment 381. The method of any of Embodiments 260-380, wherein the stacked population comprises alignment features in both opposing end margins of each of the negative electrode subunit and positive electrode subunit, and wherein alignment features on a first side of the negative electrode subunit and second opposing side of the positive electrode subunit are in end margins comprising the at least one subunit weakened region therein, and alignment features formed on a second side of the negative electrode subunit and a first side of the positive electrode subunit comprise slots having translation dimensions in the tensioning direction that are greater than that of the alignment features formed in the other of the negative electrode subunit and positive electrode subunit on the same respective side, such that applying of tension via insertion of a set of alignment pins into the alignment features on both sides of the stacked population results in removal of the portion of the negative electrode and positive electrode subunit in the end margin having the subset weakened region, and translation of the pin in the translation dimension of the alignment features comprising the slots in the other opposing end margins.

Embodiment 382. The method of any of Embodiments 260-381, wherein the stacked population comprises alignment features in both opposing end margins of each of the negative electrode subunit and positive electrode subunit, and wherein alignment features are formed in the end margin of a first side of the negative electrode subunit having at least one subunit weakened region, and the end margin of a first side of the positive electrode subunit having at least one subunit weakened region on the same side, such that applying of tension via insertion of a set of alignment pins into the alignment features on both sides of the negative electrode subunit and positive electrode subunit results in removal of the portion of the negative electrode and positive electrode subunit in the end margins on the same side having the weakened region.

Embodiment 383. The method of any of Embodiments 260-382, wherein the stacked population comprises alignment features in both opposing end margins of each of the negative electrode subunit and positive electrode subunit, and wherein alignment features on a first side of the negative electrode subunit and same first side of the positive electrode subunit are in end margins comprising the at least one weakened region therein, and wherein the alignment feature on the second opposing side of either the negative electrode subunit or positive electrode subunit is in an end margin comprising at least one subunit weakened region therein, and wherein the alignment features formed on a second opposing side of the other of the negative electrode subunit and positive electrode subunit comprises a slot having translation dimensions in the tensioning direction that is greater than that of the alignment feature formed in the other of the negative electrode and positive electrode subunits on the same respective side, such that applying of tension via insertion of a set of alignment pins into the alignment features on both sides of the stacked population results in removal of the portion of the negative electrode and positive electrode subunit in the end margin on the first side having the weakened region, removal of the portion of the negative electrode subunit or positive electrode subunit in the end margin on the second side having the weakened region, and translation of the pin in the translation dimension of the alignment feature comprising the slots in the end margin on the second side of the other of the negative electrode subunit or positive electrode subunit.

Embodiment 384. The method of any of Embodiments 260-383, wherein the stacked population comprises alignment features in both opposing end margins of each of the negative electrode subunit and positive electrode subunit, and wherein alignment features on both first and second sides of the negative electrode subunit and the positive electrode subunit are in end margins comprising the at least one subset weakened region therein, such that applying of tension via insertion of a set of alignment pins into the alignment features on both sides of the stacked population results in removal of the portions of the negative electrode and positive electrode subunit in the end margins on the first side and second sides having the weakened regions.

Embodiment 385. The method of any of Embodiments 260-384, wherein the stacked population comprises alignment features in end margins on a same side of each of the negative electrode subunit and positive electrode subunit, and wherein the alignment feature of one of the negative electrode subunit and positive electrode subunit is formed in an end margin of a first side comprising the at least one subunit weakened region therein, and wherein the alignment feature on the other of the negative electrode subunit or positive electrode subunit is in an end margin on the first side that is opposing a second side having an end margin with the at least one subunit weakened region therein, such that applying of tension via insertion of a set of alignment pins into the alignment features on the same side of the stacked population results in removal of the portion of the negative electrode subunit and/or positive electrode subunit in the end margin on the first side having the subunit weakened region, and removal of the portion of the negative electrode subunit or positive electrode subunit in the end margin on the second side having the subset weakened region that is opposing the first end with the end margins where the alignment features are formed.

Embodiment 386. The method of any of Embodiments 260-385, wherein the subunit alignment features on each of the negative electrode subunits and/or positive electrode units comprise a slot with a translation dimension in the tensioning direction.

Embodiment 387. The method of any of Embodiments 260-386, wherein the subunit alignment features on each of the negative electrode subunit and/or positive electrode subunit comprise a slot with a translation dimension in the third direction orthogonal to the tensioning direction and stacking direction.

Embodiment 388. The method of any of Embodiments 260-387, wherein the subunit alignment features on each of the negative electrode subunit and/or positive electrode subunits comprise round apertures sized to allow an alignment pin to pass therethrough, and further sized to provide for a tensioning force to be exerted via the alignment feature upon exerting a tensioning force with the alignment pin.

Embodiment 389. The method of any of Embodiments 260-388, wherein the subunit alignment features comprise a combination of slots with translation dimensions, and round apertures.

Embodiment 390. The method of any of Embodiments 260-389, wherein the subunit alignment features comprise a first set of apertures to provide for stacking and alignment of the negative electrode subunits and positive electrode subunits, and wherein the negative electrode and/or positive electrode subunits further comprise second set of apertures through which pins can be inserted to exert a tensioning force on one or more of the stacked negative electrode and positive electrode subunits.

Embodiment 391. The method of any of Embodiments 260-390, wherein the second set of apertures comprises holes in end margins having at least one weakened region, and slots having a translation dimension on one opposing side of each of the negative electrode subunit and positive electrode subunit, such that applying tension results in removal of portions of the negative electrode subunit and positive electrode subunit on opposing sides thereof, at the subunit weakened locations.

Embodiment 392. The method of any of Embodiments 260-391, wherein the subunit alignment features comprise apertures having an opening with a cross-section that is any one or more of rounded, triangular, square, oblong, oval, and rectangular.

Embodiment 393. The method of any of Embodiments 260-392, wherein the subunit alignment features comprise apertures with inwardly protruding engagement portions about a circumference thereof to engage the alignment pins.

Embodiment 394. The method of any of Embodiments 260-393, wherein the subunit alignment features comprise apertures having an opening with a cross-section that is larger at a first side of the opening proximate to the end of the negative electrode subunit and/or positive electrode subunit, and is narrower at a second side of the opening that is distal to the end of the negative electrode subunit and/or positive electrode subunit.

Embodiment 395. The method of any of Embodiments 260-394, wherein the method is performed to manufacture a secondary battery according to any of Embodiments 1-260.

Embodiment 396. An energy storage device having an electrode assembly comprising, in a stacked arrangement, a negative electrode subunit, a separator layer, and a positive electrode subunit, the electrode assembly comprising:

an electrode stack comprising a population of negative electrode subunits and a population of positive electrode subunits stacked in a stacking direction, each of the stacked negative electrode subunits having a length L of the negative electrode subunit in a transverse direction that is orthogonal to the stacking direction, and a height H of the negative electrode subunit in a direction orthogonal to both the transverse direction and stacking directions, wherein (i) each member of the population of negative electrode subunits comprises a first set of two opposing end surfaces that are spaced apart along the transverse direction, (ii) each member of the population of positive electrode subunits comprises a second set of two opposing end surfaces that are spaced apart along the transverse direction, wherein at least one of the opposing end surfaces of the negative electrode subset and/or positive electrode subunit comprises regions about the opposing end surfaces of one or more of the negative electrode subset and positive electrode subunit that exhibit plastic deformation and fracturing oriented in the transverse direction, due to elongation and narrowing of the cross-section of the negative electrode subunit and/or positive electrode subunit.

Embodiment 397. The energy storage device according to Embodiment 396, wherein the negative electrode subunit and/or the positive electrode subunit comprise multi-layer units comprising a negative electrode active material layer and a negative electrode current collector for the negative electrode subunit, and a positive electrode active material layer and a positive electrode current collector for the positive electrode current collector.

Embodiment 398. The energy storage device according to any of Embodiments 396-397, wherein the negative electrode subunits and/or positive electrode subunits have a ratio of a length dimension L, to both the height H and width dimensions W of at least 5:1, such as at least 8:1 and even at least 10:1, and have a ratio of H to W in the range of 0.4:1 to 1000:1, such as in the range of 2:1 to 10:1.

Embodiment 399. The energy storage device according to any of Embodiments 396-398, wherein negative electrode active material of the negative electrode subunits and/or positive electrode active material of the positive electrode subunits have a ratio of a length dimension L, to both the height H and width dimensions W of at least 5:1, such as at least 8:1 and even at least 10:1, and have a ratio of H to W in the range of 0.4:1 to 1000:1, such as in the range of 2:1 to 10:1.

Embodiment 400. The energy storage device according to any of Embodiments 396-399, further comprising constraints set of electrode constraints comprises a primary constraint system comprising first and second primary growth constraints and at least one primary connecting member, the first and second primary growth constraints separated from each other in the stacking direction, and the at least one primary connecting member connecting the first and second primary growth constraints, wherein the primary constraint array restrains growth of the electrode assembly in the stacking direction such that any increase in the Feret diameter of the electrode assembly in the stacking direction over 20 consecutive cycles of the secondary battery is less than 20%, where the charged state is at least 75% of a rated capacity of the secondary battery, and the discharged state is less than 25% of the rated capacity of the secondary battery.

Embodiment 401. The energy storage device according to any of Embodiments 396-400, wherein a growth of the electrode assembly in the stacking direction is such that any increase in the Feret diameter of the electrode assembly in the stacking direction over 20 consecutive cycles and/or 50 consecutive cycles of the secondary battery is less than 3% and/or less than 2%, where the charged state is at least 75% of a rated capacity of the secondary battery, and the discharged state is less than 25% of the rated capacity of the secondary battery.

Embodiment 402. The energy storage device according to any of Embodiments 396-401, formed according to a process according to any of Embodiments 261-396.

Embodiment 403. The method of any of Embodiments 260-395, comprising tensioning the sheets in the web feeding direction and the web width direction during removal of the subunits.

Embodiment 404. The method of any of Embodiments 260-395 and 403, wherein removal of the subunits is repeated to form the stacking population having a plurality of unit cells.

Embodiment 405. The method of any of Embodiments 260-395 and 403-404, wherein the stacked population comprises a stacked sheet configuration, and wherein the subunits from each of the negative electrode sheet, positive electrode sheet, and separator layer sheet, are simultaneously removed.

Embodiment 406. The method of any of Embodiments 260-395 and 403-405, wherein following removal of one or more subunits the sheet is moved in the feeding direction to provide for removal of subsequent one or more subunits.

Embodiment 407. The method of any of Embodiments 260-395 and 403-406, wherein a stacking station comprise one or more alignment pins configured to receive the one or more subunits removed from the sheets at a separation station.

Embodiment 408. The method of any of Embodiments 260-395 and 403-407, wherein the stacking station is configured to receive the one or more subunits at a stacking position in the sheet feeding direction and sheet width direction that coincident with a separation position where the one or more subunits are separated from the one or more sheets at the separation station.

Embodiment 409. The method of any of Embodiments 260-395 and 403-408, wherein the stacking station receives the one or more subunits at a plurality of positions in the sheet feeding direction and/or sheet width direction that correspond to a plurality of separation positions along the sheet feeding direction and/or sheet width direction.

Embodiment 410. The method of any of Embodiments 260-395 and 403-409, wherein the stacking station is configured to maintain that portion of the stacked population that is stacked thereon in tension in the web width direction.

Embodiment 411. The method of any of Embodiments 260-395 and 403-410, wherein the negative electrode sheets, the positive electrode sheets, and/or separator sheets are pre-patterned with the weakened regions prior to removal of the subunits.

Embodiment 412. A secondary battery for cycling between a charged and a discharged state, the secondary battery comprising a battery enclosure, an electrode assembly, and lithium ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, wherein a ratio of the maximum length $L_{EA}$ and the maximum width $W_{EA}$ to the maximum height $H_{EA}$ is at least 2:1

(b) the electrode assembly comprises a series of layers stacked in a stacking direction that parallels the longitudinal axis within the electrode assembly wherein the stacked series of layers comprises a population of negative electrode active material layers, a population of negative electrode current collector layers, a population of separator material layers, a population of positive electrode active material layers, and a population of positive electrode current collector material layers, wherein (i) each member of the population of negative electrode active material layers has a length $L_E$ that corresponds to the Feret diameter of the negative electrode active material layer as measured in the transverse direction between first and second opposing transverse end surfaces of the negative electrode active material layer, and a height $H_E$ that corresponds to the Feret diameter of the negative electrode active material layer as measured in the vertical direction between first and second opposing vertical end surfaces of the negative electrode active material layer, and a width $W_E$ that corresponds to the Feret diameter of the negative electrode active material layer as measured in the longitudinal direction between first and second opposing surfaces of the negative electrode active material layer, wherein a ratio of $L_E$ to $H_E$ and $W_E$ is at least 5:1;

(ii) each member of the population of positive electrode active material layers has a length $L_C$ that corresponds to the Feret diameter of the positive electrode active material layer as measured in the transverse direction between first and second opposing transverse end surfaces of the positive electrode active material layer, and a height $H_C$ that corresponds to the Feret diameter of the positive electrode active material layer as measured in the vertical direction between first and second opposing vertical end surfaces of the positive electrode active material layer, and a width $W_C$ that corresponds to the Feret diameter of the positive electrode active material layer as measured in the longitudinal direction between first and second opposing surfaces of the positive electrode active material layer, wherein a ratio of $L_C$ to $H_C$ and $W_C$ is at least 5:1

(iii) members of the negative electrode active material layer population comprise a particulate material having at least 60 wt % of negative electrode active material, less than 20 wt % conductive aid, and binder material, and where the negative electrode active material comprises a silicon-containing material, (c) the set of electrode constraints comprises a primary constraint system and a secondary constraint system wherein (i) the primary constraint system comprises first and second growth constraints and at least one primary connecting member, the first and second primary growth constraints separated from each other in the longitudinal direction, and the at least one primary connecting member connecting the first and second primary growth constraints to at least partially restrain growth of the electrode assembly in the longitudinal direction, and (ii) the secondary constraint system comprises first and second secondary growth constraints separated in a second direction and connected by members of the stacked series of layers wherein the secondary constraint system at least partially restrains growth of the electrode assembly in the second direction upon cycling of the secondary battery, the second direction being orthogonal to the longitudinal direction, and, (iii) the primary constraint system maintains a pressure on the electrode assembly in the stacking direction that exceeds the pressure maintained on the electrode assembly in each of two directions that are mutually perpendicular and perpendicular to the stacking direction, and (d) the electrode assembly comprises a population of unit cells, wherein each unit cell comprises a unit cell portion of a first member of the electrode current collector layer population, a member of the separator population that is ionically permeable to the carrier ions, a first member of the electrode active material layer population, a unit cell portion of first member of the counter-electrode current collector population and a first member of the counter-electrode active material layer population, wherein (aa) the first member of the electrode active material layer population is proximate a first side of the separator and the first member of the counter-electrode material layer population is proximate an opposing second side of the separator, (bb) the separator electrically isolates the first member of the electrode active material layer population from the first member of the counter-electrode active material layer population and carrier ions are primarily exchanged between the first member of the electrode active material layer population and the first member of the counter-electrode active material layer population via the separator of each such unit cell during cycling of the battery between the charged and discharged state, and (cc) within each unit cell, a. the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vertical end surface plot, $E_{VP1}$, a 2D map of the median vertical position of the first opposing vertical end surface of the counter-electrode active material layer in the X-Z plane, along the length $L_C$ of the counter-electrode active material layer, traces a first vertical end surface plot, $CE_{VP1}$, wherein for at least 60% of the length $L_C$ of the first counter-electrode active material layer (i) the absolute value of a separation distance, $S_{Z1}$, between the plots $E_{VP1}$ and $CE_{VP1}$ measured in the vertical direction is 1000 μm≥$|S_{Z1}|$≥5 μm, and (ii) as between the first vertical end surfaces of the electrode and counter-electrode active material layers, the first vertical end surface of the counter-electrode active material layer is inwardly disposed with respect to the first vertical end surface of the electrode active material layer, b. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, $E_{VP2}$, a 2D map of the median vertical position of the second opposing vertical end surface of the counter-electrode active material layer in the X-Z plane, along the length $L_C$ of the counter-electrode active material layer, traces a second vertical end surface plot, $CE_{VP2}$, wherein for at least 60% of the length $L_C$ of the counter-electrode active material layer (i) the absolute value of a separation distance, $S_{Z2}$, between the plots $E_{VP2}$ and $CE_{VP2}$ as measured in the vertical direction is 1000 μm≥$|S_{Z2}|$≥5 μm, and (ii) as between the second vertical end surfaces of the electrode and counter-electrode active material layers, the second vertical end surface of the counter-electrode active material layer is inwardly disposed with respect to the second vertical end surface of the electrode active material layer.

Embodiment 413. The secondary battery according to Embodiment 412, wherein the stacked series of layers comprises layers with opposing end surfaces that are spaced apart from one another in the transverse direction, wherein a plurality of the opposing end surfaces of the layers exhibit plastic deformation and fracturing oriented in the transverse direction, due to elongation and narrowing of the layers at the opposing end surfaces.

Embodiment 414. The secondary battery according to any of Embodiments 412-413, wherein within each unit cell, c. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, wherein for at least 60% of the height $H_C$ of the counter electrode active material layer (i) the absolute value of a separation distance, $S_{X1}$, between the plots $E_{TP1}$ and $CE_{TP1}$ measured in the transverse direction is 1000 μm≥|$S_{X1}$|≥5 μm, and (ii) as between the first transverse end surfaces of the electrode and counter-electrode active material layers, the first transverse end surface of the counter-electrode active material layer is inwardly disposed with respect to the first transverse end surface of the electrode active material layer, and d. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, wherein for at least 60% of the height $H_C$ of the counter-electrode active material layer (i) the absolute value of a separation distance, $S_{X2}$, between the plots $E_{TP2}$ and $CE_{TP2}$ measured in the transverse direction is 1000 μm≥|$S_{X2}$|≥5 μm, and (ii) as between the second transverse end surfaces of the electrode and counter-electrode active material layers, the second transverse end surface of the counter-electrode active material layer is inwardly disposed with respect to the second transverse end surface of the electrode active material layer.

Embodiment 415. A secondary battery for cycling between a charged and a discharged state, the secondary battery comprising a battery enclosure, an electrode assembly, and carrier ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, wherein the maximum length $L_{EA}$ and/or maximum width $W_{EA}$ is greater than the maximum height $H_{EA}$, (b) the electrode assembly comprises a series of layers stacked in a stacking direction that parallels the longitudinal axis within the electrode assembly wherein the stacked series of layers comprises a population of negative electrode active material layers, a population of negative electrode current collector layers, a population of separator material layers, a population of positive electrode active material layers, and a population of positive electrode current collector material layers, wherein (i) each member of the population of negative electrode active material layers has a length $L_E$ that corresponds to the Feret diameter of the negative electrode active material layer as measured in the transverse direction between first and second opposing transverse end surfaces of the negative electrode active material layer, and a height $H_E$ that corresponds to the Feret diameter of the negative electrode active material layer as measured in the vertical direction between first and second opposing vertical end surfaces of the negative electrode active material layer, and a width $W_E$ that corresponds to the Feret diameter of the negative electrode active material layer as measured in the longitudinal direction between first and second opposing surfaces of the negative electrode active material layer, wherein a ratio of $L_E$ to $H_E$ and $W_E$ is at least 5:1;

(ii) each member of the population of positive electrode material layers has a length $L_C$ that corresponds to the Feret diameter of the positive electrode active material layer as measured in the transverse direction between first and second opposing transverse end surfaces of the positive electrode active material layer, and a height $H_C$ that corresponds to the Feret diameter of the positive electrode active material layer as measured in the vertical direction between first and second opposing vertical end surfaces of the positive electrode active material layer, and a width $W_C$ that corresponds to the Feret diameter of the positive electrode active material layer as measured in the longitudinal direction between first and second opposing surfaces of the positive electrode active material layer, wherein a ratio of $L_C$ to $H_C$ and $W_C$ is at least 5:1

(iii) members of the negative electrode active material layer population comprise a particulate material having at least 60 wt % of negative electrode active material, less than 20 wt % conductive aid, and binder material, (c) the set of electrode constraints comprises a primary constraint system and a secondary constraint system wherein (i) the primary constraint system comprises first and second growth constraints and at least one primary connecting member, the first and second primary growth constraints separated from each other in the longitudinal direction, and the at least one primary connecting member connecting the first and second primary growth constraints to at least partially restrain growth of the electrode assembly in the longitudinal direction, and (ii) the secondary constraint system comprises first and second secondary growth constraints separated in a second direction and connected by members of the stacked series of layers wherein the secondary constraint system at least partially restrains growth of the electrode assembly in the second direction upon cycling of the secondary battery, the second direction being orthogonal to the longitudinal direction, and (iii) the primary constraint system maintains a pressure on the electrode assembly in the stacking direction that exceeds the pressure maintained on the electrode assembly in each of two directions that are mutually perpendicular and perpendicular to the stacking direction, and (d) the stacked series of layers comprises layers with opposing end surfaces that are spaced apart from one another in the transverse direction, wherein a plurality of the opposing end surfaces of the layers exhibit plastic deformation and fracturing oriented in the transverse direction, due to elongation and narrowing of the layers at the opposing end surfaces.

Embodiment 416. The secondary battery according to Embodiment 415, wherein the electrode assembly comprises a population of unit cells, wherein each unit cell comprises a unit cell portion of a first member of the electrode current collector layer population, a member of the separator population that is ionically permeable to the carrier ions, a first member of the electrode active material layer population, a unit cell portion of first member of the counter-electrode current collector population and a first member of the counter-electrode active material layer population, wherein (aa) the first member of the electrode active material layer population is proximate a first side of the separator and the first member of the counter-electrode material layer population is proximate an opposing second side of the separator, (bb) the separator electrically isolates the first member of the electrode active material layer population from the first member of the counter-electrode active material layer population and carrier ions are primarily exchanged between the first member of the electrode active material layer population and the first member of the counter-electrode active material layer population via the separator of each such unit cell during cycling of the battery between the charged and discharged state, and (cc) within each unit cell, a. the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vertical end surface plot, $E_{VP1}$, a 2D map of the median vertical position of the first opposing vertical end surface of the counter-electrode active material layer in the X-Z plane, along the length $L_C$ of the counter-electrode active material layer, traces a first vertical end surface plot, $CE_{VP1}$, wherein for at least 60% of the length $L_C$ of the first counter-electrode active material layer (i) the absolute value of a separation distance, $S_{Z1}$, between the plots $E_{VP1}$ and $CE_{VP1}$ measured in the vertical direction is $1000\ \mu m \geq |S_{Z1}| \geq 5\ \mu m$, and (ii) as between the first vertical end surfaces of the electrode and counter-electrode active material layers, the first vertical end surface of the counter-electrode active material layer is inwardly disposed with respect to the first vertical end surface of the electrode active material layer, b. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, $E_{VP2}$, a 2D map of the median vertical position of the second opposing vertical end surface of the counter-electrode active material layer in the X-Z plane, along the length $L_C$ of the counter-electrode active material layer, traces a second vertical end surface plot, $CE_{VP2}$, wherein for at least 60% of the length $L_C$ of the counter-electrode active material layer (i) the absolute value of a separation distance, $S_{Z2}$, between the plots $E_{VP2}$ and $CE_{VP2}$ as measured in the vertical direction is $1000\ \mu m \geq |S_{Z2}| \geq 5\ \mu m$, and (ii) as between the second vertical end surfaces of the electrode and counter-electrode active material layers, the second vertical end surface of the counter-electrode active material layer is inwardly disposed with respect to the second vertical end surface of the electrode active material layer.

Embodiment 417. The secondary battery according to any of Embodiments 415-416, wherein the electrode assembly comprises a population of unit cells, wherein each unit cell comprises a unit cell portion of a first member of the electrode current collector layer population, a member of the separator population that is ionically permeable to the carrier ions, a first member of the electrode active material layer population, a unit cell portion of first member of the counter-electrode current collector population and a first member of the counter-electrode active material layer population, wherein (aa) the first member of the electrode active material layer population is proximate a first side of the separator and the first member of the counter-electrode material layer population is proximate an opposing second side of the separator, (bb) the separator electrically isolates the first member of the electrode active material layer population from the first member of the counter-electrode active material layer population and carrier ions are primarily exchanged between the first member of the electrode active material layer population and the first member of the counter-electrode active material layer population via the separator of each such unit cell during cycling of the battery between the charged and discharged state, and (cc) within each unit cell, c. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, wherein for at least 60% of the height $H_C$ of the counter electrode active material layer (i) the absolute value of a separation distance, $S_{X1}$, between the plots $E_{TP1}$ and $CE_{TP1}$ measured in the transverse direction is $1000\ \mu m \geq |S_{X1}| \geq 5\ \mu m$, and (ii) as between the first transverse end surfaces of the electrode and counter-electrode active material layers, the first transverse end surface of the counter-electrode active material layer is inwardly disposed with respect to the first transverse end surface of the electrode active material layer, and d. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, wherein for at least 60% of the height $H_C$ of the counter-electrode active material layer (i) the absolute value of a separation distance, $S_{X2}$, between the plots $E_{TP2}$ and $CE_{TP2}$ measured in the transverse direction is $1000\ \mu m \geq |S_{X2}| \geq 5\ \mu m$, and (ii) as between the second transverse end surfaces of the electrode and counter-electrode active material layers, the second transverse end surface of the counter-electrode active material layer is inwardly disposed with respect to the second transverse end surface of the electrode active material layer.

Embodiment 418. A secondary battery for cycling between a charged and a discharged state, the secondary battery comprising a battery enclosure, an electrode assembly, and lithium ions within the battery enclosure, and a set of electrode constraints, wherein (a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, wherein a ratio of the maximum length $L_{EA}$ and the maximum width $W_{EA}$ to the maximum height $H_{EA}$ is at least 2:1

(b) the electrode assembly comprises a series of layers stacked in a stacking direction that parallels the longitudinal axis within the electrode assembly wherein the stacked series of layers comprises a population of negative electrode active material layers, a population of negative electrode current collector layers, a population of separator material layers, a population of positive electrode active material layers, and a population of positive electrode current collector material layers, wherein (i) each member of the population of negative electrode active material layers has a length $L_E$ that corresponds to the Feret diameter of the negative electrode active material layer as measured in the transverse direction between first and second opposing transverse end surfaces of the negative electrode active material layer, and a height $H_E$ that corresponds to the Feret diameter of the negative electrode active material layer as measured in the vertical direction between first and second opposing vertical end surfaces of the negative electrode active material layer, and a width $W_E$ that corresponds to the Feret diameter of the negative electrode active material layer as measured in the longitudinal direction between first and second opposing surfaces of the negative electrode active material layer, wherein a ratio of $L_E$ to $H_E$ and $W_E$ is at least 5:1;

(ii) each member of the population of positive electrode active material layers has a length $L_C$ that corresponds to the Feret diameter of the positive electrode active material layer as measured in the transverse direction between first and second opposing transverse end surfaces of the positive electrode active material layer, and a height $H_C$ that corresponds to the Feret diameter of the positive electrode active material layer as measured in the vertical direction between first and second opposing vertical end surfaces of the positive electrode active material layer, and a width $W_C$ that corresponds to the Feret diameter of the positive electrode active material layer as measured in the longitudinal direction between first and second opposing surfaces of the positive electrode active material layer, wherein a ratio of $L_C$ to $H_C$ and $W_C$ is at least 5:1

(iii) members of the negative electrode active material layer population comprise a particulate material having at least 60 wt % of negative electrode active material, less than 20 wt % conductive aid, and binder material, and where the negative electrode active material comprises a silicon-containing material, (c) the set of electrode constraints comprises a primary constraint system and a secondary constraint system wherein (i) the primary constraint system comprises first and second growth constraints and at least one primary connecting member, the first and second primary growth constraints separated from each other in the longitudinal direction, and the at least one primary connecting member connecting the first and second primary growth constraints to at least partially restrain growth of the electrode assembly in the longitudinal direction, and (ii) the secondary constraint system comprises first and second secondary growth constraints separated in a second direction and connected by members of the stacked series of layers wherein the secondary constraint system at least partially restrains growth of the electrode assembly in the second direction upon cycling of the secondary battery, the second direction being orthogonal to the longitudinal direction, and, (iii) the primary constraint system maintains a pressure on the electrode assembly in the stacking direction that exceeds the pressure maintained on the electrode assembly in each of two directions that are mutually perpendicular and perpendicular to the stacking direction, and (d) the electrode assembly comprises a population of unit cells, wherein each unit cell comprises a unit cell portion of a first member of the electrode current collector layer population, a member of the separator population that is ionically permeable to the carrier ions, a first member of the electrode active material layer population, a unit cell portion of first member of the counter-electrode current collector population and a first member of the counter-electrode active material layer population, wherein (aa) the first member of the electrode active material layer population is proximate a first side of the separator and the first member of the counter-electrode material layer population is proximate an opposing second side of the separator, (bb) the separator electrically isolates the first member of the electrode active material layer population from the first member of the counter-electrode active material layer population and carrier ions are primarily exchanged between the first member of the electrode active material layer population and the first member of the counter-electrode active material layer population via the separator of each such unit cell during cycling of the battery between the charged and discharged state, and (cc) within each unit cell, c. the first transverse end surfaces of the electrode and counter-electrode active material layers are on the same side of the electrode assembly, a 2D map of the median transverse position of the first opposing transverse end surface of the electrode active material layer in the X-Z plane, along the height $H_E$ of the electrode active material layer, traces a first transverse end surface plot, $E_{TP1}$, a 2D map of the median transverse position of the first opposing transverse end surface of the counter-electrode in the X-Z plane, along the height $H_C$ of the counter-electrode active material layer, traces a first transverse end surface plot, $CE_{TP1}$, wherein for at least 60% of the height $H_C$ of the counter electrode active material layer (i) the absolute value of a separation distance, $S_{X1}$, between the plots $E_{TP1}$ and $CE_{TP1}$ measured in the transverse direction is 1000 $\mu m \geq |S_{X1}| \geq 5$ $\mu m$, and (ii) as between the first transverse end surfaces of the electrode and counter-electrode active material layers, the first transverse end surface of the counter-electrode active material layer is inwardly disposed with respect to the first transverse end surface of the electrode active material layer, and d. the second transverse end surfaces of the electrode and counter-electrode active material layers are on the same side of the electrode assembly, and oppose the first transverse end surfaces of the electrode and counter-electrode active material layers, respectively, a 2D map of the median transverse position of the second opposing transverse end surface of the electrode active material layer in the X-Z plane, along the height $H_E$ of the electrode active material layer, traces a second transverse end surface plot, $E_{TP2}$, a 2D map of the median transverse position of the second opposing transverse end surface of the counter-electrode in the X-Z plane, along the height $H_C$ of the counter-electrode active material layer, traces a second transverse end surface plot, $CE_{TP2}$, wherein for at least 60% of the height $H_C$ of the counter-electrode active material layer (i) the absolute value of a separation distance, $S_{X2}$, between the plots $E_{TP2}$ and $CE_{TP2}$ measured in the transverse direction is 1000 $\mu m \geq |S_{X2}| \geq 5$ $\mu m$, and (ii) as between the second transverse end surfaces of the electrode and counter-electrode active material layers, the second transverse end surface of the counter-electrode active material layer is inwardly disposed with respect to the second transverse end surface of the electrode active material layer.

Embodiment 419. The secondary battery according to Embodiment 418, wherein the stacked series of layers comprises layers with opposing end surfaces that are spaced apart from one another in the transverse direction, wherein a plurality of the opposing end surfaces of the layers exhibit plastic deformation and fracturing oriented in the transverse direction, due to elongation and narrowing of the layers at the opposing end surfaces.

Embodiment 420. The secondary battery of any of Embodiments 418-419, wherein, within each unit cell, a. the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vertical end surface plot, $E_{VP1}$, a 2D map of the median vertical position of the first opposing vertical end surface of the counter-electrode active material layer in the X-Z plane, along the length $L_C$ of the counter-electrode active material layer, traces a first vertical end surface plot, $CE_{VP1}$, wherein for at least 60% of the length $L_C$ of the first counter-electrode active material layer (i) the absolute value of a separation distance, $S_{Z1}$, between the plots $E_{VP1}$ and $CE_{VP1}$ measured in the vertical direction is 1000 $\mu m \geq |S_{Z1}| \geq 5$ $\mu m$, and (ii) as between the first vertical end surfaces of the electrode and counter-electrode active material layers, the first vertical end surface of the counter-electrode active material layer is inwardly disposed with respect to the first vertical end surface of the electrode active material layer, b. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, $E_{VP2}$, a 2D map of the median vertical position of the second opposing vertical end surface of the counter-electrode active material layer in the X-Z plane, along the length $L_C$ of the counter-electrode active material layer, traces a second vertical end surface plot, $CE_{VP2}$, wherein for at least 60% of the length $L_C$ of the counter-electrode active material layer (i) the absolute value of a separation distance, $S_{Z2}$, between the plots $E_{VP2}$ and $CE_{VP2}$ as measured in the vertical direction is 1000 $\mu m \geq |S_{Z2}| \geq 5$ $\mu m$, and (ii) as between the second vertical end surfaces of the electrode and counter-electrode active material layers, the second vertical end surface of the counter-electrode active material layer is inwardly disposed with respect to the second vertical end surface of the electrode active material layer.

Embodiment 421. The secondary battery of any of Embodiments 412-420, wherein members of the negative electrode active material layer population comprise a particulate material having at least 80 wt % of negative electrode active material.

Embodiment 422. The secondary battery of any of Embodiments 412-421, wherein members of the negative electrode active material layer population comprise a particulate material having at least 90 wt % of negative electrode active material.

Embodiment 423. The secondary battery of any of Embodiments 412-422, wherein members of the negative electrode active material layer population comprise a particulate material having at least 95 wt % of negative electrode active material.

Embodiment 424. The secondary battery of any of Embodiments 412-423, wherein the electrode active material comprising the silicon-containing material comprises at least one of silicon, silicon oxide, and mixtures thereof.

Embodiment 425. The secondary battery of any of Embodiments 412-424, wherein members of the negative electrode active material layer population comprise less than 10 wt % conductive aid.

Embodiment 426. The secondary battery of any of Embodiments 412-425, wherein members of the negative electrode active material layer population comprise conductive aid comprising at least one of copper, nickel and carbon.

Embodiment 427. The secondary battery of any of Embodiments 412-426, wherein members of the positive electrode active material layer population comprise a transition metal oxide material containing lithium and at least one of cobalt and nickel.

Embodiment 428. The secondary battery of any of Embodiments 412-427, wherein the first and second secondary growth constraints separated in the second direction are connected to each other by members of the stacked series of layers comprising members of the population of negative electrode current collector layers.

Embodiment 429. The secondary battery of any of Embodiments 412-428, wherein the first and second secondary growth constraints separated in the second direction are connected to each other by members of the stacked series of layers comprising members of the population of negative electrode current collector layers, and wherein the negative electrode current collector layers comprise negative electrode backbone layers.

Embodiment 430. The secondary battery of any of Embodiments 412-429, wherein the first and second secondary growth constraints separated in the second direction are connected to each other by members of the stacked series of layers comprising members of the population of negative electrode current collector layers, and wherein for each member of the population of negative electrode current collector layers, the negative electrode current collector layer member has a member of the population of negative electrode active material layers disposed on a surface thereof.

Embodiment 431. The secondary battery of any of Embodiments 412-430, wherein the first and second secondary growth constraints separated in the second direction are connected to each other by members of the stacked series of layers comprising members of the population of negative electrode current collector layers, and wherein members of the population of negative electrode current collector layers comprise members of the population of negative electrode active material layers disposed on both opposing surfaces thereof in the stacked series of layers.

Embodiment 432. The secondary battery of any of Embodiments 412-431, wherein members of the population of negative electrode currently collector layers comprise one or more of copper and stainless steel.

Embodiment 433. The secondary battery of any of Embodiments 412-432, wherein members of the population of negative electrode current collector layers comprise a thickness as measured in the stacking direction of less than 20 microns and at least 2 microns.

Embodiment 434. The secondary battery of any of Embodiments 412-433, wherein members of the population of negative electrode current collector layers comprise a thickness as measured in the stacking direction in a range of from 6 to 18 microns.

Embodiment 435. The secondary battery of any of Embodiments 412-434, wherein members of the population of negative electrode current collector layers comprise a thickness as measured in the stacking direction in a range of from 8 to 14 microns.

Embodiment 436. The secondary battery of any of Embodiments 412-435, wherein the first and second secondary growth constraints separated in the second direction are connected to each other by members of the stacked series of layers comprising members of the population of positive electrode current collector layers.

Embodiment 437. The secondary battery of any of any of Embodiments 412-436, wherein members of the positive electrode current collector layer comprise aluminum.

Embodiment 438. The secondary battery of any of Embodiments 412-437, wherein members of the positive electrode current collector layer comprise a thickness as measured in the stacking direction of less than 20 microns and at least 2 microns.

Embodiment 439. The secondary battery of any of Embodiments 412-438, wherein members of the positive electrode current collector layer comprise a thickness as measured in the stacking direction in a range of from 6 to 18 microns.

Embodiment 440. The secondary battery of any of Embodiments 412-439, wherein members of the positive electrode current collector layer comprise a thickness as measured in the stacking direction in a range of from 8 to 14 microns.

Embodiment 441. The secondary battery of any of Embodiments 412-440, wherein the first and second secondary growth constraints separated in the second direction are connected to each other by members of the stacked series of layers comprising members of the population of negative electrode active material layers.

Embodiment 442. The secondary battery of any of Embodiments 412-441, wherein the first and second secondary growth constraints separated in the second direction are connected to each other by members of the stacked series of layers comprising members of the population of positive electrode active material layers.

Embodiment 443. The secondary battery of any of Embodiments 412-442, wherein the first and second secondary growth constraints separated in the second direction are connected to each other by members of the stacked series of layers comprising members of the population of separator material layers.

Embodiment 444. The secondary battery of any of Embodiments 412-443, wherein the enclosure is hermetically sealed.

Embodiment 445. The secondary battery of any of Embodiments 412-444, wherein the set of constraints are within the battery enclosure.

Embodiment 446. The secondary battery of any of Embodiments 412-445, wherein the primary constraint system is within the battery enclosure.

Embodiment 447. The secondary battery of any of Embodiments 412-446, wherein the secondary constraint system is within the battery enclosure.

Embodiment 448. The secondary battery of any of Embodiments 412-447, further comprising a tertiary constraint system comprising first and second tertiary growth constraints and at least one tertiary connecting member, the first and second tertiary growth constraints separated from each other in a third direction orthogonal to the longitudinal and second directions, and the at least one tertiary connecting member connecting the first and second tertiary growth constraints to at least partially restrain growth of the electrode assembly in the tertiary direction.

Embodiment 449. The secondary battery of any of Embodiments 412-448, wherein the tertiary constraint system is within the battery enclosure.

Embodiment 450. The secondary battery of any of Embodiments 412-449, wherein the separator material layer comprises a polymer electrolyte, or comprises a microporous separator material that passes a liquid electrolyte therethrough.

Embodiment 451. The secondary battery of any of Embodiments 412-450, wherein the electrode active material comprises a compact of the silicon-containing particulate electrode active material.

Embodiment 452. The secondary battery of any of Embodiments 412-451, wherein the members of the population of negative electrode current collector layers comprise copper-containing layers, and wherein the stacked series of layers comprise the members of the population of negative electrode current collector layers in a stacked sequence with members of the population of negative electrode active material layers disposed on opposing sides of the negative electrode current collector layers.

Embodiment 453. The secondary battery of any of Embodiments 412-452, wherein members of the population of negative electrode active material layers comprise a compact of particulate silicon-containing material, and wherein the members are disposed on opposing sides of copper-containing negative electrode current collectors that form a negative electrode backbone.

Embodiment 454. The secondary battery of any of Embodiments 412-453, wherein members of the population of electrode active material layers comprising a height dimension $H_E$ that is at least 2.5 mm.

Embodiment 455. The secondary battery of any of Embodiments 412-454, wherein members of the population of electrode active material layers comprising a height dimension $H_E$ that is at least 3 mm.

Embodiment 456. The secondary battery of any of Embodiments 412-455, wherein the negative electrode current collectors have longitudinal opposing ends that are welded to a conductive busbar.

Embodiment 457. The secondary battery of any of Embodiments 412-456, wherein members of the population of positive electrode current collectors comprise aluminum-containing material.

Embodiment 458. The secondary battery of any of Embodiments 412-457, wherein the primary constraint system restrains growth of the electrode assembly in the longitudinal direction such that any increase in the Feret diameter of the electrode assembly in the longitudinal direction over 20 consecutive cycles of the secondary battery is less than 20%, where the charged state of the secondary battery is at least 75% of a rated capacity of the secondary battery, and the discharged state of the secondary battery is less than 25% of the rated capacity of the secondary battery.

Embodiment 459. The secondary battery of any of Embodiments 412-458, wherein the primary constraint array restrains growth of the electrode assembly in the longitudinal direction such that any increase in the Feret diameter of the electrode assembly in the longitudinal direction over 50 consecutive cycles of the secondary battery is less than 20%.

Embodiment 460. The secondary battery of any of claims of any of Embodiments 412-459, wherein the primary constraint array restrains growth of the electrode assembly in the longitudinal direction to less than 20% over 100 consecutive cycles of the secondary battery.

Embodiment 461. The secondary battery of any of Embodiments 412-460, wherein the primary constraint array restrains growth of the electrode assembly in the longitudinal direction such that any increase in the Feret diameter of the electrode assembly in the longitudinal direction over 10 consecutive cycles of the secondary battery is less than 10%.

Embodiment 462. The secondary battery of any of Embodiments 412-461, wherein the primary constraint array restrains growth of the electrode assembly in the longitudinal direction such that any increase in the Feret diameter of the electrode assembly in the longitudinal direction over 30 consecutive cycles of the secondary battery is less than 10%.

Embodiment 463. The secondary battery of any of Embodiments 412-462, wherein the primary constraint array restrains growth of the electrode assembly in the longitudinal direction such that any increase in the Feret diameter of the electrode assembly in the longitudinal direction over 80 consecutive cycles of the secondary battery is less than 10%.

Embodiment 464. The secondary battery of any of Embodiments 412-463, wherein the primary constraint array restrains growth of the electrode assembly in the longitudinal direction such that any increase in the Feret diameter of the electrode assembly in the longitudinal direction over 5 consecutive cycles of the secondary battery is less than 5%.

Embodiment 465. The secondary battery of any of Embodiments 412-464, wherein the primary constraint array restrains growth of the electrode assembly in the longitudinal direction such that any increase in the Feret diameter of the electrode assembly in the longitudinal direction over 20 consecutive cycles of the secondary battery is less than 5%.

Embodiment 466. The secondary battery of any of Embodiments 412-465, wherein the primary constraint array restrains growth of the electrode assembly in the longitudinal direction such that any increase in the Feret diameter of the electrode assembly in the longitudinal direction over 50 consecutive cycles of the secondary battery is less than 5%.

Embodiment 467. The secondary battery of any of Embodiments 412-466, wherein the primary constraint array restrains growth of the electrode assembly in the longitudinal direction such that any increase in the Feret diameter of the electrode assembly in the longitudinal direction per cycle of the secondary battery is less than 1%.

Embodiment 468. The secondary battery of any of Embodiments 412-467, wherein the secondary growth constraint system restrains growth of the electrode assembly in the second direction such that any increase in the Feret diameter of the electrode assembly in the second direction over 20 consecutive cycles upon repeated cycling of the secondary battery is less than 20%.

Embodiment 469. The secondary battery of any of Embodiments 412-468, wherein the secondary growth constraint system restrains growth of the electrode assembly in the second direction such that any increase in the Feret diameter of the electrode assembly in the second direction over 5 consecutive cycles of the secondary battery is less than 5%.

Embodiment 470. The secondary battery of any of Embodiments 412-469, wherein the secondary growth constraint system restrains growth of the electrode assembly in the second direction such that any increase in the Feret diameter of the electrode assembly in the second direction per cycle of the secondary battery is less than 1%.

Embodiment 471. The secondary battery of any of Embodiments 412-470, as fabricated by any of the methods of Embodiments 261-396 and 404-412.

Embodiment 472. A secondary battery comprising an enclosure, an electrode assembly, carrier ions within the battery enclosure, and a set of electrode constraints, wherein the electrode assembly comprises a series of layers stacked in a stacking direction to form a stacked population, the stacked population comprising a population of negative electrode layers, a population of positive electrode layers, a population of separator material layers, and a population of unit cells, wherein (i) each unit cell comprises a unit cell portion of a first member of the negative electrode layers, a member of the population of separator material layers that is ionically permeable to the carrier ions, and a unit cell portion of a first member of the positive electrode layers, wherein the negative electrode layer is proximate a first side of the separator material layer, and the positive electrode layer is proximate an opposing second sider of the separator material layer, and the separator electrically isolates the negative electrode layer from the positive electrode layer, and carrier ions are primarily exchanged between the first member of the negative electrode layers and the first member of the positive electrode layers via the separator material layer of each such unit cell during cycling of the battery between the charged and discharged state the set of electrode constraints comprises a primary constraint system and a secondary constraint system wherein (i) the primary constraint system comprises first and second growth constraints and at least one primary connecting member, the first and second primary growth constraints separated from each other in the stacking direction, and the at least one primary connecting member connecting the first and second primary growth constraints to at least partially restrain growth of the electrode assembly in the stacking direction, and (ii) the secondary constraint system comprises first and second secondary growth constraints separated in a second direction and connected by secondary connecting members comprising at least a portion of the negative electrode layers, wherein the secondary constraint system at least partially restrains growth of the electrode assembly in the second direction, the second direction being orthogonal to the stacking direction, and (iii) the primary constraint system maintains a pressure on the electrode assembly in the stacking direction that exceeds the pressure maintained on the electrode assembly in each of two directions that are mutually perpendicular and perpendicular to the stacking direction, each unit cell comprises a cell volume in that unit cell that is located bounded by a centerline of the negative electrode layer, the centerline comprising a reference plane that is located in a plane orthogonal to the stacking direction, and by a surface of the separator material layer that faces the negative electrode layer, as well as by the first and second secondary growth constraints that are connected to one another by the negative electrode layer, wherein the cell volume comprises a first region that is adjacent the separator surface, and a second region that is adjacent the centerline, and wherein the first region comprises at least 10% of the cell volume and has a void fraction greater than 85%, and the second region comprises at least 10% of the cell volume and has a void fraction of less than 60%.

Embodiment 473. The secondary battery according to Embodiment 472, wherein the cell volume comprises a third region between the first and second region, having a void fraction that is between that of the first and second regions.

Embodiment 474. The secondary battery according to any of Embodiments 472-473, wherein the negative electrode layer comprises a negative electrode current collector layer and a negative electrode active material layer disposed on at least one surface of the negative electrode current collector, and wherein the negative electrode current collector layer connects the first and second secondary growth constraints.

Embodiment 475. The secondary battery according to any of Embodiments 472-474, wherein the centerline coincides with the negative electrode current collector layer.

Embodiment 476. The secondary battery according to any of Embodiments 472-475, wherein a void fraction of the cell volume monotonically increases from the second region to the first region.

Embodiment 477. The secondary battery according to any of Embodiments 472-476, wherein the negative electrode layer comprises a layer of negative electrode active material, and wherein a density of the negative electrode active material decreases from the second region to the first region.

Embodiment 478. The secondary battery according to any of Embodiments 472-477, wherein the void fraction in the second region is less than 55%, less than 50%, less than 45%, less than 40%, and/or less than 35%.

Embodiment 479. The secondary battery according to any of Embodiments 472-478, wherein the void fraction in the first region is greater 90%, greater than 95%, greater than 98%, and/or greater than 99%.

Embodiment 480. The secondary battery according to according to any of Embodiments 472-479, wherein the negative electrode layer comprises a layer of negative electrode active material having a plurality of protrusions of the electrode active material that extend in the stacking direction towards the separator material layer.

Embodiment 481. The secondary battery according to any of Embodiments 472-480, wherein the plurality of protrusions are about a periphery of the electrode active material layer.

Embodiment 482. The secondary battery according to any of Embodiments 472-481, wherein the plurality of protrusions are positioned at different points across a surface of the electrode active material layer facing the separator material layer.

Embodiment 483. The secondary battery according to any of Embodiments 472-482, wherein the separator material layer comprises a plurality of protrusions that extend in the stacking direction towards the negative electrode layer.

Embodiment 484. The secondary battery according to any of Embodiments 472-483, wherein the plurality of protrusions are about a periphery of the electrode active material layer.

Embodiment 485. The secondary battery according to any of Embodiments 472-484, wherein the plurality of protrusions are positioned at different points across a surface of the separator material layer facing the electrode active material layer.

Embodiment 486. The secondary battery according to any of Embodiments 472-486, wherein one or more of the negative electrode layer and the separator material layer comprise a surface roughness that imparts the void fraction in the first region.

Embodiment 487. The secondary battery according to any of Embodiments 472-486, wherein a surface of the negative electrode layer and a surface of the separator material layer define a gap therebetween.

Embodiment 488. The secondary battery according to according to any of Embodiments 472-487, wherein the secondary battery is in a pre-formation state.

Embodiment 489. The secondary battery according to any of Embodiments 1-488, comprising a negative electrode layer comprising the electrode current collector and the electrode active material layer, and wherein each unit cell comprises a cell volume in that unit cell that is located bounded by a centerline of the negative electrode layer, the centerline comprising a reference plane that is located in a plane orthogonal to the stacking direction, and by a surface of the separator material layer that faces the negative electrode layer, as well as by the first and second secondary growth constraints that are connected to one another by the negative electrode layer, wherein the cell volume comprises a first region that is adjacent the separator surface, and a second region that is adjacent the centerline, and wherein the first region comprises at least 10% of the cell volume and has a void fraction greater than 85%, and the second region comprises at least 10% of the cell volume and has a void fraction of less than 60%.

Embodiment 490. A method for the preparation of an electrode assembly, the method comprising:

removing a population of negative electrode subunits from a negative electrode sheet, the negative electrode sheet comprising a negative electrode sheet edge margin and at least one negative electrode sheet weakened region that is internal to the negative electrode sheet edge margin, the at least one negative electrode sheet weakened region at least partially defining a boundary of the negative electrode subunit population within the negative electrode sheet, the negative electrode subunit of each member of the negative electrode subunit population having a negative electrode subunit centroid, removing a population of separator layer subunits from a separator sheet, the separator sheet comprising a separator sheet edge margin and at least one separator sheet weakened region that is internal to the separator sheet edge margin, the at least one separator sheet weakened region at least partially defining a boundary of the separator layer subunit population, each member of the separator layer subunit population having opposing surfaces, removing a population of positive electrode subunits from a positive electrode sheet, the positive electrode sheet comprising a positive electrode edge margin and at least one positive electrode sheet weakened region that is internal to the positive electrode sheet edge margin, the at last one positive electrode sheet weakened region at least partially defining a boundary of the positive electrode subunit population within the positive electrode sheet, the positive electrode subunit of each member of the positive electrode subunit population having a positive electrode subunit centroid, and stacking members of the negative electrode subunit population, the separator layer subunit population and the positive electrode subunit population in a stacking direction to form a stacked population of unit cells, each unit cell in the stacked population comprising at least a unit cell portion of the negative electrode subunit, the separator layer of a stacked member of the separator layer subunit population, and a unit cell portion of the positive electrode subunit, wherein (i) the negative electrode subunit and positive electrode subunit face opposing surfaces of the separator layer comprised by such stacked unit cell population member, and (ii) the separator layer comprised by such stacked unit cell population member is adapted to electrically isolate the portion of the negative electrode subunit and the portion of the positive electrode subunit comprised by such stacked unit cell while permitting an exchange of carrier ions between the negative electrode subunit and the positive electrode subunit comprised by such stacked unit cell, affixing a set of electrode constraints to the stacked population of unit cells, the set of electrode constraints comprising a primary constraint system and a secondary constraint system wherein (i) the primary constraint system comprises first and second growth constraints and at least one primary connecting member, the first and second primary growth constraints separated from each other in the stacking direction, and the at least one primary connecting member connecting the first and second primary growth constraints to at least partially restrain growth of the electrode assembly in the stacking direction, and (ii) the secondary constraint system comprises first and second secondary growth constraints separated in a second direction and connected by secondary connecting members comprising at least a portion of the negative electrode subunit, wherein the secondary constraint system at least partially restrains growth of the electrode assembly in the second direction, the second direction being orthogonal to the stacking direction, and (iii) the primary constraint system maintains a pressure on the electrode assembly in the stacking direction that exceeds the pressure maintained on the electrode assembly in each of two directions that are mutually perpendicular and perpendicular to the stacking direction, providing, for each member of the population of unit cells, a cell volume in that unit cell that is bounded by a centerline of the negative subunit, the centerline comprising a reference plane that is located in a plane orthogonal to the stacking direction, and by a surface of the separator material subunit that faces the negative electrode subunit, as well as by the first and second secondary growth constraints that are connected to one another by the negative electrode subunit, and wherein the cell volume comprises a first region that is adjacent the surface of the separator subunit, and a second region that is adjacent the centerline, and wherein the first region comprises at least 10% of the cell volume and has a void fraction greater than 85%, and the second region comprises at least 10% of the cell volume and has a void fraction of less than 60%.

Embodiment 491. The method according to Embodiment 490, the method further comprising:

removing a population of negative electrode subunits having protrusions on at least one surface thereof from the negative electrode sheet; and stacking members of the population negative electrode subunits in the stacked population of unit cells such that the protrusions are disposed between the negative electrode subunits and the separator layer subunits.

Embodiment 492. The method according to any of Embodiments 490-491, the method further comprising:

removing a population of negative electrode subunits having protrusions at opposing end margins thereof from the negative electrode sheet, stacking members of the population negative electrode subunits in the stacked population of unit cells such that the protrusions are disposed between the negative electrode subunits and the separator layer subunits.

Embodiment 493. The method according to any of Embodiments 490-493, the method further comprising:

removing a population of separator subunits having protrusions on at least one surface thereof from a separator sheet; and stacking members of the population negative electrode subunits in the stacked population of unit cells such that the protrusions are disposed between the negative electrode subunits and the separator layer subunits.

Embodiment 494. The method according to any of Embodiments 490-493, the method further comprising:

removing a population of spacer subunits from a spacer sheet, and stacking members of the population of spacer subunits in the stacked population of unit cells such that members of the population of spacer subunits are disposed between the negative electrode subunits and the separator layer subunits.

Embodiment 495. The method according to any of Embodiments 490-494, comprising providing a population of negative electrode subunits comprising protrusions formed on the surface of the negative electrode subunit opposing the separator layer subunit, the protrusions serving to space apart the surface of the negative electrode subunit from the surface of the separator layer subunit.

Embodiment 496. The method according to any of Embodiments 490-495, comprising providing a population of negative electrode subunits wherein the protrusions are formed of negative electrode active material.

Embodiment 497. The method according to any of Embodiments 490-496, comprising providing a separator layer subunit comprising one or more of protrusions or depressions in a surface thereof that server to space apart the surface of the negative electrode subunit from the separator layer subunit.

Embodiment 498. The method according to any of Embodiments 490-497, comprising providing a spacer unit comprising a sacrificial material, the sacrificial material being removable from the electrode assembly following stacking to form the stacked population.

Embodiment 499. The method according to any of Embodiments 490-498, as used to manufacture a secondary battery according to any of Embodiments 1-489.

Embodiment 500. The secondary battery and/or method according to any preceding embodiments, wherein the carrier ions comprise at least one of lithium, sodium, magnesium and potassium ions.

Embodiment 501. The secondary battery and/or method according to any preceding embodiments, wherein the negative electrode active material comprises any one of more of carbon materials, graphite, soft or hard carbons, metals, semi-metals, alloys, oxides, compounds capable of forming an alloy with lithium, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, lithium titanate, palladium, lithium metals, carbon, petroleum cokes, activated carbon, graphite, silcon compounds, silicon alloys, tin compounds, non-graphitizable carbon, graphite-based carbon, $Li_xFe_2O_3$ ($0 \leq x \leq 1$), $Li_xWO_2$($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0<x \leq 1$; $1 \leq y \leq 3$; $1 \leq z \leq 8$), a lithium alloy, a silicon-based alloy, a tin-based alloy; a metal oxide, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_{204}$, $Bi_2O_5$, a conductive polymer, polyacetylene, Li—Co—Ni-based material, crystalline graphite, natural graphite, synthetic graphite, amorphous carbon, Kish graphite, pyrolytic carbon, mesophase pitch-based carbon fibers, mesocarbon microbeads, mesophase pitches, graphitized carbon fiber, high-temperature sintered carbon, petroleum, coal tar pitch derived cokes, tin oxide, titanium nitrate, lithium metal film, an alloy of lithium and one or more types of metals selected from the group consisting of Na, K, Rb, Cs, Fr, Be, Mg, Ca, Sr, Ba, Ra, Al and Sn, a metal compound capable of alloying and/or intercalating with lithium selected from any of Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Sn alloy, an Al alloy, a metal oxide capable of doping and dedoping lithium ions, $SiO_v$ ($0<v<2$), $SnO_2$, vanadium oxide, lithium vanadium oxide, a composite including a metal compound and carbon material, a Si—C composite, a Sn—C composite, a transition metal oxide, $Li_4/3Ti_5/3O_4$, SnO, a carbonaceous material, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite, and a composition of the formula $Na_xSn_{y-z}M_z$ disposed between layers of the layered carbonaceous material, wherein M is Ti, K, Ge, P, or a combination thereof, and $0<x \leq 15$, $1 \leq y \leq 5$, and $0 \leq z \leq 1$, as well as oxides, alloys, nitrides, fluorides of any of the foregoing, and any combination of any of the foregoing.

Embodiment 502. The secondary battery and/or method according to any preceding embodiment, wherein the negative electrode active material comprises at least one of lithium metal, a lithium metal alloy, silicon, silicon alloy, silicon oxide, tin, tin alloy, tin oxide, and a carbon-containing material.

Embodiment 503. The secondary battery and/or method according to any preceding embodiment, wherein the negative electrode active material comprises at least one of silicon and silicon oxide.

Embodiment 504. The secondary battery and/or method according to any preceding embodiment, wherein the negative electrode active material comprises at least one of lithium and lithium metal alloy.

Embodiment 505. The secondary battery and/or method according to any preceding embodiment, wherein the negative electrode active material comprises a carbon-containing material.

Embodiment 506. The secondary battery and/or method according to any preceding embodiment, wherein the negative electrode active material layer comprises particulate material having at least 60 wt % negative electrode active material, and less than 20 wt % conductive aid.

Embodiment 507. The secondary battery and/or method according to any preceding embodiment, wherein the negative electrode active material layer comprises particulate material having at least 80 wt %, at least 90 wt %, and/or at least 95 wt % negative electrode active material.

Embodiment 508. The secondary battery and/or method according to any preceding embodiment, wherein the negative electrode active material layer comprises particulate material having at least 1 wt % conductive aid, and less than 10 wt % conductive aid.

Embodiment 509. The secondary battery and/or method according to any preceding embodiment, wherein the conductive aid comprises at least one of coper, nickel and carbon.

Embodiment 510. The secondary battery and/or method according to any preceding embodiment, wherein the positive electrode active material comprises at least one of transition metal oxides, transition metal sulfides, transition metal nitrides, lithium-transition metal oxides, lithium-transition metal sulfides, lithium-transition metal nitrides, including transition metal oxides, transition metal sulfides, and transition metal nitrides having metal elements having a d-shell or f-shell, and/or where the metal element is any selected from Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au, $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, lithium-containing compounds comprising metal oxides or metal phosphates, compounds comprising lithium, cobalt and oxygen (e.g., $LiCoO_2$), compounds comprising lithium, manganese and oxygen (e.g., $LiMn_2O_4$) compounds comprising lithium iron and phosphate (e.g., LiFePO), lithium manganese oxide, lithium cobalt oxide, lithium nickel oxide, lithium iron phosphate, lithium cobalt oxide ($LiCoO_2$), lithium nickel oxide ($LiNiO_2$), a substituted compound with one or more transition metals, lithium manganese oxide, $Li_{1+x}Mn_{2-x}O_4$ (where, x is 0 to 0.33), $LiMnO_3$, $LiMn_2O_3$, $LiMnO_2$, lithium copper oxide ($Li_2CuO_2$), vanadium oxide, $LiV_3O_8$, $LiFe_3O_4$, $V_2O_5$, $Cu_2V_2O_7$, Ni site-type lithium nickel oxide represented by the chemical formula of $LiNi_{1-x}M_xO_2$ (where, M=Co, Mn, Al, Cu, Fe, Mg, B or Ga, and x=0.01 to 0.3), lithium manganese complex oxide represented by the chemical formula of $LiMn_{2-x}M_xO_2$ (where, M=Co, Ni, Fe, Cr, Zn or Ta, and x=0.01 to 0.1), $Li_2Mn_3MO_8$ (where, M=Fe, Co, Ni, Cu or Zn), $LiMn_2O_4$ in which a portion of Li is substituted with alkaline earth metal ions, a disulfide compound, $Fe_2(MoO_4)_3$, a lithium metal phosphate having an olivine crystal structure of Formula 2: $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $-0.5 \leq a \leq +0.5$, $0 \leq x \leq 0.5$, and $0 \leq b \leq 0.1$, $LiFePO_4$, Li(Fe, Mn)$PO_4$, Li(Fe, Co)$PO_4$, Li(Fe, Ni)$PO_4$, $LiCoO_2$, $LiNiO_2$, $LiMnO_2$, $LiMn_2O_4$, $LiNi_{1-y}CO_yO_2$, $LiCo_{1-y}Mn_yO_2$, $LiNi_{1-y}Mn_yO_2$ ($0 \leq y \leq 1$), $Li(Ni_aCo_bMn_c)O_4$($0<a<2$, $0<b<2$, $0<c<2$, and $a+b+c=2$), $LiMn_{2-z}Ni_zO_4$, $LiMn_{2-z}CO_zO_4$ ($0<z<2$), $LiCoPO_4$ and $LiFePO_4$, elemental sulfur ($S_8$), sulfur series compounds, $Li_2S_n$ ($n \geq 1$), an organosulfur compound, a carbon-sulfur polymer ($(C_2S_x)_n$: x=2.5 to 50, $n \geq 2$), an oxide of lithium and zirconium, a composite oxide of lithium and metal (cobalt, manganese, nickel, or a combination thereof), $Li_aA_{1-b}M_bD_2$ (wherein, $0.90 \leq a \leq 1$, and $0 \leq b \leq 0.5$), $Li_aE_{1-b}M_bO_{2-c}D_c$ (wherein, $0.90 \leq a \leq 1$, $0 \leq b \leq 0.5$, and $0 \leq c \leq 0.05$), $LiE_{2-b}M_bO_{4-c}D_c$ (wherein, $0 \leq b \leq 0.5$, and $0 \leq c \leq 0.05$), $Li_aNi_{1-b-c}CO_bM_cD_a$ (wherein, $0.90 \leq a \leq 1$, $0 \leq b \leq 0.5$, $0 \leq c \leq 0.05$, and $0<a \leq 2$), $Li_aNi_{1-b-c}CO_bM_cO_{2-a}X_a$ (wherein, $0.90 \leq a \leq 1$, $0 \leq b \leq 0.5$, $0 \leq c \leq 0.05$, and $0<a<2$), $Li_aNi_{1-b-c}CO_bM_cO_{2-a}X_2$ (wherein, $0.90 \leq a \leq 1$, $0 \leq b \leq 0.5$, $0 \leq c \leq 0.05$, and $0<a<2$), $Li_aNi_{1-b-c}Mn_bM_cD_a$ (wherein, $0.90 \leq a \leq 1$, $0 \leq b \leq 0.5$, $0 \leq c \leq 0.05$, and $0<a \leq 2$), $Li_aNi_{1-b-c}Mn_bM_cO_{2-a}X_a$ (wherein, $0.90 \leq a \leq 1$, $0 \leq b \leq 0.5$, $0 \leq c \leq 0.05$, and $0<a<2$), $Li_aNi_{1-b-c}Mn_bM_cO_{2-a}X_2$ (wherein, $0.90 \leq a \leq 1$, $0 \leq b \leq 0.5$, $0 \leq c \leq 0.05$, and $0<a<2$), $Li_aNi_bE_cG_dO_2$ (wherein, $0.90 \leq a \leq 1$, $0 \leq b \leq 0.9$, $0 \leq c \leq 0.5$, and $0.001 \leq d \leq 0.1$), $Li_aNi_bCo_cMn_dGeO_2$ (wherein, $0.90 \leq a \leq 1$, $0 \leq b \leq 0.9$, $0 \leq c \leq 0.5$, $0 \leq d \leq 0.5$, and $0.001 \leq e \leq 0.1$), $Li_aNiG_bO_2$ (wherein, $0.90 \leq a \leq 1$ and $0.001 \leq b \leq 0.1$), $Li_aCoG_bO_2$ (wherein, $0.90 \leq a \leq 1$ and $0.001 \leq b \leq 0.1$), $Li_aMnG_bO_2$ (wherein, $0.90 \leq a \leq 1$ and $0.001 \leq b \leq 0.1$), $Li_aMn_2G_bO_4$ (wherein, $0.90 \leq a \leq 1$ and $0.001 \leq b \leq 0.1$), $QO_2$, $QS_2$, $LiQS_2$, $V_2O_5$, $LiV_2O_5$, $LiX'O_2$, $LiNiVO_4$, $Li_{(3-f)}J_2(PO_4)_3$ ($0 \leq f \leq 2$); $Li_{(3-f)}Fe_2(PO_4)_3$ ($0 \leq f \leq 2$), $LiFePO_4$. (A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof), $LiCoO_2$, $LiMn_xO_{2x}$ (x=1 or 2), $LiNi_{1-x}Mn_xO_{2x}$ ($0<x<1$), $LiNi_{1-x-y}Co_xMn_yO_2$ ($0 \leq x \leq 0.5$, $0 \leq y \leq 0.5$), $FePO_4$, a lithium compound, lithium cobalt oxide, lithium nickel oxide, lithium nickel cobalt oxide, lithium nickel cobalt aluminum oxide, lithium nickel cobalt manganese oxide, lithium manganese oxide, lithium iron phosphate, nickel sulfide, copper sulfide, sulfur, iron oxide, vanadium oxide, a sodium containing material, an oxide of the formula $NaM^1_aO_2$ (wherein $M^1$ is at least one transition metal element, and $O \leq a<1$), $NaFeO_2$, $NaMnO_2$, $NaNiO_2$, $NaCoO_2$, an oxide represented by the formula $NaMn_{1-a}M^1_aO_2$ (wherein $M^1$ is at least one transition metal element, and $0 \leq a<1$), $Na[Ni_{1/2}Mn_{1/2}]O_2$, $Na_{2/3}[Fe_{1/2}Mn_{1/2}]O_2$, an oxide represented by $Na_{0.44}Mn_{1-a}M^1_aO_2$ (wherein $M^1$ is at least one transition metal element, and $0 \leq a<1$), an oxide represented by $Na_{0.7}Mn_{1-a}M^1_aO_{2.05}$ an (wherein $M^1$ is at least one transition metal element, and $0 \leq a<1$) an oxide represented by $Na_bM^2_cSi_{12}O_{30}$ (wherein $M^2$ is at least one transition metal element, $2 \leq b \leq 6$, and $2 \leq c \leq 5$), $Na_6Fe_2Si_{12}O_{30}$, $Na_2Fe_5Si_{12}O$ (wherein $M^2$ is at least one transition metal element, $2 \leq b \leq 6$, and $2 \leq c \leq 5$), an oxide represented by $Na_dM^3_eSi_6O_{18}$ (wherein $M^3$ is at least one transition metal element, $3 \leq d \leq 6$, and $1 \leq e \leq 2$), $Na_2Fe_2Si_6O_{18}$, $Na_2MnFeSi_6O_{18}$ (wherein $M^3$ is at least one transition metal element, $3 \leq d \leq 6$, and $1 \leq e \leq 2$), an oxide represented by $Na_fM^4_gSi_2O_6$ (wherein $M^4$ is at least one element selected from transition metal elements, magnesium (Mg) and aluminum (Al), $1 \leq f \leq 2$ and $1 \leq g \leq 2$), a phosphate, $Na_2FeSiO_6$, $NaFePO_4$, $Na_3Fe_2(PO_4)_3$, $Na_3V_2(PO_4)_3$, $Na_4CO_3(PO_4)_2P_2O_7$, a borate, $NaFeBO_4$ or $Na_3Fe_2(BO_4)_3$, a fluoride, $Na_hM^5F_6$ (wherein $M^5$ is at least one transition metal element, and $2 \leq h \leq 3$), $Na_3FeF_6$, $Na_2MnF_6$, a fluorophosphate, $Na_3V_2(PO_4)_2F_3$, $Na_3V_2(PO_4)_2FO_2$. $NaMnO_2$, $Na[Ni_{1/2}Mn_{1/2}]O_2$, $Na_{2/3}[Fe_{1/2}Mn_{1/2}]O_2$, $Na_3V_2(PO_4)_3$, $Na_4CO_3(PO_4)_2P_2O_7$, $Na_3V_2(PO_4)_2F_3$ and/pr $Na_3V_2(PO_4)_2FO_2$, as well as any complex oxides and/or other combinations of the foregoing.

Embodiment 511. The secondary battery and/or method according to any preceding embodiment, wherein the positive electrode active material comprises at least one of a transition metal oxide, transition metal sulfide, transition metal nitride, transition metal phosphate, and transition metal nitride.

Embodiment 512. The secondary battery and/or method according to any preceding embodiment, wherein the positive electrode active material comprises a transition metal oxide containing lithium and at least one of cobalt and nickel.

Embodiment 513. The secondary battery and/or method according to any preceding embodiment, wherein the negative electrode current collector comprises at least one of copper, nickel, aluminum, stainless steel, titanium, palladium, baked carbon, calcined carbon, indium, iron, magnesium, cobalt, germanium, lithium a surface treated material of copper or stainless steel with carbon, nickel, titanium, silver, an aluminum-cadmium alloy, and/or alloys thereof.

Embodiment 514. The secondary battery and/or method according to any preceding embodiment, wherein the negative electrode current collector comprises at least one of copper and stainless steel.

Embodiment 515. The secondary battery and/or method according to any preceding embodiment, wherein the positive electrode current collector comprises at least one of stainless steel, aluminum, nickel, titanium, baked carbon, sintered carbon, a surface treated material of aluminum or stainless steel with carbon, nickel, titanium, silver, and/or an alloy thereof.

Embodiment 516. The secondary battery and/or method according to any preceding embodiment, wherein the positive electrode current collector comprises aluminum.

Embodiment 517. The secondary battery and/or method according to any preceding embodiment, wherein the electrolyte comprises at least one of an organic liquid electrolyte, an inorganic liquid electrolyte, a solid polymer electrolyte, a gel polymer electrolyte, an inorganic solid electrolyte, a molten-type inorganic electrolyte.

Embodiment 518. The secondary battery and/or method according to any preceding embodiment, wherein the electrolyte comprises a non-aqueous liquid electrolyte comprises salts selected from lithium, sodium, magnesium and potassium-containing salts.

Embodiment 519. The secondary battery and/or method according to any preceding embodiment, wherein the electrolyte comprises a non-aqueous liquid electrolyte comprising salts selected from any one or more of $LiClO_4$, $LiBF_4$, $LiPF_6$, $LiAsF_6$, LiCl, LiBr, $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$.

Embodiment 520. The secondary battery and/or method according to any preceding embodiment, wherein the electrolyte comprises a solvent selected from any of propylene carbonate, ethylene carbonate, butylene carbonate, γ-butyrolactone, vinylene carbonate, 2-methyl-γ-butyrolactone, acetyl-γ-butyrolactone, and γ-valerolactone, dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates, tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane, 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Embodiment 521. The secondary battery and/or method according to any preceding embodiment, wherein the separator material comprises binder and particulate material.

Embodiment 522. The secondary battery and/or method according to any preceding embodiment, wherein the separator material comprises binder selected from any of silicates, phosphates, aluminates, aluminosilicates, magnesium hydroxide, calcium hydroxide, a fluoropolymer, vinylidene fluoride polymer, hexafluoropropylene polymer, tetrafluoropropene polymer, polyethylene, polypropylene, or polybutene, ethylene-diene-propene terpolymer, polystyrene, polymethyl methacrylate, polyethylene glycol, polyvinyl acetate, polyvinyl butyral, polyacetal, and polyethyleneglycol diacrylate, methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile and polyethylene oxide, acrylates, styrenes, epoxies, and silicones, polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations and/or co-polymers thereof.

Embodiment 523. The secondary battery and/or method according to any preceding embodiment, wherein the separator comprises particulate material comprising at least one of particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, $TiO_2$, $SiO_2$, $Al_2O_3$, $GeO_2$, $B_2O_3$, $Bi_2O_3$, BaO, ZnO, $ZrO_2$, BN, $Si_3N_4$, $Ge_3N_4$, $BaTiO_3$, $Pb(Zr, Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or mixtures thereof.

Embodiment 524. The secondary battery and/or method according to any of embodiments 500-517, comprising a solid electrolyte comprising any one or more of polyethylene oxide (PEO)-based, polyvinyl acetate (PVA)-based, polyethyleneimine (PEI)-based, polyvinylidene fluoride (PVDF)-based, polyacrylonitrile (PAN)-based, LiPON, and polymethyl methacrylate (PMMA)-based polymers or copolymers thereof, sulfide-based solid electrolyte comprising at least one of lithium and/or phosphorous, at least one of $Li_2S$, $P_2S_5$, $SiS_2$, $GeS_2$, $Li_3PS_4$, $Li_4P_2S_7$, $Li_4SiS_4$, $Li_2S$-$P_2S_5$, $50Li_4SiO_4{\cdot}50Li_3BO_3$, and/or $B_2S_3$.

Embodiment 525. The secondary battery and/or method according to any of the preceding Embodiments, wherein the set of constraints are capable of resisting a pressure of greater than of equal to 2 MPa exerted by the electrode assembly during cycling of the secondary battery between charged and discharged states.

Embodiment 526. The secondary battery and/or method according to any of the preceding Embodiments, wherein the set of constraints are capable of resisting a pressure of greater than or equal to 5 MPa exerted by the electrode assembly during cycling of the secondary battery between charged and discharged states.

Embodiment 527. The secondary battery and/or method according to any of the preceding Embodiments, wherein the set of constraints are capable of resisting a pressure of greater than or equal to 7 MPa exerted by the electrode assembly during cycling of the secondary battery between charged and discharged states.

Embodiment 528. The secondary battery and/or method according to any of the preceding Embodiments, wherein the set of constraints are capable of resisting a pressure of greater than or equal to 10 MPa exerted by the electrode assembly during cycling of the secondary battery between charged and discharged states.

Embodiment 529. The secondary battery and/or method according to any of the preceding Embodiments, wherein portions of the set of electrode constraints that are external to the electrode assembly occupy no more than 80% of the total combined volume of the electrode assembly and the external portions of the electrode constraints.

Embodiment 530. The secondary battery and/or method according to any of the preceding Embodiments, wherein portions of the primary growth constraint system that are external to the electrode assembly occupy no more than 40% of the total combined volume of the electrode assembly and external portions of the primary growth constraint system.

Embodiment 531. The secondary battery and/or method according to any of the preceding Embodiments, wherein portions of the secondary growth constraint system that are external to the electrode assembly occupy no more than 40% of the total combined volume of the electrode assembly and external portions of the secondary growth constraint system.

INCORPORATION BY REFERENCE

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

EQUIVALENTS

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained.

What is claimed is:

1. A secondary battery for cycling between a charged and a discharged state, the secondary battery comprising a battery enclosure and an electrode assembly, carrier ions, populations of first and second electrically insulating layers, and a set of electrode constraints, wherein:

(a) the electrode assembly has mutually perpendicular transverse, longitudinal and vertical axes corresponding to the x, y and z axes, respectively, of an imaginary three-dimensional cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, (b) the electrode assembly further comprises a population of electrode structures, a population of electrode current collectors, a population of separators that are ionically permeable to carrier ions, a population of counter-electrode structures, a population of counter-electrode collectors, and a population of unit cells wherein (i) members of the electrode and counter-electrode structure populations are arranged in an alternating sequence in the longitudinal direction, (ii) each member of the population of electrode structures comprises a layer of an electrode active material having a length $L_E$ that corresponds to the Feret diameter of the electrode active material layer as measured in the transverse direction between first and second opposing transverse end surfaces of the electrode active material layer, and a height $H_E$ that corresponds to the Feret diameter of the electrode active material layer as measured in the vertical direction between first and second opposing vertical end surfaces of the electrode active material layer, and a width $W_E$ that corresponds to the Feret diameter of the electrode active material layer as measured in the longitudinal direction between first and second opposing surfaces of the electrode active material layer, and each member of the population of counter-electrode structures comprises a layer of a counter-electrode active material having a length LC that corresponds to the Feret diameter of the counter-electrode active material layer as measured in the transverse direction between first and second opposing transverse end surfaces of the counter-electrode active material layer, and a height HC that corresponds to the Feret diameter of the counter-electrode active material layer as measured in the vertical direction between first and second opposing vertical end surfaces of the counter-electrode active material layer, and a width WC that corresponds to the Feret diameter of the counter-electrode active material layer as measured in the longitudinal direction between first and second opposing surfaces of the counter-electrode active material layer (iii) each unit cell comprises a unit cell portion of a first member of the electrode current collector of the electrode current collector population, a first electrode active material layer of one member of the electrode population, a member of the separator population that is ionically permeable to the carrier ions, a first counter-electrode active material layer of one member of the counter-electrode population, and a unit cell portion of a first member of the counter-electrode current collector of the counter-electrode current collector population, wherein (aa) the first electrode active material layer is proximate a first side of the separator and the first counter-electrode material layer is proximate an opposing second side of the separator, and (bb) the separator electrically isolates the first electrode active material layer from the first counter-electrode active material layer, and carrier ions are primarily exchanged between the first electrode active material layer and the first counter-electrode active material layer via the separator of each such unit cell during cycling of the battery between the charged and discharged state, (cc) within each unit cell, a. the first vertical end surfaces of the electrode and the counter-electrode active material layers are on the same side of the electrode assembly, a 2D map of the median vertical position of the first opposing vertical end surface of the electrode active material in the X-Z plane, along the length $L_E$ of the electrode active material layer, traces a first vert¬¬ical end surface plot, EVP1, a 2D map of the median vertical position of the first opposing vertical end surface of the counter-electrode active material layer in the X-Z plane, along the length LC of the counter-electrode active material layer, traces a first vertical end surface plot, CEVP1, wherein for at least 60% of the length $L_C$ of the first counter-electrode active material layer (i) the absolute value of a separation distance, SZ1, between the plots EVP1 and CEVP1 measure¬d in the vertical direction is 1000 μm≥|SZ1|≥5 μm, and (ii) as between the first vertical end surfaces of the electrode and counter-electrode active material layers, the first vertical end surface of the counter-electrode active material layer is inwardly disposed with respect to the first vertical end surface of the electrode active material layer, and b. the second vertical end surfaces of the electrode and counter-electrode active material layer are on the same side of the electrode assembly, and oppose the first vertical end surfaces of the electrode and counter-electrode active material layers, respectively, a 2D map of the median vertical position of the second opposing vertical end surface of the electrode active material layer in the X-Z plane, along the length $L_E$ of the electrode active material layer, traces a second vertical end surface plot, EVP2, a 2D map of the median vertical position of the second opposing vertical end surface of the counter-electrode active material layer in the X-Z plane, along the length LC of the counter-electrode active material layer, traces a second vertical end surface plot, CEVP2, wherein for at least 60% of the length LC of the counter-electrode active material layer (i) the absolute value of a separation distance, SZ2, between the plots EVP2 and $CE_{VP2}$ as measured in the vertical direction is 1000 μm≥|SZ2|≥5 μm, and (ii) as between the second vertical end surfaces of the electrode and counter-electrode active material layers, the second vertical end surface of the counter-electrode active material layer is inwardly disposed with respect to the second vertical end surface of the electrode active material layer, (c) the set of electrode constraints comprises (i) a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction, and (ii) a secondary constraint system comprising first and second secondary growth constraints separated in a second direction and connected by at least one secondary connecting member, wherein the secondary constraint system at least partially restrains growth of the electrode assembly in the second direction upon cycling of the secondary battery, the second direction being orthogonal to the longitudinal direction; and (d) members of the population of first electrically insulating layers and members of the population of second electrically insulating layers are disposed at respective first and second vertical end surfaces of counter-electrode active material layers of members of the counter-electrode structure population, the members of the populations of first and second electrically insulating layers being disposed between the first and second vertical end surfaces of the counter-electrode active material layers and the respective first and second secondary growth constraints proximate each of the first and second vertical end surfaces in the vertical direction.

2. The secondary battery of claim 1, wherein the first and second secondary growth constraints are connected to one or members of the population of electrode structures or one or more members of the population of counter-electrode structures.

3. The secondary battery of claim 1, wherein the secondary connecting member comprises a member of the population of electrode current collectors, or a member of the population of counter-electrode current collectors.

4. The secondary battery of claim 1, wherein the secondary connecting member comprises any of electrode active material layer of a member of the electrode structure population, a member of the electrode current collector population, counter-electrode active material layer of a member of the counter-electrode structure population, a member of the counter-electrode current collector population, or a member of the population of separators.

5. The secondary battery of claim 1, wherein members of the populations of first and second insulating layers extend entirely over the first and second vertical end surfaces of the counter-electrode active material layer of members of the population of counter-electrode structures in the longitudinal and transverse directions.

6. The secondary battery of claim 1, wherein for each member of the unit cell population, members of the populations of first and second vertical end surfaces of the counter-electrode active material layer and (ii) first and second vertical end surfaces of the electrode active material layer of the unit cell member.

7. The secondary battery of claim 1, wherein for each member of the unit cell population, members of the populations of first and second insulating layers extend over the first and second vertical end surfaces of the counter-electrode active material layer and are bounded in the longitudinal direction by the separator and counter-electrode current collector of the unit cell member.

8. The secondary battery of claim 1, wherein for each member of the unit cell population, members of the populations of first and second insulating layers extend over first and second vertical end surfaces of the separator to cover one or more vertical end surfaces of the electrode active material layer in each member of the unit cell population.

9. The secondary battery of claim 1, wherein for each member of the unit cell population, members of the populations of first and second insulating layers comprise a first thickness T1 over the first and second vertical end surfaces of the electrode active material layer, and a second thickness T2 over the first and second vertical end surfaces of the counter-electrode active material layer, the first thickness being less than the second thickness in the unit cell member.

10. The secondary battery of claim 1, wherein members of the populations of first and second insulating layers extend over first and second vertical end surfaces of members of the counter-electrode current collector population.

11. The secondary battery of claim 1, wherein members of the populations of first and second insulating layers extend across first and second vertical end surfaces of members of the counter-electrode population in adjoining unit cells.

12. The secondary battery of claim 1, wherein, for each member of the unit cell population, a vertical extent of members of the populations of first and second insulating layers is at least as high as the respective separation distance Sz1 or Sz2.

13. The secondary battery of claim 1, wherein members of the populations of first and second insulating layers comprises any of ceramics, polymers, glass, and combinations or composites thereof.

14. The secondary battery of claim 1, wherein members of the populations of first and second insulating layers are electrically insulating to inhibit shorting between structures in members of the unit cell population.

15. The secondary battery of claim 1, wherein members of the populations of first and second insulating layers are less ionically permeable than the separator.

16. The secondary battery of claim 1, wherein the electrode active material has the capacity to accept more than one mole of carrier ion per mole of electrode active material when the secondary battery is charged from the discharge state to the charged state, the charged state is at least 75% of a rated capacity of the secondary battery, and the discharged state is less than 25% of the rated capacity of the secondary battery.

17. The secondary battery of claim 1, wherein the electrode active material comprise any selected from the group consisting of graphite, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, graphite, carbon, lithium titanate, and palladium.

18. The secondary battery of claim 1, wherein the carrier ions comprise any selected from the group consisting of lithium, sodium and magnesium.

19. The secondary battery of claim 1, wherein for electrode active material layers of members of the population of electrode structures, an aspect ratio of the length $L_E$ of the electrode active material layer, to both the height $H_E$ and width $W_E$ of the electrode active material layer, is at least 5:1.

20. The secondary battery of claim 1, wherein the at least one secondary connecting member is interior to longitudinal first and second ends of the electrode assembly along the longitudinal axis.

* * * * *